US008401881B2

(12) United States Patent
Weinstock et al.

(10) Patent No.: US 8,401,881 B2

(45) Date of Patent: Mar. 19, 2013

(54) EXTENDED WEB ENABLED BUSINESS TO BUSINESS COMPUTER SYSTEM FOR RENTAL VEHICLE SERVICES

(75) Inventors: Timothy Robert Weinstock, St. Charles, MO (US); Kimberly Ann DeVallance, Maryland Heights, MO (US); Randall Allan Haselhorst, Imperial, MO (US); Craig Stephen Kennedy, St. Louis, MO (US); David Gary Smith, Wildwood, MO (US); William T. Tingle, Eureka, MO (US); Anita K. Klopfenstein, O'Fallon, IL (US)

(73) Assignee: The Crawford Group, Inc., St. Louis, MO (US)

( * ) Notice: Subject to any disclaimer, the term of this patent is extended or adjusted under 35 U.S.C. 154(b) by 0 days.

(21) Appl. No.: 13/025,617

(22) Filed: Feb. 11, 2011

(65) Prior Publication Data

US 2011/0153372 A1 Jun. 23, 2011

Related U.S. Application Data

(63) Continuation of application No. 09/694,050, filed on Oct. 20, 2000, now Pat. No. 7,899,690, which is a continuation-in-part of application No. 09/641,820, filed on Aug. 18, 2000, now Pat. No. 7,275,038.

(51) Int. Cl.

| | |
|---|---|
| ***G06Q 10/00*** | (2006.01) |
| ***G06Q 40/00*** | (2006.01) |
| ***G01C 21/34*** | (2006.01) |

(52) U.S. Cl. ................................................ 705/6; 705/4

(58) Field of Classification Search .................. 705/2, 3
See application file for complete search history.

(56) References Cited

U.S. PATENT DOCUMENTS

| | | | |
|---|---|---|---|
| 4,714,989 | A | 12/1987 | Billings |
| 4,757,267 | A | 7/1988 | Riskin |
| 4,774,663 | A | 9/1988 | Musmanno et al. |
| 4,788,643 | A | 11/1988 | Trippe et al. |
| 4,797,818 | A | 1/1989 | Cotter |
| 4,799,156 | A | 1/1989 | Shavit et al. |
| 4,831,526 | A | 5/1989 | Luchs et al. |
| 4,858,121 | A | 8/1989 | Barber et al. |
| 4,891,785 | A | 1/1990 | Donohoo |

(Continued)

FOREIGN PATENT DOCUMENTS

| | | |
|---|---|---|
| JP | 2001344490 | 12/2001 |
| JP | 2002074126 | 3/2002 |

(Continued)

OTHER PUBLICATIONS

U.S. Appl. No. 09/564,911, filed May 4, 2000 (Williams).

(Continued)

*Primary Examiner* — Robert Morgan
*Assistant Examiner* — Charles P Coleman
(74) *Attorney, Agent, or Firm* — Thompson Coburn LLP

(57) ABSTRACT

An Internet-enabled rental vehicle reservation management method and system are disclosed. Via the system and method, authorized purchasers can select a rental vehicle service provider from a among a plurality of competitive rental vehicle service providers via at least one graphical user interface (GUI) menu, and the authorized purchasers can further interact with the system and method to (1) automatically book a rental vehicle reservation with a selected competitive rental vehicle service provider without human intervention on the part of personnel of the selected competitive rental vehicle service provider operating the computer system and (2) manage the booked rental vehicle reservation. In an exemplary embodiment, the reservations created and managed through the system and method are replacement rental vehicles and the authorized purchasers are insurance company personnel.

20 Claims, 204 Drawing Sheets

U.S. PATENT DOCUMENTS

| | | | |
|---|---|---|---|
| 4,897,867 | A | 1/1990 | Foster et al. |
| 4,899,292 | A | 2/1990 | Montagna et al. |
| 4,916,611 | A | 4/1990 | Doyle, Jr. et al. |
| 4,931,932 | A | 6/1990 | Dalnekoff et al. |
| 4,951,196 | A | 8/1990 | Jackson |
| 4,984,155 | A | 1/1991 | Geier et al. |
| 5,058,044 | A | 10/1991 | Stewart et al. |
| 5,063,506 | A | 11/1991 | Brockwell et al. |
| 5,182,705 | A | 1/1993 | Barr et al. |
| 5,210,687 | A | 5/1993 | Wolfberg et al. |
| 5,216,592 | A | 6/1993 | Mann et al. |
| 5,218,697 | A | 6/1993 | Chung |
| 5,224,034 | A | 6/1993 | Katz et al. |
| 5,237,499 | A | 8/1993 | Garback |
| 5,253,165 | A | 10/1993 | Leiseca et al. |
| 5,270,922 | A | 12/1993 | Higgins |
| 5,289,369 | A | 2/1994 | Hirshberg |
| 5,309,355 | A | 5/1994 | Lockwood |
| 5,311,425 | A | 5/1994 | Inada et al. |
| 5,319,542 | A | 6/1994 | King, Jr. et al. |
| 5,355,474 | A | 10/1994 | Thuraisngham et al. |
| 5,361,199 | A | 11/1994 | Shoquist et al. |
| 5,369,570 | A | 11/1994 | Parad |
| 5,375,207 | A | 12/1994 | Blakely et al. |
| 5,390,314 | A | 2/1995 | Swanson |
| 5,396,600 | A | 3/1995 | Thompson et al. |
| 5,406,475 | A | 4/1995 | Kouchi et al. |
| 5,422,809 | A | 6/1995 | Griffin et al. |
| 5,432,904 | A | 7/1995 | Wong |
| 5,465,206 | A | 11/1995 | Hilt et al. |
| 5,471,615 | A | 11/1995 | Amatsu et al. |
| 5,475,585 | A | 12/1995 | Bush |
| 5,504,674 | A | 4/1996 | Chen et al. |
| 5,506,897 | A | 4/1996 | Moore et al. |
| 5,515,268 | A | 5/1996 | Yoda |
| 5,528,490 | A | 6/1996 | Hill |
| 5,530,844 | A | 6/1996 | Phillips et al. |
| 5,544,040 | A | 8/1996 | Gerbaulet et al. |
| 5,544,320 | A | 8/1996 | Konrad |
| 5,550,734 | A | 8/1996 | Tarter et al. |
| 5,557,515 | A | 9/1996 | Abbruzzese et al. |
| 5,557,518 | A | 9/1996 | Rosen |
| 5,570,283 | A | 10/1996 | Shoolery et al. |
| 5,581,461 | A | 12/1996 | Coll et al. |
| 5,586,313 | A | 12/1996 | Schnittker et al. |
| 5,588,048 | A | 12/1996 | Neville |
| 5,592,375 | A | 1/1997 | Salmon et al. |
| 5,592,378 | A | 1/1997 | Cameron et al. |
| 5,640,505 | A | 6/1997 | Hearn et al. |
| 5,644,721 | A | 7/1997 | Chung et al. |
| 5,664,207 | A | 9/1997 | Crumpler et al. |
| 5,666,493 | A | 9/1997 | Wojcik et al. |
| 5,694,551 | A | 12/1997 | Doyle et al. |
| 5,696,901 | A | 12/1997 | Konrad |
| 5,696,965 | A | 12/1997 | Dedrick |
| 5,710,887 | A | 1/1998 | Chelliah et al. |
| 5,710,889 | A | 1/1998 | Clark et al. |
| 5,712,989 | A | 1/1998 | Johnson et al. |
| 5,721,832 | A | 2/1998 | Westrope et al. |
| 5,721,913 | A | 2/1998 | Ackroff et al. |
| 5,724,520 | A | 3/1998 | Goheen |
| 5,726,885 | A | 3/1998 | Klein et al. |
| 5,732,398 | A | 3/1998 | Tagawa |
| 5,734,823 | A | 3/1998 | Saigh et al. |
| 5,754,772 | A | 5/1998 | Leaf |
| 5,754,830 | A | 5/1998 | Butts et al. |
| 5,757,925 | A | 5/1998 | Faybishenko |
| 5,758,329 | A | 5/1998 | Wojcik et al. |
| 5,758,341 | A | 5/1998 | Voss |
| 5,764,981 | A | 6/1998 | Brice et al. |
| 5,768,510 | A | 6/1998 | Gish |
| 5,768,511 | A | 6/1998 | Galvin et al. |
| 5,774,873 | A | 6/1998 | Berent et al. |
| 5,778,178 | A | 7/1998 | Arunachalam |
| 5,781,892 | A | 7/1998 | Hunt et al. |
| 5,784,565 | A | 7/1998 | Lewine |
| 5,793,966 | A | 8/1998 | Amstein et al. |
| 5,794,207 | A | 8/1998 | Walker et al. |
| 5,796,634 | A | 8/1998 | Craport et al. |
| 5,796,967 | A | 8/1998 | Filepp et al. |
| 5,797,126 | A | 8/1998 | Helbling et al. |
| 5,799,157 | A | 8/1998 | Escallon |
| 5,799,289 | A | 8/1998 | Fukushima et al. |
| 5,802,293 | A | 9/1998 | van der Sijpt et al. |
| 5,802,530 | A | 9/1998 | Van Hoff |
| 5,805,689 | A | 9/1998 | Neville |
| 5,805,829 | A | 9/1998 | Cohen et al. |
| 5,808,894 | A | 9/1998 | Wiens et al. |
| 5,809,478 | A | 9/1998 | Greco et al. |
| 5,812,067 | A | 9/1998 | Bergholz et al. |
| 5,818,715 | A | 10/1998 | Marshall et al. |
| 5,819,274 | A | 10/1998 | Jackson, Jr. |
| 5,832,451 | A | 11/1998 | Flake et al. |
| 5,832,452 | A | 11/1998 | Schneider et al. |
| 5,832,454 | A | 11/1998 | Jafri et al. |
| 5,835,724 | A | 11/1998 | Smith |
| 5,838,910 | A | 11/1998 | Domenikos et al. |
| 5,838,916 | A | 11/1998 | Domenikos et al. |
| 5,839,112 | A | 11/1998 | Schreitmueller et al. |
| 5,839,114 | A | 11/1998 | Lynch et al. |
| 5,842,176 | A | 11/1998 | Hunt et al. |
| 5,845,077 | A | 12/1998 | Fawcett |
| 5,847,957 | A | 12/1998 | Cohen et al. |
| 5,848,131 | A | 12/1998 | Shaffer et al. |
| 5,848,241 | A | 12/1998 | Misinai et al. |
| 5,850,446 | A | 12/1998 | Berger et al. |
| 5,857,191 | A | 1/1999 | Blackwell, Jr. et al. |
| 5,862,346 | A | 1/1999 | Kley et al. |
| 5,864,818 | A | 1/1999 | Feldman |
| 5,864,827 | A | 1/1999 | Wilson |
| RE36,111 | E | 2/1999 | Neville |
| 5,870,719 | A | 2/1999 | Maritzen et al. |
| 5,870,733 | A | 2/1999 | Bass et al. |
| 5,875,110 | A | 2/1999 | Jacobs |
| 5,877,765 | A | 3/1999 | Dickman et al. |
| 5,881,230 | A | 3/1999 | Christensen et al. |
| 5,889,863 | A | 3/1999 | Weber |
| 5,889,942 | A | 3/1999 | Orenshteyn |
| 5,890,129 | A | 3/1999 | Spurgeon |
| 5,890,140 | A | 3/1999 | Clark et al. |
| 5,892,905 | A | 4/1999 | Brandt et al. |
| 5,893,904 | A | 4/1999 | Harris et al. |
| 5,897,620 | A | 4/1999 | Walker et al. |
| 5,898,835 | A | 4/1999 | Truong |
| 5,901,214 | A | 5/1999 | Shaffer et al. |
| 5,903,873 | A | 5/1999 | Peterson et al. |
| 5,907,608 | A | 5/1999 | Shaffer et al. |
| 5,909,542 | A | 6/1999 | Paquette et al. |
| 5,909,570 | A | 6/1999 | Webber |
| 5,909,581 | A | 6/1999 | Park |
| 5,910,982 | A | 6/1999 | Shaffer et al. |
| 5,915,241 | A | 6/1999 | Giannini |
| 5,918,215 | A | 6/1999 | Yoshioka et al. |
| 5,920,696 | A | 7/1999 | Brandt et al. |
| 5,923,552 | A | 7/1999 | Brown et al. |
| 5,926,793 | A | 7/1999 | de Rafael et al. |
| 5,926,798 | A | 7/1999 | Carter et al. |
| 5,930,474 | A | 7/1999 | Dunworth et al. |
| 5,931,878 | A | 8/1999 | Chapin, Jr. |
| 5,931,917 | A | 8/1999 | Nguyen et al. |
| 5,933,810 | A | 8/1999 | Okawa et al. |
| 5,944,784 | A | 8/1999 | Simonoff et al. |
| 5,946,660 | A | 8/1999 | McCarty et al. |
| 5,946,687 | A | 8/1999 | Gehani et al. |
| 5,948,040 | A | 9/1999 | DeLorme et al. |
| 5,950,169 | A | 9/1999 | Borghesi et al. |
| 5,953,706 | A | 9/1999 | Patel |
| 5,956,397 | A | 9/1999 | Shaffer et al. |
| 5,956,487 | A | 9/1999 | Venkatraman et al. |
| 5,956,509 | A | 9/1999 | Kevner |
| 5,961,569 | A | 10/1999 | Craport et al. |
| 5,961,572 | A | 10/1999 | Craport et al. |
| 5,963,915 | A | 10/1999 | Kirsch |
| 5,966,451 | A | 10/1999 | Utsumi |
| 5,970,475 | A | 10/1999 | Barnes et al. |
| 5,973,619 | A | 10/1999 | Paredes |
| 5,974,444 | A | 10/1999 | Konrad |

5,977,966 A 11/1999 Bogdan
5,978,577 A 11/1999 Rierden et al.
5,978,747 A 11/1999 Craport et al.
5,978,817 A 11/1999 Giannandrea et al.
5,978,834 A 11/1999 Simonoff et al.
5,978,840 A 11/1999 Nguyen et al.
5,982,867 A 11/1999 Urban et al.
5,982,868 A 11/1999 Shaffer et al.
5,983,200 A 11/1999 Slotznick
5,983,208 A 11/1999 Haller et al.
5,987,423 A 11/1999 Arnold et al.
5,991,739 A 11/1999 Cupps et al.
5,995,939 A 11/1999 Berman et al.
5,996,017 A 11/1999 Cipiere et al.
6,002,767 A 12/1999 Kramer
6,005,568 A 12/1999 Simonoff et al.
6,006,148 A 12/1999 Strong
6,006,201 A 12/1999 Berent et al.
6,009,464 A 12/1999 Hamilton et al.
6,012,083 A 1/2000 Savitzky et al.
6,014,673 A 1/2000 Davis et al.
6,014,702 A 1/2000 King et al.
6,016,496 A 1/2000 Roberson
6,018,627 A 1/2000 Iyengar et al.
6,021,406 A 2/2000 Kuznetsov
6,023,679 A 2/2000 Acebo et al.
6,026,379 A 2/2000 Haller et al.
6,029,175 A 2/2000 Chow et al.
6,031,533 A 2/2000 Peddada et al.
6,043,815 A 3/2000 Simonoff et al.
6,044,382 A 3/2000 Martino
6,049,671 A 4/2000 Slivka et al.
6,049,774 A 4/2000 Roy
6,049,832 A 4/2000 Brim et al.
6,054,983 A 4/2000 Simonoff et al.
6,058,179 A 5/2000 Shaffer et al.
6,058,378 A 5/2000 Clark et al.
6,061,665 A 5/2000 Bahreman
6,061,691 A 5/2000 Fox
6,064,973 A 5/2000 Smith et al.
6,070,142 A 5/2000 McDonough et al.
6,072,870 A 6/2000 Nguyen et al.
6,073,163 A 6/2000 Clark et al.
6,073,214 A 6/2000 Fawcett
6,076,066 A 6/2000 DiRienzo et al.
6,076,067 A 6/2000 Jacobs et al.
6,078,321 A 6/2000 Simonoff et al.
6,078,322 A 6/2000 Simonoff et al.
6,084,585 A 7/2000 Kraft et al.
6,085,169 A 7/2000 Walker et al.
6,085,170 A 7/2000 Tsukuda et al.
6,088,677 A 7/2000 Spurgeon
6,091,409 A 7/2000 Dickman et al.
6,091,412 A 7/2000 Simonoff et al.
6,091,810 A 7/2000 Shaffer et al.
6,094,640 A 7/2000 Goheen
6,094,679 A 7/2000 Teng et al.
6,097,802 A 8/2000 Fleischer, III et al.
6,101,496 A 8/2000 Esposito
6,108,650 A 8/2000 Musk et al.
6,112,185 A 8/2000 Walker et al.
6,119,105 A 9/2000 Williams
6,119,149 A 9/2000 Notani
6,122,642 A 9/2000 Mehovic
6,125,384 A 9/2000 Brandt et al.
6,125,391 A 9/2000 Meltzer et al.
6,144,944 A 11/2000 Kurtzman, II et al.
6,144,990 A 11/2000 Brandt et al.
6,148,289 A 11/2000 Virdy
6,148,290 A 11/2000 Dan et al.
6,154,172 A 11/2000 Piccionelli et al.
6,163,772 A 12/2000 Kramer et al.
6,167,567 A 12/2000 Chiles et al.
6,175,832 B1 1/2001 Luzzi et al.
6,178,409 B1 1/2001 Weber et al.
6,185,290 B1 2/2001 Shaffer et al.
6,185,540 B1 2/2001 Schreitmueller et al.
6,189,003 B1 2/2001 Leal
6,192,415 B1 2/2001 Haverstock et al.
6,205,482 B1 3/2001 Navarre et al.
6,223,094 B1 4/2001 Muehleck et al.
6,226,654 B1 5/2001 Van Hoff
6,226,675 B1 5/2001 Meltzer et al.
6,229,534 B1 5/2001 Gerra et al.
6,230,117 B1 5/2001 Lymer et al.
6,233,329 B1 5/2001 Urban et al.
6,233,609 B1 5/2001 Mittal
6,240,365 B1 5/2001 Bunn
6,253,188 B1 6/2001 Witek et al.
6,263,322 B1 7/2001 Kirkevold et al.
6,272,528 B1 8/2001 Cullen et al.
6,272,675 B1 8/2001 Schrab et al.
6,275,843 B1 8/2001 Chorn
6,282,489 B1 8/2001 Bellesfield et al.
6,282,517 B1 8/2001 Wolfe et al.
6,282,568 B1 8/2001 Sondur et al.
6,286,028 B1 9/2001 Cohen et al.
6,292,185 B1 9/2001 Ko et al.
6,304,892 B1 10/2001 Bhoj et al.
6,308,120 B1 10/2001 Good
6,308,160 B1 10/2001 Rex
6,311,207 B1 10/2001 Mighdoll et al.
6,311,213 B2 10/2001 Dawson et al.
6,324,568 B1 11/2001 Diec
6,327,574 B1 12/2001 Kramer et al.
6,327,617 B1 12/2001 Fawcett
6,332,163 B1 12/2001 Bowman-Amuah
6,334,146 B1 12/2001 Parasnis et al.
6,336,100 B1 1/2002 Yamada
6,339,773 B1 1/2002 Rishe
6,343,290 B1 1/2002 Cossins et al.
6,347,398 B1 2/2002 Parthasarathy et al.
6,351,738 B1 2/2002 Clark
6,360,205 B1 3/2002 Iyengar et al.
6,363,388 B1 3/2002 Sprenger et al.
6,370,523 B1 4/2002 Anderson
6,381,324 B1 4/2002 Shaffer et al.
6,381,603 B1 4/2002 Chan et al.
6,381,617 B1 4/2002 Frolund et al.
6,385,312 B1 5/2002 Shaffer et al.
6,389,431 B1 5/2002 Frolund et al.
6,393,415 B1 5/2002 Getchius et al.
6,393,471 B1 5/2002 Kobata
6,397,191 B1 5/2002 Notani et al.
6,397,208 B1 5/2002 Lee
6,397,219 B2 5/2002 Mills et al.
6,401,094 B1 6/2002 Stemp et al.
6,418,400 B1 7/2002 Webber
6,418,554 B1 7/2002 Delo et al.
6,445,309 B1 9/2002 Walker et al.
6,477,452 B2 11/2002 Good
6,542,912 B2 4/2003 Meltzer et al.
6,567,783 B1 5/2003 Notani et al.
6,609,050 B2 8/2003 Li
6,694,234 B2 2/2004 Lockwood et al.
6,732,358 B1 5/2004 Siefert
6,748,426 B1 6/2004 Shaffer et al.
6,757,698 B2 6/2004 McBride et al.
6,802,061 B1 10/2004 Parthasarathy et al.
6,968,388 B1 11/2005 Fuldseth et al.
7,020,620 B1 3/2006 Bargnes et al.
7,050,986 B1 5/2006 Vance et al.
7,062,765 B1 6/2006 Pitzel et al.
7,089,588 B2 8/2006 Schaefer et al.
7,136,821 B1 11/2006 Kohavi et al.
7,243,075 B1 7/2007 Shaffer et al.
7,275,038 B1 9/2007 Weinstock et al.
7,328,166 B1 2/2008 Geoghegan et al.
7,899,690 B1 * 3/2011 Weinstock et al. ............... 705/5
8,160,906 B2 4/2012 Smith et al.
8,160,907 B2 4/2012 Smith et al.
2001/0005831 A1 6/2001 Lewin et al.
2001/0008998 A1 7/2001 Tamaki et al.
2001/0010058 A1 7/2001 Mittal
2001/0011222 A1 8/2001 McLauchlin et al.
2001/0011246 A1 8/2001 Tammaro
2001/0014907 A1 8/2001 Brebner
2001/0016825 A1 8/2001 Pugliese, III et al.

2001/0016868 A1 8/2001 Nakamura et al.
2001/0018661 A1 8/2001 Sato et al.
2001/0021912 A1 9/2001 Demarcken et al.
2001/0027420 A1 10/2001 Boublik et al.
2001/0027483 A1 10/2001 Gupta et al.
2001/0029459 A1 10/2001 Fujiwara
2001/0032113 A1 10/2001 Rudnick
2001/0032273 A1 10/2001 Cheng
2001/0037224 A1 11/2001 Eldridge et al.
2001/0037255 A1 11/2001 Tambay et al.
2001/0037298 A1 11/2001 Ehrman et al.
2001/0037331 A1 11/2001 Lloyd
2001/0044811 A1 11/2001 Ballantyne et al.
2001/0056361 A1 12/2001 Sendouda
2002/0004796 A1 1/2002 Vange et al.
2002/0007289 A1 1/2002 Malin et al.
2002/0010781 A1 1/2002 Tuatini
2002/0019821 A1 2/2002 Rosenbluth
2002/0022979 A1 2/2002 Whipp et al.
2002/0026337 A1 2/2002 Sasaki
2002/0032626 A1 3/2002 DeWolf et al.
2002/0032790 A1 3/2002 Linderman
2002/0035488 A1 3/2002 Aquila et al.
2002/0040352 A1 4/2002 McCormick
2002/0042843 A1 4/2002 Diec
2002/0042849 A1 4/2002 Ho et al.
2002/0046213 A1 4/2002 Vinati et al.
2002/0046294 A1 4/2002 Brodsky et al.
2002/0046301 A1 4/2002 Shannon et al.
2002/0049603 A1 4/2002 Mehra et al.
2002/0062262 A1 5/2002 Vasconi et al.
2002/0069123 A1 6/2002 Soderlind et al.
2002/0072937 A1 6/2002 Domenick et al.
2002/0072938 A1 6/2002 Black et al.
2002/0073012 A1 6/2002 Lowell et al.
2002/0073236 A1 6/2002 Helgeson et al.
2002/0076029 A1 6/2002 Shaffer et al.
2002/0077871 A1 6/2002 Udelhoven et al.
2002/0082912 A1 6/2002 Batachia et al.
2002/0083095 A1 6/2002 Wu et al.
2002/0083099 A1 6/2002 Knauss et al.
2002/0091533 A1 7/2002 Ims et al.
2002/0095319 A1 7/2002 Swart et al.
2002/0099562 A1 7/2002 Bruce, Sr. et al.
2002/0099575 A1 7/2002 Hubbard et al.
2002/0099613 A1 7/2002 Swart et al.
2002/0099735 A1 7/2002 Schroeder et al.
2002/0099738 A1 7/2002 Grant
2002/0106069 A1 8/2002 Shaffer et al.
2002/0107918 A1 8/2002 Shaffer et al.
2002/0111846 A1 8/2002 Singer
2002/0111876 A1 8/2002 Rudraraju et al.
2002/0116205 A1 8/2002 Ankireddipally et al.
2002/0116454 A1 8/2002 Dyla et al.
2002/0120459 A1 8/2002 Dick et al.
2002/0120776 A1 8/2002 Eggebraaten et al.
2002/0129021 A1 9/2002 Brown
2002/0133359 A1 9/2002 Brown
2002/0133517 A1 9/2002 Carlson et al.
2002/0136381 A1 9/2002 Shaffer et al.
2002/0143644 A1 10/2002 Tosun et al.
2002/0152100 A1 10/2002 Chen et al.
2002/0156693 A1 10/2002 Stewart et al.
2002/0156865 A1 10/2002 Rajarajan et al.
2002/0169842 A1 11/2002 Christensen et al.
2002/0178087 A1 11/2002 Henderson et al.
2002/0184054 A1 12/2002 Cox et al.
2002/0184266 A1 12/2002 Blessin
2002/0188761 A1 12/2002 Chikirivao et al.
2002/0194219 A1 12/2002 Bradley et al.
2002/0198743 A1 12/2002 Ariathurai et al.
2003/0004822 A1 1/2003 Shorter et al.
2003/0009545 A1 1/2003 Sahai et al.
2003/0014270 A1 1/2003 Qureshi et al.
2003/0014295 A1 1/2003 Brookes et al.
2003/0018666 A1 1/2003 Chen et al.
2003/0023450 A1 1/2003 Casati et al.
2003/0023463 A1* 1/2003 Dombroski et al. .............. 705/5
2003/0028404 A1 2/2003 Herron et al.
2003/0028533 A1 2/2003 Bata et al.
2003/0036917 A1 2/2003 Hite et al.
2003/0036930 A1 2/2003 Matos et al.
2003/0036966 A1 2/2003 Amra et al.
2003/0041180 A1 2/2003 Schlussman
2003/0114967 A1 6/2003 Good
2003/0125992 A1* 7/2003 Rogers et al. ..................... 705/5
2003/0149600 A1 8/2003 Williams
2003/0154111 A1 8/2003 Dutra et al.
2004/0054600 A1 3/2004 Shike et al.
2005/0021378 A1 1/2005 Weinstock et al.
2005/0091087 A1 4/2005 Smith et al.
2005/0187833 A1 8/2005 Royer et al.
2005/0246206 A1 11/2005 Obora et al.
2007/0174081 A1 7/2007 Smith et al.
2007/0198311 A1 8/2007 Menendez et al.
2007/0260496 A1 11/2007 Weinstock et al.
2007/0271124 A1 11/2007 Weinstock et al.
2007/0271125 A1 11/2007 Weinstock et al.
2008/0010105 A1 1/2008 Rose et al.
2008/0097798 A1 4/2008 DeVallance et al.
2008/0133281 A1 6/2008 Bolt et al.
2008/0140460 A1 6/2008 Smith et al.
2008/0162199 A1 7/2008 Smith et al.
2008/0243562 A1 10/2008 Weinstock et al.
2008/0243563 A1 10/2008 Weinstock et al.
2008/0249814 A1 10/2008 Weinstock et al.
2009/0030747 A1 1/2009 Smith et al.
2010/0023352 A1 1/2010 Smith et al.
2011/0153375 A1 6/2011 Weinstock et al.

FOREIGN PATENT DOCUMENTS

WO 9966738 12/1999
WO 0052601 A1 9/2000
WO 0197072 12/2001
WO 0221314 A2 3/2002
WO 0229675 4/2002
WO 02057873 7/2002
WO 02067079 8/2002
WO 02080646 10/2002

OTHER PUBLICATIONS

U.S. Appl. No. 09/698,491, filed Oct. 27, 2000 (Menendez et al.).
U.S. Appl. No. 09/698,502, filed Oct. 27, 2000 (Menendez et al.).
U.S. Appl. No. 09/698,552, filed Oct. 27, 2000 (Menendez et al.).
"Thrifty Introduces Automated Car Rental Centers", PRNEWSWIRE, Jul. 20, 1994.
Prosecution History for U.S. Appl. No. 09/641,820, now USPN 7,275,038, filed Aug. 18, 2000 (as of Apr. 20, 2011).
Prosecution History for U.S. Appl. No. 09/694,050, now USPN 7,899,690, filed Oct. 20, 2000—Parts 1-3 (as of Apr. 20, 2011).
Prosecution History for U.S. Appl. No. 10/343,576, filed Jan. 31, 2003—Parts 1-3 (as of Apr. 20, 2011).
Prosecution History for U.S. Appl. No. 11/550,614, filed Oct. 18, 2006 (as of Oct. 24, 2011).
Prosecution History for U.S. Appl. No. 11/747,645, filed May 11, 2007 (as of Oct. 18, 2011).
Prosecution History for U.S. Appl. No. 11/823,782, filed Jun. 28, 2007—Parts 1 & 2 (as of Oct. 18, 2011).
Prosecution History for U.S. Appl. No. 11/868,266, filed Oct. 5, 2007 (as of Apr. 20, 2011).
Prosecution History for U.S. Appl. No. 11/881,216, filed Jul. 26, 2007—Parts 1 & 2 (as of Oct. 18, 2011).
Prosecution History for U.S. Appl. No. 11/881,383, filed Jul. 26, 2007—Parts 1 & 2 (as of Oct. 18, 2011).
Prosecution History for U.S. Appl. No. 11/929,277, filed Oct. 30, 2007—Parts 1 & 2 (as of Oct. 18, 2011).
Prosecution History for U.S. Appl. No. 11/929,350, filed Oct. 30, 2007—Parts 1 & 2 (as of Oct. 18, 2011).
Prosecution History for U.S. Appl. No. 12/179,071, filed Jul. 24, 2008 (as of Apr. 20, 2011).
Response to Office Action for CA Application 2416840 dated Sep. 3, 2010.
Interactions, vol. 2, No. 13, Nov. 1, 1993.
Interactions, vol. 2, No. 14, Nov. 15, 1993.

Interactions, vol. 2, No. 5, May 1993.
Interactions, vol. 2, No. 7, Jul. 1993.
Interactions, vol. 2, No. 8, Aug. 1993.
Interactions, vol. 3, No. 1, Jan. 1, 1994.
Interactions, vol. 3, No. 1, Jan. 15, 1994.
Interactions, vol. 3, No. 10, May 15, 1994.
Interactions, vol. 3, No. 11, Jun. 1, 1994.
Interactions, vol. 3, No. 12, Jun. 15, 1994.
Interactions, vol. 3, No. 14, Jul. 15, 1994.
Interactions, vol. 3, No. 15, Aug. 1, 1994.
Interactions, vol. 3, No. 16, Aug. 15, 1994.
Interactions, vol. 3, No. 21, Nov. 1, 1994.
Interactions, vol. 3, No. 23, Dec. 1, 1994.
Interactions, vol. 3, No. 8, Apr. 15, 1994.
Interactions, vol. 4, Issue 14, Jul. 15, 1995.
Interactions, vol. 4, Issue 16, Aug. 15, 1995.
Interactions, vol. 4, Issue 19, Oct. 1, 1995.
Interactions, vol. 4, Issue 21, Nov. 1, 1995.
Interactions, vol. 4, Issue 24, Dec. 15, 1995.
Interactions, vol. 4, No. 3, Feb. 1, 1995.
Interactions, vol. 4, No. 6, Mar. 15, 1995.
Interactions, vol. 4, No. 9, May 1, 1995.
Interactions, vol. 5, Issue 1, Jan. 1, 1996.
Interactions, vol. 5, Issue 13, Oct. 1, 1996.
Interactions, vol. 5, Issue 14, Nov. 1, 1996.
Interactions, vol. 5, Issue 2, Jan. 15, 1996.
Interactions, vol. 5, Issue 4, Feb. 15, 1996.
Interactions, vol. 6, Issue 12, Dec. 1997.
Interactions, vol. 6, Issue 8, Aug. 1997.
Interactions, vol. 7, Issue 1, Jan. 1998.
Interactions, vol. 7, Issue 12, Dec. 1998.
Interactions, vol. 7, Issue 5, May 1998.
Interactions, vol. 7, Issue 7, Jul. 1998.
Interactions, vol. 7, Issue 8, Aug. 1998.
Interactions, vol. 8, Issue 7, Jul. 1999.
Interactions, vol. 8, Issue 8, Aug. 1999.
Interactions, vol. 8, Issue 9, Sep. 1999.
Interactions, vol. 9, Issue 2, Feb. 2000.
Interactions, vol. 9, Issue 3, Mar. 2000.
Interactions, vol. 9, Issue 5, May 2000.
International Search Report for PCT/US2007/025327 dated May 21, 2008.
Internet Networking Architecture, 1999.
Interoffice Memorandum re ARMS Outline, Oct. 7, 1999, pp. 1-2.
Introducing ARMS Claims, Jun. 2000, pp. 1-6.
IS General Use Programs—Section 15, AACB40, Overview, pp. 1-16, Jun. 22, 2000.
IS General Use Programs—Section 19, AACB34 Callback Fax Customization, Mar. 5, 1998.
Jacada Implementation Methodology, pp. 1-10, May 12, 1999.
Jacada, Chicago Executive Briefing, Nov. 4, 1999, pp. 1-13.
"Additional Internet Efforts Will Propel Every Segment of Our Business", Free Enterprise, Summer 1999, p. 13.
"All Open Orders for Customer No. 218556"; Motorola Corporation; Nov. 23, 1999.
"Information on Hertz Corporation"; Sep. 24, 2002; pp. 1-61.
"Rental Management for Vehicle Replacement Rentals", National Electronic Data Interchange Transaction Set Implementation Guide, 272/824, Jul. 2000.
"Rental Management Invoicing and Application Advice for Vehicle Replacement Rentals", National Electronic Data Interchange Transaction Set Implementation Guide, 811/824, Jul. 2000.
"Rental Management Remittance Advice for Vehicle Replacement Rentals", National Electronic Data Interchange Transaction Set Implementation Guide, 820, Jul. 2000.
"Welcome to the Hertz Interactive Reservation Process"; Mar. 3, 2000; pp. 62-27.
10K Report; Agency Rent-A-Car Inc.; Report No. 0127651; Section Heading: Part I, Item 1. Business; Jan. 31, 1994; p. 4 of 54.
1997 Rental Systems Manual, 1997.
A Call to ARMS, 1996.
AACB35 Fax Display, pp. 1-5.
AACM07, Customer Add/Update, Revised Documentation, pp. 1-12, Sep. 17, 2001.
AAGP12, Group/Branch Name and Address Add/Update, pp. 1 through 2-8, Nov. 19, 1999.
AAPW01 Update Code Maintenance, Jul. 1, 1999, pp. 1-25.
ABC Insurance Company/EngineRoar, pp. 1-2.
ARMS 400 Demonstration, p. 1-67.
ARMS Claims Internet Quick Reference Guide, Oct. 1999.
ARMS Electronic Callback System Demonstration, pp. 1-22, 1998.
ARMS Overview, pp. 1-10.
ARMS Technology, Jul. 2000.
ARMS/400—Automated Rental Management System, pp. 1-8, 1995.
ARMS/400—ERAC Employee Reference, pp. 1-10.
ARMS/400 Automated Rental Management System, Copyright 1998.
ARMS/400 Automated Rental Management System, Copyright 1999.
ARMS/400 Automated Rental Management System, Version 3, Feb. 1997.
ARMS/400 Main Menu Flow, pp. 1-20.
ARMS/400 Manual.
ARMS/400 Training System Document, Nov. 16, 1998.
ARMS/400 Update, Mar. 15, 2000, pp. 1-4.
ARMS/400 Update, p. 1-7, Jan. 7, 2000.
ARMS/400 Update, pp. 1-6.
ARMS/400 User Manual, 1999.
ARMS/400 User Training, Jul. 2000, pp. 1-26.
ARMS/ECARS Handbook for ARMS/Claims Developers, pp. 1-19.
ARMS/Web User Training, pp. 1-38, Jul. 18, 2000.
ARMS/Web Using Jacada, Oct. 13, 1999, pp. 1-13.
Automated Rentals, Unwrapped, pp. 1-7, Oct. 1995.
Bluebird Auto Rental Systems, "Are You Buried Under an Evergrowing Mountain of Paper?".
Bluebird Auto Rental Systems, Business Description & Products.
Business Wire; "Cendent's Real Estate Subsidiaries Create On-Line Cross-Marketing Alliance with Rent Net; Coldwell Banker, Century 21 and ERA Join Forces with Sister Company, Rent Net"; May 7, 1998; pp. 1-3.
Car Rental Insider, May 1997, pp. 1-4.
CarTemps Rent-A-Car; "CarTemps DIRECT" information; publication date unknown.
CarTemps Rent-A-Car; "CarTemps MPOWERENT Management System"; Instruction Manual; Copyright 2000; v1.1; publication date unknown.
CIO Magazine 2002 Enterprise Value Awards Application, pp. 4-10, 2002.
CLIP, "Servlets: CGI the Java Way", Byte, May 1, 1998, pp. 55-56, vol. 23, No. 5, McGraw-Hill, Inc., St. Peterborough, US.
Close Pending Ticket Report (All Tickets pended for 5 days or more), Job #579, DR0018, Apr. 3, 1996, pp. 1-2.
Copyright Chronicle Publishing Company, May 2, 1997, "Booking a room, vehicle for vacation via the 'Net", Pantagraph, C.1.
CST , May 6, 1999, pp. 1-18.
Customer Account Services, AACB45.
D.P. General Use Programs, AACB10 Consolidated Callback Maintenance, Apr. 1994, pp. 1-4.
Notice of Allowance for U.S. Appl. No. 11/747,645 dated Dec. 28, 2011.
Notice of Allowance for U.S. Appl. No. 12/179,071 dated Dec. 30, 2011.
Saha, "Application Framework for e-business: Portals", Internet Citation, Nov. 1999, XP002276158, Retrieved from the Internet: URL:ftp://www6.softwarejbm.com/software/developer/library/portals.pdf, Retrieved on Apr. 5, 2004.
Schlosser, "IBM Application Framework for e-business: Security", Internet Citation, Nov. 1999, XP002257288, Retrieved from the Internet: URL:ftp://www6.software.ibm.com/software/developer/library/security.pdf, Retrieved on Sep. 12, 1999.
Summons to Attend Oral Proceedings for EP Application 01273072.7 dated Jan. 30, 2012.
Kenyon, Stephanie, "20 Tips for an Effective Web Site", ASTA Agency Management, Jan. 1999.

King, Jeff and Estes, Steve, Enterprise Rent-A-Car ARMS Web-enabled Management Reporting System Initial Project Analysis & Options, Jul. 23, 1999, pp. 1-7.
Kiplinger's Money Power; "Booking a room, vehicle for vacation via the 'Net"; Copyright May 2, 1997; Chronicle Publishing Company; Downloaded from the Internet on Apr. 7, 2002.
Lone Star Rental Systems, EZ Traker™, Your Complete Auto Rental Management Solution.
Lorentz, Jeff, Functional Specification, Internet Application Development, ARMS Automotive, pp. 1-3.
Marino, Donna, "Internet Experts Urge Development of E-Commerce Models", ASTA Agency Management, Jan. 1999, pp. 32-34.
McKeown, Rosemary, The Right Computer System Adds to Your Revenue, Computer Systems, pp. 1-4.
Memorandum re Sabre Meeting, Rob Hibbard to Scott Shuler, Sep. 21, 1998.
Milligan, Michael, "OTA targets mid-January to release e-commerce protocol", Travel Weekly, Jan. 10, 2000.
Nelson, "Quicken 99 for Windows for Dummies", IDG Books Worldwide, Inc., 1998, pp. 114, 122-124.
Net rentacar.com User Guide, pp. 1-19.
Office Action for CA Application No. 2416840 dated Jan. 7, 2005.
Office Action for CA Application No. 2416840 dated Mar. 5, 2010.
Office Action for EP Application No. 01273072.7 dated Apr. 11, 2004.
Open Travel Alliance, "ebXML Uses Opentravel Alliance Specification for Early Tests", May 10, 2000.
Open Travel Alliance, "Open Travel Alliance Joins Forces with DISA", Sep. 9, 1999.
Open Travel Alliance, "Open Travel Alliance Names Board Officers", Sep. 2, 1999.
Open Travel Alliance, "OpenTravel Alliance's New XML Specification Creates a Common Customer Profile for Travelers", Feb. 29, 2000.
Open Travel Alliance, "White Paper", pp. 1-20, Feb. 2000.
Orion Systems, Ltd., pp. 1-36.
Orion Systems, Ltd., System Overview and Handheld Terminals, downloaded from www.orsys.com on Dec. 1, 1997, pp. 1-5.
Orion Systems, Ltd., System Overview with Screens and Reports, May 1996.
Our Packages Come in All Sizes!, Nov. 1999, pp. 1-2.
PC/ARMS Demonstration, pp. 1-45, 1995.
PGMR, ECARS—Enterprise Computer Assisted Rental System, pp. 1-4.
Planning and Managing a Project, Version 5.3, CST Catalog UG-184-1198, 1st Ed., Nov. 1998, pp. 1-90.
Preview Travel, Inc., Car Reservations, 1999.
Reeves, "Travel Web Site Expedia's Shares Take Off During Initial Offering", Denver Post, Nov. 11, 1999, p. C-02, entire document.
Rental 101, pp. 1-30.
Rental Redesign Requirements—Contract Process, pp. 1-5, Feb. 16, 2000.
Rental Redesign Requirements Contract, pp. 1-56, Feb. 15, 2000.
Rental Redesign, Rental Management, RMS (Rental Management Services), Sep. 30, 1998, pp. 1-2.
Response to Office Action for CA Application No. 2416840 dated Jul. 7, 2005.
Response to Office Action for EP Application No. 01273072.7 dated Aug. 30, 2005.
Rosen, Cheryl, "OTA Debuts Data Protocol", Business Travel News, Jan. 10, 2000.
Rosen, Cheryl, "OTA Publishes XML Data Standard", Business Travel News, pp. 1-2, Mar. 20, 2000.
St. Louis Business Journal; "E-commerce Department Director Answers Questions about TWA.com"; Aug. 28, 2000; St. Louis, Missouri.
The ARMS Connection, Safeco/Enterprise Rent-A-Car, pp. 1-4.
The Connection, State Farm Insurance/Enterprise Rent-A-Car, Rental Process Automation and Procedures, pp. 1-3.
The Hertz Corporation, 1998.
The Jacada User Guide: Jacada for Java, Version 6.0, CST Catalog UG-213-0799, 1st Ed., Jul. 1999.
TSD Brochure, "Are You Comparing Apples to Apples When Choosing Rental Software", p. 1-3.
TSD Brochure, Rent 2000 from TSD, Rental Management Software, Revolutionize the Way You Do Business with the Proven Solution, p. 1-2.
TSD Brochure, Rent 2000 from TSD, Rental Management Software, Revolutionize the Way You Do Business, p. 1-29.
Warner, Fara, "Car Race in Cyberspace".
Weinstock, Tim, ARMS/Web is Coming, pp. 1-2, Aug. 13, 1999.
Welcome to ARMS/400, New York State Rollout and Implementation Session, Oct. 28, 1999, pp. 1-51.
Welcome to the Data Warehouse, Jun. 2000, pp. 1-2.
Yenckel, "For This Cyberspace Visitor, Once Is More Than Enough", Feb. 11, 1996, p. E.01, The Washington Post (Pre-1997 Fulltext), ISSN 01908286.
U.S. Appl. No. 60/194,128, filed Apr. 3, 2000 (Aquila).
Response to Office Action for U.S. Appl. No. 11/823,782 dated Feb. 17, 2011.
Response to Office Action for U.S. Appl. No. 11/881,216 dated Sep. 28, 2011.
Response to Office Action for U.S. Appl. No. 11/881,383 dated Sep. 6, 2011.
Response to Office Action for U.S. Appl. No. 11/929,277 dated Aug. 18, 2011.
Response to Office Action for U.S. Appl. No. 11/929,350 dated Aug. 30, 2011.
Notice of Allowance for U.S. Appl. No. 13/025,546 dated Jun. 25, 2012.
D.P. General Use Programs, AACM12, ECARS—Special Instructions/Rates/Rate Rules, Jun. 1993, pp. 1-5.
Darrah, "Hi-Tech Streamlines Car Rental Process", Feb. 1999, p. 29, vol. 66, Issue 2.
Data Warehouse & Analyzer Quick Sheet, Jun. 2000, pp. 1-2.
Declaration of Timothy Weinstock, including Exhibits A-D, filed Jan. 12, 2006 in U.S. Appl. No. 09/641,820.
Declaration of William G. Tingle, including Exhibits A-F, filed Jan. 12, 2006 in U.S. Appl. No. 09/641,820.
Dollar Rent a Car Systems, Inc., pp. 1-5, 1998.
ECARS—Enterprise Computer Assisted Rental System, AACJO1 Callbacks, pp. 1-9, Jul. 1, 1997.
ECARS 2000 Customer Profile, Chapters 1-16.
ECARS Backdated Ticket Report, Job #043/DR0099, Mar. 1996, pp. 1-2.
Edlund, Al, "How Thin Clients Lead to Fat Networks", Business Communications Review, Jul. 1998, pp. 28-31.
eINFO, Data Warehouse, Oct. 1999.
Email exchange between Ken Keller and David Smith, Jun. 4, 1997.
Email from Angela Babin, Jun. 22, 1999, single page.
EngineRoar.com, pp. 3-76.
Enterprise Computer Assisted Rental System Workbook, Dec. 1996.
Enterprise Computer Assisted Rental System Workbook, Sep. 1997.
Enterprise Network and Physical Connections Overview, 1995, pp. 1-5.
Enterprise Rent-A-Car ARMS—Vehicle Messaging System, Project Charter, Oct. 15, 1998, pp. 1-7.
Enterprise Rent-A-Car Company ARMS—Vehicle Messaging System Overview, May 16, 2001, p. 1-35.
Enterprise Rent-A-Car Company ARMS—Vehicle Messaging System Phase II Project Charter, Aug. 20, 1999, p. 1-6.
Enterprise Rent-A-Car Company, AACM27/AACM28, Overview, pp. 1-8, Nov. 22, 1999.
Enterprise Rent-A-Car Company, ARMS Basics and Concepts, vol. 1, Chapter 1-4, Feb. 24, 1998.
Enterprise Rent-A-Car Company, ARMS Basics and Concepts, vol. 1, Chapters 1-4, Jun. 10, 1998.
Enterprise Rent-A-Car Company, ARMS Technical Document (ATD Internal), pp. 1-40, Aug. 2, 1993.
Enterprise Rent-A-Car Company, ARMS, Automated Rental Management System, pp. 1-36.
Enterprise Rent-A-Car Company, Automated Rental Management System (ARMS), Version 1, Apr. 12, 1993.
Enterprise Rent-A-Car Company, Automated Rental Management System (ARMS), Version 1.1, Jan. 5, 1994.

Enterprise Rent-A-Car Company, ECARS Workbook, Dec. 1996.
Enterprise Rent-A-Car Company, Functional Specification, pp. 1-2, Nov. 1999.
Enterprise Rent-A-Car Customer Profile Data Form, pp. 1-14.
Enterprise Rent-A-Car Rental Application Development and Support Project Request, Jul. 12, 1999, pp. 1-3.
Enterprise Rent-A-Car Rental Application Development and Support Project Request, Jul. 6, 1999, pp. 1-2.
Enterprise Rent-A-Car, ARMS Online Reporting, Project Charter, Version 1.0, Aug. 20, 1999, pp. 1-7.
Everything You Need to Know About Arms Automotive, 2000, pp. 1-8.
Future State Summary, Jun. 1999, pp. 1-8.
GUI ARMS/400 Development Project Approach.
GUI ARMS/400 Development, pp. 1-2, 1999.
http://www.eautoclaims.com, pp. 1-11, Apr. 8, 2000.
http://www.hertz.com/InteractionRes/htm/isexckge.htm, pp. 1-2, Mar. 20, 1997.
Interactions, "Electronic Connections", p. 3, Mar. 15, 1995.
Interactions, ARMS Update, vol. 6, Issue 2, Feb. 1997.
Interactions, ARMS, vol. 3, No. 6, Mar. 15, 1994.
Interactions, Published especially for our Farmers adjusters, 1994.
Interactions, Special Edition, Nov. 1992.
Interactions, Special Edition, vol. 1, No. 4, Aug. 1992.
Interactions, vol. 1, No. 3, Jul. 1992.
Interactions, vol. 1, No. 5, Sep. 1992.
Interactions, vol. 1, No. 8, Dec. 1992.
Interactions, vol. 2, No. 1, Jan. 1993.
Interactions, vol. 2, No. 11, Oct. 1, 1993.

* cited by examiner

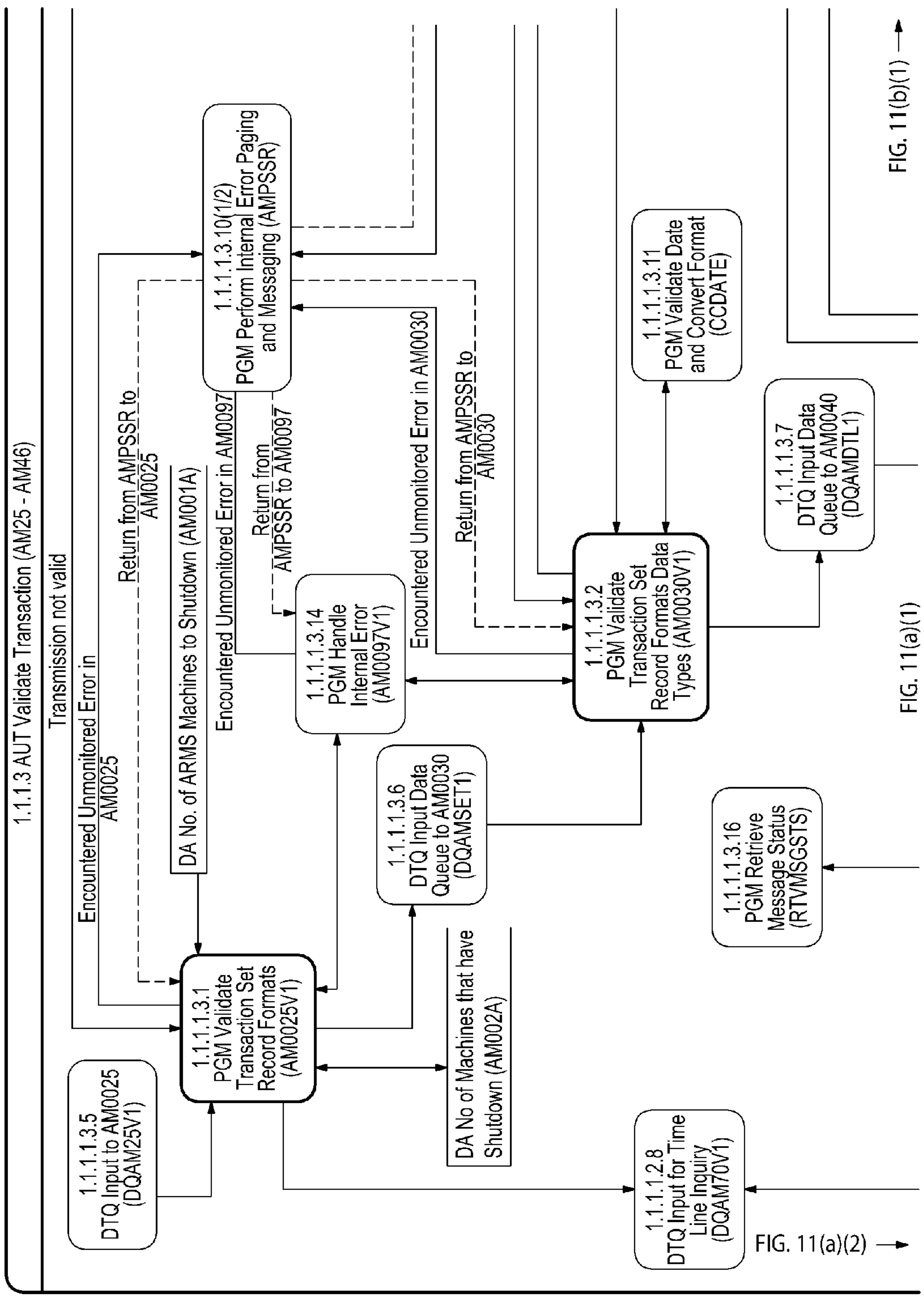
FIG. 11(a)(1)

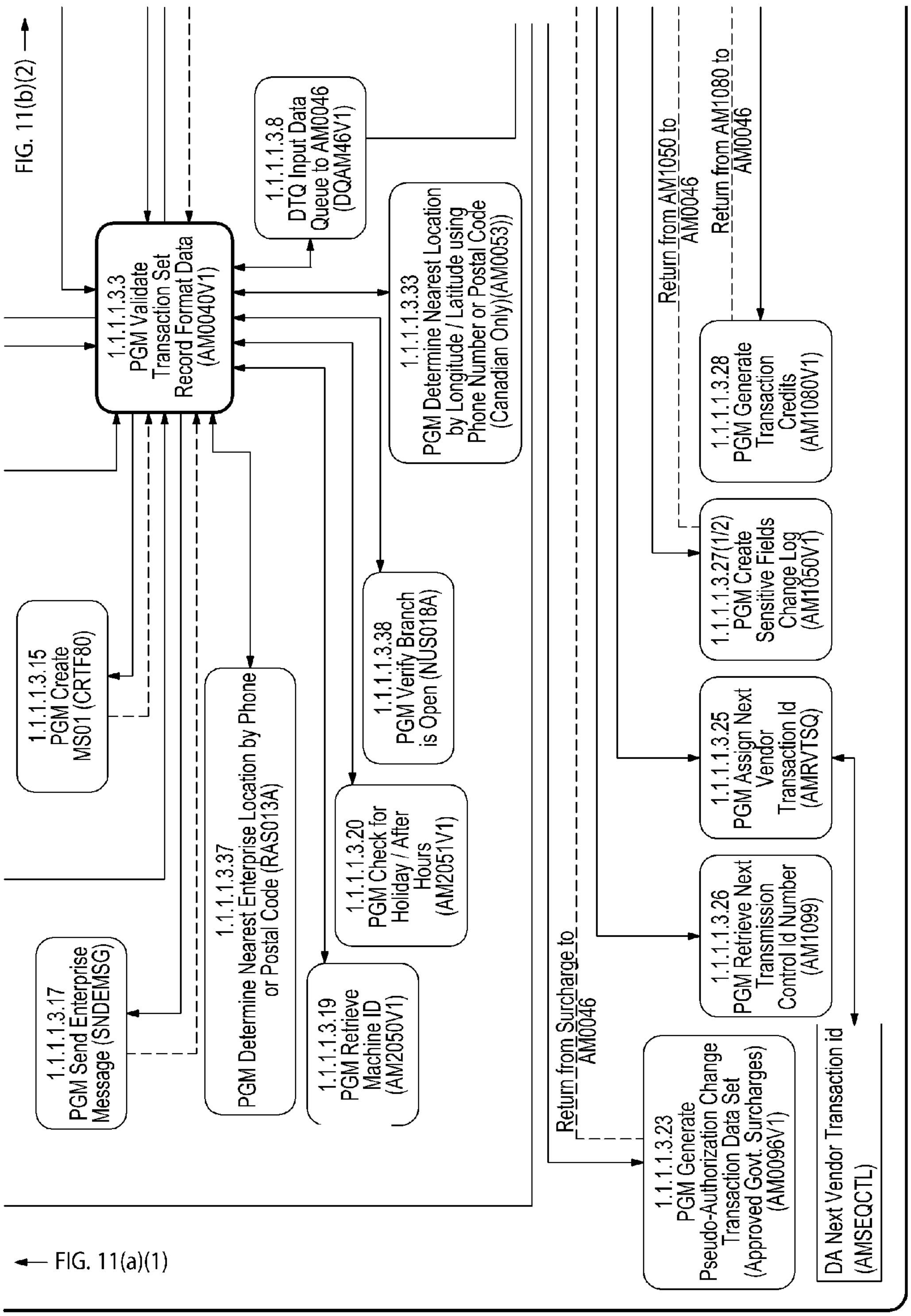
FIG. 11(a)(2)

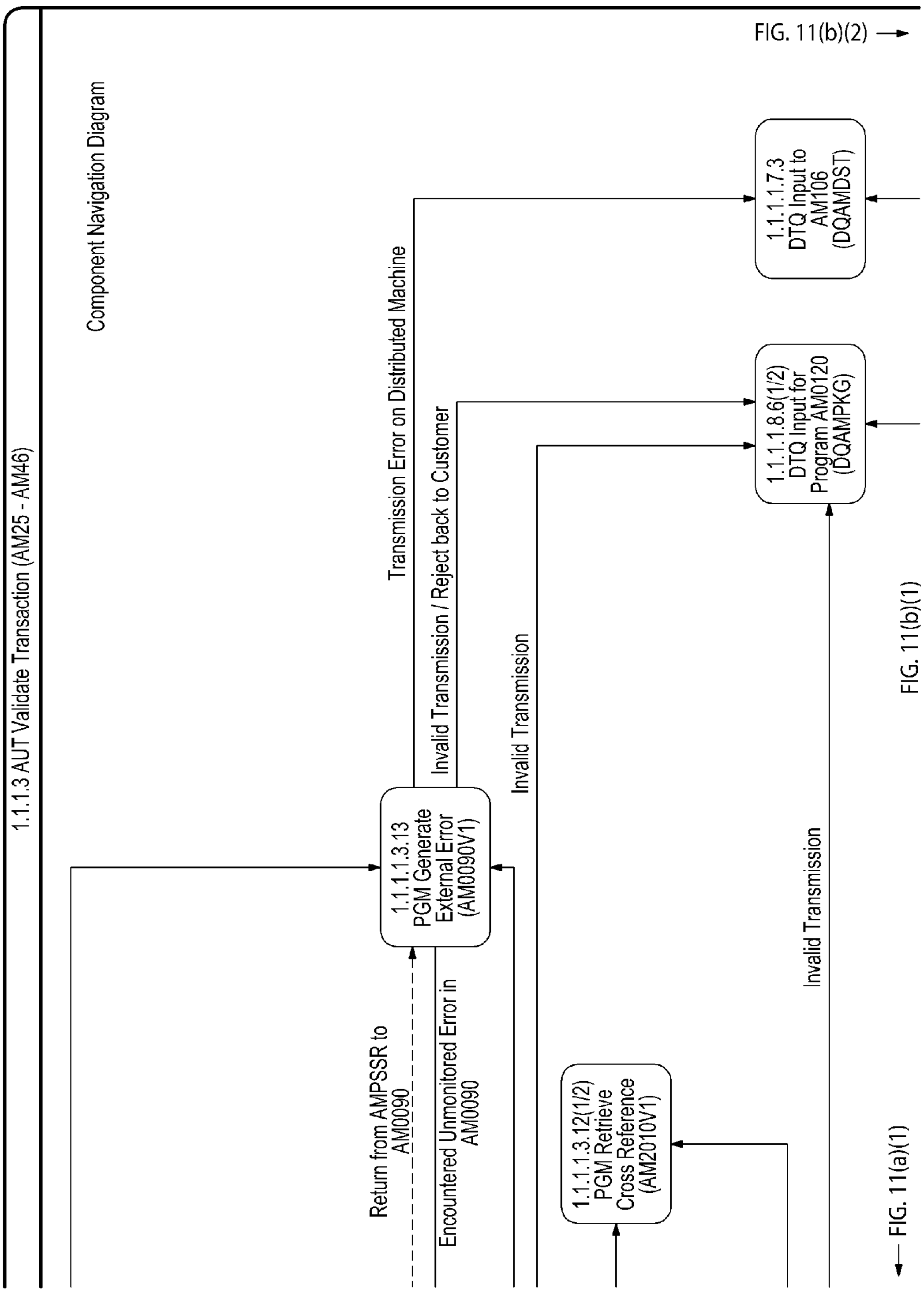
1.1.1.3 AUT Validate Transaction (AM25 - AM46)
Component Navigation Diagram
FIG. 11(b)(2)
1.1.1.1.7.3 DTQ Input to AM106 (DQAMDST)
1.1.1.1.8.6(1/2) DTQ Input for Program AM0120 (DQAMPKG)
Transmission Error on Distributed Machine
Invalid Transmission / Reject back to Customer
Invalid Transmission
1.1.1.1.3.13 PGM Generate External Error (AM0090V1)
Return from AMPSSR to AM0090
Encountered Unmonitored Error in AM0090
1.1.1.1.3.12(1/2) PGM Retrieve Cross Reference (AM2010V1)
Invalid Transmission
FIG. 11(b)(1)
FIG. 11(a)(1)

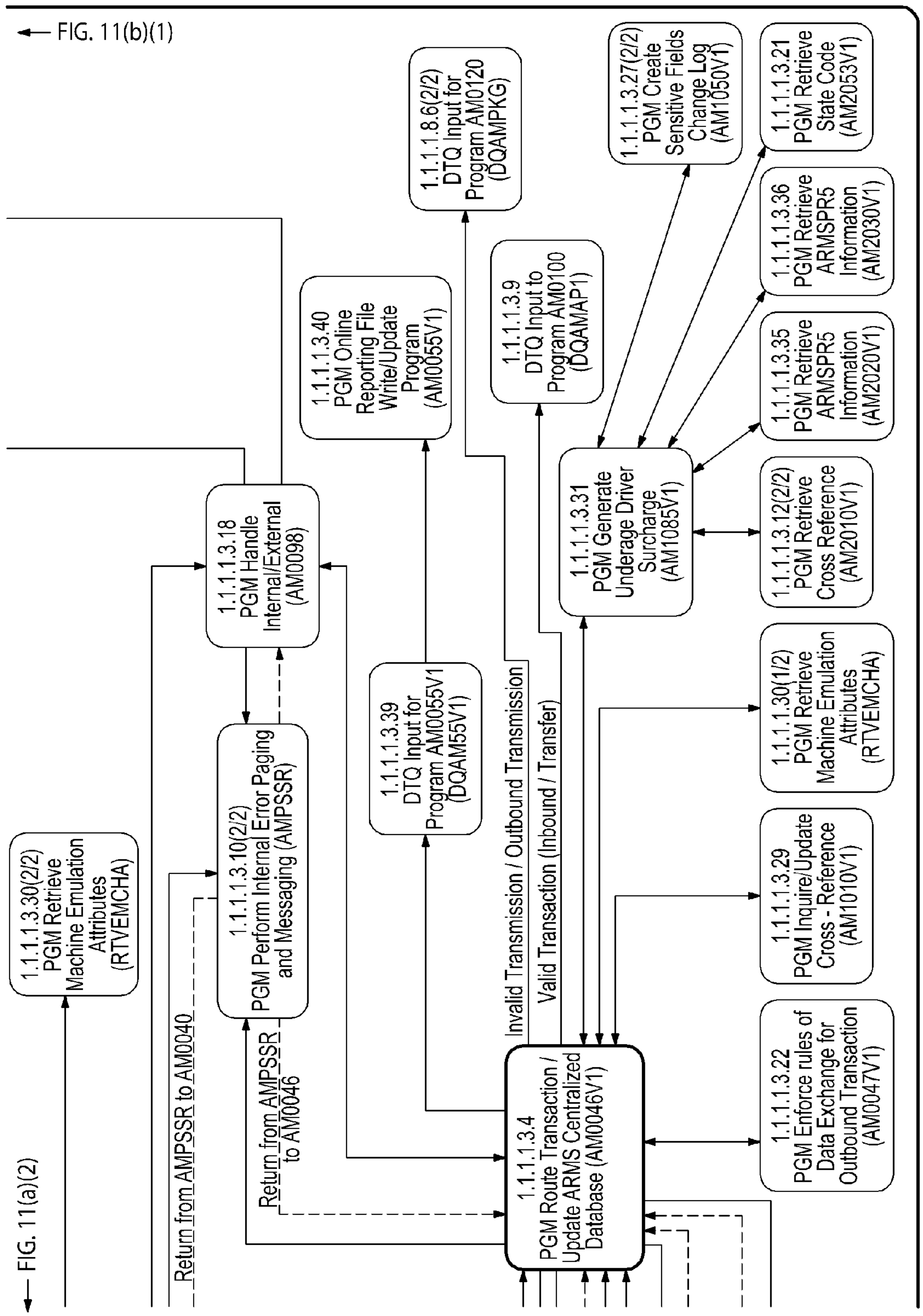
FIG. 11(b)(2)

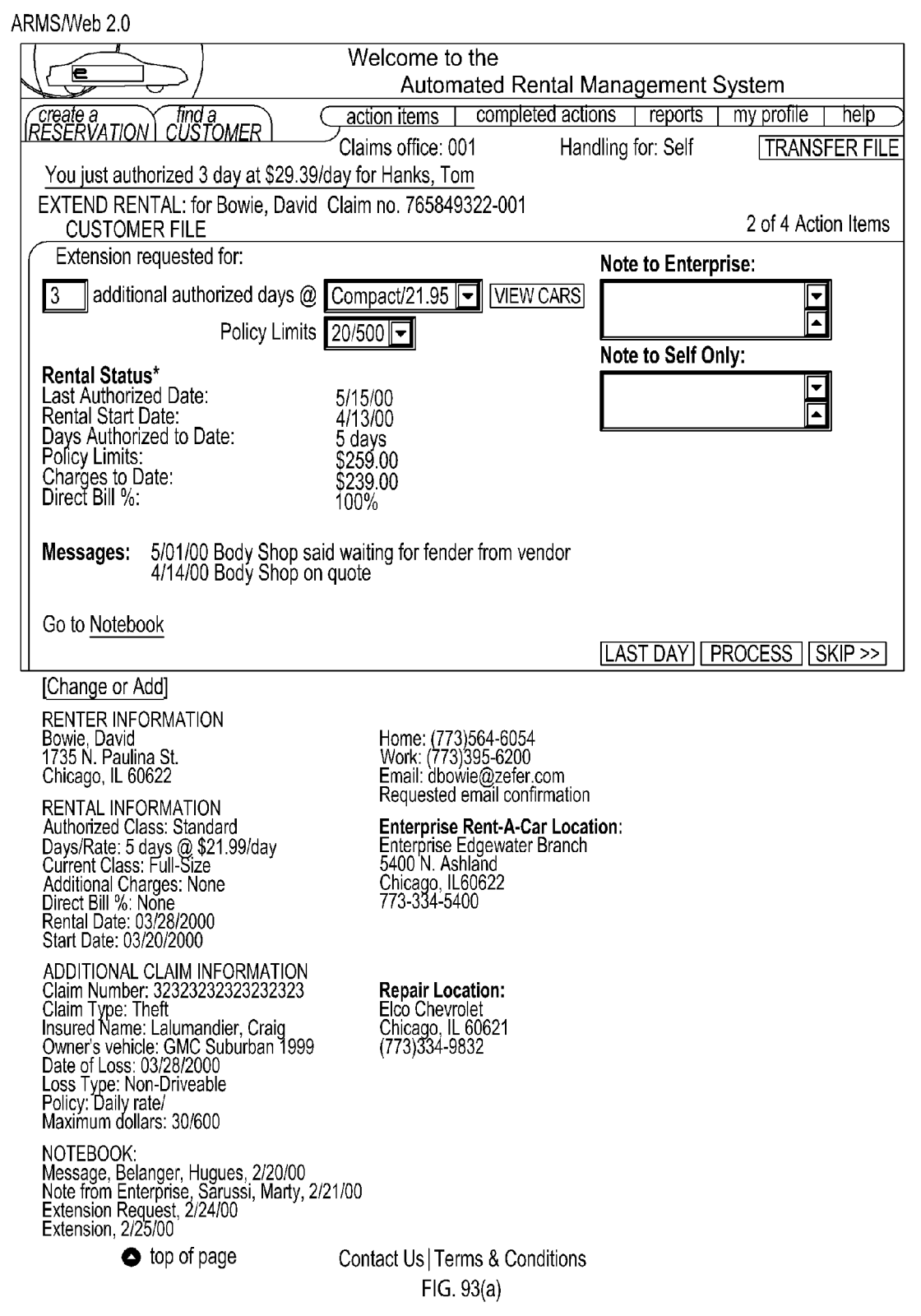

ARMS/Web 2.0

Welcome to the
Automated Rental Management System create a RESERVATION | find a CUSTOMER action items | completed actions | reports | my profile | help Claims office: 001 Handling for: Self [TRANSFER FILE]

You just authorized 3 day at $29.39/day for Hanks, Tom

EXTEND RENTAL: for Bowie, David Claim no. 765849322-001

CUSTOMER FILE 2 of 4 Action Items

Extension requested for:

[3] additional authorized days @ [Compact/21.95 ▾] [VIEW CARS]

Policy Limits [20/500 ▾]

Note to Enterprise:

Note to Self Only:

Rental Status*

| | |
|---|---|
| Last Authorized Date: | 5/15/00 |
| Rental Start Date: | 4/13/00 |
| Days Authorized to Date: | 5 days |
| Policy Limits: | $259.00 |
| Charges to Date: | $239.00 |
| Direct Bill %: | 100% |

Messages: 5/01/00 Body Shop said waiting for fender from vendor
4/14/00 Body Shop on quote Go to Notebook

[LAST DAY] [PROCESS] [SKIP >>]

[Change or Add]

RENTER INFORMATION
Bowie, David
1735 N. Paulina St.
Chicago, IL 60622

Home: (773)564-6054
Work: (773)395-6200
Email: dbowie@zefer.com
Requested email confirmation RENTAL INFORMATION
Authorized Class: Standard
Days/Rate: 5 days @ $21.99/day
Current Class: Full-Size
Additional Charges: None
Direct Bill %: None
Rental Date: 03/28/2000
Start Date: 03/20/2000

Enterprise Rent-A-Car Location:
Enterprise Edgewater Branch
5400 N. Ashland
Chicago, IL60622
773-334-5400

ADDITIONAL CLAIM INFORMATION
Claim Number: 32323232323232323
Claim Type: Theft
Insured Name: Lalumandier, Craig
Owner's vehicle: GMC Suburban 1999
Date of Loss: 03/28/2000
Loss Type: Non-Driveable
Policy: Daily rate/
Maximum dollars: 30/600

Repair Location:
Elco Chevrolet
Chicago, IL 60621
(773)334-9832

NOTEBOOK:
Message, Belanger, Hugues, 2/20/00
Note from Enterprise, Sarussi, Marty, 2/21/00
Extension Request, 2/24/00
Extension, 2/25/00 top of page

Contact Us | Terms & Conditions

FIG. 93(a)

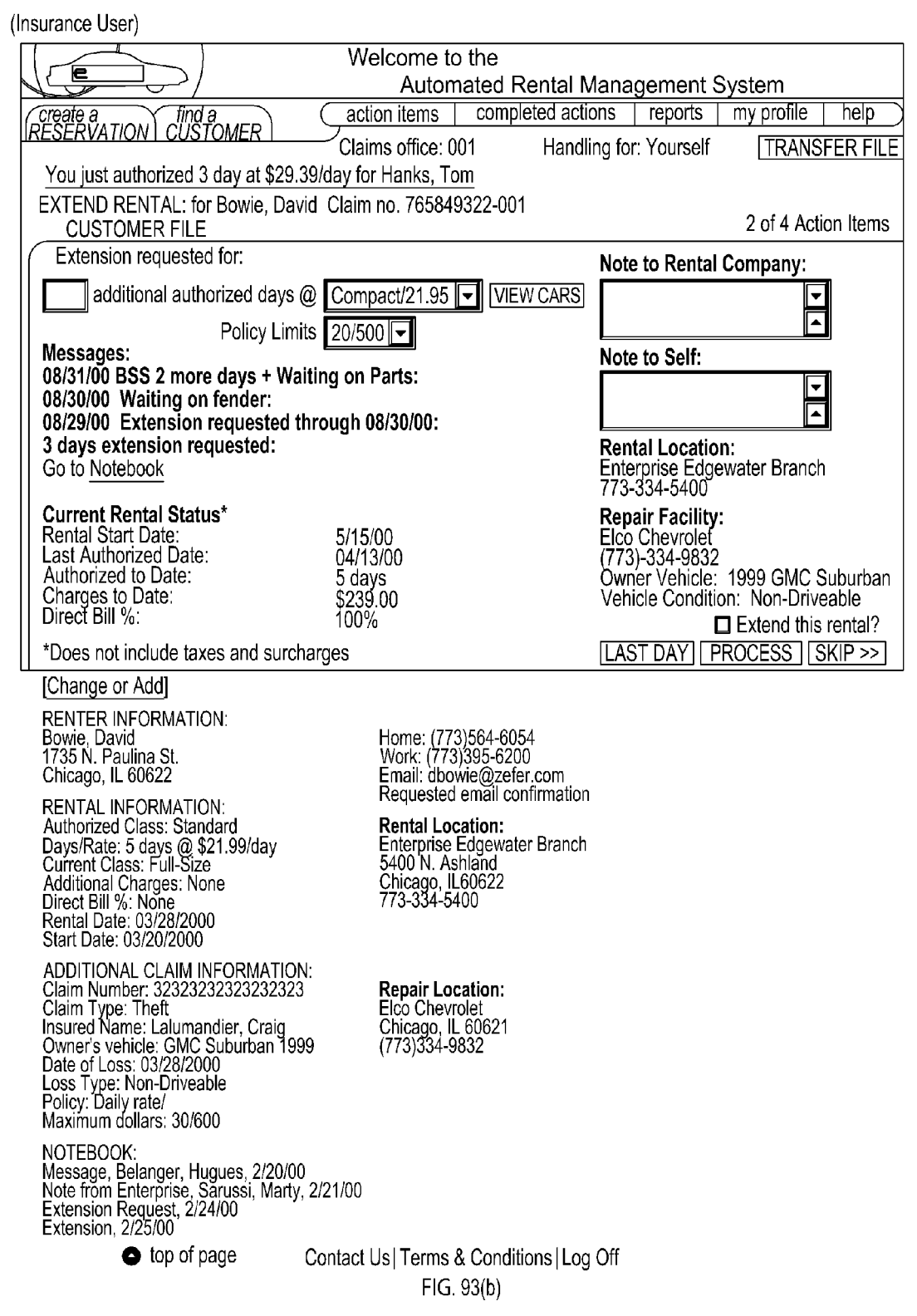

(Insurance User)

Welcome to the
Automated Rental Management System create a RESERVATION | find a CUSTOMER action items | completed actions | reports | my profile | help Claims office: 001 Handling for: Yourself [TRANSFER FILE]

You just authorized 3 day at $29.39/day for Hanks, Tom

EXTEND RENTAL: for Bowie, David Claim no. 765849322-001

CUSTOMER FILE 2 of 4 Action Items

Extension requested for:

[ ] additional authorized days @ [Compact/21.95 ▾] [VIEW CARS]

Policy Limits [20/500 ▾]

Messages:
08/31/00 BSS 2 more days + Waiting on Parts:
08/30/00 Waiting on fender:
08/29/00 Extension requested through 08/30/00:
3 days extension requested:
Go to Notebook

Current Rental Status*

| | |
|---|---|
| Rental Start Date: | 5/15/00 |
| Last Authorized Date: | 04/13/00 |
| Authorized to Date: | 5 days |
| Charges to Date: | $239.00 |
| Direct Bill %: | 100% |

*Does not include taxes and surcharges

Note to Rental Company:

Note to Self:

Rental Location:
Enterprise Edgewater Branch
773-334-5400

Repair Facility:
Elco Chevrolet
(773)-334-9832
Owner Vehicle: 1999 GMC Suburban
Vehicle Condition: Non-Driveable ☐ Extend this rental?

[LAST DAY] [PROCESS] [SKIP >>]

[Change or Add]

RENTER INFORMATION:
Bowie, David
1735 N. Paulina St.
Chicago, IL 60622

Home: (773)564-6054
Work: (773)395-6200
Email: dbowie@zefer.com
Requested email confirmation RENTAL INFORMATION:
Authorized Class: Standard
Days/Rate: 5 days @ $21.99/day
Current Class: Full-Size
Additional Charges: None
Direct Bill %: None
Rental Date: 03/28/2000
Start Date: 03/20/2000

Rental Location:
Enterprise Edgewater Branch
5400 N. Ashland
Chicago, IL60622
773-334-5400

ADDITIONAL CLAIM INFORMATION:
Claim Number: 32323232323232323
Claim Type: Theft
Insured Name: Lalumandier, Craig
Owner's vehicle: GMC Suburban 1999
Date of Loss: 03/28/2000
Loss Type: Non-Driveable
Policy: Daily rate/
Maximum dollars: 30/600

Repair Location:
Elco Chevrolet
Chicago, IL 60621
(773)334-9832

NOTEBOOK:
Message, Belanger, Hugues, 2/20/00
Note from Enterprise, Sarussi, Marty, 2/21/00
Extension Request, 2/24/00
Extension, 2/25/00

● top of page

Contact Us | Terms & Conditions | Log Off

FIG. 93(b)

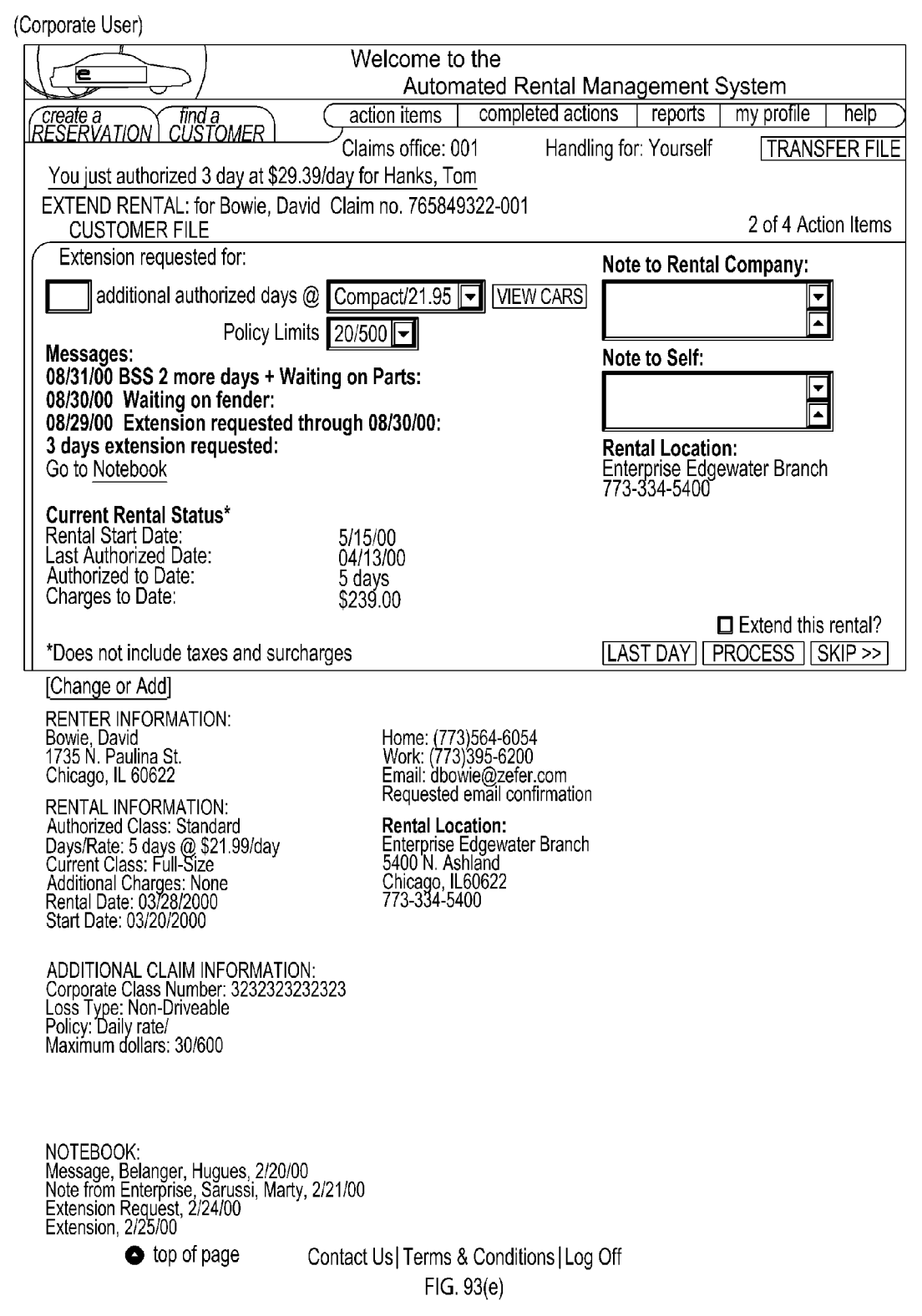

(Corporate User)

Welcome to the
Automated Rental Management System create a RESERVATION | find a CUSTOMER action items | completed actions | reports | my profile | help Claims office: 001 Handling for: Yourself [TRANSFER FILE]

You just authorized 3 day at $29.39/day for Hanks, Tom

EXTEND RENTAL: for Bowie, David Claim no. 765849322-001
CUSTOMER FILE 2 of 4 Action Items Extension requested for:

[ ] additional authorized days @ [Compact/21.95 ▾] [VIEW CARS]

Policy Limits [20/500 ▾]

Messages:
08/31/00 BSS 2 more days + Waiting on Parts:
08/30/00 Waiting on fender:
08/29/00 Extension requested through 08/30/00:
3 days extension requested:
Go to Notebook

Note to Rental Company:

Note to Self:

Rental Location:
Enterprise Edgewater Branch
773-334-5400

Current Rental Status*

| | |
|---|---|
| Rental Start Date: | 5/15/00 |
| Last Authorized Date: | 04/13/00 |
| Authorized to Date: | 5 days |
| Charges to Date: | $239.00 |

☐ Extend this rental?

*Does not include taxes and surcharges

[LAST DAY] [PROCESS] [SKIP >>]

[Change or Add]

RENTER INFORMATION:
Bowie, David
1735 N. Paulina St.
Chicago, IL 60622

Home: (773)564-6054
Work: (773)395-6200
Email: dbowie@zefer.com
Requested email confirmation RENTAL INFORMATION:
Authorized Class: Standard
Days/Rate: 5 days @ $21.99/day
Current Class: Full-Size
Additional Charges: None
Rental Date: 03/28/2000
Start Date: 03/20/2000

Rental Location:
Enterprise Edgewater Branch
5400 N. Ashland
Chicago, IL60622
773-334-5400

ADDITIONAL CLAIM INFORMATION:
Corporate Class Number: 3232323232323
Loss Type: Non-Driveable
Policy: Daily rate/
Maximum dollars: 30/600

NOTEBOOK:
Message, Belanger, Hugues, 2/20/00
Note from Enterprise, Sarussi, Marty, 2/21/00
Extension Request, 2/24/00
Extension, 2/25/00

● top of page Contact Us | Terms & Conditions | Log Off

FIG. 93(e)

Review List Action Items (Insurance User)

Contact Us | Terms & Conditions | Log Off (Fleet User)

Action Items: Welcome back, Fitzgerald, Neil.

Below please find the action items that require your attention.

To sort the Action Items, click the column title of your chosen sorting method (ex: to sort by date, click "DATE RECEIVED")

| TYPE | DATE RECEIVED | RENTERS NAME | CLAIM NUMBER | RENTAL COMPANY | ADJUSTER |
|---|---|---|---|---|---|
| Direct Bill Request | 04-23-00 | Hanks, Tom | 234589871 | Enterprise Rent-A-Car | Fitzgerald, Neil |
| Extension | 05-01-00 | Bowie, David | 234587871 | HLE Rent-A-Car | Fitzgerald, Neil |
| Message | 05-01-00 | Simpson, Homer | 754589877 | Enterprise Rent-A-Car | Fitzgerald, Neil |
| Invoice | 05-01-00 | Weber, Andrew | 754589877 | Enterprise Rent-A-Car | Fitzgerald, Neil |
| Returned Invoice | 05-01-00 | Crystal, Billy | 235469071 | Rent-A-Wreck | Fitzgerald, Neil |
| Payment List | 06-15-00 | (5) Invoices | | Car Temps | Fitzgerald, Neil |
| Unassigned Items | 06-15-00 | (7) Action Items | | Enterprise Rent-A-Car | Unassigned |

Over 24 hours old

New information has come in

Contact Us | Terms & Conditions | Log Off

FIG. 95(c)

(Corporate User)

Contact Us | Terms & Conditions | Log Off (Insurance Fleet)

(Dealership User)

View Car Class Activity Diagram (ARMS/Web 3.0)

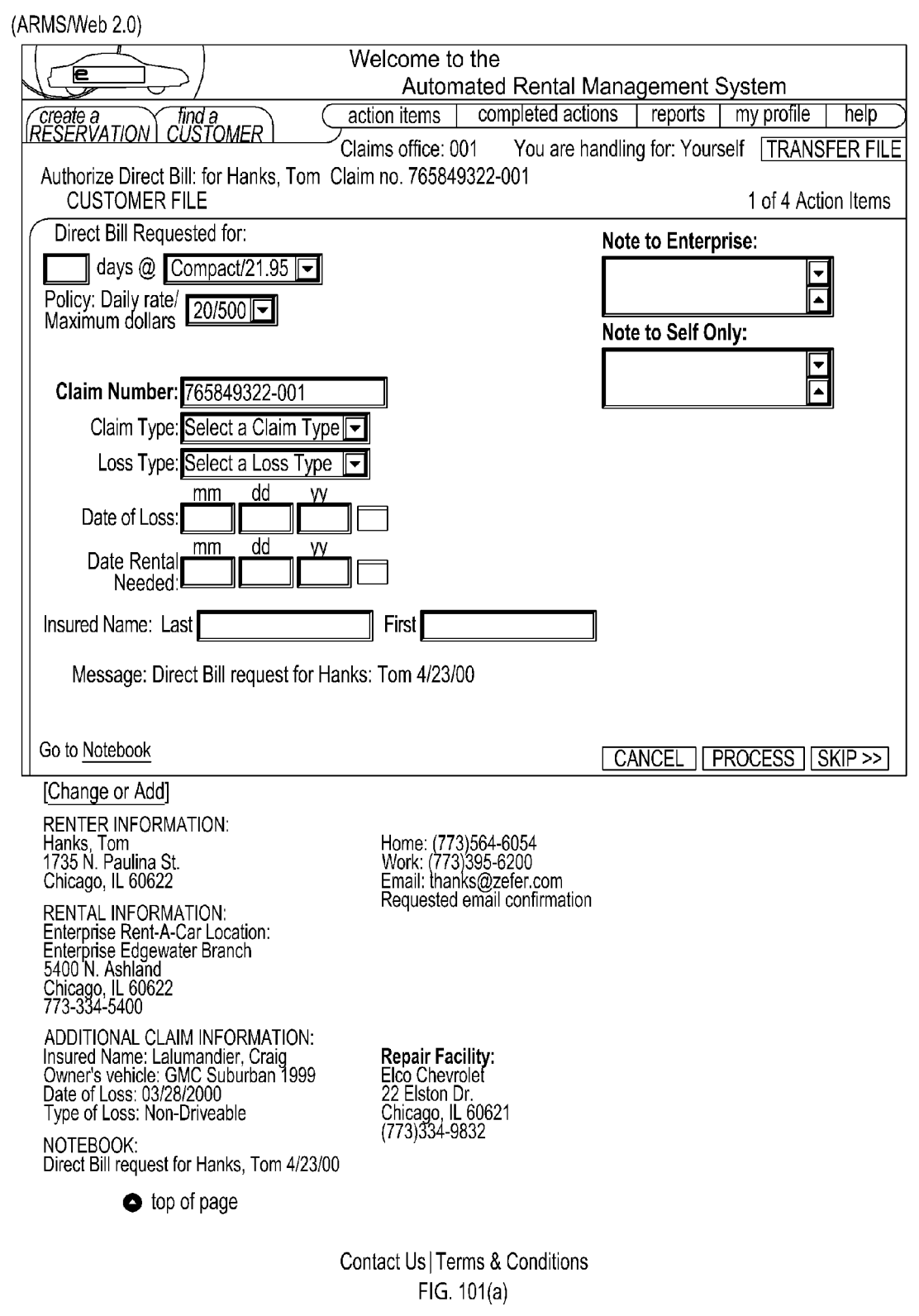

(ARMS/Web 2.0)

Welcome to the
Automated Rental Management System create a RESERVATION | find a CUSTOMER action items | completed actions | reports | my profile | help Claims office: 001 You are handling for: Yourself [TRANSFER FILE]

Authorize Direct Bill: for Hanks, Tom Claim no. 765849322-001
CUSTOMER FILE 1 of 4 Action Items Direct Bill Requested for:

[ ] days @ [Compact/21.95 ▼]

Policy: Daily rate/ Maximum dollars [20/500 ▼]

Note to Enterprise:

Note to Self Only:

Claim Number: [765849322-001]

Claim Type: [Select a Claim Type ▼]

Loss Type: [Select a Loss Type ▼]

Date of Loss: mm dd yy

Date Rental Needed: mm dd yy

Insured Name: Last [ ] First [ ]

Message: Direct Bill request for Hanks: Tom 4/23/00

Go to Notebook

[CANCEL] [PROCESS] [SKIP >>]

[Change or Add]

RENTER INFORMATION:
Hanks, Tom
1735 N. Paulina St.
Chicago, IL 60622

Home: (773)564-6054
Work: (773)395-6200
Email: thanks@zefer.com
Requested email confirmation RENTAL INFORMATION:
Enterprise Rent-A-Car Location:
Enterprise Edgewater Branch
5400 N. Ashland
Chicago, IL 60622
773-334-5400

ADDITIONAL CLAIM INFORMATION:
Insured Name: Lalumandier, Craig
Owner's vehicle: GMC Suburban 1999
Date of Loss: 03/28/2000
Type of Loss: Non-Driveable

Repair Facility:
Elco Chevrolet
22 Elston Dr.
Chicago, IL 60621
(773)334-9832

NOTEBOOK:
Direct Bill request for Hanks, Tom 4/23/00 top of page

Contact Us | Terms & Conditions

FIG. 101(a)

Create Reservation Activity Diagram (Insurance User)

Contact Us | Terms & Conditions | Log Off (Fleet User)

(Dealership User)

Contact Us | Terms & Conditions | Log Off (ARMS Web 2.0)

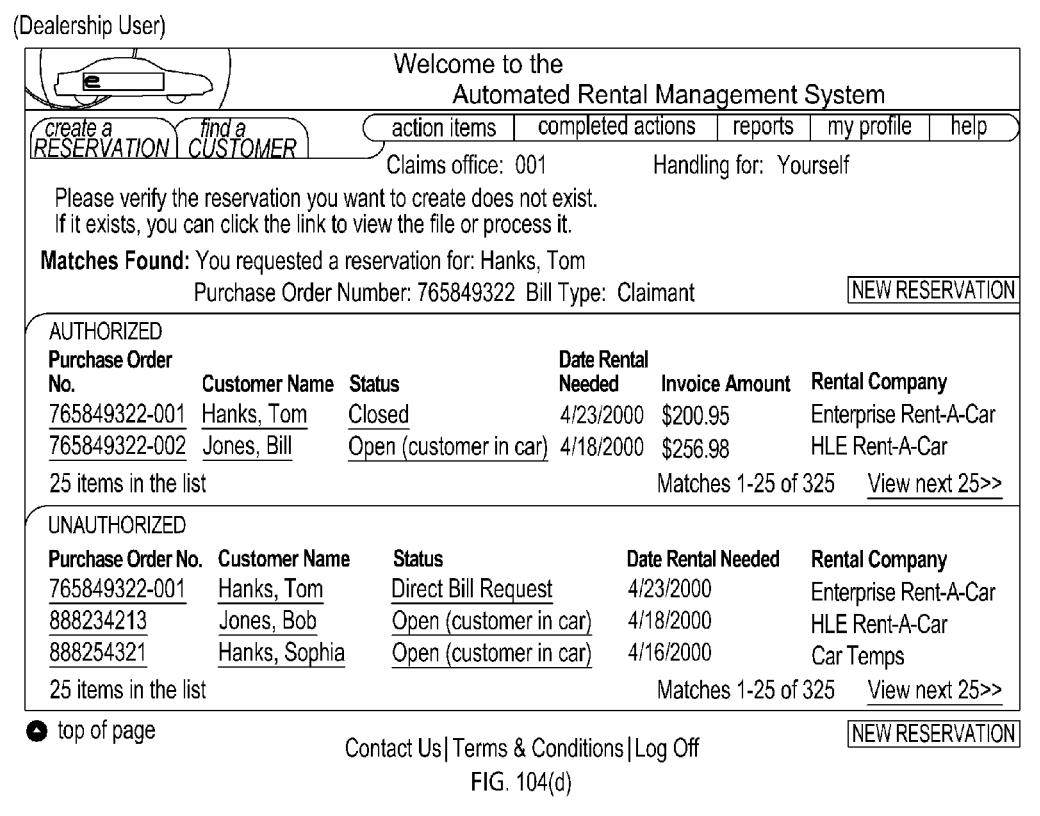

(Dealership User)

Welcome to the
Automated Rental Management System create a RESERVATION | find a CUSTOMER action items | completed actions | reports | my profile | help Claims office: 001 Handling for: Yourself Please verify the reservation you want to create does not exist.
If it exists, you can click the link to view the file or process it.

Matches Found: You requested a reservation for: Hanks, Tom
Purchase Order Number: 765849322 Bill Type: Claimant

NEW RESERVATION

AUTHORIZED

| Purchase Order No. | Customer Name | Status | Date Rental Needed | Invoice Amount | Rental Company |
|---|---|---|---|---|---|
| 765849322-001 | Hanks, Tom | Closed | 4/23/2000 | $200.95 | Enterprise Rent-A-Car |
| 765849322-002 | Jones, Bill | Open (customer in car) | 4/18/2000 | $256.98 | HLE Rent-A-Car |

25 items in the list Matches 1-25 of 325 View next 25>>

UNAUTHORIZED

| Purchase Order No. | Customer Name | Status | Date Rental Needed | Rental Company |
|---|---|---|---|---|
| 765849322-001 | Hanks, Tom | Direct Bill Request | 4/23/2000 | Enterprise Rent-A-Car |
| 888234213 | Jones, Bob | Open (customer in car) | 4/18/2000 | HLE Rent-A-Car |
| 888254321 | Hanks, Sophia | Open (customer in car) | 4/16/2000 | Car Temps |

25 items in the list Matches 1-25 of 325 View next 25>> top of page

NEW RESERVATION

Contact Us | Terms & Conditions | Log Off

FIG. 104(d)

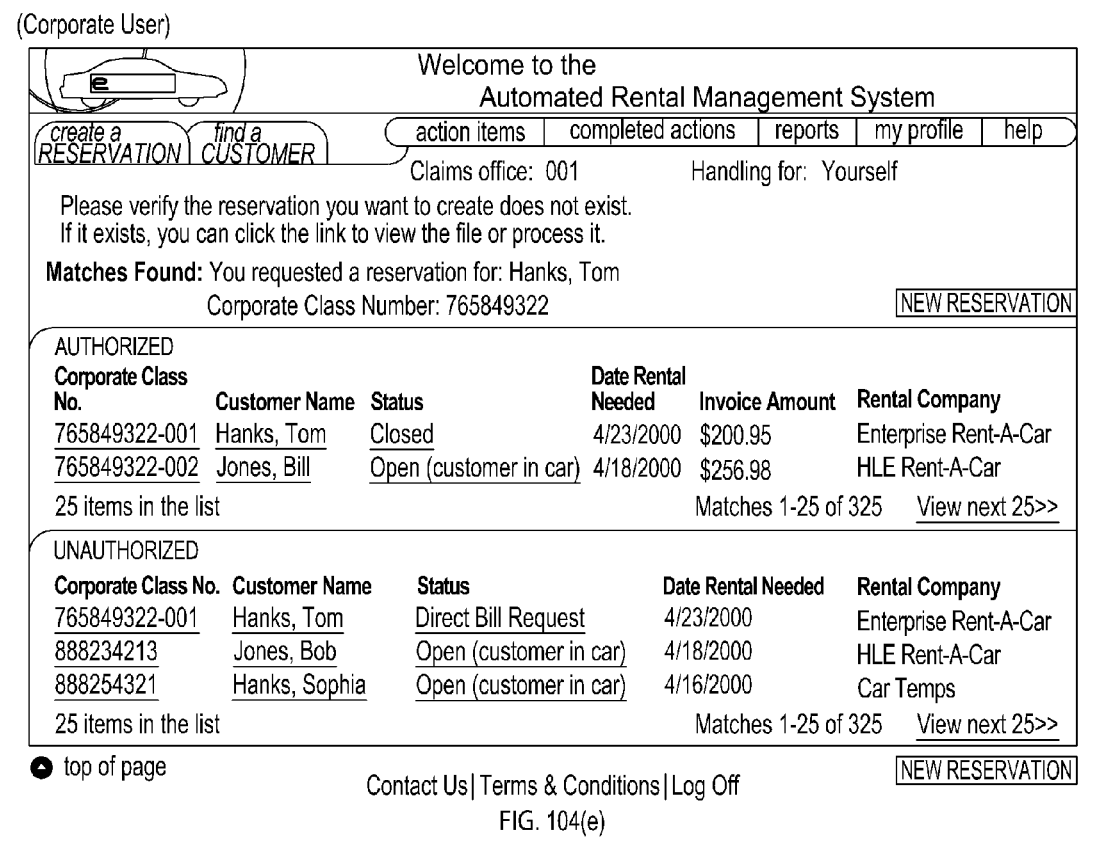

(Corporate User)

Welcome to the
Automated Rental Management System create a RESERVATION | find a CUSTOMER action items | completed actions | reports | my profile | help Claims office: 001 Handling for: Yourself Please verify the reservation you want to create does not exist.
If it exists, you can click the link to view the file or process it.

Matches Found: You requested a reservation for: Hanks, Tom
Corporate Class Number: 765849322

NEW RESERVATION

AUTHORIZED

| Corporate Class No. | Customer Name | Status | Date Rental Needed | Invoice Amount | Rental Company |
|---|---|---|---|---|---|
| 765849322-001 | Hanks, Tom | Closed | 4/23/2000 | $200.95 | Enterprise Rent-A-Car |
| 765849322-002 | Jones, Bill | Open (customer in car) | 4/18/2000 | $256.98 | HLE Rent-A-Car |

25 items in the list Matches 1-25 of 325 View next 25>>

UNAUTHORIZED

| Corporate Class No. | Customer Name | Status | Date Rental Needed | Rental Company |
|---|---|---|---|---|
| 765849322-001 | Hanks, Tom | Direct Bill Request | 4/23/2000 | Enterprise Rent-A-Car |
| 888234213 | Jones, Bob | Open (customer in car) | 4/18/2000 | HLE Rent-A-Car |
| 888254321 | Hanks, Sophia | Open (customer in car) | 4/16/2000 | Car Temps |

25 items in the list Matches 1-25 of 325 View next 25>> top of page

NEW RESERVATION

Contact Us | Terms & Conditions | Log Off

FIG. 104(e)

(ARMS/Web 2.0)

Contact Us | Terms & Conditions | Log Off (Insurance User)

(Fleet User)

Find Rental Location Use Case Activity Diagram (ARMS/Web 3.0)

(ARMS/Web 2.0)

(ARMS/Web 3.0)

(ARMS/Web 2.0)

(ARMS/Web 3.0)

Send Message Activity Diagram

Additional Charges Activity Diagram

Change Customer File Activity Diagram (Before clicking the Change or Add Link)

Welcome to the
Automated Rental Management System create a RESERVATION | find a CUSTOMER | action items | completed actions | reports | my profile | help Claims office: 001 Handling for: Yourself [TRANSFER FILE]

You just authorized 3 day at $29.39/day for Hanks, Tom

Customer File: for Bowie, David Claim no. 765849322-001
OPEN 2 of 4 Action Items Extension requested for:

[ ] additional authorized days @ [Compact/21.95 ▾] [VIEW CARS]

Policy Limits [20/500 ▾]

Messages:
08/31/00 BSS 2 more days - Waiting on Parts:
08/30/00 Waiting on fender:
08/29/00 Extension requested through 08/30/00:
3 days extension requested:
Go to Notebook

Note to Enterprise:

Note to Self:

Rental Location:
Enterprise Edgewater Branch
773-334-5400

Current Rental Status*

| | |
|---|---|
| Rental Start Date: | 5/15/00 |
| Last Authorized Date: | 04/13/00 |
| Authorized to Date: | 5 days |
| Charges to Date: | $239.00* |
| Direct Bill %: | 100% |

Repair Facility:
Elco Chevrolet
(773)-334-9832
Owner Vehicle: 1999 GMC Suburban
Vehicle Condition: Non-Driveable ☐ Extend this rental?

*Does not include taxes and surcharges

[SET LAST DAY] [PROCESS] [SKIP >>]

[Change or Add]

RENTER INFORMATION
Bowie, David
1735 N. Paulina St.
Chicago, IL 60622

Home: (773)564-6054
Work: (773)395-6200
Email: dbowie@zefer.com
Requested email confirmation RENTAL INFORMATION
Authorized Class: Standard
Days/Rate: 5 days @ $21.99/day
Current Class: Full-Size
Additional Charges: None
Direct Bill %: None
Rental Date: 03/28/2000
Start Date: 03/20/2000

Enterprise Rent-A-Car Location:
Enterprise Edgewater Branch
5400 N. Ashland
Chicago, IL60622
773-334-5400

ADDITIONAL CLAIM INFORMATION:
Claim Number: 323232323232323
Claim Type: Theft
Insured Name: Lalumandier, Craig
Owner's vehicle: GMC Suburban 1999
Date of Loss: 03/28/2000
Loss Type: Non-Driveable
Policy: Daily rate/
Maximum dollars: 30/600

Repair Facility:
Elco Chevrolet
Chicago, IL 60621
(773)334-9832

NOTEBOOK:
Message, Belanger, Hugues, 2/20/00
Note from Enterprise, Sarussi, Marty, 2/21/00
Extension Request, 2/24/00
Extension, 2/25/00

⬆ top of page

Contact Us | Terms & Conditions | Log Off

FIG. 120(b)

Reassign User/Office Activity Diagram

View Customer File Activity Diagram

FIG. 129(a)

Invoicing: [PRINTER FRIENDLY PAGE] ☐ Print Rental History too

[Use the "Print" button from your browser after clicking the "Printer-Friendly Version" button.]

RENTAL:
Enterprise Rent-A-Car Location:
6850 Ladue Rd.
Saint Louis, MO 631240001
(314) 512-0294

INVOICE:
Reference: PPGM D073082
Invoice Date: 02/10/00
Federal ID: 4800791835

Authorized
Authorized Period: 02/10/00 to 03/01/00 (20 days)

| | |
|---|---|
| Days | 20 |
| Rate | 22.99 |
| Direct Bill Percent | 100% |
| Total authorized: | 459.8 Plus Tax & Surcharges |

CLAIM:
Renter: Weber, Andrew
Claim Number: 5698754821
Claim Type: Claimant
Vehicle Condition: Non-Driveable
Date of Loss: 02/05/00
Insured Name: Smith, Bob Actual Rental
Rental Period: 02/10/00 to 03/01/00 (20 days)
Billed Period: 02/10/00 to 03/01/00 (20 days)
Actual Days:
Actual Days:

| | |
|---|---|
| 20 @ $22.99/day = | $505.78 |
| Direct Bill Percent | 100% |
| Sales Tax (6%) = | $30.35 |
| Total Charges: | $536.13 |
| Amount Received: | $0.00 |
| Total Due: | $536.13 |

top of page

[PREVIOUS]

Contact Us | Terms & Conditions | Log Off

FIG. 129(b)

Handle Unapproved Invoices Activity Diagram

Handle Unapproved Invoices Activity Diagram

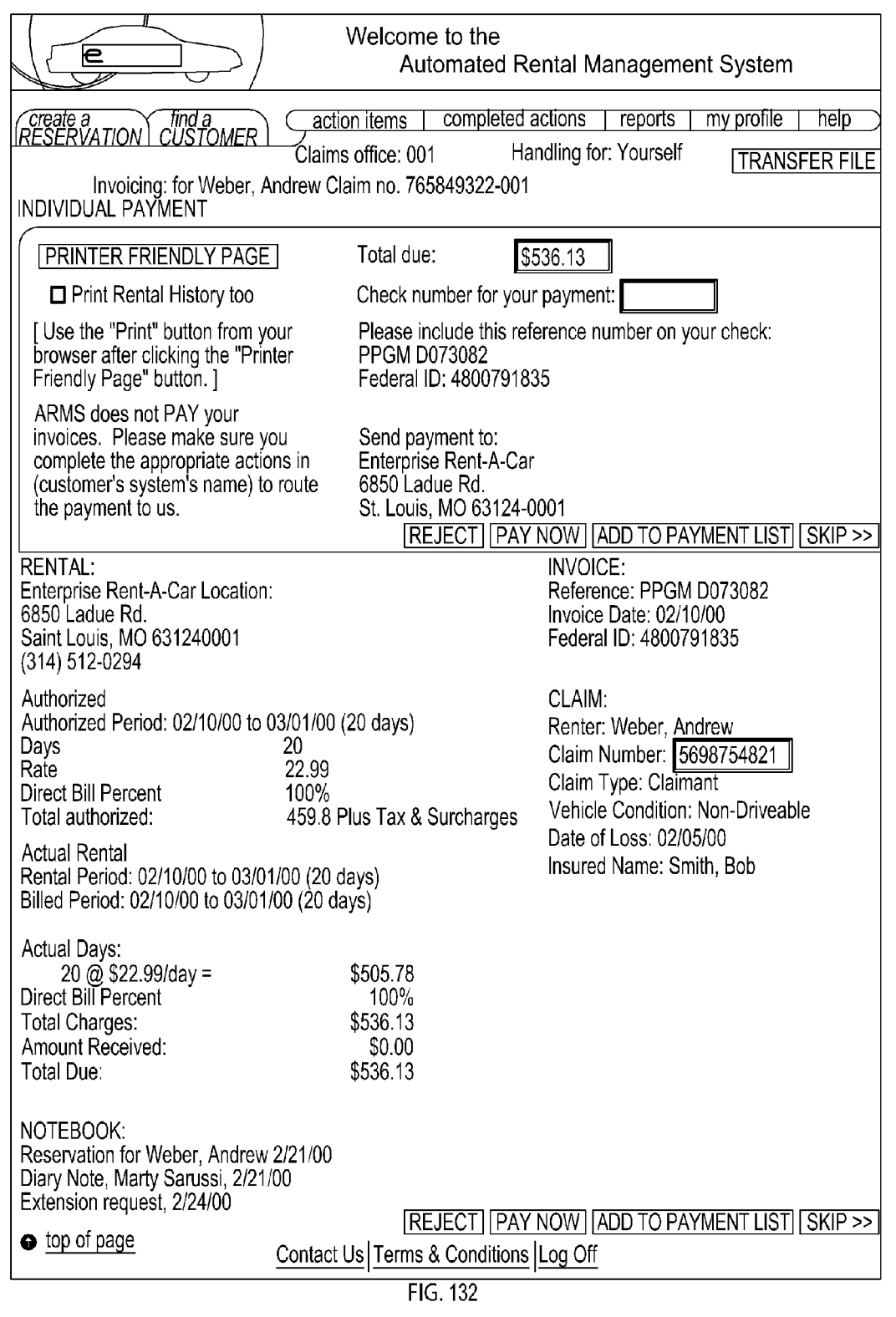

Welcome to the
Automated Rental Management System create a RESERVATION | find a CUSTOMER | action items | completed actions | reports | my profile | help Claims office: 001 Handling for: Yourself [TRANSFER FILE]

Invoicing: for Weber, Andrew Claim no. 765849322-001
INDIVIDUAL PAYMENT

[PRINTER FRIENDLY PAGE]

☐ Print Rental History too

[ Use the "Print" button from your browser after clicking the "Printer Friendly Page" button. ]

ARMS does not PAY your invoices. Please make sure you complete the appropriate actions in (customer's system's name) to route the payment to us.

Total due: [$536.13]

Check number for your payment: [ ]

Please include this reference number on your check:
PPGM D073082
Federal ID: 4800791835

Send payment to:
Enterprise Rent-A-Car
6850 Ladue Rd.
St. Louis, MO 63124-0001

[REJECT] [PAY NOW] [ADD TO PAYMENT LIST] [SKIP >>]

RENTAL:
Enterprise Rent-A-Car Location:
6850 Ladue Rd.
Saint Louis, MO 631240001
(314) 512-0294

Authorized
Authorized Period: 02/10/00 to 03/01/00 (20 days)

| | |
|---|---|
| Days | 20 |
| Rate | 22.99 |
| Direct Bill Percent | 100% |
| Total authorized: | 459.8 Plus Tax & Surcharges |

Actual Rental
Rental Period: 02/10/00 to 03/01/00 (20 days)
Billed Period: 02/10/00 to 03/01/00 (20 days)

Actual Days:

| | |
|---|---|
| 20 @ $22.99/day = | $505.78 |
| Direct Bill Percent | 100% |
| Total Charges: | $536.13 |
| Amount Received: | $0.00 |
| Total Due: | $536.13 |

INVOICE:
Reference: PPGM D073082
Invoice Date: 02/10/00
Federal ID: 4800791835

CLAIM:
Renter: Weber, Andrew
Claim Number: [5698754821]
Claim Type: Claimant
Vehicle Condition: Non-Driveable
Date of Loss: 02/05/00
Insured Name: Smith, Bob NOTEBOOK:
Reservation for Weber, Andrew 2/21/00
Diary Note, Marty Sarussi, 2/21/00
Extension request, 2/24/00

[REJECT] [PAY NOW] [ADD TO PAYMENT LIST] [SKIP >>]

top of page

Contact Us | Terms & Conditions | Log Off

FIG. 132

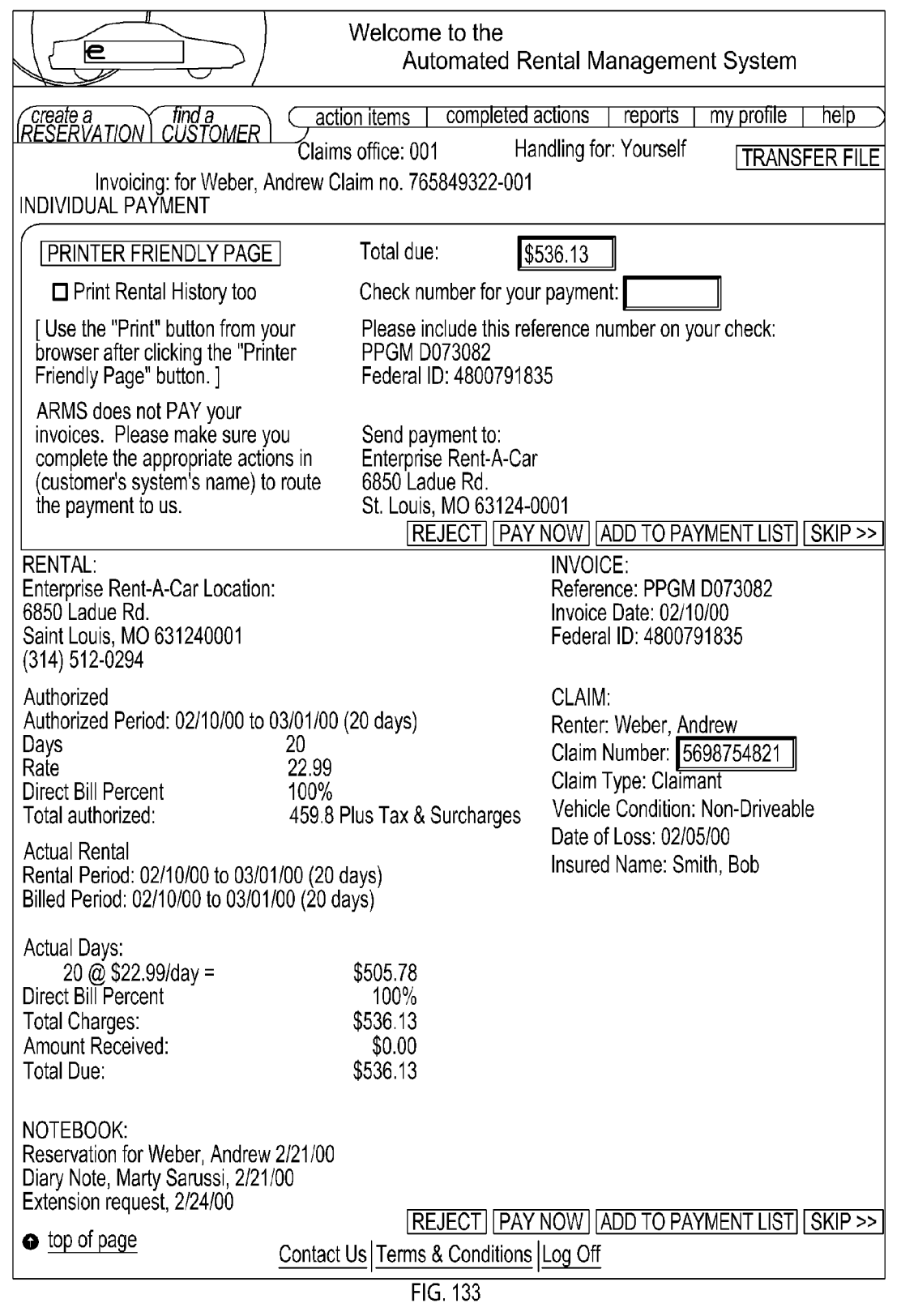

Welcome to the
Automated Rental Management System create a RESERVATION | find a CUSTOMER | action items | completed actions | reports | my profile | help Claims office: 001 Handling for: Yourself [TRANSFER FILE]

Invoicing: for Weber, Andrew Claim no. 765849322-001

INDIVIDUAL PAYMENT

[PRINTER FRIENDLY PAGE]

☐ Print Rental History too

[ Use the "Print" button from your browser after clicking the "Printer Friendly Page" button. ]

ARMS does not PAY your invoices. Please make sure you complete the appropriate actions in (customer's system's name) to route the payment to us.

Total due: [$536.13]

Check number for your payment: [ ]

Please include this reference number on your check:
PPGM D073082
Federal ID: 4800791835

Send payment to:
Enterprise Rent-A-Car
6850 Ladue Rd.
St. Louis, MO 63124-0001

[REJECT] [PAY NOW] [ADD TO PAYMENT LIST] [SKIP >>]

RENTAL:
Enterprise Rent-A-Car Location:
6850 Ladue Rd.
Saint Louis, MO 631240001
(314) 512-0294

Authorized
Authorized Period: 02/10/00 to 03/01/00 (20 days)

| | |
|---|---|
| Days | 20 |
| Rate | 22.99 |
| Direct Bill Percent | 100% |
| Total authorized: | 459.8 Plus Tax & Surcharges |

Actual Rental
Rental Period: 02/10/00 to 03/01/00 (20 days)
Billed Period: 02/10/00 to 03/01/00 (20 days)

Actual Days:

| | |
|---|---|
| 20 @ $22.99/day = | $505.78 |
| Direct Bill Percent | 100% |
| Total Charges: | $536.13 |
| Amount Received: | $0.00 |
| Total Due: | $536.13 |

INVOICE:
Reference: PPGM D073082
Invoice Date: 02/10/00
Federal ID: 4800791835

CLAIM:
Renter: Weber, Andrew
Claim Number: [5698754821]
Claim Type: Claimant
Vehicle Condition: Non-Driveable
Date of Loss: 02/05/00
Insured Name: Smith, Bob NOTEBOOK:
Reservation for Weber, Andrew 2/21/00
Diary Note, Marty Sarussi, 2/21/00
Extension request, 2/24/00

[REJECT] [PAY NOW] [ADD TO PAYMENT LIST] [SKIP >>]

top of page

Contact Us | Terms & Conditions | Log Off

FIG. 133

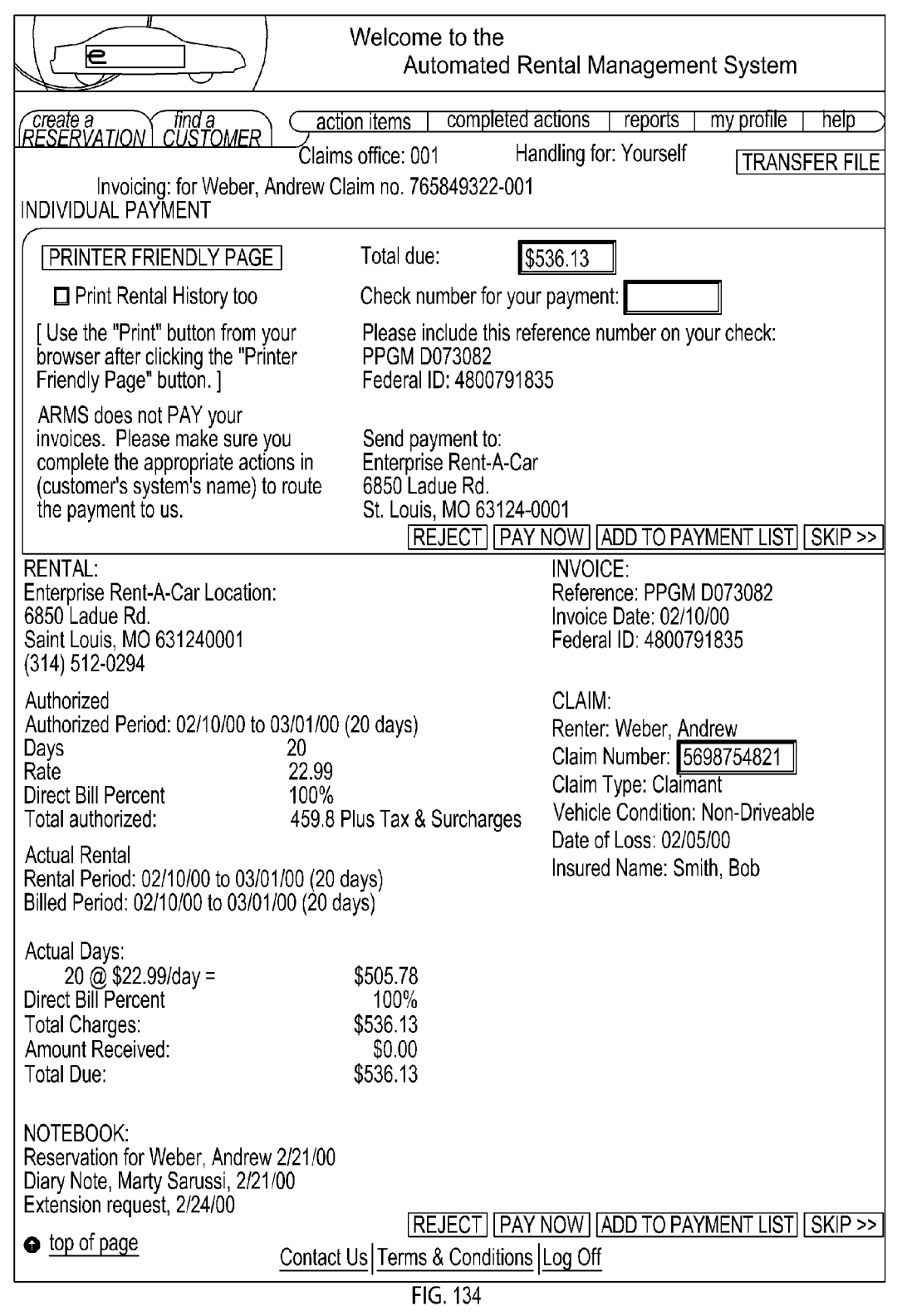

Welcome to the
Automated Rental Management System create a RESERVATION | find a CUSTOMER | action items | completed actions | reports | my profile | help Claims office: 001 Handling for: Yourself [TRANSFER FILE]

Invoicing: for Weber, Andrew Claim no. 765849322-001

INDIVIDUAL PAYMENT

[PRINTER FRIENDLY PAGE]

☐ Print Rental History too

[ Use the "Print" button from your browser after clicking the "Printer Friendly Page" button. ]

ARMS does not PAY your invoices. Please make sure you complete the appropriate actions in (customer's system's name) to route the payment to us.

Total due: [$536.13]

Check number for your payment: [ ]

Please include this reference number on your check:
PPGM D073082
Federal ID: 4800791835

Send payment to:
Enterprise Rent-A-Car
6850 Ladue Rd.
St. Louis, MO 63124-0001

[REJECT] [PAY NOW] [ADD TO PAYMENT LIST] [SKIP >>]

RENTAL:
Enterprise Rent-A-Car Location:
6850 Ladue Rd.
Saint Louis, MO 631240001
(314) 512-0294

Authorized
Authorized Period: 02/10/00 to 03/01/00 (20 days)

| | |
|---|---|
| Days | 20 |
| Rate | 22.99 |
| Direct Bill Percent | 100% |
| Total authorized: | 459.8 Plus Tax & Surcharges |

Actual Rental
Rental Period: 02/10/00 to 03/01/00 (20 days)
Billed Period: 02/10/00 to 03/01/00 (20 days)

Actual Days:

| | |
|---|---|
| 20 @ $22.99/day = | $505.78 |
| Direct Bill Percent | 100% |
| Total Charges: | $536.13 |
| Amount Received: | $0.00 |
| Total Due: | $536.13 |

INVOICE:
Reference: PPGM D073082
Invoice Date: 02/10/00
Federal ID: 4800791835

CLAIM:
Renter: Weber, Andrew
Claim Number: [5698754821]
Claim Type: Claimant
Vehicle Condition: Non-Driveable
Date of Loss: 02/05/00
Insured Name: Smith, Bob NOTEBOOK:
Reservation for Weber, Andrew 2/21/00
Diary Note, Marty Sarussi, 2/21/00
Extension request, 2/24/00

[REJECT] [PAY NOW] [ADD TO PAYMENT LIST] [SKIP >>]

top of page

Contact Us | Terms & Conditions | Log Off

FIG. 134

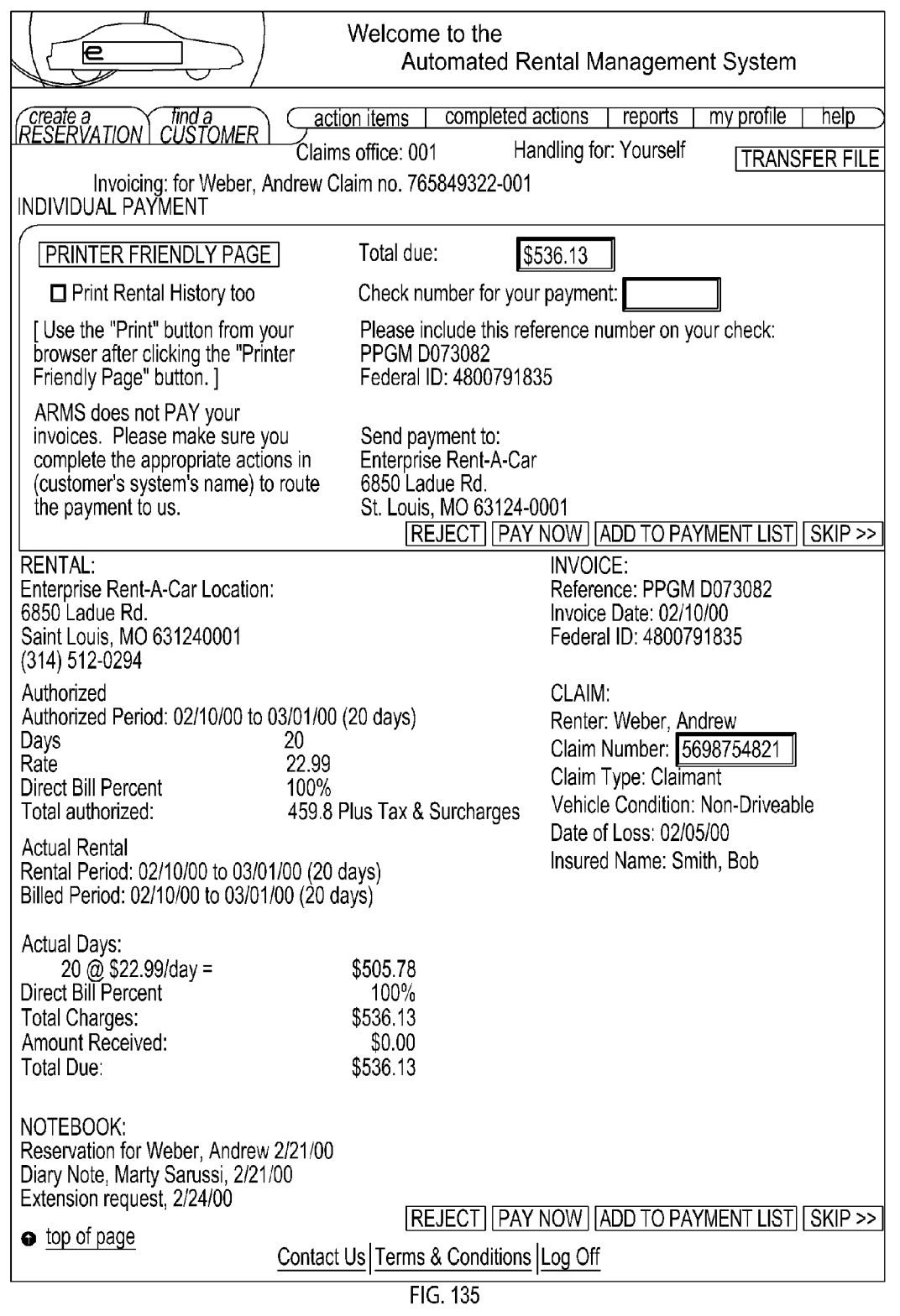

Welcome to the
Automated Rental Management System create a RESERVATION | find a CUSTOMER | action items | completed actions | reports | my profile | help Claims office: 001 Handling for: Yourself [TRANSFER FILE]

Invoicing: for Weber, Andrew Claim no. 765849322-001
INDIVIDUAL PAYMENT

[PRINTER FRIENDLY PAGE]

☐ Print Rental History too

[ Use the "Print" button from your browser after clicking the "Printer Friendly Page" button. ]

ARMS does not PAY your invoices. Please make sure you complete the appropriate actions in (customer's system's name) to route the payment to us.

Total due: [$536.13]

Check number for your payment: [ ]

Please include this reference number on your check:
PPGM D073082
Federal ID: 4800791835

Send payment to:
Enterprise Rent-A-Car
6850 Ladue Rd.
St. Louis, MO 63124-0001

[REJECT] [PAY NOW] [ADD TO PAYMENT LIST] [SKIP >>]

RENTAL:
Enterprise Rent-A-Car Location:
6850 Ladue Rd.
Saint Louis, MO 631240001
(314) 512-0294

Authorized
Authorized Period: 02/10/00 to 03/01/00 (20 days)

| | |
|---|---|
| Days | 20 |
| Rate | 22.99 |
| Direct Bill Percent | 100% |
| Total authorized: | 459.8 Plus Tax & Surcharges |

Actual Rental
Rental Period: 02/10/00 to 03/01/00 (20 days)
Billed Period: 02/10/00 to 03/01/00 (20 days)

| | |
|---|---|
| Actual Days: | |
| 20 @ $22.99/day = | $505.78 |
| Direct Bill Percent | 100% |
| Total Charges: | $536.13 |
| Amount Received: | $0.00 |
| Total Due: | $536.13 |

INVOICE:
Reference: PPGM D073082
Invoice Date: 02/10/00
Federal ID: 4800791835

CLAIM:
Renter: Weber, Andrew
Claim Number: [5698754821]
Claim Type: Claimant
Vehicle Condition: Non-Driveable
Date of Loss: 02/05/00
Insured Name: Smith, Bob NOTEBOOK:
Reservation for Weber, Andrew 2/21/00
Diary Note, Marty Sarussi, 2/21/00
Extension request, 2/24/00

[REJECT] [PAY NOW] [ADD TO PAYMENT LIST] [SKIP >>]

top of page

Contact Us | Terms & Conditions | Log Off

FIG. 135

Callbacks Activity Diagram

| | | | |
|---|---|---|---|
| ☐ | Bob's Autobarn | 333-377-2091 | 1 |
| ☑ | Johnson Glass | 333-397-9000 | 3 |
| ☐ | Wagonhaus | 333-521-2029 | 2 |

PROCESS

FIG. 144

Generate Personal Report Activity Diagram

Generate Management Report Activity Diagram

| | Report Sorted By | | | | | | | | | | | |
|---|---|---|---|---|---|---|---|---|---|---|---|---|
| | Adjuster | | | | Repair Facility | | | | Office | | | |
| | Open Detail | Open Summary | Closed Detail | Closed Summary | Open Detail | Open Summary | Closed Detail | Closed Summary | Open Detail | Open Summary | Closed Detail | Closed Summary |
| Adjuster Name | X | 1 | X | 1 | | | | | 1 | | 1 | |
| Renter Name | 1 | | 1 | | 1 | | 1 | | | | | |
| Claim Number | 2 | | 2 | | 2 | | 2 | | 2 | | 2 | |
| Claim Type | 3 | | 3 | | 3 | | 3 | | 3 | | 3 | 2 |
| Authorized Days* | 6 | 5 | 6 | 5 | 6 | 5 | 6 | 5 | 6 | 5 | 6 | 5 |
| Authorized Rate* | 4 | 3 | 4 | 3 | 4 | 3 | 4 | 3 | 4 | 3 | 4 | 3 |
| Rental Days* | 5 | 4 | | | 5 | 4 | | | 5 | 4 | | |
| Billed Days*+ | | | 5 | 4 | | | 5 | 4 | | | 5 | 4 |
| Days Behind* | 7 | 6 | | | 7 | 6 | | | 7 | 6 | | |
| Number of Extensions* | 8 | 7 | 7 | 6 | 8 | 7 | 7 | 6 | 8 | 7 | 7 | 6 |
| Surcharges | 9 | | | | 9 | | | | 9 | | | |
| Authorized Amount* | 10 | 8 | | | 10 | 8 | | | 10 | 8 | | |
| Amount Received* | | | 9 | 8 | | | 9 | 8 | | | 9 | 8 |
| Total Charges* | | | 8 | 7 | | | 8 | 7 | | | 8 | 7 |
| Billed Amount* | | | 10 | 9 | | | 10 | 9 | | | 10 | 9 |
| Total Contracts | X | 2 | X | 2 | X | 2 | X | 2 | X | 2 | X | X |
| Repair Facility Name | | | | | X | 1 | X | 1 | | | | |
| Repair Facility Telephone | | | | | X | | X | | | | | |
| Office Name | | | | | | | | | X | 1 | X | X |
| Month/Year | | | | | | | | | | | | 1 |

+ Not available in current state system. Being implemented by the ARMS Maintenance team.

FIG. 149

Add/Edit Custom View Activity Diagram

EXTENDED WEB ENABLED BUSINESS TO BUSINESS COMPUTER SYSTEM FOR RENTAL VEHICLE SERVICES

CROSS REFERENCE AND PRIORITY CLAIM TO RELATED APPLICATION

This application is a continuation of U.S. patent application Ser. No. 09/694,050, filed Oct. 20, 2000, now U.S. Pat. No. 7,899,690 (the entire disclosure of which is incorporated herein by reference), which is a continuation-in-part of U.S. patent application Ser. No. 09/641,820, filed Aug. 18, 2000, now U.S. Pat. No. 7,275,038.

REFERENCE TO A COMPUTER PROGRAM LISTING APPENDIX SUBMITTED ON COMPACT DISC

This application includes a computer program listing appendix submitted on a compact disc, the compact disc containing the files "Exhibit A.txt" (file created Feb. 8, 2011; file size of 316 kilobytes), "Exhibit C.txt" (file created Feb. 8, 2011; file size of 534 kilobytes), and "Exhibit D.txt" (file created Feb. 8, 2011; file size of 261 kilobytes), these files being incorporated herein by reference.

INTRODUCTION

The invention disclosed and claimed in the parent cross referenced above relates generally to the field of an Internet enabled business-to-business intelligent communication link allowing a first business organization to have intelligent interaction with a second fully integrated business organization to facilitate the placing of orders or reservations for business services or goods, with the services or goods provider having a computer network linking multiple levels of its organization to provide for the smooth conduct of business between the two organizations. More particularly, this field relates to an Internet enabled automatic rental vehicle transaction system to facilitate the conduct of rental vehicle transactions between two multilevel business organizations, one of which provides such rental vehicle transaction services in an integrated manner through business enterprise software to a high volume user of such rental vehicle services wherein an Internet web portal is defined by the rental vehicle service provider which interconnects the two business organizations at multiple levels, providing a graphical user interface (GUI) for the transaction of large amounts of rental vehicle services automatically and virtually without human intervention upon entry. The invention of the present continuation-in-part application extends the functionality of the parent invention by providing an intelligent portal that is readily configurable to suit any particular customer and any particular provider data requirements or method of doing business. This added functionality allows the invention, for example, to provide the user with access to other suppliers in the same seamless and integrated manner. In other words, the user now has access to not just one integrated business but multiple businesses, some of which may but need not be, integrated businesses thereby extending the invention for use in a generic application to satisfy a users needs for a good or service not just from one vendor but all vendors connected to the invention.

BACKGROUND OF THE INVENTION

Computer technology has been embraced by many businesses in order to handle their ever increasing order flow as well as to mitigate the increasing blizzard of paper required to be produced to document this business. A significant benefit which often drives the implementation of technology is its further advantage in increasing productivity to thereby allow fewer people to handle greater volumes of business. One such good example demonstrating the efficiencies and value to be gained by implementing technology is the business model developed and followed by the assignee of the present invention. A rental car company at its heart, the assignee transacts an ever increasing number of time sensitive, relatively low dollar volume, vehicle rentals which in many instances require authorizations to be made in advance, reservations of vehicles from available geographic and vehicle type selections, monitoring of the rental as it progresses including possibly extending the rental under certain circumstances, communications between the various parties involved in the transaction to ensure ultimate customer satisfaction, and financial accounting for the transaction including generating invoices and processing them for payment. While a significant portion of the vehicle rental business involves rental for leisure, business travel, etc., another significant business relationship has developed with insurance companies and the like in what has been termed as the replacement car rental service business. In this business, a vehicle insurance company may have many thousands of policyholders who are eligible to be involved in accidents, and other dislocations of use, requiring that a vehicle be rented for that customer's use while his own vehicle be made ready again for use. Thus, for this business segment, a multi-tiered business organization such as a vehicle insurance company represents a significant customer for repetitive vehicle rental services. To conduct this business in an orderly, time efficient and cost efficient manner, it is necessary that this insurance company has as its business partner a vehicle rental company which is itself multi-tiered, such as the assignee of the present invention. This is because the needs, both geographically and in volume, are significant which require the dedication of a significant amount of resources. To satisfy these needs and to respond to other business growth, in its embrace of technology the assignee hereof has succeeded in developing an in-house computer system and related software which has integrated its business internally. This business integration has been massive and company-wide as is needed to integrate a company having a central office with literally thousands of individual branches located nationally, and even now internationally, with hundreds of thousands of vehicles available for rental. Furthermore, other business partners including other service providers such as vehicle repair shops have also been given access to this system to allow for input of information relating to progress of vehicle repair, extension of rental time, etc. as the rental progresses. This integrated business computer network and software generally includes a mainframe server at the heart of a wide area network (WAN) which facilitates the transfer of vehicle rental information and orders company-wide. This integrated business model is most efficient and needed in order to satisfy the vehicle rental service needs of a vehicle insurance company which itself may be national or even international in scope.

As a first step in extending the integration of technology into this business model, the present assignee has previously developed and implemented a computer system which has provided improved communication capabilities between the two business partners. This system generally comprised a second mainframe computer linked to the first mainframe of the integrated business network, with dedicated access lines being provided from this second mainframe to various levels of the multilevel business organization comprising the insurance company. In effect, with this additional mainframe and dedicated pipeline access, various individuals at the insurance company were permitted to directly interact with the integrated business computer network of the vehicle rental company as well as other selected service providers such as body shops where wrecked vehicles were being repaired. The implementation of this system provided a great step forward over the people intensive business activity previously required in order to handle the large number of transactions encountered in this business relationship. Historically, the replacement car market engendered large numbers of telephone calls being placed between the insurance company, the rental company, and the body shop where vehicle repair was being performed in order to authorize the rental, select and secure the desired replacement vehicle to be provided, monitor the progress of the repair work so that scheduling of the rental vehicle could be controlled, extending the vehicle rental in the event of delays in repair, authorizing various activities involved in the rental process including upgrades of vehicles or other charges for services, and subsequent billing of the rental service and processing the billing to the insurance company for payment.

While the implementation of this system was successful and represented a tremendous step forward in automating the business relationship between the insurance company and the vehicle rental company, it did have certain limitations. For example, a specific communication link had to be established between the rental vehicle company and the particular users at the insurance company designated to have access to this system. Thus, special attention and some modicum of expense was required to establish these "pipelines" and maintain them. Still another aspect to the system implemented was that it was not "browser" based nor did it provide graphical user interface (GUI) menus. Thus, each user had to be specifically trained in the particular "language" used by the system and learn to work with specific menus nested in a specific manner as well as codes for entering commands which were not similar to other computer software programs. This software design thus necessarily required additional training in order to insure that users could gain the full measure of advantage provided by the system and in order to minimize the opportunity for erroneous information or incorrect reservations from being entered or otherwise confusing the business transactions. Furthermore, user efficiency was not immediate and required skill beyond that ordinarily found in casual computer users, as we are all becoming in this computer age. Still another disadvantage to the system was that access was required to a designated entry point in the system in order for a person authorized to be on the system to work with it. As the nature of the insurance and replacement car business requires extreme mobility at multiple levels of both business partners, this represents a limitation to the usefulness and time efficiency with which various business functions could be performed. Therefore, while implementation of the second mainframe allowing for pipeline connections at various levels of the multi-tiered insurance company was a significant step forward in automating the business relationship between the two business partners, significant limitations to this solution were readily apparent to the users thereof.

SUMMARY OF THE INVENTION

In the parent application cross-referenced above, the inventors herein have succeeded in designing and developing a means for substantially enhancing the business to business communication link between these two businesses which provide significant advantages over its prior embodiment. More particularly, the inventors have succeeded in replacing the dedicated pipeline access of the existing system with a web portal allowing Internet access to the mainframe with a browser based graphical user interface (GUI) presentation. This also made the system more readily accessible to smaller business partners as the expense of the "pipeline" was eliminated. The parent invention offers several important technical advantages over the previous system. First of all, by taking advantage of the ubiquitous nature of the Internet, the ultimate in portability and connectivity for this system is now provided in a business environment where mobility and connectivity are at a premium. In other words, a claims adjuster, body shop, or any other business employee authorized to have access to the system may gain access at any site offering Internet access. In present day technology that includes many mobile devices and appliances which are Internet enabled. As technology advances, it is conceivable that this access will extend to permit "24/7" access by any authorized person at any geographic location. This is a marked improvement providing immediate benefit and advantage over the dedicated pipeline access of the prior art system.

A second major advantage of the parent invention is its graphical user interface. The inventors have taken full advantage of this browser based GUI to streamline and organize the presentation of information to a user to actually guide him as he interacts in doing his business. One such example is customized design of the menus such that the user is guided and directed to answer only those questions required to be answered in order to conduct the particular transaction being addressed, and further to present choices to the user for his selection to minimize the need for the user to rely on his own memory or to be familiar with complicated and specialized codes to enter data or request transaction activity. With the recent and continuing explosion of the Internet, more people are becoming familiar with browser programs and their operation through their own daily activities in their personal lives. This familiarity paves the way for easier training and quicker orientation of a new user to the present invention. For large business organizations communicating at multiple levels, this significant advantage cannot be minimized as there are large numbers of people who must be continuously trained due to the growth of the organizations, as well as the replacement of employees due to the inevitable attrition. Thus, the parent invention provides an immediate increase in worker productivity, and makes that improved efficiency available to many more workers who are not particularly skilled otherwise in computer usage.

Still another advantage provided by the parent invention is through the implementation of additional functionalities which are engendered by the browser/GUI interface. As the system is continuously used, and feedback is continuously monitored and analyzed, additional features that add value through providing management information as well as by speeding transaction activity over the system may be implemented. For example, several of these features include the ability of a user to create an on demand report for transaction activity including summaries of transactions handled by a particular user or group of users which might either be open or closed. Another example of additional functionality which improves the efficiency of a user is the ability to create a repair facility call back list which allows a user to sort existing open vehicle rental reservations by repair facility (body shop) and date such that a user is presented with the list of open reservations at a particular repair facility which can be readily handled in a single telephone call while at the same time having the system on line to implement any needed changes such as extensions of reservations, etc. Additional functionality has also been provided to speed the processing of invoicing which of course also speeds their payment and cash receipts. For example, it was found that even despite the built-in error checking and correction facilities provided to the users of the system, a repetitive pattern of mistakes involving incorrect claim numbers was discovered. To speed the processing of these, an additional functionality was provided as an "electronic audit" known as invoice return which returns an invoice to a particular adjuster upon detection of an incorrect claim number for his human intervention and correction of the claim number. In this manner, problem invoices exhibiting one of the most common problems encountered may be readily handled within the system and in an efficient manner, instead of manually as before.

The parent invention also has as a significant advantage the ability to be further customized to meet the individual business partners' needs and desires as well as to provide additional functionality by offering additional features which become desirable upon accumulation of user data based on user experience. Furthermore, once implemented, they are immediately available system wide. While this allows for consistent usage, it is limited in the sense that all of the system users are forced to use the same menus, data definitions, etc. This is not seen as a limitation for the one-to-one business application intended to be primarily addressed by the parent invention.

Still another advantage of the parent invention is that the graphical user interface incorporates point and click interaction, using buttons and tabs to present or conceal data for the user's attention or inattention as the case may be, and provide a much more robust interaction capability through the creation of menu designs that allow for access to the most commonly needed features from any point in the menu architecture. This is to be contrasted with the prior system which consisted of a main frame character based interface while the parent invention with its GUI interface allows a user to point and click to navigate and to make selections by pull down selection, thereby reducing errors. As users become more experienced with the system, and their confidence level grows, they are much more likely to become bored and aggravated with the rigid structure of the prior system requiring them to follow along a certain menu architecture in order to complete certain tasks. On the other hand, the parent invention generally increases the interest of the user in using the system. These advantages of the parent invention over the prior interface promote employee productivity by allowing a user more control over his work which is critical in achieving savings in human resources to operate the system which is one of its main goals.

The present invention extends the parent invention and expands its capabilities and functionalities. With the present invention, a user may not only have access to its business partner, but also one or more competitors of its business partner through the same Internet portal. In this way, at least two needs are satisfied. First, the user can have access to a variety of providers to choose from where business needs or desires require. This allows the user to use a single portal and not have to sign on to a number of different portals, even should they be available. Furthermore, the user isn't troubled to learn how to access and use different portals even should they be available. Presently, not all providers are operating an Internet portal for offering their services, so by allowing business competitors to be accessible through the same portal, independent development of other portals is forestalled. This is a benefit to the operator of the main portal as it creates and maintains a competitive advantage by handling all of the order flow which creates a data base of useful information for marketing purposes. Although initially the portal services might be offered for no additional cost to a competitor, eventually a fee might be charged which would at least partially offset the cost for owning and operating the portal.

The design of the portal is elegant and offers great flexibility for customizing not only the menus for presentation to the user, but also in the design of the data base entries needed or desired by the user and/or the competitive provider. For example, some users might not know or care about the features of a vehicle rented and so those data entries may not be provided space on the menu for the user to fill in. The data base as handled by the networked computer system then need not keep track of that data for that customer. This feature is readily accommodated by the data base programming and is conveniently implemented.

In still another aspect of the present invention, the web portal has the capability to accommodate the varying data requirements also of the various competitive providers, but also the level of their sophistication as evidenced in their respective computer systems and interface facilities. For example, the web portal may be configured to communicate the users order to the competitive provider via email, phone, or even through a connection directly to an integrated computer system having the same or substantially the same interoperability as the integrated computer system of the assignee hereof. This capability extends to accommodating and matching the competing data requirements of the user and the competitive providers, and having the flexibility to design and implement menus that readily meet these competing needs. Furthermore, the present invention allows for changes to be implemented by simple re-programming of the web portal which minimizes the effort and enhances the "user friendly" aspect to the present invention.

Not only are these "global" improvements made available with the present invention, there are other more particularized improvements that add functionality within the operating framework of the parent invention. For example, one such improvement is the ability to "virtually" assign work groups within the user so that, for example, multiple adjusters might be made into a team with a shared work load so that all of the team members have access to the same pool of work, such as the placing of reservations for the same group of drivers. With this "virtual team" assignment capability, work groups may be readily re-assigned to match changing work loads without worrying about re-configuring hardware or internal network connections. This can be a very valuable feature to accommodate staffing issues over geographical distances that can be nation-wide, with access through the web portal to reservation facilities which are themselves nation-wide.

Still another feature is the ability to customize an individual users authorization limits. As can be appreciated, one of the mixed blessings of providing enhanced functionality to the individual user's of any integrated computer system is that it places great power in the hands of the user which at the same time creates the potential for abuse. There have been well publicized instances of "rogue" employees making financial decisions or placing instructions which have far reaching financial consequences well beyond the intended authority of an employee, with disastrous results. With the present invention, one feature is the ability to limit the financial commitments that a user may make during any pre-selected time period. For example, the users profile may limit his ability to make only a certain dollar limit of vehicle reservations over any certain number of work days. In this way, added safe guards may be conveniently provided, monitored by reporting capabilities, and changes as circumstances warrant, all with simple programming changes at the web portal.

There are still other features that are provided by the present invention that find their genesis in the different approach taken over the parent invention and owing to the inherent increased flexibility of using a web based programming for the web portal to interface between the user and the providers on the web server and eliminating the need for any custom software on the user's terminal. The details of these are to be found and described in the detailed description of the preferred embodiment below. Examples include the ability to send confirmatory communications to the user that the reservation has been received and entered into the providers system for fulfillment, custom report design including the capability to save and re-generate the custom report upon user command, increased flexibility to process and pay invoices, etc.

While the principal advantages and features of the invention have been discussed above, a greater understanding of the invention including a fuller description of its other advantages and features may be attained by referring to the drawings and the detailed description of the preferred embodiment which follow.

DETAILED DESCRIPTION OF THE PREFERRED EMBODIMENT

Figure 1:
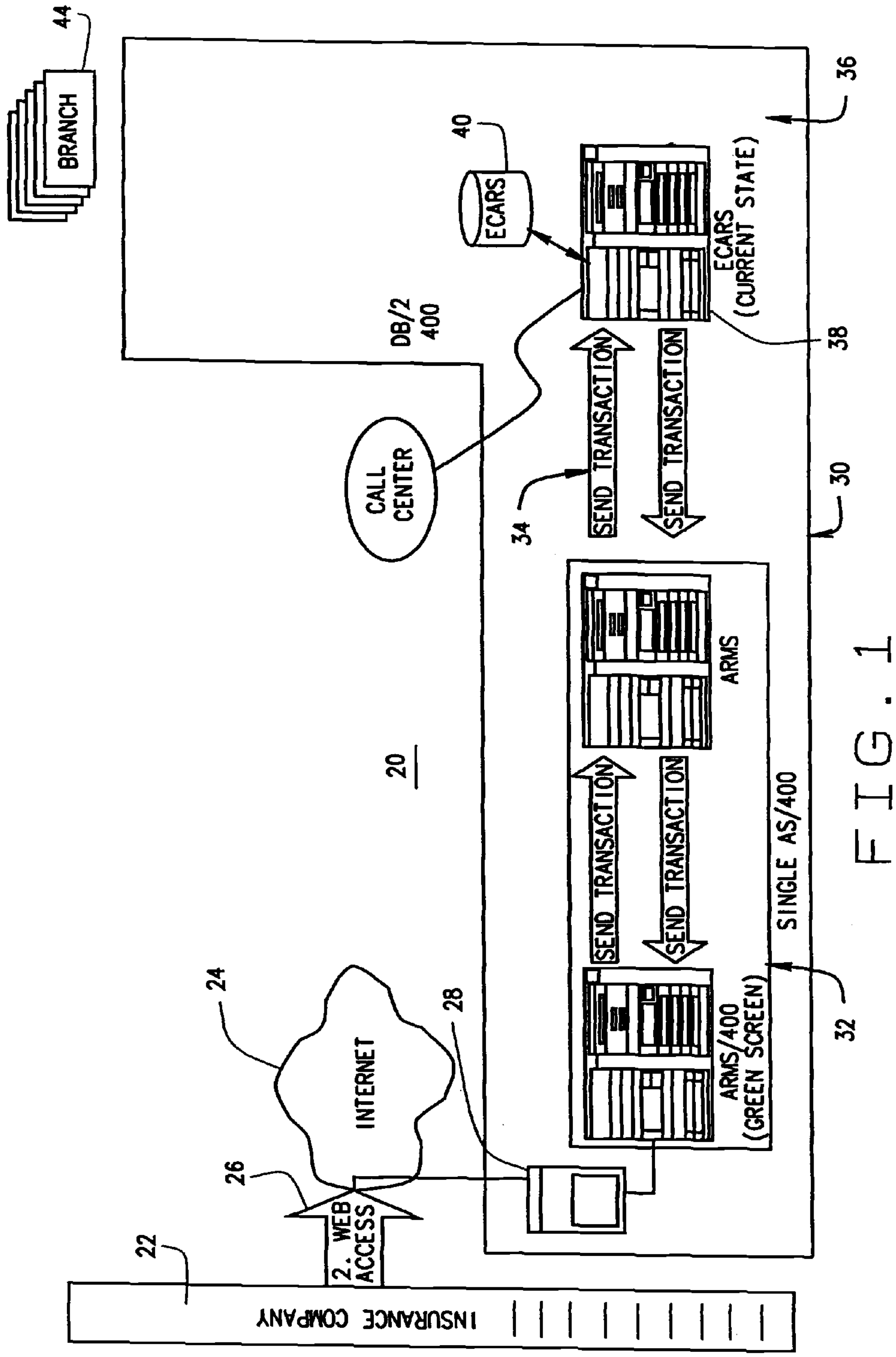
FIG. 1 is a schematic diagram of the computer systems comprising the parent invention.

The overall system architecture for the parent invention 20 is best shown in FIG. 1. As shown therein, an insurance company computer system 22, which itself may be virtually any computer configuration or even a stand alone PC accesses the Internet 24 through any convenient access point 26 such as even including an ISP (Internet service provider), as known in the art. Also connected to the Internet 24 is a web portal 28 which is preferably provided by a server appropriately programmed as explained herein below. This web portal 28 may be appropriate configured as desired to suit any particular business relationship or arrangement, although preferably the inventors herein and assignee of this invention have determined that a 24/7 or full time connection to the Internet 24 is preferable, except for scheduled downtimes for maintenance, etc. The service provider 30 which for purposes of explaining the parent preferred embodiment is preferably a vehicle rental organization, has itself an Internet portal mainframe 32 connected by a bi-directional communication link 34 to a second computer network 36 which may itself preferably have a mainframe server 38. This second computer system 36 is preferably a network having a database 40 for communication with what may be thousands of branch offices each of which has its own computer interface 44 which communicates to this second mainframe server 38 to conduct the integrated business functions of a service provider organization. Instead of communicating with the branch offices directly, a reservation may be communicated to a centralized location for further processing, such as a call center, and then relayed on to an appropriate branch office. This might be desirable under certain circumstances, such as if a branch office is closed, or when a purchaser requires some specialized service such as close monitoring of the rental. This may be done electronically and automatically, or with human intervention.

It should be noted that the particular computer configuration chosen as the preferred embodiment of the parent invention may itself be subject to wide variation. Furthermore, the term "mainframe" as used herein refers solely to a computer which can provide large scale processing of large numbers of transactions in a timely enough manner to suit the particular business application. Preferably, as is presently used by the assignee hereof, an IBM AS/400 mainframe computer is used as each of computers 32, 38. However, as is well known in the art, computer technology is subject to rapid change and it is difficult if not impossible to predict how these computer systems may evolve as technology advances in this art. For example, it is not beyond the realm of possibility that in the not so distant future a network of computers would provide the processing power to conduct these business operations as presently handled by "mainframe" computers. Thus, the term "mainframe" is not used in a limiting sense but merely to indicate that it is descriptive of a computer suited to handle the processing needs for a large scale business application.

It should also be noted that the communication link 46 extending between the server 42 and each of the branch offices 44 may have alternative configurations. For example, in some applications access over the Internet may itself be adequate, recognizing the vagaries of Internet service availability, reliability, and processing speed. Alternatively, this communication link 46 could well be a dedicated pipeline providing broadband service connection full time with back up connections to ensure continuous communication between a particular branch office or groups of branch offices and the service providers business operations computer system 36. Some branch offices might even be served through satellite links. Indeed, it is even possible that a mixture of these wide variations of service level be present within a single organization's structure depending upon communication link cost and availability balanced against service needs. It should merely be noted for present purposes that this communication link 46 serves as the electronic umbilical cord through which branch offices 44 communicate with the business computer system 36 of the present invention.

Attached hereto as exhibits are functional descriptions of the software programs resident on the computers comprising the two computer systems 32, 38 which implement the parent invention. More particularly, attached hereto as Exhibit A is a functional description of the software to implement the integrated business functions resident on the AS/400 or mainframe computer 38. Attached hereto as Exhibits B and C are related flow diagrams (see FIGS. 4-91 of Exhibit B) and explanatory text, respectively, for the software resident on the mainframe AS/400 computer 32. Attached hereto as Exhibit D is a functional description of the software resident on computer 32 but which also appears on the server 28 which creates the web portal for access to the mainframe 32 and its resident program. Server 28 may use a bi-directional GUI to character based interface translator program, well known to those skilled in the art, to present the displays and information obtained and transmitted between the user and the computer 32. However, the software of Exhibit D could also be run on server 28, as would be appreciated by those of skill in the art. It is believed that these functional descriptions and accompanying text as exemplified in these exhibits are adequate to enable an ordinary programmer to implement corresponding software programs for executing the preferred embodiment of the parent invention using ordinary programming skills and without inventive effort.

Figure 2:
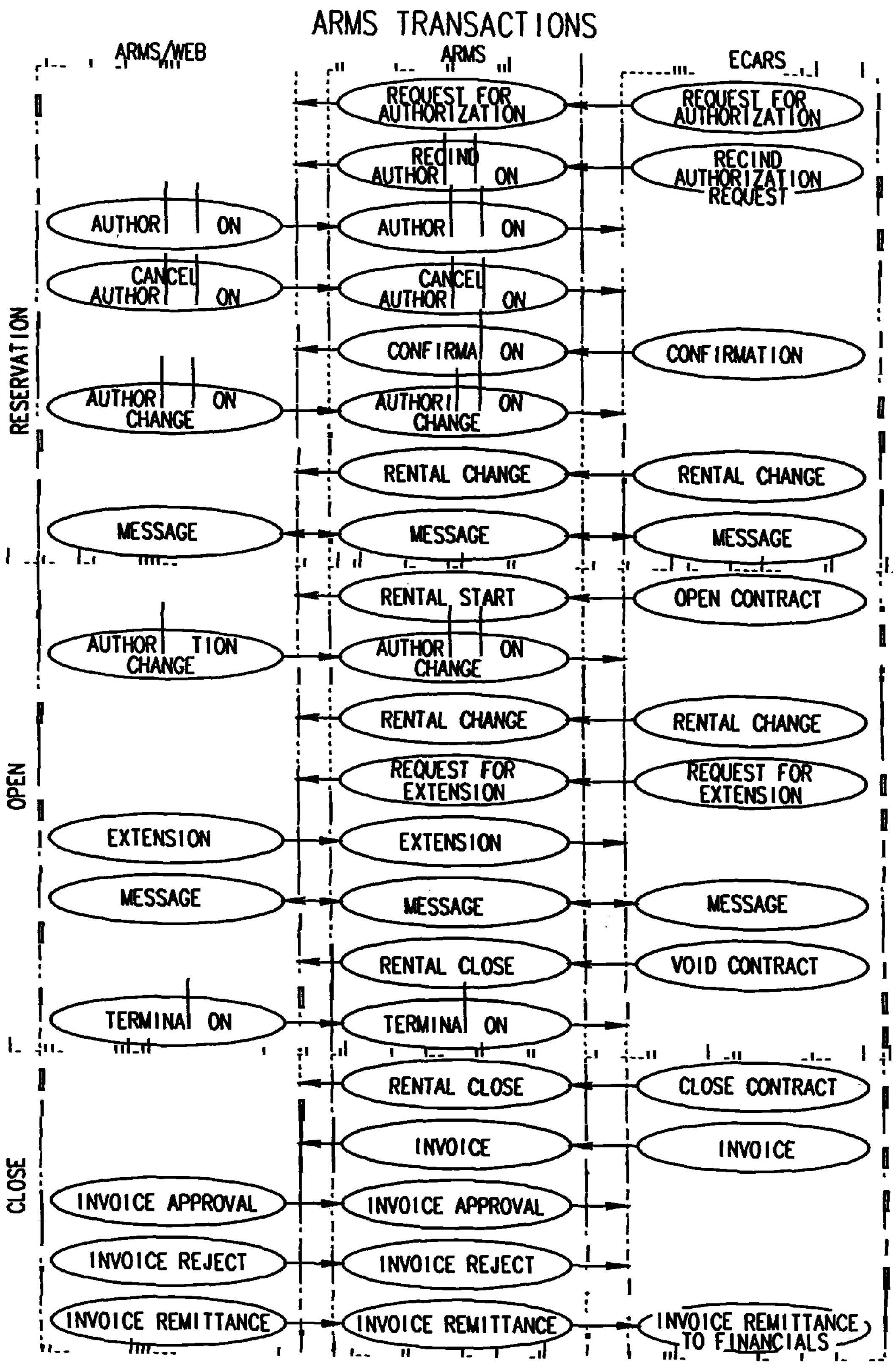
FIG. 2 is a flow chart of the software programs which communicate over the computer systems of FIG. 1 to implement the parent invention.

As a further example of the flow of data and the functional advantages provided by the parent invention, reference is made to FIG. 2. As shown therein, a right hand column is identified as "ECARS" which represents the integrated business software implemented as part of the mainframe operation 38 in computer network 36. The center column headed "ARMS" is resident on mainframe computer 32 and coordinates the communication of data. The left column headed "ARMS/WEB" represents the software resident on computer but which is presented on server 28 and accessible by users through the Internet. Along the left side of FIG. 2 are designated three separate sections of operational activity. These are "reservation" followed by "open" and concluded by "close". Generally, the functional descriptions are arranged in chronological order proceeding from the top of FIG. 2 to the bottom. However, some functional features are permitted throughout the entirety of one of the three periods designated at the left side of FIG. 2. One such example is the "message" function which allows messages to be sent between users at one business organization 22 and branch offices 44 and others connected to the other business organization 30. Proceeding with a description of the transaction, the first set of communications allow for the reservation of the services. These can include requests for authorization or a rescind authorization request to be sent from the service provider to the service purchaser. Correspondingly, authorizations and authorization cancels can be sent from the services purchaser to the services provider. Confirmations are communicated upon confirmation of an authorized reservation request. Authorization changes may be made and communicated from the services purchaser to the service provider. Corresponding rental transaction changes may be communicated from the services provider to the services purchaser. As indicated, through the entirety of this process messages may be sent between users and others connected or having access to the integrated business software, as desired. The consummation of this portion of the transaction is a reservation that has been placed, authorized, confirmed, and provision is made for changes as necessary. During the next phase of the transaction, a reservation is opened and services intended to be provided are started. Generally, and preferably for the rental of vehicles, a start and end date are established in the reservation process. However, along the way, transactional changes may be made, such as for changing the type of vehicle provided, extensions may be requested and entered from either business partner, messages may be transmitted between the business partners, and the transaction may be terminated such as by voiding the contract by one business partner or terminating the authority by the other business partner. The term "reservation" has been used herein to refer not only to the act of placing the order but also to filling the order for services including providing the rental vehicle to the ultimate user and even invoicing for those services.

The last phase of the process involves closing the transaction. During this phase of the transaction, the contract is indicated as being closed and invoiced, the services purchaser can approve invoices, reject invoices, and also remit invoices. Such invoice remittance may also include the actual transfer of funds through an electronic funds transfer medium, or otherwise as previously arranged between the business partners.

It should be understood that this is a streamlined description of the handling of a transaction, and by no means is exhaustive. For example, much more functionality is available to the user including accessing the data base to generate production reports regarding status of open or closed reservations, preparing action item lists to allow a user to organize and prioritize his work, obtaining information available in the system from having been entered by others which would otherwise require phone conversations which are inefficient and occupy still another person's time. A more detailed explanation of the functionality provided is found in the exhibits.

In summary, the parent invention creates almost an illusion that the services purchaser, and the great number of users at various levels of the multi-tier purchaser users, are actually part of the services provider organization in that immediate online access is provided to significant data which enable the user to make reservations for services, monitor those services as they are being provided, communicate with those providing the services, obtain information relating to the status of services as they are being provided, and close transactions, all by interacting with the services provider business organization over that user's PC and without human interaction required by the business providers personnel. By way of contra-distinction, for many years business has been conducted on a human level by customers picking up the telephone and calling services providers and talking to their human counterparts in order to convey information, place orders, monitor orders, including obtaining information as to status, canceling orders, questioning invoices and paying invoices, along with a myriad of other related interactions. Not only did the conduct of business in this manner entail significant amounts of human resources at both ends of the transaction, but it also led to inefficiencies, mistakes and delays all of which increase the cost of doing business and contribute to an increased risk of services being rendered in an unsatisfactory manner in many instances to the end user. The parent invention has taken the preexisting solution of providing electronic communication between the business partners to another level by "web enabling" this system for improved connectivity, improved usability, reduced training, enhanced mobility, and other advantages as described herein.

Figure 3:
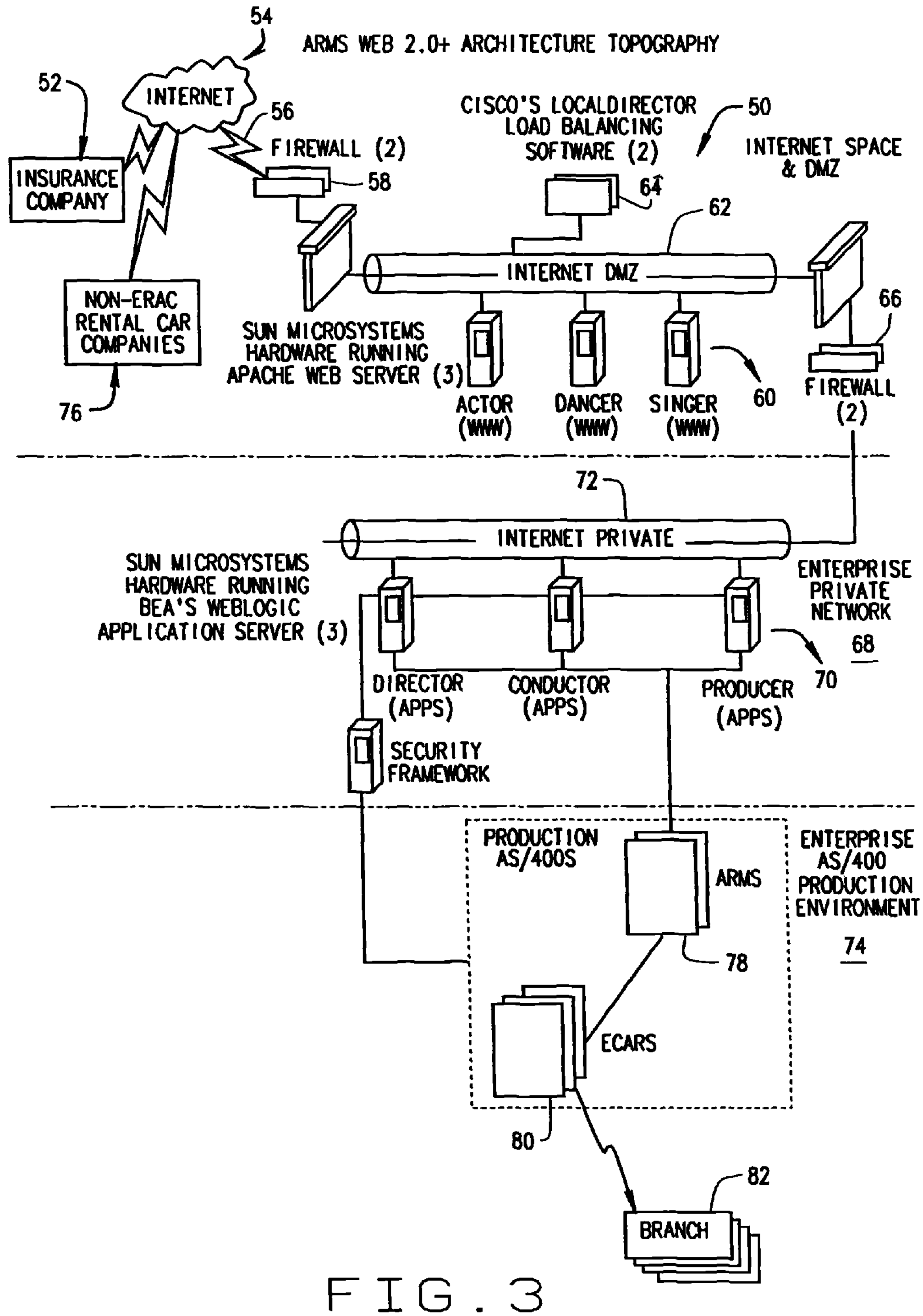
FIG. 3 is a schematic diagram of the computer systems comprising the present invention.

A schematic diagram of the present invention is shown in FIG. 3 and includes three levels of architecture. As shown in the first level of the architecture 50, a user 52 such as an insurance company or other user has access through the Internet 54 to the computer system comprising and incorporating the present invention. An Internet provider provides a link 56 through which Internet connections may be made to communicate with the further described system. For convenience, this Internet connection may be considered as an Internet site or portal in that a user enters a URL and arrives at this connection. A firewall 58 as is known in the art is used for security purposes and to prevent hackers and the like from unauthorized access to the system. A first set of servers 60 are interconnected in a network 62 and may preferably include an ancillary server 64 for running load balancing software or the like to balance the load and provide redundancy amongst what may be a plurality of web servers 60. These web servers 60 may preferably be Sun Microsystem servers running Apache web server software, or other such suitable software as would be well known to those of ordinary skill in the art. This first web server network of servers 60, 62 process the random and disorderly communications flowing to and from this system and the Internet before passing them through a firewall 66 as a further precautionary measure. This first layer of architecture, identified as the Internet space/DMZ layer provides a secure interface and creates order out of the chaos of communications flowing between the system and others, as will be described.

The next layer of architecture 68 is noted in the figure as the "Enterprise private network" and is comprised of a plurality of servers 70 network connected with a network connection 72. Again, although the choice of hardware is not considered critical by the inventors hereof, Sun Microsystem's server/work station hardware is preferably used to provide the platform for running the application software for processing the various rental vehicle transactions, as will now be explained. Attached hereto as Exhibit E are a series of functional design specifications for the ARMS/WEB application software resident on servers 70 and which provide the detailed description of the operational features of the software and system. With these functional design specifications for the individual modules, it would be readily apparent to those of ordinary skill in the art that programmers of ordinary skill would be able to write software to execute these functional specifications without using inventive effort. Furthermore, the details of this implementation are not considered to provide any aspect of the best mode for carrying out the invention which is defined by the claims below.

Generally, the ARMS/WEB application software permits a user to sign on and, when recognized, provides the series of menus presenting choices for the user to indicate the parameters for his reservation. A plethora of information is provided and accessible to the user through the various menus provided from which the user selects and enters data to process the reservation. An important feature of the ARMS/WEB application software is that it provides the user the opportunity to select to place his vehicle rental reservation not only with the integrated business computer system represented by the third level of architecture 74, described below, but also to route the reservation information back through the first architectural level 50 and into the Internet 54 for transmission to a competitive service provider 76. Although the interconnection is depicted in FIG. 3 as being made through the Internet 54, the network of servers 70 configured in accordance with the ARMS/WEB application software may utilize virtually any electronic means for transmitting the reservation information to a competitive services provider 76. These include email, automated telephone, facsimile, and other forms of electronic communication. Of course, the competitive services provider 76 may itself comprise an integrated business such that the level of interconnectivity provided to the user 52 may parallel that disclosed and described in connection with the integrated services provider system of the present invention as well as the parent invention. This integrated business capability is represented as the third level 74 of the architectural topography shown in FIG. 3 which parallels portions of that shown in FIG. 1 in that a pair of network mainframe computers, such as AS/400's 78, 80 may process reservations to and from various branch offices 82 which are geographically diverse.

With the present invention, the Internet portal provided by the AMRS/WEB network configured servers 70 provide an Internet portal for communication with not only the integrated computer enabled business system of the resident services provider, but also a portal for placing reservations to other competitive services provider 76. Thus, the user 52 enjoys the capability of accessing multiple service providers for competitive services through a single Internet connection using a single set of protocols, menus, etc. for the conduct of this business activity. Furthermore, the software configured network of servers 70 is readily configured in Web Logic to adapt to changing user requirements, data requirements, unique competitive service provider requirements, and other upgrades or modifications in a convenient manner by simply modifying the software resident therein. No special browser software of other interface software is required by the user and any special interconnecting software or server/hardware requirements may be satisfied as between the service providers such that the user is presented with a seamless interconnection. As the present invention is configured and works well with the integrated business and computer systems as disclosed herein, it is anticipated that such interconnection and usability may be readily translated to any other such integrated computer system as might be found in other competitive service providers, as would be apparent to those of ordinary skill in the art. Thus, with the present invention, a user is provided with Internet access through a single portal to a plurality of service providers and, to the extent possible, to their integrated computer business systems.

Various changes and modifications to the preferred embodiment as explained herein would be envisioned by those of skill in the art. Examples of these changes and modifications include the utilization of computer systems configured in any one of a myriad of ways using present technology alone. For example, mobile computers are presently available and wireless technology could be used to extend the integrated business network of the services provider, as well as match the mobility needed by the various users connected to and using the present invention. The particular software, and various aspects and features of its design, have been adapted for particular application to the vehicle rental business. Of course, computer software applications satisfying other business needs would necessarily require adaptation to their particular business models. Thus, it is envisioned by the inventors herein that the various software programs described herein would be matched to the particular business application to which the invention is utilized. These and other aspects of the preferred embodiment should not be viewed as limiting and instead be considered merely as illustrative of an example of the practical implementation of the present invention. These changes and modifications should be considered as part of the invention and the invention should be considered as limited only by the scope of the claims appended hereto and their legal equivalents.

Exhibit A

See the file "Exhibit A.txt" submitted on the incorporated compact disc.

Exhibit B

Figure 4:
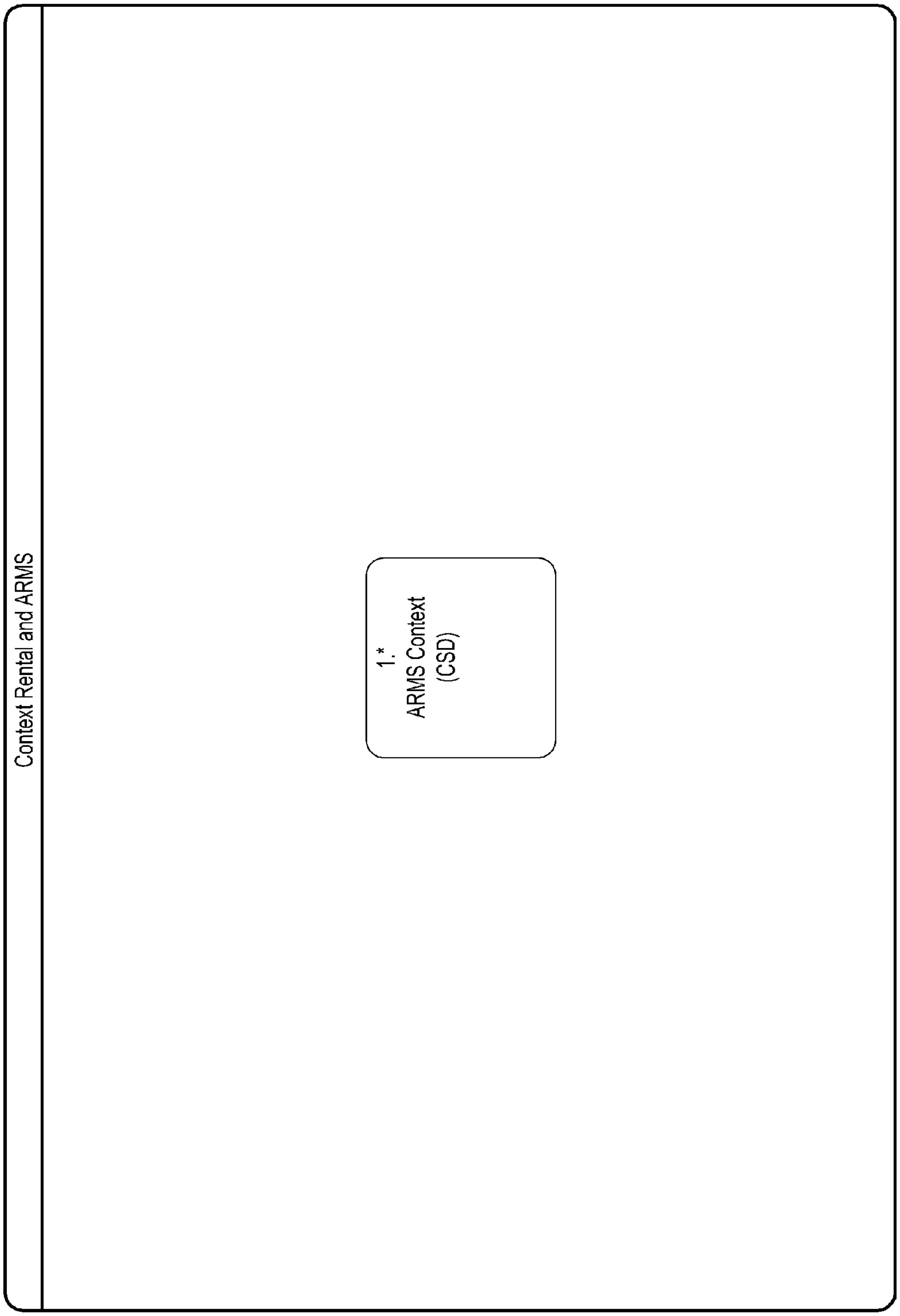
FIGS. 4-91 are flow diagrams for software resident on the mainframe AS/400 computer 32 as described in Exhibits B and C.
Figure 5:
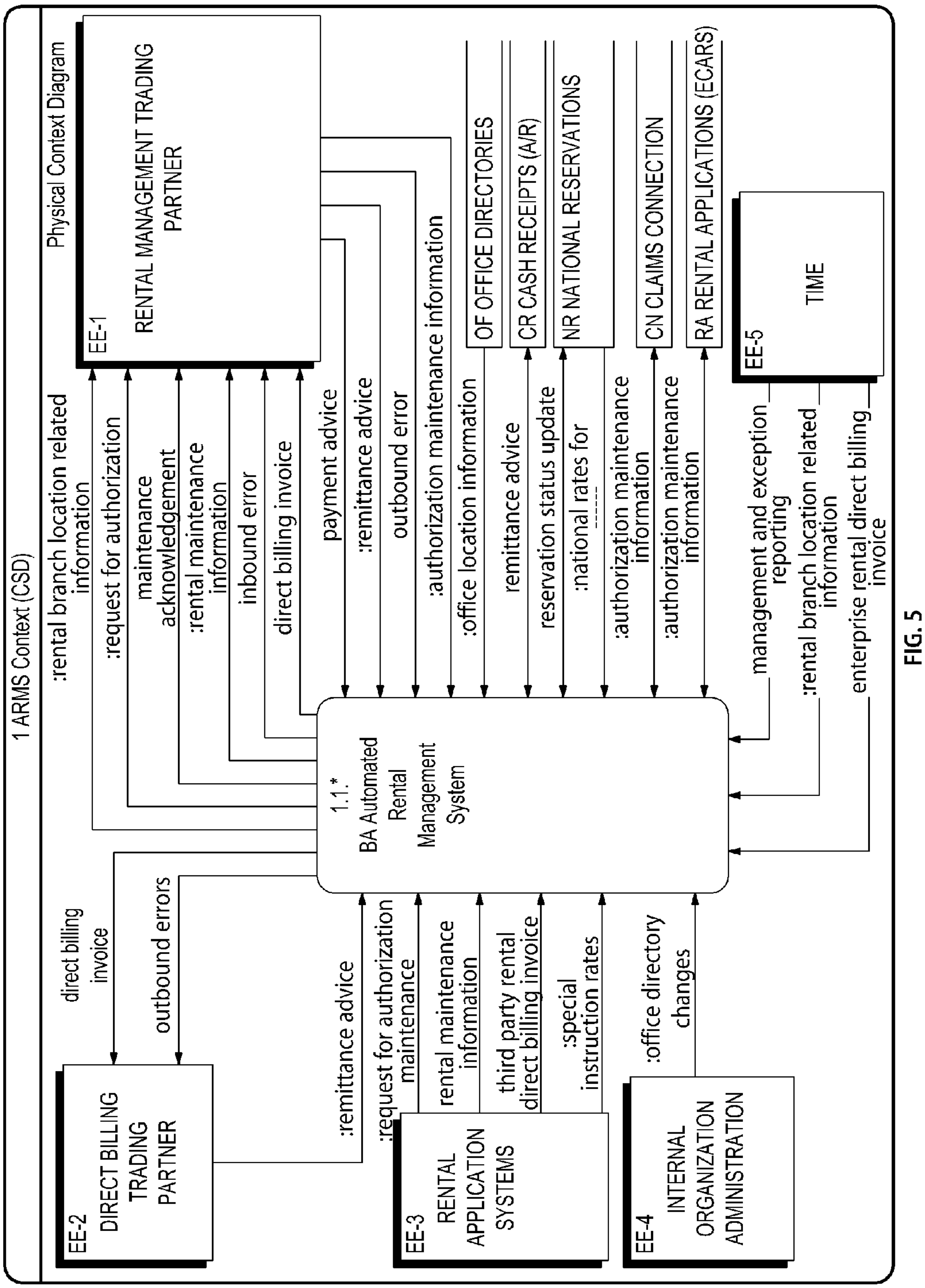
Figure 6:
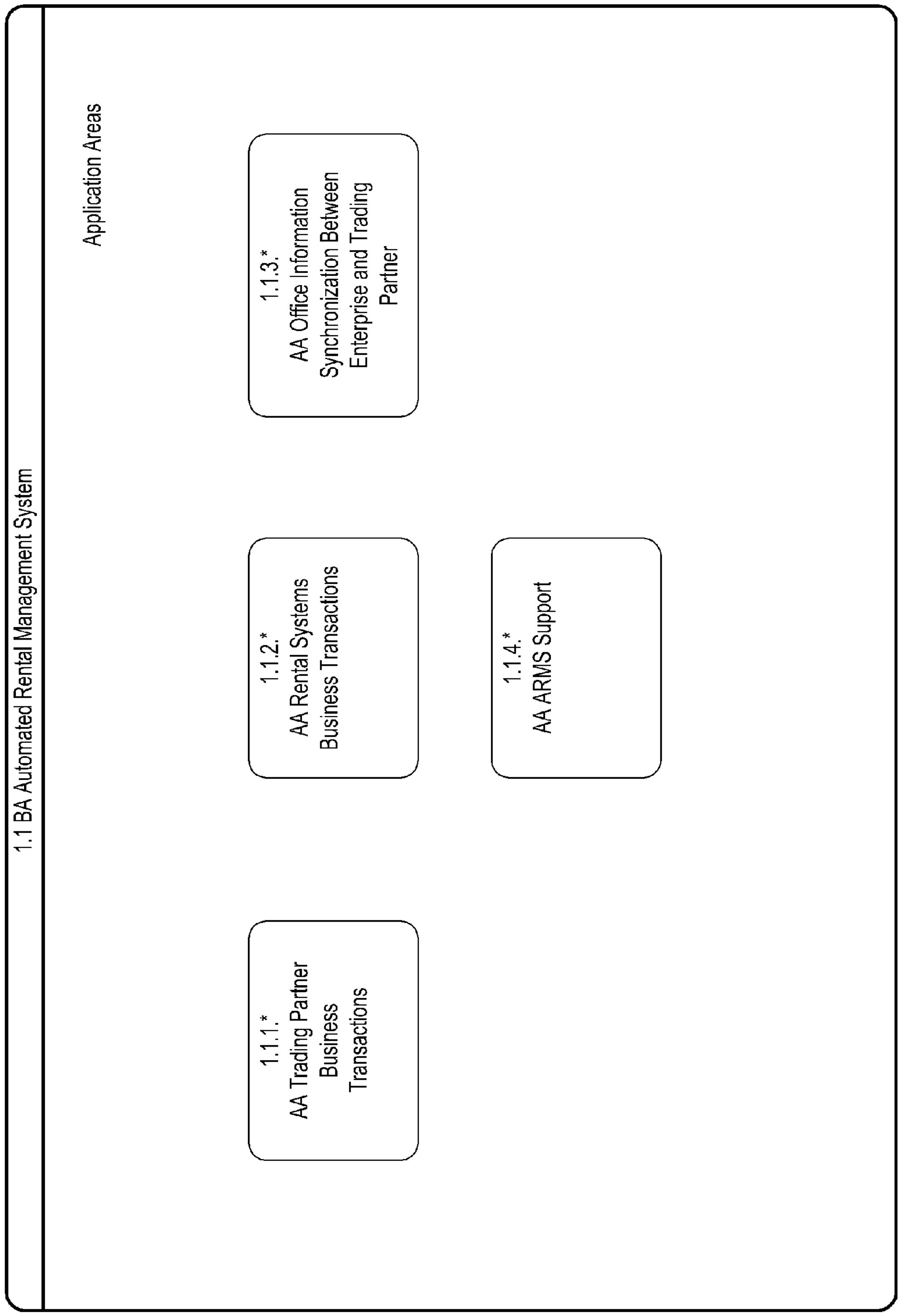
Figure 7:
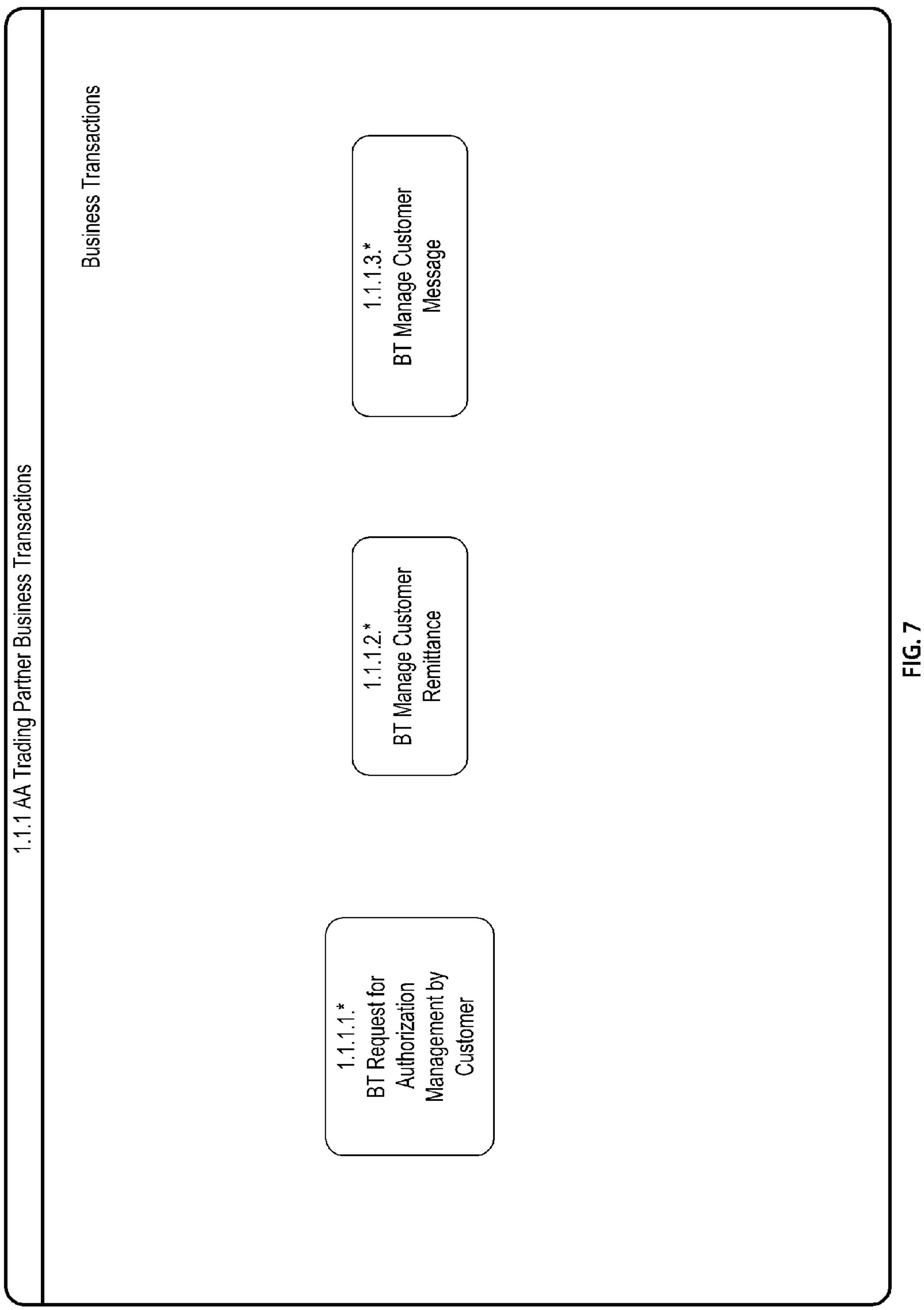
Figure 8:
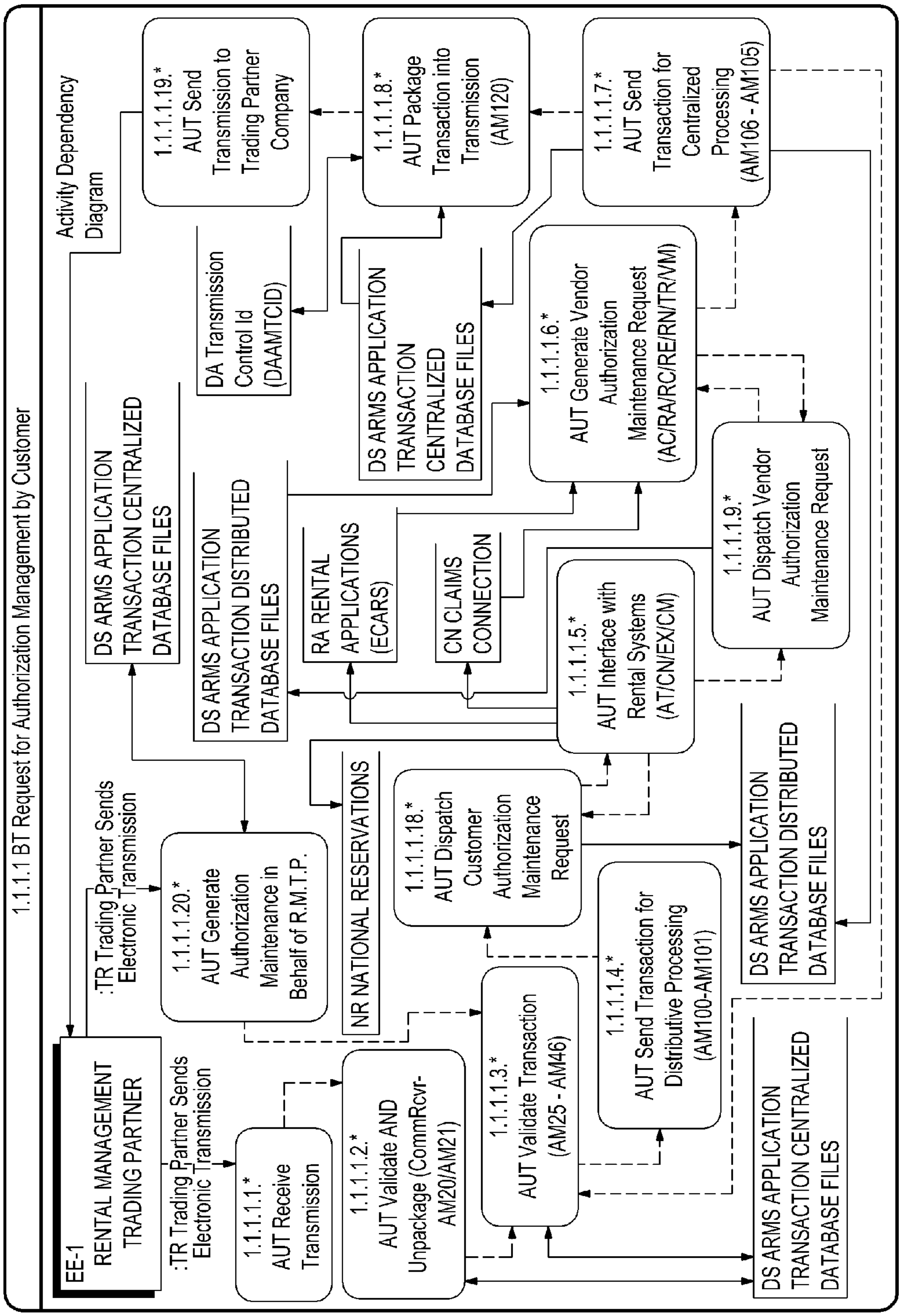
Figure 9:
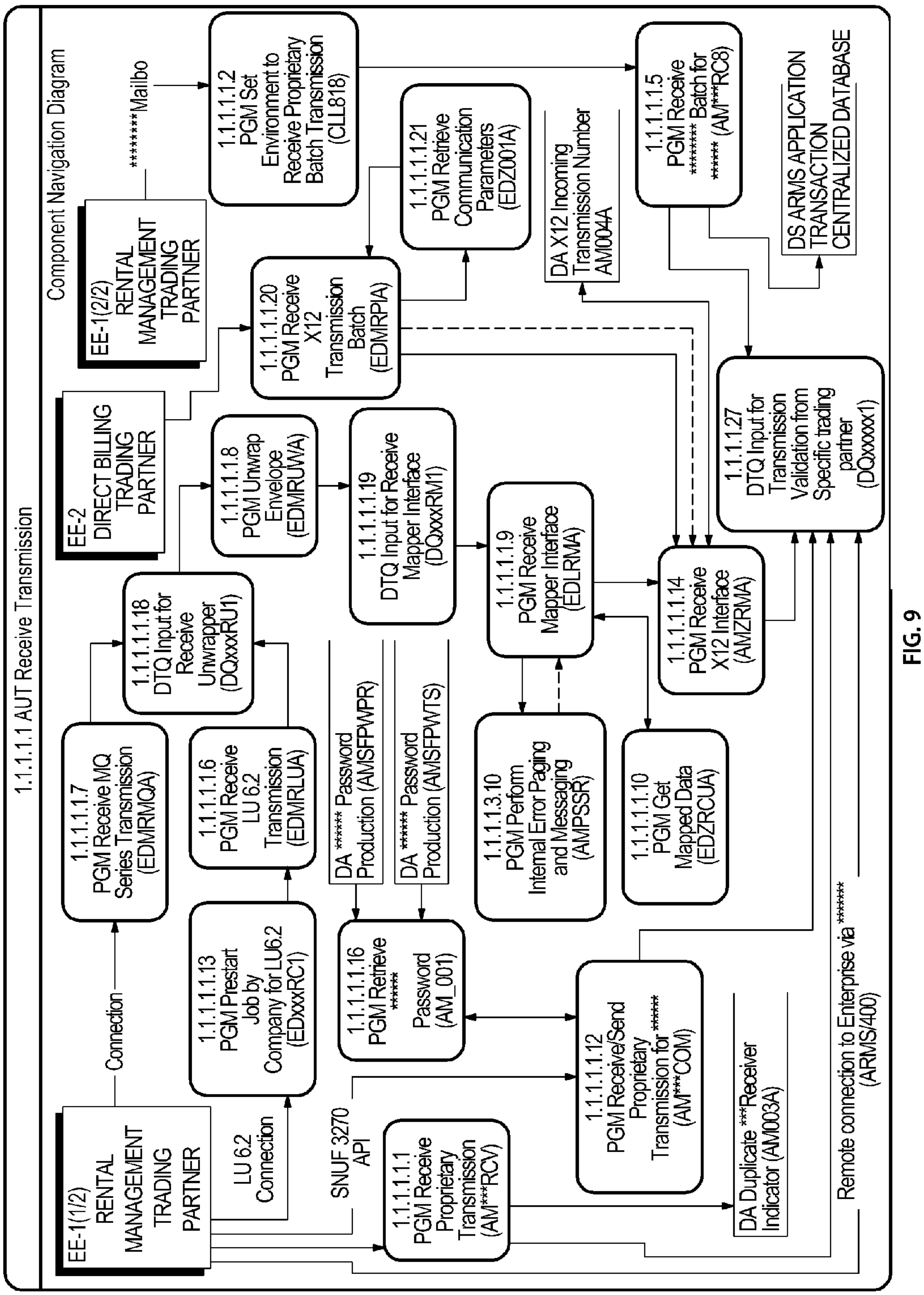
Figure 10:
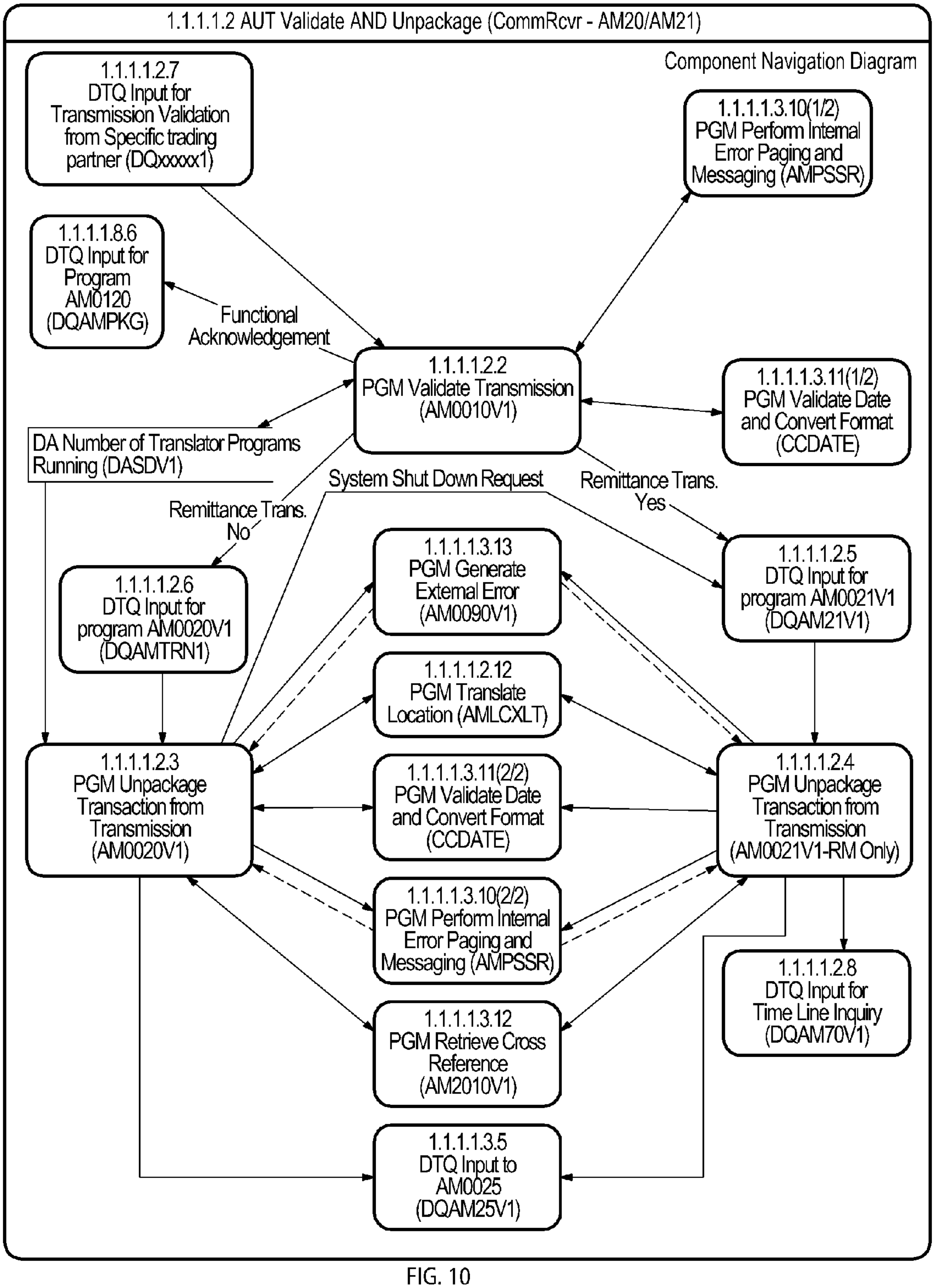
Figure 12:
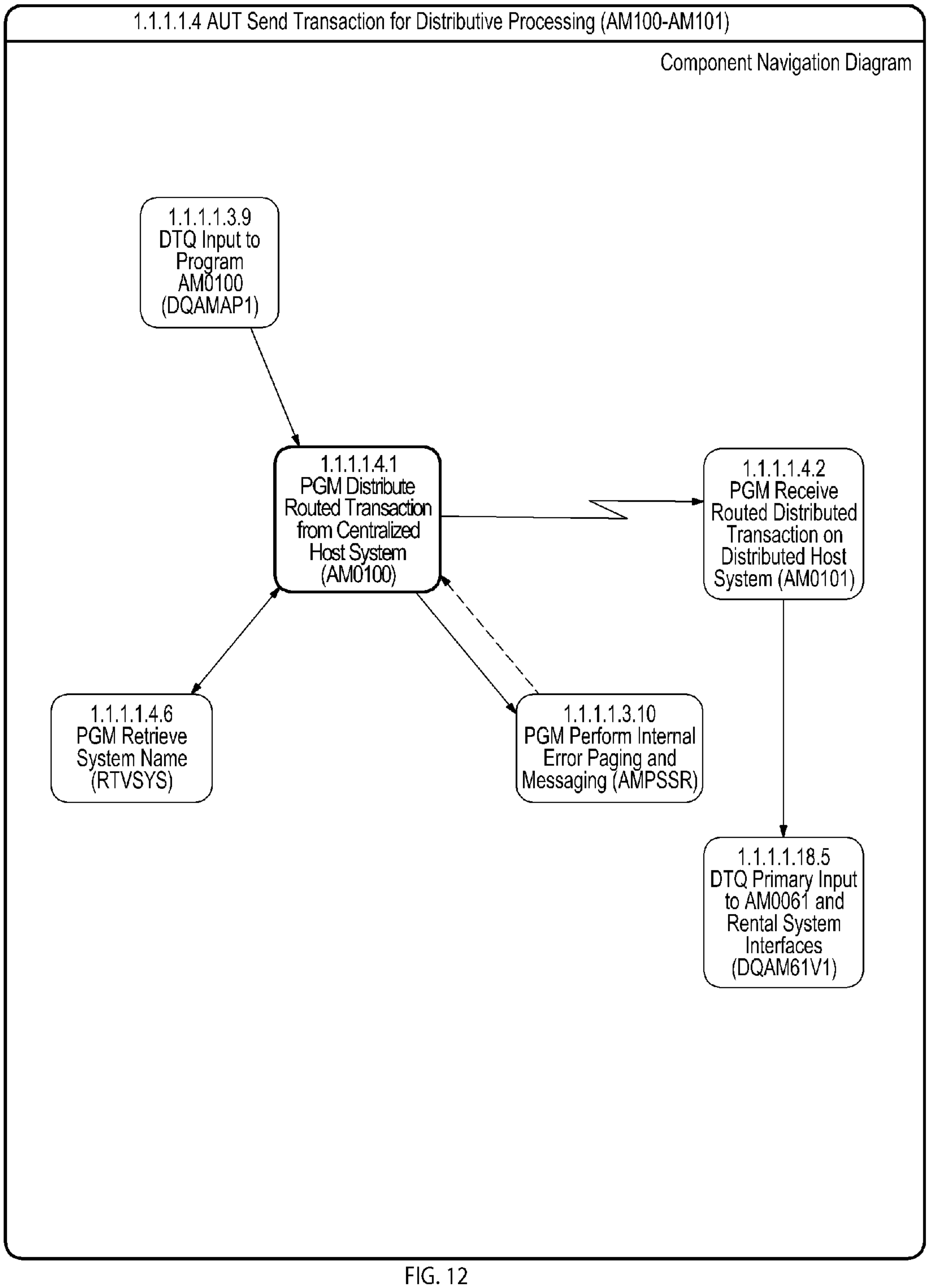
Figure 13:
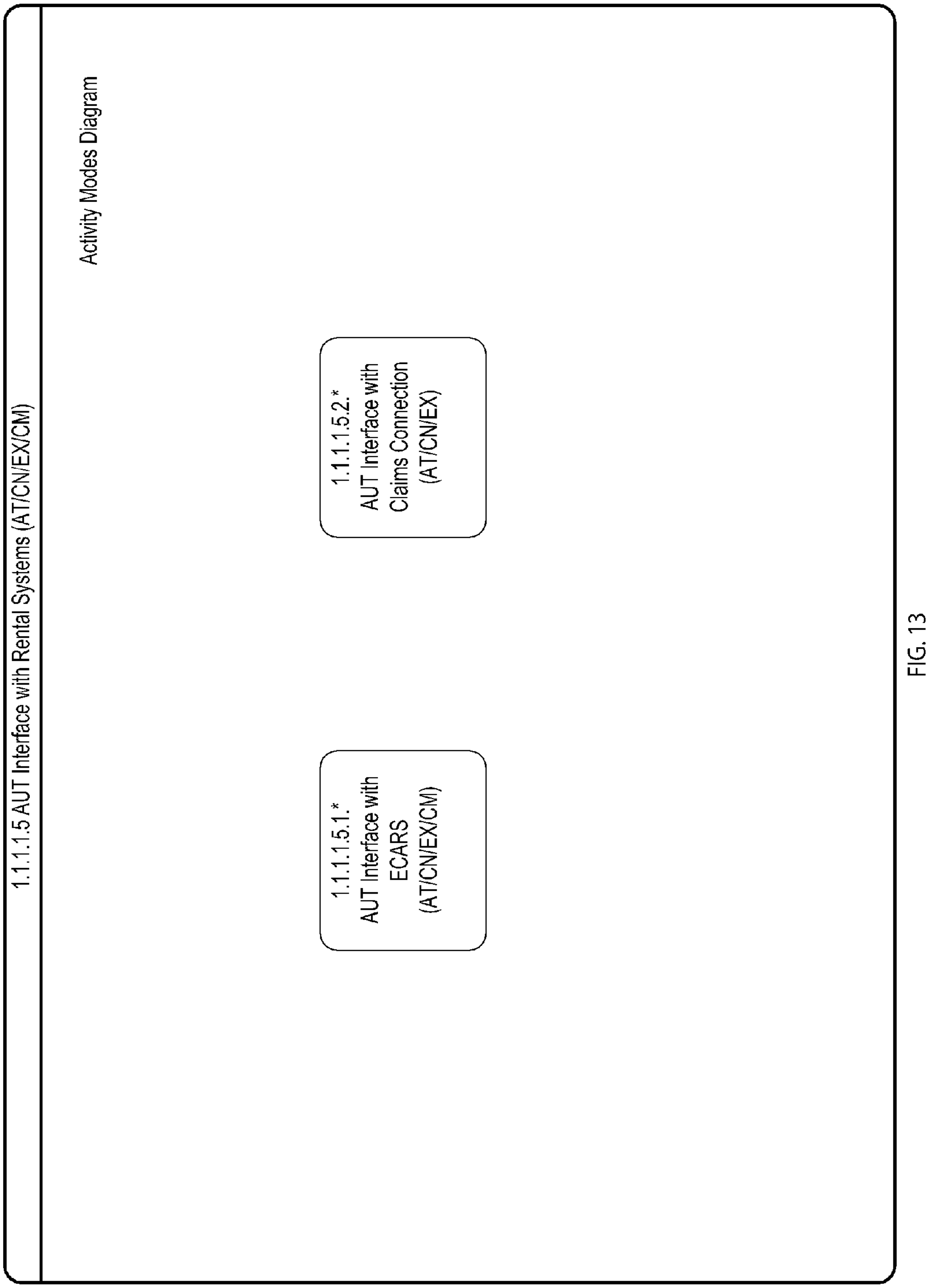
Figure 14A:
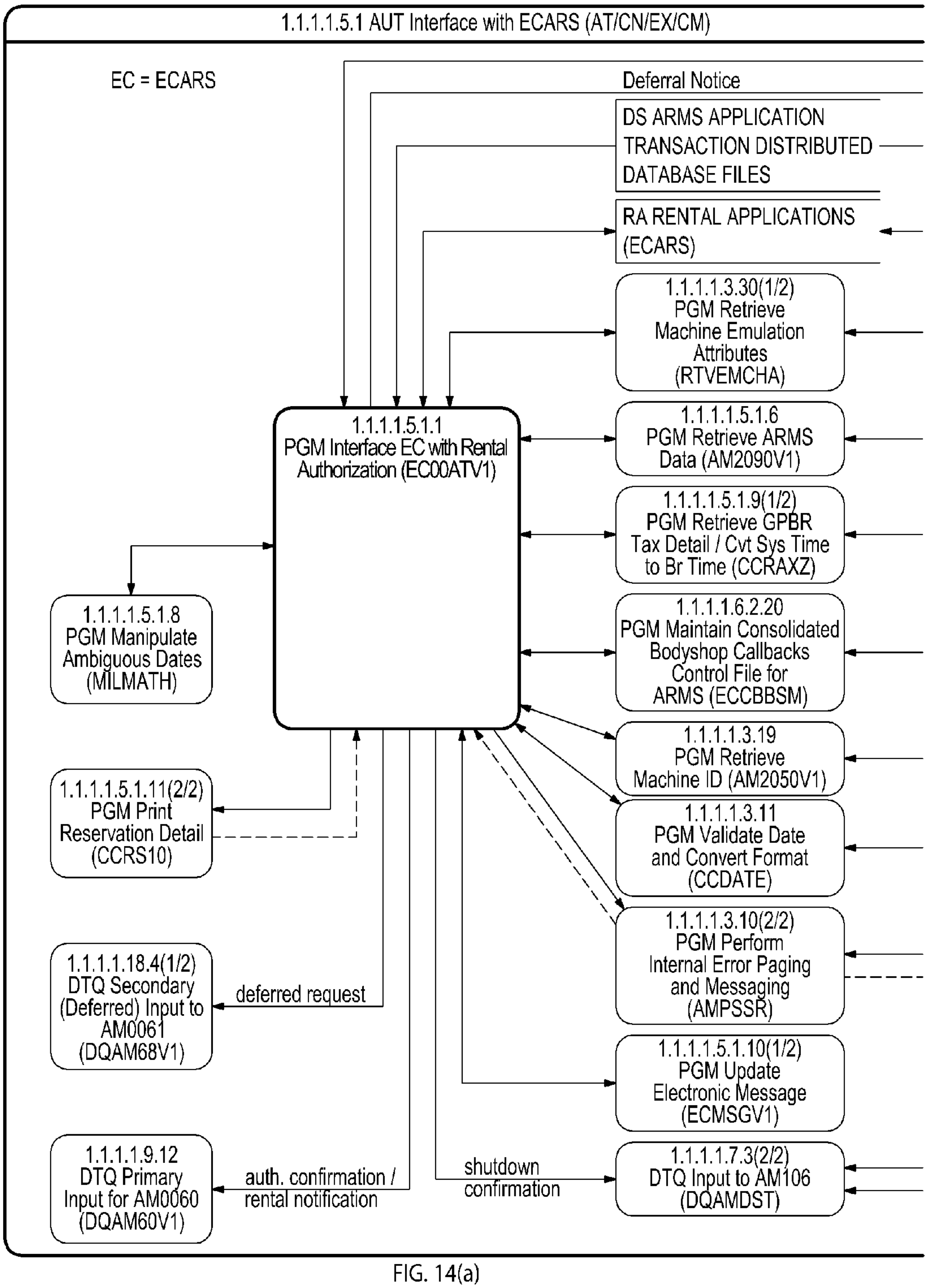
Figure 14B:
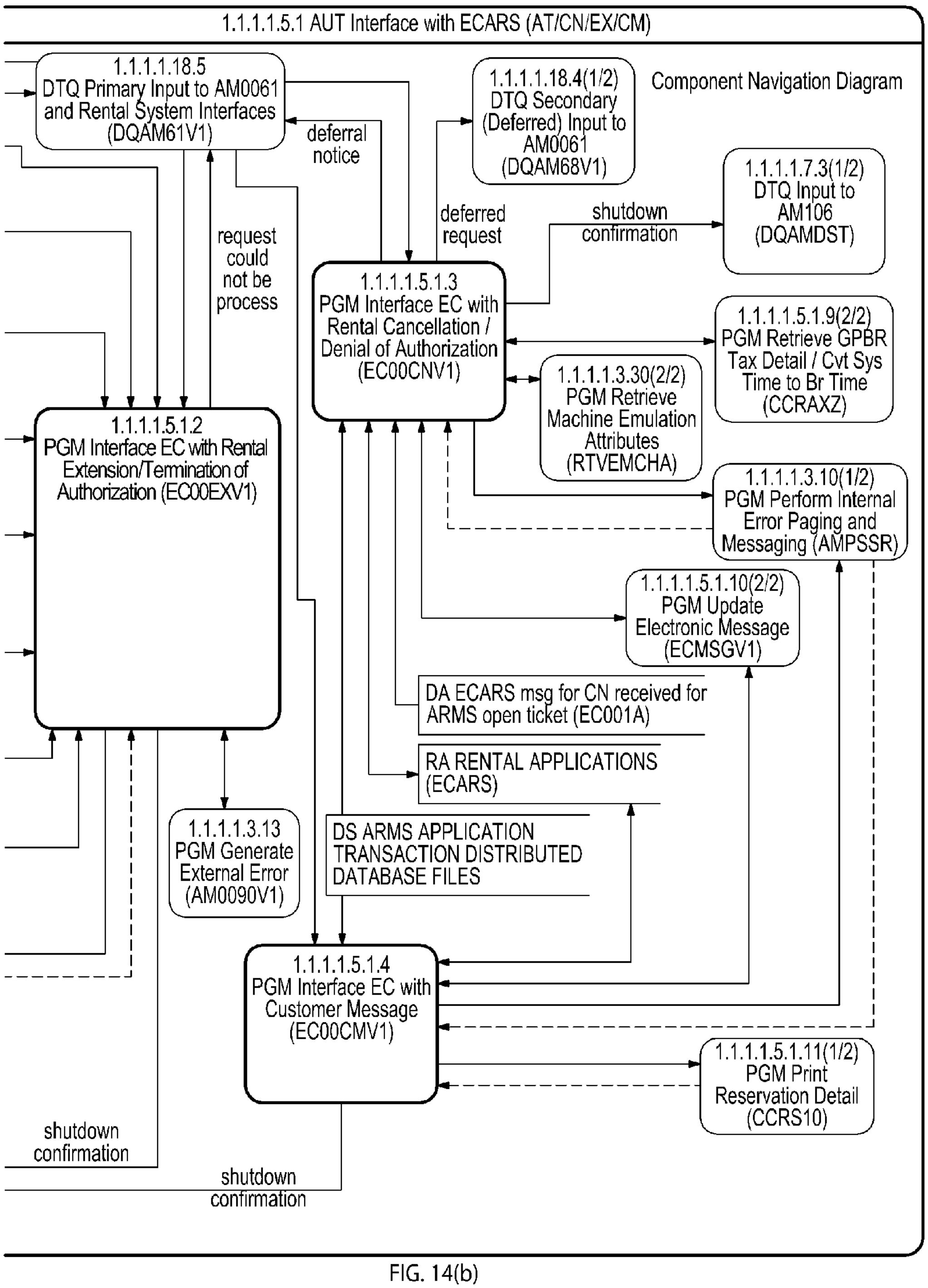
Figure 15:
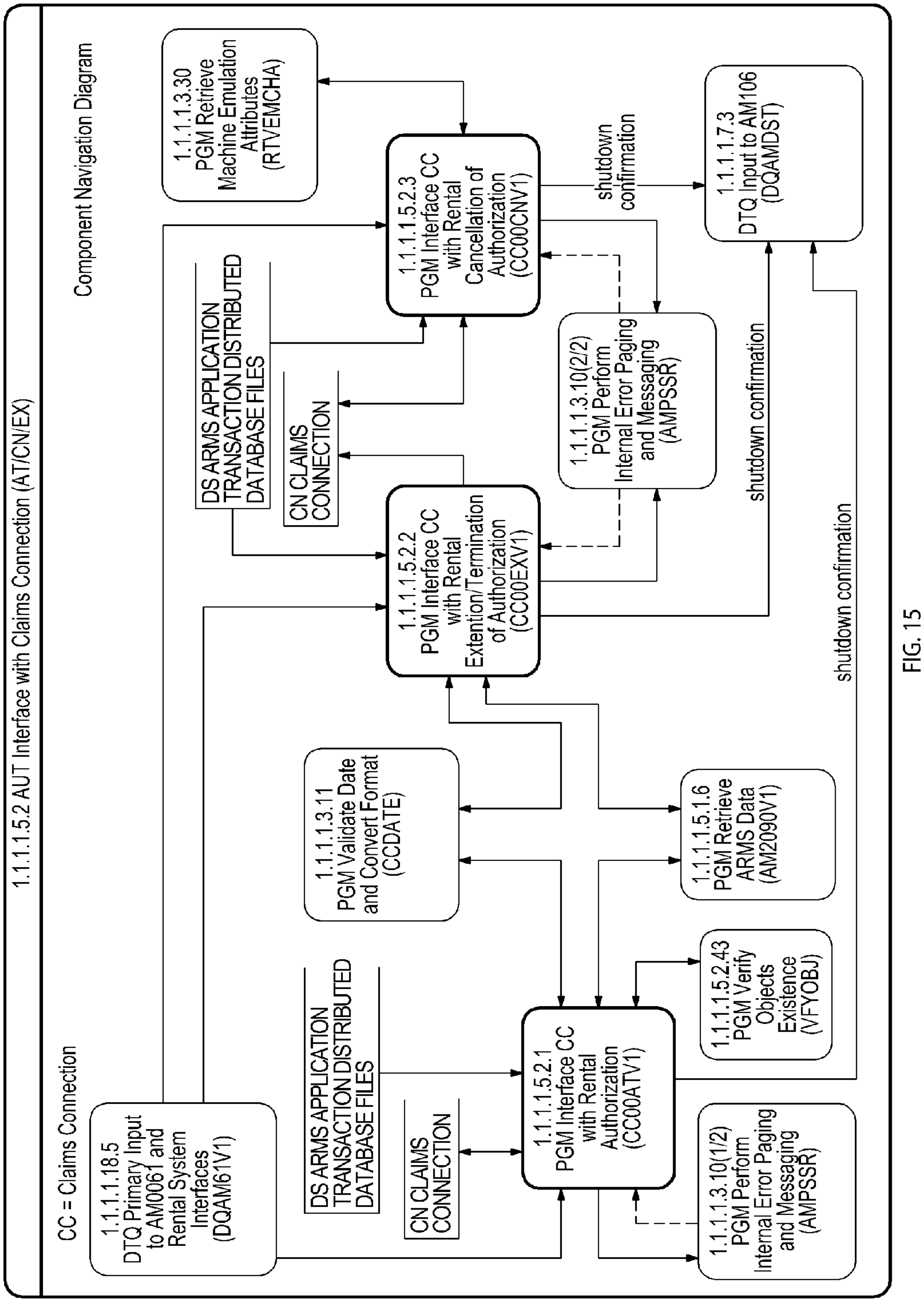
Figure 16:
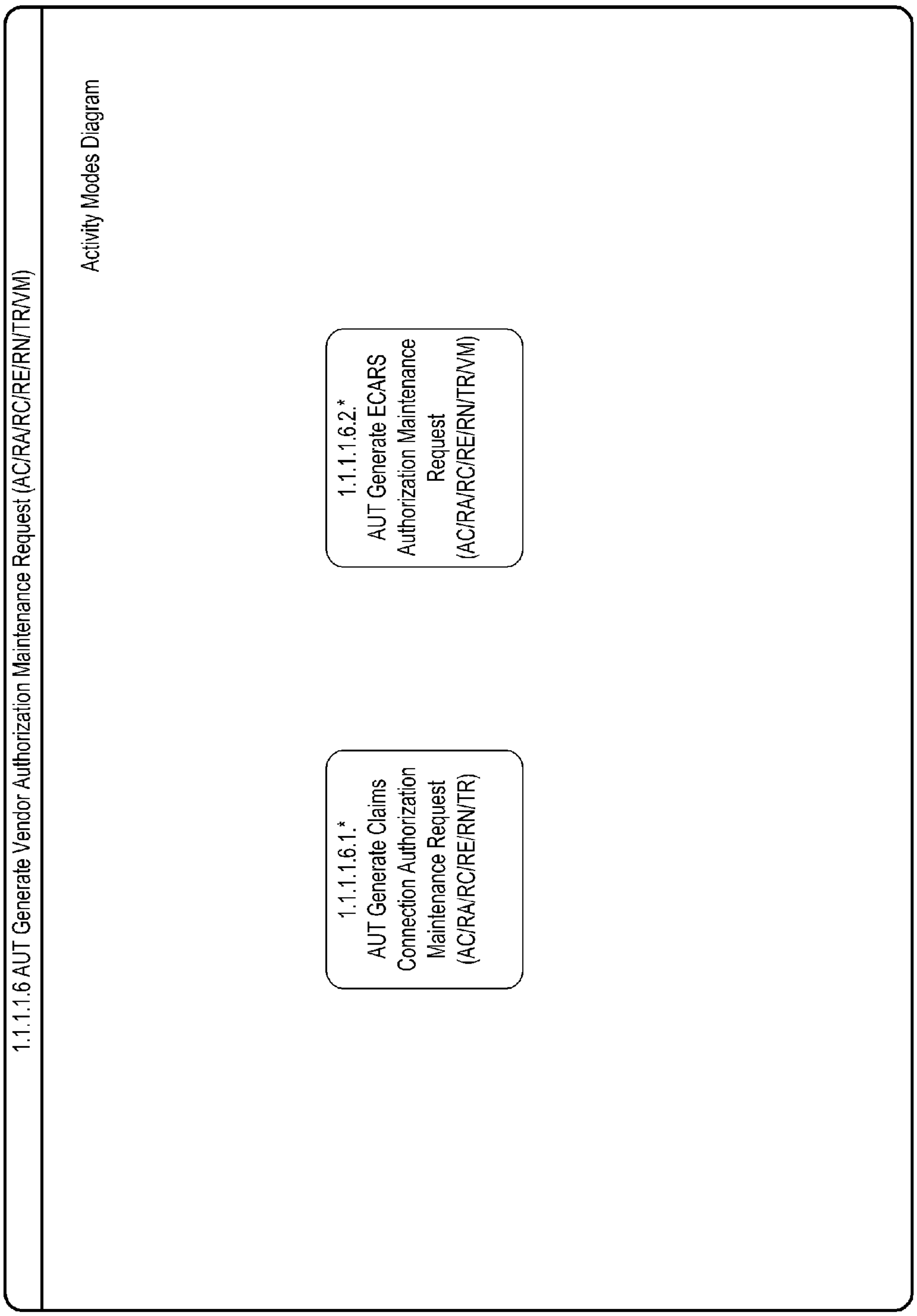
Figure 17:
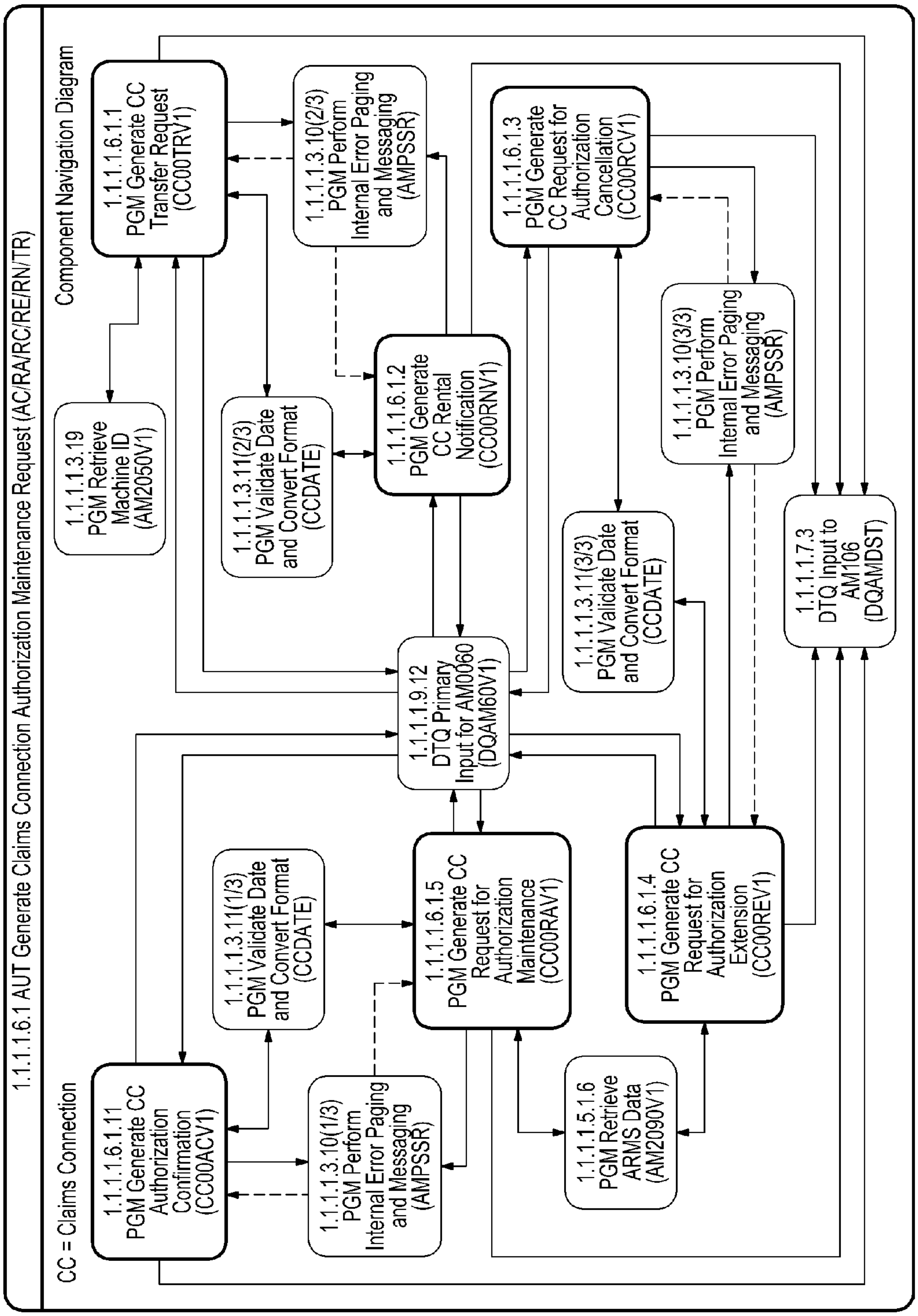
Figure 18A:
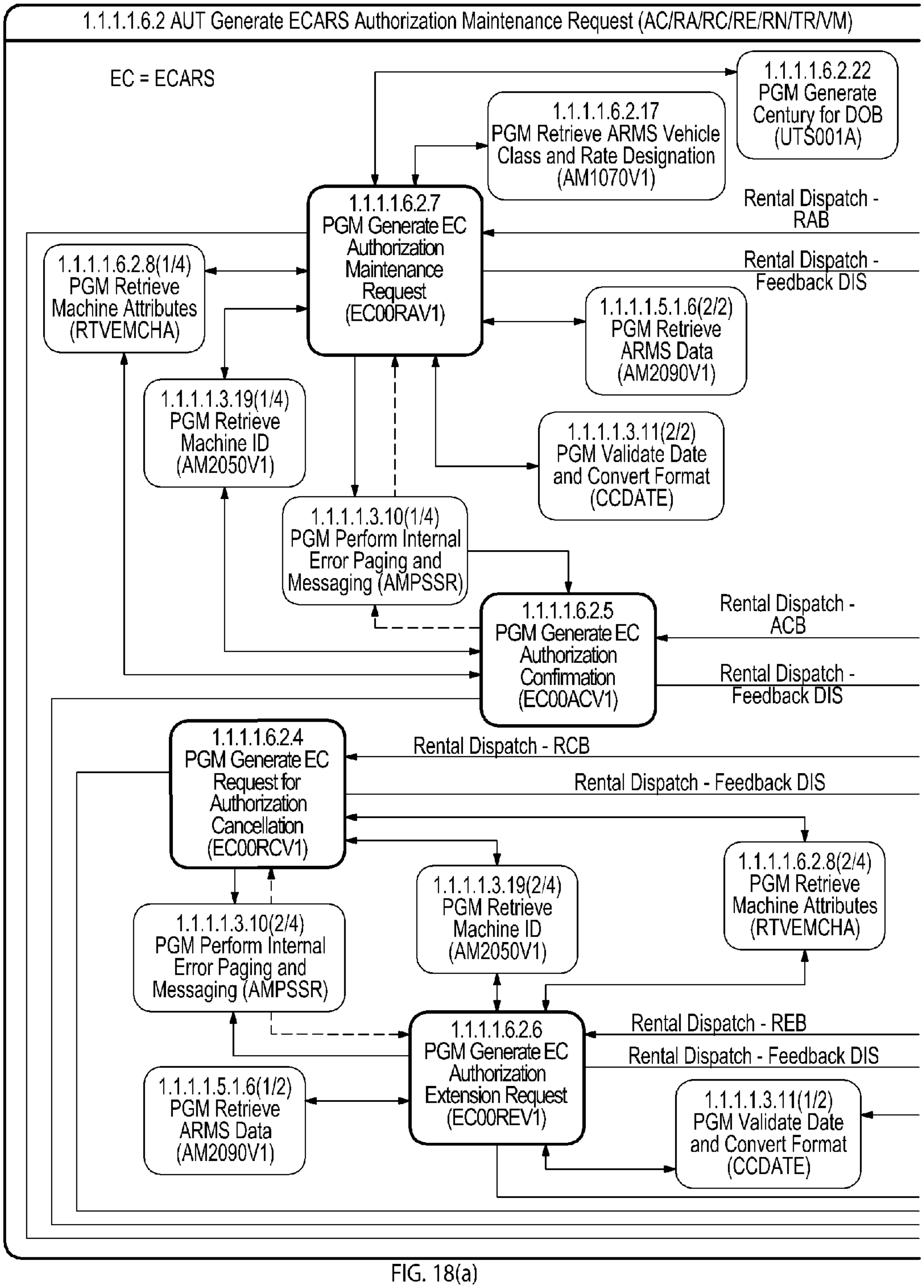
Figure 18B:
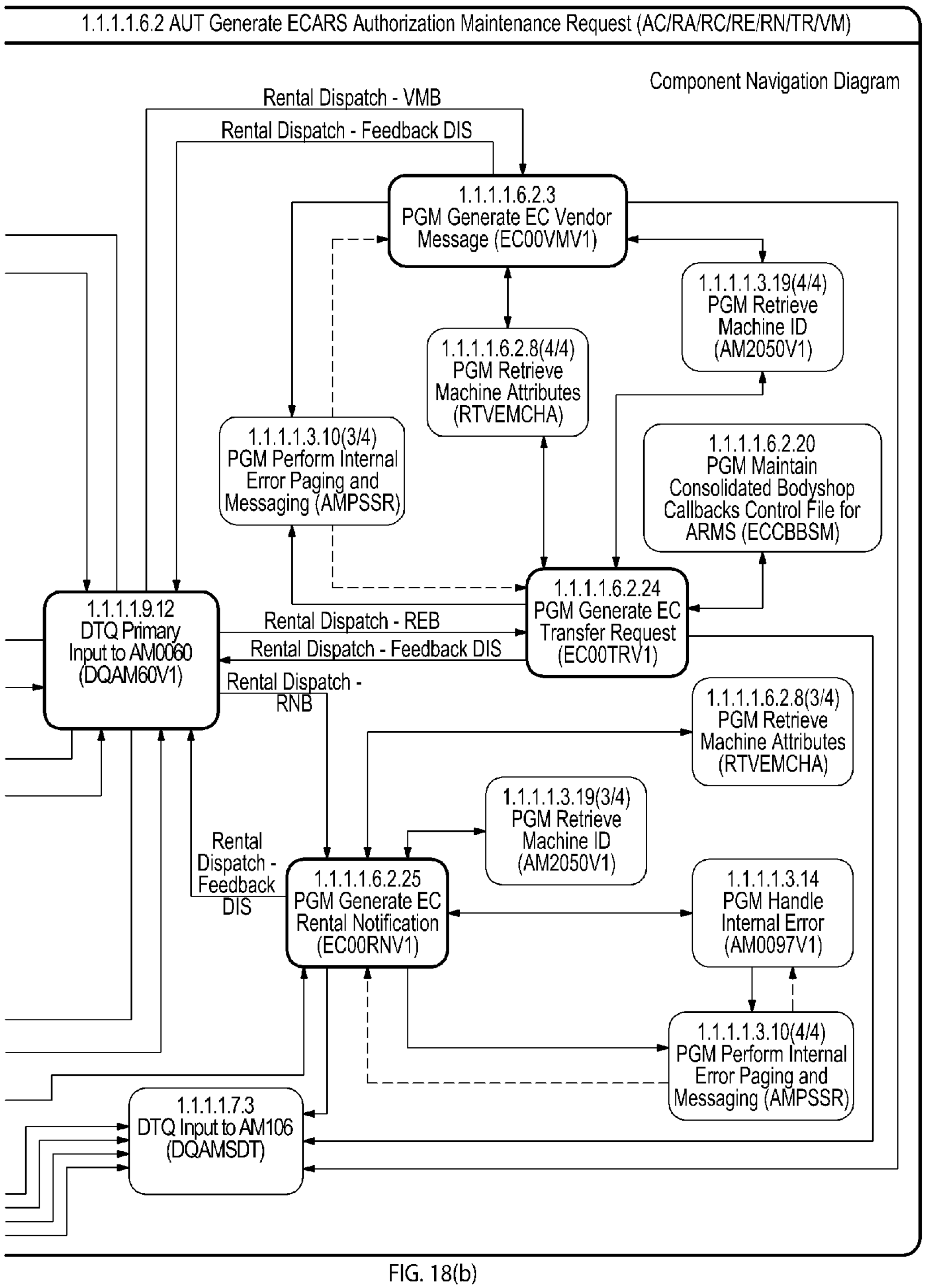
Figure 19:
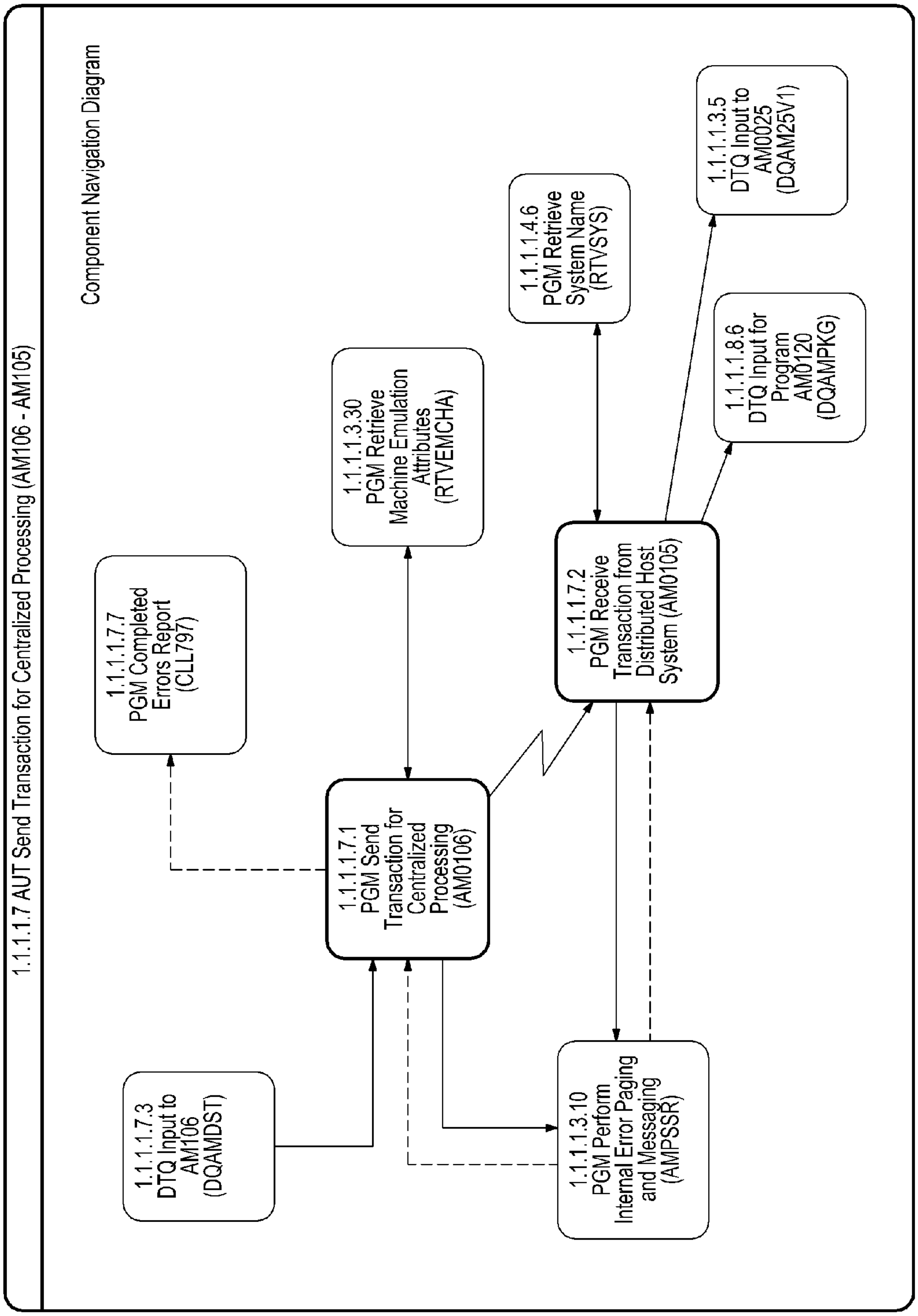
Figure 20:
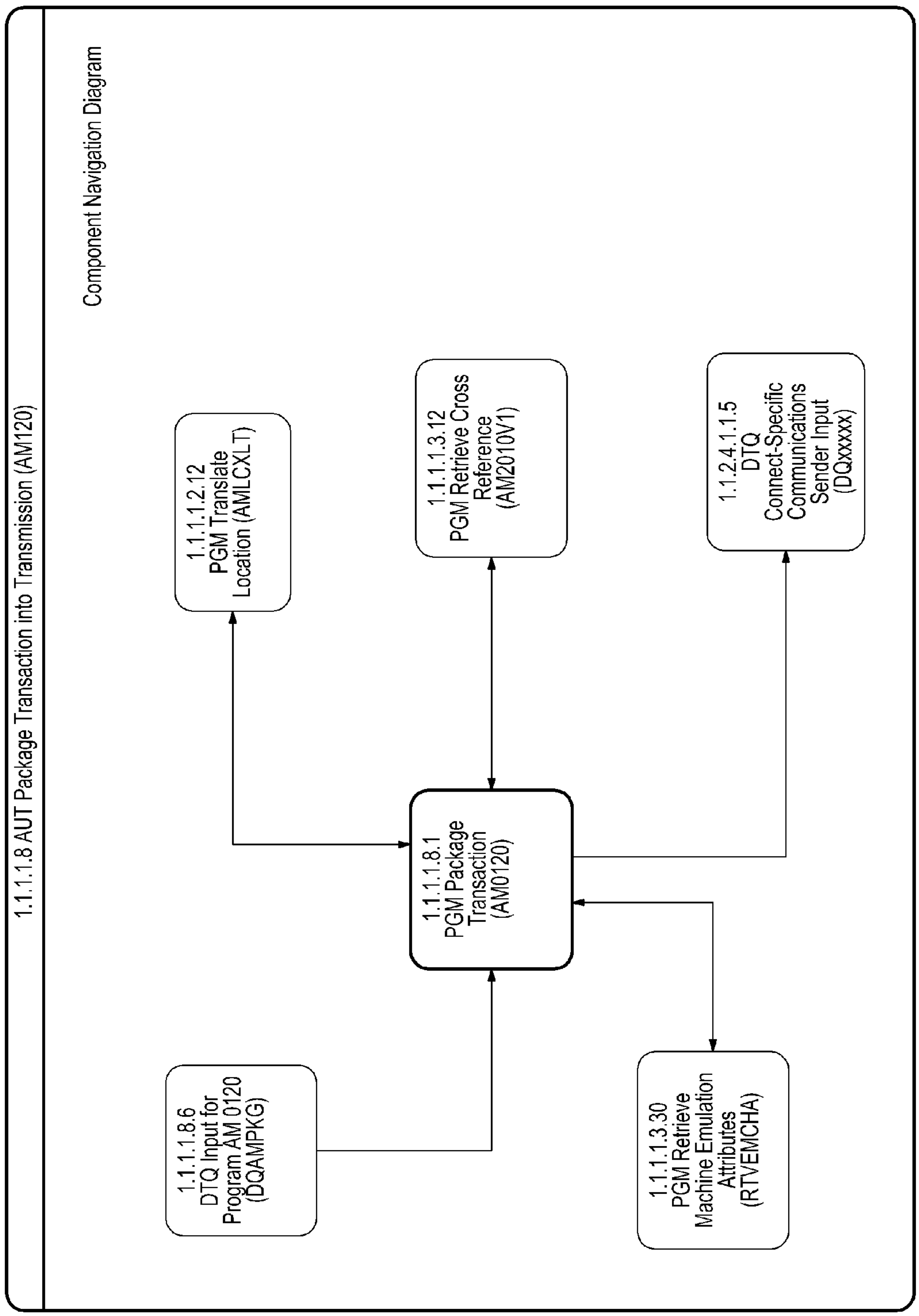
Figure 21:
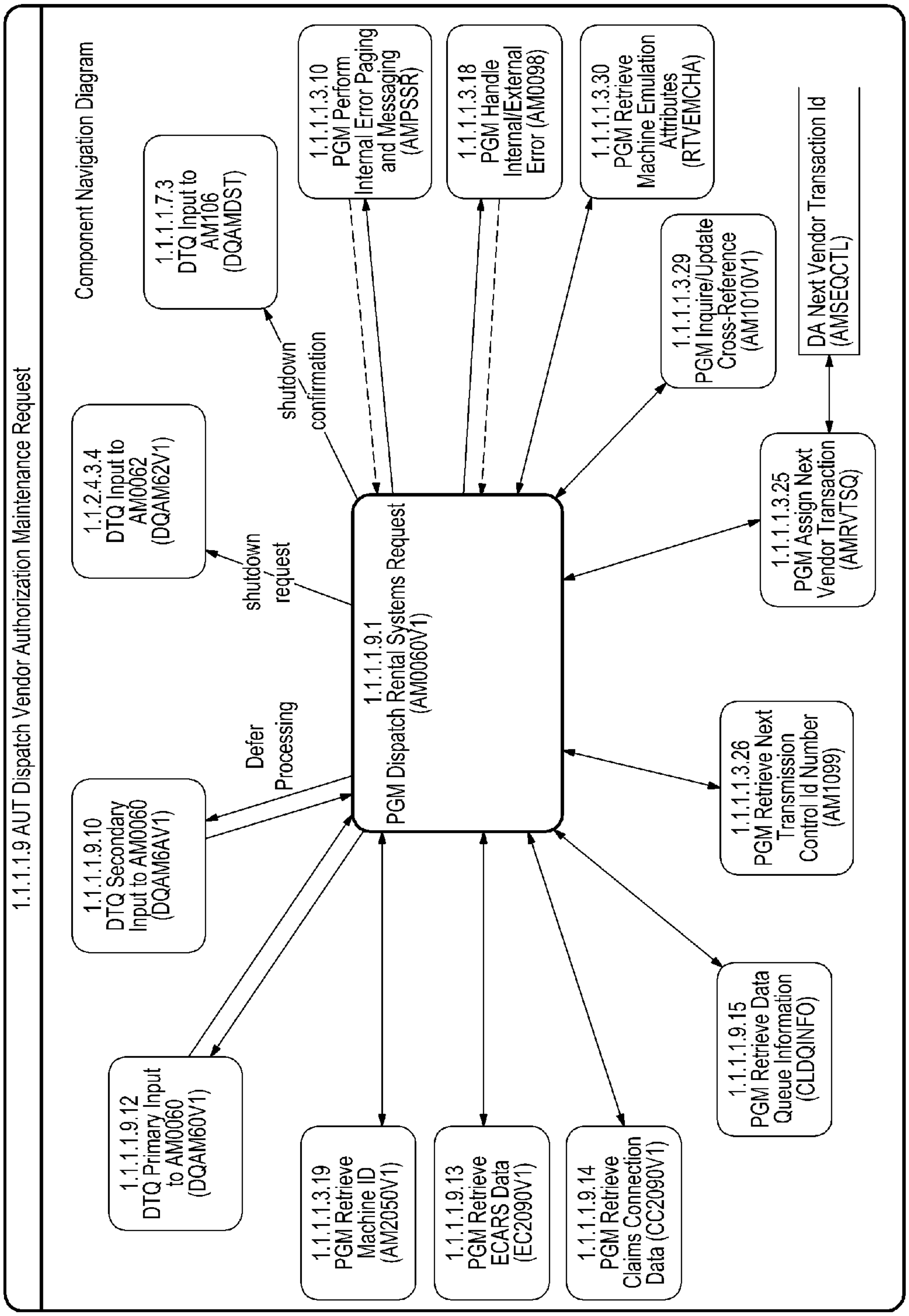
Figure 22:
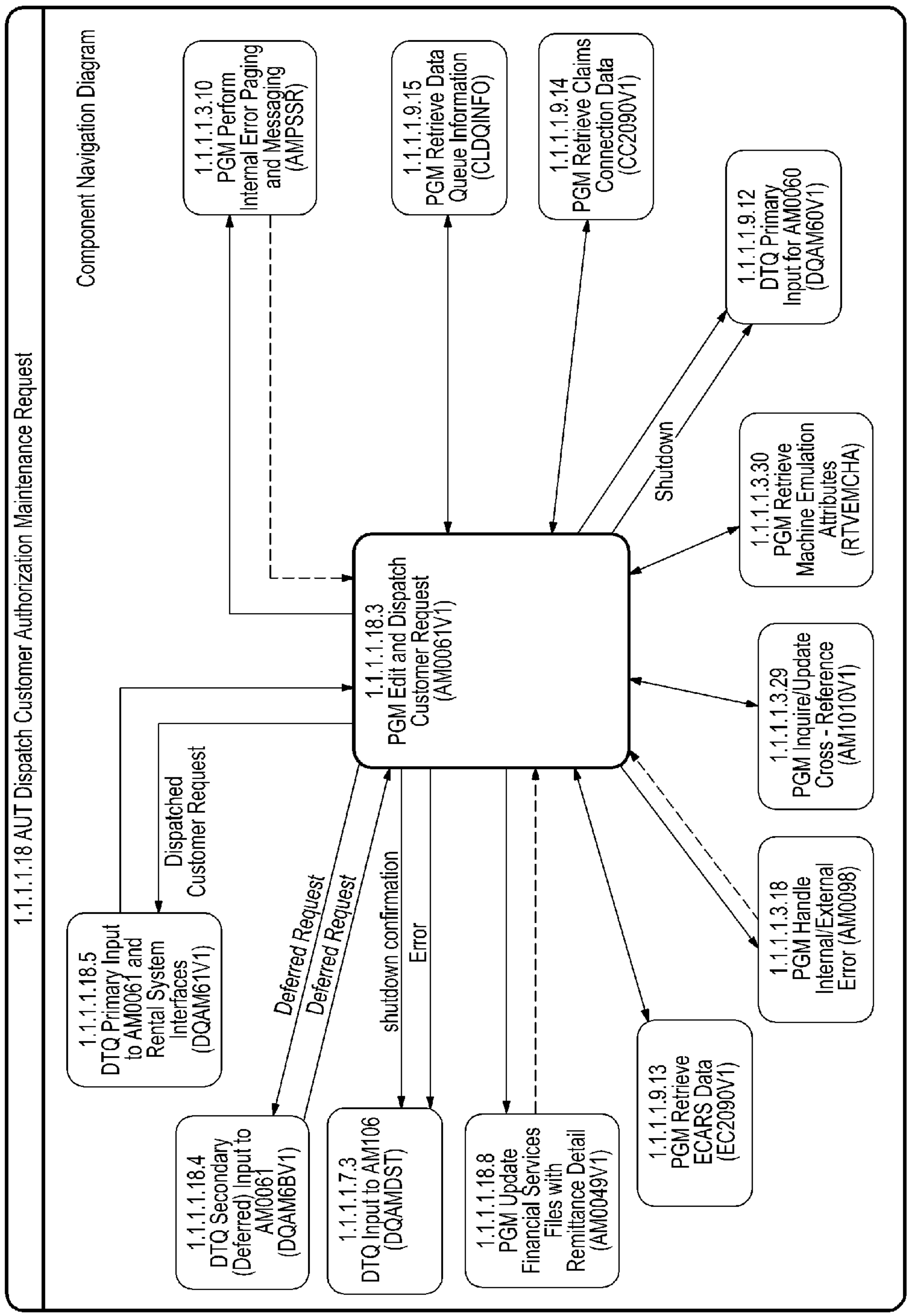
Figure 23:
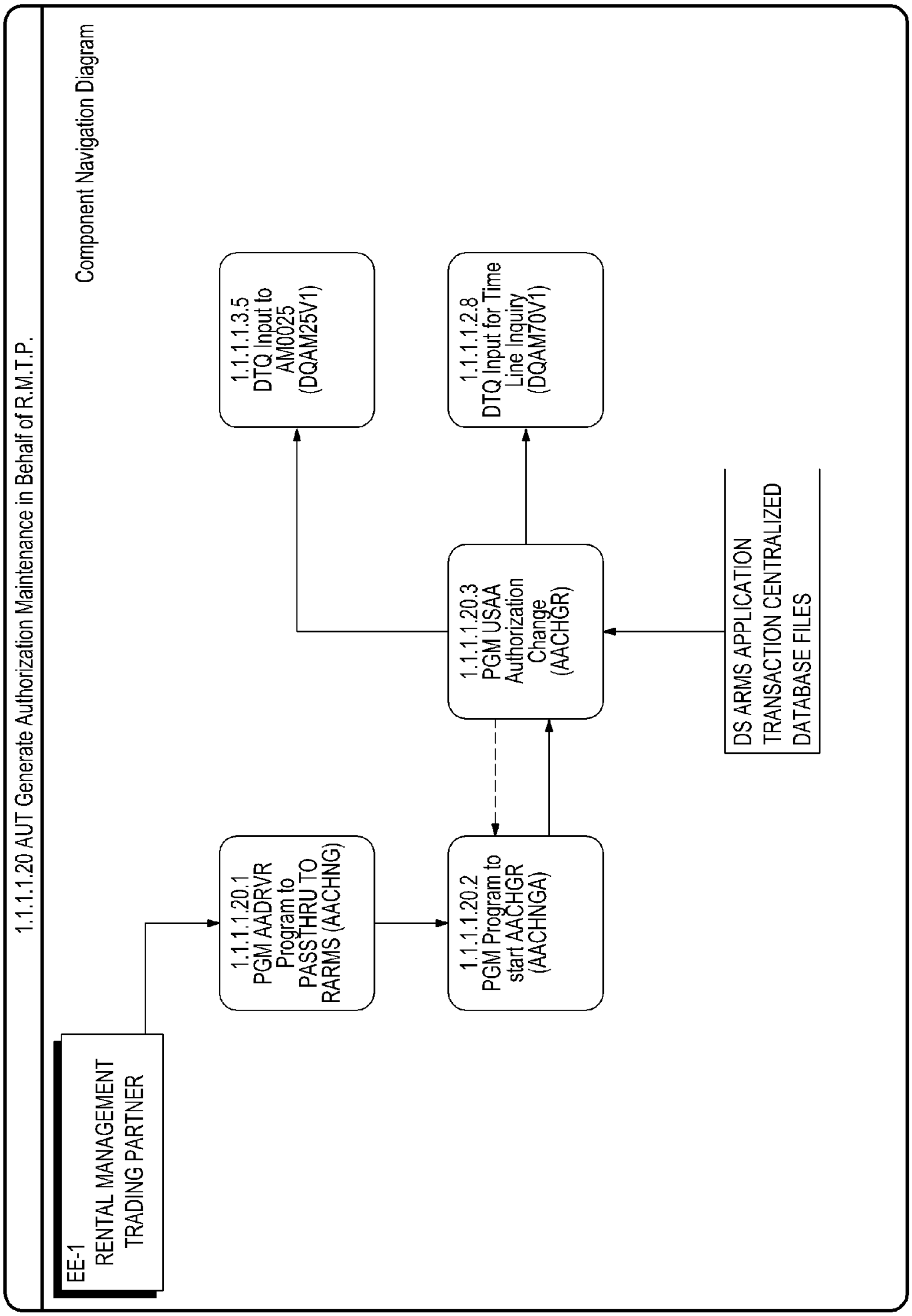
Figure 24:
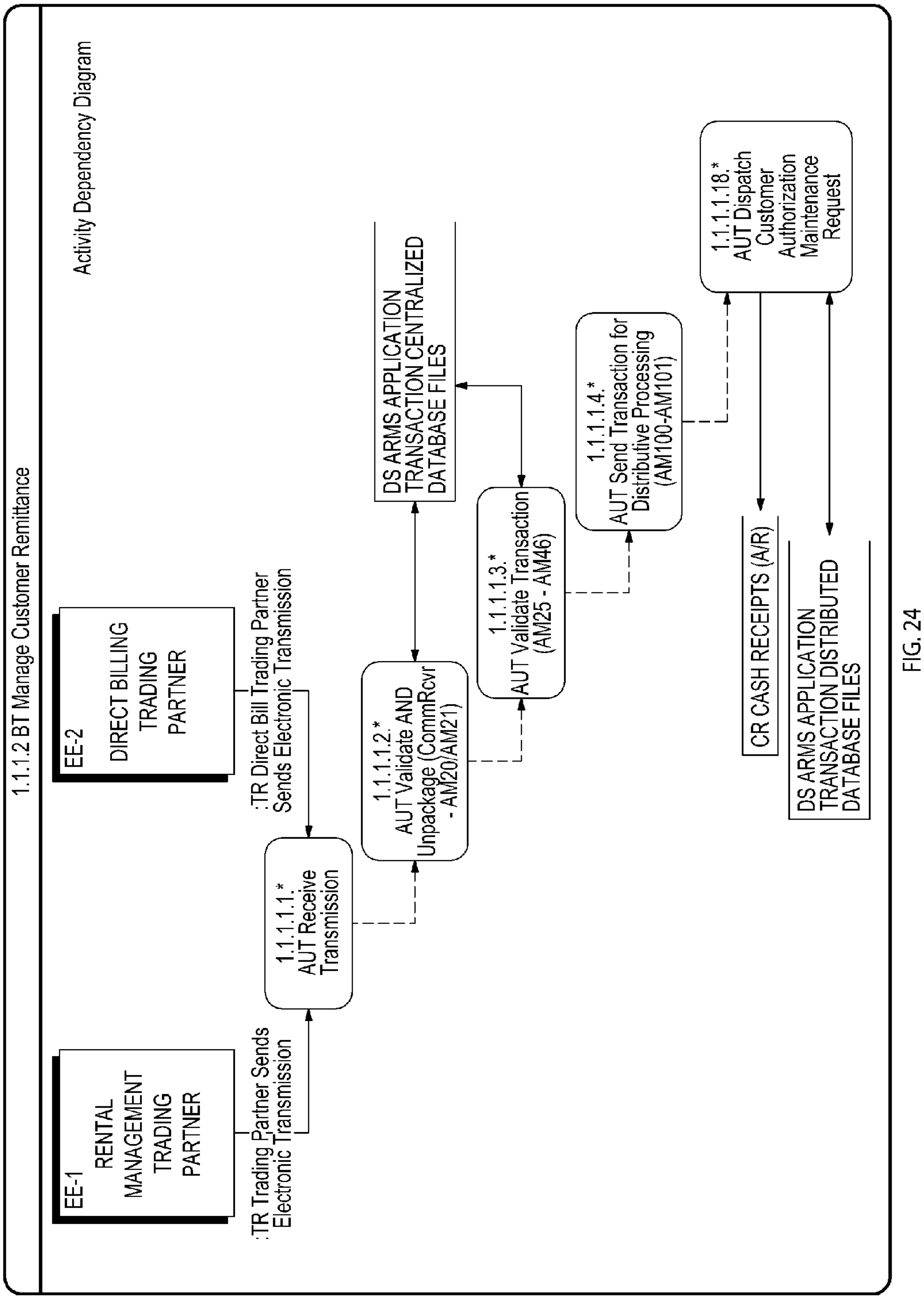
Figure 25:
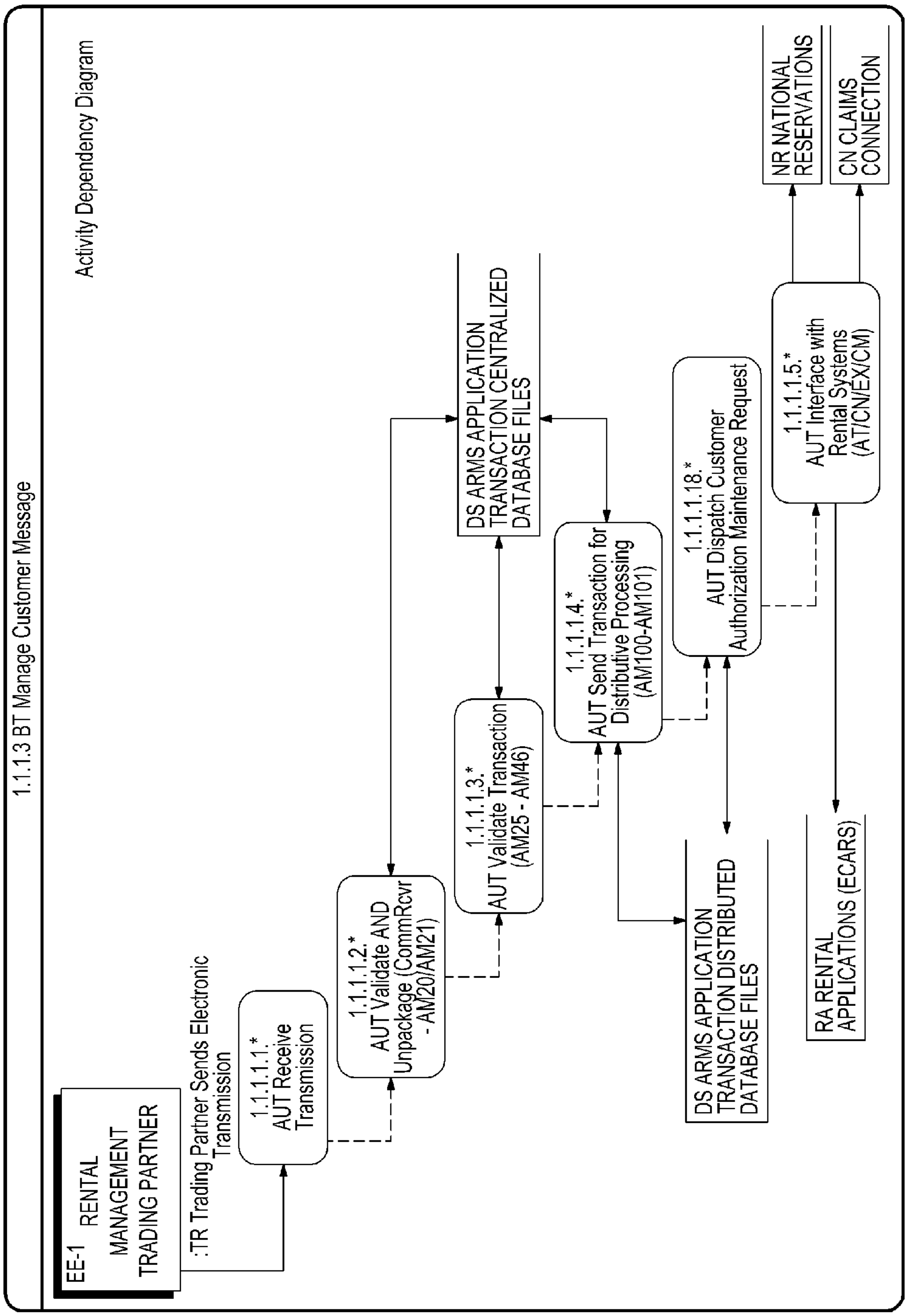
Figure 26:
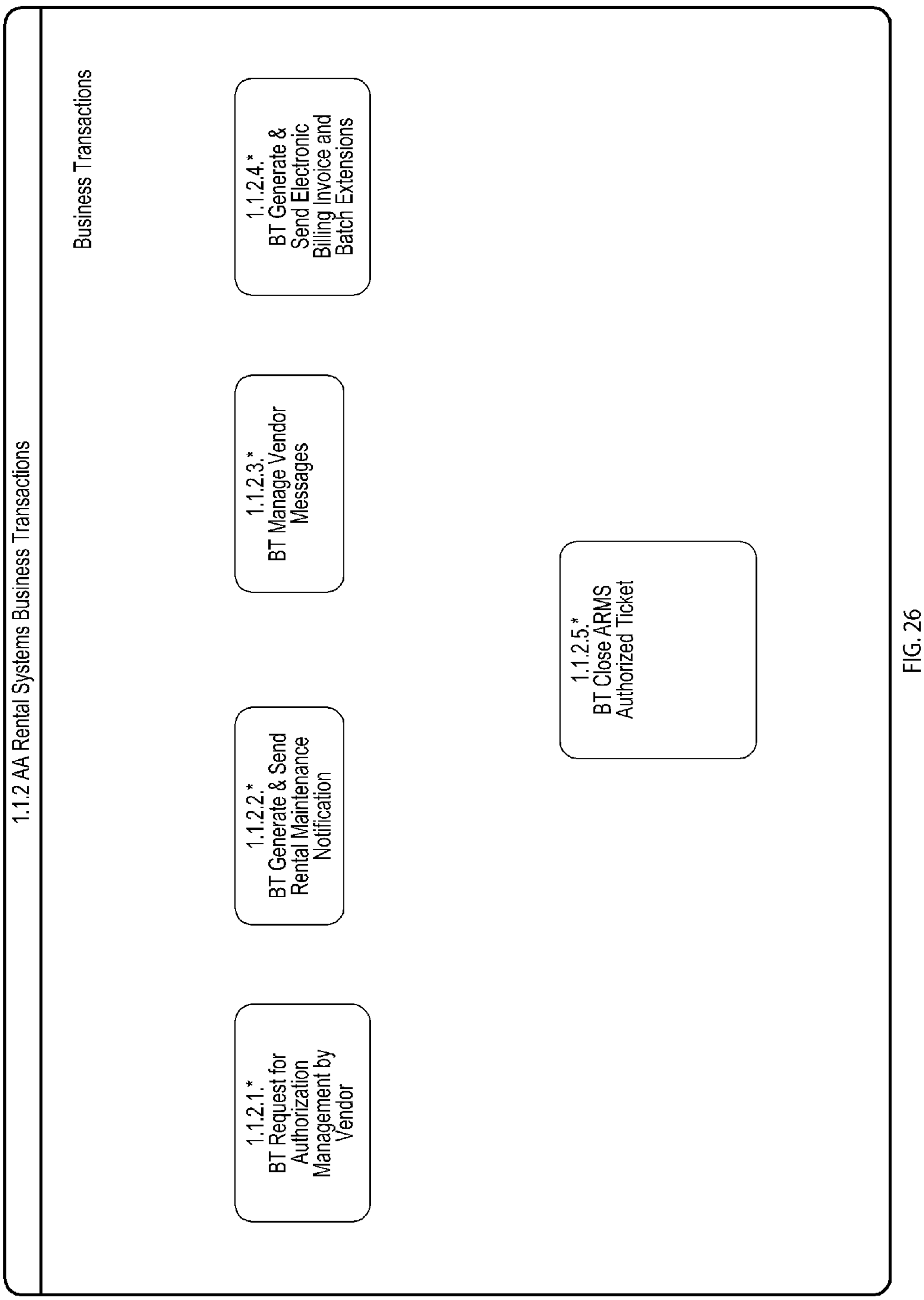
Figure 27:
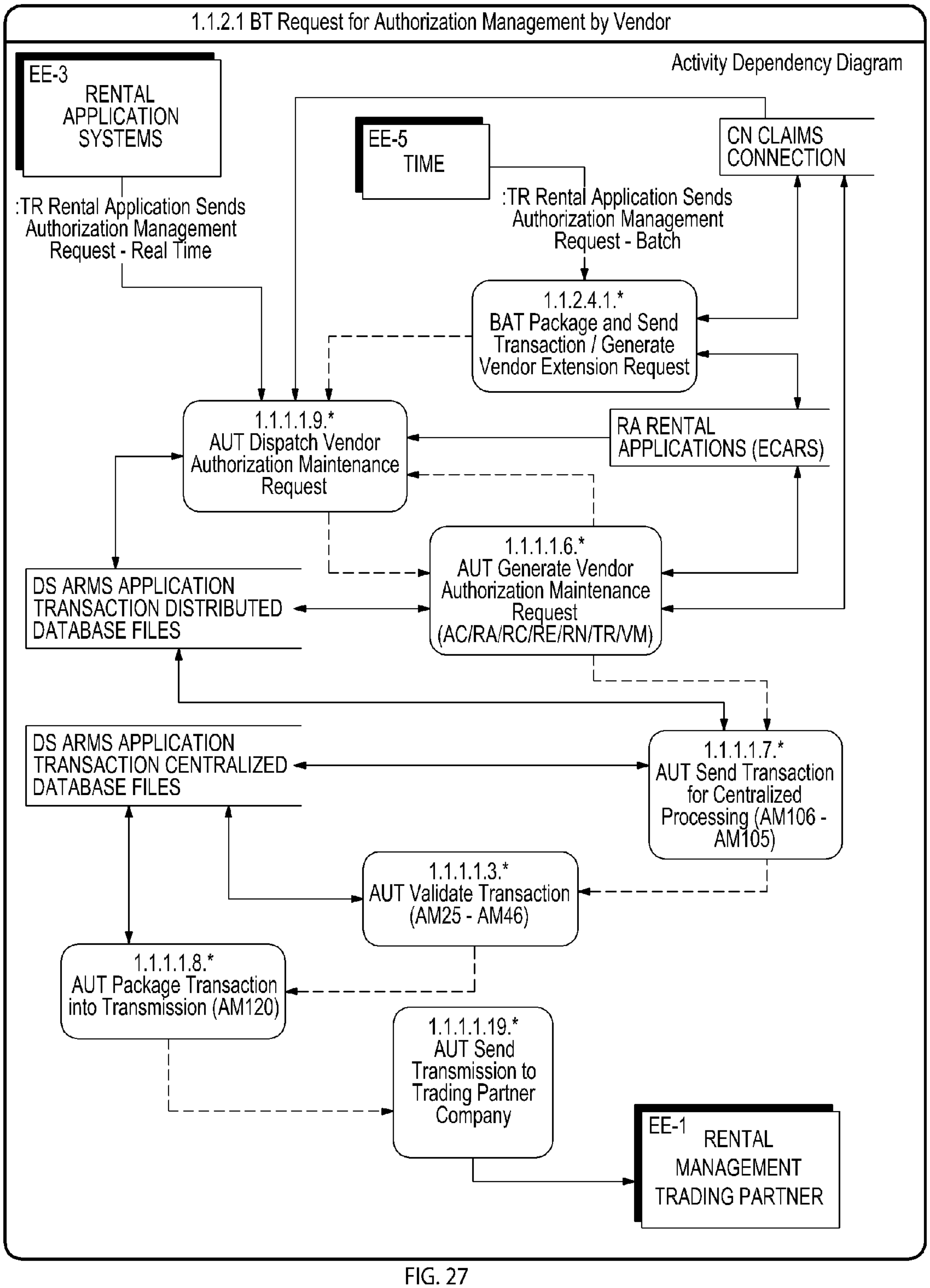
Figure 28:
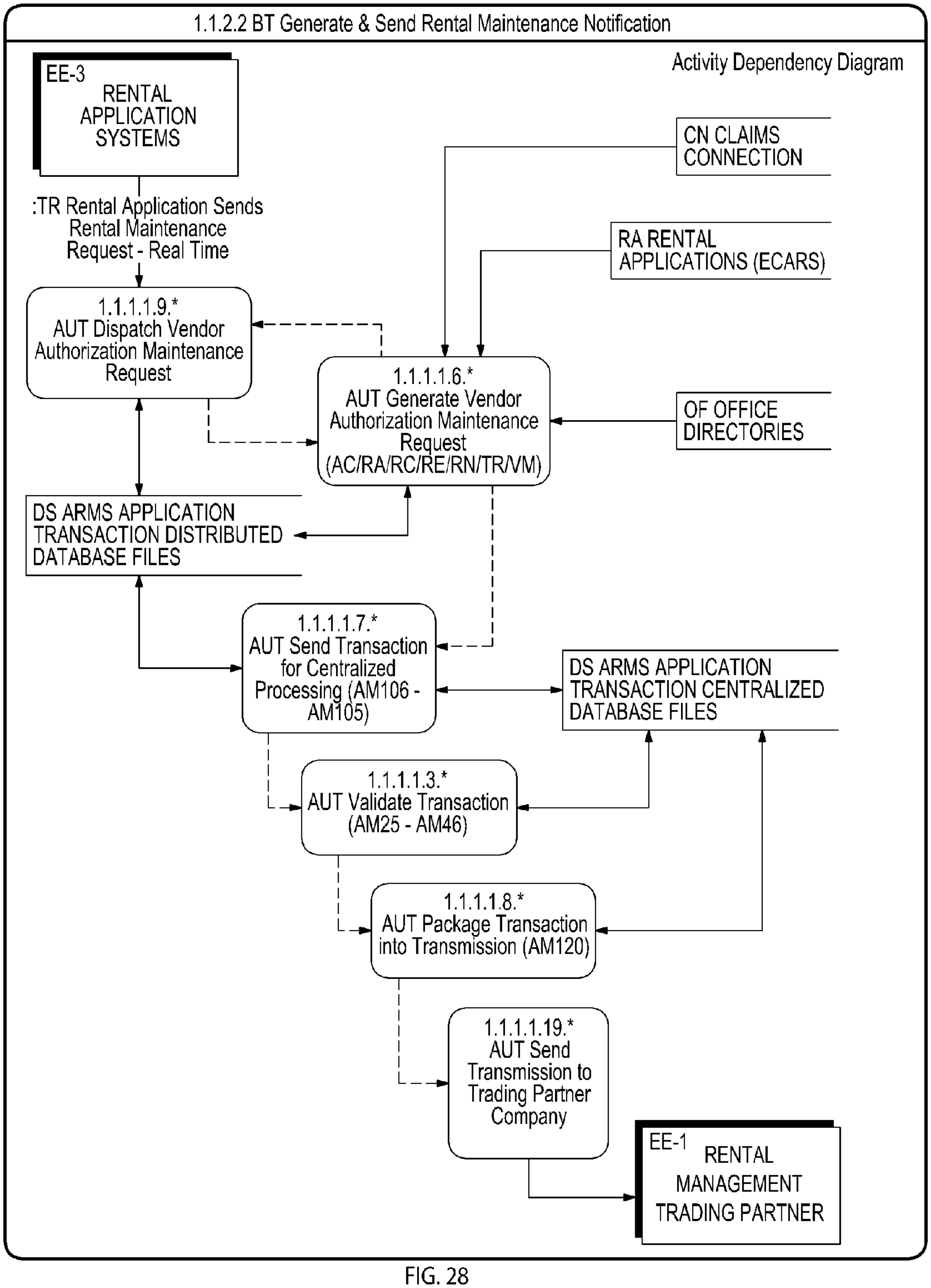
Figure 29:
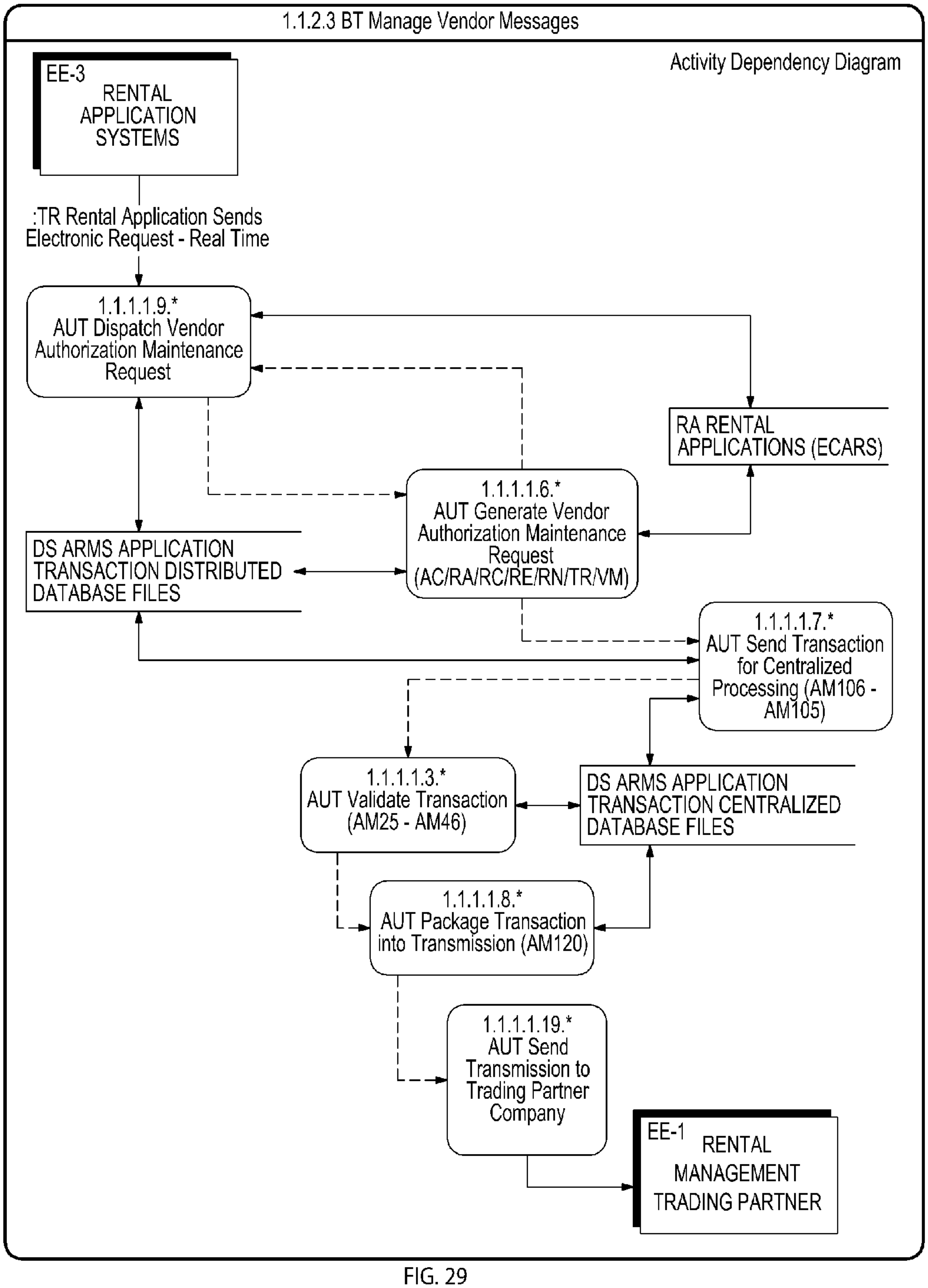
Figure 30:
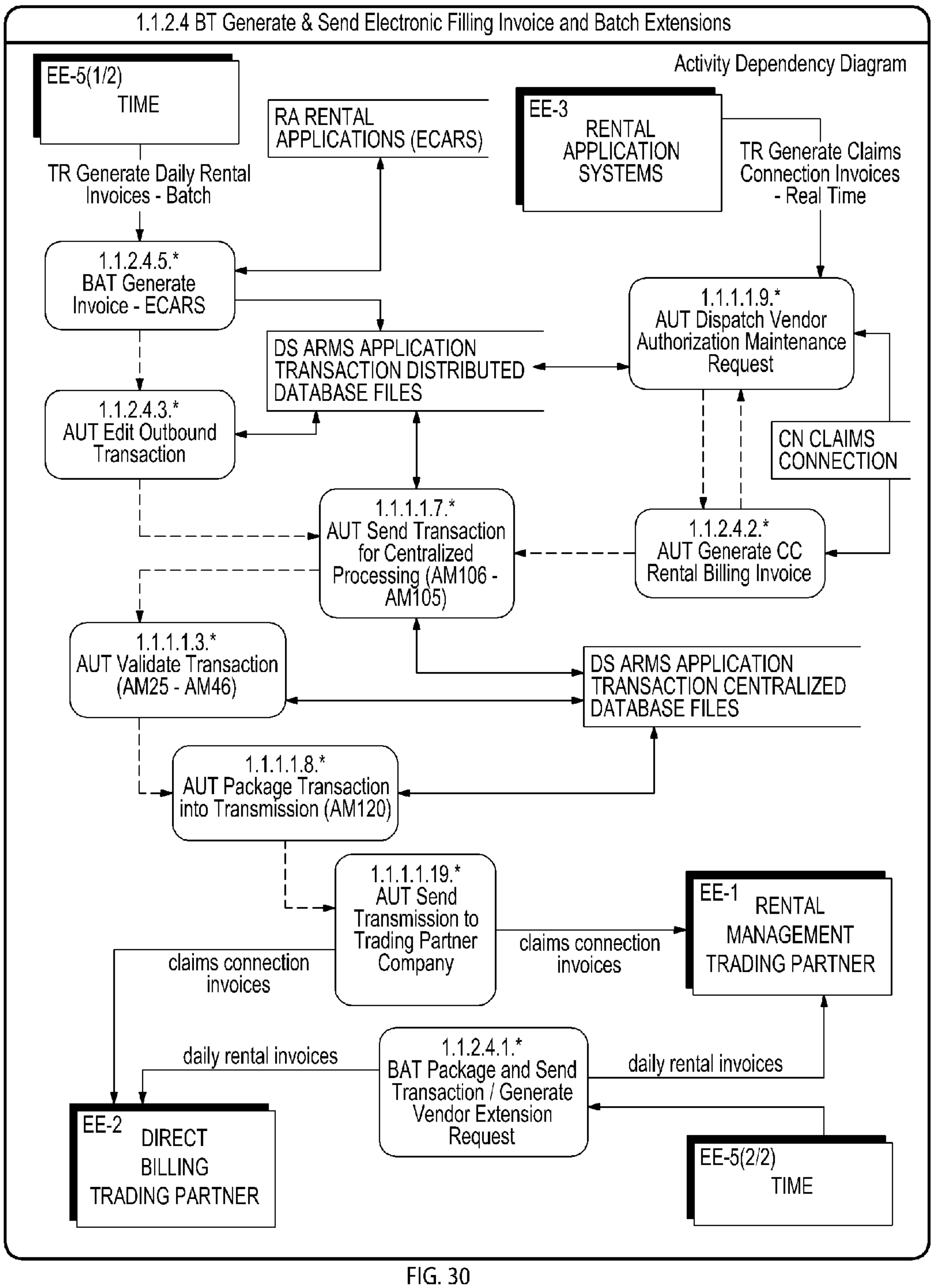
Figure 31:
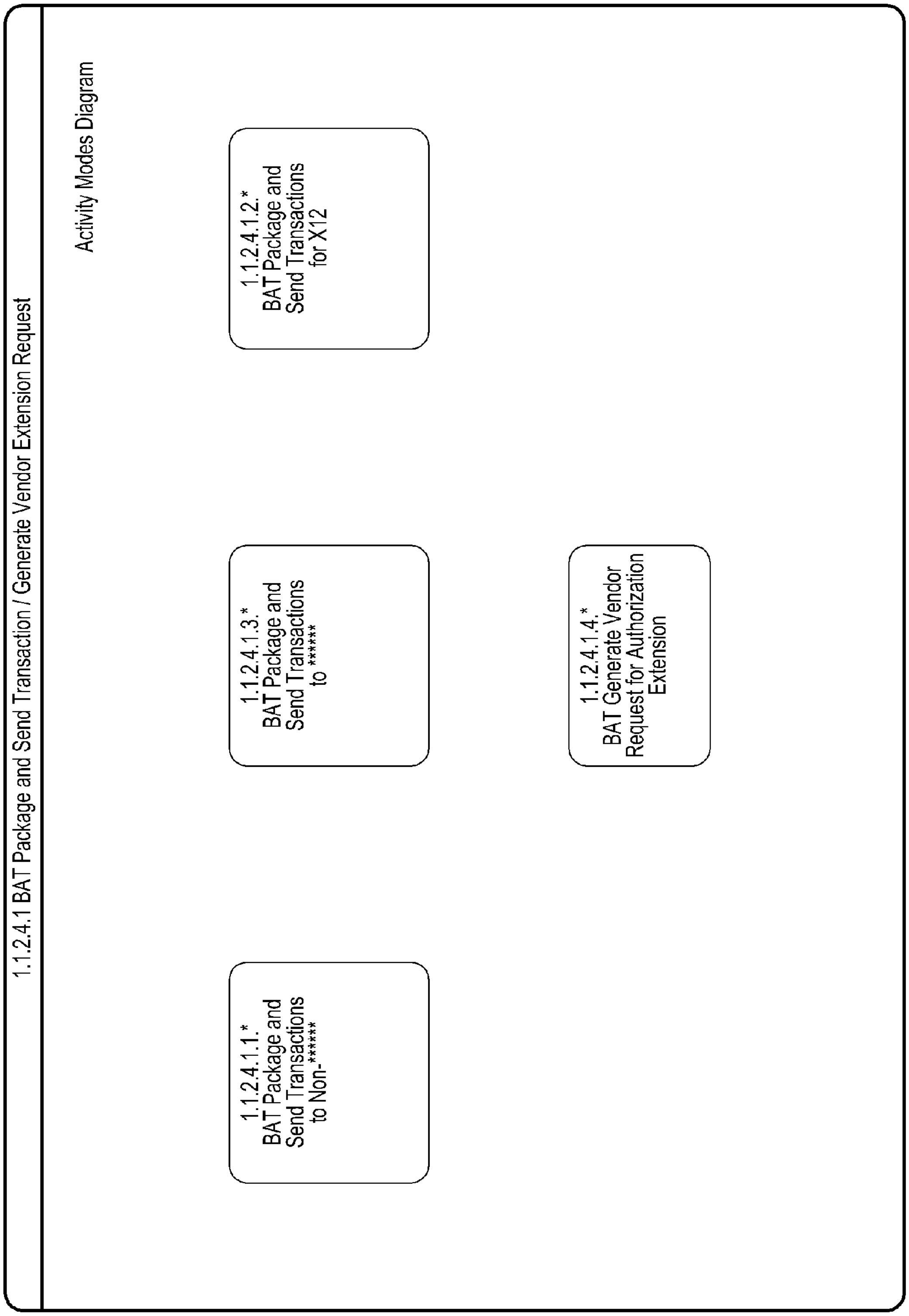
Figure 32:
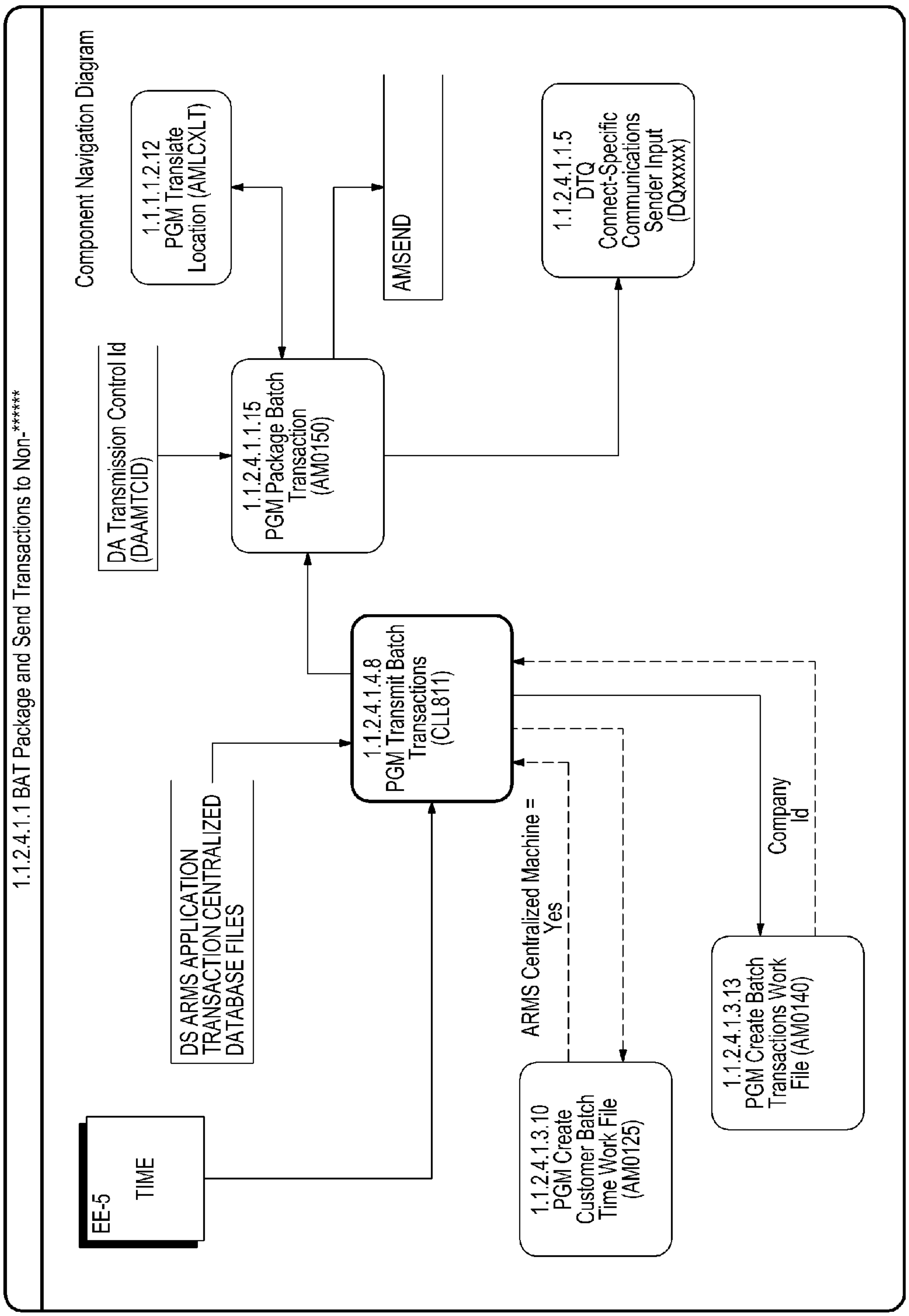
Figure 33:
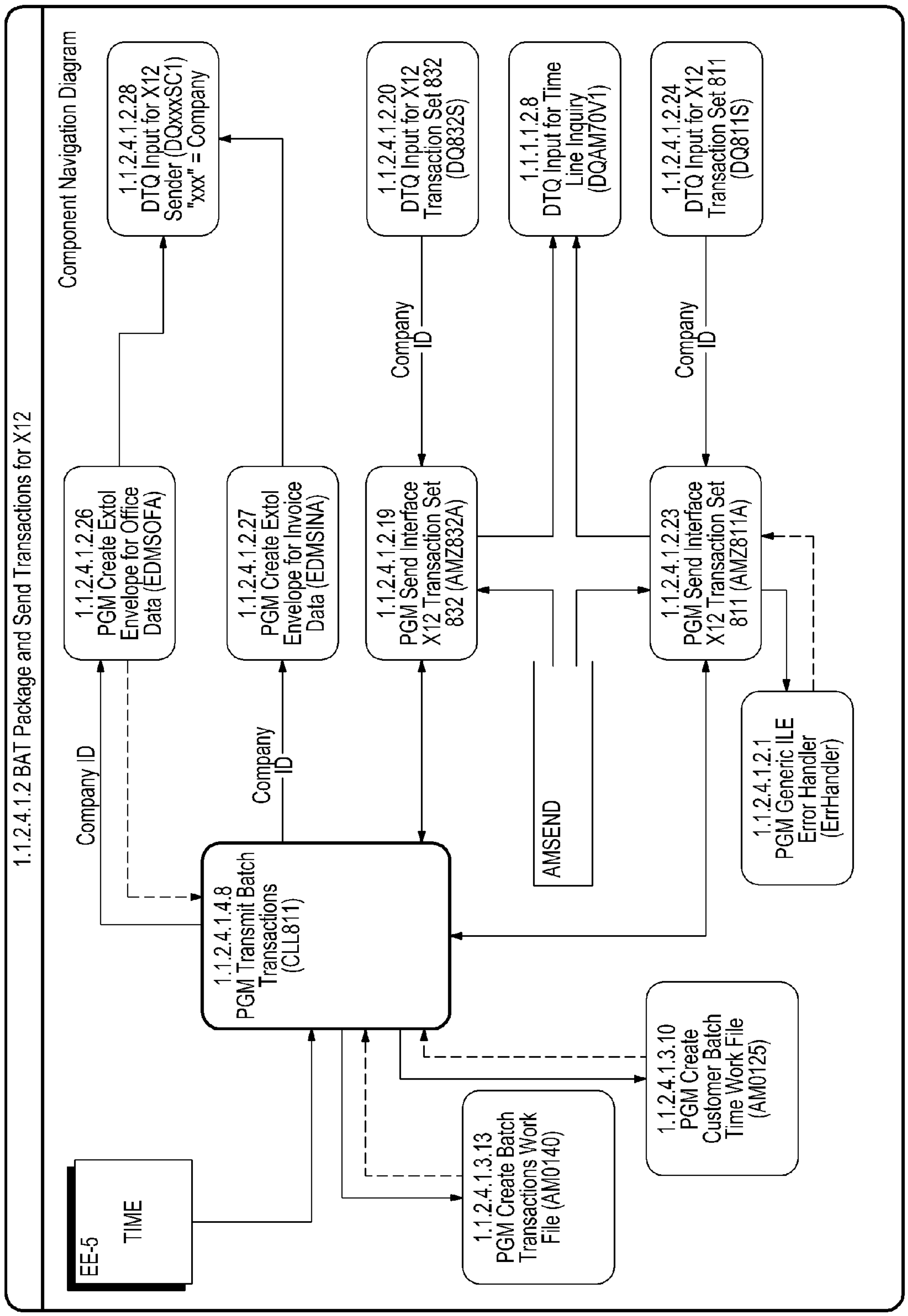
Figure 34:
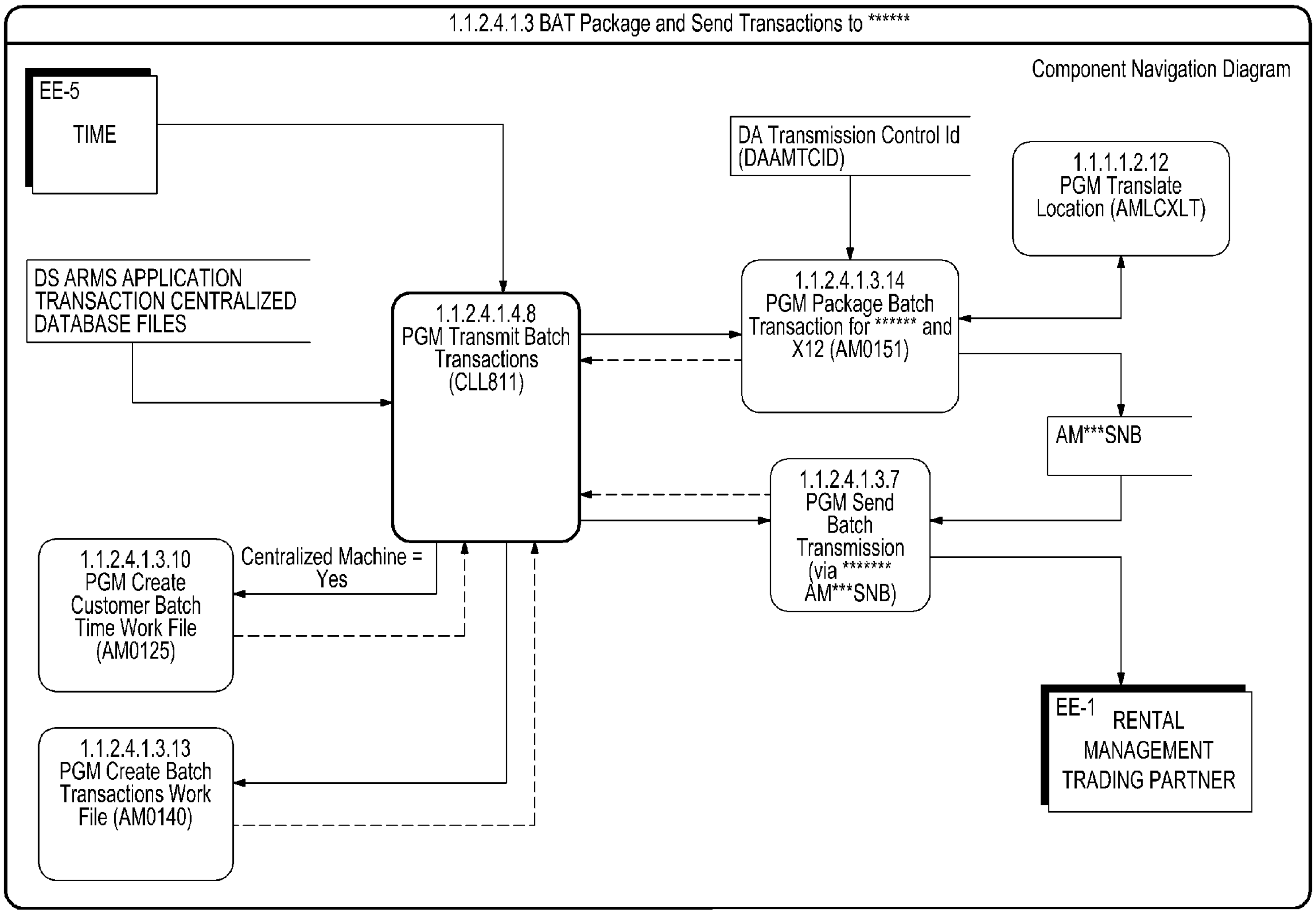
Figure 35:
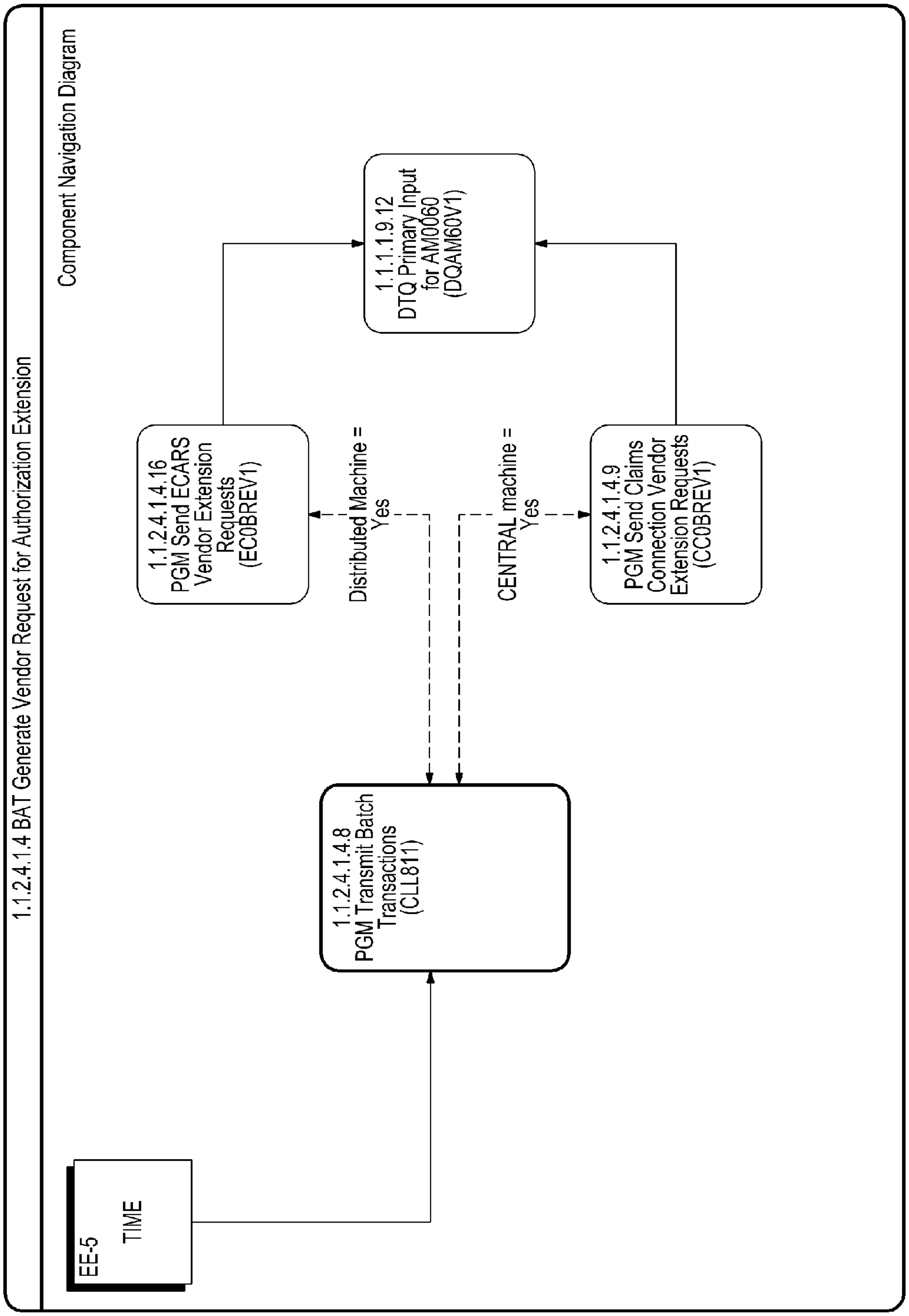
Figure 36:
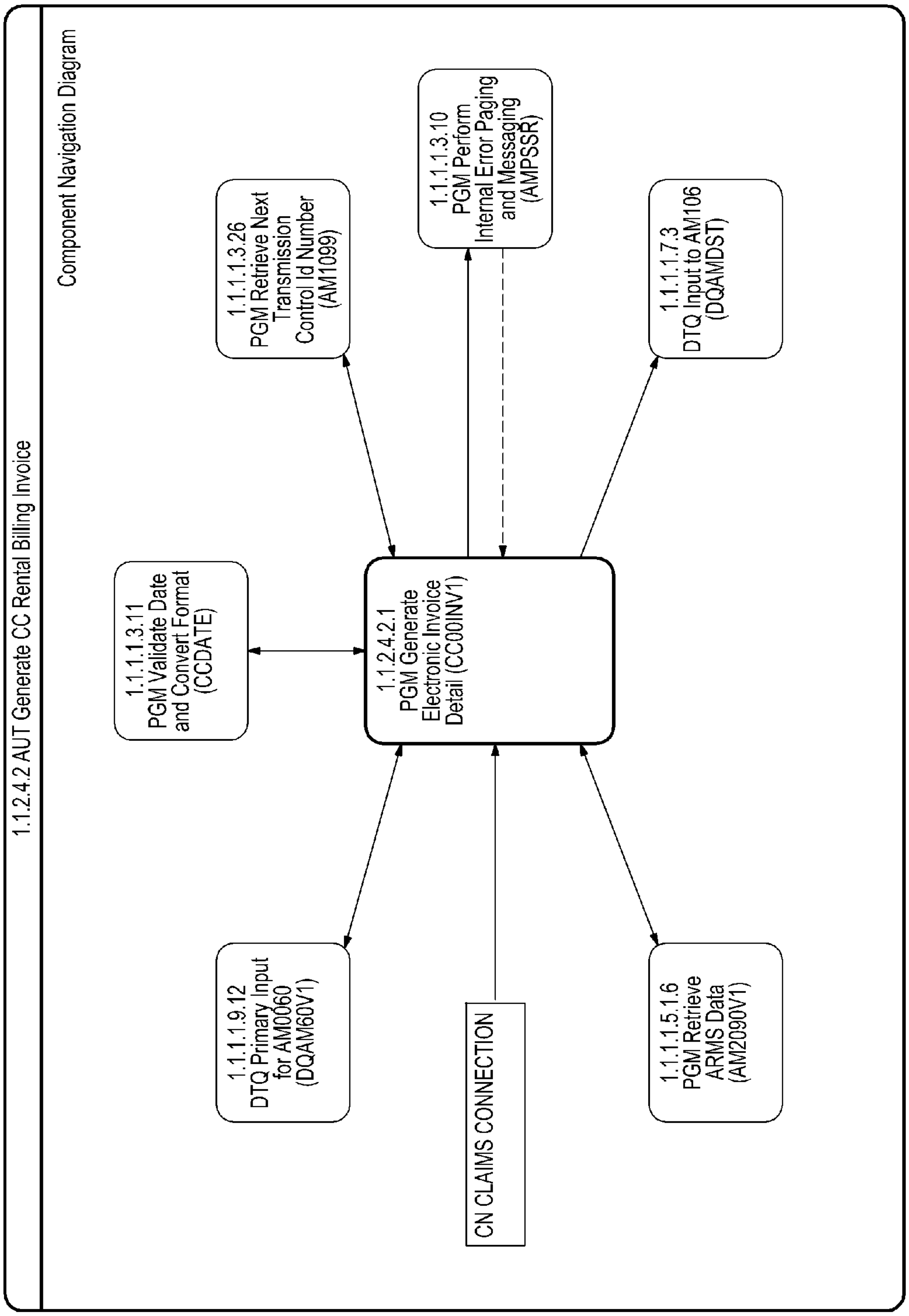
Figure 37:
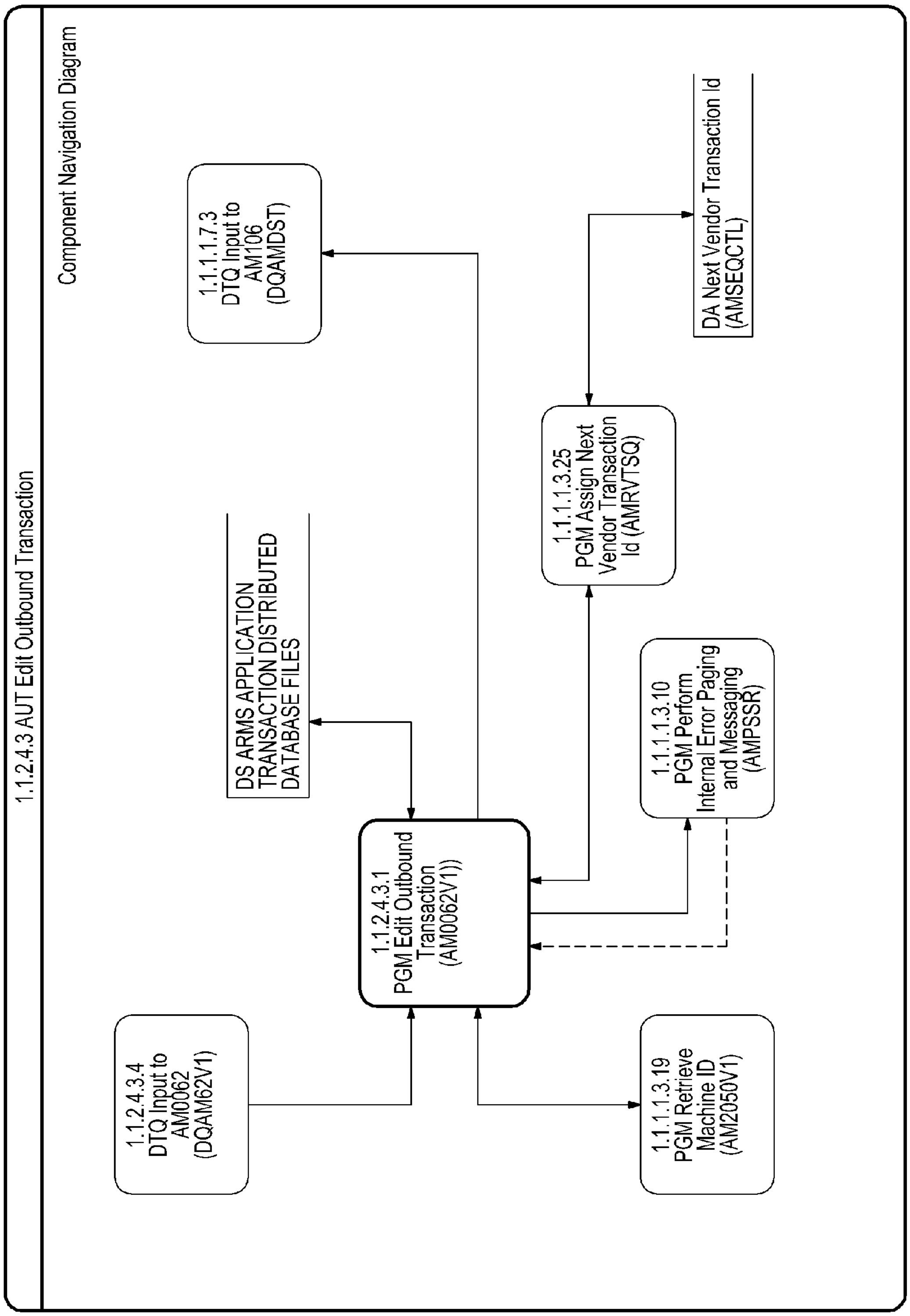
Figure 38:
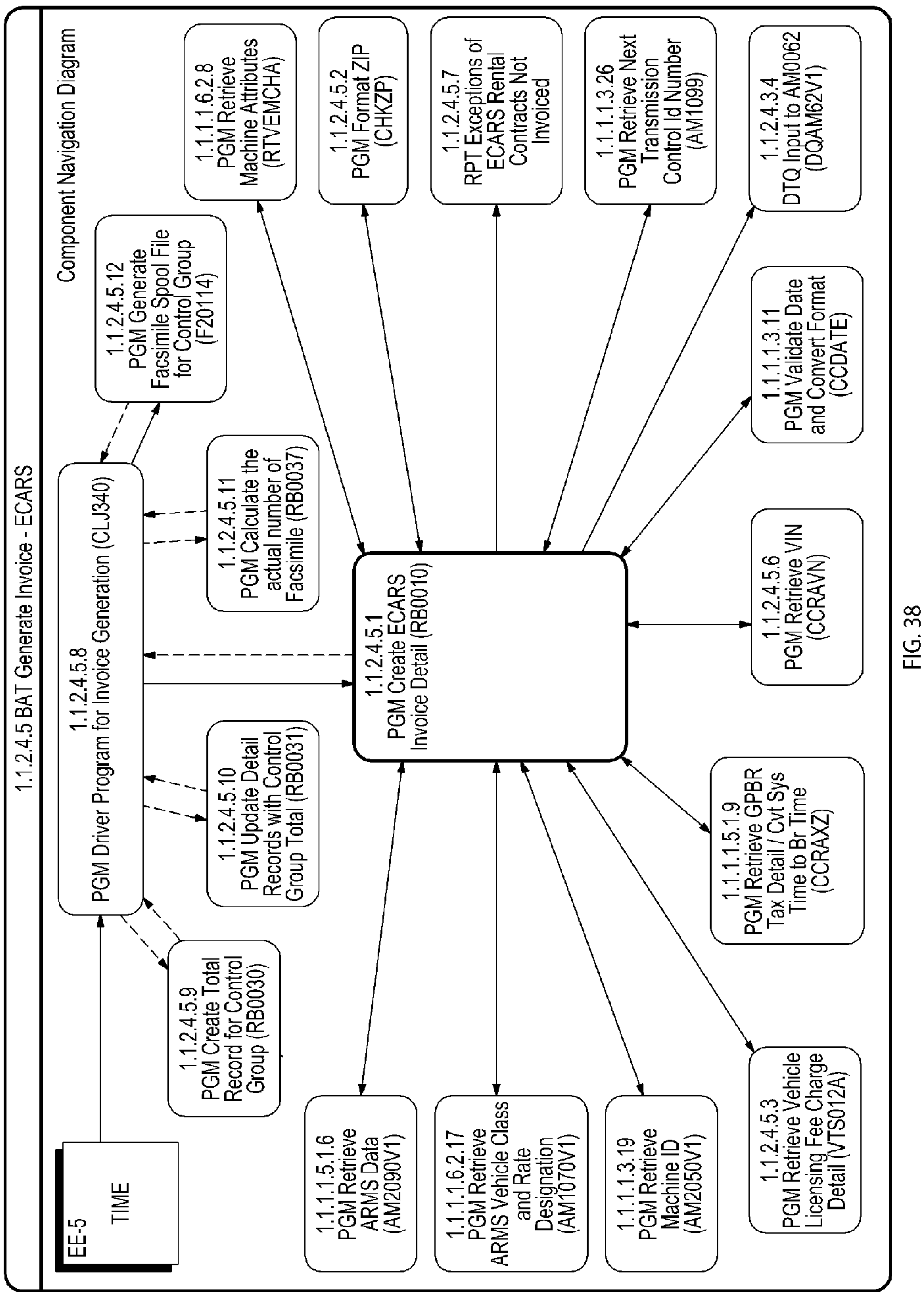
Figure 39:
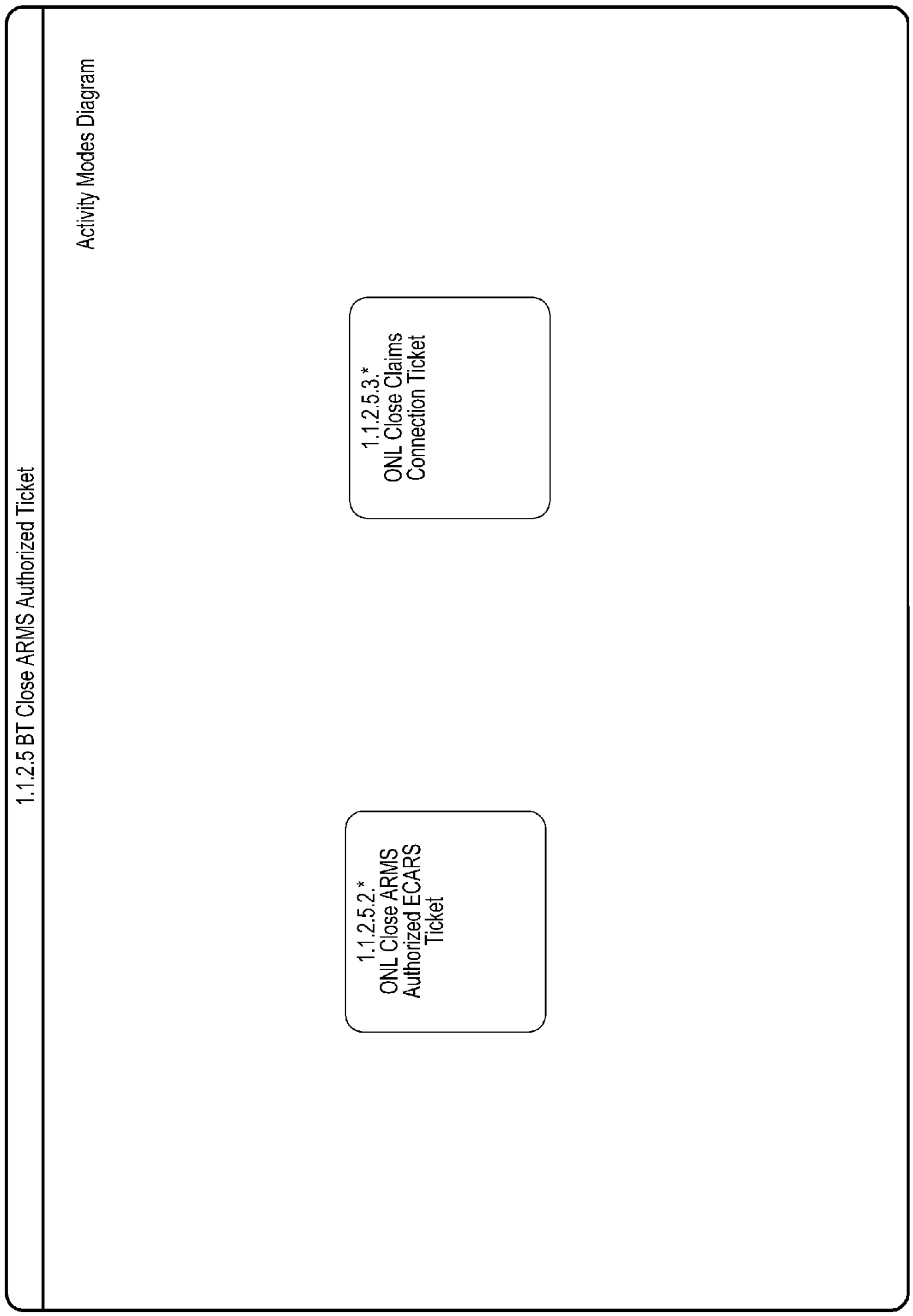
Figure 40:
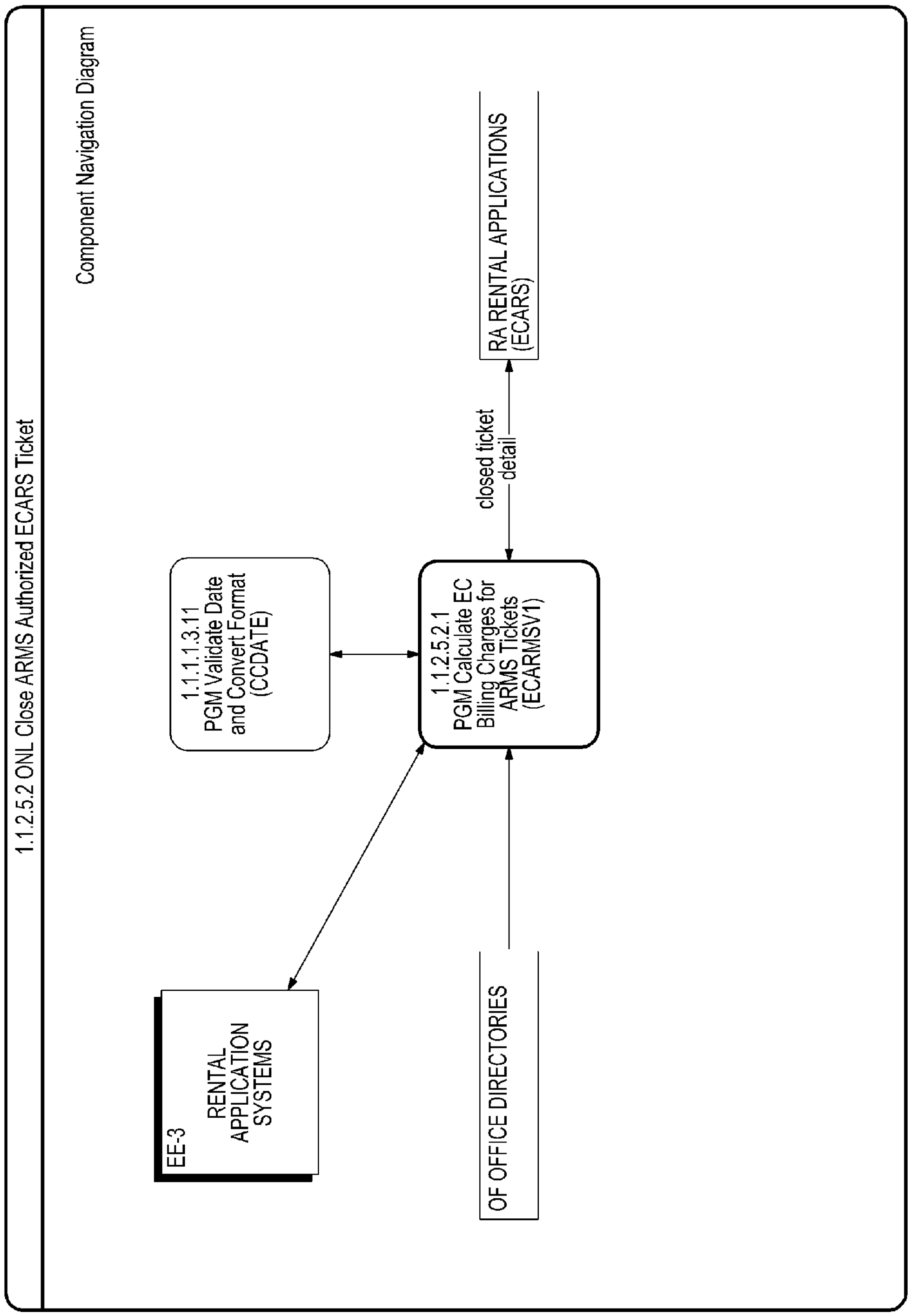
Figure 41:
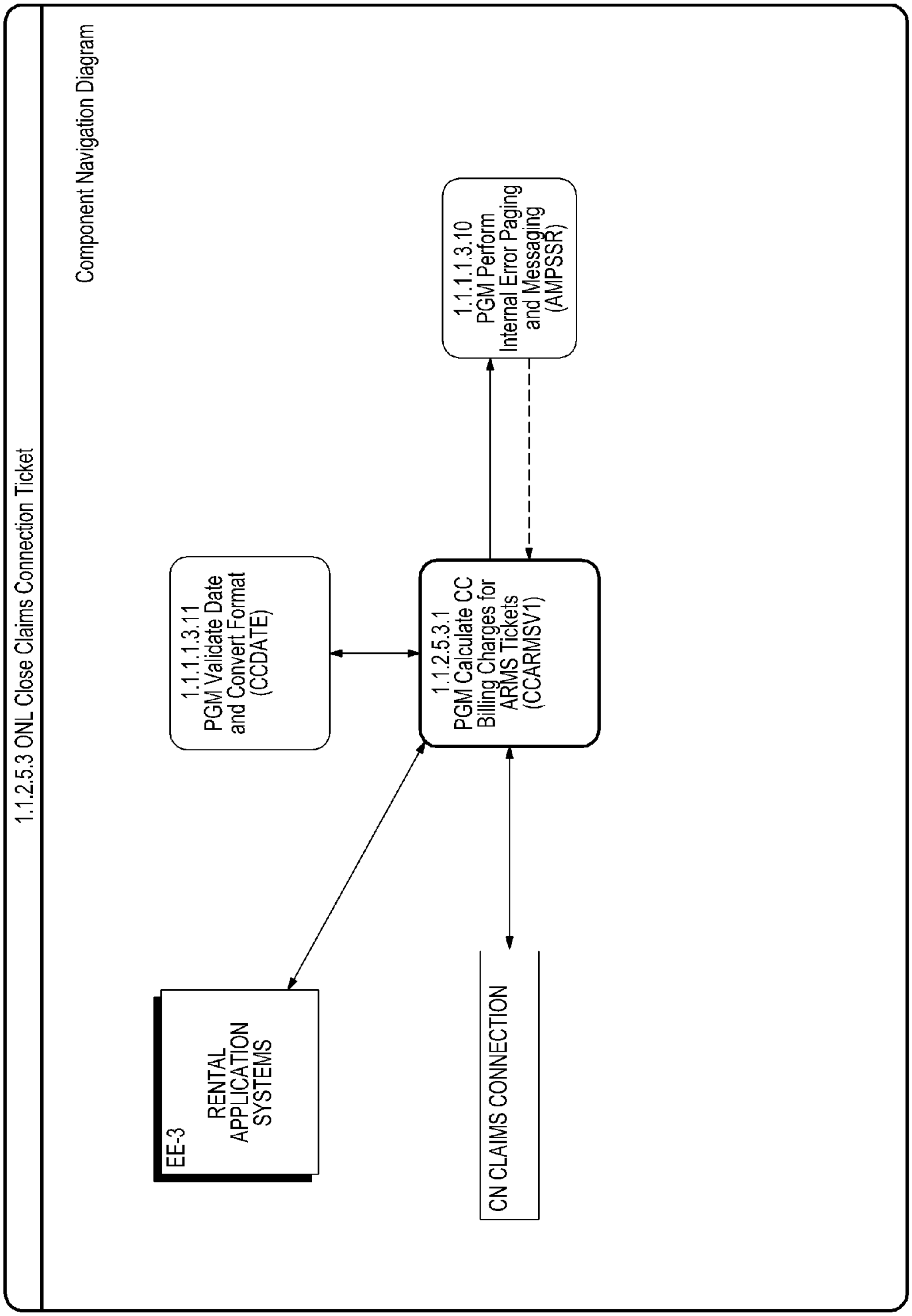
Figure 42:
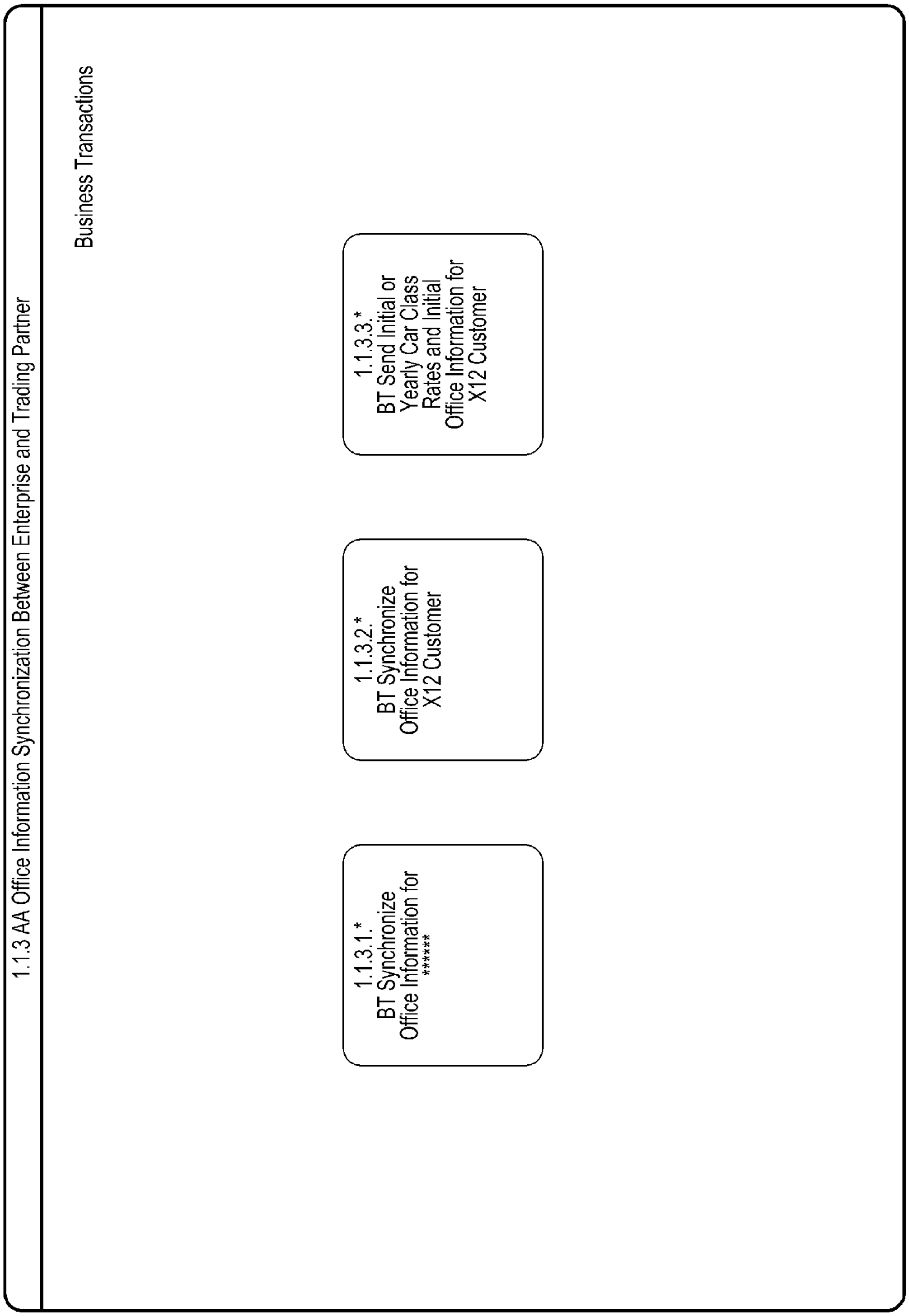
Figure 43:
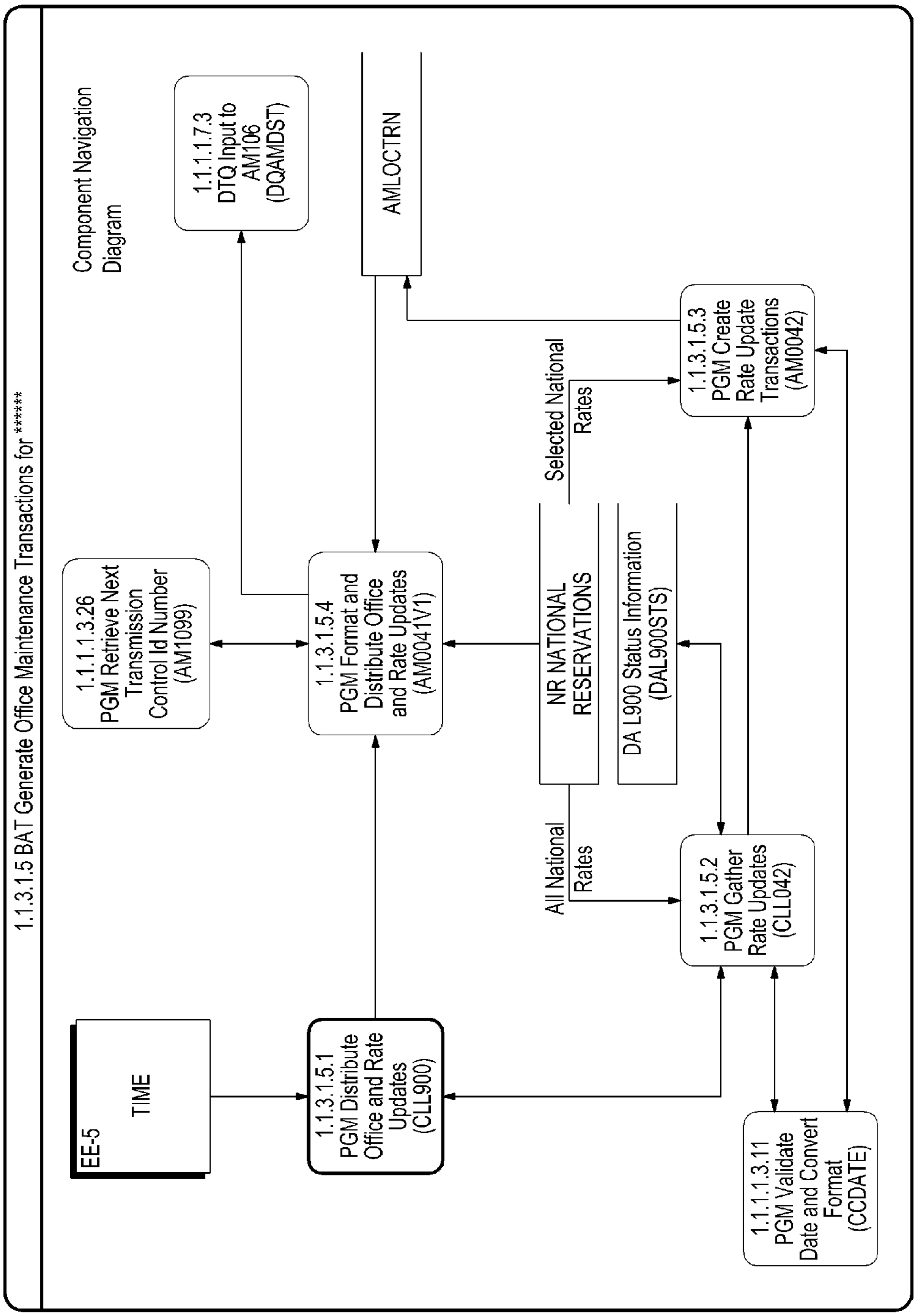
Figure 44:
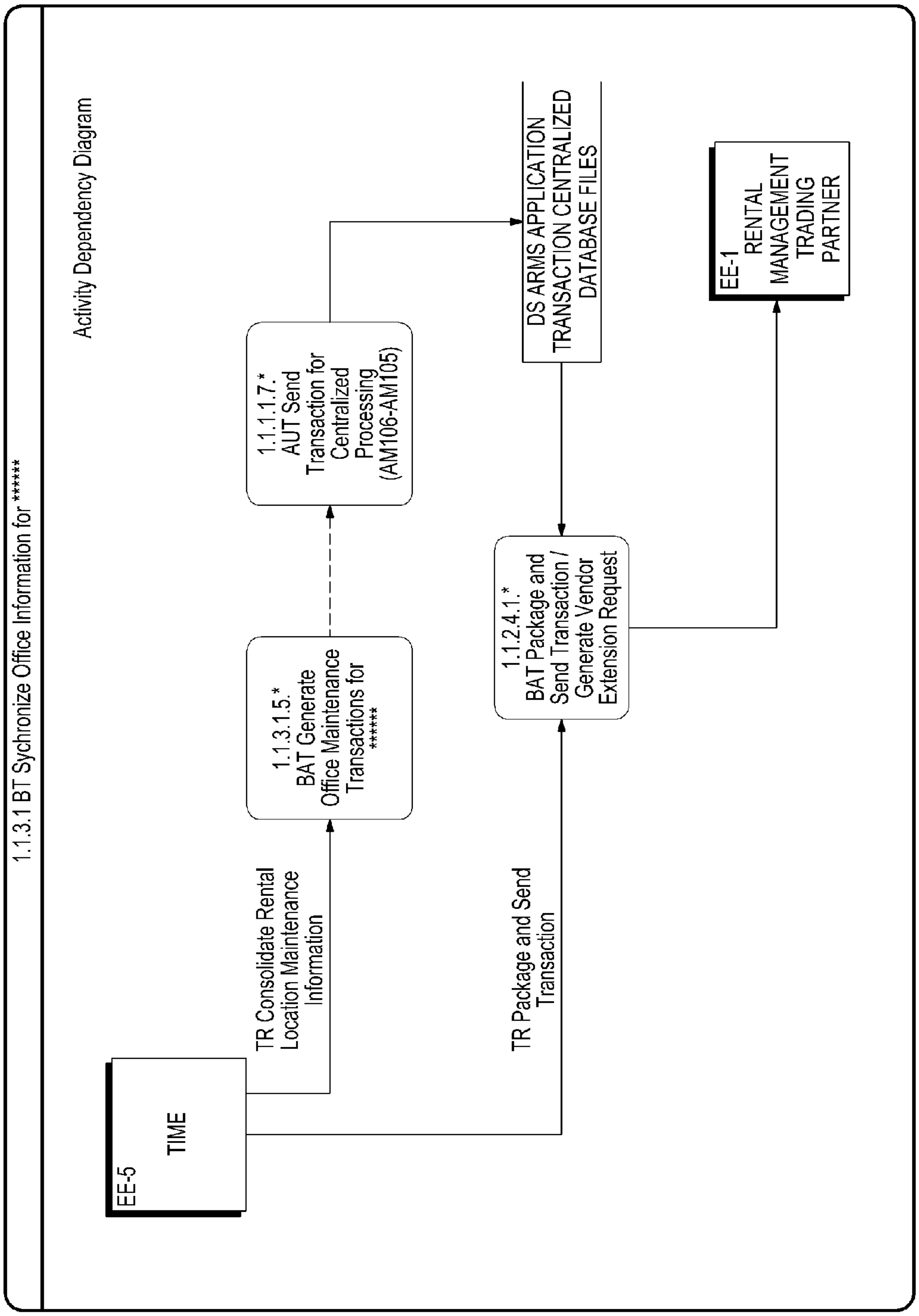
Figure 45:
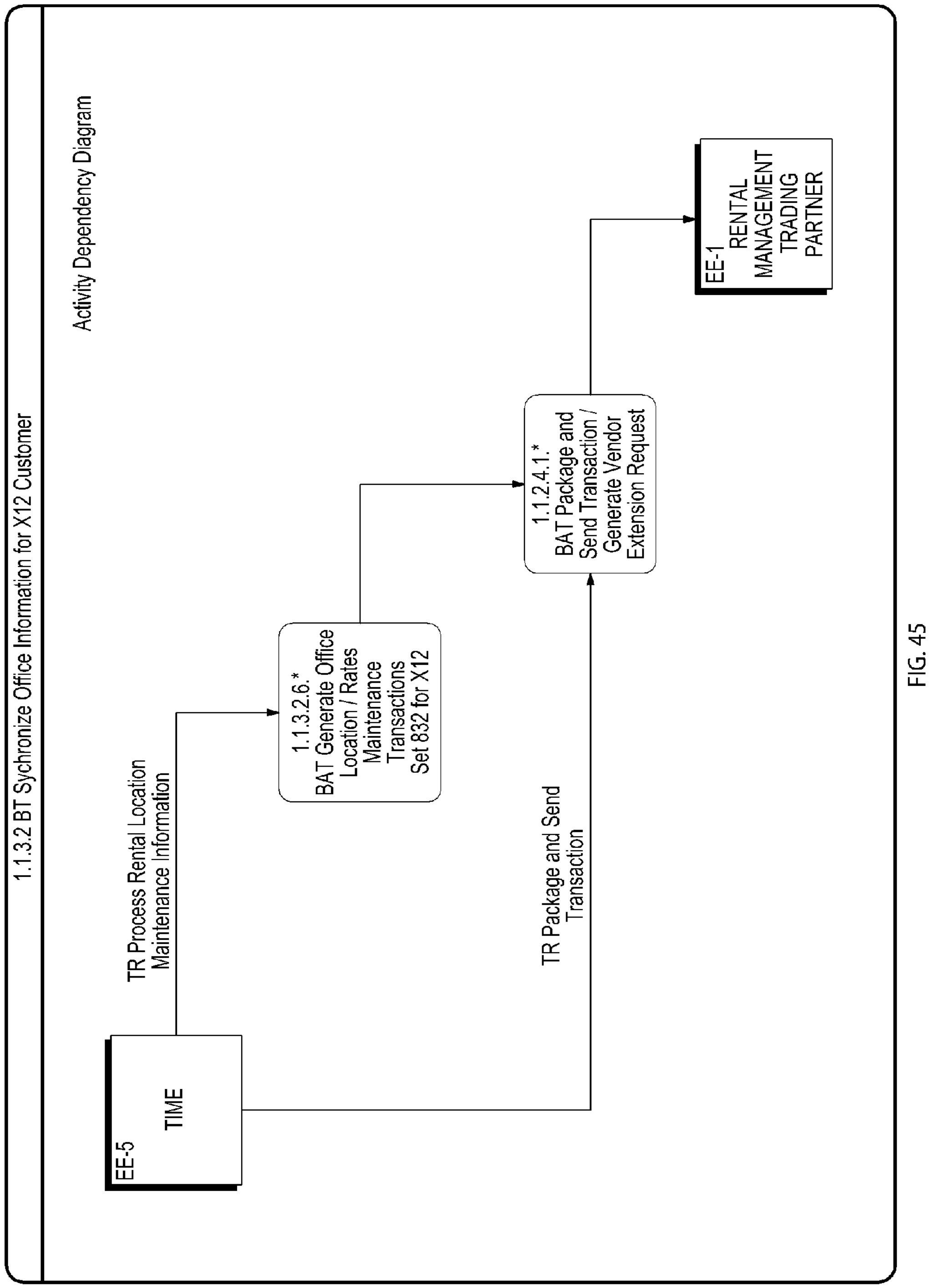
Figure 46A:
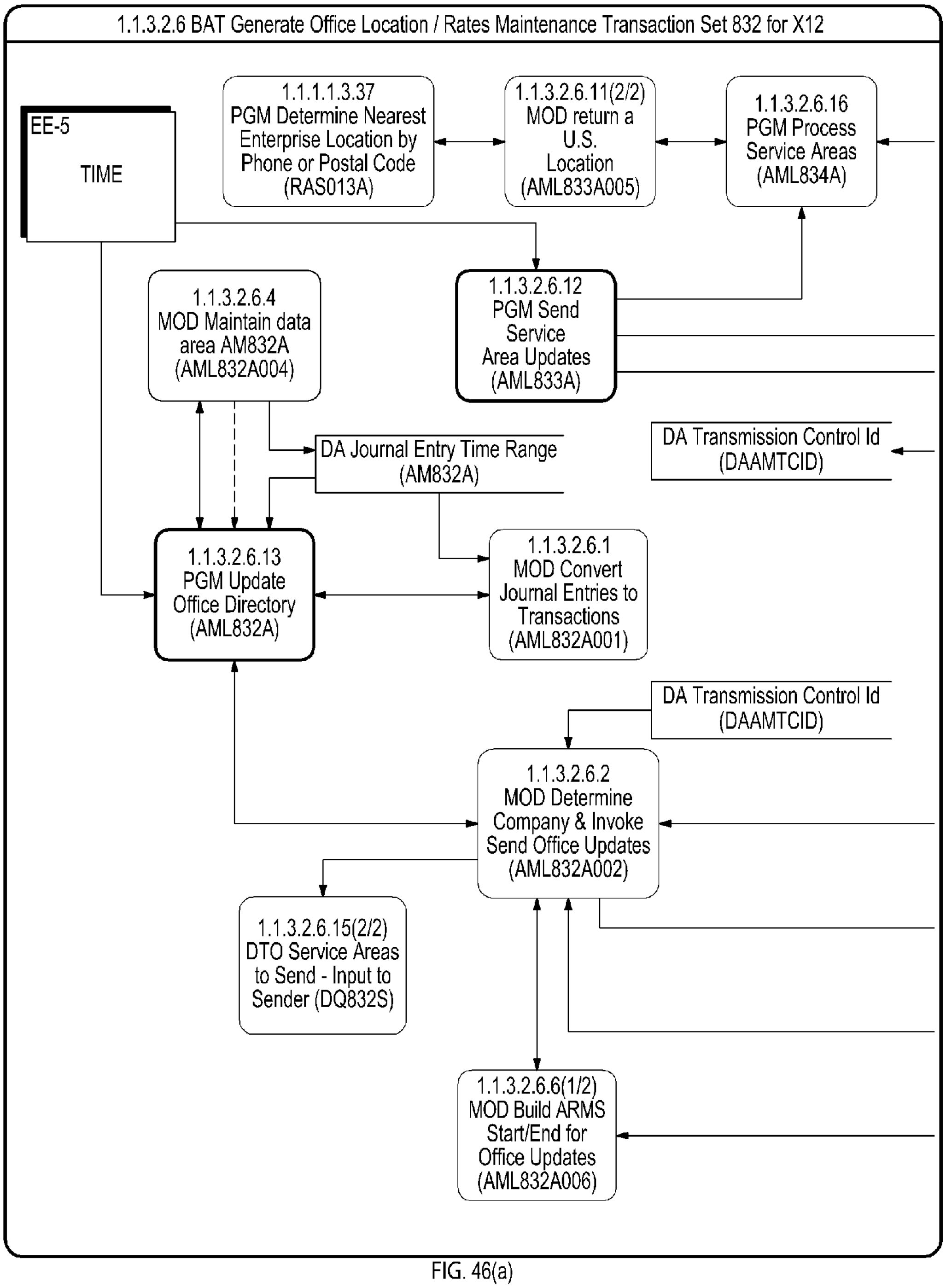
Figure 46B:
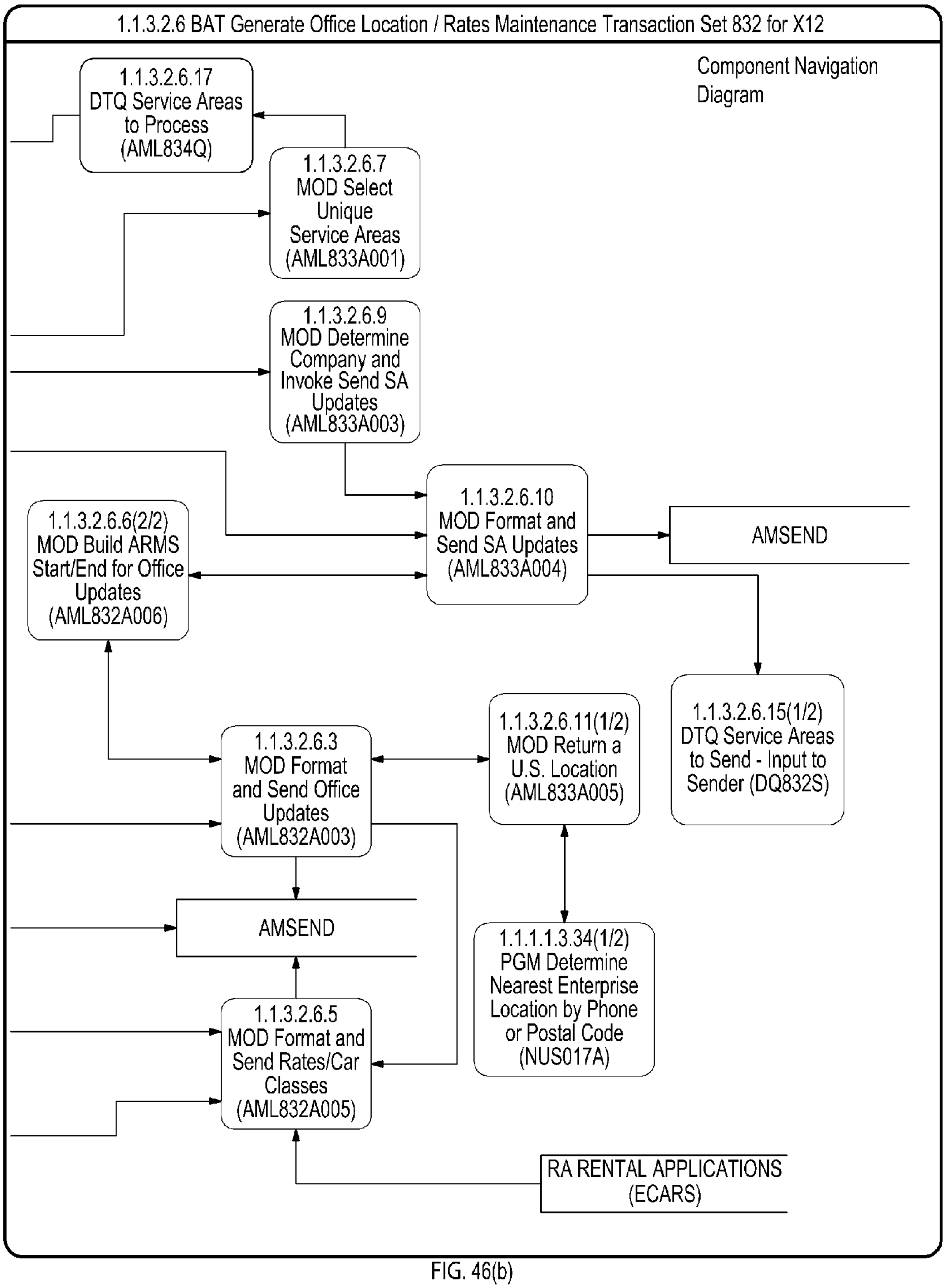
Figure 47:
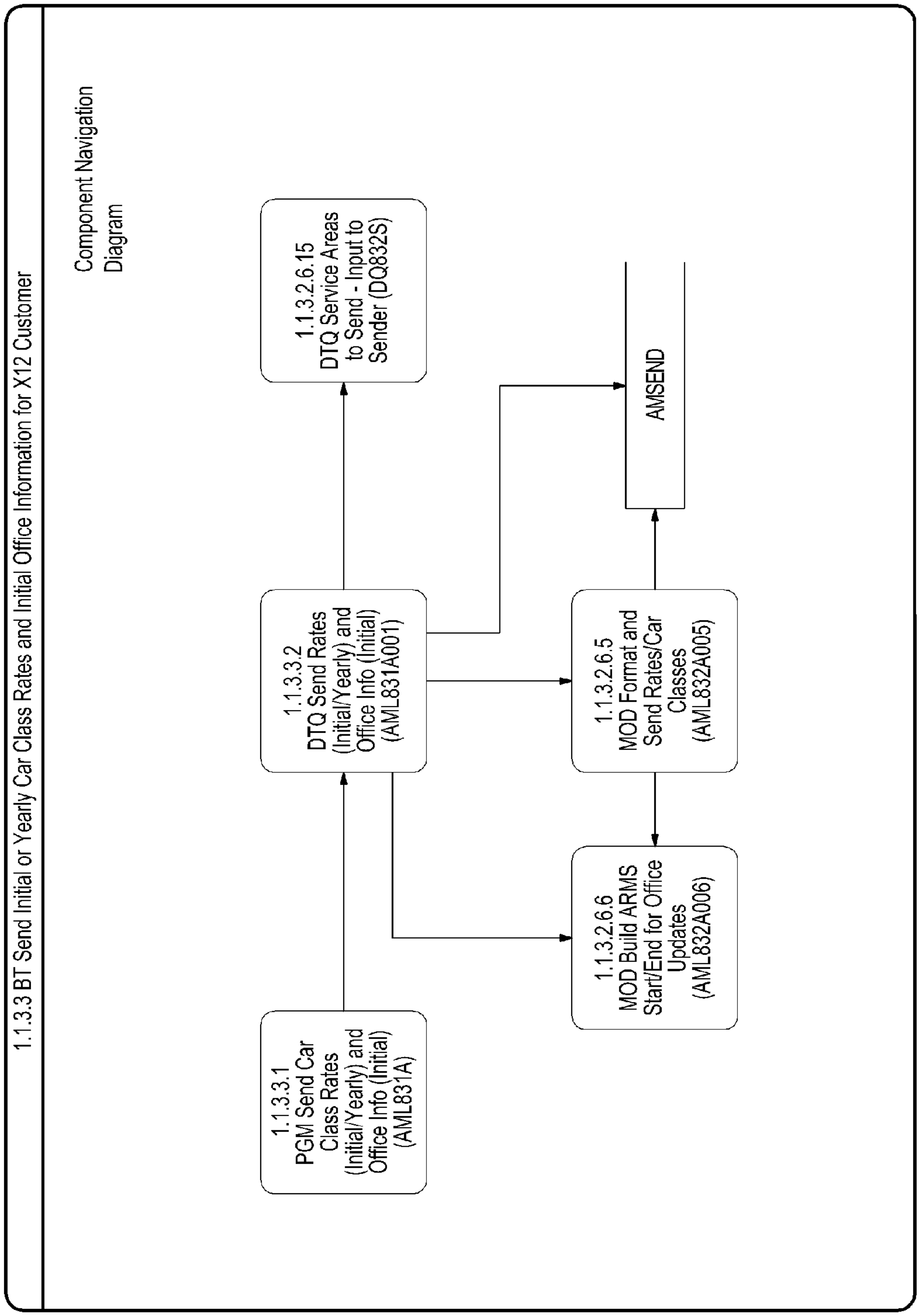
Figure 48:
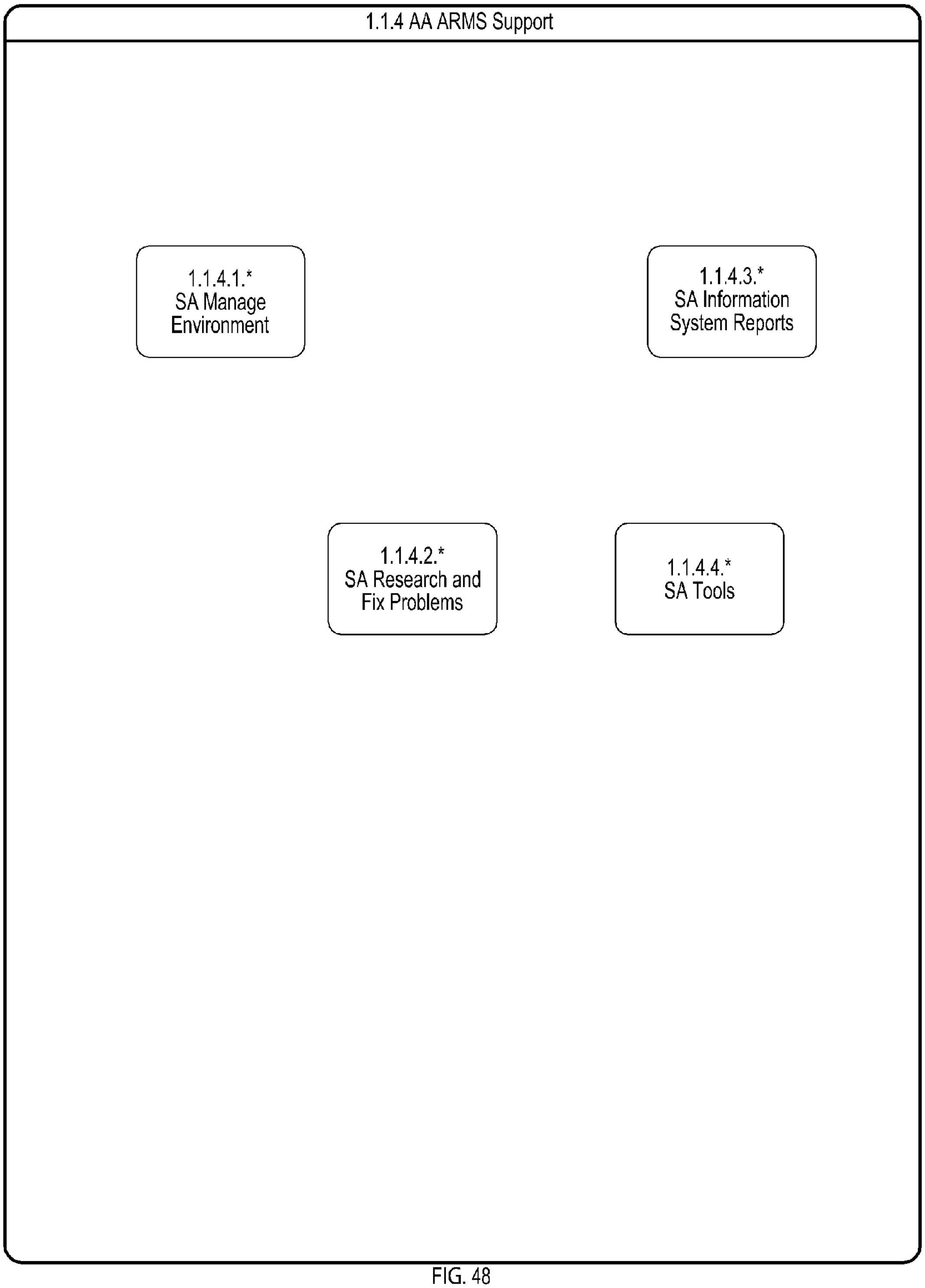
Figure 49:
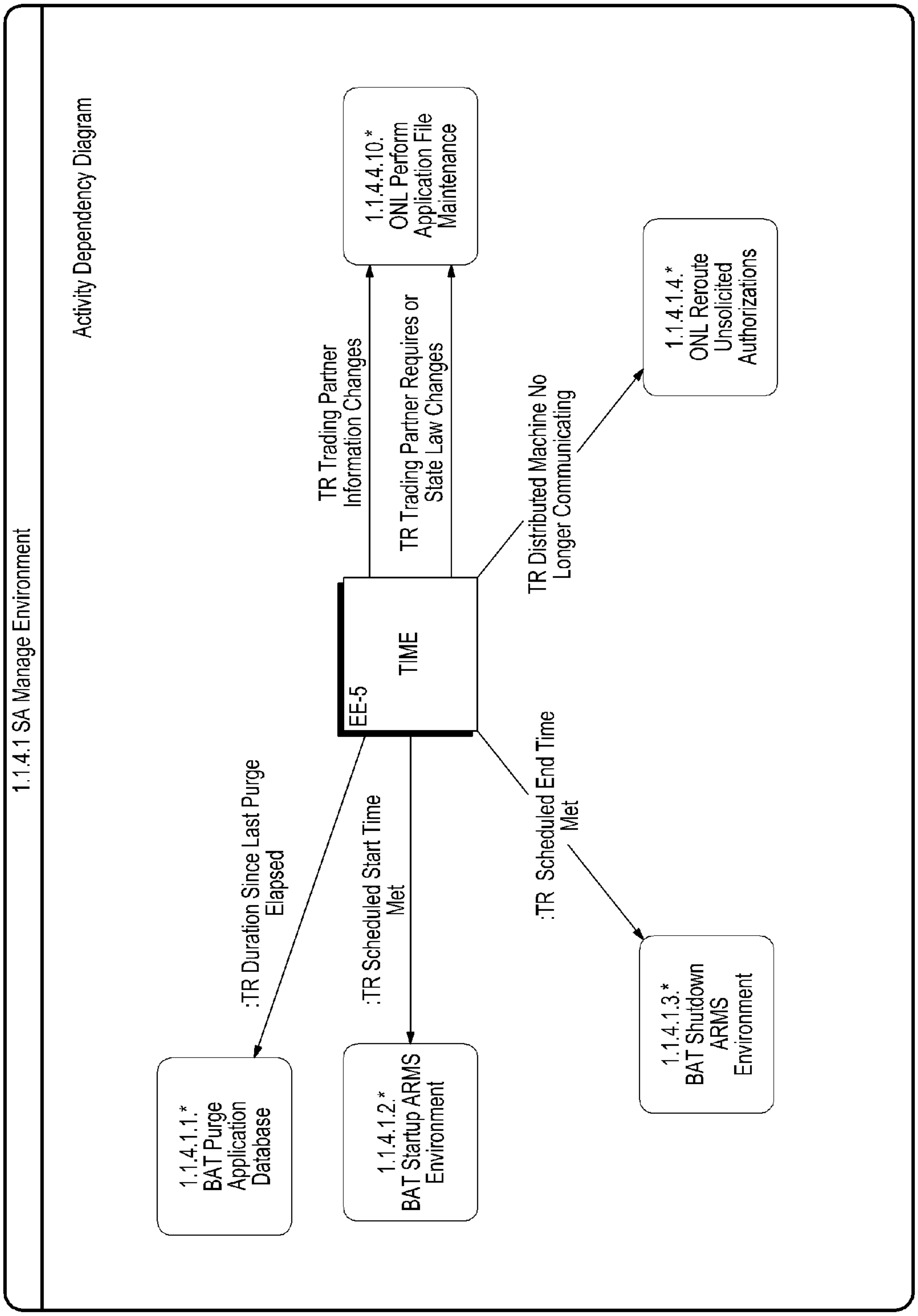
Figure 50:
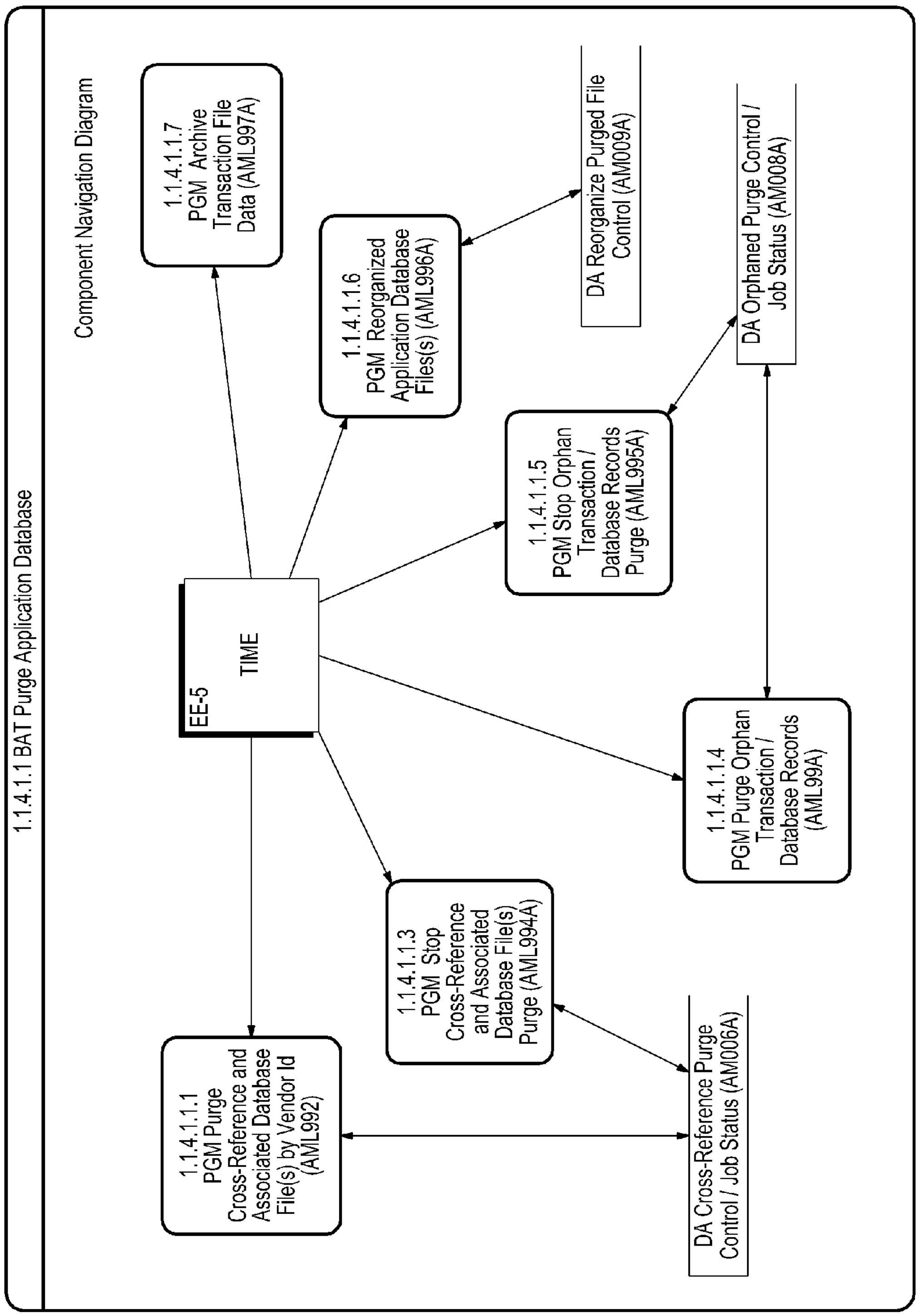
Figure 51:
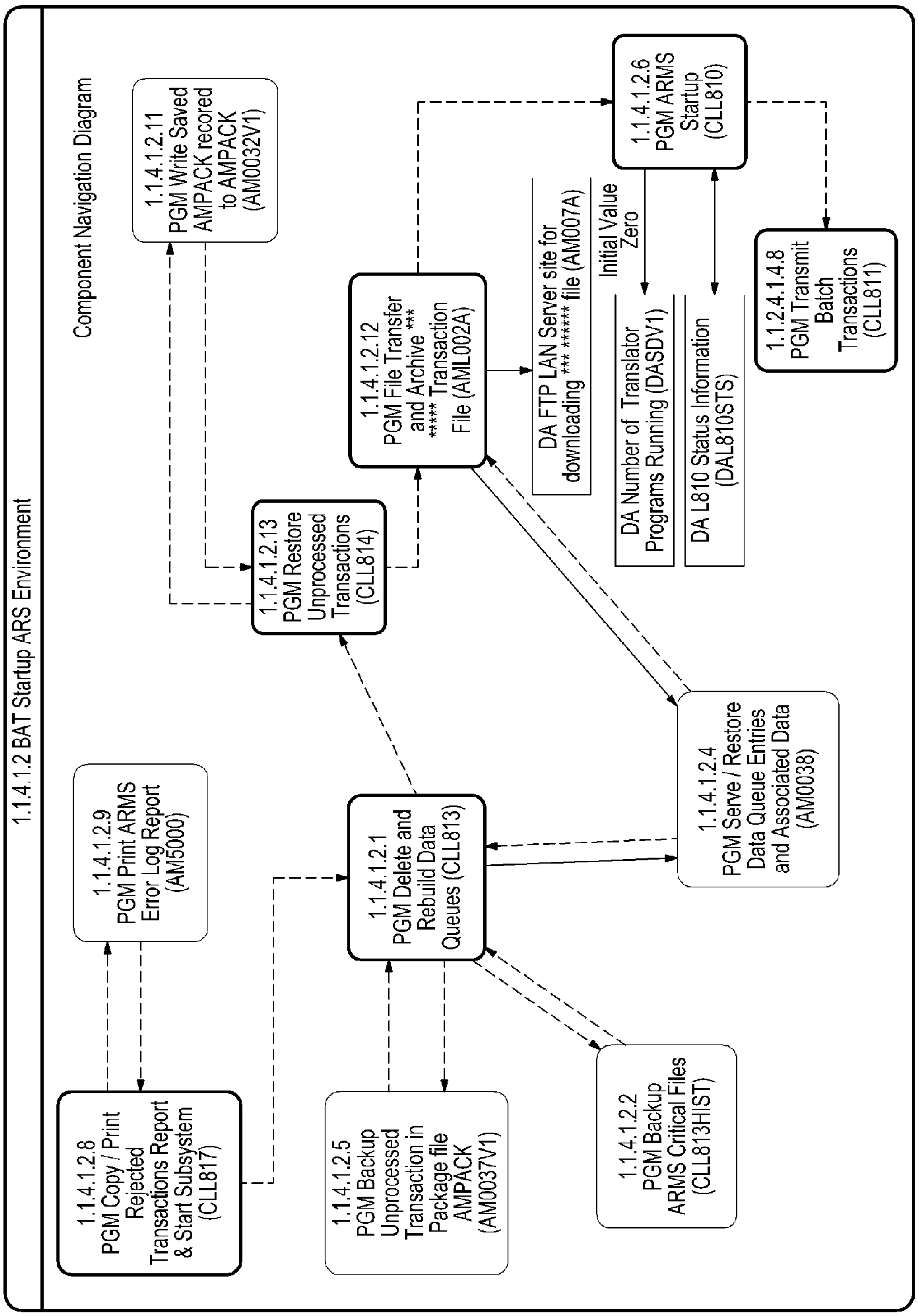
Figure 52:
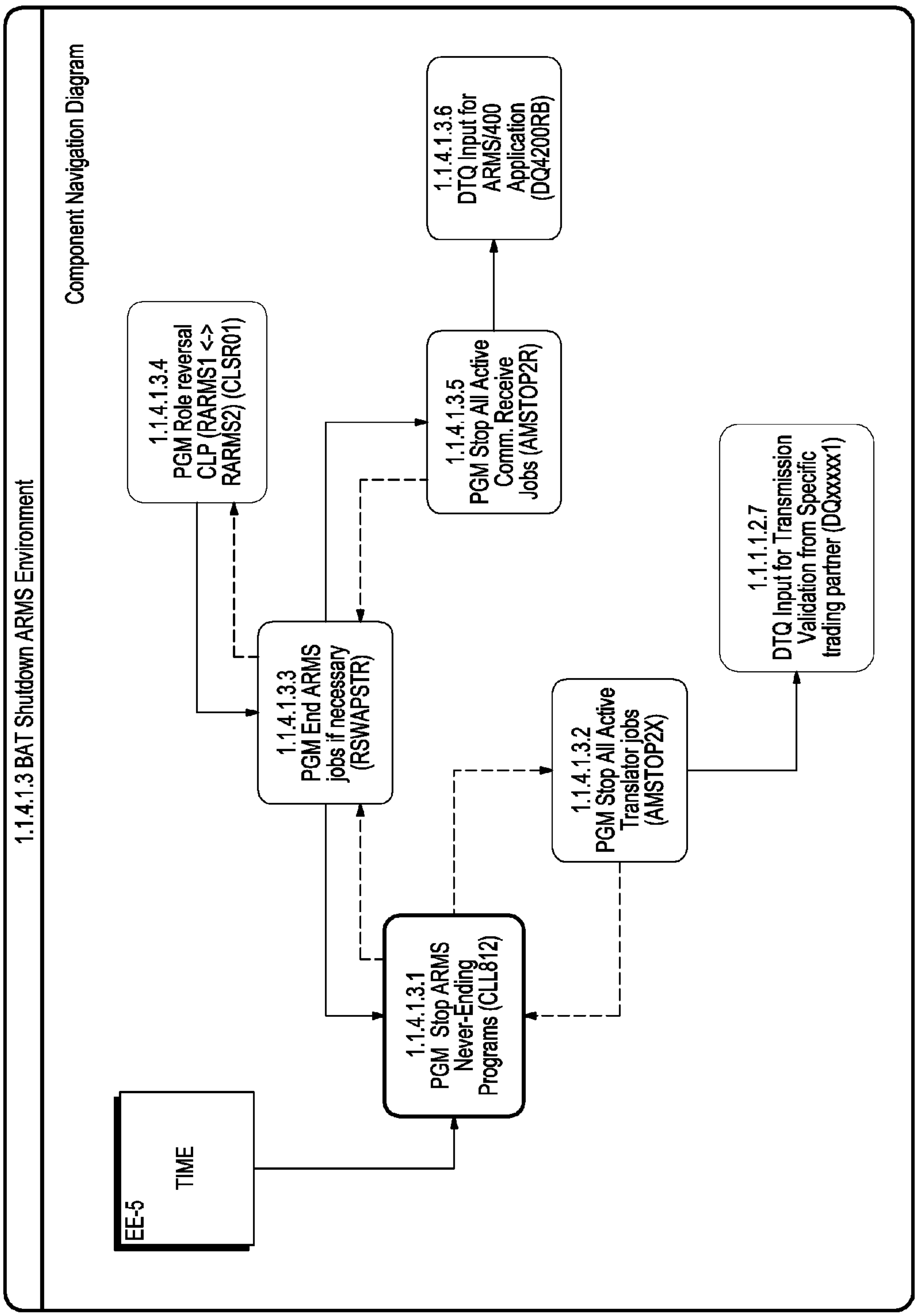
Figure 53:
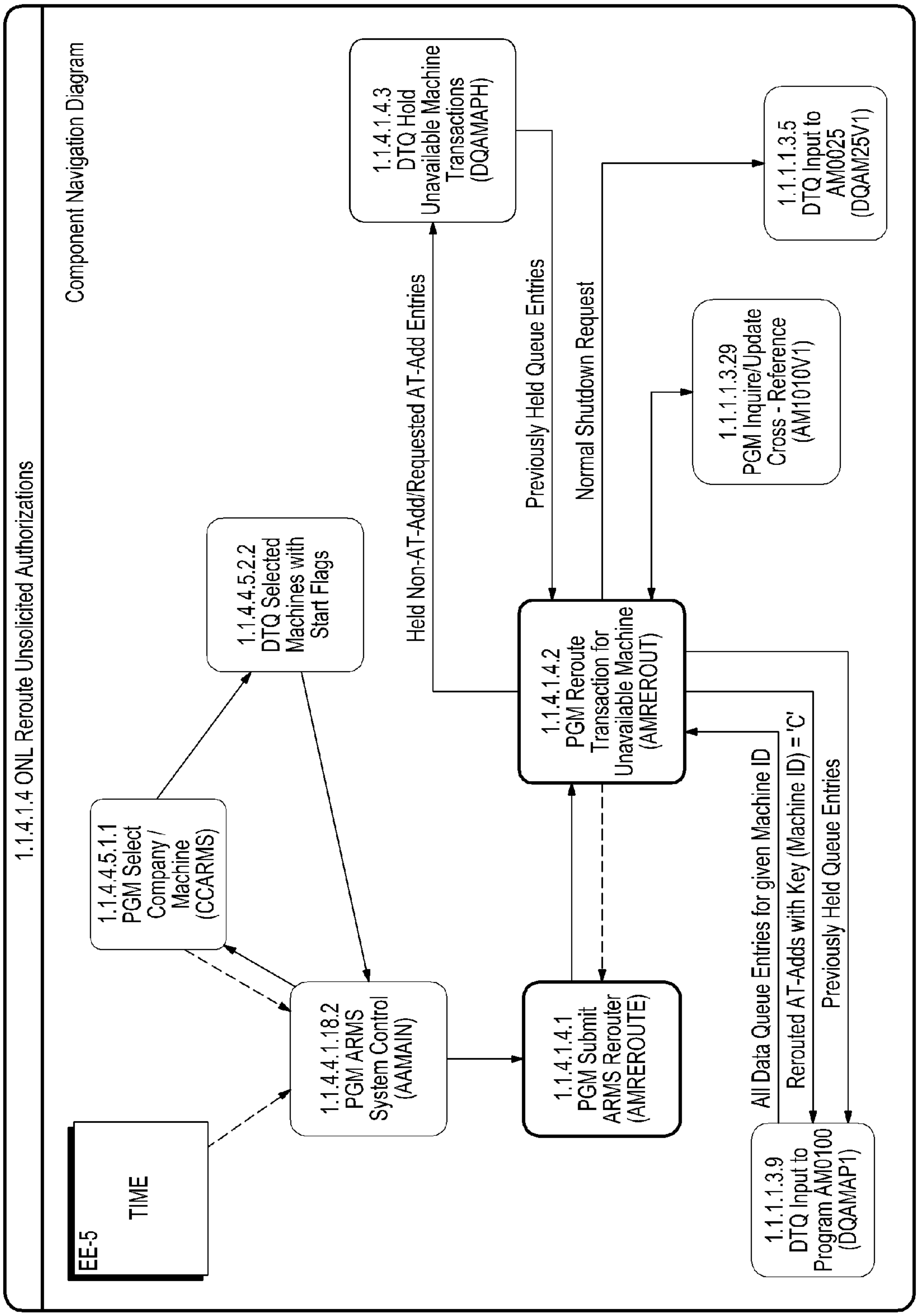
Figure 54:
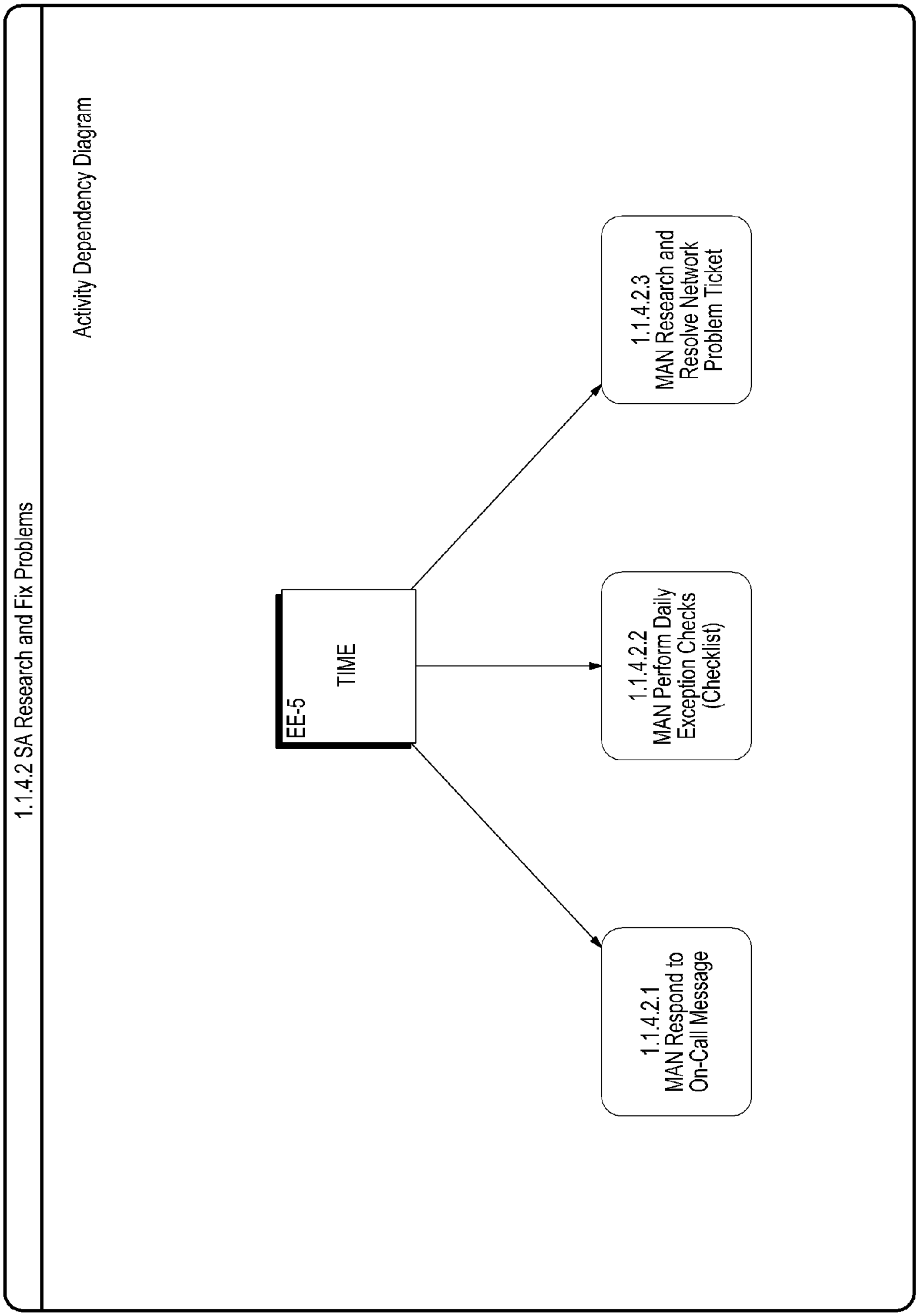
Figure 55:
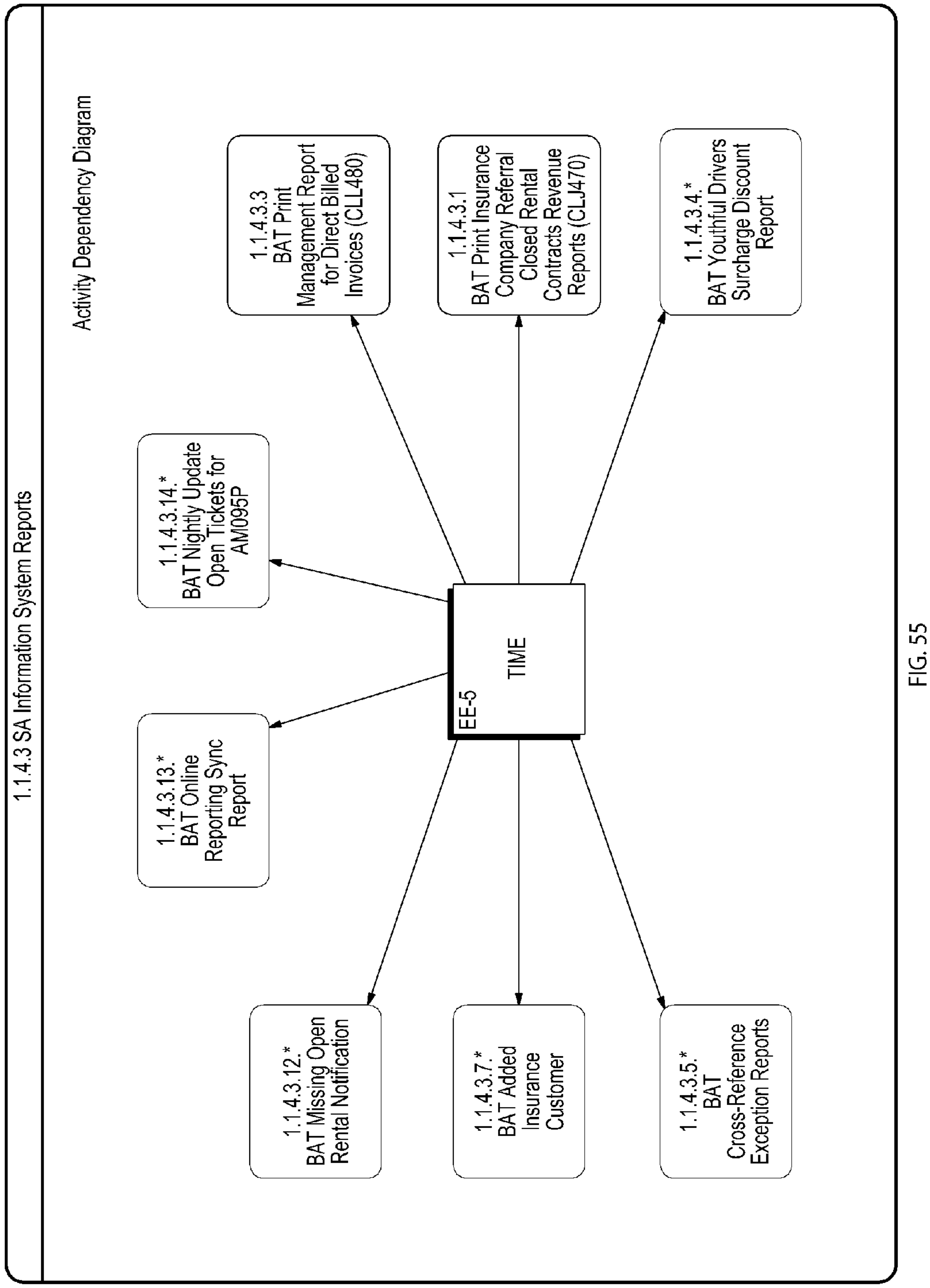
Figure 56:
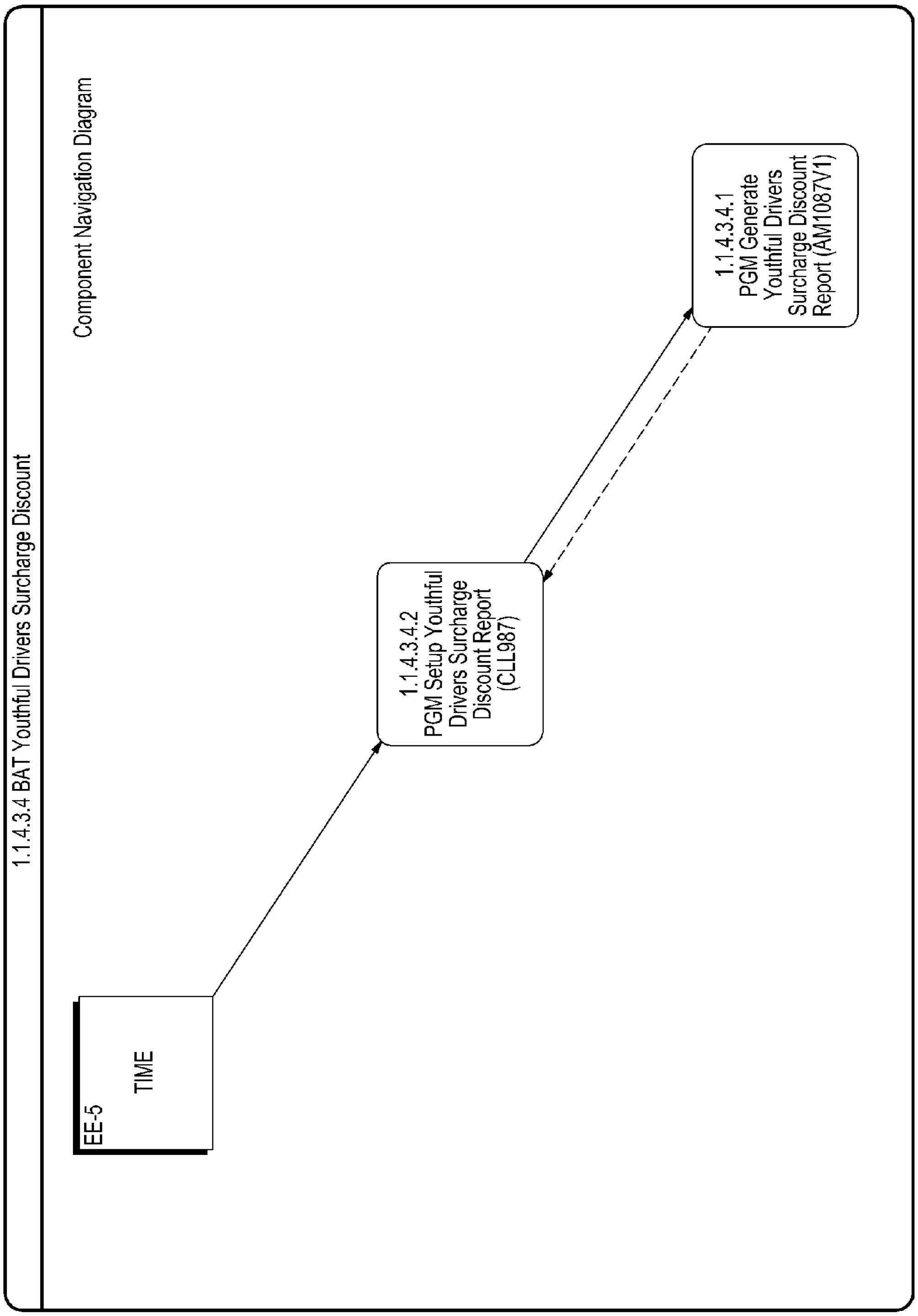
Figure 57:
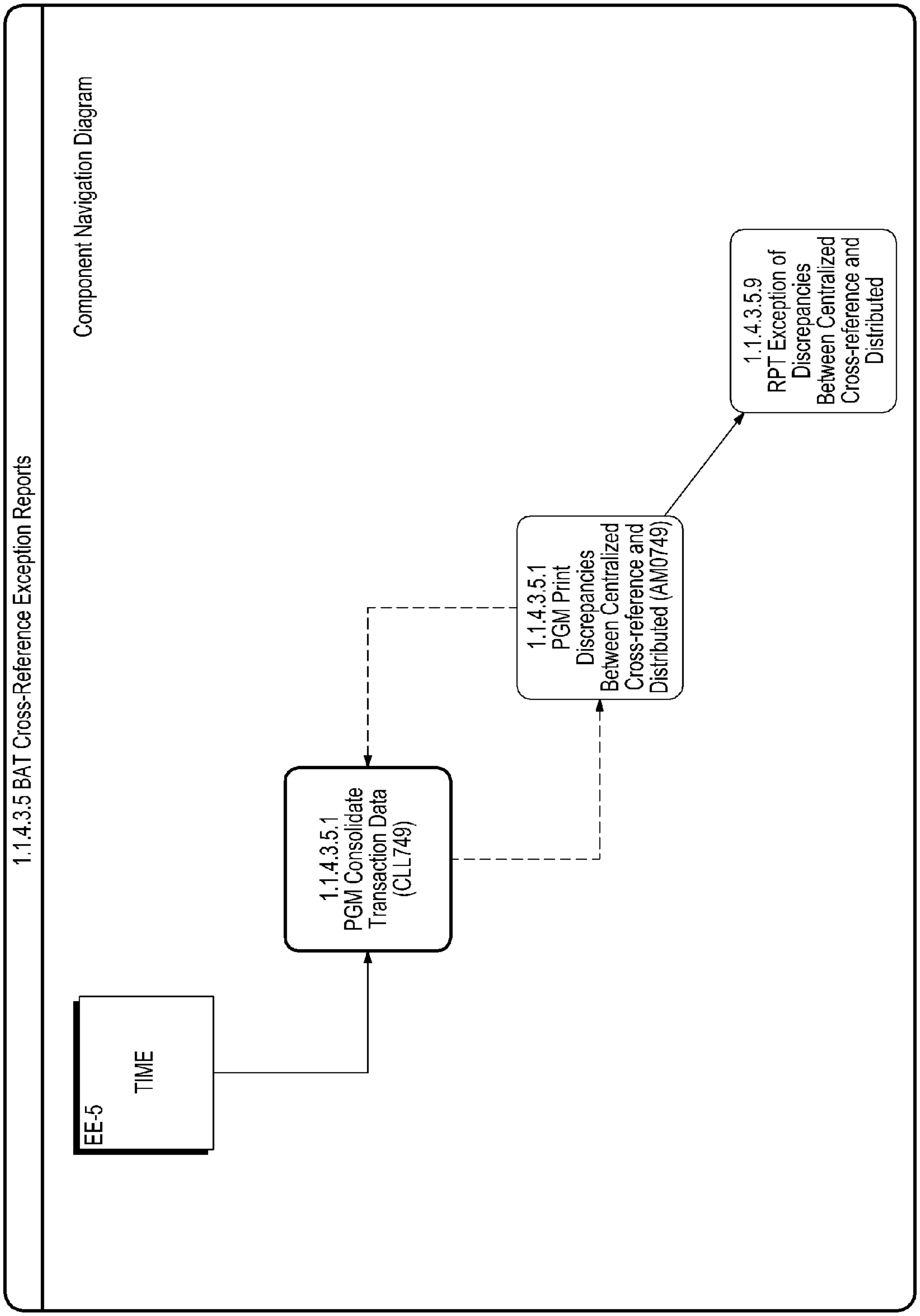
Figure 58:
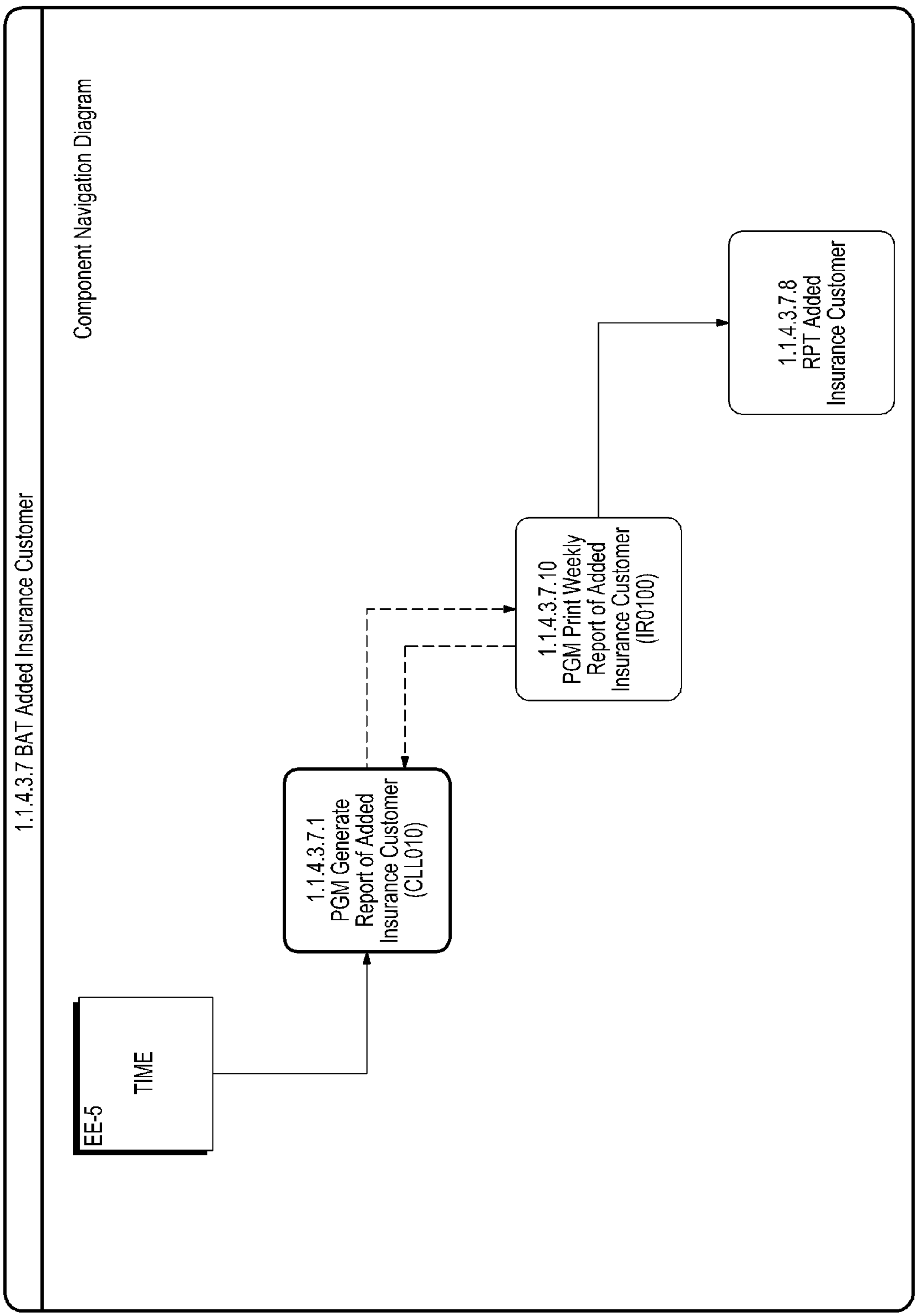
Figure 59:
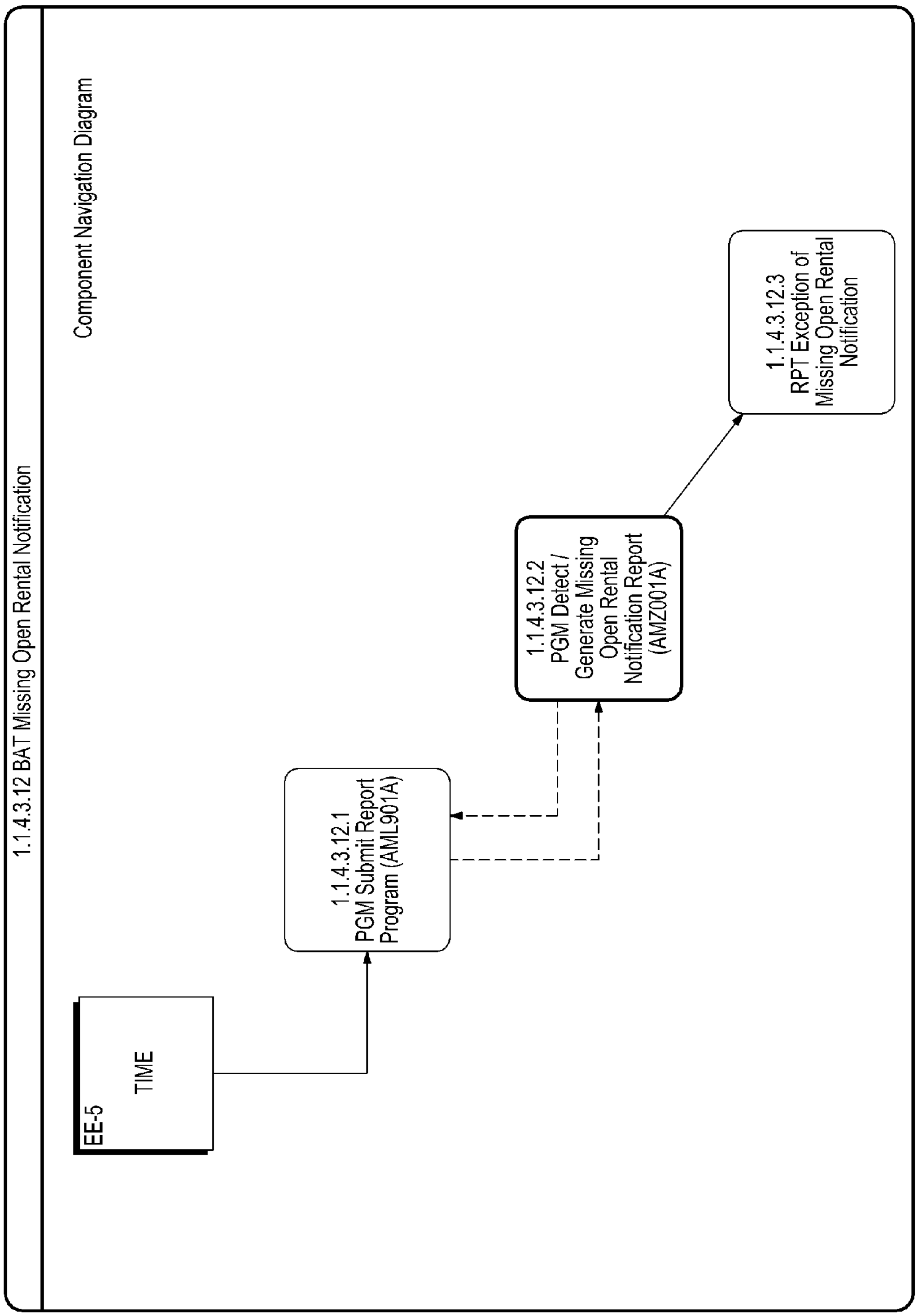
Figure 60:
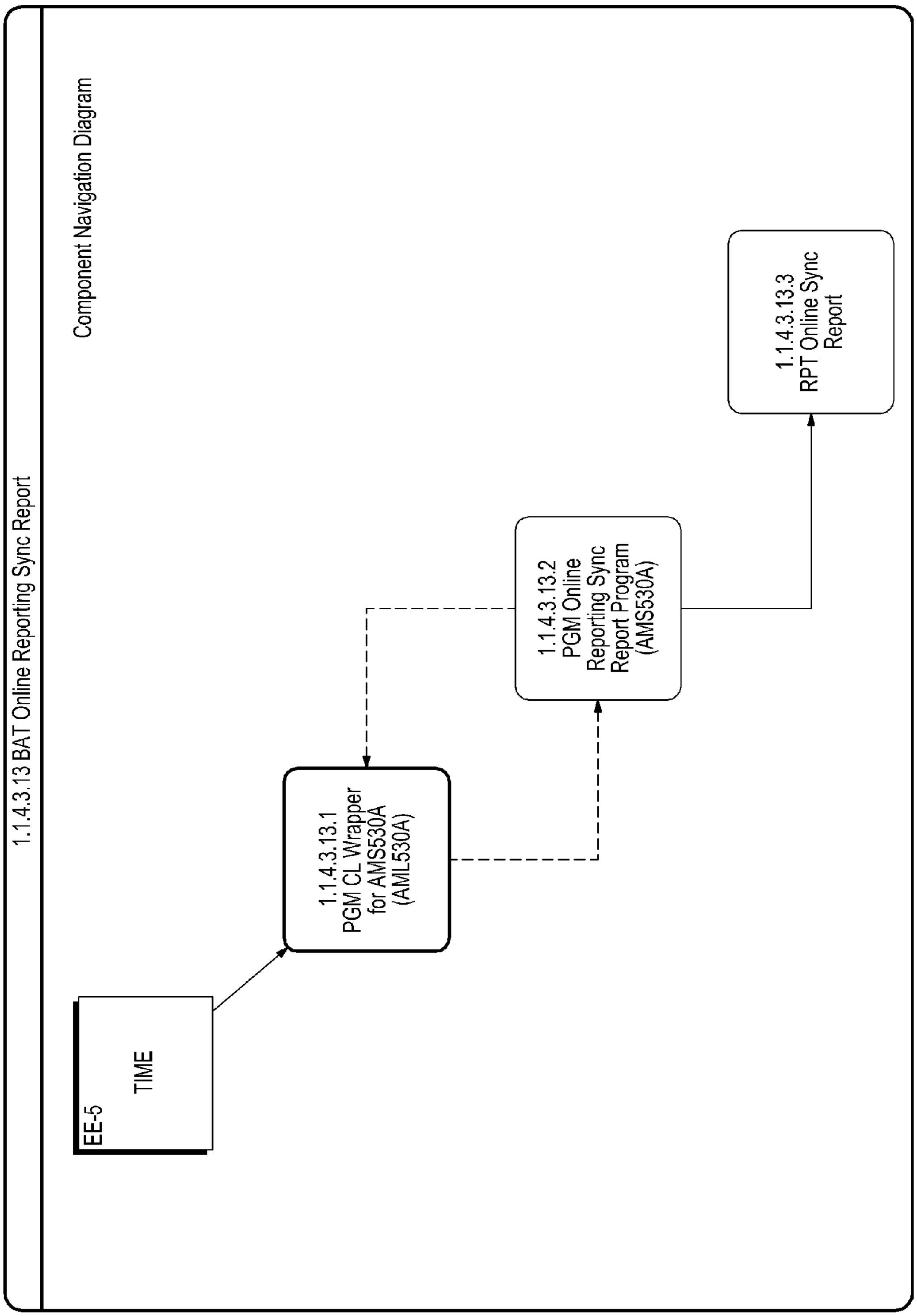
Figure 61:
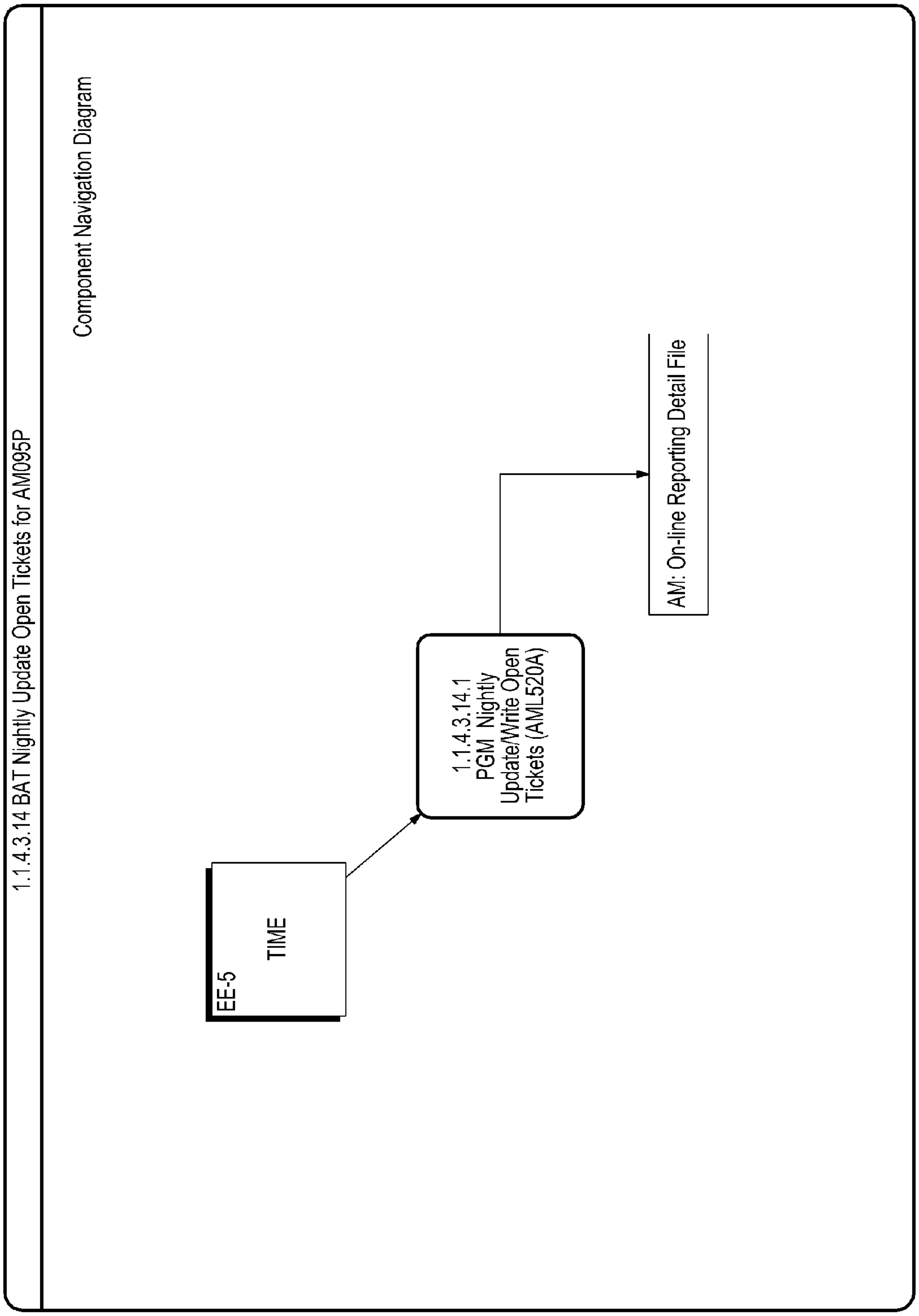
Figure 62:
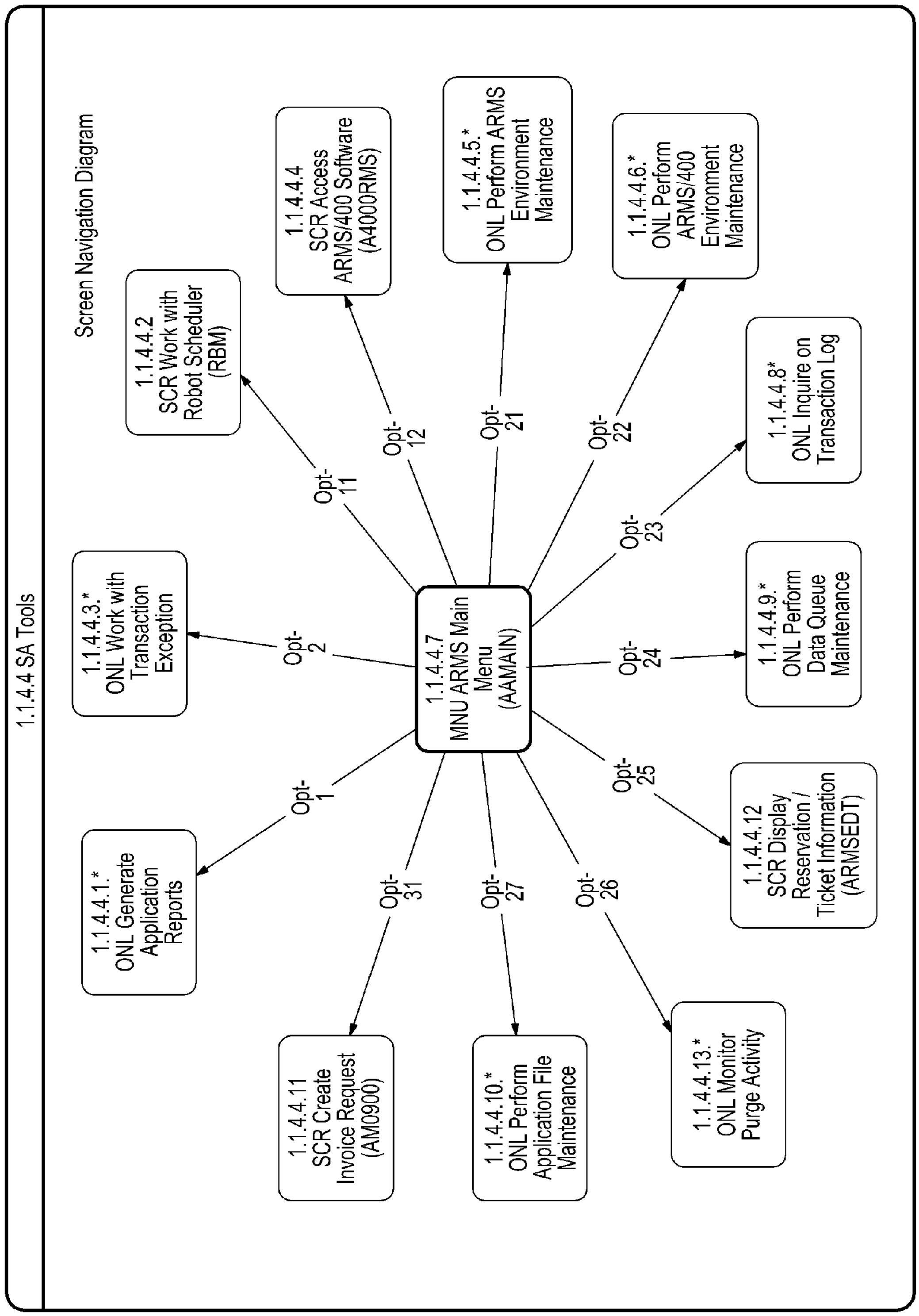
Figure 63:
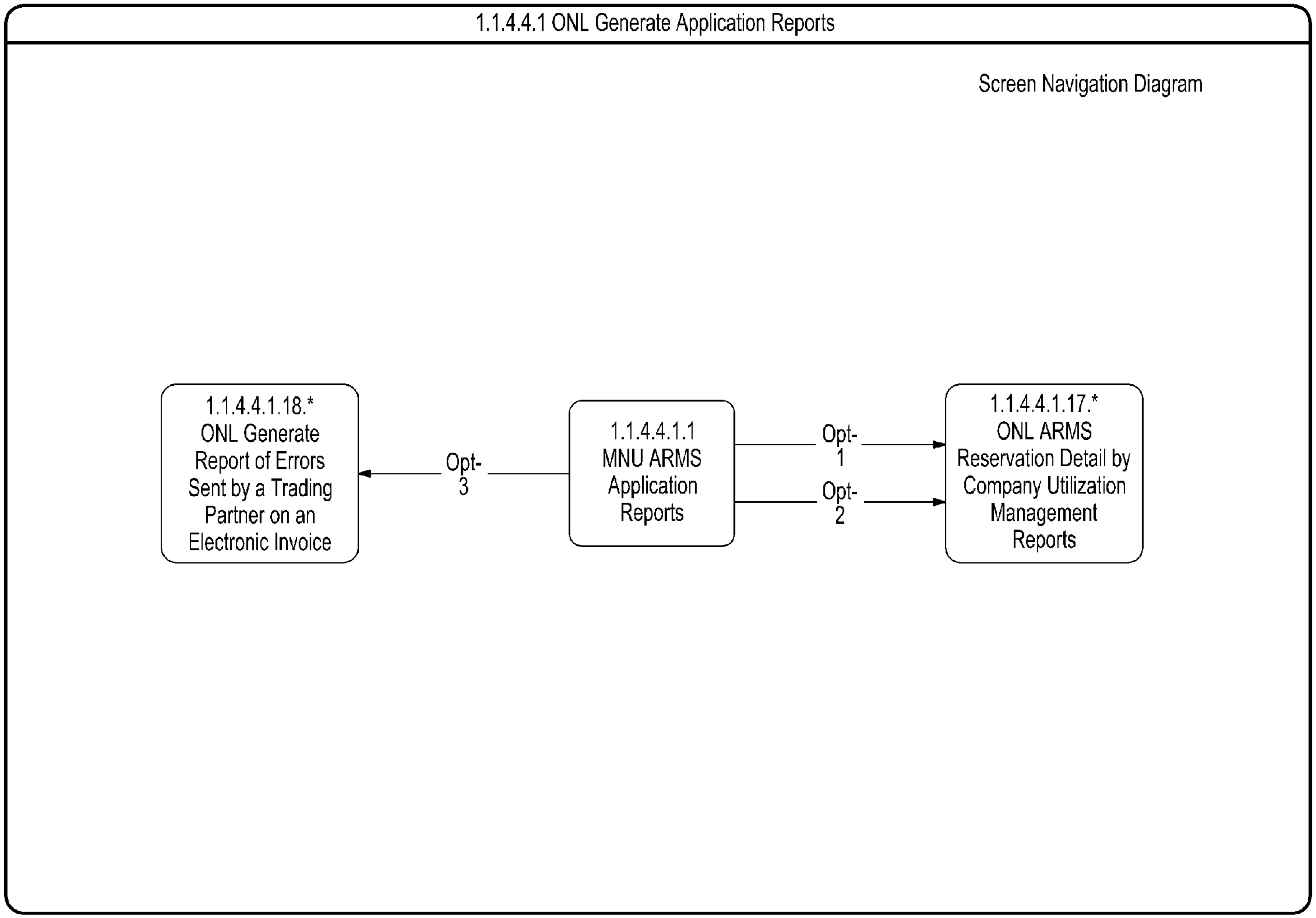
Figure 64:
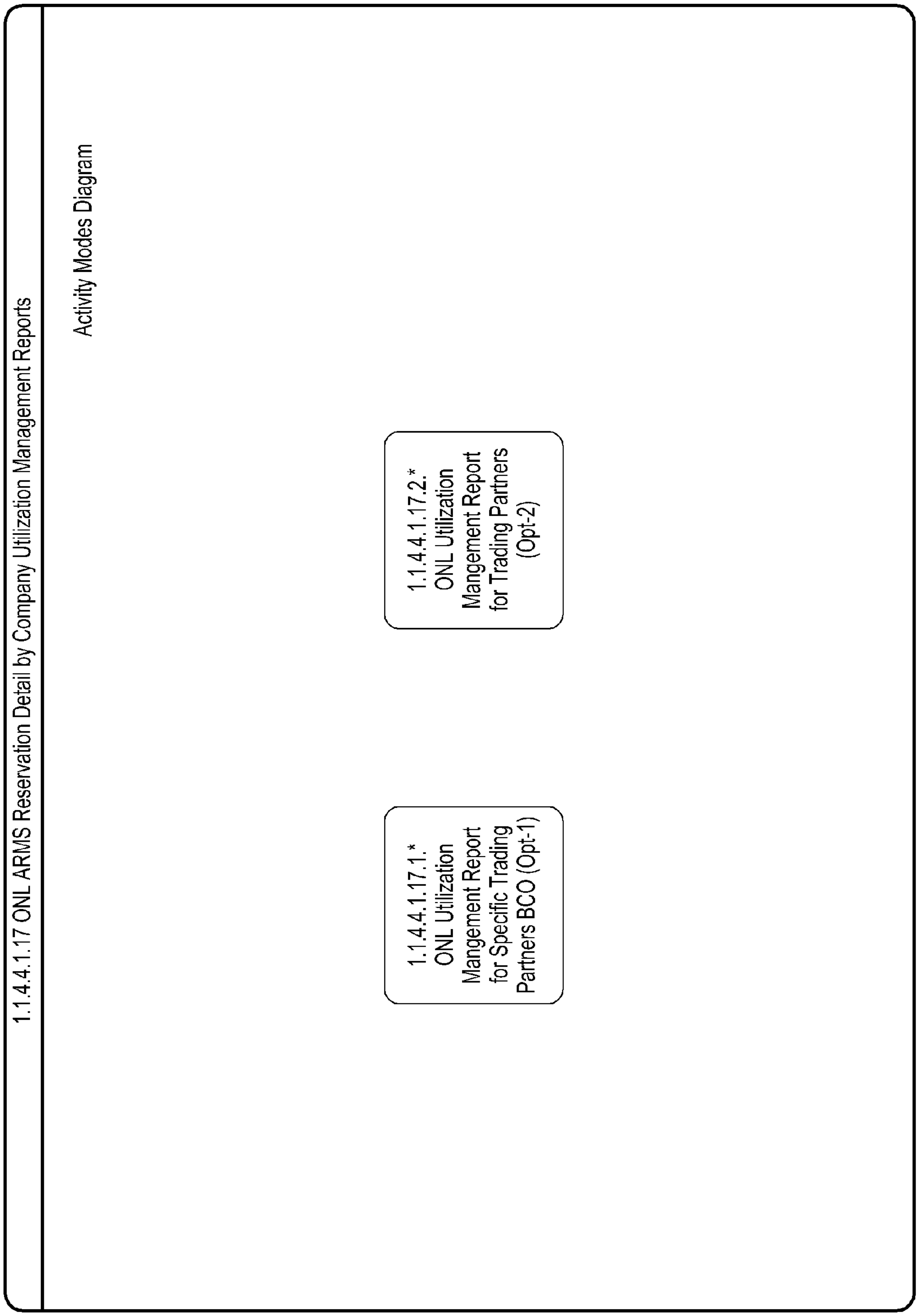
Figure 65:
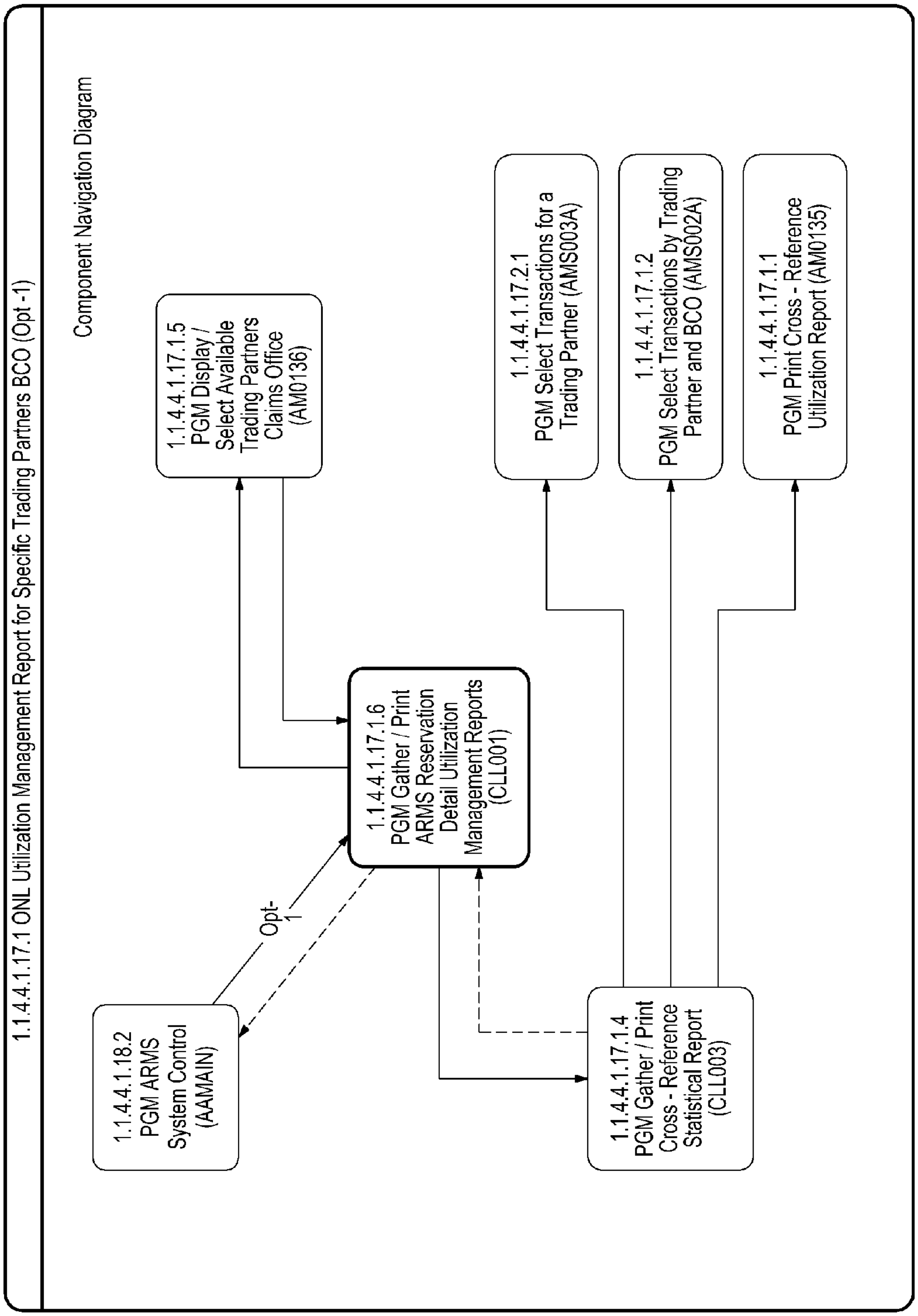
Figure 66:
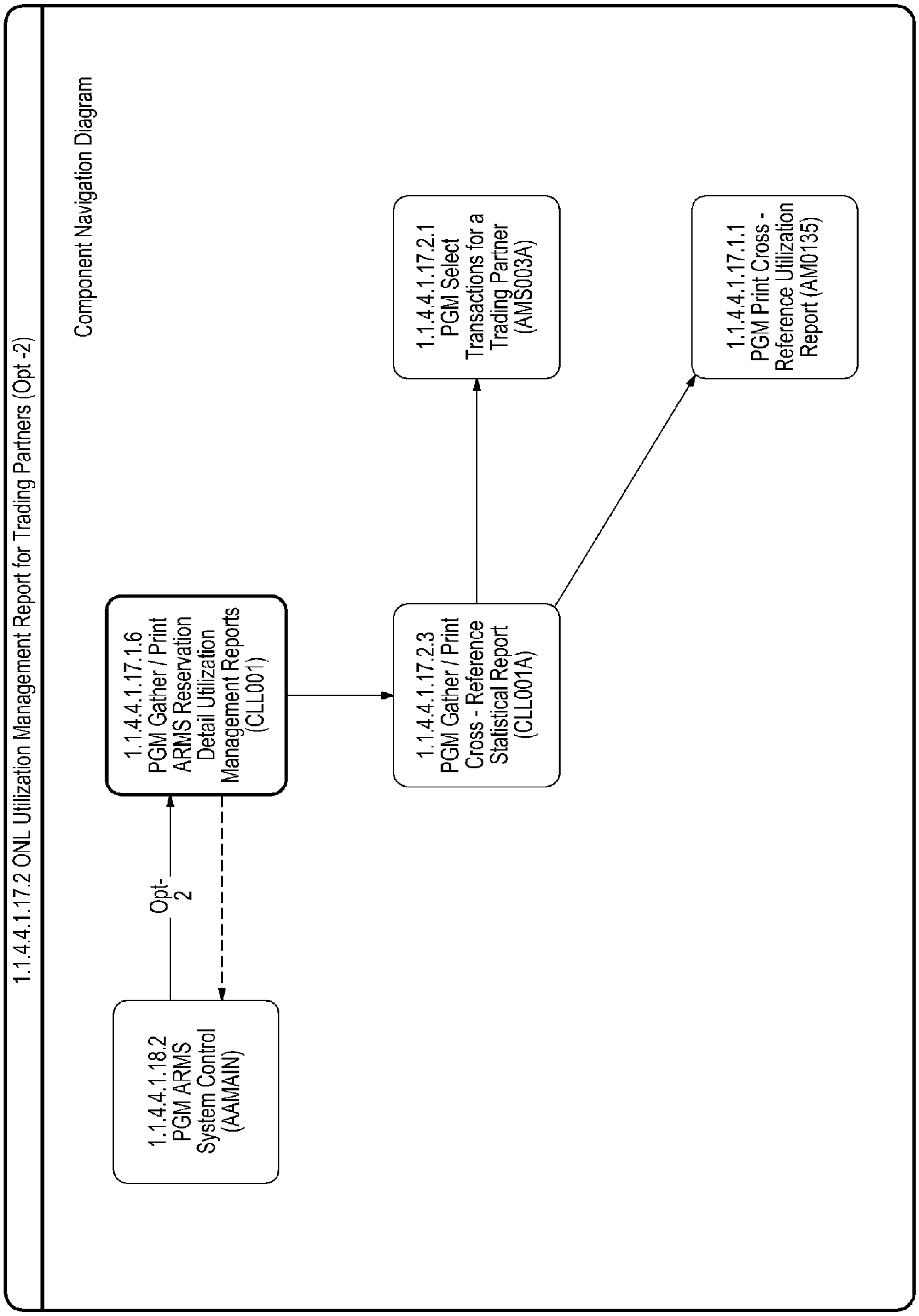
Figure 67:
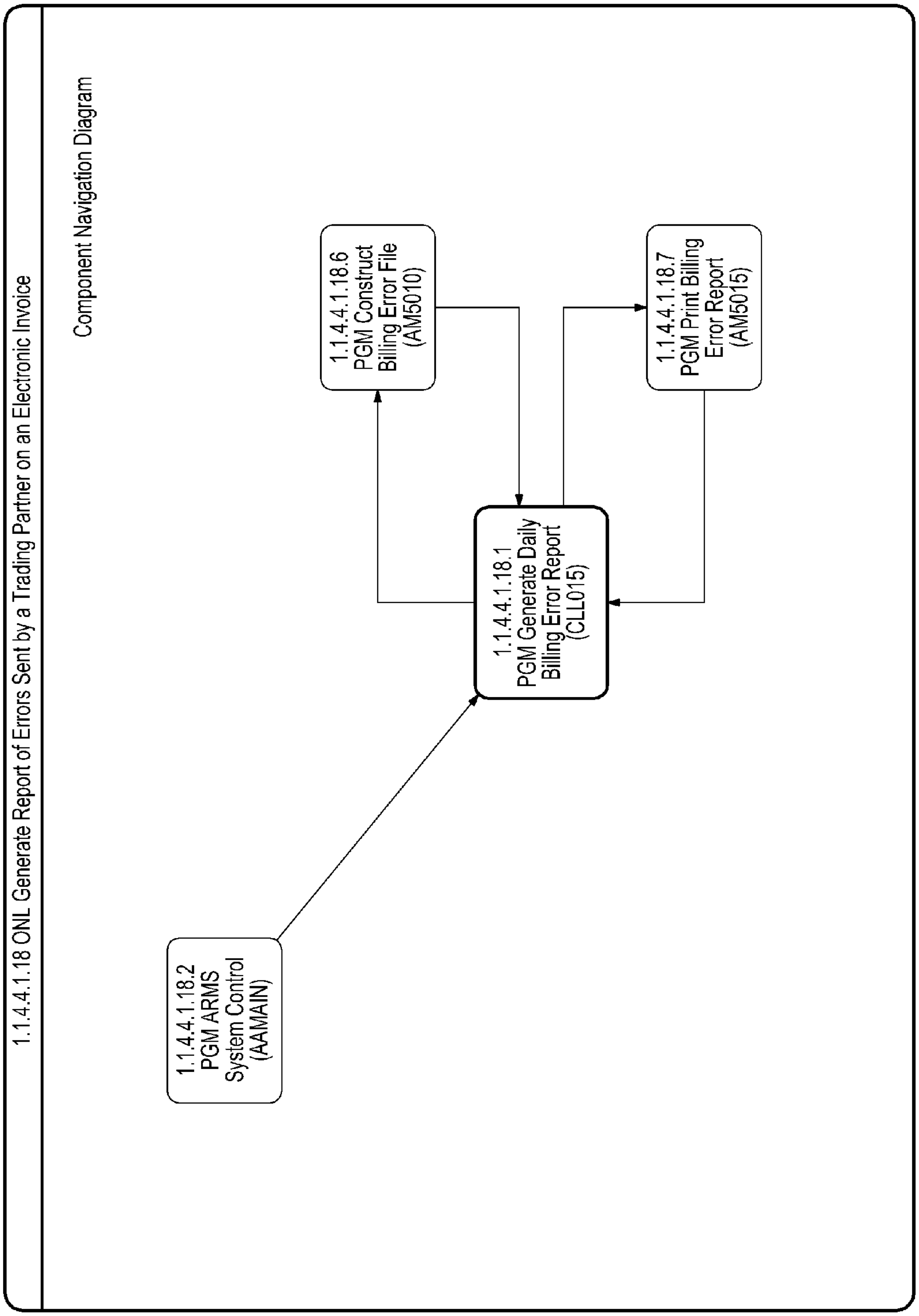
Figure 68:
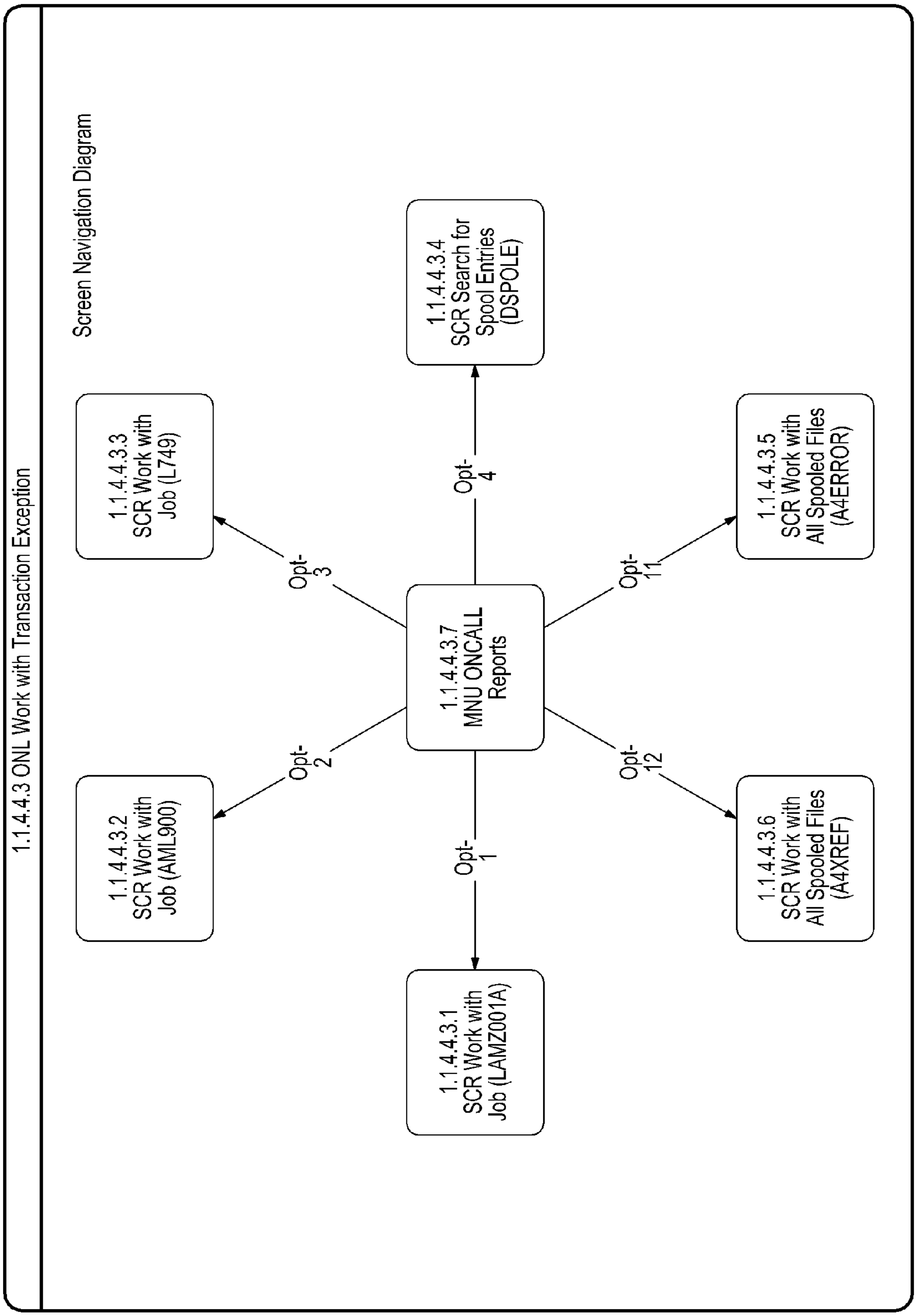
Figure 69:
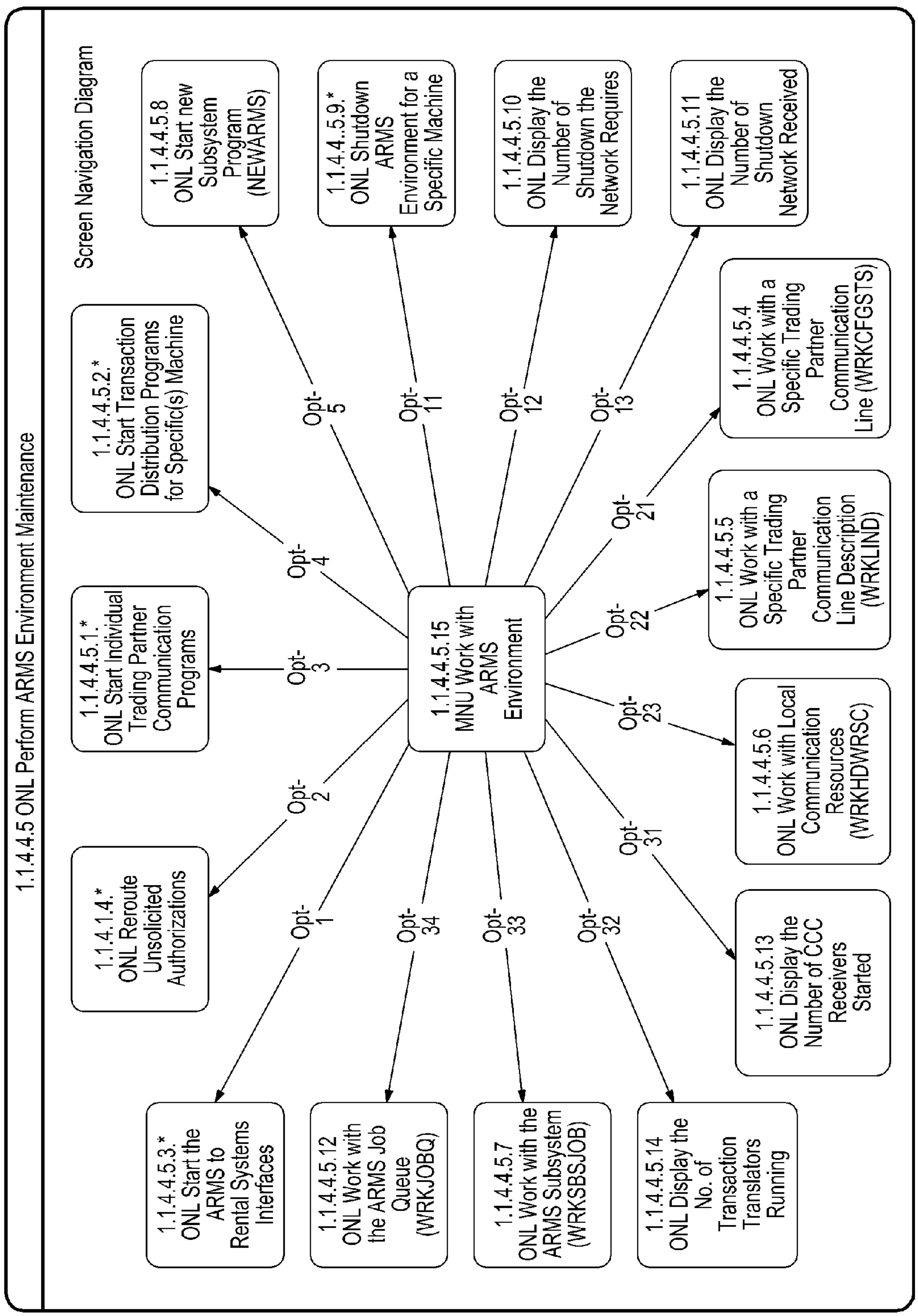
Figure 70:
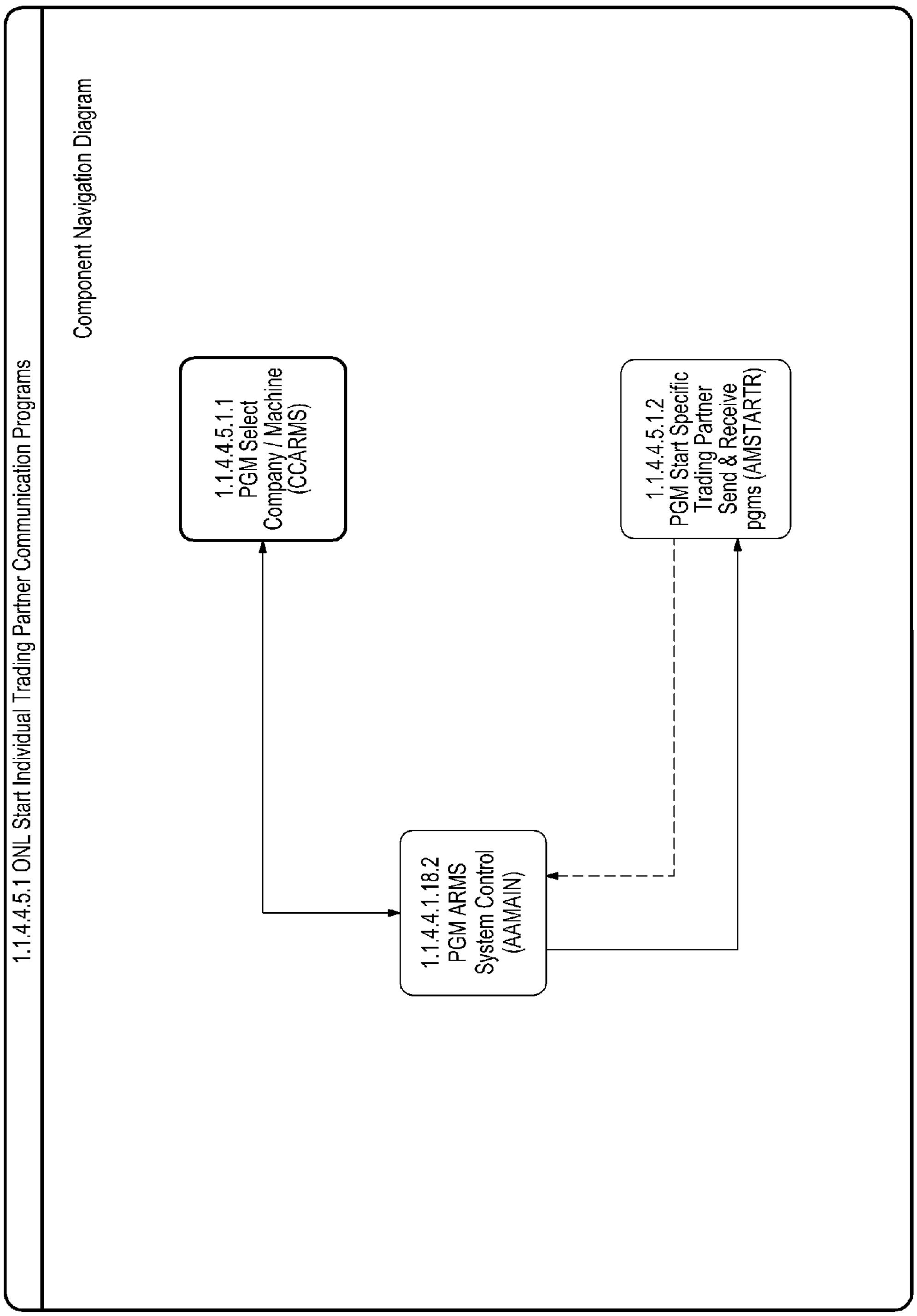
Figure 71:
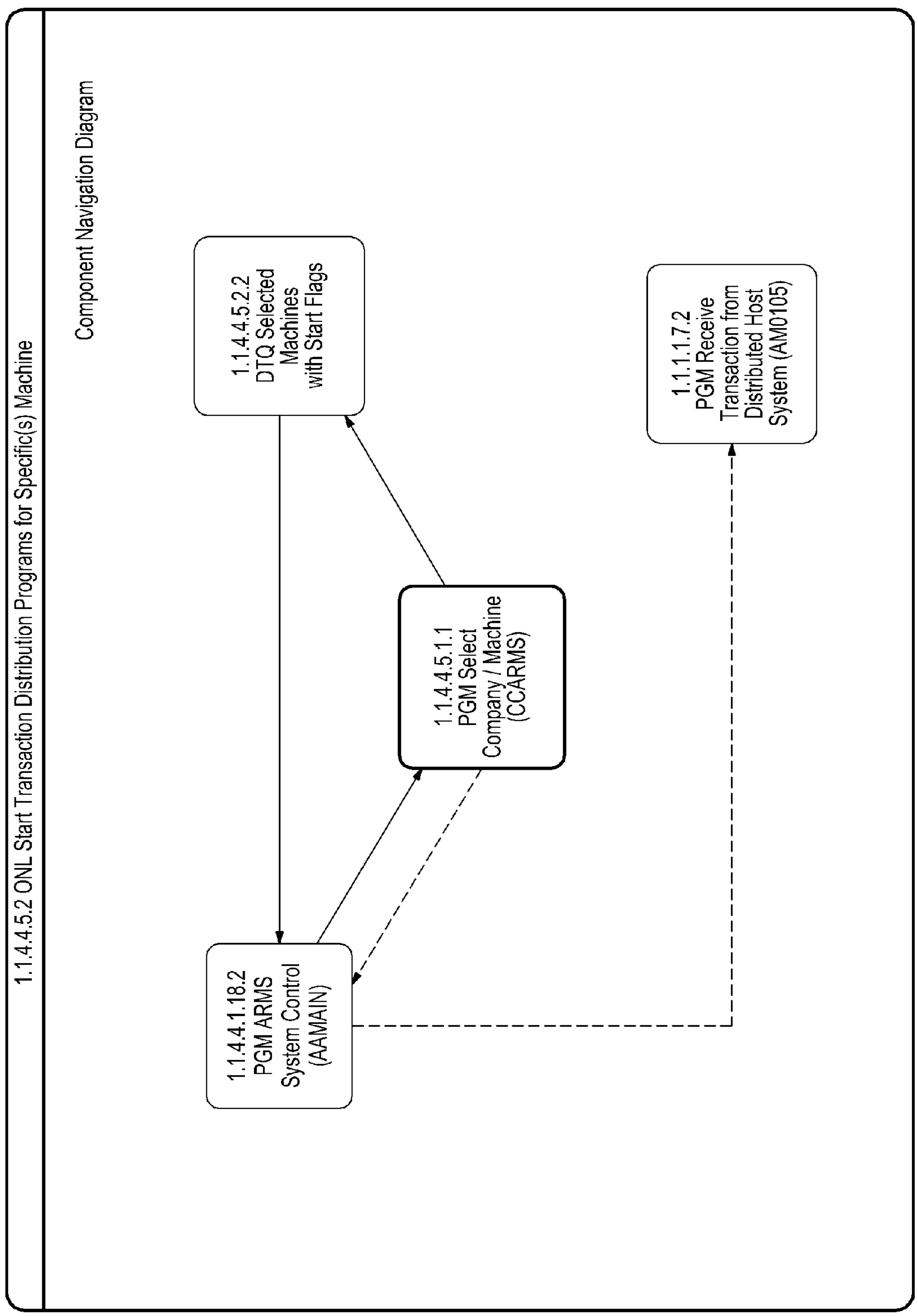
Figure 72:
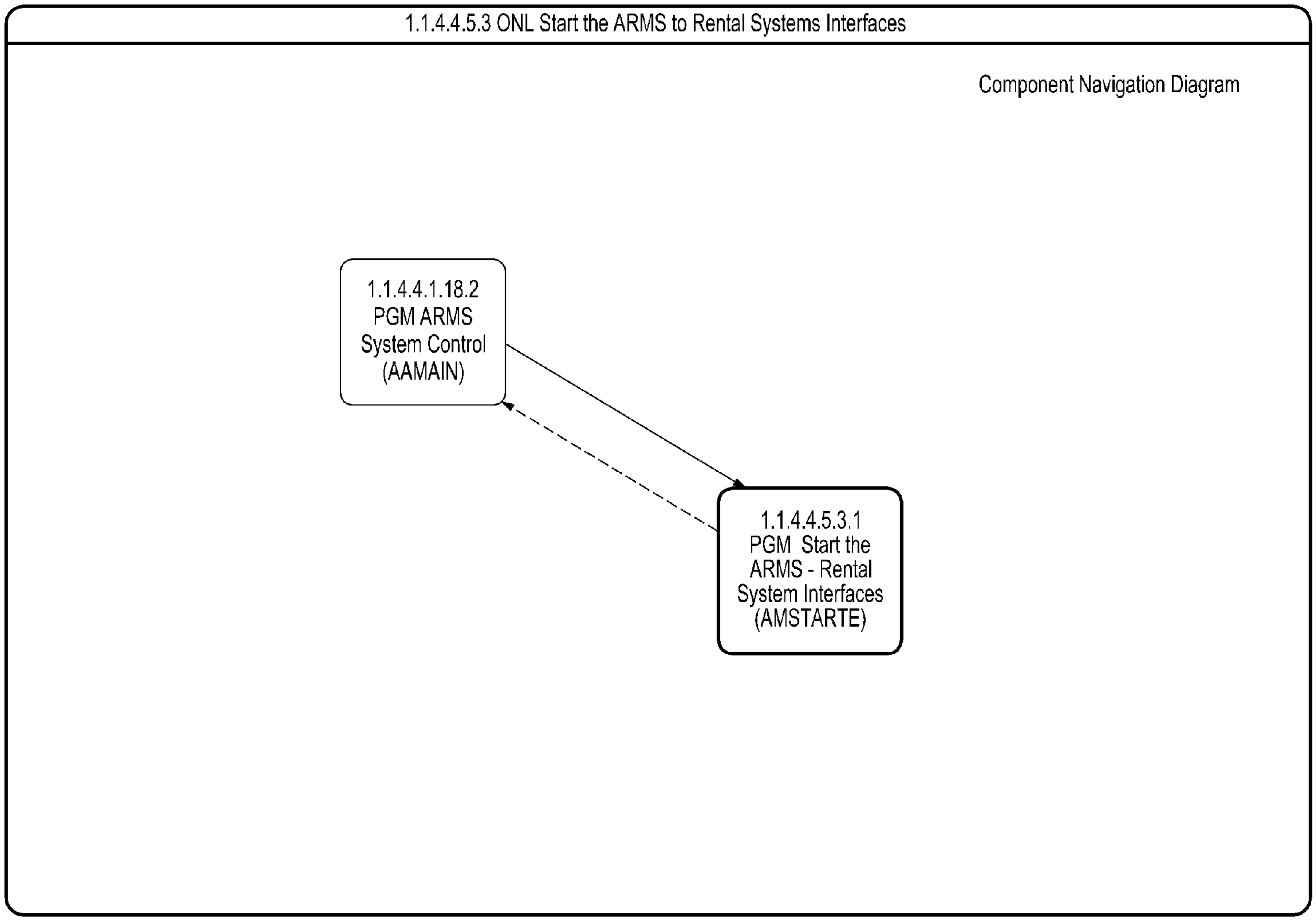
Figure 73:
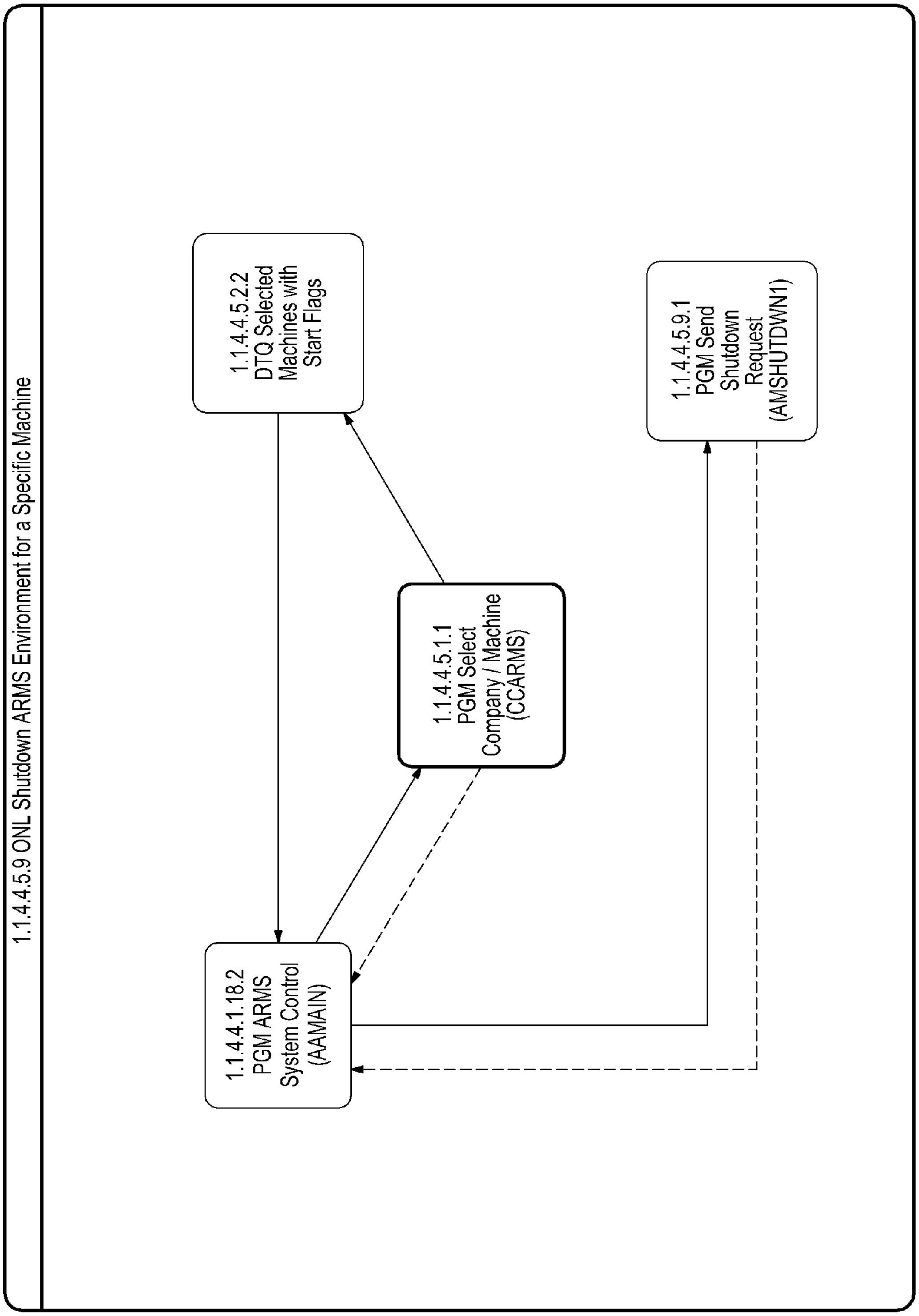
Figure 74:
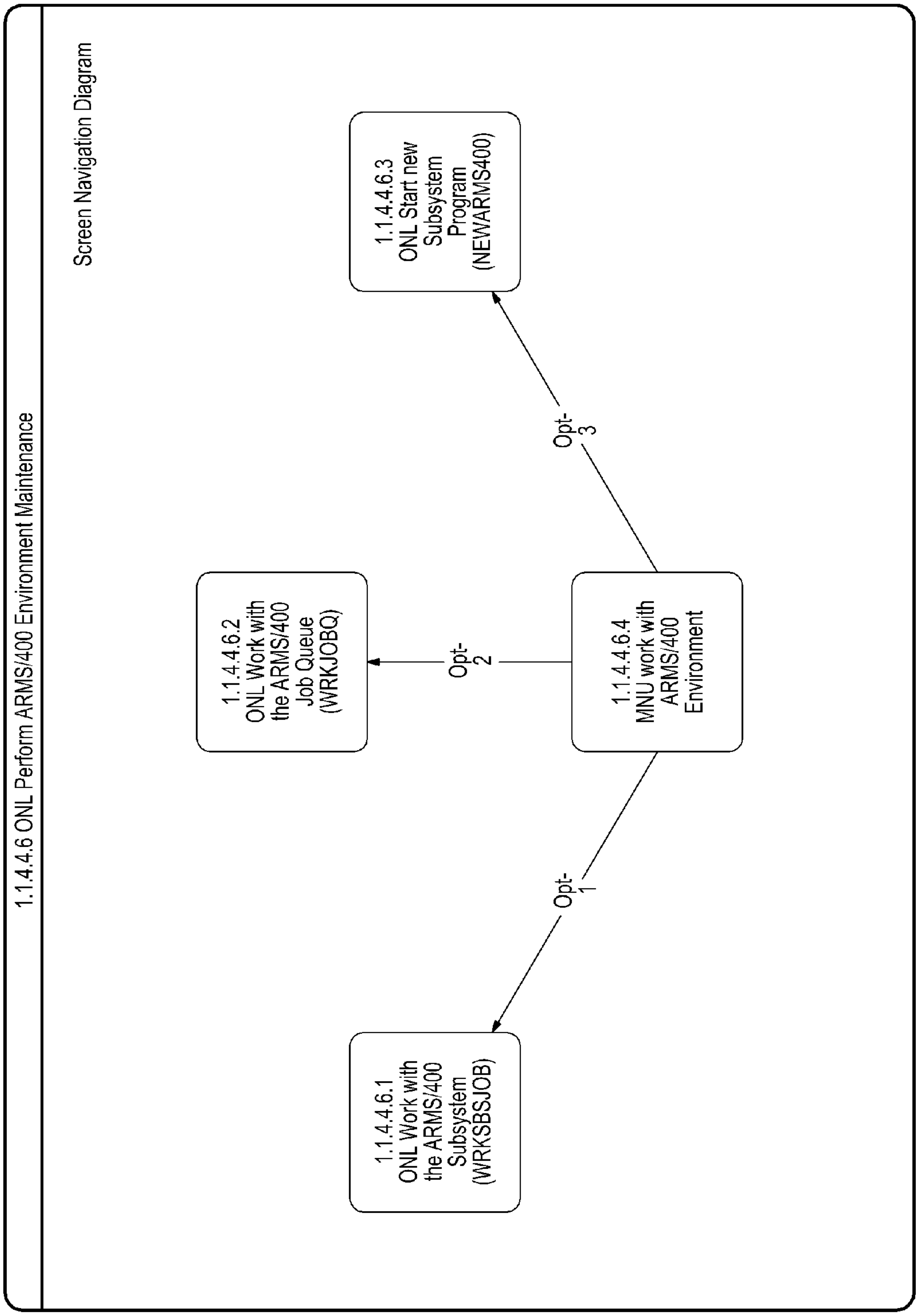
Figure 75:
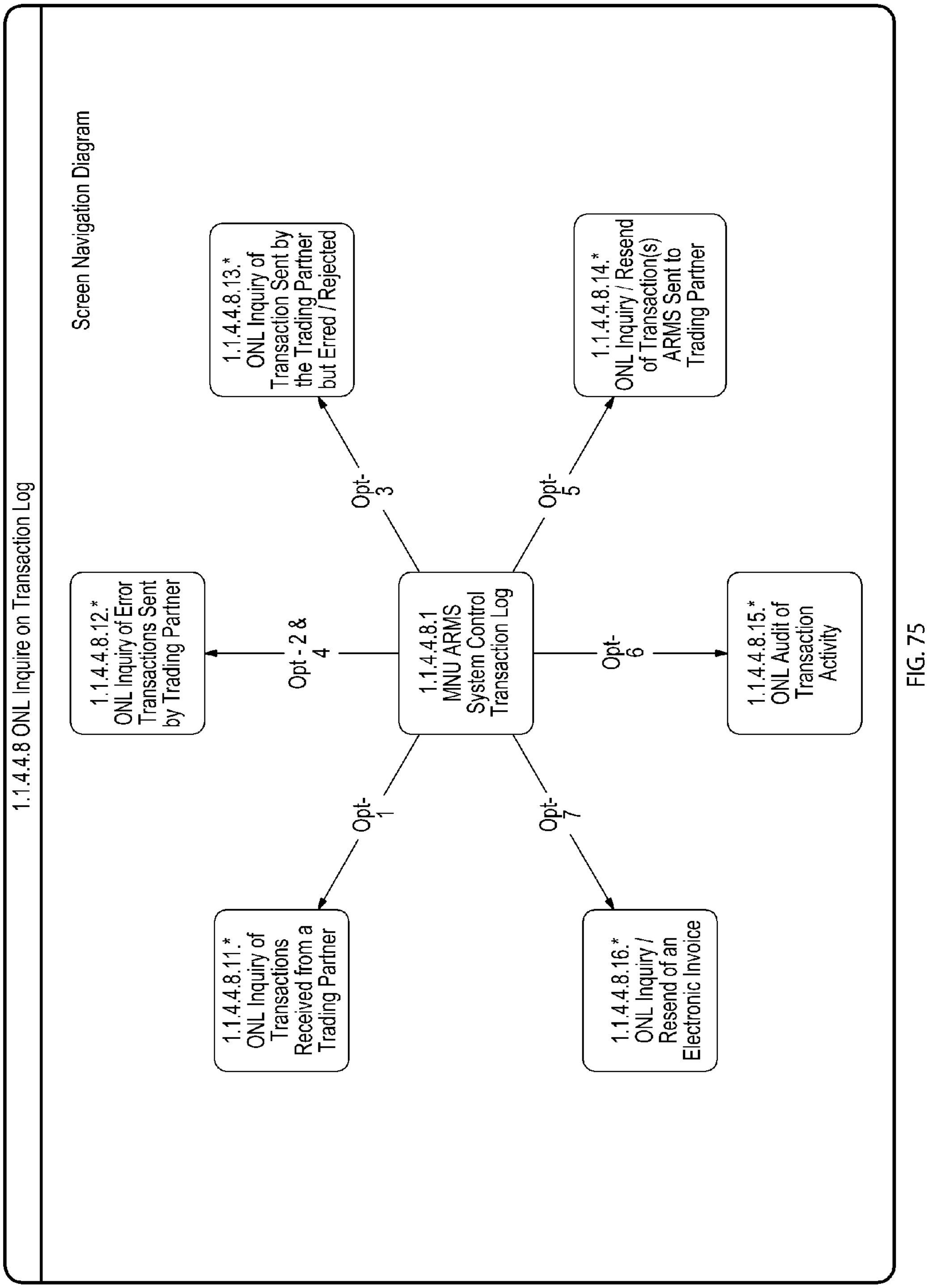
Figure 76:
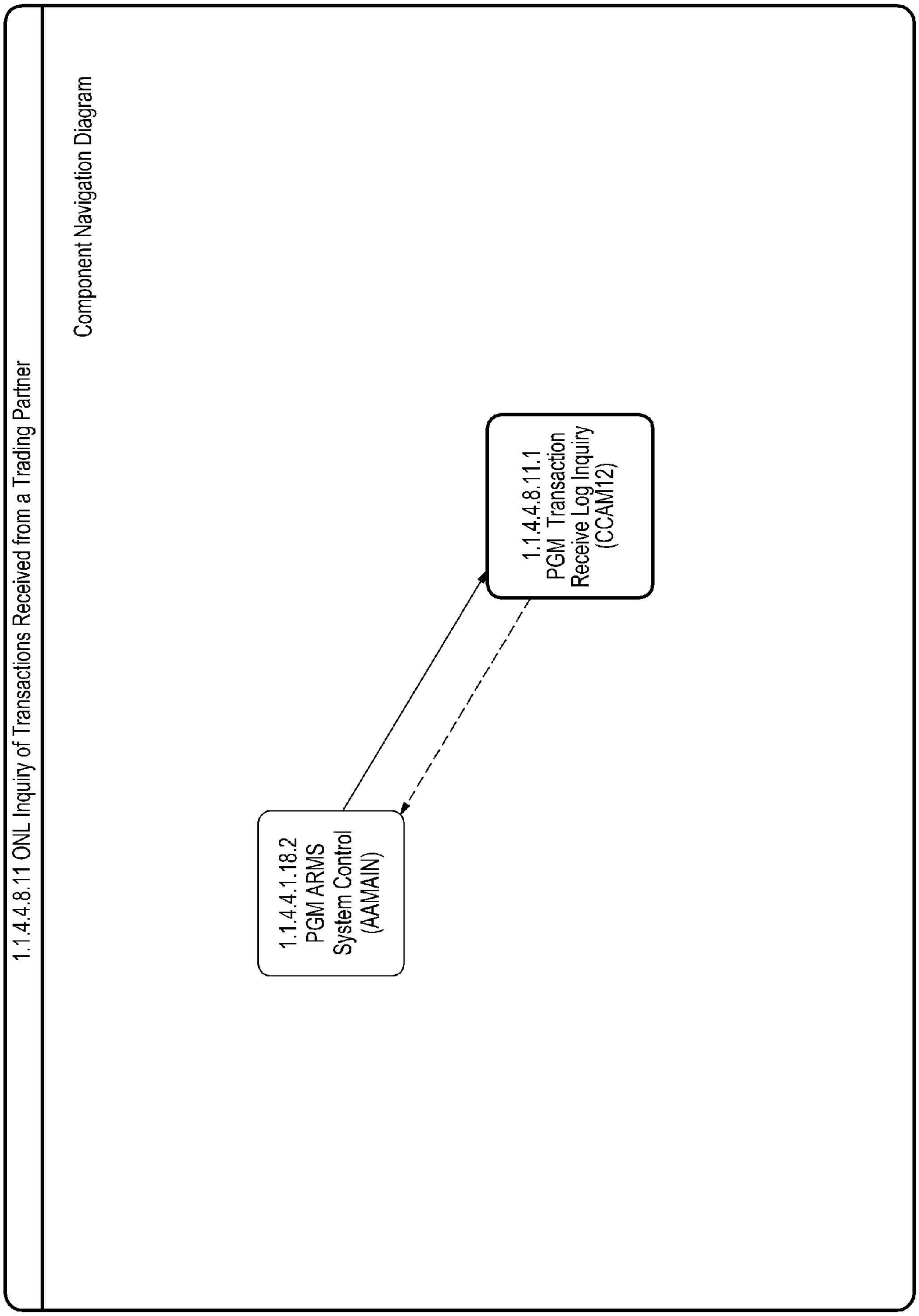
Figure 77:
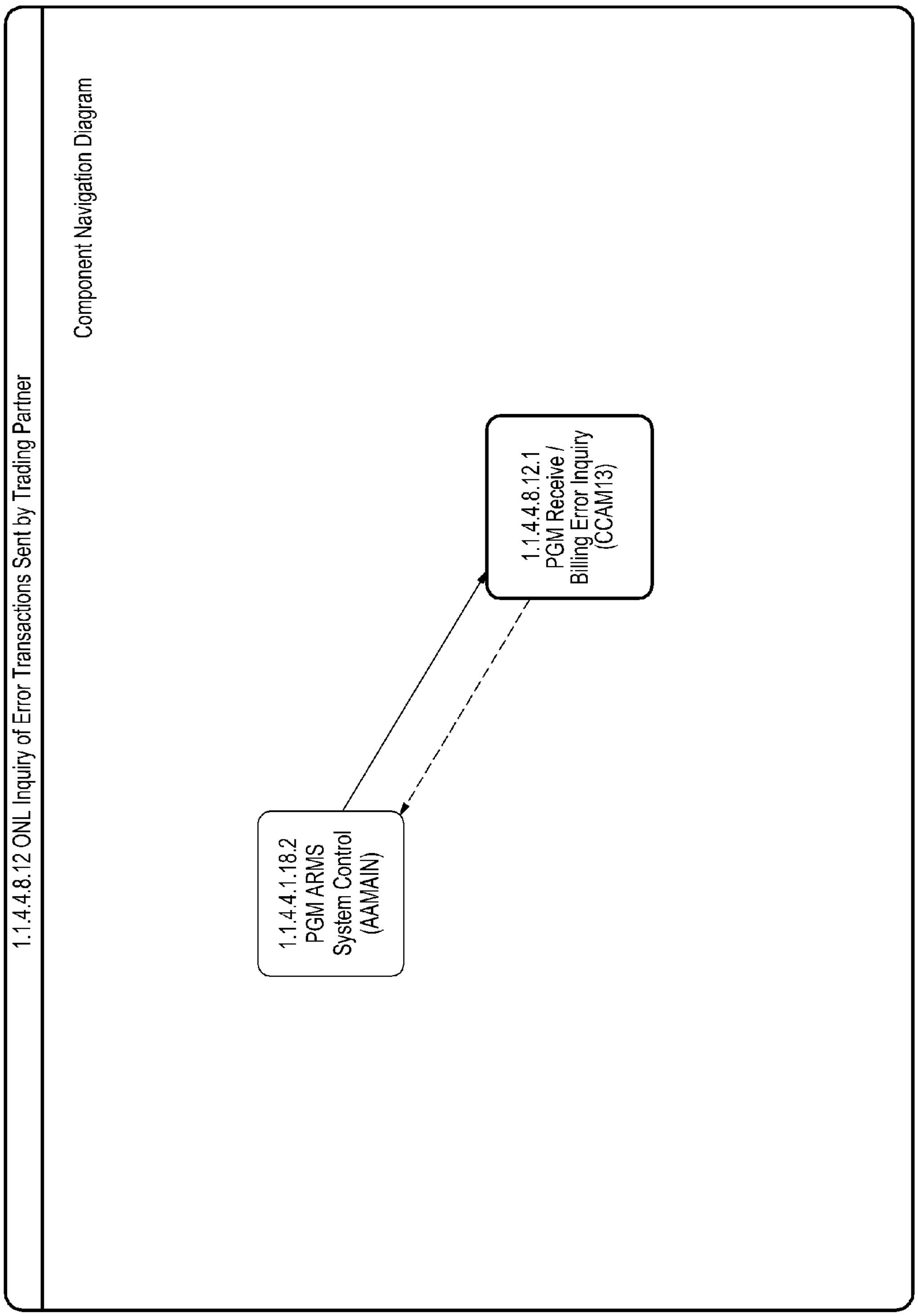
Figure 78:
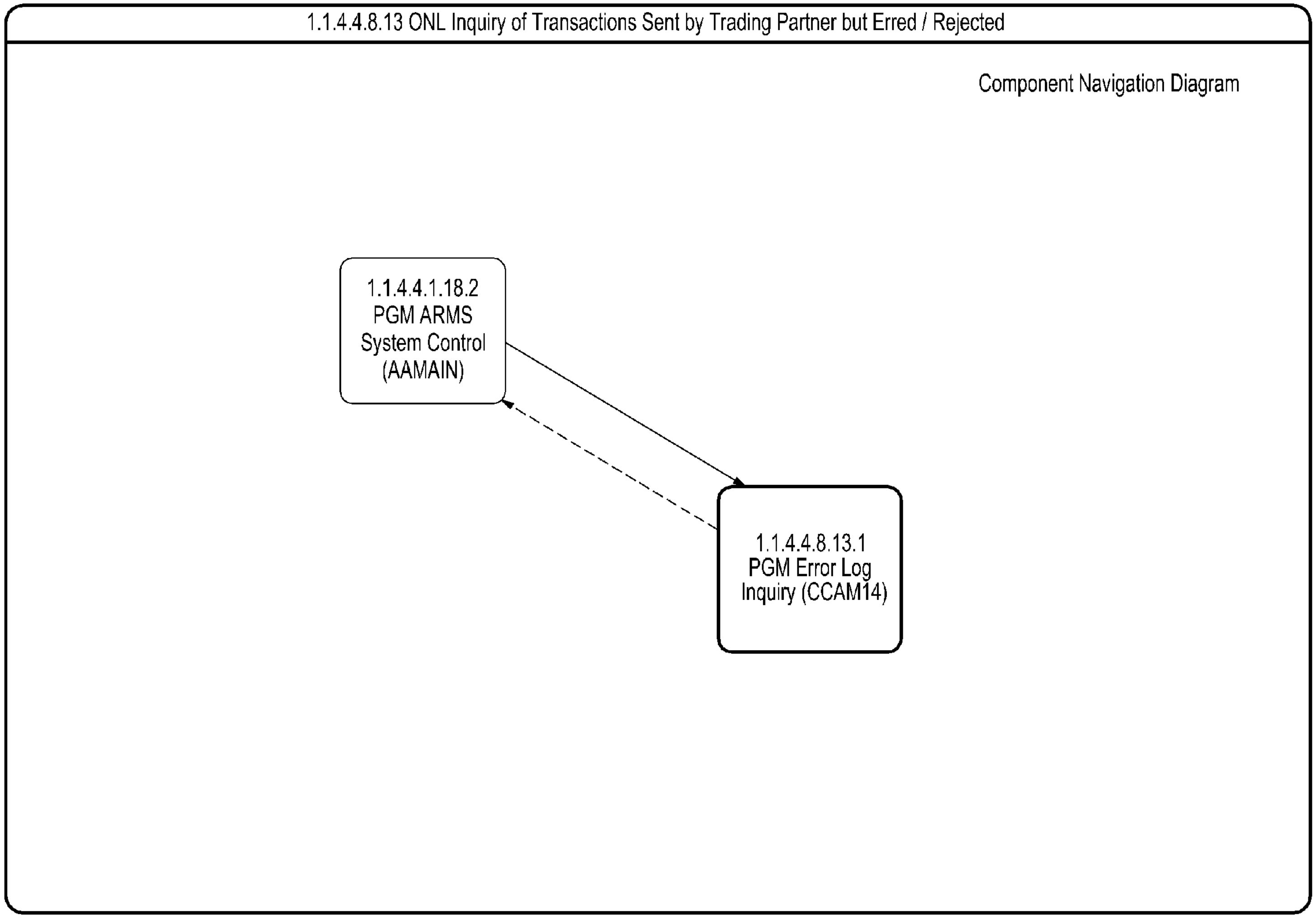
Figure 79:
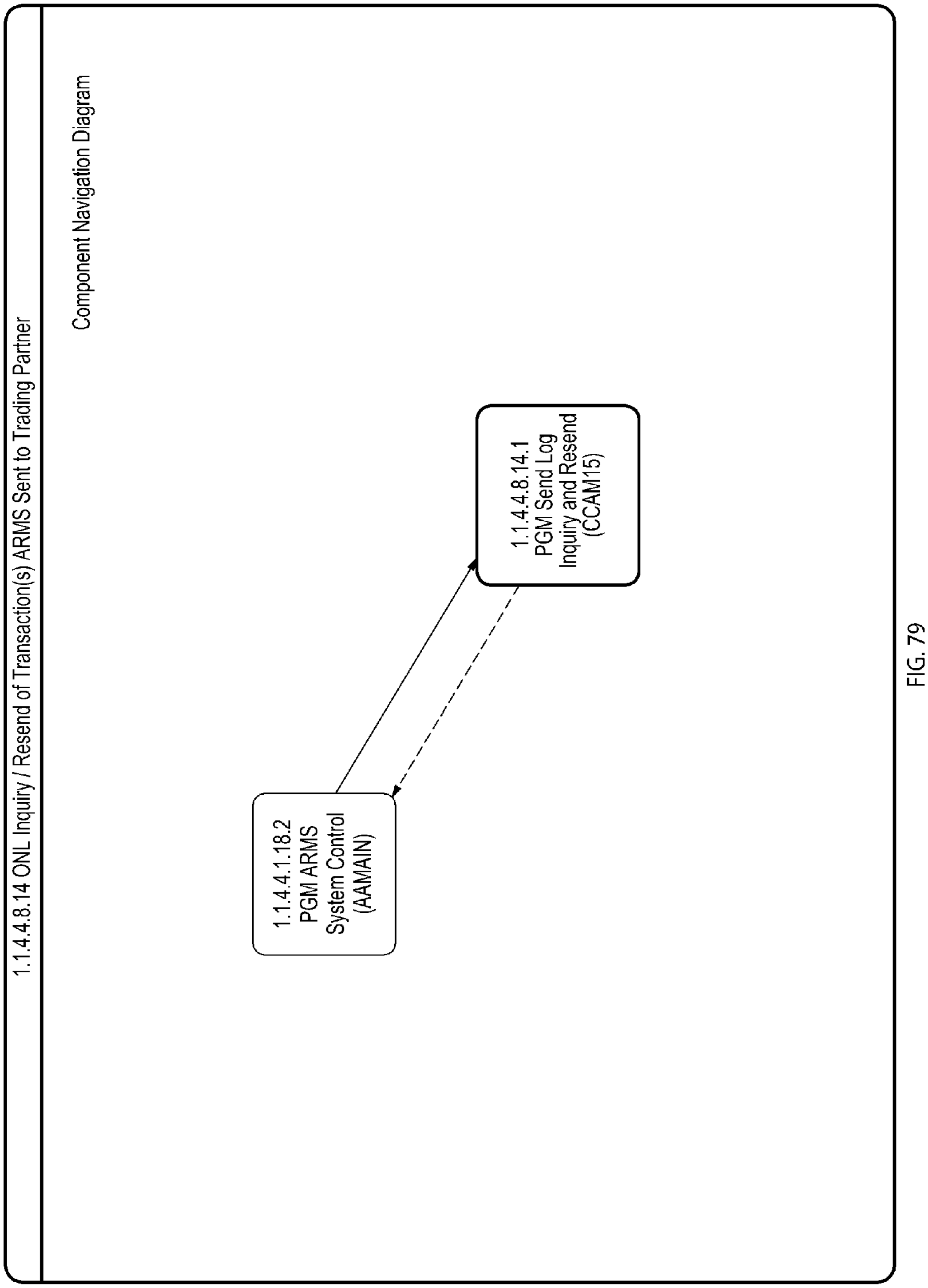
Figure 80:
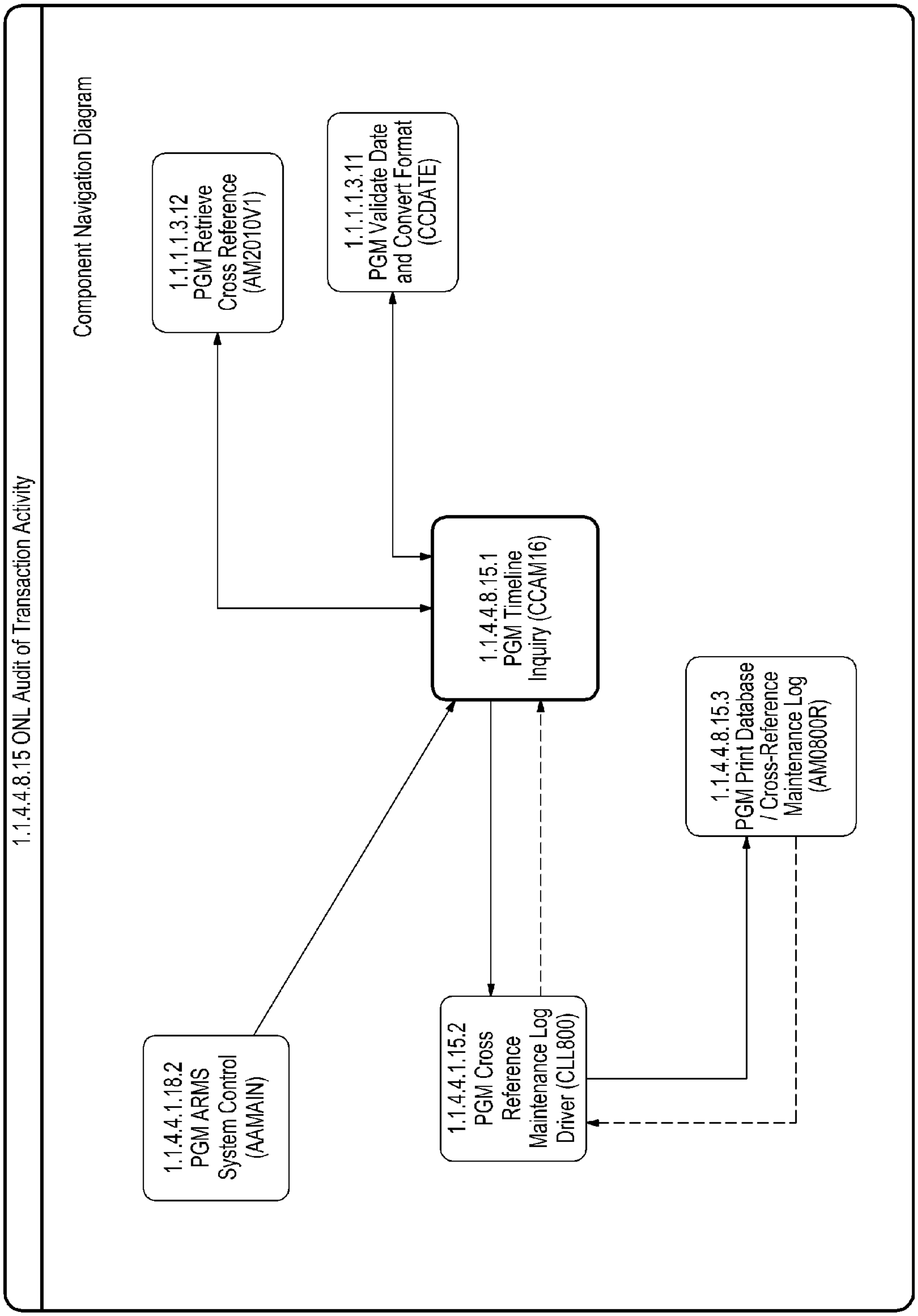
Figure 81:
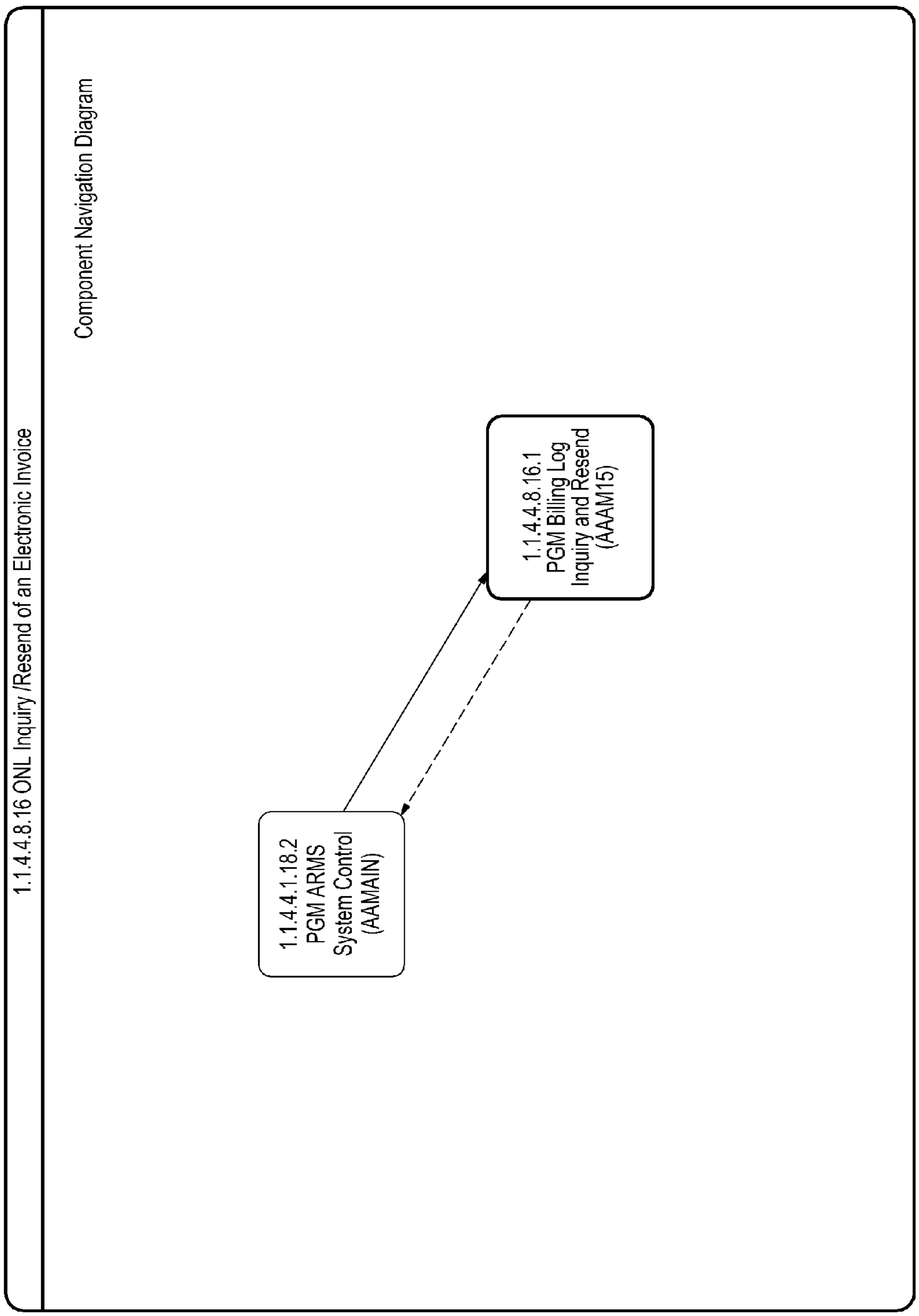
Figure 82:
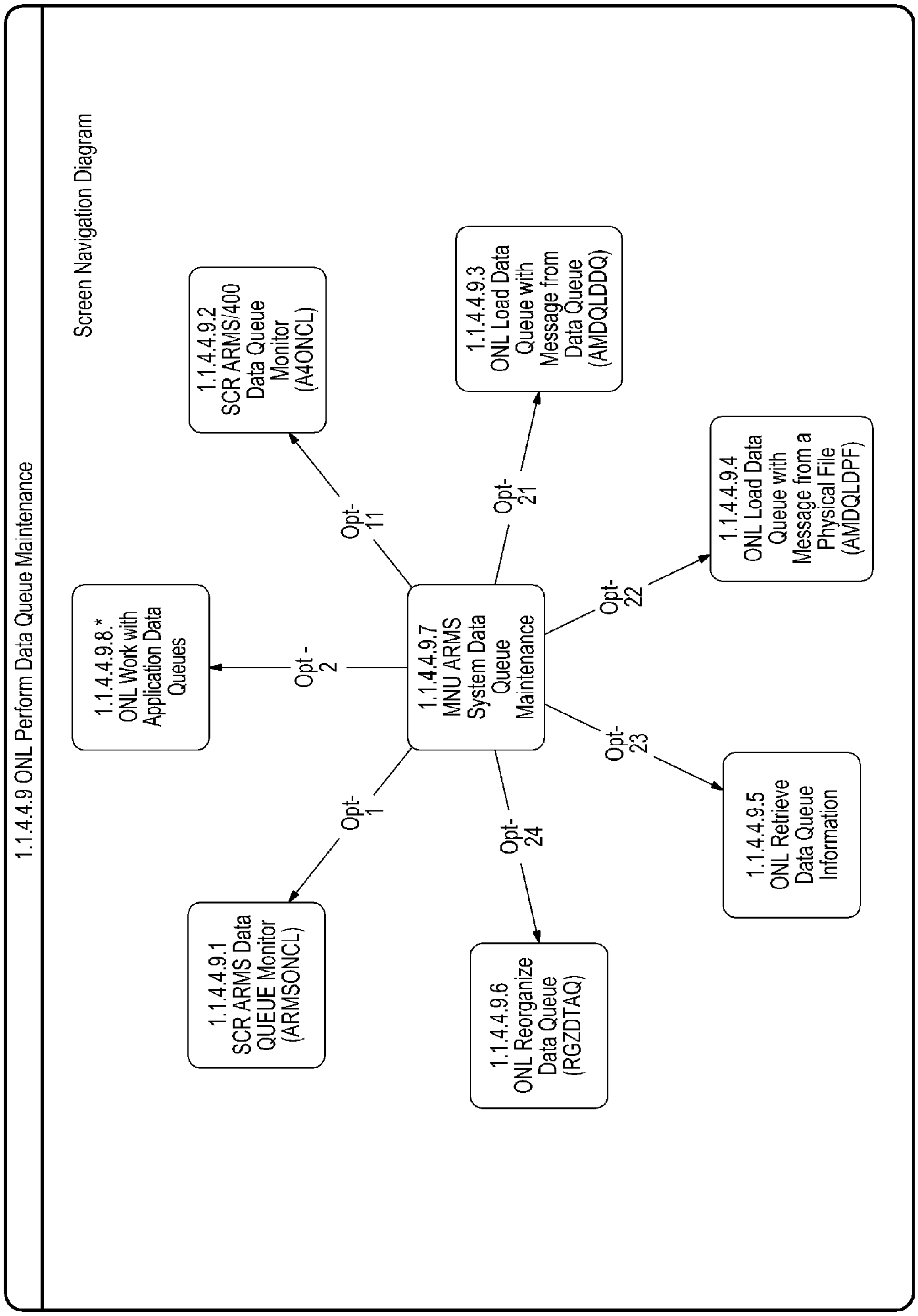
Figure 83:
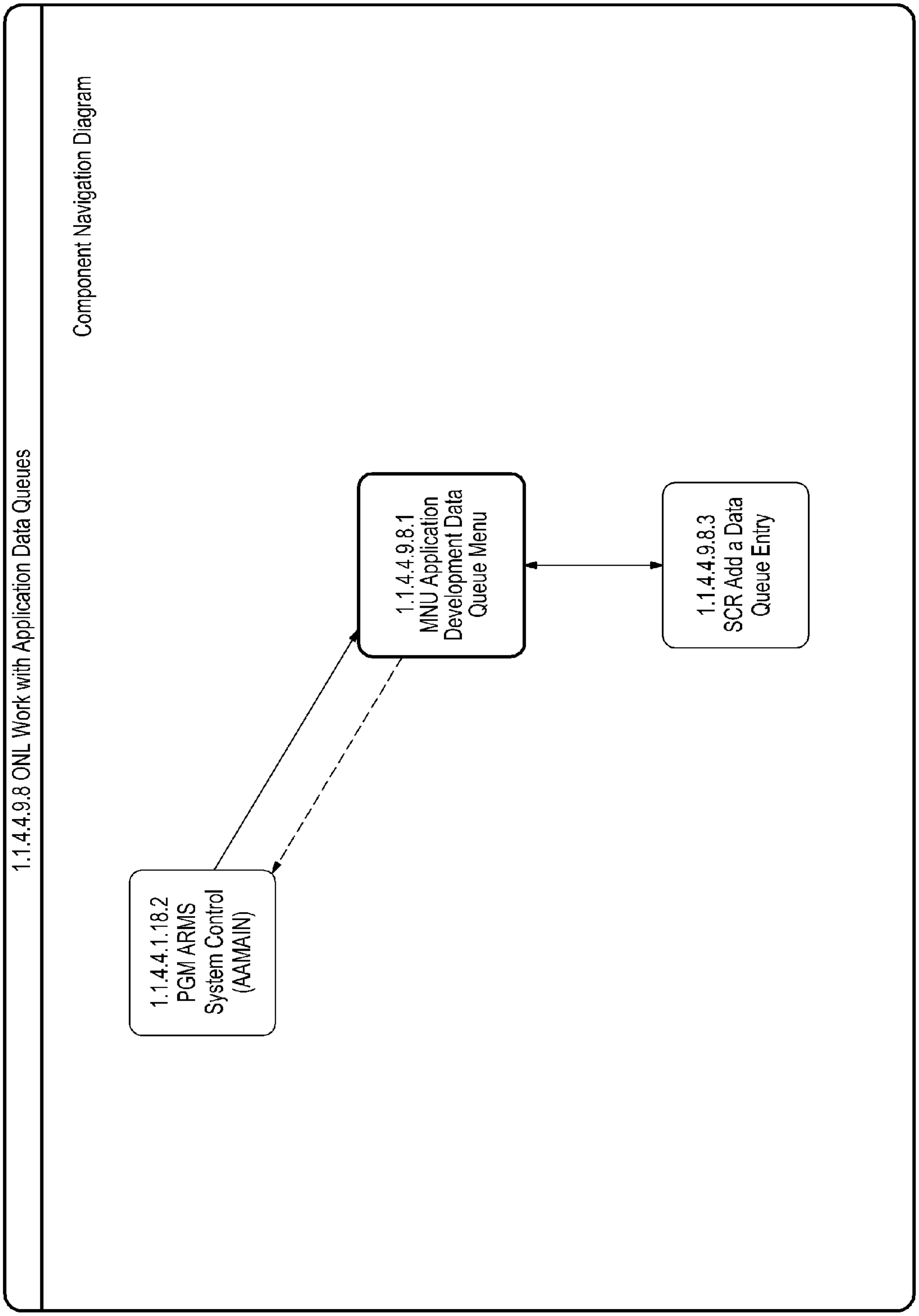
Figure 84:
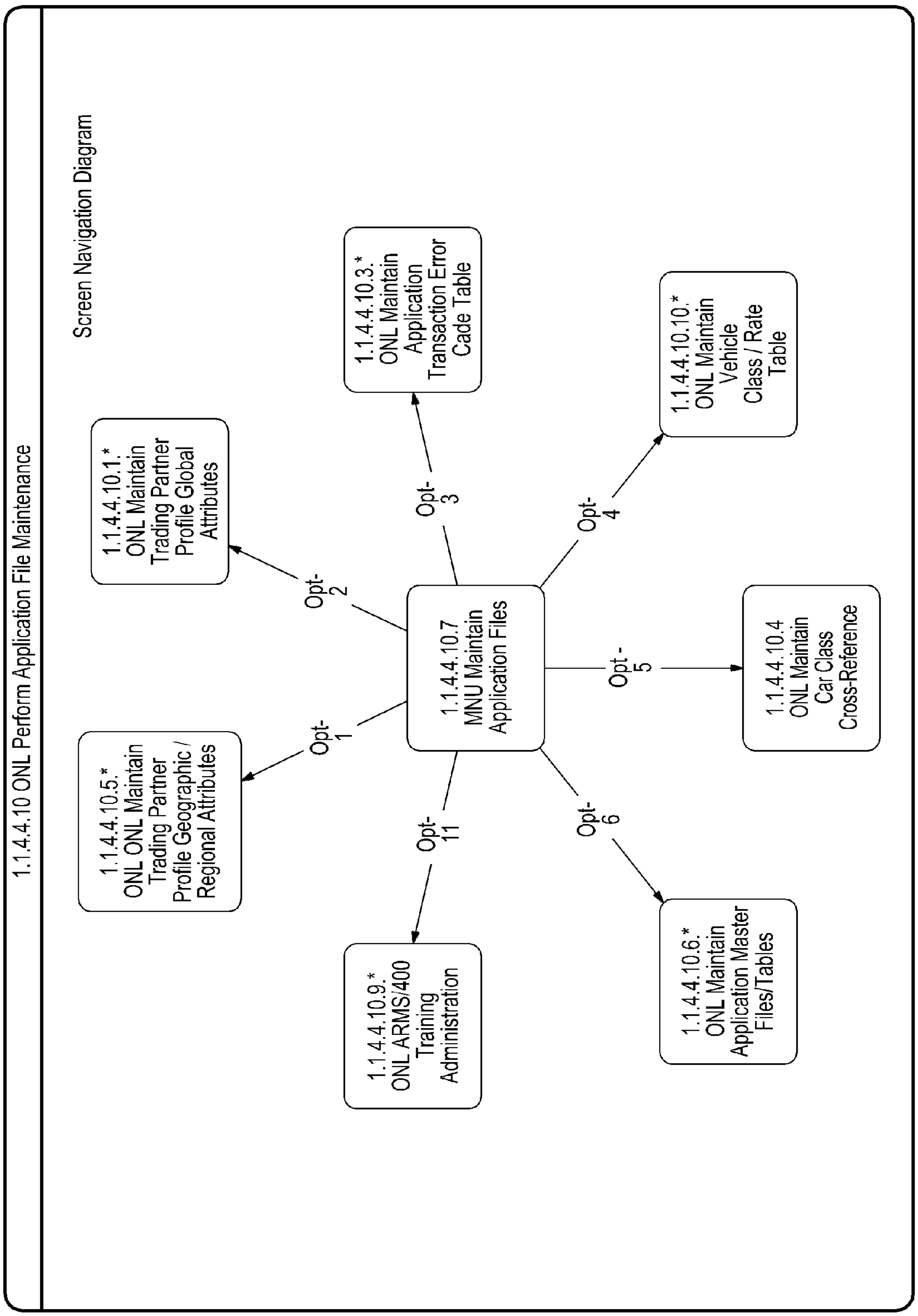
Figure 85:
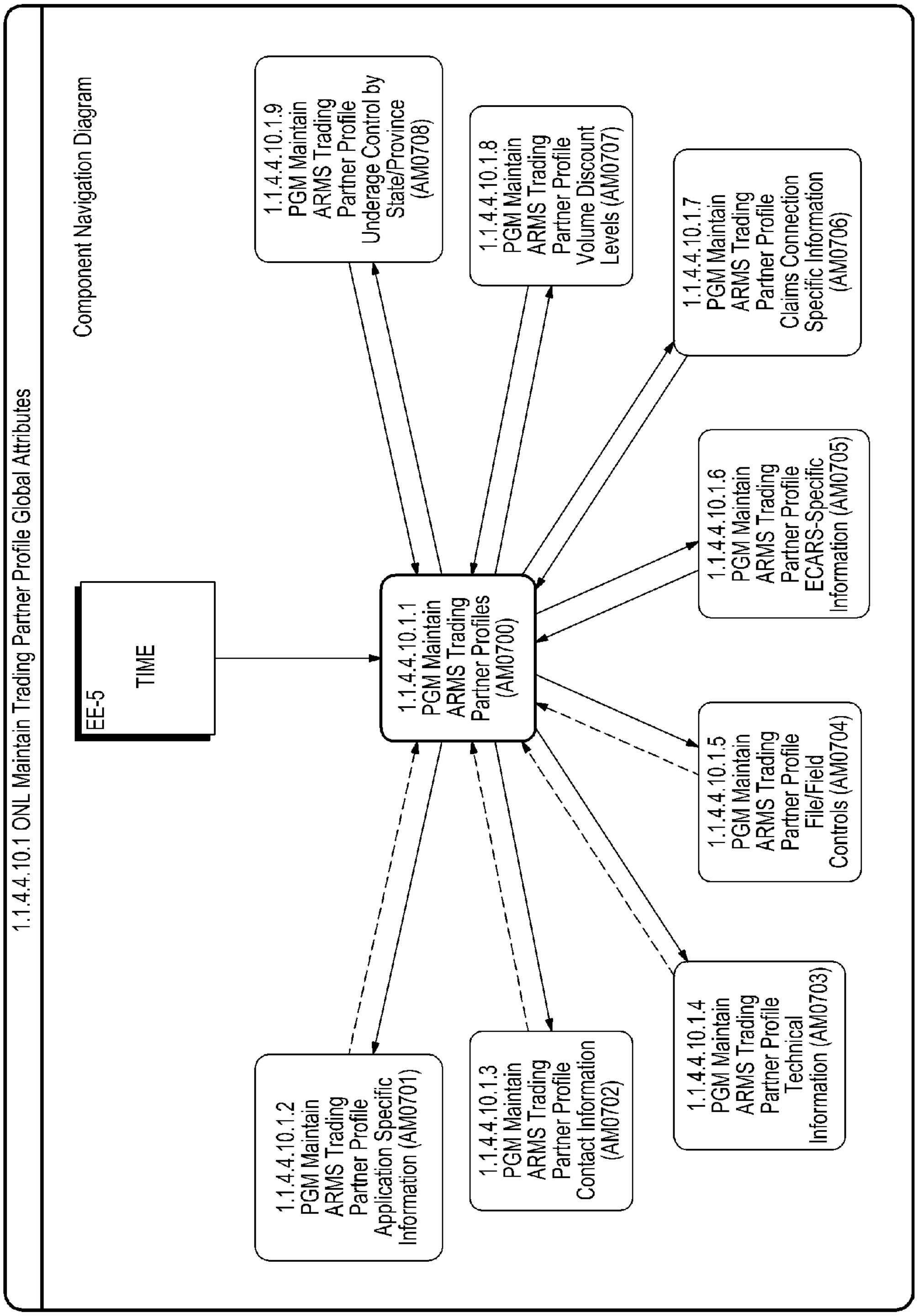
Figure 86:
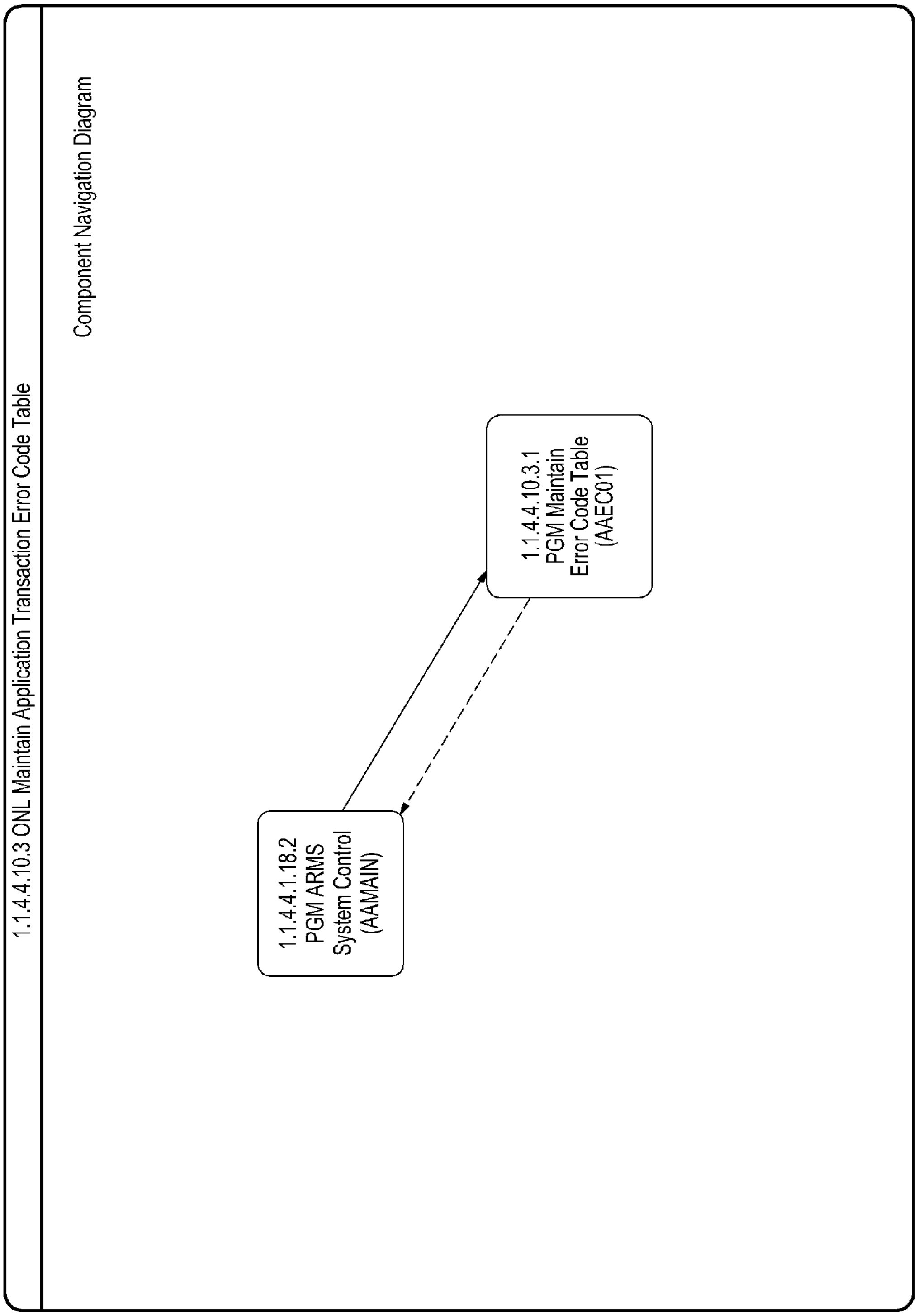
Figure 87:
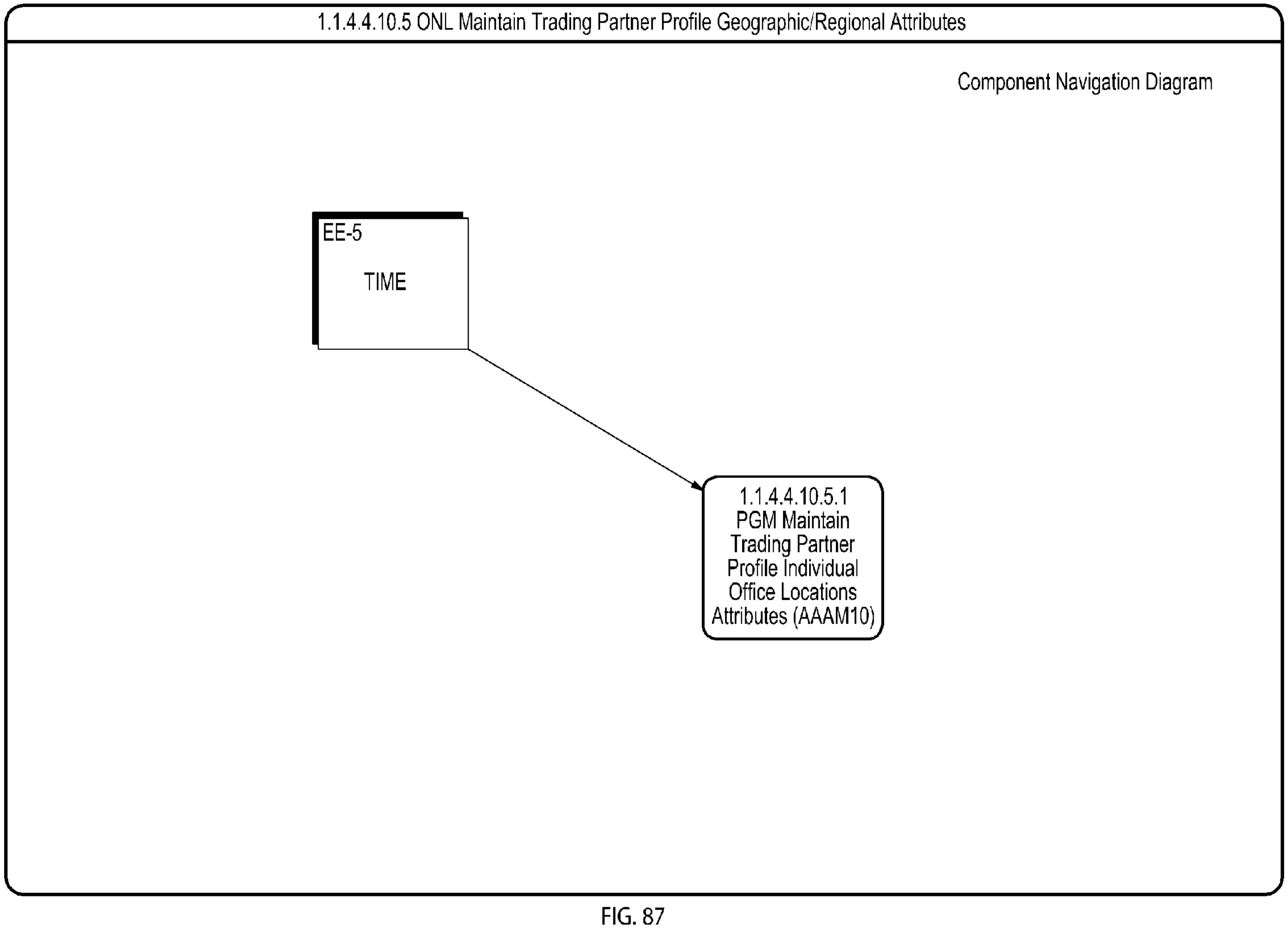
Figure 88:
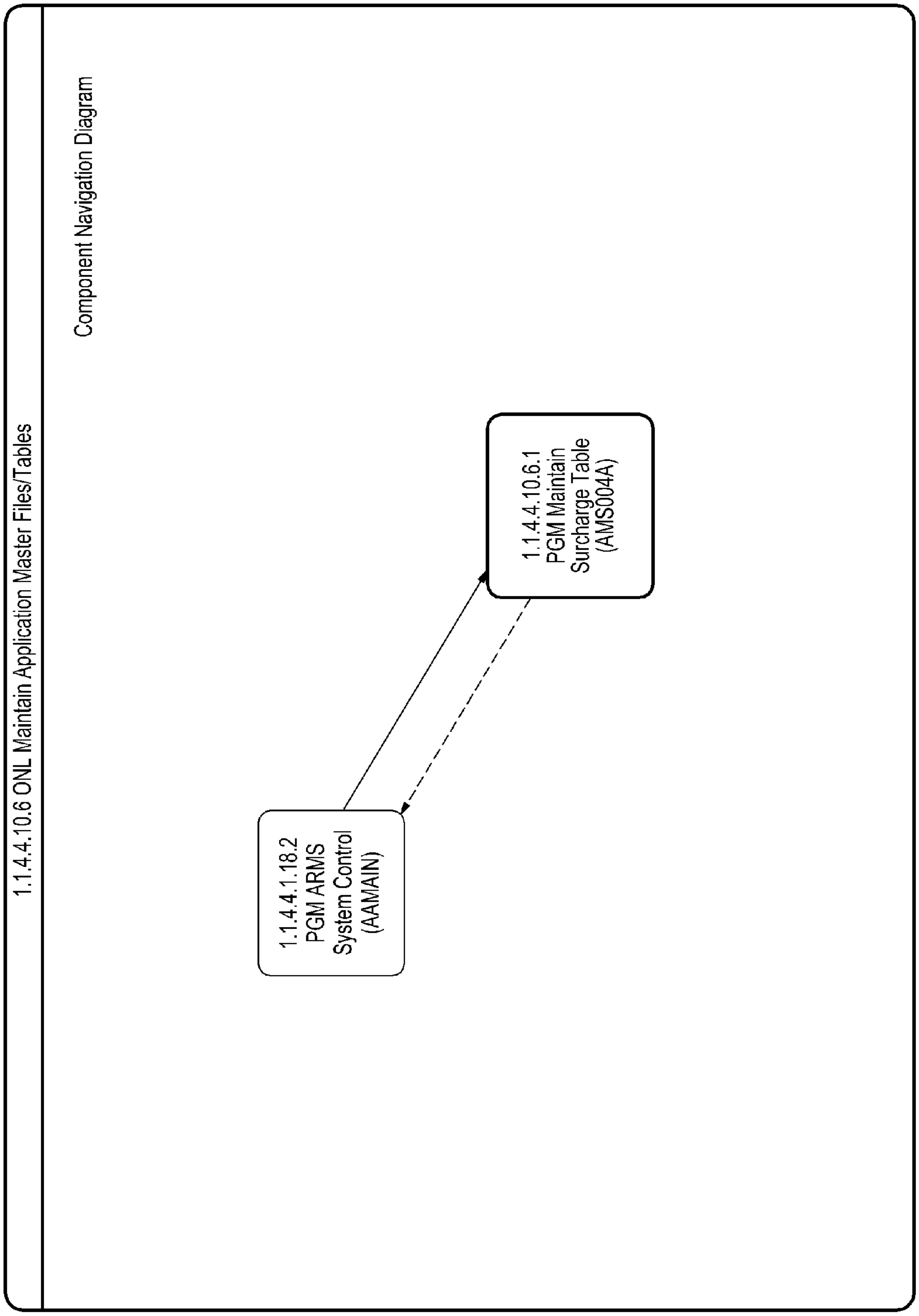
Figure 89:
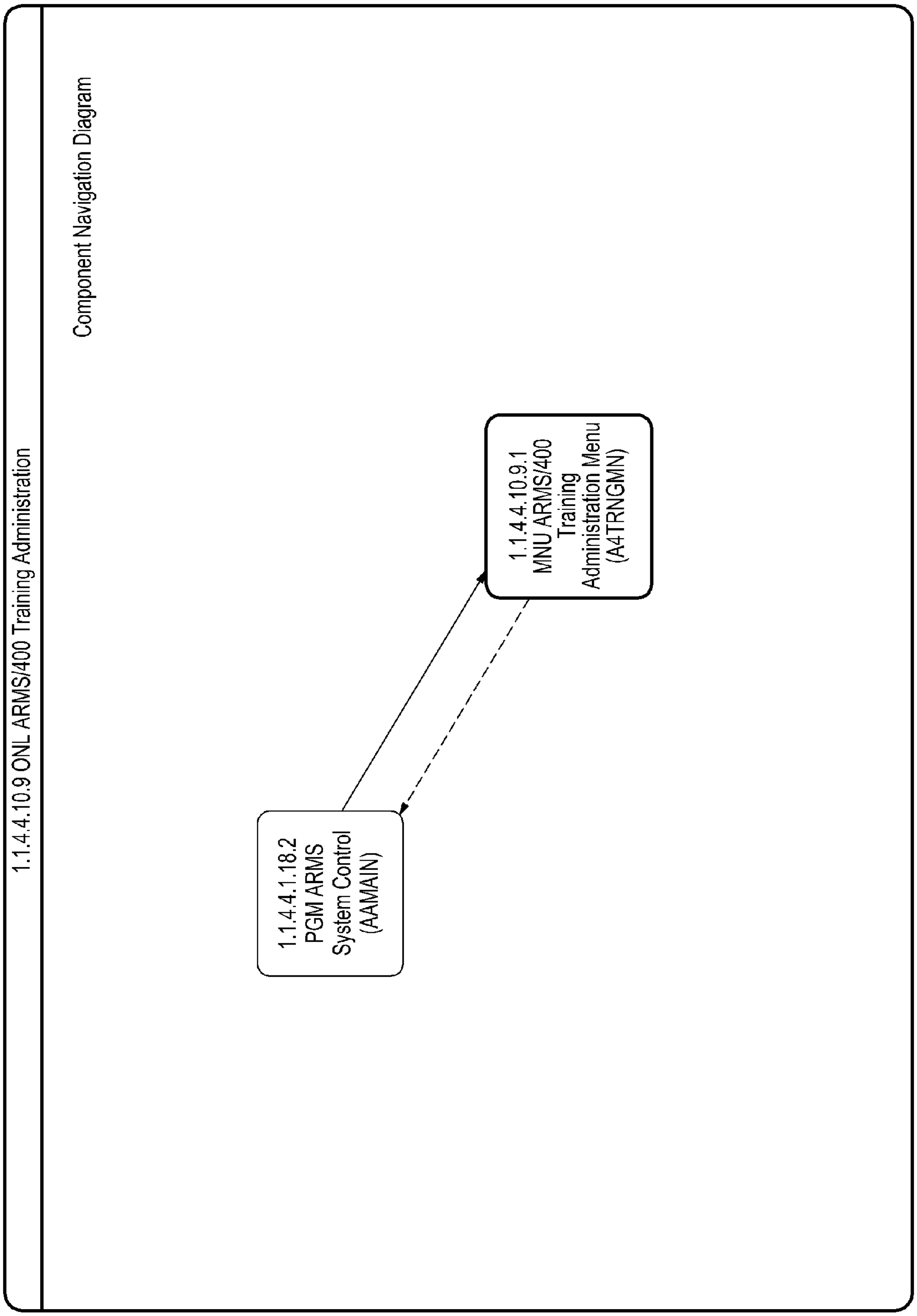
Figure 90:
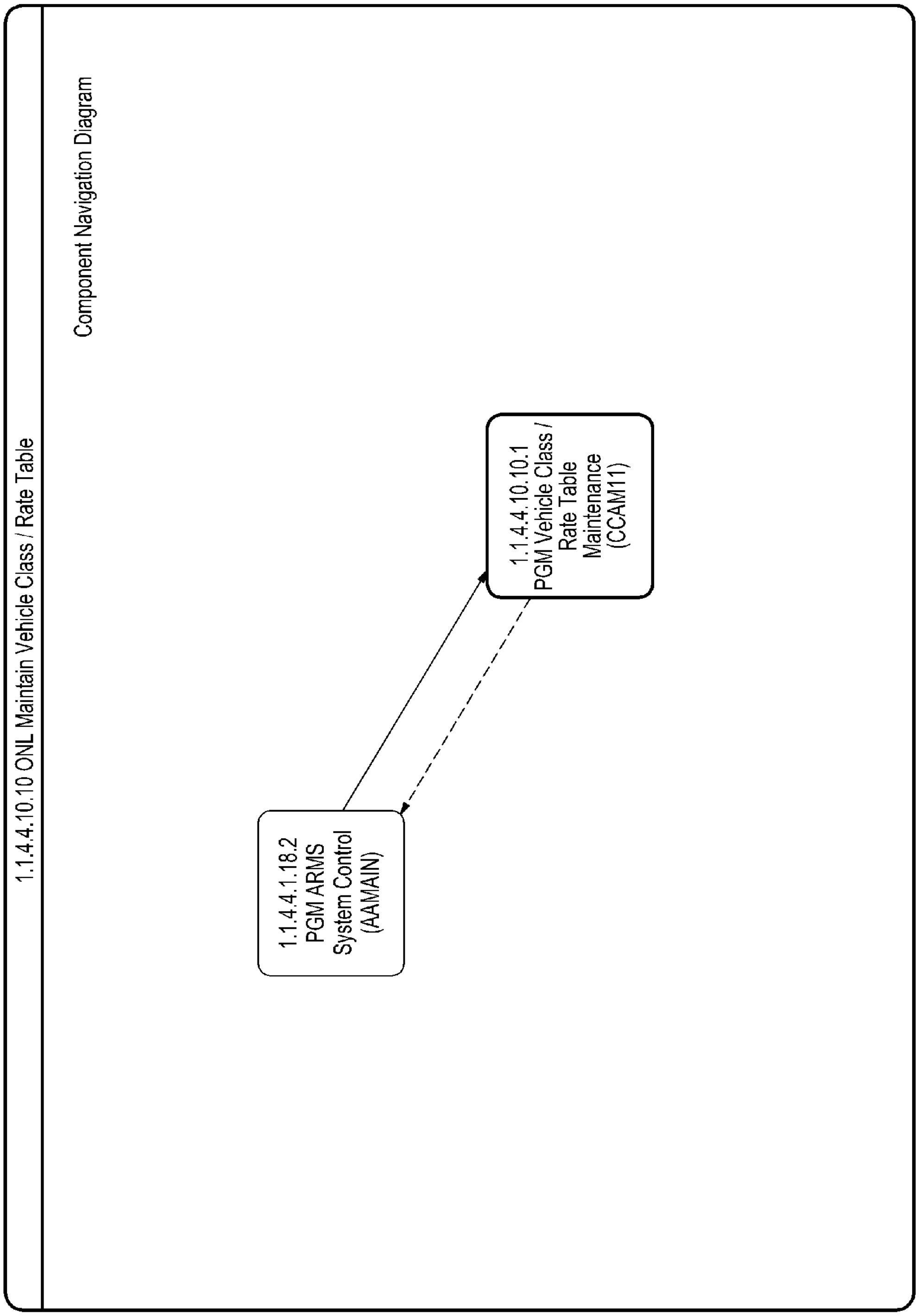
Figure 91:
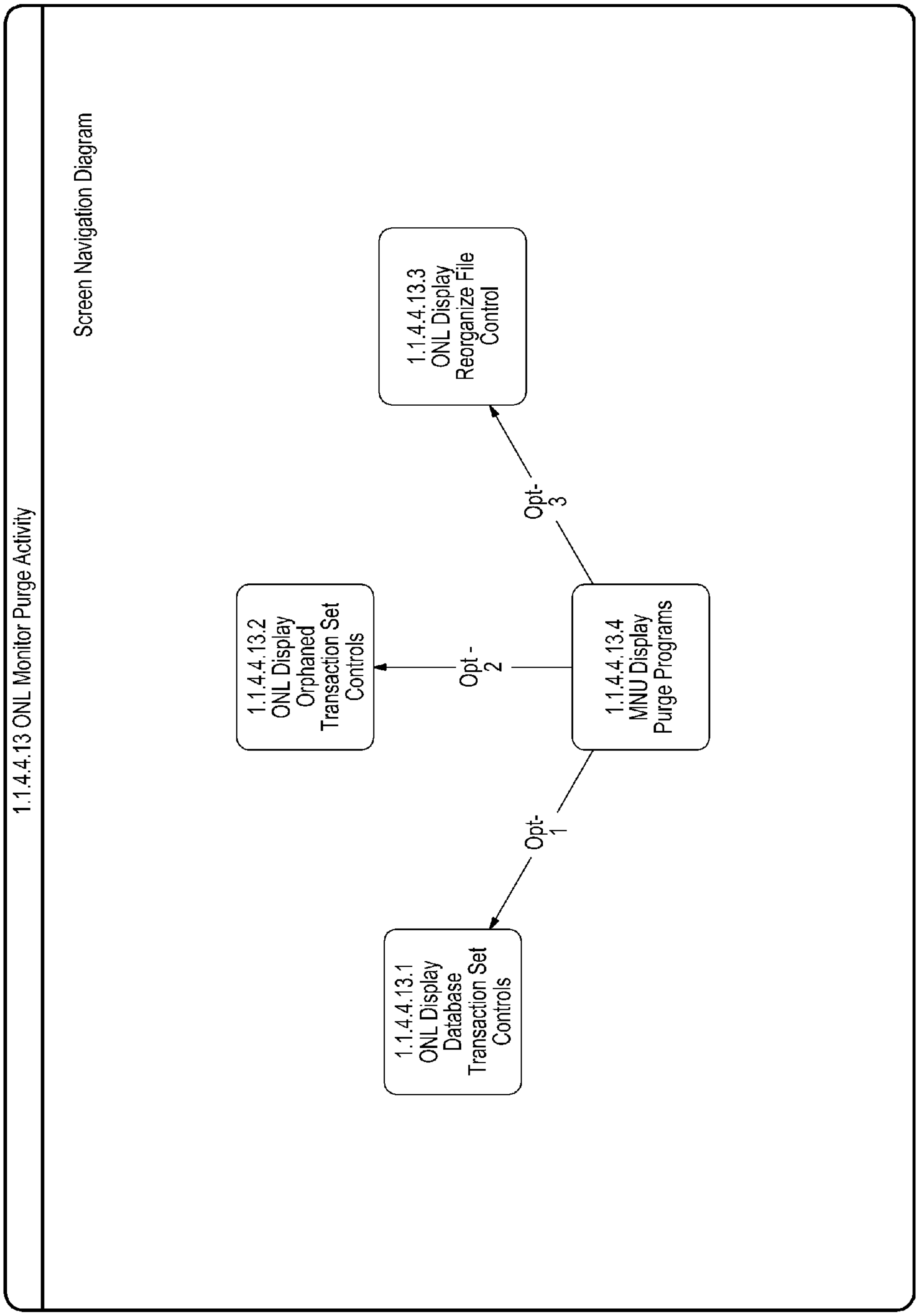

See FIGS. 4-91.

Exhibit C

See the file "Exhibit C.txt" submitted on the incorporated compact disc.

Exhibit D

See the file "Exhibit D.txt" submitted on the incorporated compact disc.

Exhibit E

ARMS Web 3.0

Functional Design Specification

Extend Rental

Version 1.1

Extend Rental

1. Extend Rental Use Case 1.1 Application Overview

The following is a document used to illustrate the process for how the USER will extend a previously authorized rental using ARMS/Web 3.0. The intent for this release of the ARMS/Web application is to reach a much wider audience. This application will target a Multi-Vendor, Multi-Segment, and International customer base.

1.2 Brief Description

This use case will describe how the USER will extend a previously authorized rental. The rental company (via an Authorization Request), the RENTAL ADMINISTRATOR (via a Customer Search), or Reporting (via the Callback feature) can initiate this use case.

1.3 Use Case Actors

The following actors will interact with this use case:

RENTAL ADMINISTRATOR—The RENTAL ADMINISTRATOR will use the system to extend a previously authorized rental. This use case refers to a USER in the role of a rental administrator. There are various types of customers that the USER would represent, which include corporate account holders, car dealerships, insurance companies, and others.

ARMS—The ARMS system will receive/send transactions to ARMS/Web to confirm the extended rental.

RENTAL CAR COMPANY—A wide variety of rental car companies will be able to use this system as well. Each company will have the ability to initiate and manage their rentals through the use of this application.

1.4 Pre-Conditions

The USER must have logged into the ARMS/Web system.

The USER must have selected a previously authorized, open rental.

1.5 Flow of Events

The Flow of Events will include the necessary steps to make changes and updates to "Extend Rental".

Figure 92:
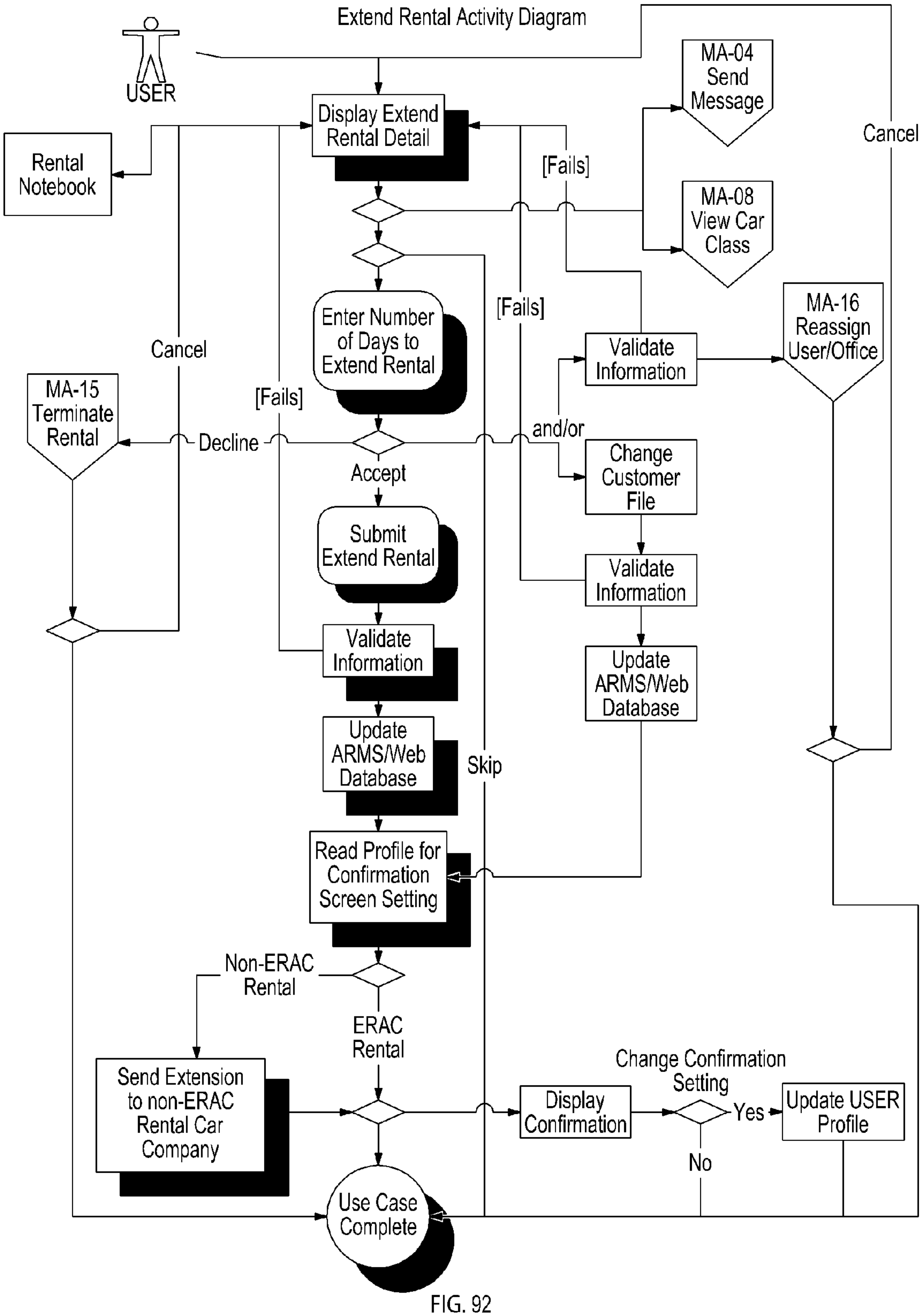
FIGS. 92-159 are a series of flow diagrams and screenshots for the ARMS/WEB application software resident on servers 70 as described in Exhibit E.

1.5.1 Activity Diagram—see FIG. 92.

1.5.2 Basic Flow

1. The system will display the details of the Rental.
2. The USER will enter the number of days to extend the rental.
3. The USER will submit the Extended Rental Details.
4. The system will validate the number of days the rental will be extended.
5. The system will update the ARMS/Web database with the Extend Rental Details.
6. The system will read the profile for the confirmation screen setting.
7. For non-Enterprise rentals, the extension is sent to the non-ERAC rental car company's rental system.
8. This ends the use case.

1.5.3 Alternative Flows 1.5.3.1 View Rental Notebook

At step 1 of the basic flow, the USER may choose to view the history of a rental. The USER will be able to see the diary notes associated with the Reservation/Rental.

1.5.3.2 Display Confirmation

After step 7, the USER may wish to have a confirmation page displayed, indicating that some type of change has taken place. The confirmation page is completely optional; therefore, at anytime the USER wants to set their profile to bypass this screen, he/she may do so.

1.5.3.3 Update USER Profile

During the confirmation process, the USER has the option of changing their profile setting to display or hide the confirmation page. Each time the setting is changed, the USER profile must be updated to reflect the new requirements set by the USER.

1.5.3.4 Validate Changes

If the USER changes or adds information, which does not pass validation, an error message will notify the USER and return them to step 1 of the Basic Flow.

If an error is discovered in the validation of the reservation/rental information submitted by the USER, the system would present the USER with an error message and return them to the Detailed Reservation/Rental Display. If the error is specific to a data field within the form, the field should be highlighted and the error described.

1.5.3.5 Change Customer File

Prior to step 3, the USER has the option to make changes to the customer file. After clicking the change/add link, the screen will refresh with all editable fields opened and available for the USER to make changes.

1.5.3.6 Update ARMS/Web Database

After successfully validating the recent changes, the system must update the ARMS/Web Database. The system goes through the same process as in the Basic Flow, as the database is updated to reflect the latest changes.

1.6 Post-Conditions

If the use case was successful then the rental has been extended and the ARMS/Web system has been notified.

If the use case was unsuccessful then the system has remained unchanged.

1.7 Special Requirements

The number of days to extend a rental must be an integer greater than zero.

If a USER attempts to extend an insured rental beyond their limits for number of days and dollar amount, the system should return an error message.

1.8 Extension Points 1.8.1 MA-16 Reassign USER/Office (Transfer)

After the extend rental detail is displayed, the USER may choose to transfer the current office/USER. First, the USER would select to change the current office/USER. Second, the system would display a list of authorized offices/USERs. Third, the USER would select a new office/USER. If additional changes are made to the customer file, the new data will also be passed through the transfer process.

1.8.2 MA-08 View Car Class

The View Car Class use case will be used to allow the USER to view details about and select a car class to apply to a reservation. Details will include the average number of passengers and luggage items that can be served by a vehicle in the specific car class. The car class selected by the USER should be applied to the reservation.

1.8.3 MA-15 Terminate Rental

After the extend rental detail is displayed, the USER may choose to terminate the rental. If termination is selected, the USER must enter a reason for the termination of the rental. Termination means the insurance company is no longer willing to pay for the rental.

1.8.4 MA-04 Send Message

The Send Message will be used to allow the USER to capture messages and diary notes associated with extending a rental. The USER can elect to either have the message sent to the rental company responsible for the reservation/authorization, or (Depending on the user segment if this option is available) to store the note in the ARMS/Web system without sending the message to rental company. All MESSAGES and DIARY NOTES captured must be related to a specific reservation/authorization.

2. Screen Design

A definition of the screen layout(s), screen data fields, and screen functions that are used to implement the flows identified above. More than one screen may be used to implement support for the use case flow.

2.1 Extend Rental Detail

Figure 93C:
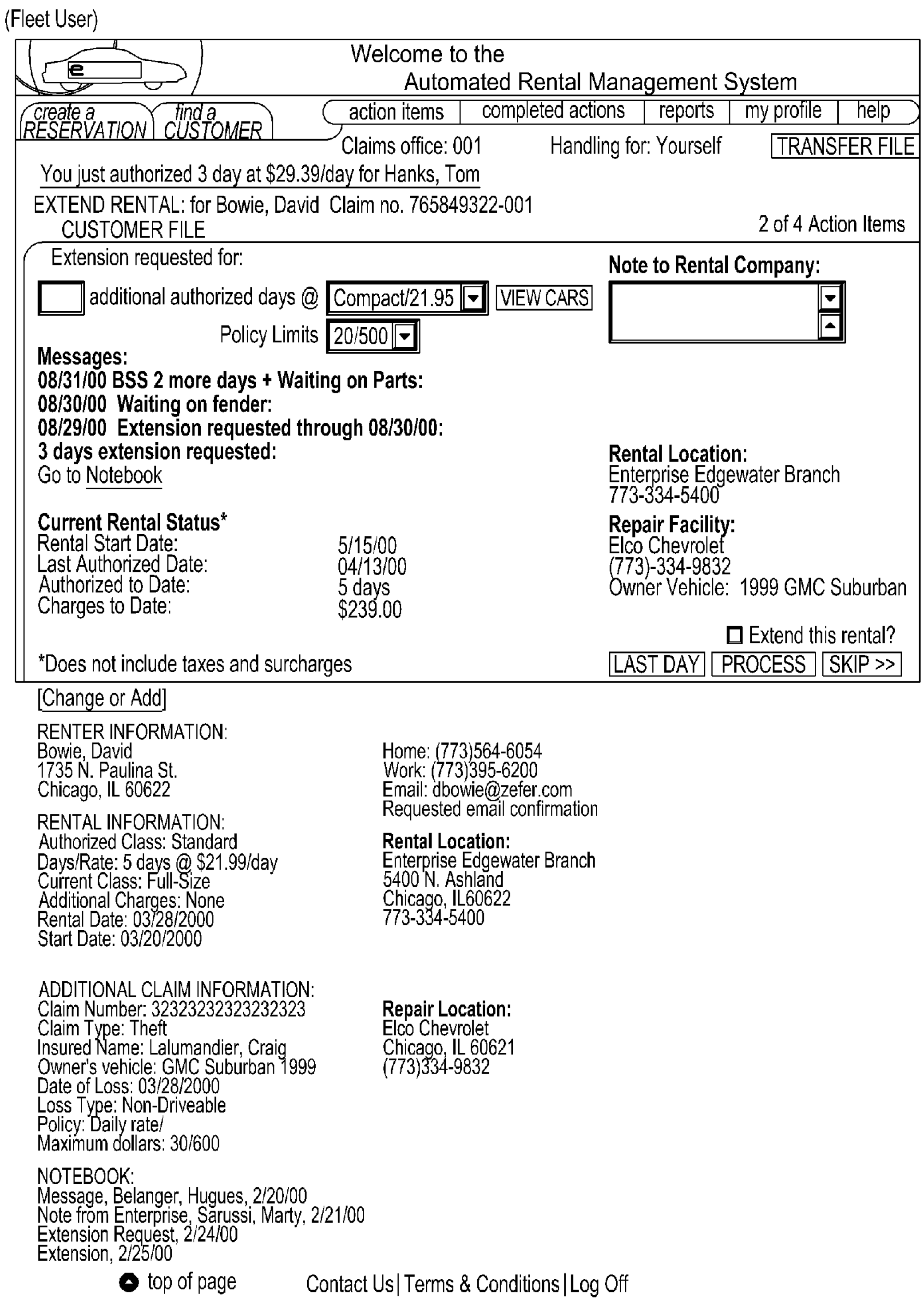
Figure 93D:
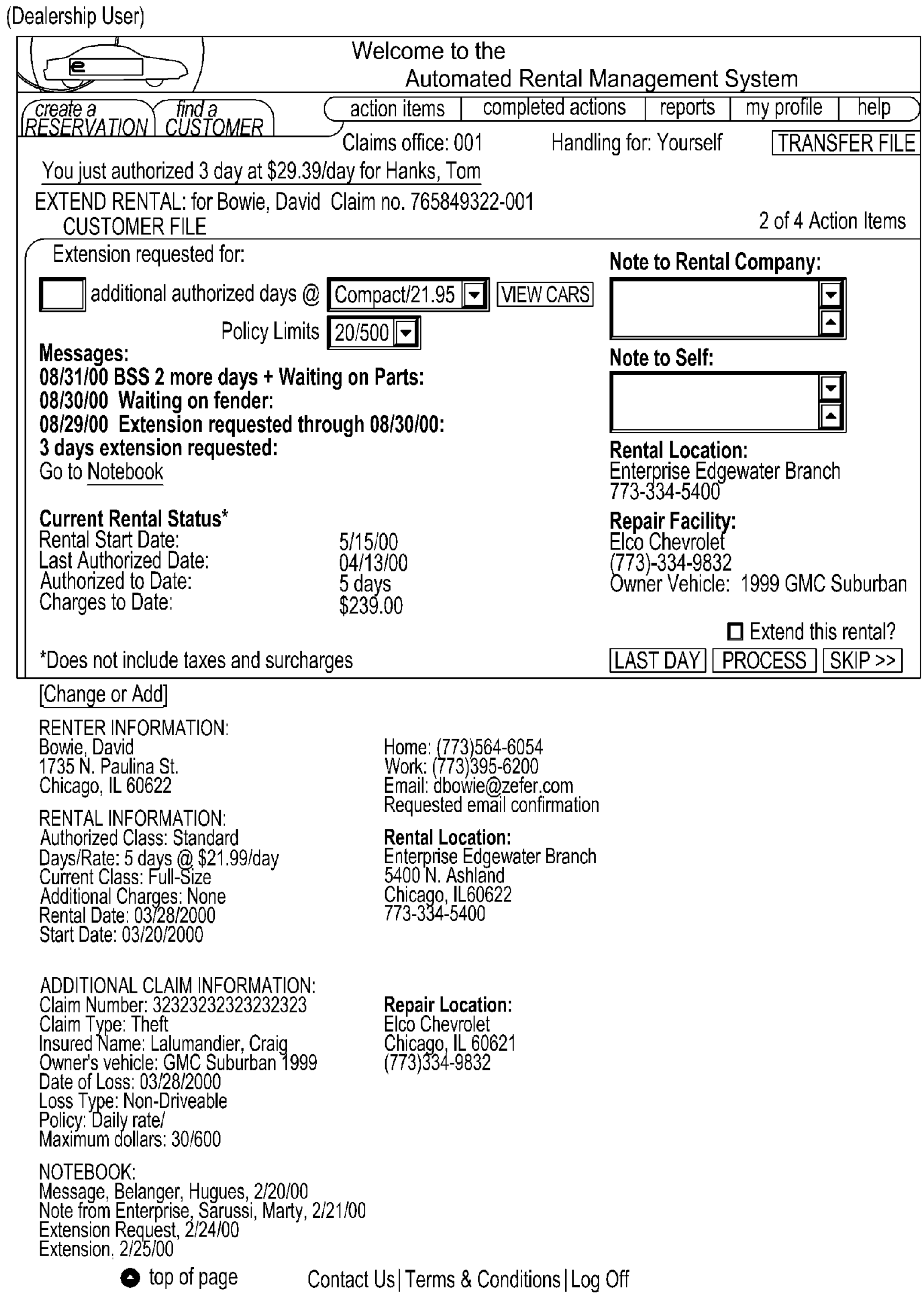

This screen (see FIGS. 93(*a*)-(*e*)) will allow the USER to pick which functions that he/she may want to change.

2.1.1 Screen Layout—Extend Rental Detail—see FIGS. 93(*a*)-(*e*)

2.1.3 Extend Rental Detail

| Screen Label | Type | Size | Screen Field Name | Data Field Name | Screen Specific Rule |
|---|---|---|---|---|---|
| Additional Charges | Output | 15 | Additional Charges | | |
| Handling For: | Output | 30 | Handling for Adjuster's Name | First Name + Last Name | Last Name + First Name |
| Note to Self Only | Input | 50 | Message | NOTE | |
| Messages: | Output | 8 | Message Creation Date | Add Date | N/A. |
| Note to Enterprise: | Input | 50 | Message Text | NOTE | N/A. |
| | Output | 50 | Message Text | NOTE | N/A. |
| Claim Number: Purchase Order Number Corporate Class Number | Output | 11 | Claim Number Purchase Order Number Corporate Class Number | Insurance Claim Number, PO#, CC# | |
| Days Authorized to Date: | Output | 2 | Number of Days Authorized | Number of Days Authorized | N/A. |
| ____ additional authorized days | Output | 2 | Number of Days to Extend | Number of Days to Extend | |
| Policy Limits | List Box | 5 | Policy Maximum and Dollars per day | Max $ Covered + Dollars Per Day Covered | |
| | Output | 30 | Rental Location Branch Name | Rental Location | |
| days @: | List Box | 6 | Rental Location Rate | Vehicle Rate | N/A. |
| Date of Rental | Output | 10 | Rental Start Date | Start Date | N/A. |
| Insured Name: | Output | 30 | Insured's Name | First Name + Last Name | |
| | Output | 30 | Rental Location Address | Address Line + Address Line2 | N/A. |
| | Output | 25 | Rental Location City Name | City | N/A. |
| | Output | 10 | Rental Location Postal/Zip Code | Zip Code | N/A. |
| | Output | 3 | Rental Location State/ Province Code | State | N/A. |
| | Output | 13 | Rental Location Telephone Number | Telephone Number | N/A. |
| Date of Loss: | Output | 10 | Date of Loss | Date of Loss | |
| | Output | 20 | Renter City Name | City | |
| | Output | 10 | Rental Postal/Zip Code | Zip Code | |
| | Output | 3 | Renter State/ Province Code | State | |
| | Output | 30 | Renter Street Address | Address Line | |
| Home: | Output | 16 | Renter's Home Phone | Renters Night Phone + Renters Night Phone Extension | Not editable if ticket is Open. |
| | Output | 30 | Renter's Name | First Name + Last Name | Will not be editable if ticket is open. First Name + Last Name |
| Renter Information: | Output | 30 | Renter's Name | First Name + Last Name | N/A. |
| Work Phone: | Output | 16 | Renter's Work Phone | Day Phone + Renters Day Phone Extension | Will not be able to edit if ticket is Open. |
| Owner's vehicle: | Output | 4 | Vehicle Year, Make and Model | Renter Make/Model + Renter Vehicle Year | |
| Repair Facility: | Output | 20 | Body Shop Name | Repair Facility Name | |
| | Input | 16 | Body Shop Phone Number | Telephone Number | |
| | Output | 15 | Repair Facility City | City | |
| | Output | 3 | Repair Facility State | State | |
| | Output | 7 | Repair Facility zip code | Zip Code | |
| Last Day authorized | Output | 10 | Date rental is authorized through | CALCULATED | Calculated field. Populated with an Open Ticket only. |
| Charges to Date: | Output | 10 | Total Charges | CALCULATED | |

-continued

| Screen Label | Type | Size | Screen Field Name | Data Field Name | Screen Specific Rule |
|---|---|---|---|---|---|
| Renter Type | Output | 10 | Claim type | claim type description | |
| Claims Office: | Output | 3 | Office Id | external organization abbreviated name | N/A. |
| Vehicle Condition | Output | 15 | Type of Loss | loss type description | |
| Renter Email: | Output | 20 | Renter's Email | renter email | Will not be able to edit if ticket is Open. |

2.1.4 Screen Function Definition

This section includes the definitions for all functions that can be performed within the screen. This includes operations invoked by button clicks, specific shortcut keystrokes, or other actor activity.

2.1.4.1 Skip

When clicked, the USER will be taken out of the use case without changing the current status of the request. Any changes made by clicking Change or Add and keying data in the bottom section will be saved.

2.1.4.2 Process

When clicked, the system will validate the input and accept the changes made to the customer file. The ARMS/Web database will be updated. The use case will then end and the USER will return to the process from which they came.

2.1.4.3 Notebook

When clicked, the USER will be taken to the Note Book section at the bottom of the screen to view all messages for this rental.

2.1.4.4 Set Last Date

When clicked, the system will terminate the rental. The USER will be prompted to enter a termination date for this rental. This coincides with the use case MA-17-Terminate Rental.

2.1.4.5 Transfer File

When clicked, the USER will be taken to the Transfer File screen. This screen allows the USER to change the office or adjuster currently assigned to the customer file. The required information in the Extend Rental/Customer File will be passed to the Transfer File screen. Upon completion of the transfer, the USER will then be returned to the next action item or the profiled start page, depending on the screen from which the USER began.

2.1.4.6 Change or Add

When clicked, the system will refresh the current screen and make all editable fields in the bottom section (outside the gray box area) input capable. The changes on the top of the screen will not be lost.

2.1.4.7 Top of Page

When clicked, the USER will be taken to the top of the current page.

2.1.4.8 View Car Class

When clicked, the USER will be taken to the View Car Class Use Case. No changes will be lost. Once the USER is finished with this use case, the USER will return to the Extend Rental Use Case.

2.1.4.9 Extend Rental

When clicked, the system will validate the input and accept the extension AND the changes made to the customer file. The ARMS/Web database will be updated. The use case will then end and the USER will return to the process from which they came.

ARMS Web 3.0
Functional Design Specification
Review List—Action Items
Version 1.1

Review List-Action Items

1. Review List Action Items Use Case 1.1 Application Overview

The following is a document used to illustrate the process for how the USER would view and/or select any outstanding action items assigned to them using ARMS/Web 3.0. The intent for this release of the ARMS/Web application is to reach a much wider audience. This application will target a Multi-Vendor, Multi-Segment, and International customer base.

1.2 Brief Description

This use case describes how the USER would view and/or select any outstanding action items assigned to them.

1.3 Use Case Actors

The following actors will interact with this use case.

RENTAL ADMINISTRATOR—The RENTAL ADMINISTRATOR will use the system to review outstanding action items to be completed. This use case refers to a USER in the role of a USER. There are various types of customers that the USER would represent, which include corporate account holders, car dealerships, insurance companies, and others.

ARMS—The ARMS system will receive/send transactions to ARMS/Web based on actions of the USER, retrieving and acting action items.

RENTAL CAR COMPANY—A wide variety of rental car companies will be able to use this system as well. Each company will have the ability to initiate and manage their rentals through the use of this application.

1.4 Pre-Conditions

The USER must be logged into the ARMS/Web system.

The USER must have selected to Review a List of Action Items.

The system must retrieve and confirm the USER ID and access authority.

1.5 Flow of Events

The Flow of Events will include the necessary steps for a USER to review and assign outstanding action items.

Figure 94:
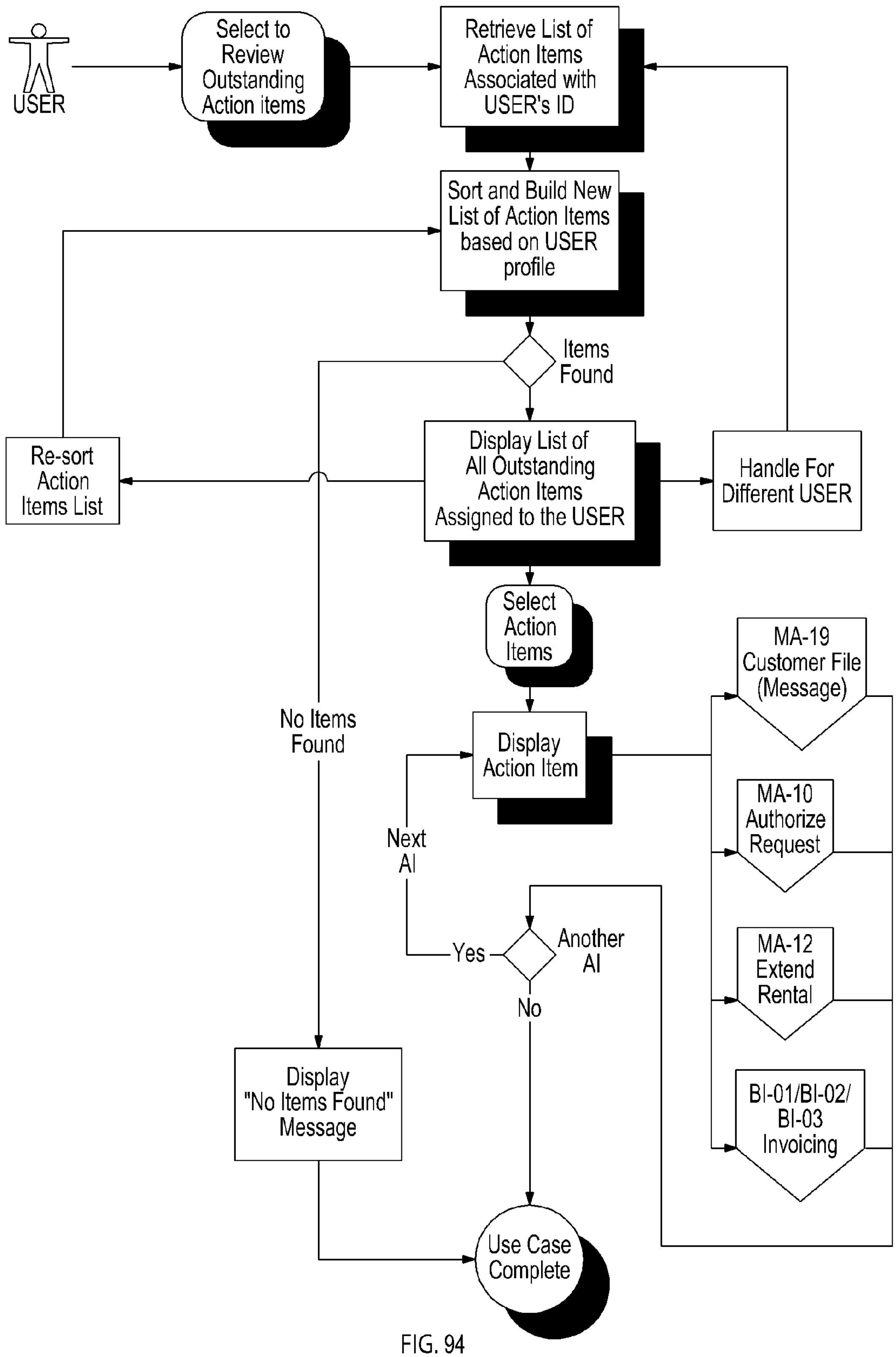
Figure 95A:
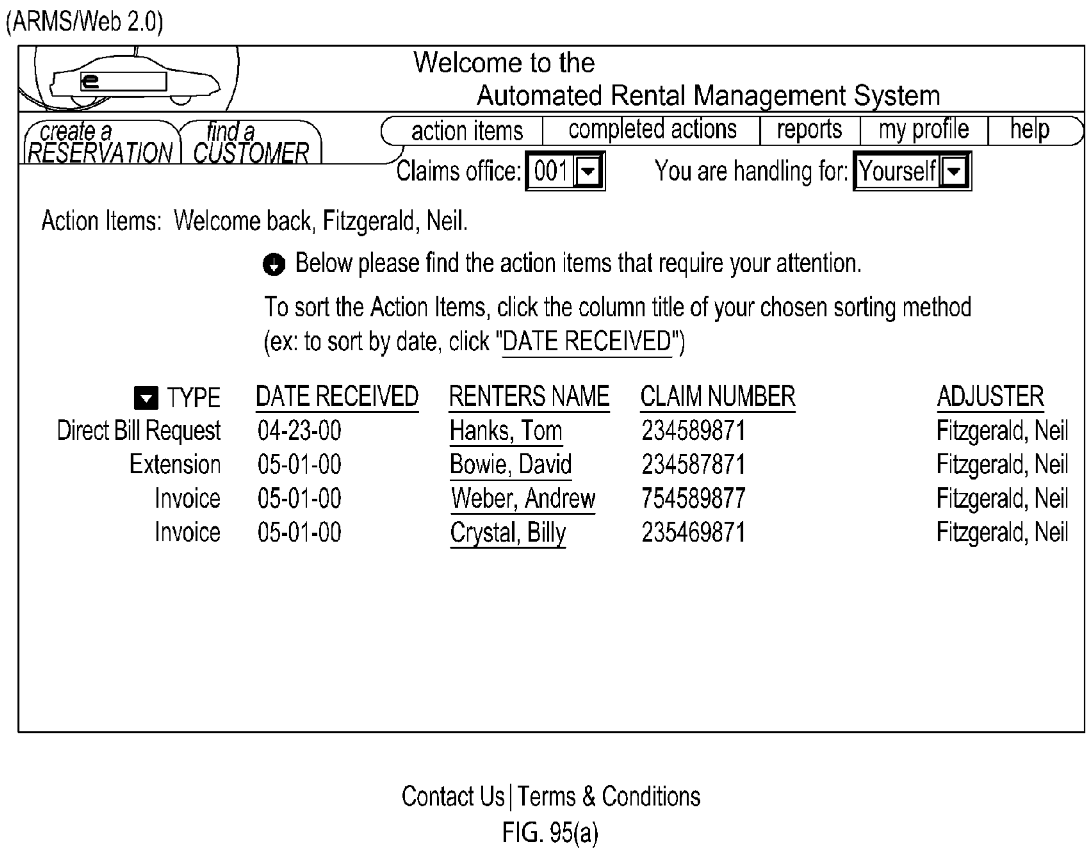
Figure 95B:
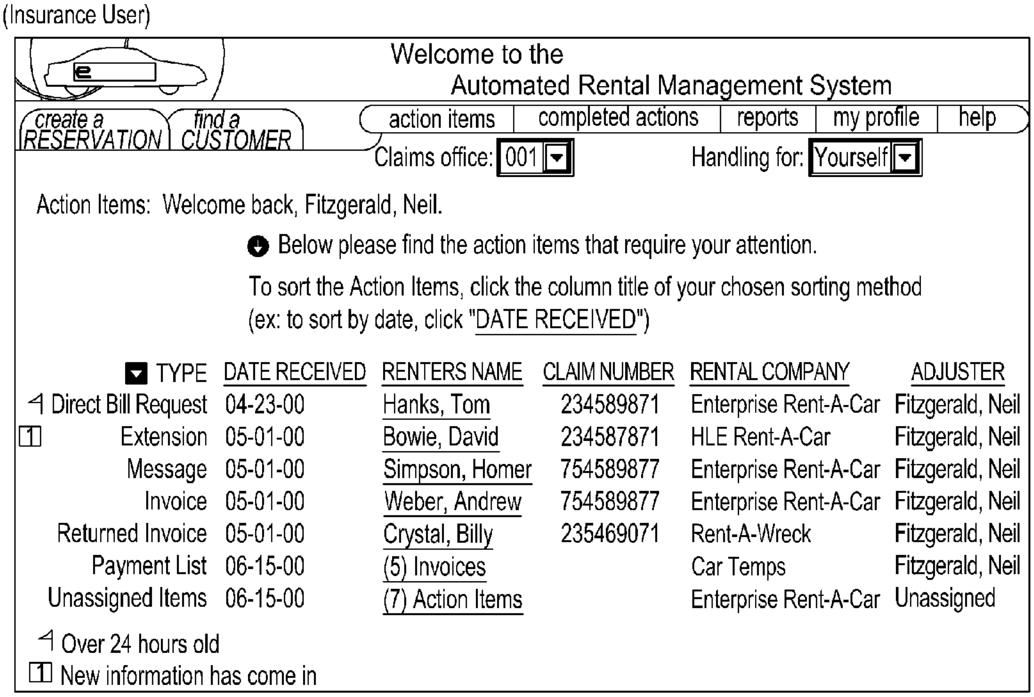
Figure 95D:
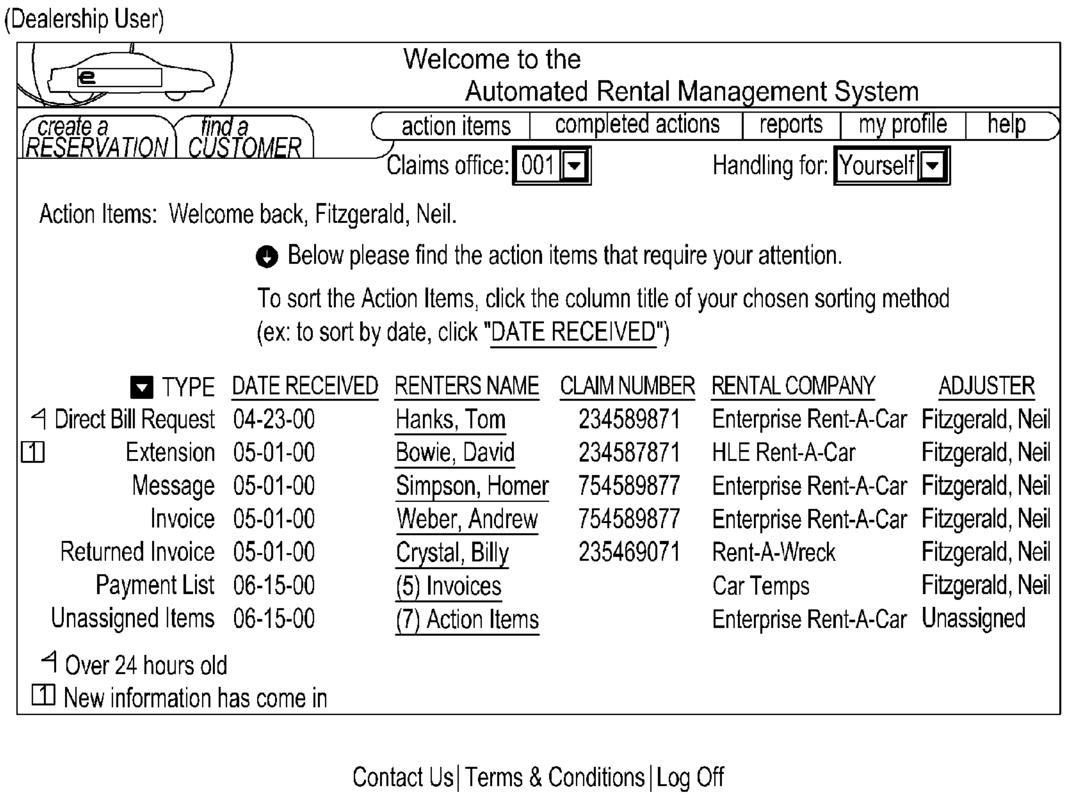
Figure 95E:
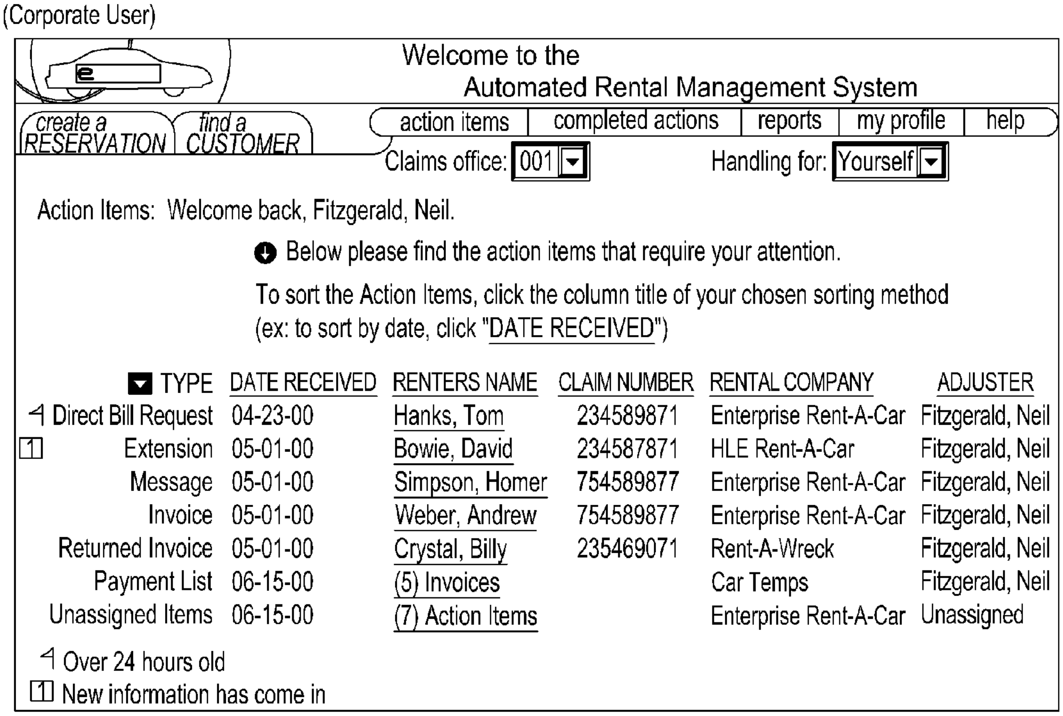

1.5.1 Activity Diagram—see FIG. 94.

1.5.2 Basic Flow

1. The USER selects to review the outstanding action items list.
2. The system retrieves the list of outstanding action items associated with the USER ID.
3. The system sorts and builds the list based on the appropriate USER profile.

4. The system will display a list of all outstanding action items assigned to the USER, which could include:
   Authorize a Request
   Extend a Rental
   Handle Unapproved Invoices/Pay Approved Invoices
   Send a Message
5. The USER will select an item from the action items list.
6. The system displays the detail appropriate to the action item status.
7. Upon completion of the selected action item, the system will determine the next action item and display until the current list has been completed.
8. This ends the use case.

1.5.3 Alternative Flows 1.5.3.1 Handle for a Different User

Until step 5, the USER may choose to handle requests for another USER. At this time, the USER must select the appropriate USER to handle for. The system will then validate the ID of the alternate USER, and then rebuild the action list to include all outstanding items associated with the new ID.

1.5.3.2 Re-Sort Action Items List

After displaying the action item list using the default from the profile, the USER may decide to sort the list based on some other criteria. At any time, the USER may choose to re-sort the action item list (Depending on the USER segment) based on Item Type, Date Received, Renter's Name, Claim Number or Corporate Class Number or Purchase Order Number, Rental Company, and Administrator.

1.5.3.3 No Items Found

If there are no Action Items available for the USER work on, the system will display a message indicating that there are no available action items to display.

1.6 Post-Conditions

None 1.7 Special Requirements 1.7.1 Sort Request

The default sort order has been specified by the USERs profile, which governs the order in which action items have been presented. If invoices have been added to the USER's payment list, a link displays for them to proceed to the 'Payment List'. Alternatively, after the last invoice has been approved, the system automatically proceeds to the 'Payment List' before resuming the outstanding action items. If the USER has been designated with the responsibility of handling the 'Unassigned Requests,' a link at the bottom of the action item list displays.

1.8 Extension Points

An extension point indicates a link between this use case and another use case. Extension points associated with the use case are indicated below. Clicking on the extension point will open the related use case.

1.8.1 MA-12-Extend Rental

At step 5, the USER must select an action item to perform. At this point, the USER may elect to extend a previously authorized rental. Extensions may be performed due to prolonged body shop delays and other scenarios. Upon completion of the Extend Rental process, the USER should be returned to step 5 of the Basic Flow. The action item that called for the extension should no longer appear in the USER's action item list.

1.8.2 MA-10-Authorize Request

At step 5, the USER must select an action item to perform. At this point, the USER may elect to authorize a direct bill request. Upon completion of the authorization, the USER should be returned back to step 5 of the Basic Flow. The request needing authorization should no longer appear in the USER's action item list.

1.8.3 Invoicing—BI-01-Handle Unapproved Invoices & BI-02 Pay Approved Invoices & BI-03 Reject an Invoice At step 5, the USER must select an action item to perform. At this point, the USER may elect to pay approved invoices, handle unapproved invoices, or reject an invoice. Upon completion of this process, the USER should be returned back to step 5 of the Basic Flow. The invoices that were processed should no longer appear in the USER's action item list.

1.8.4 MA-19—View Customer File (Message)

At step 5, the USER must select an action item to perform. At this point, the USER may elect to view a message from the rental company. Upon completion of the message, the USER should be returned back to step 5 of the Basic Flow. The message should no longer appear in the USER's action item list.

2. Screen Design

A definition of the screen layout(s), screen data fields, and screen functions that are used to implement the flows identified above. More than one screen may be used to implement support for the use case flow.

2.1 Action Items

This screen (see FIGS. 95(*a*)-(*e*)) will allow the USER to pick which functions that he/she may want to change.

2.1.1 Screen Layout—Action Items—see FIGS. 95(*a*)-(*e*)

2.1.2 Action Items—Summary

| Screen Label | Type | Size | Screen Field Name | Data Field | Screen Specific Rule |
|---|---|---|---|---|---|
| Date Received | Output | 0 | Date Received | action item assigned date | N/A. |
| Type | Output | 15 | Action Item Type | action item type description | N/A. |
| USER | Output | 0 | USER's Name | First Name + Last Name | N/A. |
| Handling For: | List Box | 30 | Handling for USER's Name | First Name + Last Name | N/A. |
| Welcome Back | Output | 30 | User's Name | First Name + Last Name | N/A. |
| Claim Number Purchase Order Number Corporate Class Number | Output | 0 | Claim Number Purchase Order Number Corporate Class Number | Insurance Claim Number, PO#, CC# | N/A. |

-continued

| Screen Label | Type | Size | Screen Field Name | Data Field | Screen Specific Rule |
|---|---|---|---|---|---|
| Renter's Name | Output | 30 | Renter's Name | First Name + Last Name | N/A. |
| Claims Office: | List Box | 3 | Office | external organization abbreviated name | |

2.1.3 Screen Function Definition

This section includes the definitions for all functions that can be performed within the screen. This includes operations invoked by button clicks, specific shortcut keystrokes, or other actor activity.

2.1.3.1 Renter's Name

When clicked on a specific hyperlink under the "Renter's Name" heading, the USER will go into the details of that particular action item and will begin any of the following use cases:

MA-12-Extend Rental

MA-10-Authorize Request

Invoicing-BI-01-Handle Unapproved Invoices & BI-02-Pay Approved Invoices & BI-03 Reject an Invoice MA-19-Customer File (Message)

ARMS Web 3.0

Functional Design Specification

Assign a Request

Version 1.1

Assign a Request

1. Assign a Request Use Case 1.1 Application Overview

The following is a document used to illustrate the process for assigning the unassigned authorization requests to the appropriate user. The assignments will be made using the ARMS Web 3.0 system. The intent for this release of the ARMS Web application is to reach a much wider audience. This application will target a Multi-Vendor, Multi-Segment, and International customer base.

1.2 Brief Description

This use case describes the process of how a USER will review unassigned authorization request and assign them to a USER for further handling.

1.3 Use Case Actors

The following actors will interact with this use case:

RENTAL ADMINISTRATOR—RENTAL ADMINISTRATOR will use the system to assign the unassigned authorization requests. This use case refers to a USER in the role of a rental administrator. There are various types of customers that the rental administrator would represent, which include corporate account holders, car dealerships, insurance companies, and others.

ARMS—The ARMS system will receive/send transactions to ARMS Web to manage each phase of the rental process.

RENTAL CAR COMPANY—A wide variety of rental car companies will be able to use this system as well. Each company will have the ability to initiate and manage their rentals through the use of this application.

1.4 Pre-Conditions

The USER must be signed-on to the ARMS Web system.

The USER should be authorized to assign a request.

If there are unassigned requests present, the USER has selected the link from the Review List Action Items Use Case to enter this use case.

1.5 Flow of Events

The Flow of Events will include the necessary steps to make changes and updates to "Assign an Action Item".

Figure 96:
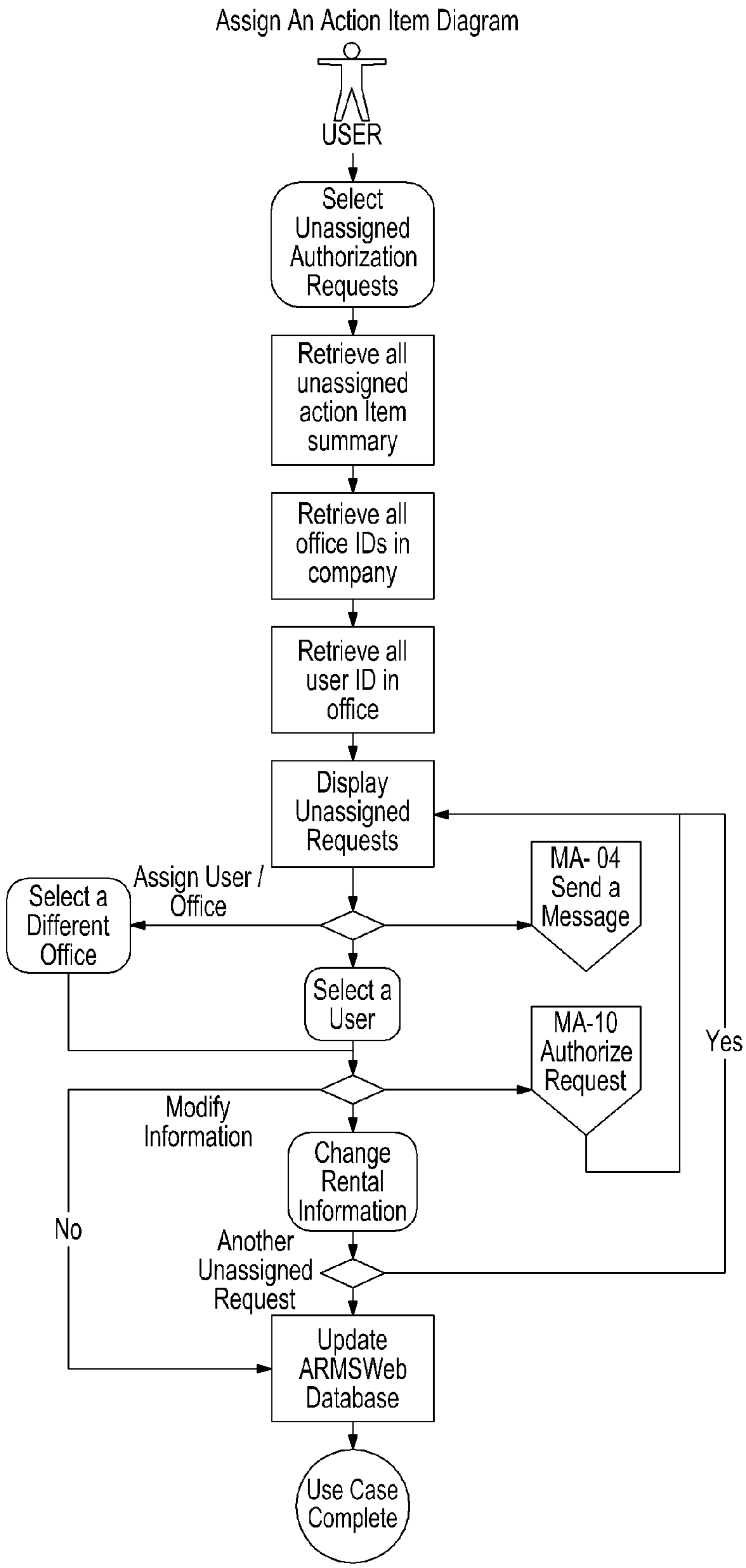
Figure 97A:
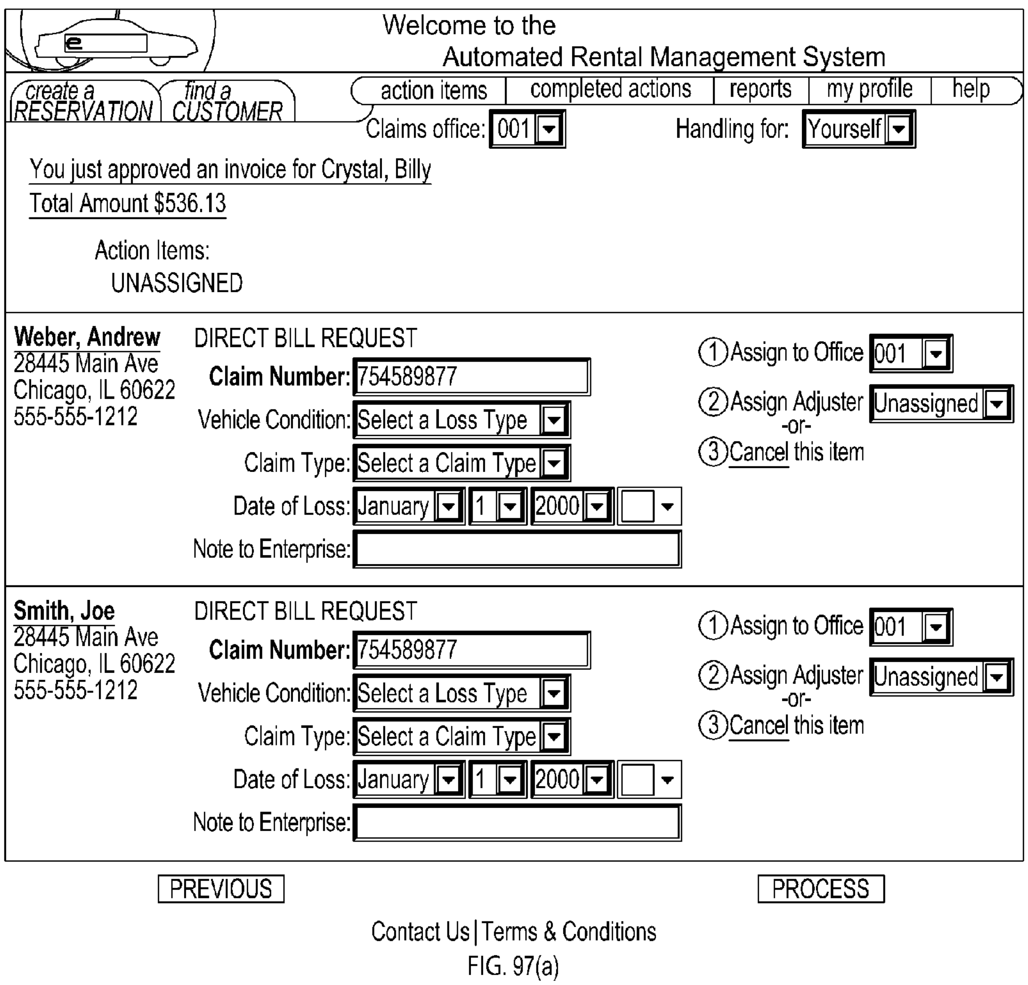
Figure 97B:
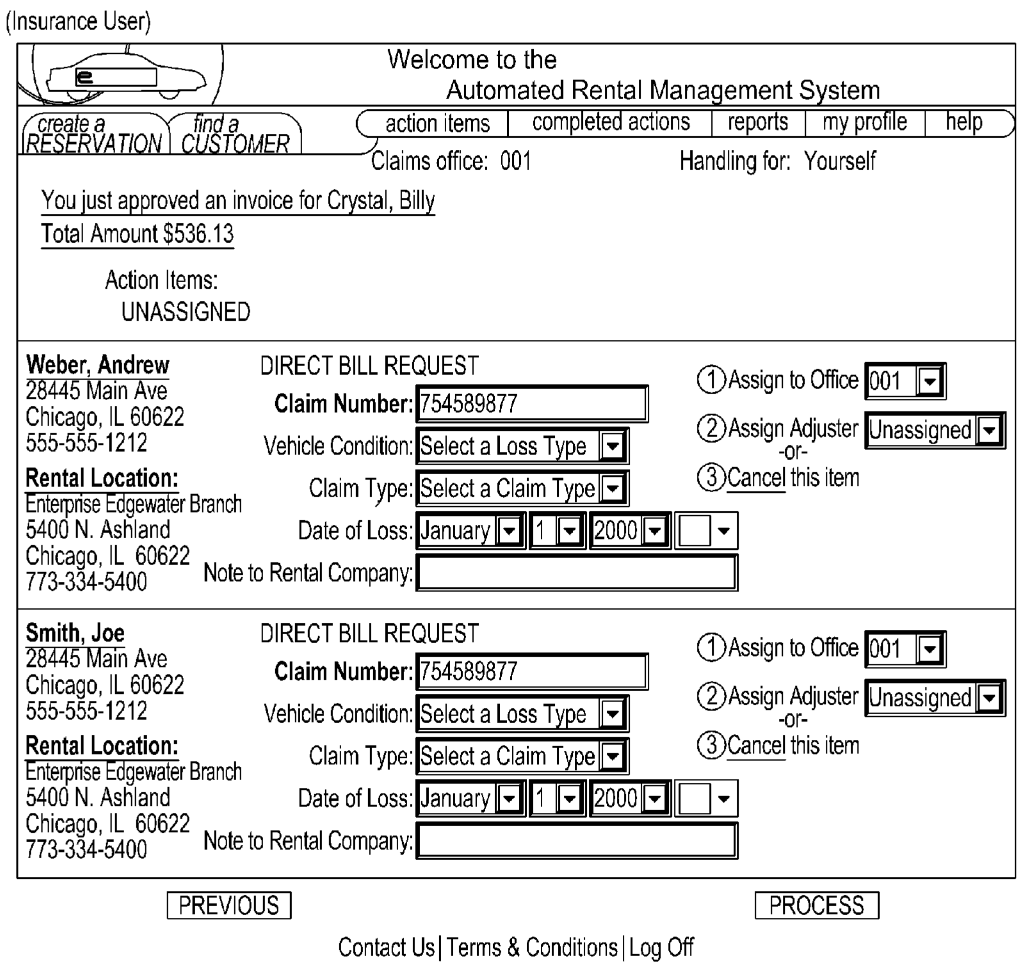
Figure 97C:
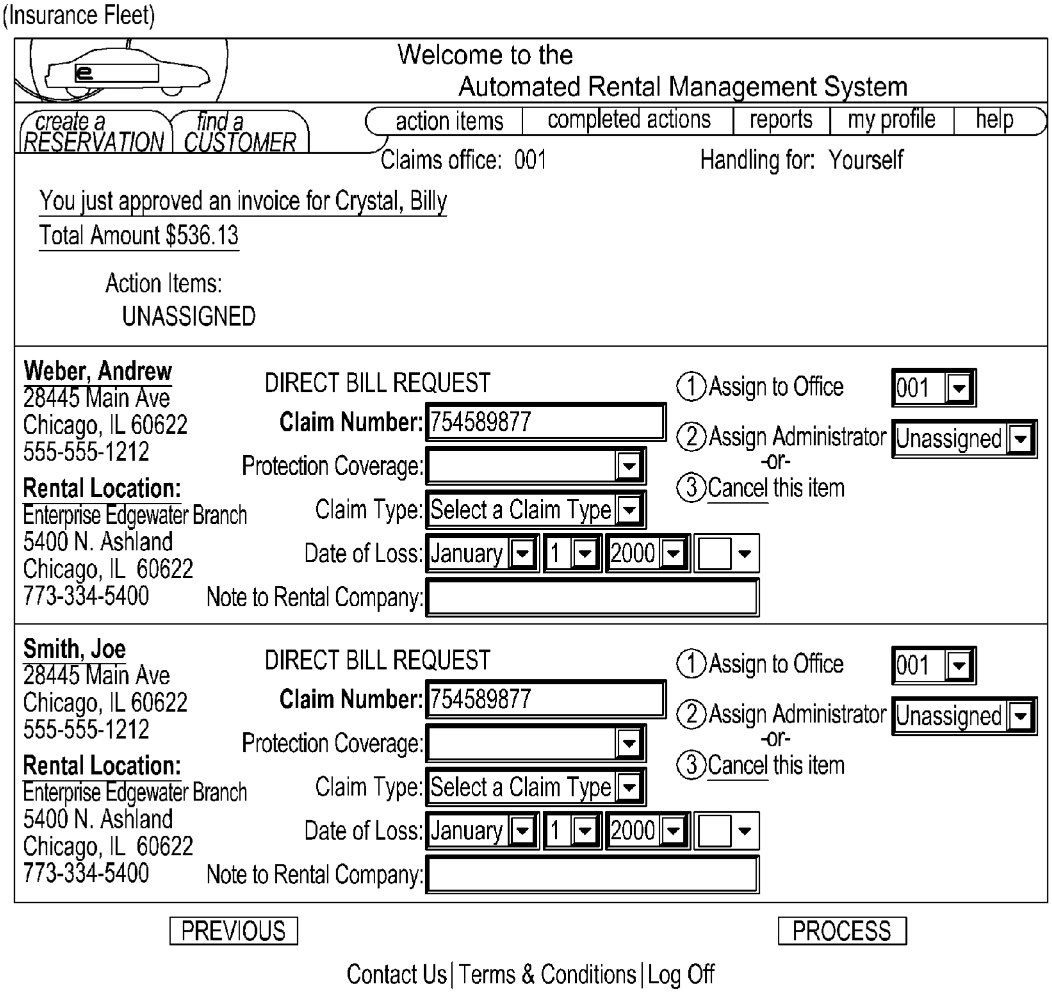
Figure 97D:
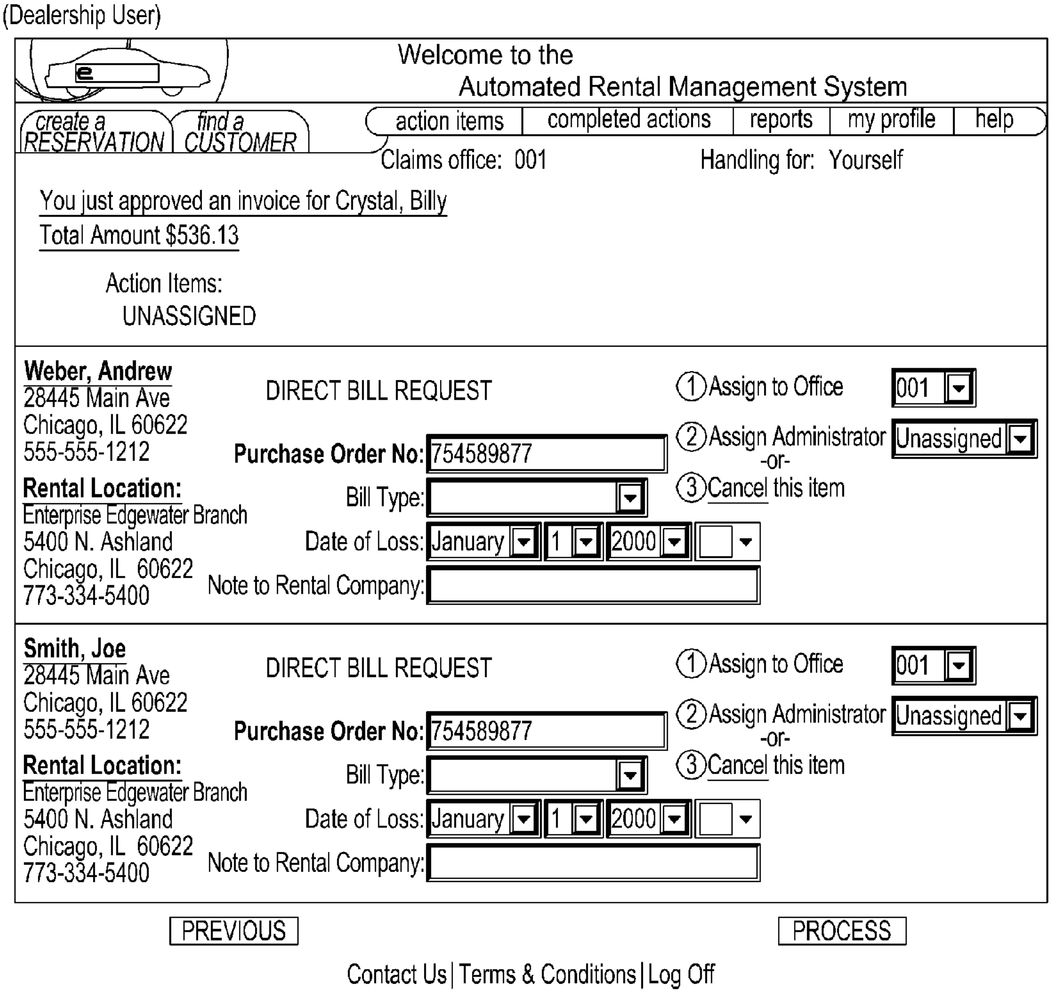
Figure 97E:
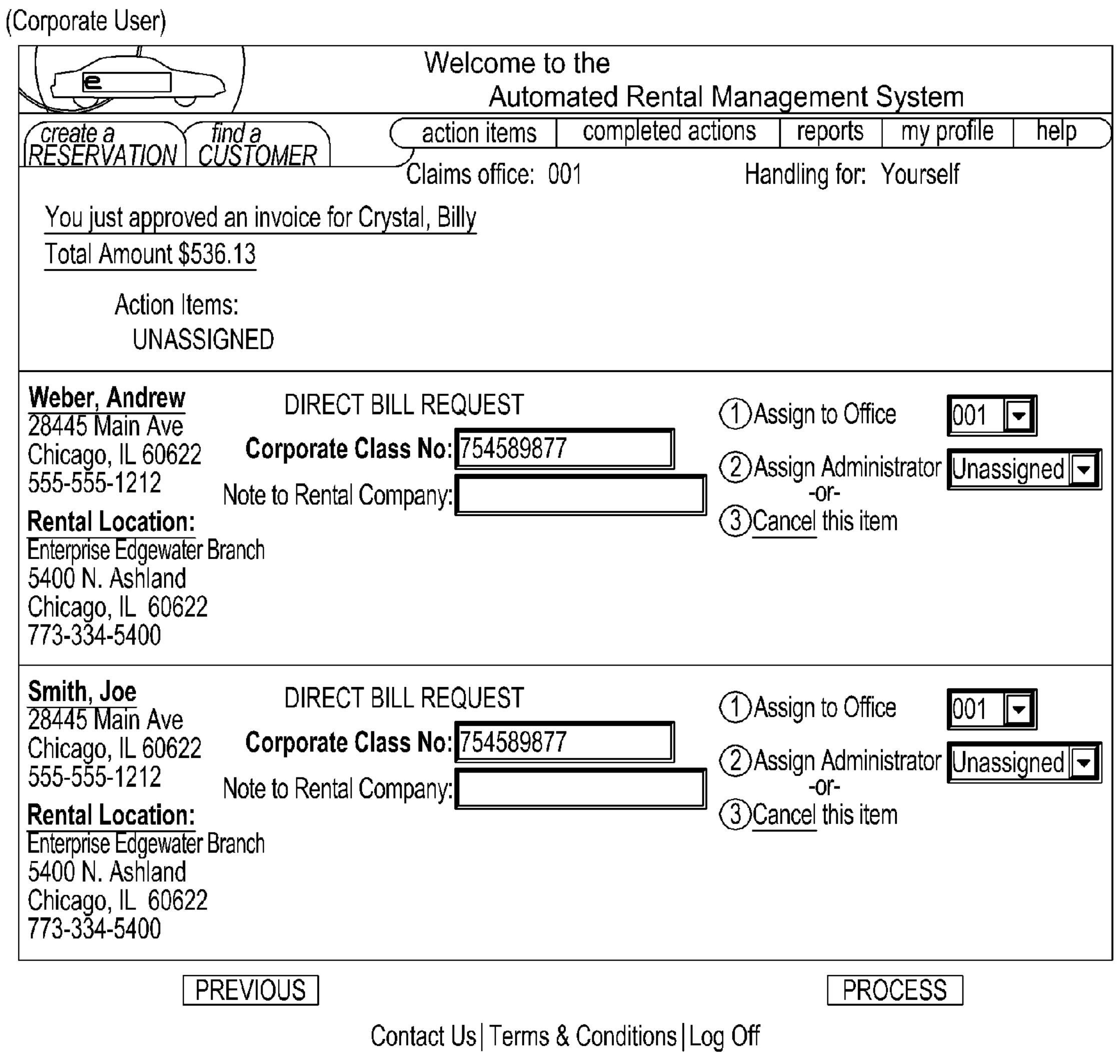

1.5.1 Activity Diagram—see FIG. 96.

1.5.2 Basic Flow

1. The USER selects the unassigned authorizations link.
2. The system retrieves all unassigned request summaries.
3. The system retrieves all OFFICE IDs within ARMS Web.
4. The system retrieves all USER IDs within the OFFICE.
5. The system displays the unassigned authorization summaries with the offices and users.
6. The USER selects a user to assign to the request.
7. The system will update the ARMS Web database.
8. This ends the use case.

1.5.3 Alternative Flows 1.5.3.1 Cancel Use Case

The USER should be capable of leaving the use case at any point prior to assigning the of the reservation information.

1.5.3.2 Modify a Request

Before step 6 of the basic flow, the USER should be able to make changes to the authorization.

1.5.3.3 Select a Different Office

Before step 6 of the basic flow, the USER should be able to select a different office for this authorization request. If a different office has been selected, the user cannot assign the file to a new user. The new office must now assign the file.

1.6 Post-Conditions

If the use case is successful, the system will change the request type from an unassigned authorization request to direct bill. If the user has authority to authorize this request, the system will change the request to Authorized status and assign the adjuster picked in Step 5 of the basic flow.

If the use case is unsuccessful, the system state will remain unchanged.

1.7 Special Requirements

None 1.8 Extension Points 1.8.1 MA-04 Send Message

The Send Message function will be used to allow the user to capture messages and diary notes associated with a rental reservation/authorization. The USER can elect to have the message sent to the rental branch location responsible for the reservation/authorization. The USER may also send a message without assigning the file to a user/office. All MESSAGES and DIARY NOTES captured must be related to a specific reservation/authorization.

1.8.2 MA-10 Authorize a Request

The USER may decide to enter into the full detail screen of the unassigned request, which would invoke the Authorize a Request use case.

2. Screen Design

A definition of the screen layout(s), screen data fields, and screen functions that are used to implement the flows identified above. More than one screen may be used to implement support for the use case flow.

2.1 Action Items—Unassigned

This screen (see FIGS. 97(*a*)-(*e*)) will allow the USER to assign action items to an office or USER. The USER may also cancel an item or change specified information in the Customer File through this screen.

2.1.1 Screen Layout—Action Items—Unassigned (ARMS Web 2.0)—see FIGS. 97(*a*)-(*e*)

2.1.2 Action Items—Unassigned 2.1.2.2 Process

When clicked, the USER will be taken to the next item in the action item list or a detail of the completed action items. This button ends the use case.

2.1.2.3 Cancel

When clicked, the USER will be allowed to cancel the authorization. If this occurs, the rental becomes unauthorized and the rental is no longer responsibility of the company.

ARMS/Web 3.0
Functional Design Specification
View Car Class
Version 1.3

| Screen Label | Type | Size | Screen Field Name | Data Field Name | Screen Specific Rule |
|---|---|---|---|---|---|
| Claims Office: | Output | 3 | Office Id | external organization abbreviated name | N/A. |
| Handling For: | Output | 30 | Handling for Adjuster's Name | First Name + Last Name | N/A. |
| | Output | 30 | Renter's Name | First Name + Last Name | This should be a link. The USER should be able to get to the authorize page from this screen field |
| | Output | 30 | Renter's Address | Address Line | |
| | Output | 10 | Renter's City | City | |
| | Output | 3 | Renter's State | State | |
| | Output | 10 | Renter's Zip Code | Zip Code | |
| | Output | 16 | Renter's Home Phone | Renters Night Phone + Renters Night Phone Extension | If these fields are populated, add a label to the screen to differentiate between Home Phone and Work Phone |
| | Output | 16 | Renter's Work Phone | Day Phone + Renters Day Phone Extension | If these fields are populated, add a label to the screen to differentiate between Home Phone and Work Phone |
| Claim Number Purchase Order Number Corporate Class Number | Input | 30 | Claim Number Purchase Order Number Corporate Class Number | Insurance Claim Number, PO#, CC# | N/A. |
| Vehicle Condition | List Box | 15 | Loss Type | loss type description | |
| Claim Type Bill Type | List Box | 15 | Claim Type Bill Type | Rental type description | N/A. |
| Date of Loss: | Input | 10 | Date of Loss | Date of Loss | N/A. |
| Note to Enterprise | Input | 30 | Message Text | NOTE | N/A. |
| Assign to office: | List Box | 5 | Office Id | external organization abbreviated name | |
| Assign adjuster: | List Box | 30 | Adjuster Name | First Name + Last Name | Lists only those adjusters the USER has authority to assign |

Screen Function Definition

This section includes the definitions for all functions that can be performed within the screen. This includes operations invoked by button clicks, specific shortcut keystrokes, or other actor activity.

2.1.2.1 <<Previous

When clicked, the USER will be taken back to the previous screen.

View Car Class

1. View Car Class Use Case 1.1 Application Overview

The following is a document used to illustrate the process for how the USER would view examples of automobiles that are part of each rental company car class using ARMS/Web 3.0. The intent for this release of the ARMS/Web application is to reach a much wider audience. This application will target a Multi-Vendor, Multi-Segment, and International customer base.

1.2 Brief Description

This use case will allow the USER to view examples of automobiles that are part of each rental company car class. The USER will have the ability to select a car class and have the rate for the car class apply to the reservation/authorization.

1.3 Use Case Actors

The following actors will interact with this use case:

RENTAL ADMINISTRATOR—The RENTAL ADMINISTRATOR will use the system to view and/or select the car class that will apply to a reservation. This use case refers to a USER in the role of a USER. There are various types of customers that the USER would represent, which include corporate account holders, car dealerships, insurance companies, and others.

ARMS—The ARMS system will receive/send transactions to ARMS/Web to retrieving information regarding the automobiles.

RENTAL CAR COMPANY—A wide variety of rental car companies will be able to use this system as well. Each company will have the ability to initiate and manage their rentals through the use of this application.

1.4 Pre-Conditions

The USER must be signed-on to the ARMS/Web system.

The USER must have a reservation or open ticket selected.

1.5 Flow of Events

The Flow of Events will include the necessary steps to view and/or select the car class to apply to a rental reservation.

Figure 98:
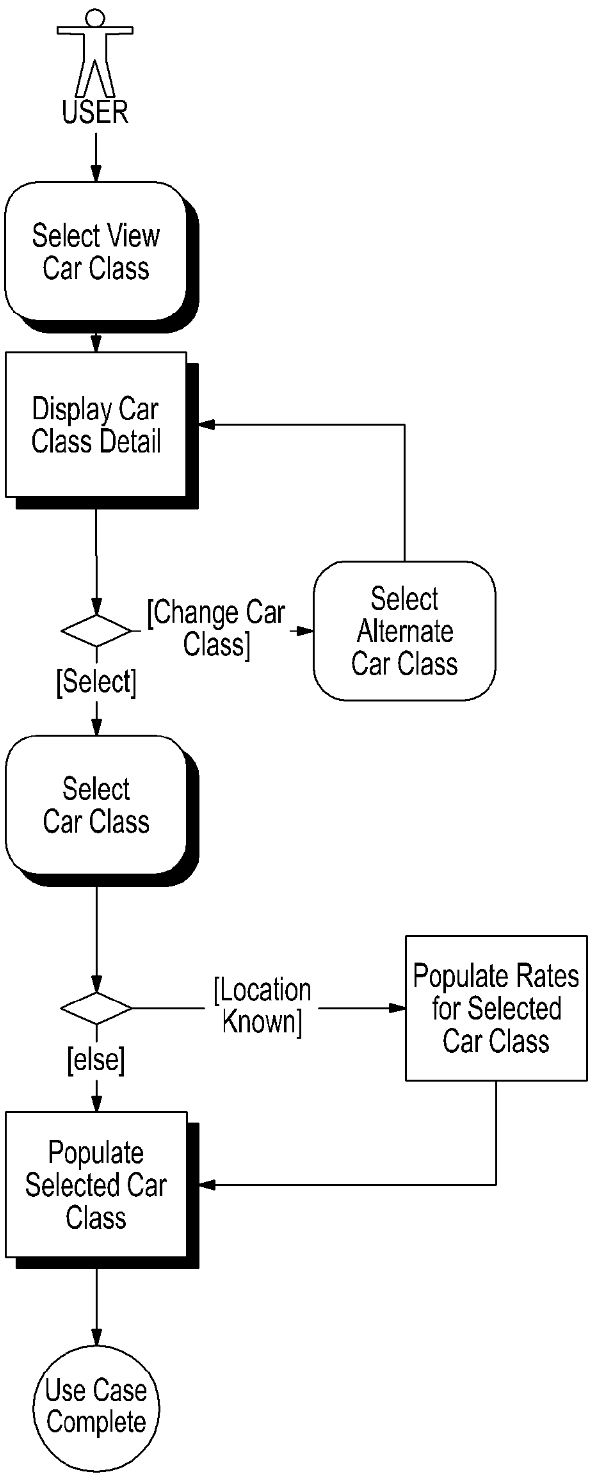

1.5.1 Activity Diagram—see FIG. 98.

1.5.2 Basic Flow

The Basic Flow of the View Car Class use case includes all of the required steps to view and/or select a car class for a rental reservation. If a car class is selected, it will be used to populate rate information on a rental authorization.

1. The USER will select View Car Class from the active reservation or open ticket.
2. The system will display a car class detail screen. If the USER had previously selected a car class (for example, on the Create Reservation screen), the car class selected will be displayed. If no car class has been selected, the system will display the Standard car class.
3. The USER will select the car class to apply to the reservation or open ticket.
4. The system will return the USER to the active reservation or open ticket and populate car class information based on the car class selected.
5. This ends this use case.

1.5.3 Alternative Flows 1.5.3.1 Select Alternate Car Class

From Step 2 of the Basic Flow, the USER will have the ability to view an alternate car class. The car classes that will be available to view include:

Economy
Compact
Intermediate
Standard
Full Size
Premium

If the USER selects an alternate car class, the system will refresh and present the details of the new car class.

1.5.3.2 Populate Car Class Rates

If a rental branch location has already been selected prior to entering this use case, the selection of a car class will populate the rates that apply to the selected car class on the active reservation or open ticket. This alternate flow returns the USER to Step 4 of the Basic Flow.

1.6 Post-Conditions

If successful, the selected Car Class will be returned to the active reservation or open ticket.

If unsuccessful, the system state is unchanged.

1.7 Special Requirements

The additional requirements of the business use case are included here. These are requirements not covered by the flow as they have been described in the sections above.

1.7.1 Modify Car Class Selection Results

The USER may change the results of this use case as part of the active reservation or open ticket.

1.8 Extension Points

None.

2. Screen Design

A definition of the screen layout(s), screen data fields, and screen functions that are used to implement the flows identified above. More than one screen may be used to implement support for the use case flow.

2.1 Car Class Detail Screen

Figure 99A:
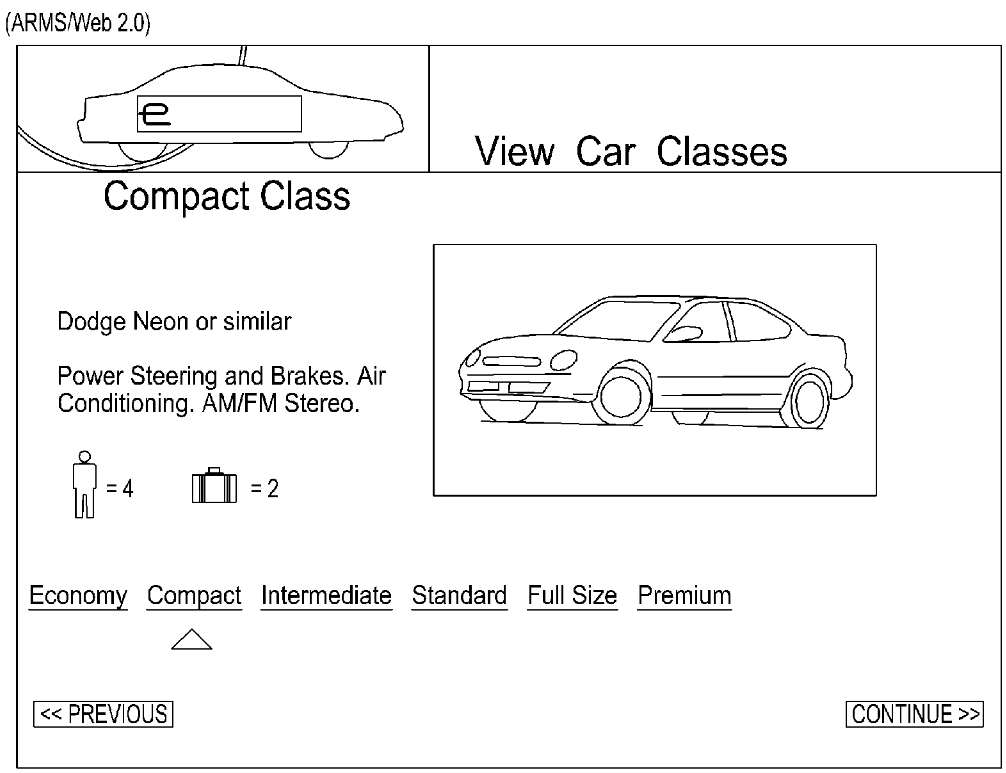
Figure 99B:
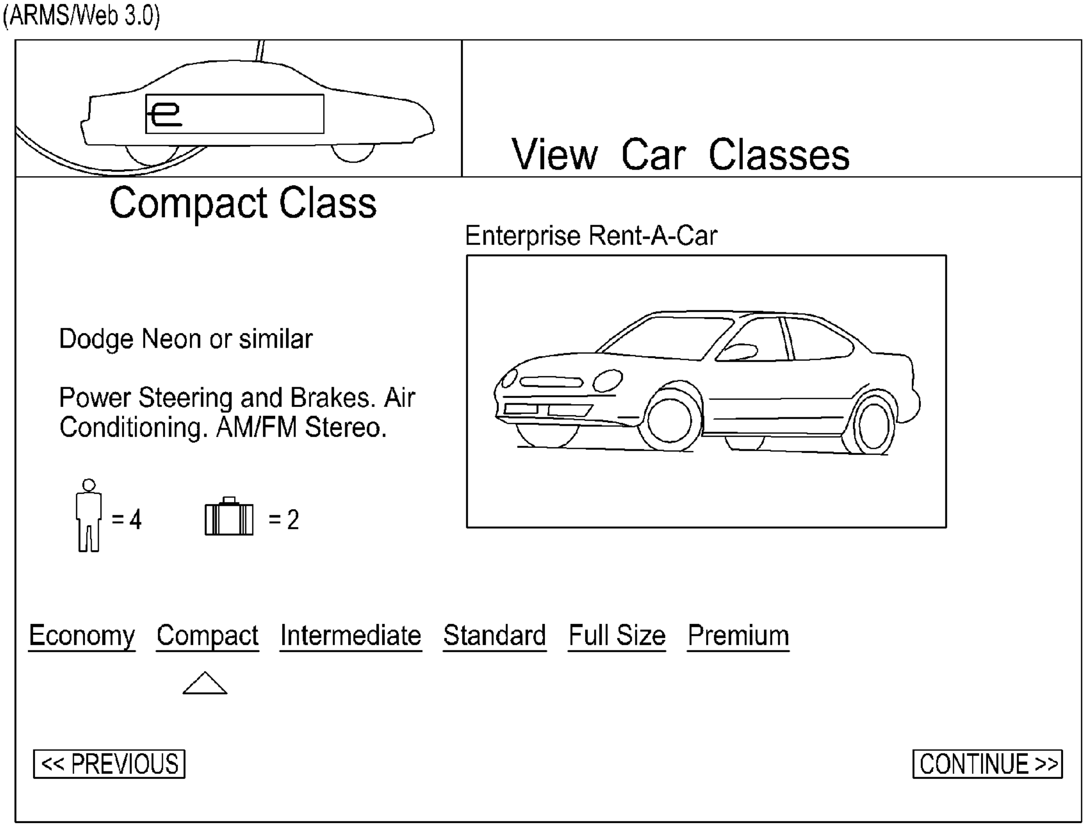

This screen (see FIGS. 99(*a*)-(*b*)) will allow the USER to view detailed information about the rental company's car classes. The USER will also have the ability to select a car class to apply to a rental reservation/authorization.

2.1.1 Screen Layout—see FIGS. 99(*a*)-(*b*)

2.1.2 Car Class Details

| Screen Label | Type | Length | Screen Field Name | Data Field | Screen Specific Rule |
|---|---|---|---|---|---|
| | Output | 20 | Car Class Name | | This should be the name of the currently selected car class. |
| | Output | 40 | Rental Company Name | | |
| (Person Image) | Output | 2 | Car Class Person Capacity | | This should provide the average person capacity of the selected car class. |
| (Luggage Image) | Output | 2 | Car Class Luggage Capacity | | This should provide the average luggage capacity of the selected car class. |
| | Hidden | 255 | Car Class Image Source | | This should provide a picture of an example car within the selected car class. |
| | Output | 120 | Car Class Detail Description | | This should provide a description of the selected car class. |

-continued

| Screen Label | Type | Length | Screen Field Name | Data Field | Screen Specific Rule |
|---|---|---|---|---|---|
| Economy | Output | | Economy Car Class | | This should be a hyperlink to the Economy car class detail. |
| Compact | Output | | Compact Car Class | | This should be a hyperlink to the Compact car class detail. |
| Intermediate | Output | | Intermediate Car Class | | This should be a hyperlink to the Intermediate car class detail. |
| Standard | Output | | Standard Car Class | | This should be a hyperlink to the Standard car class detail. |
| Full Size | Output | | Full Size Car Class | | This should be a hyperlink to the Full Size car class detail. |
| Premium | Output | | Premium Car Class | | This should be a hyperlink to the Premium car class detail. |

2.1.3 Screen Function Definition

This section includes the definitions for all functions that can be performed within the screen. This includes operations invoked by button clicks, specific shortcut keystrokes, or other actor activity.

2.1.3.1 Select this Car Class

The continue screen function will allow the USER to select the car class to apply to a reservation.

2.1.3.1.1 The Continue screen function is invoked through either a button click or through an Enter keystroke.

2.1.3.2 Previous

The Previous screen function allows the USER to return to the previous screen.

2.1.3.2.1 The Previous screen function is invoked through a button click.

3. Questions and Answers

None.

ARMS/Web 3.0

Functional Design Specification

Authorize a Request

Version 1.1

Authorize a Request

1. Authorize Request Use Case 1.1 Application Overview

The following is a document used to illustrate the process for how a USER authorizes a direct bill request using ARMS/Web 3.0. The intent for this release of the ARMS/Web application is to reach a much wider audience. This application will target a Multi-Vendor, Multi-Segment, and International customer base.

1.2 Brief Description

This use case describes how a USER authorizes a direct bill request.

1.3 Use Case Actors

The following actors will interact with this use case:

RENTAL ADMINISTRATOR—The RENTAL ADMINISTRATOR will use the system to authorize a direct bill request. This use case refers to a USER in the role of a rental administrator. There are various types of customers that the USER would represent, which include corporate account holders, car dealerships, insurance companies, and others.

ARMS—The ARMS system will receive/send transactions to ARMS/Web to confirm the direct bill request.

RENTAL CAR COMPANY—A wide variety of rental car companies will be able to use this system as well. Each company will have the ability to initiate and manage their rentals through the use of this application.

1.4 Pre-Conditions

The USER must be logged into the ARMS/Web system.

The USER must have the authority to authorize a request.

At least one outstanding unauthorized direct bill request must be assigned that the USER may handle.

The USER must have selected an Unauthorized Direct Bill Request from the Review Action Items Screen or from the Search Results page.

1.5 Flow of Events

The Flow of Events will include the necessary steps to make changes and updates to "Authorize Request".

Figure 100:
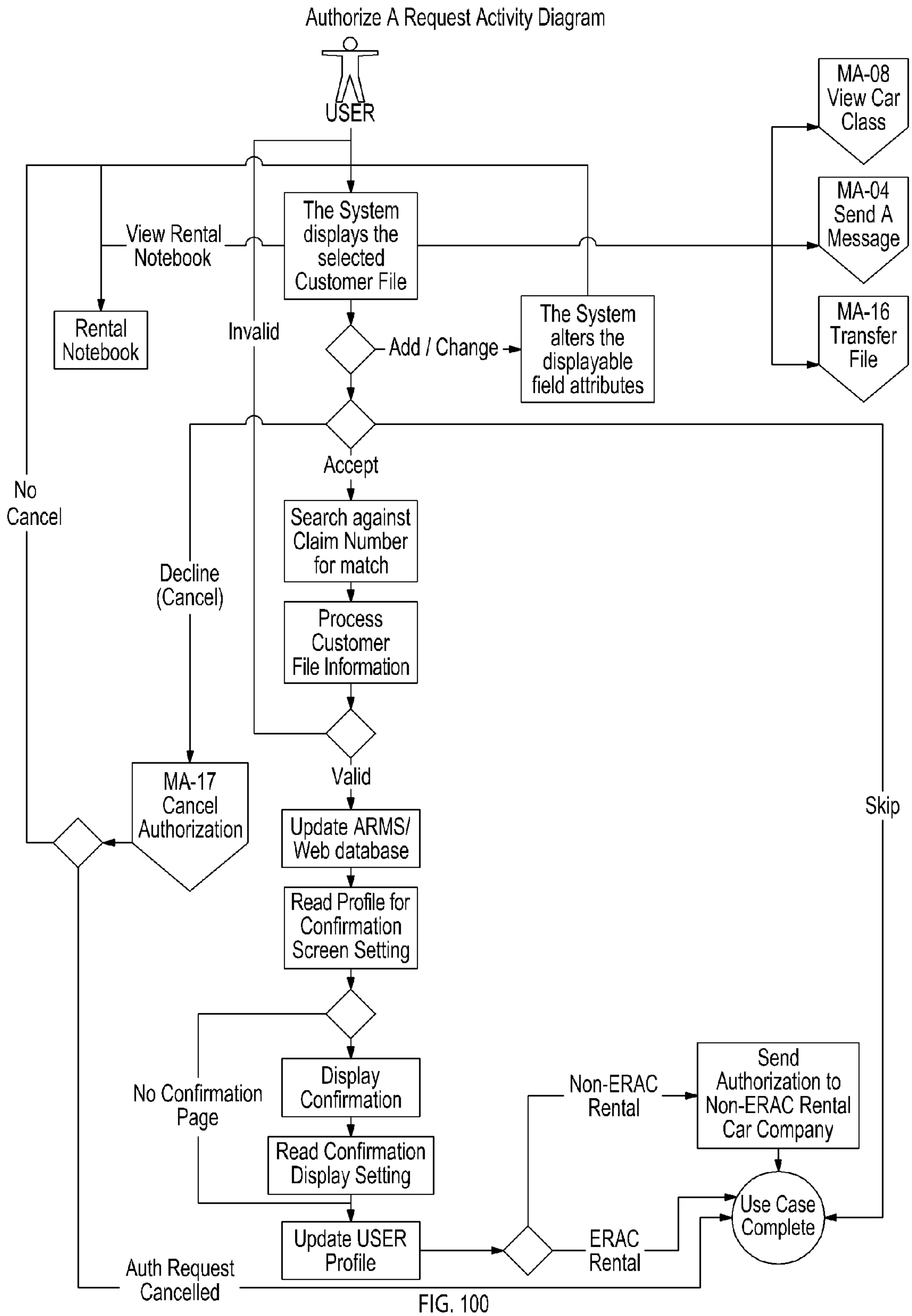
Figure 101B:
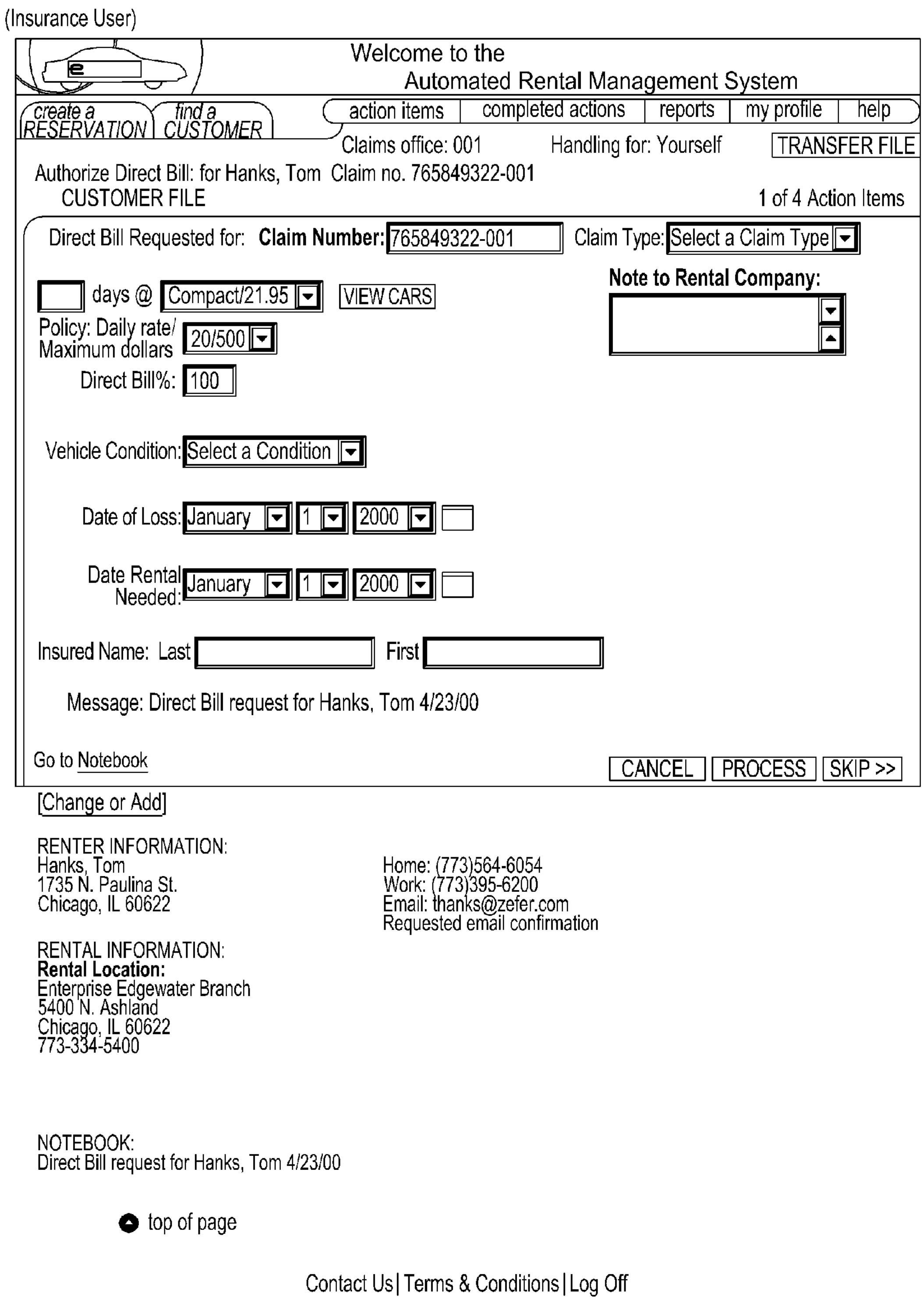
Figure 101C:
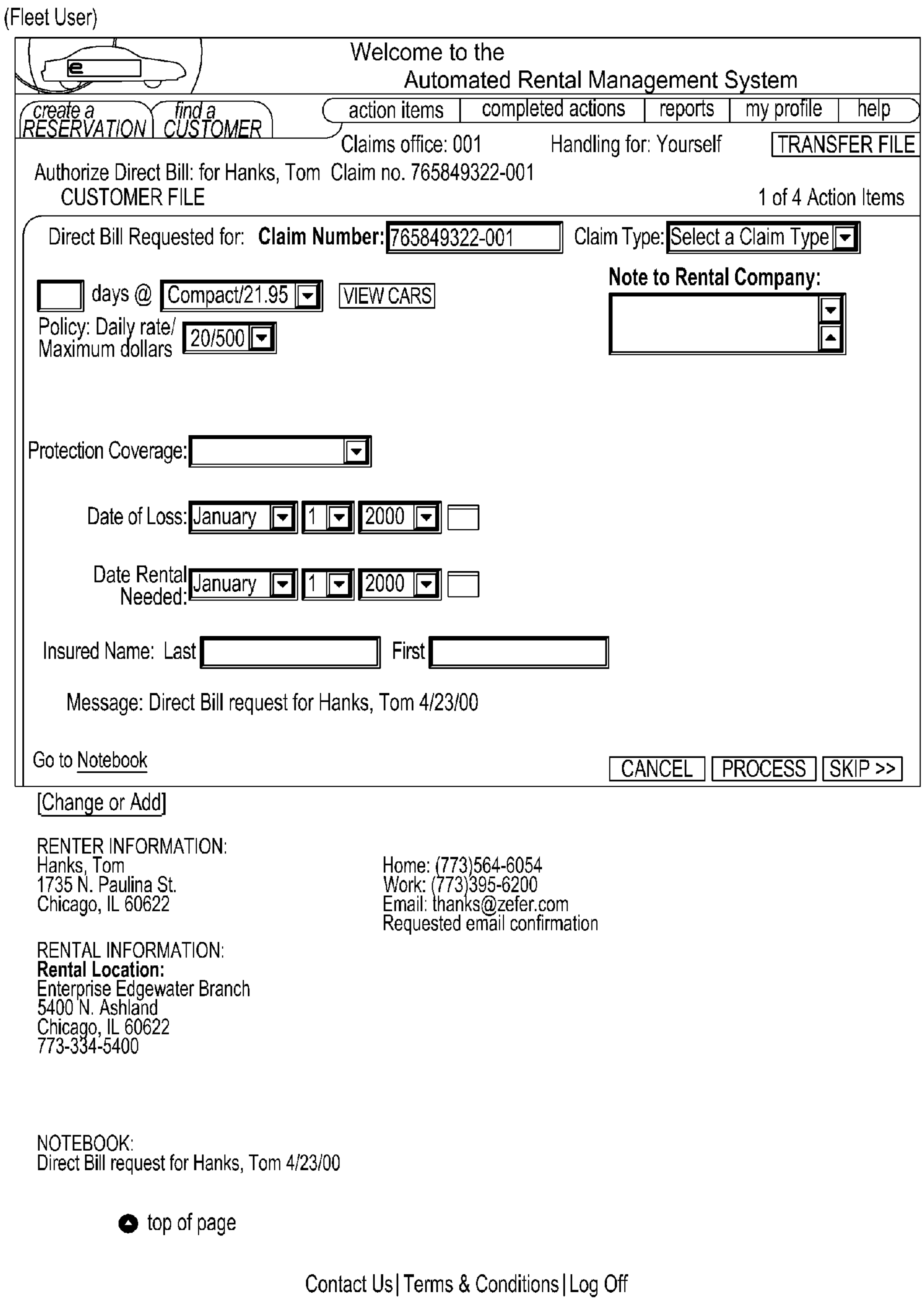
Figure 101D:
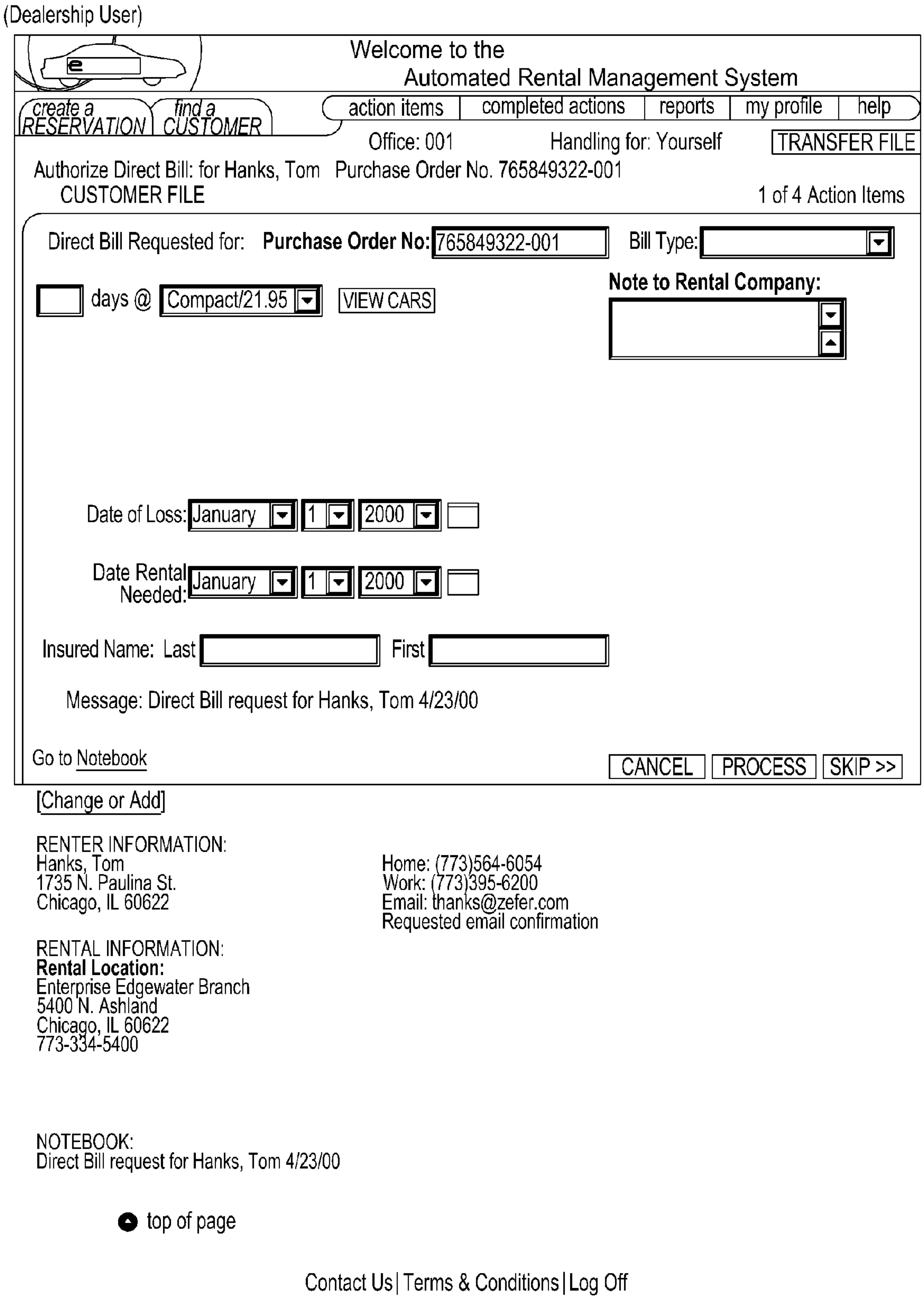
Figure 101E:
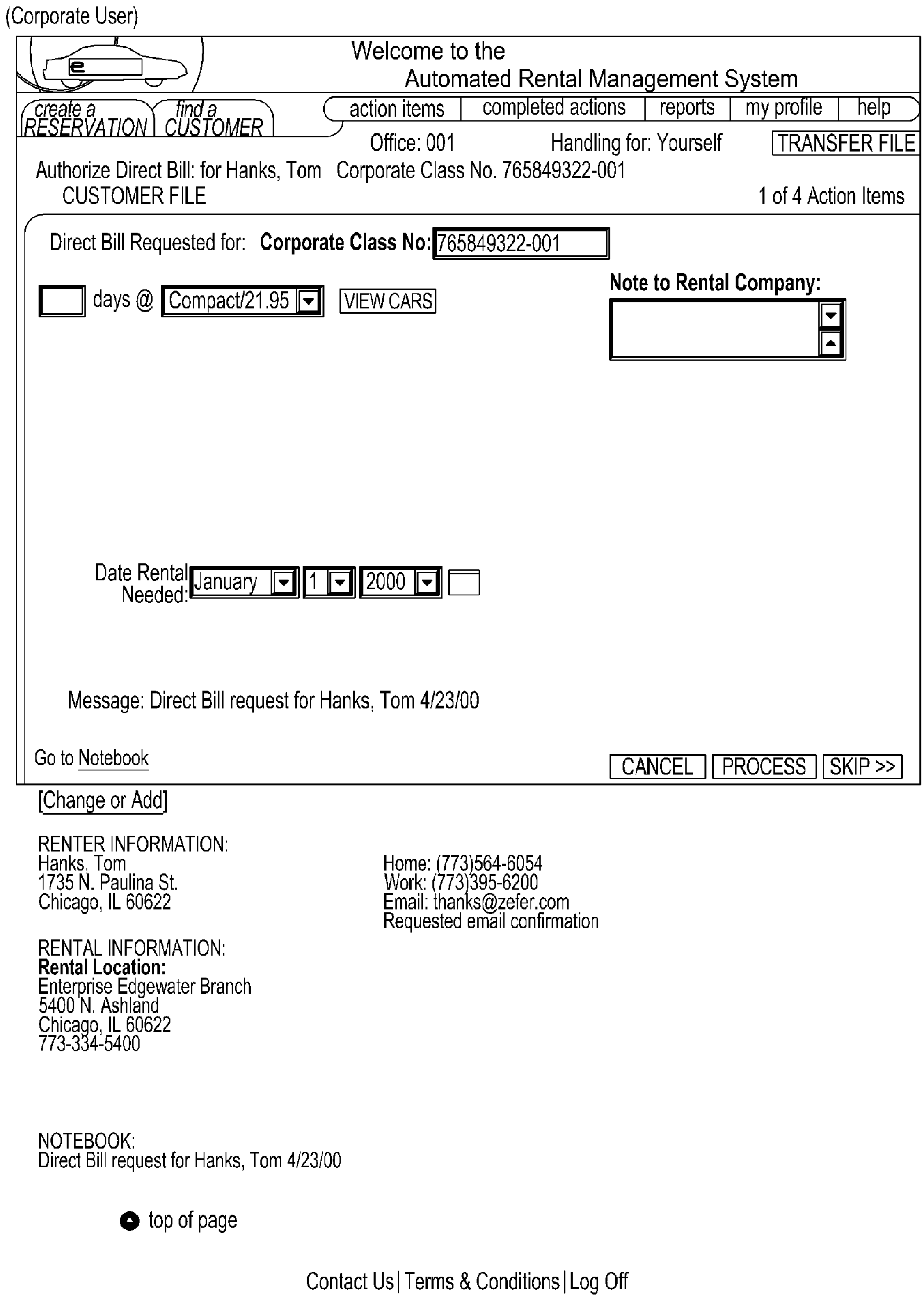

1.5.1 Activity Diagram—see FIG. 100.

1.5.2 Basic Flow

1. The USER selects an outstanding direct bill to authorize.
2. The system displays the Customer file.
3. The USER reviews the renter's information.
4. The USER inputs a number of Authorized Amounts, days and required fields.
5. The USER submits the Authorization.
6. The system validates information in the Customer File.
7. If the USER assigned to the Customer File is 'UNKNOWN' or 'UNASSIGNED', the System will assign the Customer File to the current USER.
8. The system will update the ARMS/Web database with the Authorization.
9. The System reads the USER profile to see if the confirmation page should display.
10. If the profile indicates 'Show Confirmation Page', the System will display the confirmation page.
11. For non-Enterprise rentals, the authorization request is sent to the non-ERAC rental car company's rental system.
12. This ends the use case.

1.5.3 Alternative Flows 1.5.3.1 View Notebook

At step 3 of the Basic Flow, the USER can select to view the transaction history (Notebook) by selecting the Go To Notebook link.

1.5.3.2 Add Notes to Customer File

At step 3 of the Basic Flow, the USER can add notes to the Customer File by typing in the appropriate notes field on the Customer File page.

1.5.3.3 Skip Customer File

At step 3 of the Basic Flow, the USER can get out of the Customer File by selecting the skip button on the Customer File page.

1.5.3.4 Change Customer File

At step 3 of the Basic Flow, the USER can make changes to the additional details of the Customer File. This is done by selecting the Add/Change link which will invoke an editable page with all *appropriate information editable.

1.6 Post-Conditions

If the use case was successful then the changes should go into effect immediately and the screen should revert back to the original screen of entry.

If the use case was successful, then the ARMS/Web system will be notified of authorization changes.

If the use case was unsuccessful then the system state will be unchanged.

1.7 Special Requirements 1.7.1 Requirements for Claim Type Authorizations (Insurance Users Only)

The following are a set of requirements surrounding the type of authorized amounts that are allowable based on the Claim Type associated with a rental. These restrictions DO NOT APPLY to reservations that are submitted with a Direct Billing Percentage of zero (0).

1.7.1.1 When the Claim Type Selected is 'Insured', 'Theft', or 'Uninsured Motorist'

1.7.1.1.1 For insurance USERs, the reservation/rental must always include an Authorized Rate or both Policy Daily and Maximum Limits as defined by the renter's insurance policy. Zero (0) is an acceptable Policy Daily Limit.

1.7.1.1.2 For insurance USERs, the reservation/rental must include an Authorized Rate or Policy Daily Limit if a Policy Maximum Limit is included. Zero (0) is an acceptable Policy Daily Limit.

1.7.1.2 When the Claim Type Selected is 'Claimant' (Insurance Users Only)

1.7.1.2.1 The reservation/rental must always include an Authorized Rate.

1.7.1.2.2 The reservation/rental may not include a Policy Daily/Maximum Limits selection.

1.7.1.3 Requirements for Editable Fields Based on Reservation/Ticket Status 1.7.1.3.1 Depending on the status of the Customer File the USER may change the following fields:

| Field Name (Depending on USER Segment) | Unassigned/ Unauthorized Reservation/ Ticket | Assigned but Unauthorized Reservation or Ticket | Authorized Ticket |
|---|---|---|---|
| CLAIM NUMBER (Insurance & Fleet) | X | X | X |
| PURCHASE ORDER NUMBER (Dealership) | | | |
| CORPORATE CLASS NUMBER (Corporate) | | | |
| CLAIM TYPE (Insurance) | X | X | X |
| BILL TYPE (Dealership) | | | |
| VEHICLE CONDITION | X | X | X |
| DATE OF LOSS (Removed for corporate) | X | X | X |
| INSURED INFORMATION | X | X | X |
| RENTER INFORMATION | X | | |
| DATE RENTAL IS NEEDED | X | | |
| NUMBER OF AUTHORIZED DAYS | X | X | |
| DIRECT BILL PERCENT (Insurance Only) | X | X | X |
| POLICY LIMITS (Insurance and Corporate Only) | X | X | X |
| AUTHORIZED RATE | X | X | X |

If the Customer File is an Unauthorized Reservation, the USER can Reject the Authorization Request, Send a Message, and/or Transfer (Assign) the file to a USER.

1.7.1.3.2 If the status of the Customer File is an open ticket the following rules apply:

| Actions | Authorized Reservation | Unauthorized Reservation/ Ticket | Authorized Open Ticket |
|---|---|---|---|
| Send Message | X | X | X |
| Extension | | | X |
| Terminate Rental | | | X |
| Cancel Authorization | X | X | |
| Transfer/Assign Adjuster | X | X | X |
| View Car Class | X | X | X |

1.8 Extension Points

An extension point indicates a link between this use case and another use case. Extension points associated with the use case are indicated below. Clicking on the extension point will open the related use case.

1.8.1 MA-04 Send A Message

The Send Message will be used to allow the USER to capture messages and diary notes associated with extending a rental. The USER can elect to either have the message sent to the rental company responsible for the reservation/authorization, or (Depending on the USER segment if this option is available) to store the note in the ARMS/Web system without sending the message to rental company. All MESSAGES and DIARY NOTES captured must be related to a specific reservation/authorization.

1.8.2 MA-07 Additional Charges

The USER may choose to select the additional charges button that displays a page showing all the additional items at the branch with the branch charges displayed. The USER can select the items and enter in the authorized amounts.

1.8.3 MA-16 Transfer Work

The USER may choose to transfer an authorization to a different USER in his/her office or transfer the authorization to another USER in a different office.

1.8.4 MA-08 View Car Class

The USER may choose to view the car class. This button invokes the View Car Class use case.

1.8.5 MA-17 Cancel Authorization

The USER may choose to deny the authorization. When the USER selects the CANCEL button, it will invoke the Cancel Authorization use case to reject the authorization.

2. Screen Design

A definition of the screen layout(s), screen data fields, and screen functions that are used to implement the flows identified above. More than one screen may be used to implement support for the use case flow.

2.1 Authorize Rental Detail

This screen (see FIGS. 101(*a*)-(*e*)) will allow the USER to work the currently selected authorization request. The USER (Depending on the USER segment) may set the authorization amounts and policy coverage limits or may assign the request to another USER.

2.1.1 Screen Layout—Authorize Rental Detail—see FIGS. 101(*a*)-(*e*)

2.1.2 Authorize Rental Detail

| Screen Label | Type | Size | Screen Field Name | Data Field | Screen Specific Rule |
|---|---|---|---|---|---|
| Handling For: | List Box | 30 | Handling for USER's Name | First Name + Last Name | |
| Note to: | Input | 0 | Message | NOTE | |
| Notebook | Output | 50 | Message | NOTE | |
| | Output | 8 | Message Creation Date | Add Date | |
| Message | Output | 50 | Message Text | NOTE | |
| | Output | 10 | Notebook creation date | Add Date | |
| Claim no Corporate Class no Purchase Order no | Output | 30 | Claim Number Corporate Class Number Purchase Order Number | Insurance Claim Number | Claim number for an insurance USER Corporate Class number is for a corporate USER Purchase order number is for a dealership USER |
| Claim Number: Corporate Class Number Purchase Order Number | Input | 11 | Claim Number Corporate Class Number Purchase Order Number | Insurance Claim Number | Claim number for an insurance USER Corporate Class number is for a corporate USER Purchase order number is for a dealership USER |
| ____ days @ | Input | 4 | Number of Days Authorized | Number Of Days Authorized | |
| Direct Bill %: | Input | 6 | Percent Covered | Bill To % | Only visible to insurance USER |
| Policy: Daily rate/Maximum dollars: | List Box | 5 | Policy Maximum and Daily Rates | Dollars Per Day Covered | Only visible to insurance and fleet USERs. |
| Policy: Daily rate/Maximum dollars: | List Box | 5 | Policy Maximum and Daily Rates | Max $ Covered | Only visible to insurance and fleet USERs. |
| | Output | 30 | Rental Location Branch Name | Rental Location | |
| Date Rental Needed: | List Box | 10 | Rental Start Date | Start Date | |
| days @____ | List Box | 6 | Vehicle Rate | Vehicle Rate | |
| Insured Name: | Input | 30 | Insured's Name | First Name + Last Name | |
| Insured Name: | Output | 20 | Insured's Name | First Name + Last Name | |
| | Output | 30 | Rental Location Address | Address Line + Address Line2 | |
| | Output | 25 | Rental Location City Name | City | |
| | Output | 10 | Rental Location Postal/ Zip Code | Zip Code | |
| | Output | 3 | Rental Location State/ Province Code | State | |
| | Output | 13 | Rental Location Telephone Number | Telephone Number | |
| Date of Loss: | List Box | 10 | Date of Loss | Date of Loss | Remove for corporate USERs |
| Date of Loss | Output | 10 | Date of Loss | Date of Loss | Remove for corporate USERs |
| | Output | 30 | Renter's Address Line | Address Line | |
| Renter's Address | Output | 20 | Renter's City | City | |
| | Output | 3 | Renter's State/Province Code | State | |
| | Output | 15 | Renter's Zip/Postal Code | Zip Code | |

-continued

| Screen Label | Type | Size | Screen Field Name | Data Field | Screen Specific Rule |
|---|---|---|---|---|---|
| Home Phone: | Output | 16 | Renter's Home Phone | Renters Night Phone + Renters Night Phone Extension | This field is input if the ticket is not opened. It will not be editable if the ticket is open. |
| Authorize Direct Bill: for | Output | 30 | Renter's Name | First Name + Last Name | N/A. |
| Renter: | Output | 30 | Renter's Name | First Name + Last Name | N/A. |
| | Output | 16 | Renter's Work Phone | Day Phone + Renters Day Phone Extension | |
| Owner's Vehicle | Output | 20 | Vehicle Year, Make and Model | Renter Vehicle Year + Renter Make/Model | |
| | Output | 15 | Repair Facility City | City | |
| Repair Facility | Output | 20 | Repair Facility Name | Repair Facility Name | |
| | Output | 3 | Repair Facility State | State | |
| | Output | 10 | Repair Facility Telephone Number | Telephone Number | |
| | Output | 7 | Repair Facility Zip Code | Zip Code | |
| Claim Type: | List Box | 15 | Claim Type | claim type description | N/A. |
| Claims Office: | Output | 3 | Office Id | external organization abbreviated name | N/A. |
| Vehicle Condition | List Box | 20 | Loss Type | loss type description | |
| Vehicle Condition | Output | 20 | Type of Loss | loss type description | |
| | Input | 20 | Renter's Email | renter email | |

2.1.3 Screen Function Definition

This section includes the definitions for all functions that can be performed within the screen. This includes operations invoked by button clicks, specific shortcut keystrokes, or other actor activity.

2.1.3.1 Skip

When clicked, the USER will be taken out of the use case without changing the current status of the request. Any changes made by clicking Change or Add and keying data in the bottom section will be saved.

2.1.3.2 Process

When clicked, the system will validate the input and accept the changes made to the customer file. The ARMS/Web database will be updated. The use case will then end and the USER will return to the process from which they came.

2.1.3.3 Notebook

When clicked, the USER will be taken to the Note Book section at the bottom of the screen to view all messages for this rental.

2.1.3.4 Set Last Date

When clicked, the system will terminate the rental. The USER will be prompted to enter a termination date for this rental. This coincides with the use case MA-17-Terminate Rental.

2.1.3.5 Transfer File

When clicked, the USER will be taken to the Transfer File screen. This screen allows the USER to change the office or USER currently assigned to the customer file. The required information in the Extend Rental/Customer File will be passed to the Transfer File screen. Upon completion of the transfer, the USER will then be returned to the next action item or the profiled start page, depending on the screen from which the USER began.

2.1.3.6 Change or Add

When clicked, the system will refresh the current screen and make all editable fields in the bottom section (outside the gray box area) input capable. The changes on the top of the screen will not be lost.

2.1.3.7 Top of Page

When clicked, the USER will be taken to the top of the current page.

2.1.3.8 View Car Class

When clicked, the USER will be taken to the View Car Class Use Case. No changes will be lost. Once the USER is finished with this use case, the USER will return to the Extend Rental Use Case.

ARMS Web 3.0
Functional Design Specification
Create Reservation
Version 1.4

Create Reservation

1. Create Reservation Use Case 1.1 Application Overview

The following is a document used to illustrate the process for creating a reservation using ARMS Web 3.0. The intent for this release of the ARMS Web application is to reach a much wider audience. This application will target a Multi-Vendor, Multi-Segment, and International customer base.

1.2 Brief Description

This use case will describe how a USER would create a rental reservation in the ARMS Web system. When creating a reservation, the USER is also creating an authorization for payment. The USER may also submit a reservation without authorizing payment.

1.3 Use Case Actors

The following actors will interact with this use case:

RENTAL ADMINISTRATOR—The RENTAL ADMINISTRATOR will use the system to create an authorized reservation. This use case refers to a USER in the role of a rental administrator. There are various types of customers that the rental administrator would represent, which include corporate account holders, car dealerships, insurance companies, and others.

ARMS—The ARMS system will receive/send transactions to ARMS Web to confirm the extended rental.

RENTAL CAR COMPANY—A wide variety of rental car companies will be able to use this system as well. Each company will have the ability to initiate and manage their rentals through the use of this application.

1.4 Pre-Conditions

The USER must be signed in to the ARMS Web system.

The USER must the authority to create a reservation.

1.5 Flow of Events

The Flow of Events includes all steps necessary to create a reservation using the ARMS Web system.

Figure 102:
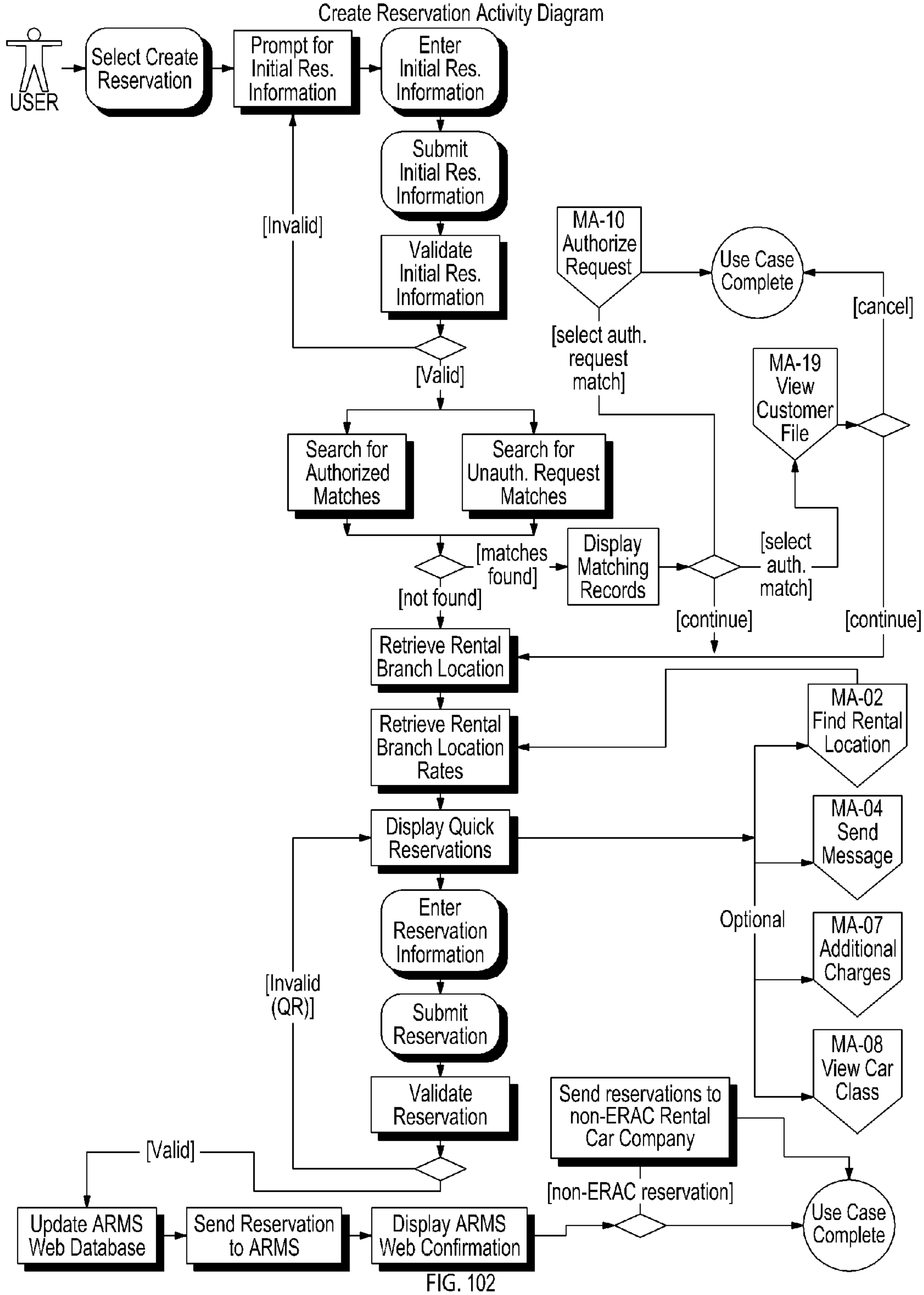
Figure 103A:
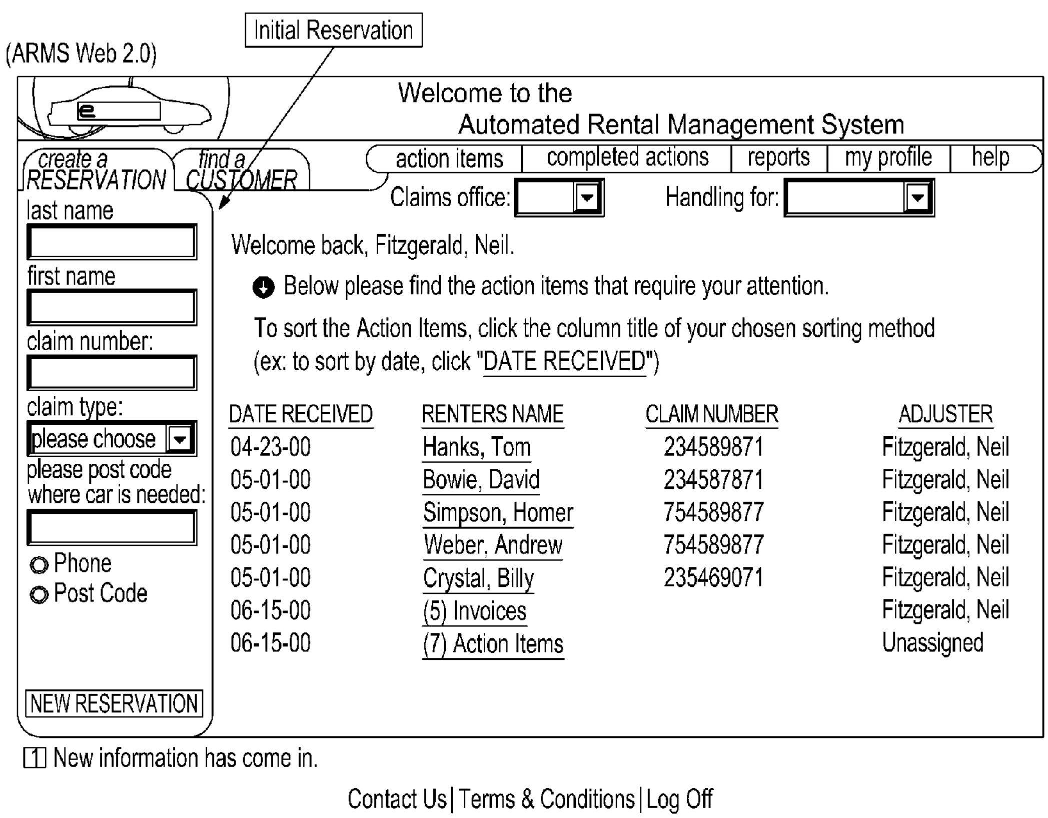
Figure 103B:
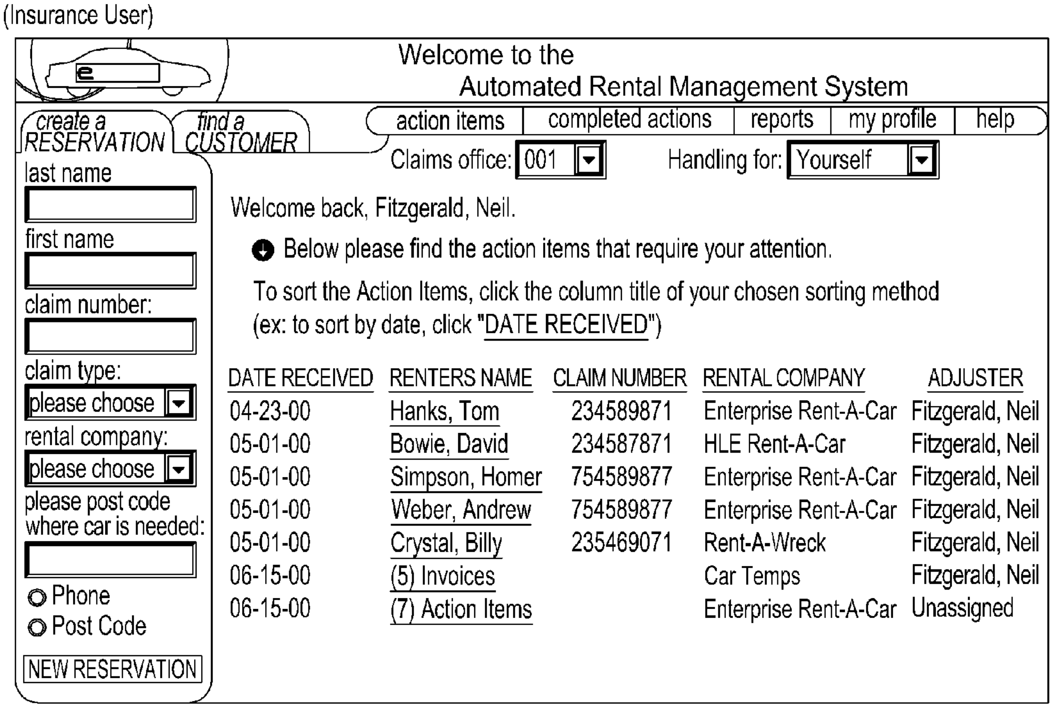
Figure 103C:
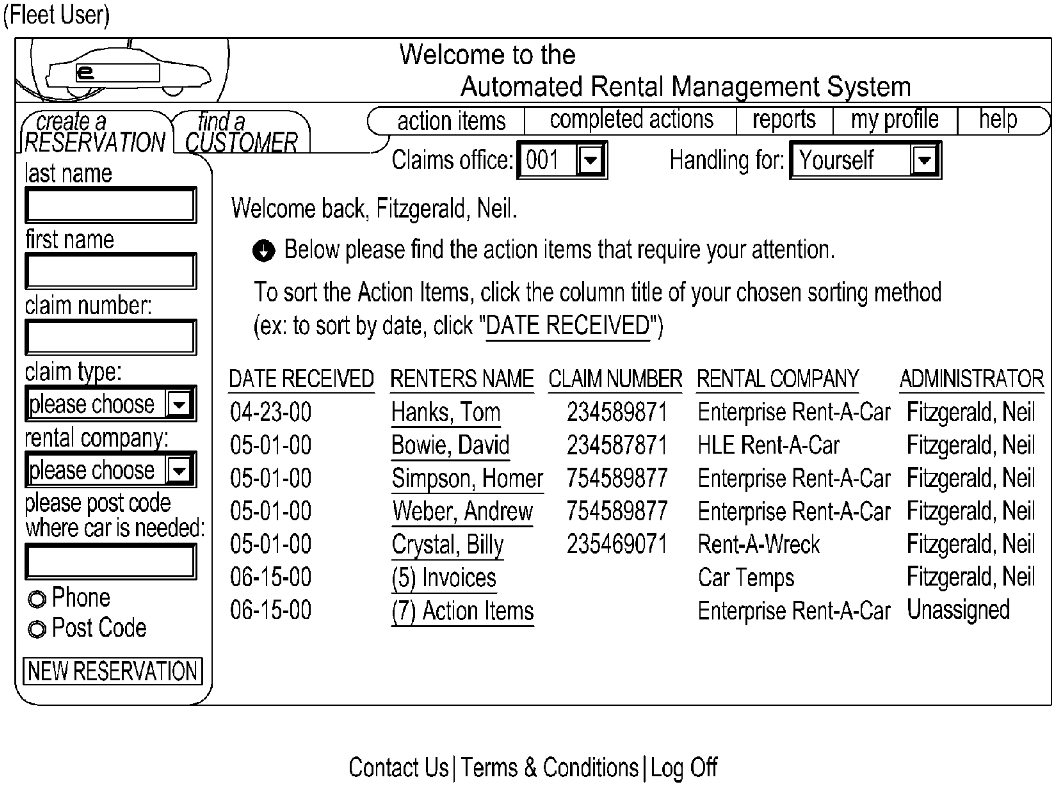
Figure 103D:
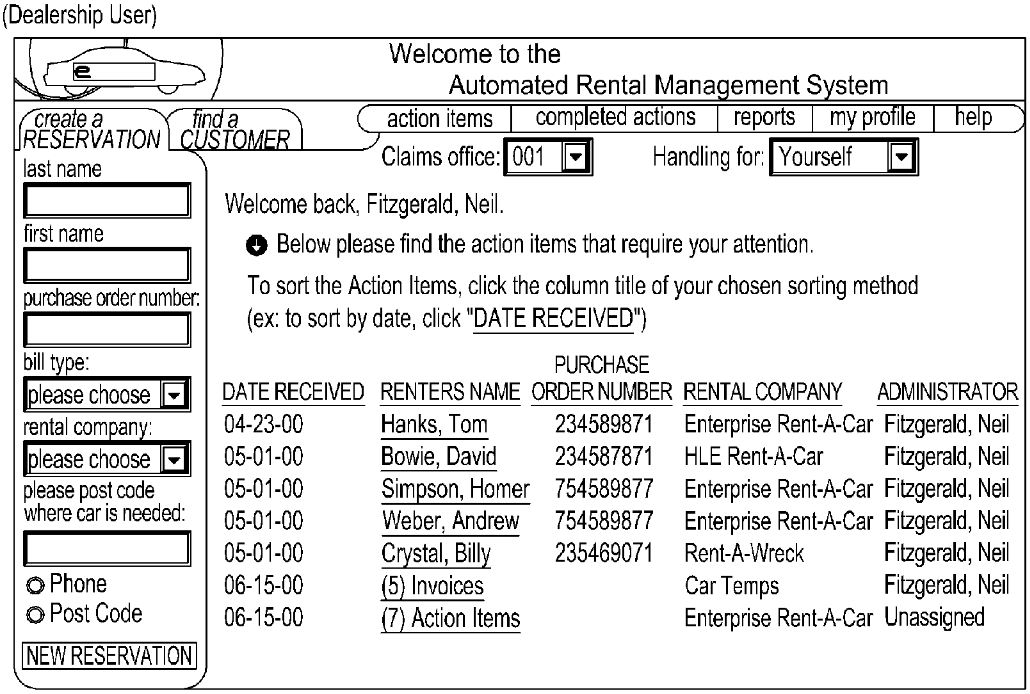
Figure 103E:
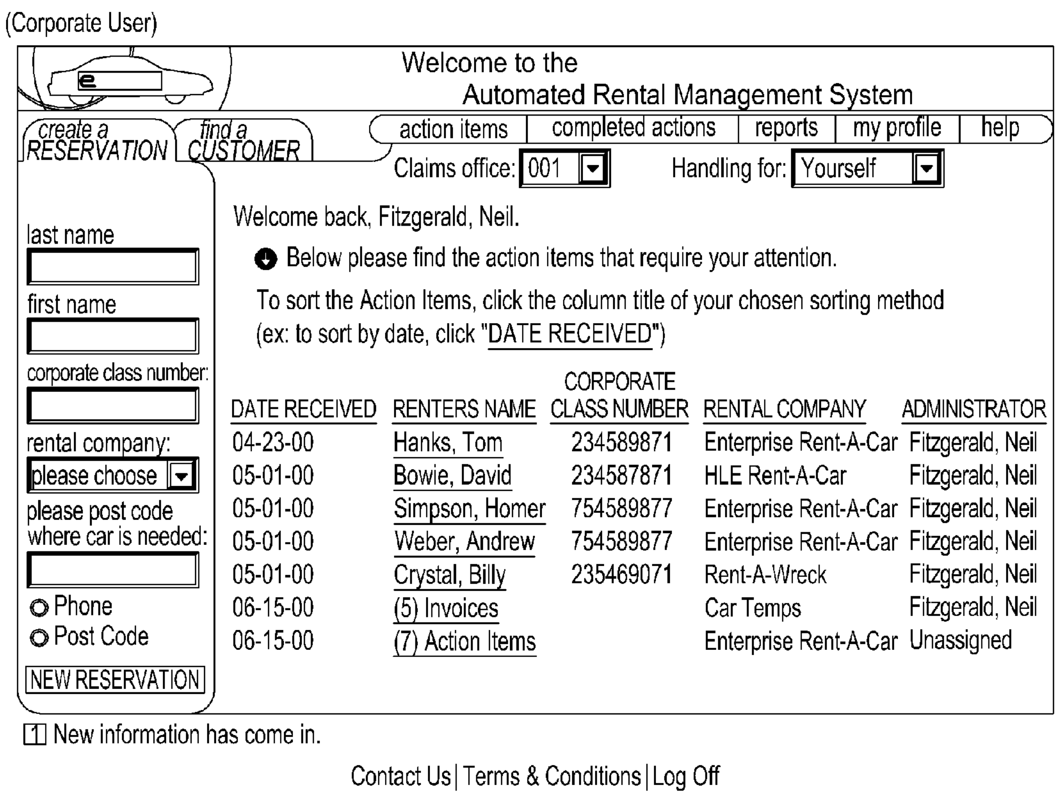

1.5.1 Activity Diagram—see FIG. 102.

1.5.2 Basic Flow

The Basic Flow of the Create Reservation use case includes all of the required steps for a new reservation to be created in the ARMS Web system. Shadowed boxes in the Activity Diagram indicate the Basic Flow.

1. The USER selects to create a reservation from the top navigation menu.
2. The system prompts the USER to enter initial information about the renter (Depending on the user segment):
   Corporate Class Number or Claim Number (The use case will refer to this as 'Reference Number')
   Bill type
   Renter First Name
   Renter Last Name
   Rental Company
   Telephone Number or Postal Code where the renter would like to be picked up
3. The USER enters initial information about the renter.
4. The USER submits the initial reservation information to the system.
5. The system will validate the initial information entered by the USER. (See section 1.5.3.1 Initial Reservation Information Invalid in Alternative Flows on page 4 for validation rules.)
6. The system will perform a search for previous authorizations that may correlate directly to the rental reservation that the USER is beginning to establish. The system will search for two key types of records:

Unauthorized Request Matches

An Unauthorized Request is defined as a rental Authorization Request that is generated when The Rental Company creates a reservation or contract for the customer that has not been approved. This search helps to prevent the USER from creating a new reservation for a customer that has an outstanding Unauthorized Request in the ARMS system. The Unauthorized Request search is completed using the first three characters of the Renter Last Name and is limited to unauthorized requests (requests in unassigned or direct bill request statuses) for the selected Office. If matches are found, the Unauthorized Request/Authorized Request Search Matches Alternative Flow will be invoked.

Authorized Matches

Reference numbers that have already been associated with a rental reservation or contract (i.e., Authorized Rentals) should be brought to the attention of the USER to help prevent over-authorization situations. The system will search for an exact corporate class number match on any reservation or ticket (open or closed) related to the company in the last six months. This search will be completed using the exact Reference Number on all authorized requests (requests in any status other than unassigned or direct bill request).

If no matching records are found, the Basic Flow continues.

7. The system will retrieve a rental branch location where the rental is needed based on the Telephone Number or Postal Code entered by the USER. If no allocation is found, a message should be generated notifying the USER that no location was available for the search criteria and that Claims Connection will handle the reservation (include the search criteria in message).
8. The system will retrieve the current applicable rates for that rental branch location. If no rental branch location is available, the system will display an open text box to allow the USER to type in a rate.
9. The system will display the Quick Reservations screen.
10. The USER will enter the reservation information.
11. The USER submits the reservation to the system.
12. The system will validate the reservation information submitted by the USER. (See section 1.5.3.3 Reservation Information Invalid in Alternative Flows on page 5 for validation rules.)
13. The system updates the database.
14. The system sends the reservation to ARMS.
15. The system will display the reservation confirmation to the USER. The reservation confirmation will not include a confirmation number, but will incorporate a message that The Rental Company has received the reservation.
16. If the reservation is a non-Enterprise reservation, then the transaction is electronically transmitted to the intended rental car company's rental system.
17. This ends the use case.

1.5.3 Alternative Flows

The Alternative Flows of this use case can occur when conditions exist or specific USER feedback is provided.

1.5.3.1 Initial Reservation Information Invalid

If the initial reservation information is invalid (Step 5 of the Basic Flow), the system should present an error message to the USER and force the USER back into Step 2 of the Basic Flow.

1.5.3.1.1 It will be considered invalid if the Reference Number, Renter First Name, Renter Last Name, Rental Company, or Where Needed Value (Postal Code or Telephone Number) have not been included.

1.5.3.1.2 It will be considered invalid if the 'where needed' search criteria is a U.S. or Canadian telephone number and the first three digits (i.e., area code) meet the criteria below:

0XX

1XX the second and third digits equal (e.g., 800, 877, 888, etc.) Where X equals any digit 0 through 9.

1.5.3.1.3 It will be considered invalid if the 'where needed' search criteria is a U.S. or Canadian telephone number that does not consist of 10 digits.

1.5.3.1.4 It will be considered invalid if the 'where needed' search criteria is a U.S. postal code that does not consist of 5 or 9 digits.

1.5.3.1.5 It will be considered invalid if the 'where needed' search criteria is a Canadian postal code that does not consist of 6 alphanumeric characters in the format AXAXAX where A is an alpha character and X is a digit between 0 and 9.

1.5.3.2 Unauthorized Request/Authorized Request Search Matches

If either the search for Unauthorized Requests or the search for Authorized Request matches returns a positive result (Step 6 of the Basic Flow), the matching records will be presented to the USER. The matching records should be provided in summary form, and be distinctly identified as either Authorized Request matches or potential Unauthorized Request matches.

For Authorized Request matches, the USER will have the ability to select the Authorized Request and move into the MA-19 View Customer File use case to view the details of the previously authorized rental. The USER will have the option of continuing or canceling this use case from the MA-19 View Customer File use case.

For Unauthorized Request matches, the USER will have the ability to select the Unauthorized Request and move into the MA-10 Authorize Request use case to review and/or perform operations on the Unauthorized Request.

If the customer does not appear as an Unauthorized Request or Corporate Class Number match, the USER can select to continue to Step 7 of the Basic Flow.

1.5.3.3 Reservation Information Invalid

If an error is discovered in the validation of the reservation information submitted by the USER (Step 12 of the Basic Flow), the system will present the USER with an error message and return them to Step 9 of the Basic Flow (NOTE: If the USER submitted information from the Detailed Reservation screen, they should be returned to the Display Detailed Reservation Alternative Flow above). If the error is specific to a data field within the form, the field should be highlighted and the error described.

1.5.3.3.1 It will be considered invalid if the Reference Number, Renter First Name, Renter Last Name, Vehicle Condition, Rental Location, Authorized Number of Days, and at least one Renter Telephone number have not been included.

1.5.3.3.2 It will be considered invalid if the customer has established Reference Number editing and the Reference Number format does not meet the requirements of the customer's Reference Number definition. Reference Number definition is completed as part of the company profile. (Claim Number format definition will be defined in some cases in both the Arms Web system and in the Arms/400 system (e.g., Nationwide, GEICO). Claim number definition will have to be maintained in BOTH systems in cases where this overlap exists. We are unable to reuse the claim number format definitions due to technical complications.)

1.5.3.3.3 It will be considered invalid if any field identified as REQUIRED in the company/office profile is not included.

1.5.3.3.4 It will be considered invalid if any data entered violates the data type as specified by the ARMS Web database (i.e., alpha characters in a numeric field).

1.5.3.3.5 A warning will be presented to the USER if any defined limits identified in the company/office/user profile are exceeded (e.g., Maximum Number of Days Authorized). The system will allow the USER to submit the authorization from the warning.

1.5.3.3.6 It will be considered invalid if the Authorized Number of Days is included and is less than zero (0).

1.5.3.3.7 It will be considered invalid if the Date of Loss is greater than the current date.

1.5.3.3.8 It will be considered invalid if the first three digits (i.e., area code) of any U.S. or Canadian telephone number meet the criteria below:

0XX

1XX

The second and third digits equal (e.g., 800, 877, 888, etc.)

Where X equals any digit 0 through 9.

1.5.3.3.9 It will be considered invalid if a U.S. or Canadian telephone number does not consist of 10 digits.

1.5.3.3.10 It will be considered invalid if a U.S. postal code does not consist of 5 or 9 digits.

1.5.3.3.11 It will be considered invalid if a Canadian postal code does not consist of 6 alphanumeric characters in the format AXAXAX where A is an alpha character and X id a digit between 0 and 9.

1.5.3.3.12 It will be considered invalid if an E-mail address is included that does not include an '@' character.

1.5.3.4 Cancel Use Case

The USER should be capable of canceling the use case at any point prior to the submission of the reservation to the ARMS Web database. The USER should be returned to the previous activity/page that the USER was on prior to entering this use case.

1.6 Post-Conditions

If successful, a reservation authorization is sent to ARMS.

If unsuccessful, the system state will be unchanged.

1.7 Special Requirements 1.7.1 Requirements for Reference Number Formatting

The following statements are a set of requirements for providing custom reference number formatting for a customer. The ARMS Web system will allow customer companies to define a specific layout or format that they use as their standard reference number format, so that the reference number field used in the system is presented as separate fields and are easily recognizable and 'intuitive' to the USER. These requirements will be implemented to all system functions where the customer reference number is used.

1.7.1.1 Customers must have the ability to define their reference number format (and in some cases, validations on specific portions of the reference number format) as part of the company profile. More than one reference number format can be stored per company, and each reference number format definition must have a unique identifier/name. The selection of which reference number format to use should be defined as part of the office profile using the reference number format unique identifier/name.

1.7.1.2 Reference numbers will be defined in 'segments'. Each segment will be presented to the USER as a separate field. For example, if the reference number format for the COMPANY were 45-A7456-1207, the reference number format would be defined to the system as a 2-character numeric field, a 5-character alphanumeric field, and a 4-character numeric field.

1.7.1.3 Customers must have the ability to define a set of 'valid values' for any given segment of the reference number format. Valid Values allow the customer to dictate what the valid entries for a given reference number segment would include. For example, if the second segment in the customer's reference number format must be a state abbreviation, the customer could define valid values for that segment as 'AL', 'AR', 'AK', etc. If the USER does not enter one of the valid values, an error would be generated to notify the USER to enter a 'valid' value. If no valid values are included for a reference number segment, all entry in to the field will be considered valid (assuming that the data type is correct). If valid values are specified, entry into the reference number segment MUST MATCH ONE OF THE VALID VALUES IDENTIFIED.

1.7.1.4 The system will display the reference number field(s) as it is described by the reference number format definition for the office.

1.7.2 Requirements for Finding Rental Location

Below are the requirements for finding a rental location, across multiple rental car companies, in the ARMS Web system. ARMS Web will resolve a rental location and pass the location to ARMS for routing (which is a deviation from current state handling). These requirements were derived from the current state business requirements for the ARMS locator system.

1.7.2.1 ARMS Web will always return a Rental Company's branch location for a reservation. For all ARMS Web reservations, the following rules for finding a rental location apply:

1.7.2.1.1 For United States locations, the locator will search a 50-mile radius around the renter's phone number or postal code for the closest branch that accepts ARMS reservations.

1.7.2.1.2 For International locations, the locator will search a 50-mile radius around the renter's phone number or postal code for the closest open branch that accepts ARMS reservations. If no open branches are found, the closest branch that accepts ARMS reservations should be returned.

1.7.2.2 When the rental branch location is determined, the system will retrieve the name, shipping address, telephone number and rates of the rental branch location and present them to the USER on the Create Reservation screen(s).

1.7.2.3 The system will only display Claims Connection (7680) as the location (with no rates) when no location can be found within the 50-mile radius. If Claims Connection is displayed, a message should be included to indicate that no rental branch location was found within a 50-mile radius of the search criteria, and Claims Connection will ensure that the reservation is handled appropriately.

1.7.3 Requirements for Routing a Reservation

When a reservation is submitted to the ARMS Web system, routing of the reservation is required to ensure that the renter is called within two hours to confirm rental details. Routing is done AFTER the reservation has been submitted to the ARMS Web system, and is transparent to the USER. The reservation can be routed to the selected rental branch, to Claims Connection, or to a regional call center based on the following rules:

NOTE: These requirements were derived from the current state business requirements for the ARMS locator system.

1.7.3.1 The system should automatically route submitted reservations to Claims Connection between Friday 11:00 pm and Sunday 11:00 pm, regardless of whether the selected rental branch location is open or not.

1.7.3.2 The system should determine if the selected rental branch location on a submitted reservation is open or closed.

1.7.3.2.1 If the selected branch is open, the submitted reservation should be routed directly to the rental branch location (except in cases where a regional call center exists, see 1.7.3.3 below).

1.7.3.2.2 If the selected rental branch location is closed, the system will determine if the company that submitted the reservation has established after-hours handling of reservations. If the company has not established after-hours handling, the reservation is routed to the selected rental branch location (except in cases where a regional call center exists, see 1.7.3.3 below). If the company has established after-hours handling, the following rules apply:

1. The system will check the hours of availability for Claims Connection. Claims Connections Hours are 5:00 a.m.-11:00 p.m. CST, 7 days a week. (Although we receive reservations 24 hours/day, 7 days/week, we do not route them between 11:45 pm and 4:30 am (CST). The only exception to this is Saturday night to Sunday.)

a. If Claims connection is open, the reservation will be routed to Claims Connection. (The insurance company customer, National Marketing and the Claims Connection Manager will determine whether or not Claims Connection makes a courtesy call to the renter).

b. If Claims Connection is closed, the closest branch hours are checked to see if they will be open within 8 hours. If the branch will be open in 8 hours, the reservation will be routed to the rental branch location (except in cases where a regional call center exists, see 1.7.3.3 below). If the branch will not be open in the next 8 hours, the reservation will be routed to Claims Connection.

1.7.3.3 The system should determine if the selected rental branch location on a submitted reservation has a regional call center.

1.7.3.3.1 If the selected rental branch location has a call center to handle customer callbacks, the reservation should be routed to the call center.

1.7.3.3.2 If the selected rental branch location does not have a call center to handle customer callbacks, the reservation should be routed to the rental branch location.

1.7.3.4 The system should provide specific feedback indicating the reason a reservation was re-routed when the Authorization Confirmation is received. This will allow the USER to be aware of the reason for the change of location if they access the reservation while it is owned by someone other than the rental branch location selected when the reservation was originally submitted.

1.7.3.4.1 If the reservation is re-routed to Claims Connection because the selected rental branch location was closed, the system should provide a message (that will be accessible through the diary notes/notebook) that states the reservation was routed to Claims Connection because the rental branch location was closed when the reservation was submitted.

1.7.3.4.2 If the reservation is re-routed to a regional call center to expedite the callback process, the system should provide a message (that will be accessible through the diary notes/notebook) that states the reservation was routed to a regional call center to expedite the renter callback process.

1.7.3.5 The system should include a message/note with the group/branch number and address of the rental branch location selected by the USER if the reservation is routed to any location (i.e., Claims Connection or otherwise) other than the rental branch location selected by the USER.

1.7.4 Maintenance of Source Systems

This use case requires that information in the existing Locator and Special Instructions (AS/400) databases be kept current and it is assumed that the group responsible for maintaining these databases will continue to do so in the future. Locator is used to retrieve Rental Branch Location information, and Special Instructions is used to retrieve rate information for a selected rental branch location.

1.8 Extension Points

An extension point indicates a link between this use case and another use case. Extension points associated with the use case are indicated below.

1.8.1 MA-10—Authorize Request

The Authorize Request use case will be used to allow the USER to view and perform operations on an outstanding Unauthorized Request. The USER will not be returned to this use case on completion of the Authorize Request use case.

1.8.2 MA-19—View Customer File

The View Customer File use case will be used to allow the USER to view the customer file when a matching authorized request is found and selected. The USER will have the option of ending the use case or be returned to Step 9 of the Basic Flow on completion of the View Customer File use case.

1.8.3 MA-02—Find Rental Location

The Find Rental Location use case will be used to allow the user to find one or more alternate rental branch locations that can provide service to the customer. The USER should be returned to Step 9 of the Basic Flow upon completion of the Find Rental Location use case. If the USER selects a rental branch location, branch information (i.e., address, phone) should be returned and the appropriate fields should be populated on the Reservation screen.

1.8.4 MA-04—Send Message

The Send Message use case will allow the USER to send a message to the Rental Company branch regarding the reservation, or select to store the message text with the reservation as a diary note (which is not sent to the branch). The USER should be returned to Step 9 of the Basic Flow upon completion of the Send Message use case.

1.8.5 MA-07—Additional Charges

The Additional Charges use case will be used to add special charges to the reservation being created by the USER. The USER should be returned to Step 9 of the Basic Flow upon completion of the Additional Charges use case. Any Additional Charges captured should be returned and applied to the reservation. The existence of Additional Charges should be reflected on the reservation screen.

1.8.6 MA-08—View Car Classes

The View Car Classes use case will be used to allow the USER to view details about and select a car class to apply to a reservation. Details will include the average number of passengers and luggage items that can be served by a vehicle in the specific car class. The USER should be returned to Step 9 of the Basic Flow upon completion of the View Car Classes use case. The car class selected by the USER should be applied to the reservation.

2. Screen Design

A definition of the screen layout(s), screen data fields, and screen functions that are used to implement the flows identified above. More than one screen may be used to implement support for the use case flow.

2.1 Initial Reservation Screen

The Initial Reservation screen provides the user interface and functions to support Steps 2 through 4 of the Basic Flow. The information captured on this screen will allow the system to perform several background search activities, and help to better construct the Quick/Detailed Reservation screen. All information captured on the Initial Reservation screen is required to create a new reservation, and is reused later in the reservation creation process.

2.1.1 Screen Layout—see FIGS. 103(*a*)-(*e*)

2.1.2 Screen Field Definition

| Screen Label | Type | Size | Screen Field Name | Data Field | Screen Specific Rule |
|---|---|---|---|---|---|
| Renter First Name | Text | 15 | Renter First Name | First Name | Renter First Name is a required field. |
| Renter Last Name | Text | 20 | Renter Last Name | Last Name | Renter Last Name is a required field. |
| Claim Number<br>Purchase Order Number<br>Corporate Class Number | Text | 30 | Claim Number<br>Purchase Order Number<br>Corporate Class Number | Insurance Claim Number, PO#, CC# | 'Reference' Number is a required field.<br>'Reference' number should be presented in separate fields to correspond to the reference number format (segments) that has been defined by the USER profile.<br>Insurance User - Claim Number<br>Fleet User - Claim Number<br>Dealership User - Purchase Order Number<br>Corporate User - Corporate Class Number |

-continued

| Screen Label | Type | Size | Screen Field Name | Data Field | Screen Specific Rule |
|---|---|---|---|---|---|
| Claim Type Bill Type | Combo Box | 20 | Rental Type Description | Rental type description | The values of the Rental Type field for the Insurance user class are: 'Insured', 'Claimant', 'Theft' and 'Uninsured'. The default value is '-Select Claim Type-'. Claim Type is a required field. |
| | Text | 15 | Where Needed Value | Day Phone or Zip Code | Where Needed Value is a required field. |
| Postal Code | Radio Button | 1 | Where Needed Postal Code Indicator | NOT STORED | If the Where Needed Postal Code Indicator is set, the Where Needed Value should pre-populate the Renter Zip/Postal Code on the Quick/Detailed Reservation screen. |
| Phone | Radio Button | 1 | Where Needed Telephone Indicator | NOT STORED | This should be the default radio button selected. If the Where Needed Telephone Indicator is set, the Where Needed Value should pre-populate the Renter Phone Number 1 on the Quick/Detailed Reservation screen. |

2.1.3 Screen Function Definition

This section includes the definitions for all functions that can be performed within the screen. This includes operations invoked by button clicks, specific shortcut keystrokes, or other actor activity.

2.1.3.1 Create Reservation

The Create Reservation screen function will allow the USER to submit the information on the Initial Reservation screen and move on in the create reservation process. The system will use this information to perform background searches for Unauthorized Requests and Corporate Class Number Matches, and to build the Quick/Detailed Reservation screen appropriately.

2.1.3.1.1 The Create Reservation screen function is invoked through either a button click or an Enter keystroke.

2.1.3.1.2 The information captured on the Initial Reservation screen will be used to pre-populate the corresponding fields on the Quick/Detailed Reservation screen.

2.1.3.1.3 If the information submitted to the ARMS Web application is invalid or incomplete, this screen function should prompt the USER with an error. The error should be specific as to the cause of the failure. All information previously entered should remain populated in each field, with the problem field highlighted or otherwise identified.

2.2 Authorization Matches Found Screen

The Authorization Matches Found screen provides the functions to support the Unauthorized Request/Authorized Request Search Matches alternative flow.

Figure 104A:
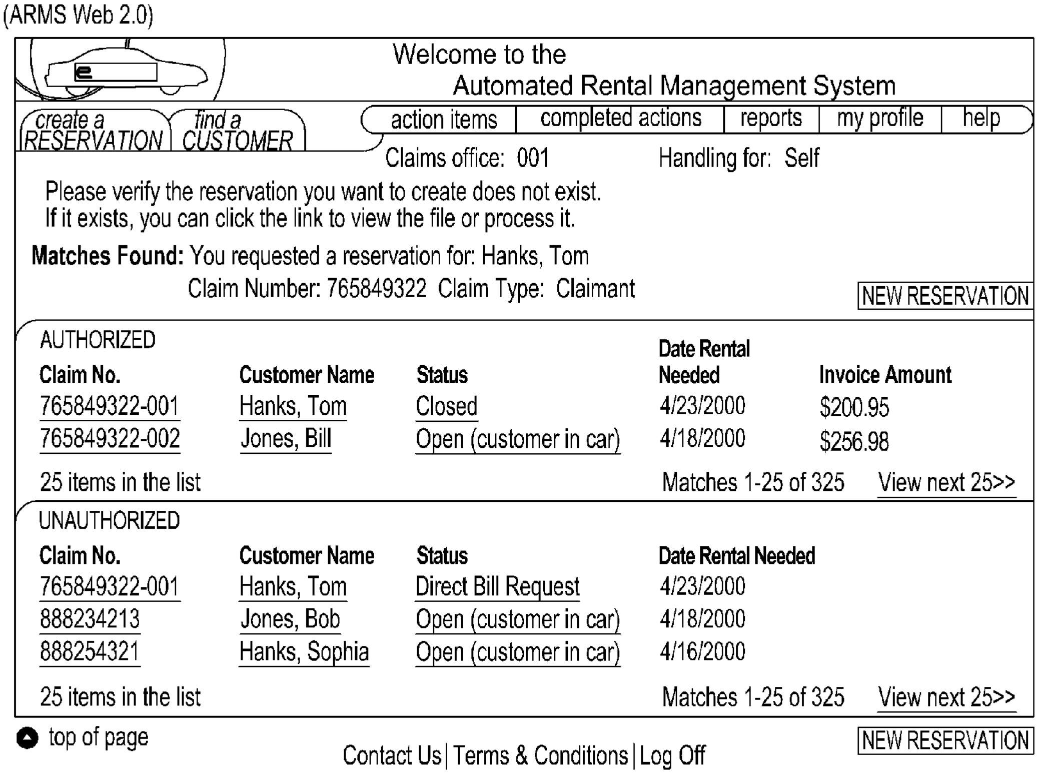
Figure 104B:
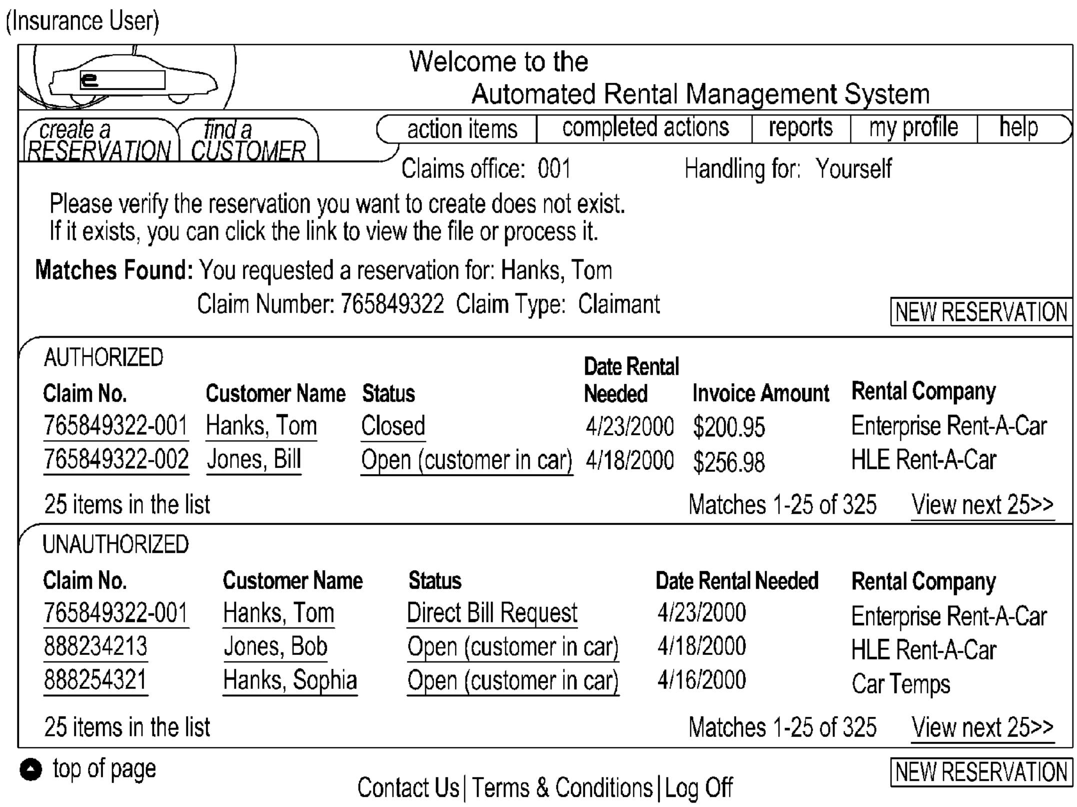
Figure 104C:
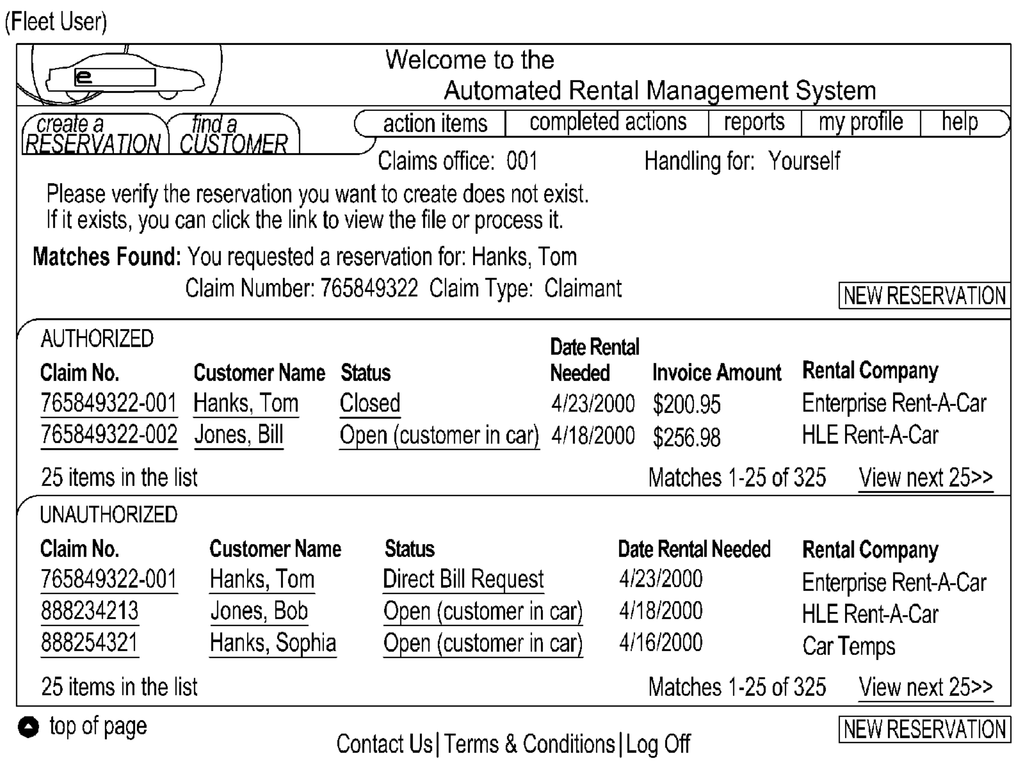
Figure 105A:
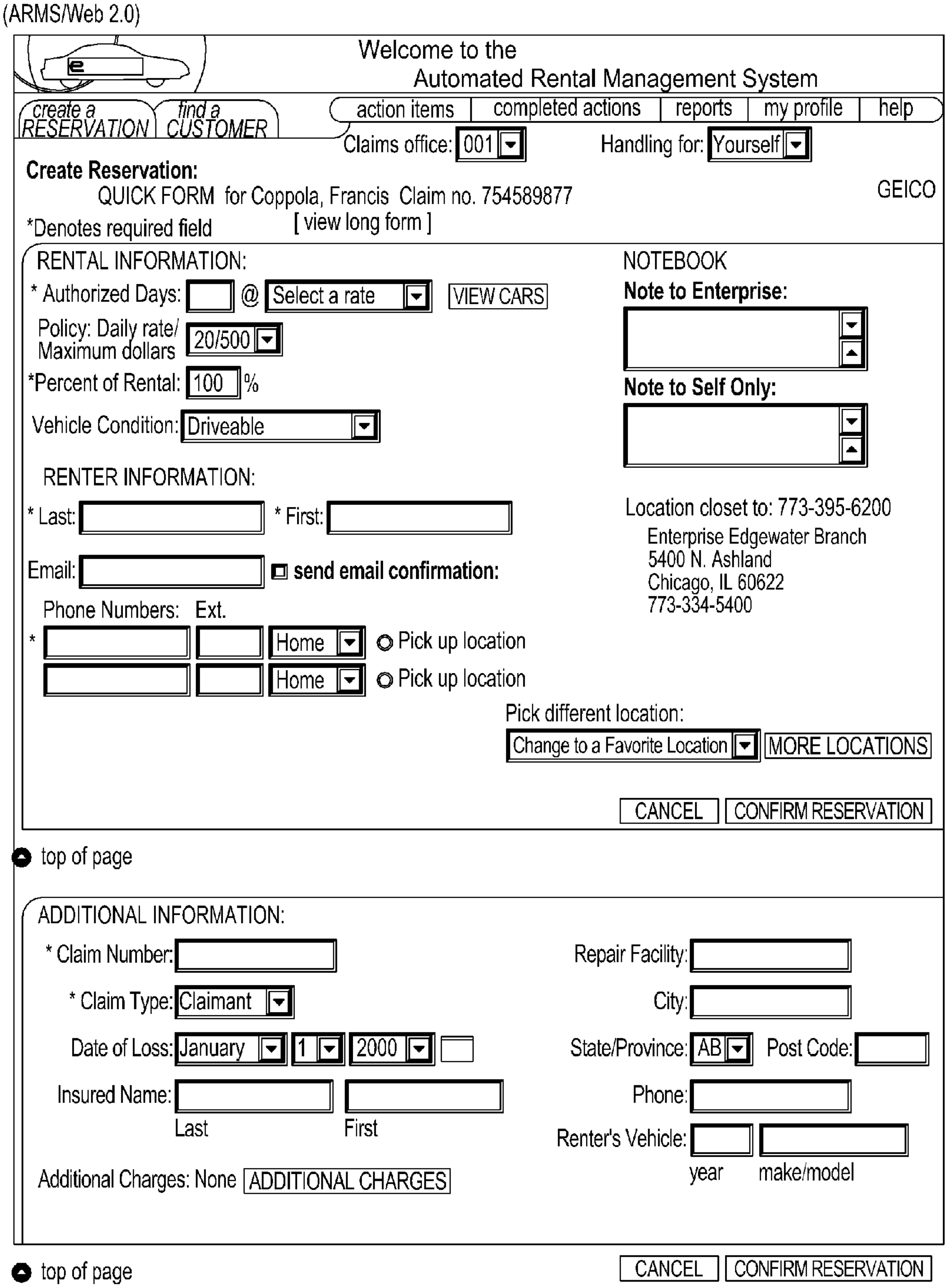
Figure 105B:
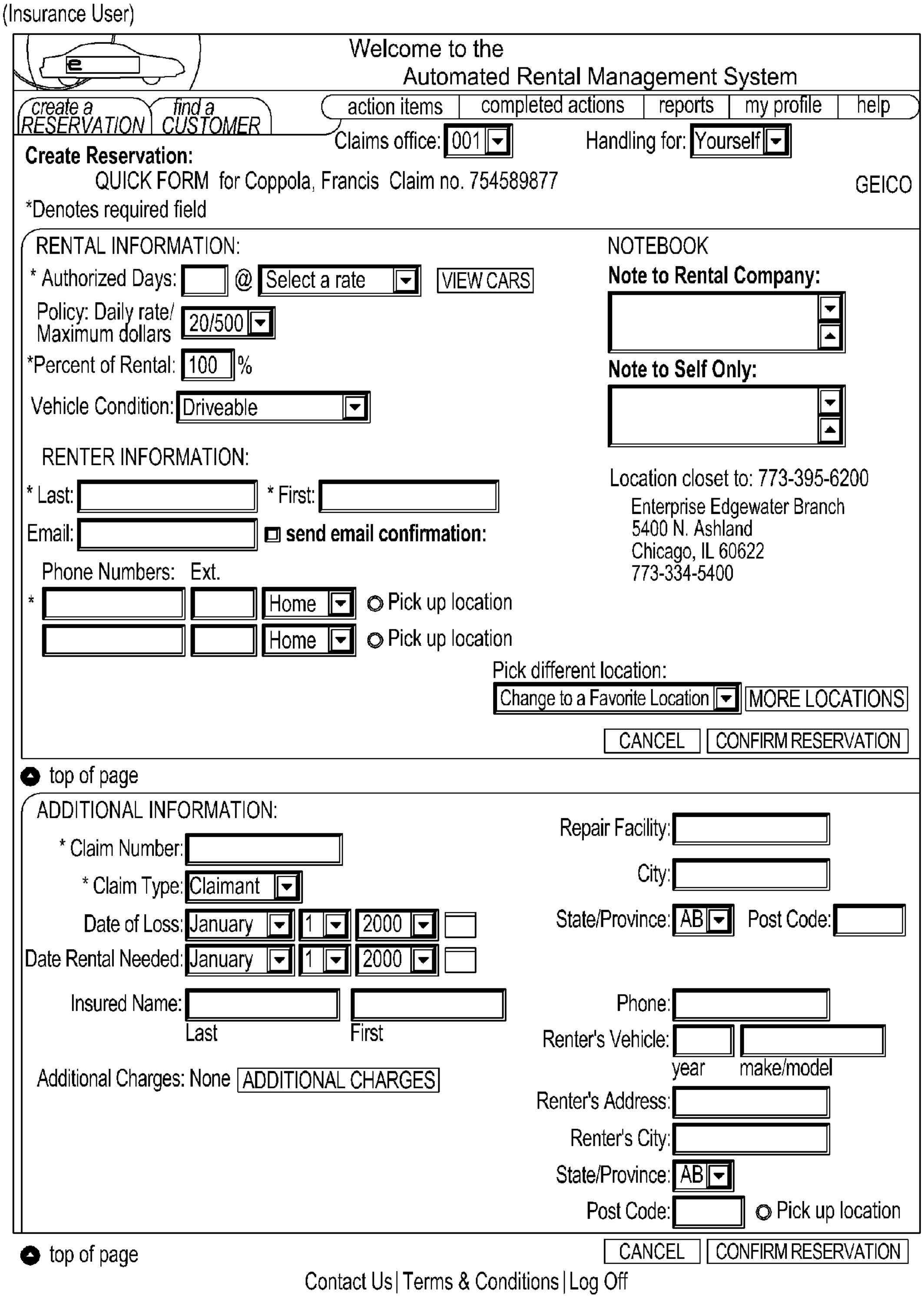
Figure 105C:
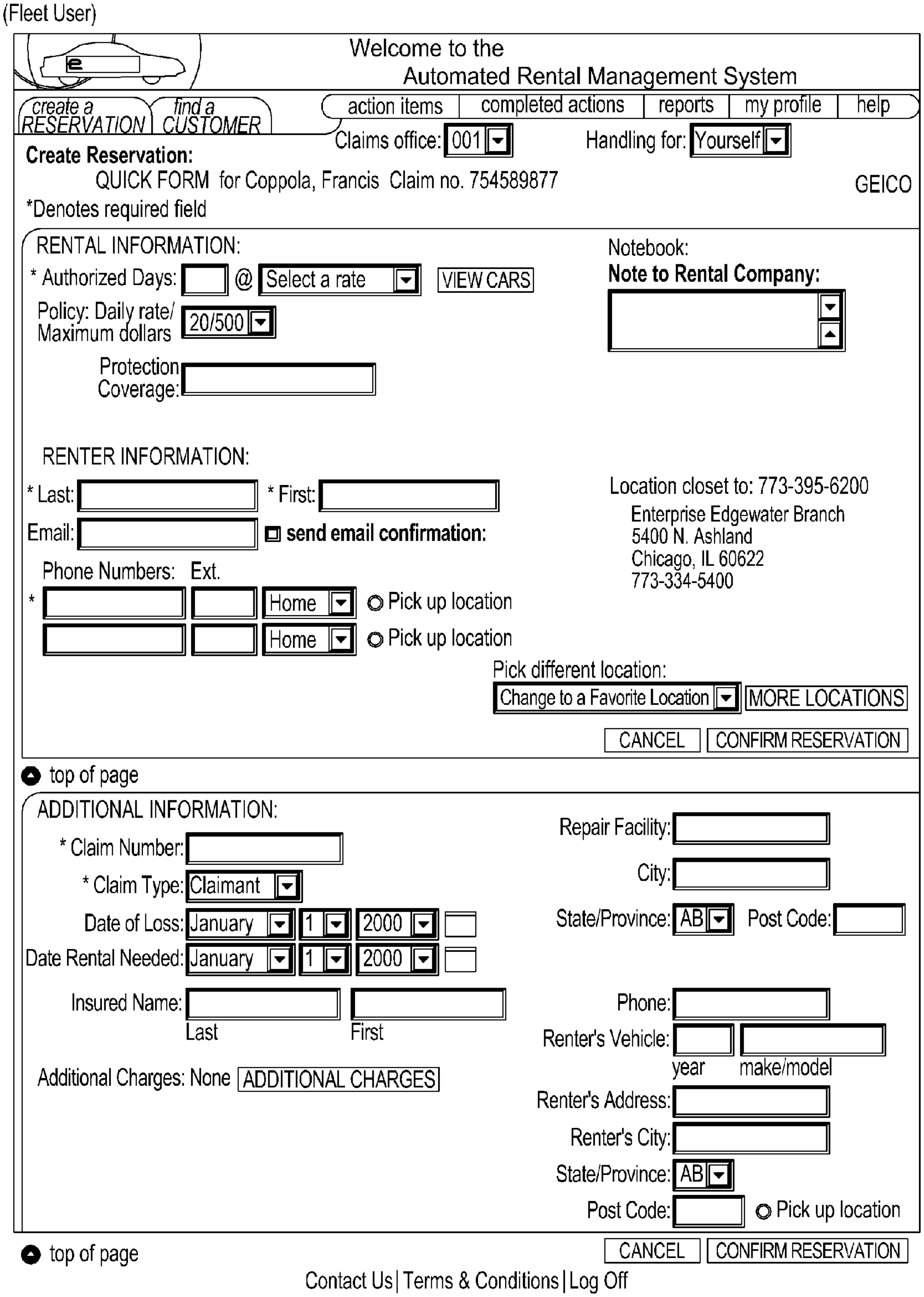
Figure 105D:
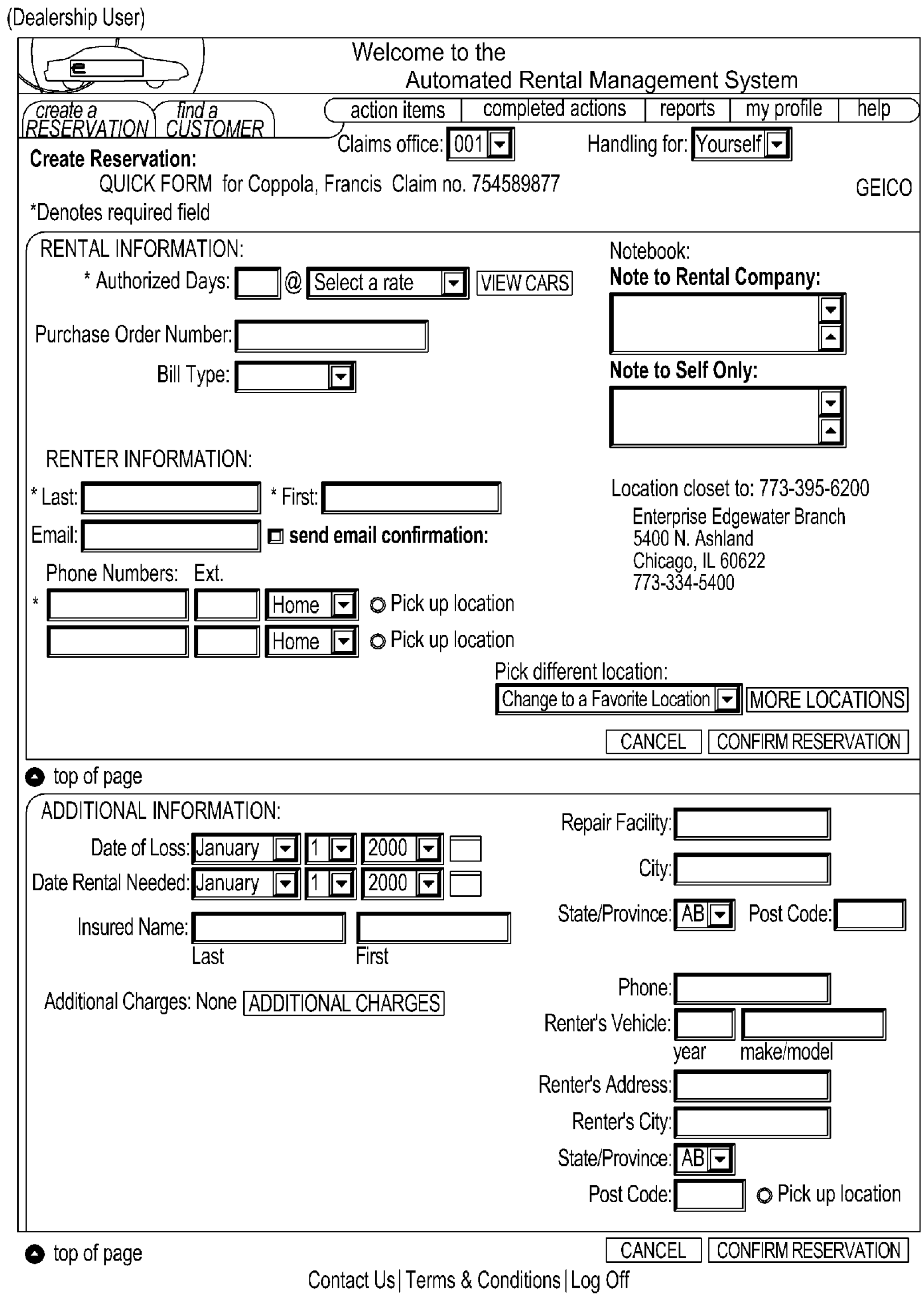
Figure 105E:
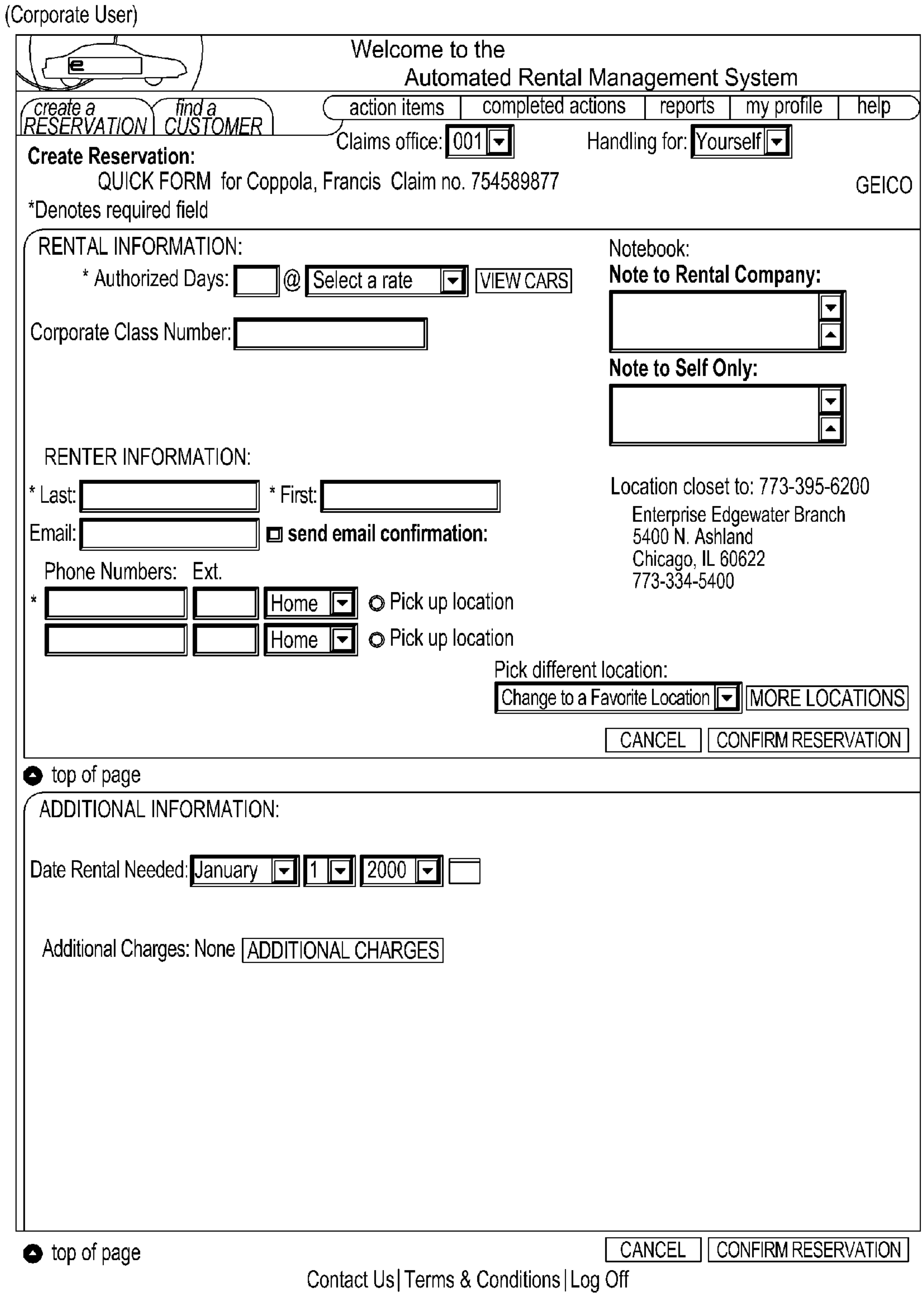

2.2.1 Screen Layout—see FIGS. 104(*a*)-(*e*)

2.2.2 Screen Field Definition

| Screen Label | Type | Size | Screen Field Name | Data Field | Screen Specific Rule |
|---|---|---|---|---|---|
| Handling for: | Output | 35 | User Name | First Name + Last Name | Should be presented as User First Name + User Last Name |
| Office | Combo Box | 10 | Office Location | external organization abbreviated name | The values presented in the Office Location list should be limited to the offices that the user has been granted the authority to create a reservation. The default selection is the last selected office location. If the user has not selected an office, the default selection is the user's default office as defined in the user profile. Office is a required field. |
| Renter Name | Output | 35 | Renter Name | First Name + Last Name | Should be presented as 'Renter Last Name + "," + Renter First Name' Should provide a hyperlink to the corresponding Authorize Request record (see MA-10 Authorize Request use case). |

-continued

| Screen Label | Type | Size | Screen Field Name | Data Field | Screen Specific Rule |
|---|---|---|---|---|---|
| | | | | | This field is in the "Unauthorized Request Matches" section of the "Authorization Matches Found" screen |
| Claim Number Purchase Order Number Corporate Class Number | Output | 30 | Claim Number Purchase Order Number Corporate Class Number | Insurance Claim Number, PO#, CC# | Should provide a hyperlink to the corresponding Unauthorized Request record. This field is in the "Unauthorized Request Matches" section of the "Authorization Matches Found" screen. Insurance User - Claim Number Fleet User - Claim Number Dealership User - Purchase Order Number Corporate User - Corporate Class Number |
| Status | Output | 15 | Authorization Status | Status Description | This field is in the "Unauthorized Request Matches" section of the "Authorization Matches Found" screen. |
| Renter Name | Output | 20 | Renter Name | First Name + Last Name | Should be presented as Renter Last Name + Renter First Name Should provide a hyperlink to the corresponding Customer File. This field is in the "Authorized Request Matches" section of the "Authorization Matches Found" screen. |
| Claim Number Purchase Order Number Corporate Class Number | Output | 30 | Claim Number Purchase Order Number Corporate Class Number | Insurance Claim Number, PO#, CC# | Should provide a hyperlink to the corresponding Customer File. This field is in the "Reference Number Matches" section of the "Authorization Matches Found" screen. Insurance User - Claim Number Fleet User - Claim Number Dealership User - Purchase Order Number Corporate User - Corporate Class Number |
| Claim Type Bill Type | Output | 20 | Rental Type Description | Rental type description | This field is in the "Reference Number Matches" section of the "Authorization Matches Found" screen. Insurance User - Claim Type Fleet User - Claim Type Dealership User - Bill Type |
| Status | Output | | Authorization Status | Status Description | This field is in the "Reference Number Matches" section of the "Authorization Matches Found" screen. |
| Authorized Amount | Output | 9 | Authorized Total Amount | CALCULATED | This field is in the "Reference Number Matches" section of the "Authorization Matches Found" screen. |

2.2.4 Screen Function Definition

This section includes the definitions for all functions that can be performed within the screen. This includes operations invoked by button clicks, specific shortcut keystrokes, or other actor activity.

2.2.3.1 New Reservation

The New Reservation screen function button will allow the USER to close/continue beyond the Authorization Matches Found screen.

2.2.3.1.1 The New Reservation screen function is invoked through either a button click or through an Enter keystroke.

2.3 Quick Reservation Screen

The Quick Reservation screen provides support for Step 9 of the Basic Flow.

IMPORTANT NOTE: This is the minimum allowable set of fields on the Quick Reservation screen. The Quick Reservation screen will also include any fields indicated as QUICK RESERVATION in the company/office profile! See the Detail Reservation screen for all available fields.

2.3.1 Screen Layout see FIGS. 105(*a*)-(*e*)

2.3.2 Screen Field Definition

| Screen Label | Type | Size | Screen Field Name | Data Field | Screen Specific Rule |
|---|---|---|---|---|---|
| | Output | 35 | User Name | First Name + Last Name | Should be presented as User First Name + User Last Name |
| Office | Combo Box | 10 | Office Location | external organization identifier | The default value should be the primary office of the current user. The values presented in the Office Location list should be limited to the offices that the user has been granted the authority to create a reservation. If changed, the system should automatically refresh the screen and update the "Handling for" list to the users in the newly selected office with the ability to create a reservation. |
| Handling for | Combo Box | 35 | Handling for | First Name + Last Name | The combo list should include the users for the selected office location that have the authority to create a reservation. The default value should be 'Yourself'. The handling for users should be presented as User Last Name + User First Name in alphabetical order. |
| Claim Number Purchase Order Number Corporate Class Number | Text Box | 30 | Claim Number Purchase Order Number Corporate Class Number | Insurance Claim Number, PO#, CC# | Should be populated by the Reference Number entered on the Initial Reservation screen. Reference number should be presented in separate fields to correspond to the claim number format (segments) that has been defined by the USER profile. If changed, the system should validate that no matching reference numbers exist (i.e., reference number matching). The user should be notified if a match exists. Reference Number is a required field. Insurance User - Claim Number Fleet User - Claim Number Dealership User - Purchase Order Number Corporate User - Corporate Class Number |
| Claim Type Bill Type | Combo Box | 20 | Rental Type Description | Rental type description | Should be populated by the Rental Type selected on the Initial Reservation screen. The values of the Rental Type field for the Insurance user class are: 'Insured', 'Claimant', 'Theft', and 'Uninsured'. Claim Type is a required field. |
| Vehicle Condition | Combo Box | 20 | Vehicle Condition | Driveable Flag + Repairable Flag | The values of the Vehicle Condition field should include: 'Driveable', 'Non-Driveable', and 'Total Loss'. the default value should be '-Select Vehicle Condition-'. |

-continued

| Screen Label | Type | Size | Screen Field Name | Data Field | Screen Specific Rule |
|---|---|---|---|---|---|
| Renter First Name | Text | 15 | Renter First Name | First Name | Should be populated by the Renter First Name entered on the Initial Reservation screen. If the Renter First Name changes, and an exact/ Unauthorized request match exists on the Renter First Name + Renter Last Name combination, the user will be notified of this match. Renter First Name is a required field. |
| Renter Last Name | Text | 20 | Renter Last Name | Last Name | Should be populated by the Renter Last Name entered on the Initial Reservation screen. If the Renter Last Name changes, and an exact/ Unauthorized request match exists on the Renter First Name + Renter Last Name combination, the user will be notified of this match. Renter Last Name is a required field. |
| | Combo Box | 10 | Renter Phone Type 1 | | The combo list should include the values: 'Home', 'Work', 'Mobile', and 'Pager'. The default value should be 'Select Type' |
| | Text | 15 | Renter Phone Number 1 | Day Phone | If the Where Needed criteria entered on the Initial Reservation or Find a Rental Location screen was 'Telephone', the Where Needed Value from the screen should be populated in this field. At least one renter phone number is required. |
| | Text | 5 | Renter Phone Extension 1 | Renters Day Phone Extension | N/A |
| Post Code | Text | 10 | Renter Postal Code | Zip Code | If the Where Needed criterion entered on the Initial Reservation or Find a Rental Location screen was 'Postal Code', the Where Needed Value from the screen should be populated in this field. |
| Email address | Text Box | 50 | email Address | | N/A |
| Send email confirmation to the renter | Check Box | 1 | email Confirmation Indicator | | This field will default to unchecked. |
| Authorized Days | Text | 3 | Authorized Number of Days | Number Of Days Authorized | The Number of Days is a required field. |
| Policy Limits | Combo Box | 10 | Policy Daily Limit and Policy Maximum | Dollars Per Day Covered + Max $ Covered | The combo list should include the policy daily and maximum limits as defined in the company/office profile. The policy limits should be presented as 'Policy Daily Limit + "/" + Policy Maximum Limit'. This field should default to 'Select Policy Limits' if the Claim Type is 'Insured', 'Uninsured Motorist', or 'Theft' If the Claim Type is 'Claimant', this field should NOT be displayed. |

-continued

| Screen Label | Type | Size | Screen Field Name | Data Field | Screen Specific Rule |
|---|---|---|---|---|---|
| | | | | | 'Other' should be a selection in the list of options. If selected, the system will automatically replace the combo box with an open text box to allow the USER to type in a Daily Policy Limit, and a second open text box to allow the USER to type in a Maximum Policy Limit. |
| | Combo Box | 20 | Authorized Rate | Vehicle Rate | This field should be a combo box that lists all of the rates and car classes for the rental branch location in the format 'Rate + "" + Car Class' 'Other' should be a selection in the list of options. If selected, the system will automatically replace the combo box with an open text box to allow the USER to type in a rate. A combo box should also be included that allows the USER to select a car class with selections to include 'Economy', 'Compact', 'Intermediate', 'Standard', and 'Full Size'. If the reservation is for an 'Insured', 'Uninsured', or 'Theft' Claim Type, the default selection for the field should be '-Policy Limits-' If the reservation is for a 'Claimant' Claim Type, the default selection for the field should be '-Select a rate-'. |
| Additional Charge | Output | | Additional Charges | | Should include the Additional Charge Description, the Additional Charge Value, and the Additional Charge Type. More than one additional charge can exist. |
| Direct Billing % | Text | 3 | Authorized Direct Bill Percent | Bill To % | The Direct Bill % should default to 100%. The Direct Bill % is a required field. |
| Authorized Total Amount | Output | 9 | Authorized Total Amount | CALCULATED | The authorized total amount field should show the total amount (w/o taxes and gov't surcharges) authorized based on the Number of Days Authorized, Rate, Policy Limits, and Direct Bill percent entered by the user. This field will calculate the total amount to be authorized (based on entry) when the USER clicks the Calculate screen function. |
| Rental Location | Output | 30 | Rental Location Branch Name | Branch Name | N/A |
| | Output | 30 | Rental Location Address | Address Line | N/A |
| | Output | 30 | Rental Location Address | Address Line2 | N/A |
| | Output | 25 | Rental Location City Name | City | N/A |
| | Output | 10 | Rental Location Postal/Zip Code | Zip Code | N/A |
| | Output | 3 | Rental Location State/Province Code | State | N/A |
| | Output | 20 | Rental Location Telephone Number | Telephone Number | N/A |

-continued

| Screen Label | Type | Size | Screen Field Name | Data Field | Screen Specific Rule |
|---|---|---|---|---|---|
| Add the current location to my list of favorites | Check box | 1 | Add to Favorites Indicator | NOT STORED | Should default to false (unchecked). If checked, the system should add the current rental branch location to the favorites list in the user profile on the basis of the reservation. The branch location address will appear in the combo box on subsequent attempts until a description. |
| Favorite Locations | Combo Box | 30 | Favorite Location | location name | The combo list should include the descriptions of each favorite location as identified in the user profile. This field should default to '-Select a Favorite Location-'. If a favorite location is selected, the application will instantly retrieve the favorite location and refresh the reservation screen. |
| Note to Enterprise | Text | 400 | Authorization Message | message text | N/A |
| Note to Self Only | Text | 400 | Diary Note | diary note text | The system will store the text entered into this field in the ARMS Web database with the authorization, but the message will not be sent to the branch. |

2.3.3 Screen Function Definition

This section includes the definitions for all functions that can be performed within the screen. This includes operations invoked by button clicks, specific shortcut keystrokes, or other actor activity.

2.3.3.1 More Locations

The More Locations screen function allows the USER to select a different rental branch location using the Find Rental Location use case. Invoking this screen function will launch the USER into the Find a Rental Location use case.

2.3.3.1.1 The More Locations screen function is invoked through a button click.

2.3.3.2 Additional Charges

The Additional Charges screen function allows the USER to add, view, and modify any additional charges that they might authorize for a rental reservation (e.g., CDW). Invoking this screen function will launch the USER into the Additional Charges use case.

2.3.3.2.1 The Additional Charges screen function is invoked through a button click.

2.3.3.3 View Car Class

The View Car Class screen function allows the USER to view and select a Rental Car Class to apply to a reservation. Invoking this screen function will launch the USER into the View Car Classes use case.

2.3.3.3.1 The View Car Class screen function is invoked through a button click.

2.3.3.4 Select a Favorite Location

The Select a Favorite Location screen function allows the USER to change the rental branch location to one of the rental branch locations identified as a 'favorites' in their USER profile.

2.3.3.4.1 The Select a Favorite Location is invoked by selecting a value from the Favorite Locations drop-down list. The system should automatically retrieve the favorite location (and rates) when the value of this field is selected.

2.3.3.5 Confirm Reservation

The Confirm Reservation screen function allows the USER to submit all reservation information to the ARMS Web system, which will create a new reservation.

2.3.3.5.1 The Confirm Reservation screen function is invoked either through a button click or by an Enter keystroke.

2.3.3.5.2 If the information submitted to the ARMS Web application is invalid or incomplete, this screen function should prompt the USER with an error. The error should be specific as to the cause of the failure. All information previously entered should remain populated in each field, with the problem field highlighted or otherwise identified.

2.3.3.6 Cancel

The Cancel Reservation screen function will allow the USER to leave the screen and return to their ARMS Web start page. No information is saved and no reservation is created.

2.3.3.6.1 The Cancel screen function is invoked through a button click.

2.4 Reservation Confirmation Screen

The Reservation Confirmation screen provides the user interface and functions to support Step 16 of the Basic Flow. This provides the USER with confirmation feedback on successful submission of the reservation.

Figure 106A:
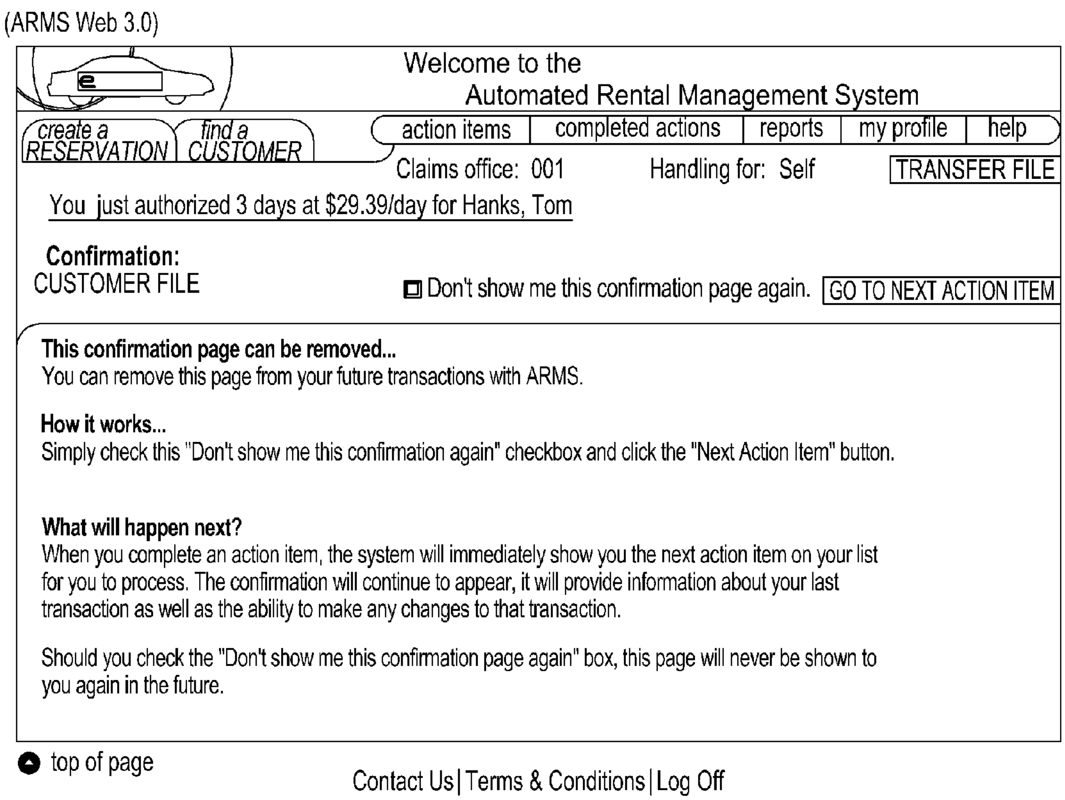
Figure 106B:
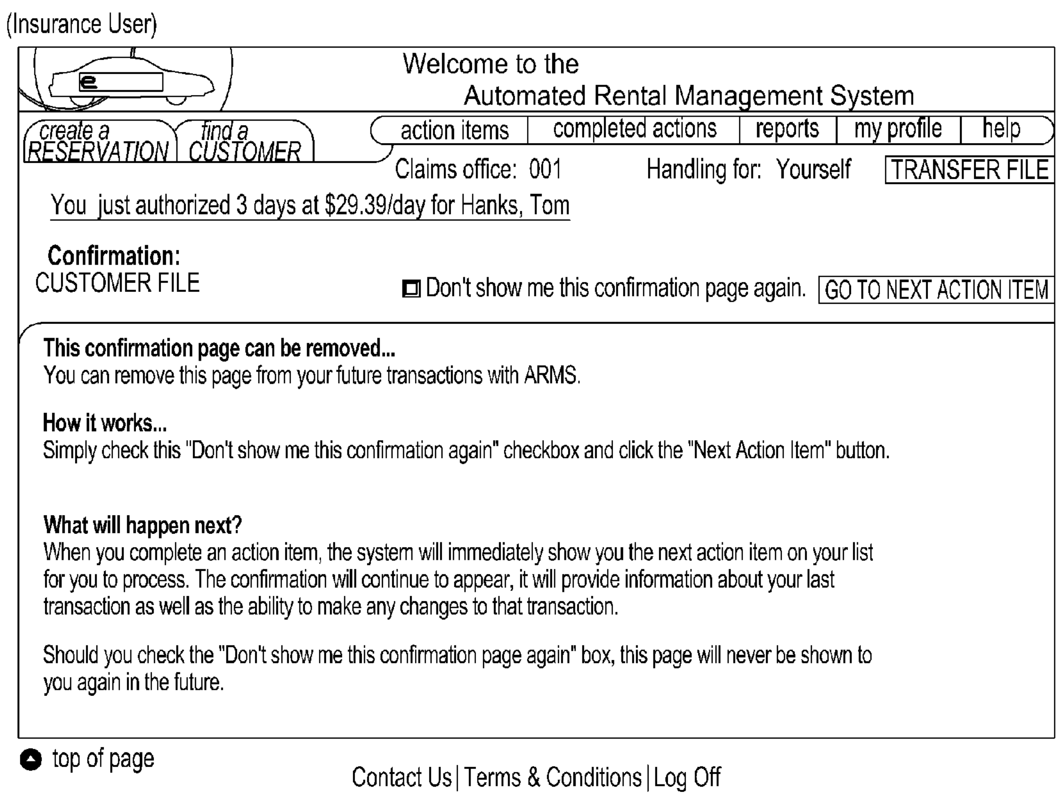
Figure 106C:
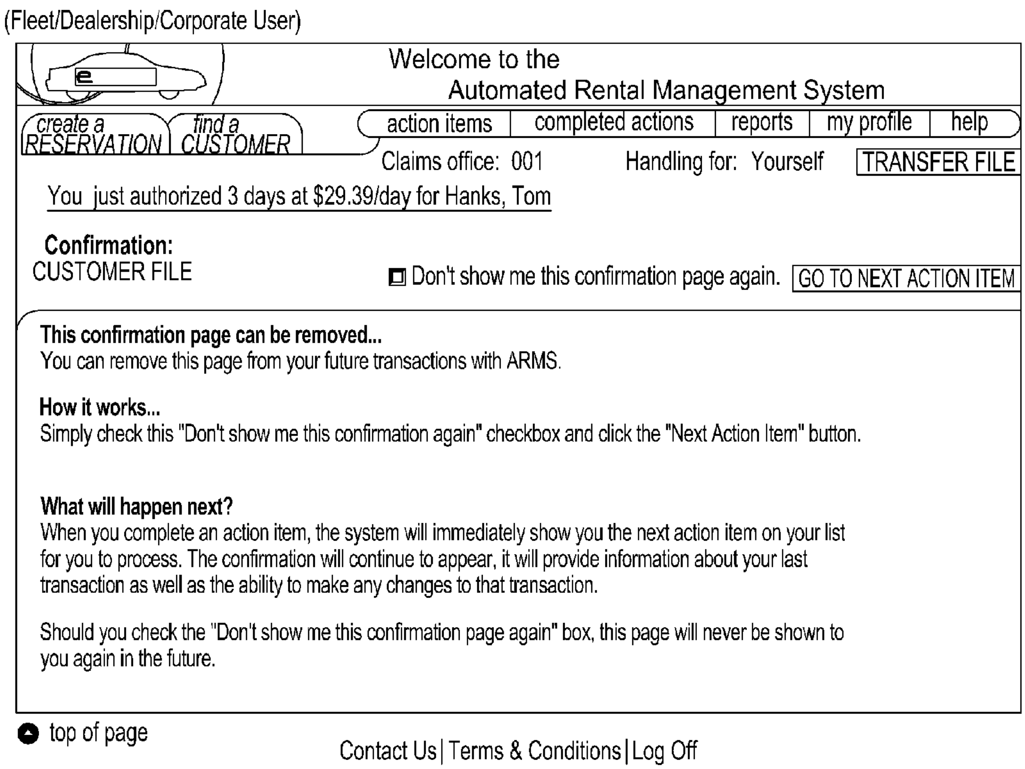

2.4.1 Screen Layout—see FIGS. 106(*a*)-(*c*)

2.4.2 Screen Field Definition

| Screen Label | Type | Size | Screen Field Name | Data Field | Screen Specific Rule |
|---|---|---|---|---|---|
| Office | Output | 10 | Office Location | external organization abbreviated name | |
| Handling for | Output | 35 | Handling for | First Name + Last Name | |
| | Output | 150 | Confirmation Statement | Authorized Days + Authorized Rate + Renter Last Name + Renter First Name | The screen should provide a statement that reads 'You just authorized' + Authorized Days + 'days at' + Authorized Rate/Policy Limits + '/day for' + Renter Last Name + ',' + Renter First Name |
| Don't show me this confirmation page again | Check box | 1 | Delete confirmation page | | If checked, the system should not show this page again. Instead the system will provide the confirmation statement (above) in the feedback section of the page that the user is returned to (the area of the EVERY page reserved for feedback, error messages, etc.) |

2.4.3 Screen Function Definition

This section includes the definitions for all functions that can be performed within the screen. This includes operations invoked by button clicks, specific shortcut keystrokes, or other actor activity.

2.4.3.1 Return to Home Page

The Return to Home Page screen function will allow the USER to return to their home page from the reservation confirmation screen.

2.4.3.1.1 The Return to Home Page screen function is invoked through either a button click or an Enter keystroke.

2.4.3.2 Change Reservation

The Change Reservation screen function will allow the USER to go back into the Quick Reservation or Detailed Reservation screen and change any errors.

2.4.3.2.1 The Change Reservation screen function is invoked by clicking on the feedback hyperlink (e.g., You just authorized 3 days at $29.39/day for Tom Hanks).

ARMS Web 3.0

Functional Design Specification

Find a Rental Location

Version 1.3

Find a Rental Location

1. Find a Rental Location Use Case 1.1 Application Overview

The following is a document used to illustrate the process of finding and selecting an alternate rental location for a reservation created using ARMS/Web 3.0. The intent for this release of the ARMS/Web application is to reach a much wider audience. This application will target a Multi-Vendor, Multi-Segment, and International customer base.

1.2 Brief Description

This use case describes the process of finding and selecting an alternate rental location for a reservation created in the ARMS/Web system. The USER will have the ability to select the location search criteria they want to use (i.e. phone number or postal code), select the rental company and select to either review a list of nearby rental company locations or have the system automatically determine a rental company location based on the location search criteria. (The USER will also have the ability to select an alternate location by using the 'Favorite Locations' functionality built into the Create Reservation screens.) This use case provides the mechanism to return rental company location information, including address, rental company, and phone number to create a new reservation or define a favorite location.

1.3 Use Case Actors

The following actors will interact with this use case:

RENTAL ADMINISTRATOR—The RENTAL ADMINISTRATOR will use the system to find and select a rental location for creating a reservation. This use case refers to a USER in the role of a rental administrator. There are various types of customers that the rental administrator would represent, which include corporate account holders, car dealerships, insurance companies, and others.

LOCATOR—The LOCATOR system will determine the nearest rental branch location(s) based on the search criteria provided in this use case.

ARMS—The ARMS system will receive/send transactions to ARMS/Web to retrieve the information regarding the rental company.

RENTAL CAR COMPANY—A wide variety of rental car companies will be able to use this system as well. Each company will have the ability to initiate and manage their rentals through the use of this application.

1.4 Pre-Conditions

The USER must be logged on to the ARMS/Web system.

The USER must be creating a reservation or defining a favorite location.

1.5 Flow of Events

The Flow of Events includes all steps necessary to select rental location search criteria and retrieve an alternate rental branch location (s).

Figure 107:
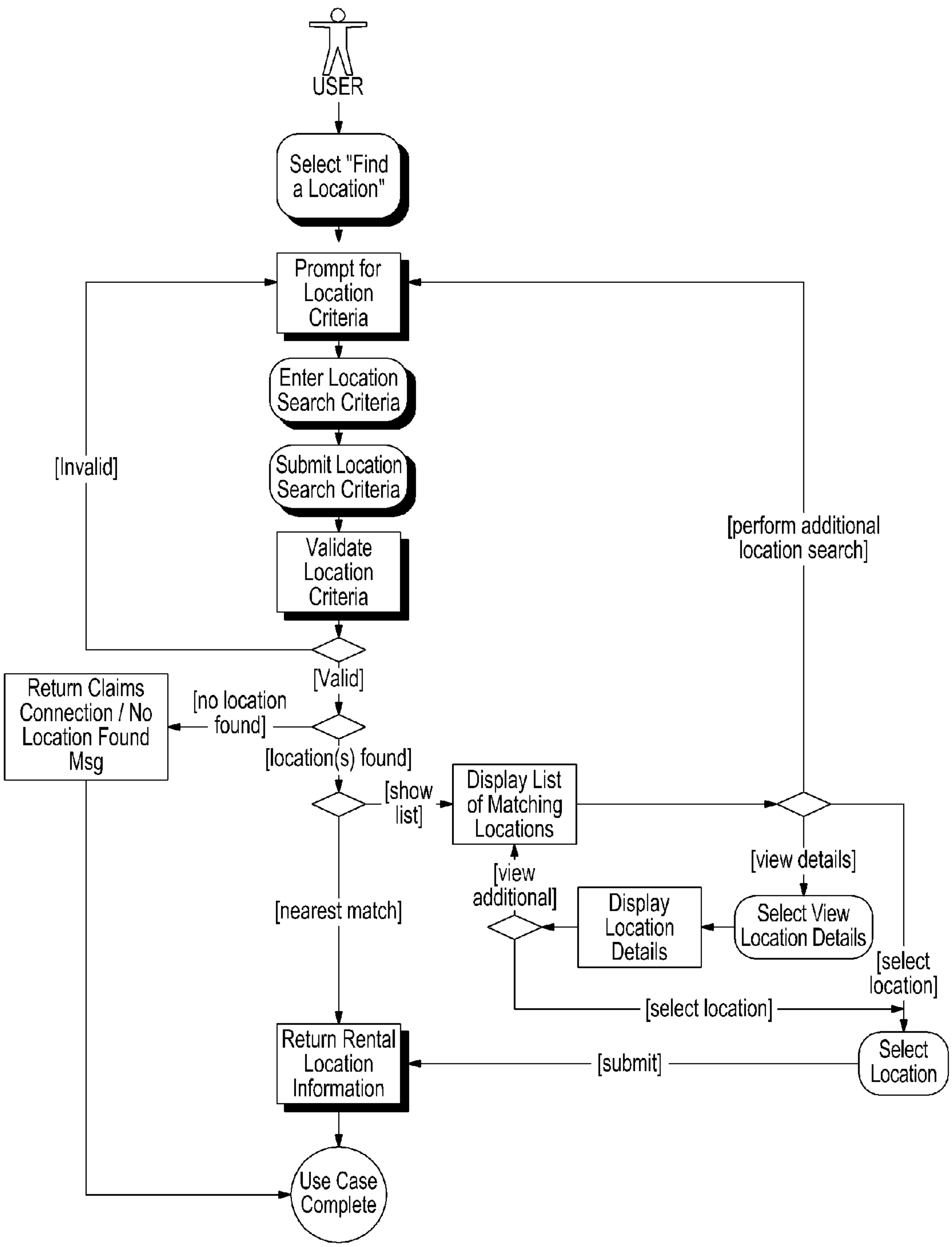

1.5.1 Activity Diagram—see FIG. 107.

1.5.2 Basic Flow

The Basic Flow of the Find a Rental Location use case includes all of the required steps for the USER to select and input search criteria to find an alternate rental location. The USER will have the ability to view detailed information about a rental branch, and select a rental branch location to apply to a new reservation.

1. The USER selects to find an alternate rental location.
2. The system will prompt the USER for pick up location search criteria (also referred to as 'where needed' search criteria). This allows the USER to input a telephone number, city, or postal code to find a rental branch (or branches) that accepts ARMS/Web reservations in a given area. (Rental branch locations have the ability to opt out of accepting ARMS/Web reservations.) The USER may also narrow the search by selecting a particular rental company along with the location search criteria. The USER will be given the option to view a list of rental branch locations matching the search criteria, or to have the ARMS/Web system automatically select the rental branch considered the Nearest Match.
3. The USER enters the required search criteria.
4. The USER submits the rental branch location search criteria.
5. The system will validate the rental branch location search criteria.
6. The system will retrieve/return a rental branch location (The requirements for retrieving a rental branch location can be found on page 5 of this document (Section 1.7.1 Requirements for Finding Rental Location).) (based on USER search/selection criteria) to be used by the Create Reservation use case. (This use case is also used to define favorite locations from the 'My Profile' use case. The location will be returned to the 'My Profile' use case when the use case is entered from a 'My Profile' screen.) The rental branch location information for the selected branch on the Create Reservation screens will be automatically populated with the list below for the current Create Reservation transaction.

Branch name (The Branch name has been included for future usability purposes (e.g., Network Allocation).)

Address

Telephone number

Rates
7. The use case is complete.

1.5.3 Alternative Flows 1.5.3.1 Search Criteria Entered is Invalid

If the USER enters an invalid Postal Code or Phone Number as location search criteria, an error message should be displayed to the USER and the USER should be forced back into Step 2 of the Basic Flow. If the error is specific to a data field, the field should be highlighted and the error described.

1.5.3.1.1 It will be considered invalid if the 'where needed' search criteria is a telephone number and the first three digits (i.e., area code) meet the criteria below:

0XX

1XX the second and third digits equal (e.g., 800, 877, 888, etc.) Where X equals any digit 0 through 9.

1.5.3.1.2 It will be considered invalid if the 'where needed' search criteria is a U.S. or Canadian telephone number that does not consist of 10 digits.

1.5.3.1.3 It will be considered invalid if the 'where needed' search criteria is a U.S. postal code that does not consist of 5 or 9 digits.

1.5.3.1.4 It will be considered invalid if the 'where needed' search criteria is a Canadian postal code that does not consist of 6 alphanumeric characters in the format AXAXAX where A is an alpha 1.5.3.2 No Rental Branch Locations Found If the system cannot determine a rental branch location based on the search criteria entered by the USER, Claims Connection will be returned as the location and the use case will end. Please refer to section 1.7.1 Requirements for Finding Rental Location on beginning on page 5 of this functional specification for handling of this situation.

1.5.3.3 View a List of Rental Branch Locations

If the USER opts to view a list of matching rental locations, the list of matching locations will be displayed after Step 5 of the Basic Flow. The USER will have the ability to select one of these locations, view more detail about the locations (i.e., maps, hours of operation), or perform another location search by entering new search criteria.

1.5.3.3.1 If the USER requests additional detail on a specific rental branch in the View a List of Rental Branch Locations Alternate Flow, the system should display a screen with the selected branch's additional information (Rental Company, Branch name, Addresses, telephone/fax numbers, Map to the rental branch location, Hours of operation). The USER should either select the location from this screen (and be returned to Step 6 of the Basic Flow), or be returned to the list of matching locations by closing/continuing from this screen.

1.5.3.3.2 If the USER wishes to perform another rental branch location search in the View a List of Rental Branch Locations Alternate Flow, the system should return the USER to Step 2 of the Basic Flow.

1.5.3.4 Use Case Cancellation

The USER should be capable of leaving the use case at any time.

1.6 Post-Conditions

If successful, a rental branch location will have been determined and returned to the Create Reservation use case.

If unsuccessful, the system state remained unchanged.

1.7 Special Requirements

The additional requirements of the business use case are included here. These are requirements not covered by the flow as they have been described in the sections above.

1.7.1 Requirements for Finding Rental Location

Below are the requirements for finding a rental location in the ARMS/Web system. ARMS/Web will resolve a rental location and pass the location to ARMS for routing (which is a deviation from current state handling). These requirements were derived from the current state business requirements for the ARMS locator system.

1.7.1.1 ARMS/Web will always return a rental branch location for a reservation. For all ARMS/Web reservations, the following rules for finding a rental location apply:

1.7.1.1.1 For United States locations, the locator will search a 50-mile radius around the renter's phone number or postal code for the closest branch (or branches) that accepts ARMS reservations. If the USER selects to review a list of rental branch locations, an array of rental branch locations meeting these criteria should be returned.

1.7.1.1.2 For Canadian locations, the locator will search a 50-mile radius around the renter's phone number or postal code for the closest open branch (or branches) that accepts ARMS reservations. If no open branches are found, the closest branch (or branches) that accepts ARMS reservations should be returned. If the USER selects to review a list of rental branch locations, an array of rental branch locations meeting these criteria should be returned.

1.7.1.2 When the rental branch location is determined, the system will retrieve the group/branch number, name, shipping address, and telephone number of the rental branch location and present them to the USER on the Create Reservation screen(s).

1.7.1.3 The system will only display Claims Connection (7680) as the location (with no rates) when no location can be found within the 50-mile radius. If Claims Connection is displayed, a message should be included to indicate that no rental branch location was found within a 50-mile radius of the search criteria, and Claims Connection will ensure that the reservation is handled appropriately.

1.7.2 Maintenance of Source Systems

This use case requires that several existing AS/400 databases be used to query for information:

Locator Database

Office Information Database

The use case requires that the information in these databases be kept current and it is assumed that the group responsible for maintaining these databases will continue to do so in the future.

1.8 Extension Points

None.

2. Screen Design

A definition of the screen layout(s), screen data fields, and screen functions that are used to implement the flows identified above. More than one screen may be used to implement support for the use case flow.

2.1 Location Search Criteria Screen

This screen allows the USER to select/input the search criteria they want to use to find a rental location. This screen supports Steps 2 and 3 of the Basic Flow.

Figure 108A:
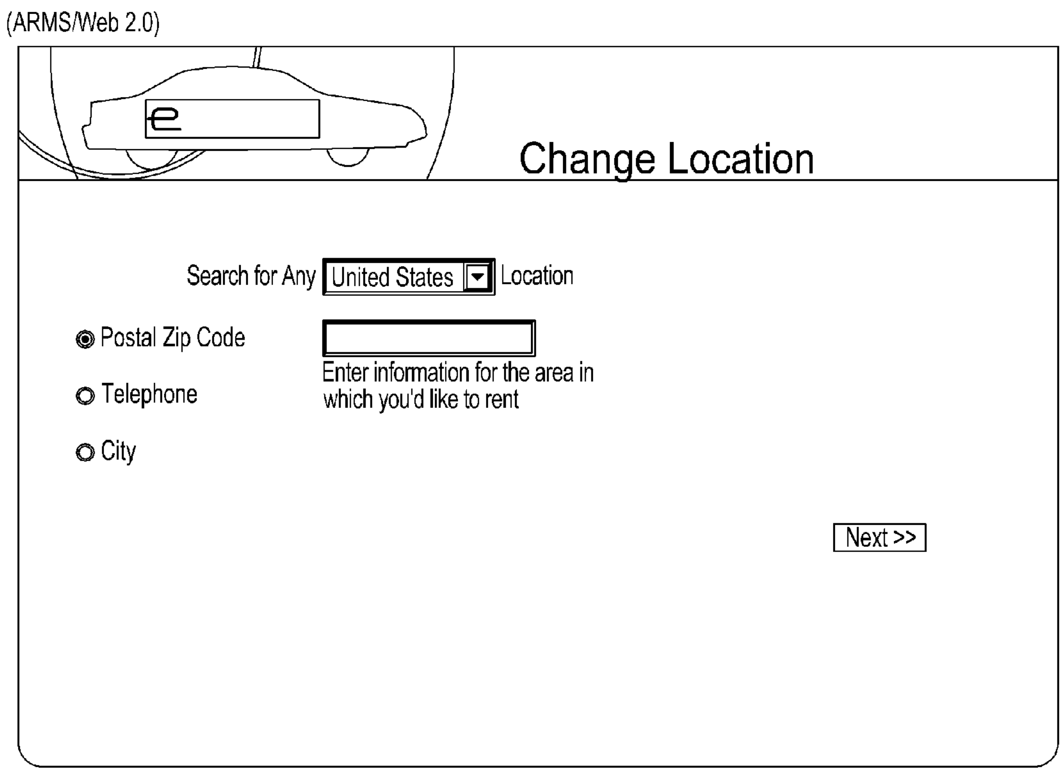
Figure 108B:
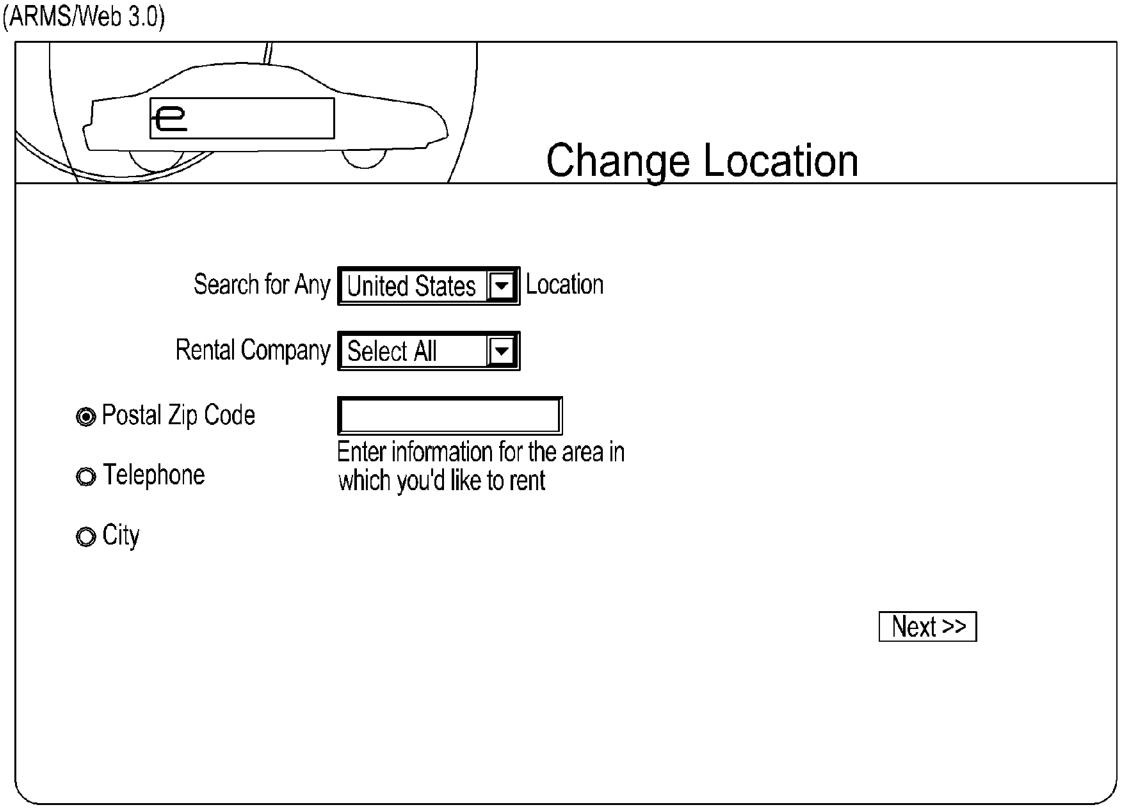

2.1.1 Screen Layout—see FIGS. 108(*a*) and (*b*)

2.1.2 Search for Rental Location

| Screen Label | Type | Size | Screen Field Name | Data Field | Screen Specific Rule |
|---|---|---|---|---|---|
| Country | Combo box | 14 | Country | country code | This list should consist of United States and Canada. This will expand in future releases. The selection will default to the home country of the USER as defined in the USER profile. |
| | Input Text | 20 | Where Needed Value | Where Needed Value | |
| Rental Company | Combo box | 20 | Rental Company | | This is a list of all the rental companies that are participating. |
| Postal/Zip Code | Radio Button | 1 | Postal/Zip Code Button | NOT STORED | |
| Telephone | Radio Button | 1 | Telephone Button | NOT STORED | This should be the default radio button selection. |
| City | Radio Button | 1 | City Radio Button | NOT STORED | |
| Automatically select the nearest office | Checkbox | 1 | Nearest match Selection | | This checkbox should default to checked. |

2.1.3 Screen Function Definition

This section includes the definitions for all functions that can be performed within the screen. This includes operations invoked by button clicks, specific shortcut keystrokes, or other actor activity.

2.1.3.1 Next

The Next screen function will allow the USER to submit the information on the Location Search Criteria screen and initiate the search for matching locations.

2.1.3.1.1 The Next screen function is launched through either a button click or by using the Enter keystroke.

2.1.3.1.2 If the information submitted to the ARMS/Web system is invalid or incomplete, this screen function should prompt the USER with an error. The error should be specific as to the cause of the failure. All information previously entered should remain populated in each field, with the problem field highlighted or otherwise identified.

2.2 Matching Location Screen

This screen allows the USER to review/select a rental location based on the search criteria entered on the Location Search Criteria screen. The screen will present 5 matching records at a time to the USER. The USER is given the option of viewing additional detail on a location or entering new search criteria. If there are more locations selected by the search, the USER will view the next locations (up to 5). This screen supports Step 4 of the Basic Flow.

Figure 109A:
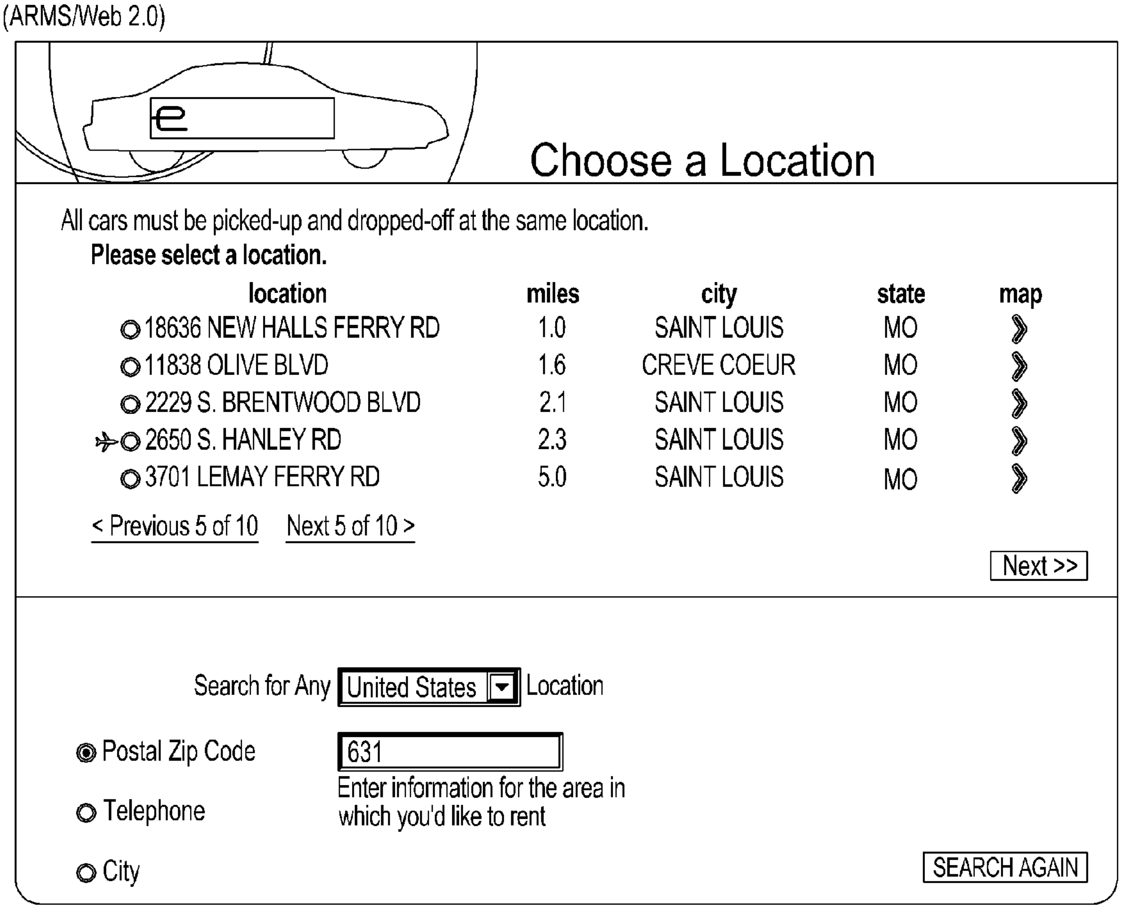
Figure 109B:
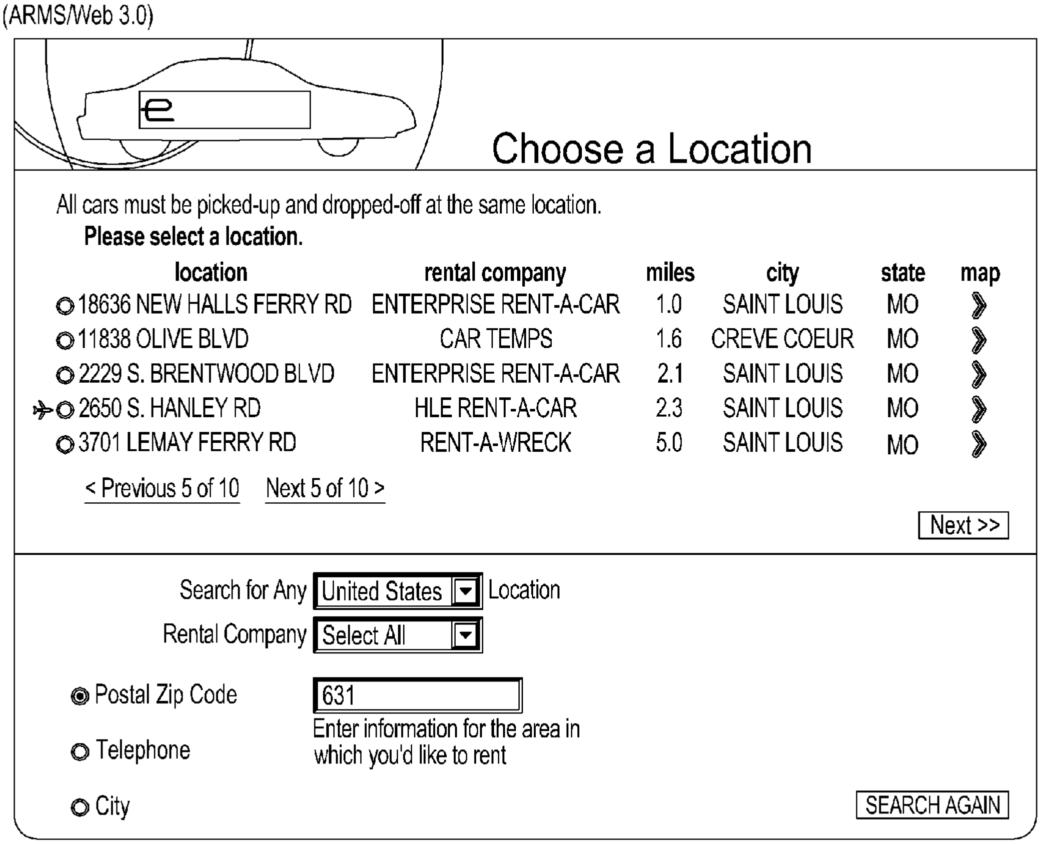

2.2.1 Screen Layout—see FIGS. 109(*a*) and (*b*)
2.2.2 Screen Field Definition

| Screen Label | Type | Length | Screen Field Name | Data Field | Screen Specific Rule |
|---|---|---|---|---|---|
| | Radio Button | 1 | Selector Radio Button | | A radio button should be presented for every rental branch location record in the list. Only one radio button may be selected. The rental branch location that is the shortest distance from the search criteria entered should be the default. |
| Location | Output | 30 | Rental Location Address | Address Line | A location should be presented for every rental branch location record in the list. |
| Rental Company | Output | 30 | Rental Company name | | The name of the rental company that is available from the search criteria. |
| Miles | Output | 4 | Miles from Search Criteria | | Miles from search criteria should be presented for every rental branch location record in this list. |
| City | Output | 18 | Rental Location City Name | City | A city should be presented for every rental branch location record in the list. |
| State/Province | Output | 2 | Rental Location State/Province Code | State | A state/province should be presented for every rental branch location record in the list. |
| Country | Drop Down | 14 | Country | NOT STORED | This list should consist of United States and Canada. This will expand in future releases. The selection will default to the home country of the USER as defined in the USER profile. |
| | Input Text | 12 | Where Needed Value | Where Needed Value | |
| Rental Company | Combo box | 20 | Rental Company | | This is a list of all the rental companies that are participating. |
| Postal/Zip Code | Radio Button | 1 | Postal/Zip Code Button | NOT STORED | |
| Telephone | Radio Button | 1 | Telephone Button | NOT STORED | This should be the default radio button selection. |
| City | Radio Button | 1 | City Radio Button | NOT STORED | |
| Automatically select the nearest office | Checkbox | 1 | Nearest Match Selection | NOT STORED | This should default to checked. |

2.2.3 Screen Function Definition

This section includes the definitions for all functions that can be performed within the screen. This includes operations invoked by button clicks, specific shortcut keystrokes, or other actor activity.

2.2.3.1 Select this Location

The Select this Location screen function will submit the selected rental branch location in the Rental Location Information Container to the ARMS/Web system, to be used by the Create Reservation use case.

2.2.3.1.1 The Select this Location screen function is launched through either a button click or by using the Enter keystroke.

2.2.3.2 Next X of Y

The Next X of Y screen function will allow the USER to view the next five rental locations (unless less than five records exist) that match the search criteria. For example, if a total of 8 locations were returned as part of the search, this screen function would be presented as Next 3 of 8.

2.2.3.2.1 The Next X of Y screen function is launched through a button click.

2.2.3.2.2 The Next X of Y screen function should not be presented if 5 or fewer records are retrieved.

2.2.3.2.3 The Next X of Y screen function should have the X values replaced by the number of records remaining to view (up to five) in this search.

2.2.3.2.4 The Next X of Y screen function should have the Y value replaced by the number of total records returned in the search.

2.2.3.3 Previous 5 of Y

The Previous 5 of Y screen function will allow the USER to view the previous five rental locations that matched the search criteria (and were previously reviewed).

2.2.3.3.1 The Previous 5 of Y screen function is launched through a button click.

2.2.3.3.2 The Previous 5 of Y screen function should not be presented on the initial search results screen. The Previous 5 of Y screen function should only be available if the USER has selected the Next X of Y screen function.

2.2.3.3.3 The Previous 5 of Y screen function should have the Y value replaced by the number of total records returned in the search.

2.2.3.4 Details/Map

The Details/Map screen function allows the USER to review additional information about a rental location presented in the list of matching records. Selecting this screen function will open the Location Details screen for the rental branch selected.

2.2.3.4.1 The Details/Map screen function is launched through a button click.

2.2.3.4.2 Each rental branch location presented in the list of matching locations should have its own Details/Map button.

2.2.3.5 Search Again

The Search Again screen function will allow the USER to submit the Location Search Criteria Container information on the Matching Location screen and re-initiate the search for matching locations.

2.2.3.5.1 The Search Again screen function is launched through a button click.

2.2.3.5.2 If the information submitted to the ARMS/Web system is invalid or incomplete, this screen function should prompt the USER with an error. The error should be specific as to the cause of the failure. All information previously entered should remain populated in each field, with the problem field highlighted or otherwise identified.

2.3 Location Details Screen

This screen allows the USER to view additional details for a given rental location. This screen supports the View Location Detail alternate flow.

Figure 110A:
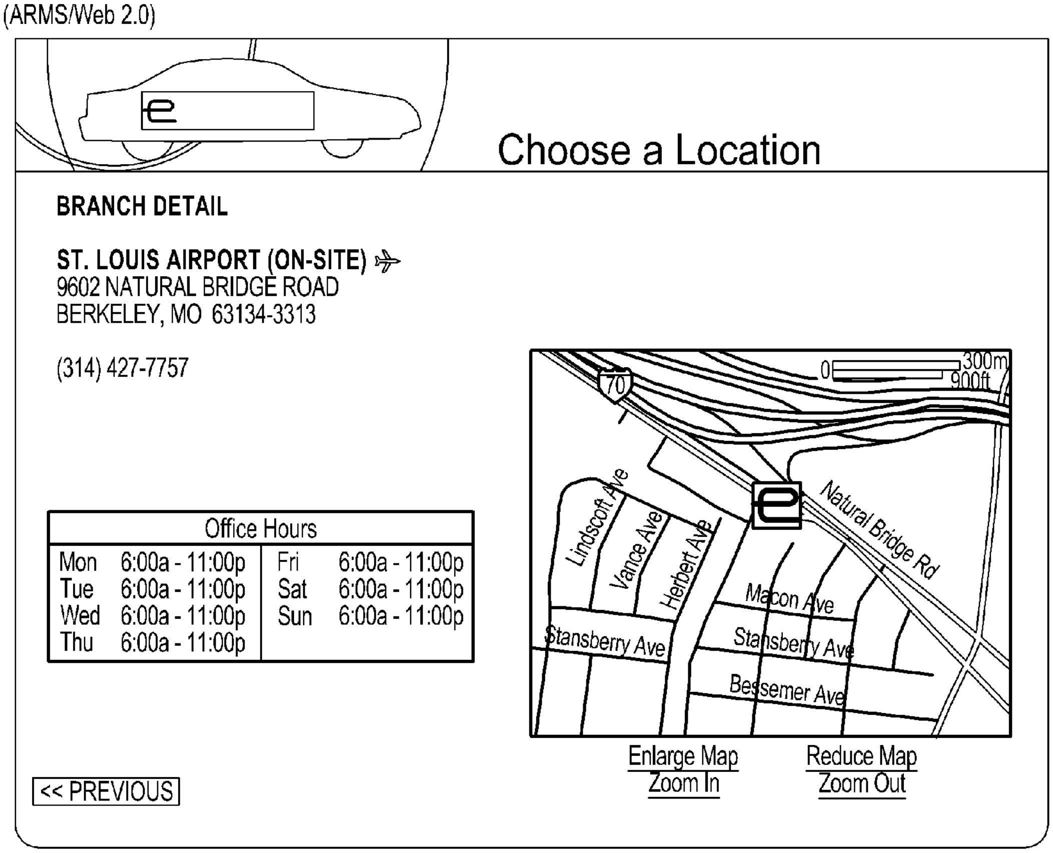
Figure 110B:
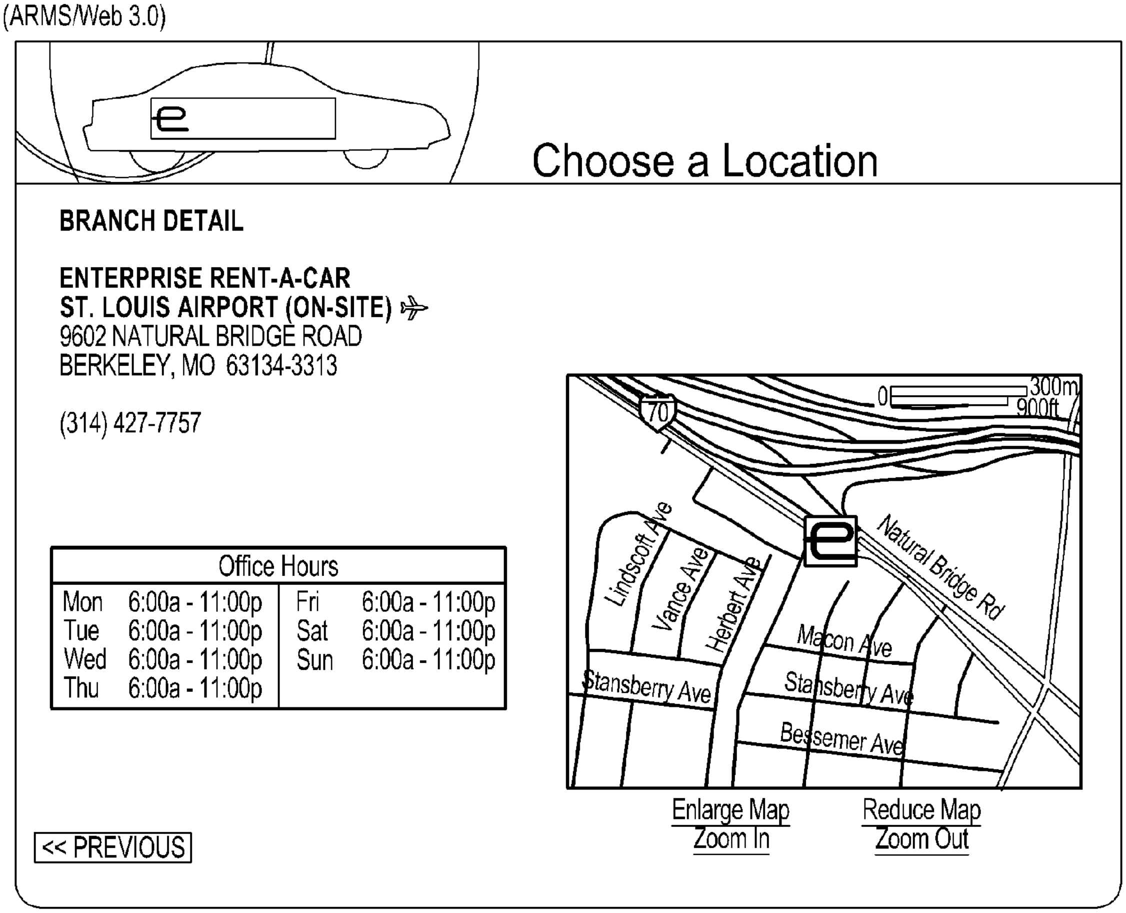

2.3.1 Screen Layout—see FIGS. 110(*a*) and (*b*)

2.3.2 Screen Field Definition

| Screen Label | Type | Length | Screen Field Name | Data Field | Screen Specific Rule |
|---|---|---|---|---|---|
| | Output | | Rental Location Name | Rental Location | |
| | Output | | Rental Companies Name | | |
| | Output | | Rental Location Address | Address Line | |
| | Output | | Rental Location City Name + "," + Rental Location | State + City + Zip Code | Rental Location City Name + "," + Rental Location State/Province Code + "" + Rental Location Postal/Zip Code |
| | Output Text | | Rental Location Telephone Number | Telephone Number | |
| Mon | Output Text | | Rental Location Start Hours of Operation + "-" + R | | Rental Location Start Hours of Operation + "-" + Rental Location End Hours of Operation<br>This should be filled with the start and end hours of operation for the 'Monday' value in the hours of operation array. |
| Tue | Output Text | | Rental Location Start Hours of Operation + "-" + R | | Rental Location Start Hours of Operation + "-" + Rental Location End Hours of Operation<br>This should be filled with the start and end hours of operation for the 'Tuesday' value in the hours of operation array. |
| Wed | Output Text | | Rental Location Start Hours of Operation + "-" + R | | Rental Location Start Hours of Operation + "-" + Rental Location End Hours of Operation<br>This should be filled with the start and end hours of operation for the 'Wednesday' value in the hours of operation array. |
| Thu | Output Text | | Rental Location Start Hours of Operation + "-" + R | | Rental Location Start Hours of Operation + "-" + Rental Location End Hours of Operation<br>This should be filled with the start and end hours of operation for the 'Thursday' value in the hours of operation array. |

-continued

| Screen Label | Type | Length | Screen Field Name | Data Field | Screen Specific Rule |
|---|---|---|---|---|---|
| Fri | Output Text | | Rental Location Start Hours of Operation + "-" + R | | Rental Location Start Hours of Operation + "-" + Rental Location End Hours of Operation This should be filled with the start and end hours of operation for the 'Friday' value in the hours of operation array. |
| Sat | Output Text | | Rental Location Start Hours of Operation + "-" + R | | Rental Location Start Hours of Operation + "-" + Rental Location End Hours of Operation This should be filled with the start and end hours of operation for the 'Saturday' value in the hours of operation array. |

2.3.3 Screen Function Definition

This section includes the definitions for all functions that can be performed within the screen. This includes operations invoked by button clicks, specific shortcut keystrokes, or other actor activity.

2.3.3.1 Select this Location

The Select This Location screen function will submit the selected rental branch location to the ARMS/Web system, to be used in other parts of the system.

2.3.3.1.1 Clicking on the Select This Location hyperlink launches the Select This Location screen function.

2.3.3.2 Previous

The Previous screen function will return the USER to the list of locations that was presented based on the search criteria that were entered.

2.3.3.2.1 Clicking on the Prev button launches the Previous screen function.

2.3.3.3 Enlarge Map

The Enlarge Map Screen function will retrieve a larger graphic image of the map to the location. The larger image will be placed in the same screen location of the Location Details screen.

2.3.3.3.1 Clicking on the Enlarge Map hyperlink launches the Enlarge Map screen function.

2.3.3.4 Reduce Map

The Reduce Map Screen function will retrieve a smaller graphic image of the map to the location. The smaller image will be placed in the same screen location of the Location Details screen.

2.3.3.4.1 Clicking on the Reduce Map hyperlink launches the Reduce Map screen function.

2.3.3.5 Zoom In

The Zoom In screen function will retrieve a more specific (more detailed) graphic image of the map to the location. The more specific image will be placed in the same screen location of the Location Details screen.

2.3.3.5.1 Clicking on the Zoom In hyperlink launches the Zoom In screen function.

2.3.3.6 Zoom Out

The Zoom Out screen function will retrieve a more general (less specific) graphic image of the map to the location. The more general image will be placed in the same screen location of the Location Details screen.

2.3.3.6.1 Clicking on the Zoom Out hyperlink launches the Zoom Out screen function.

3. Questions and Answers

Issue Number: 307

Question: We have heard from the business that the search by name criteria needs to be better. Today we search by the first three letters of the last name. We need to know what criteria is the preferred method of search to be done.

For example: Do we search the entire last name and first name?

Do we search by the first three letters of the last name and the first letter for the first name?

Do we search by first letter of last name and first letter of first name? Need the Business Rule.

Status: 12 User Review

Resolution: 4-17-00, Sean O'Donnell—We have spoken to the Rental Redesign folks to find out how they are doing last/first name matching, and they are not planning to search by name in the new rental system (Telephone Number, Driver's License, and SSN only). They were going to have an 'implied wildcard' search by name, but it was taken out in USER review.

Issue Number: 310

Question: Do we want the ARMS/Web to have search available by phone, zip code/postal code, city and state. Current state only allows for phone number searches. Do we want to search other than phone number For example: Do we want to search by phone number or zip code?

Do we want to search by phone number or zip code or city? Need Business Rule

Status: Closed—Resolved

Resolution: 3-16-00, Jen Cavanaugh—Talking with Dave Smith. 3-22-00, Issue Mtg. Search by phone # & zip code only.

(SHOULD THE ANSWER BE "SEARCH BY PHONE # AND/OR ZIP CODE?) yes it is and/or could be both or one.

Issue Number: 311

Question: If a daily rental branch is closed, how do we want the system to work?Current state it defaults to Claims Connection. We need clarification on how this should work in the ARMS/Web environment.

3-17-00, Application Team—What do we want to see in the locator, do we want to see just open only or all? If no branch is open do we return to Claims Connection?

Status: Closed—Resolved

Resolution: 3-16-00, Jen Cavanaugh—Stan's team is going to get w/claims Connection to see how this process works after hours. From there we will make some business decisions 3-20-00, Jennifer Cavanaugh—Stan's team needs to research how ARMS & Retail Res Locator works & how they differ. Then we will re-review the question.

3-27-00, Sean—I talked with Trent Tinsley and Kim Devallance on this topic, which was EXTREMELY helpful. If the adjuster selects a closed branch, the system will route the ticket based on the type of service established in the insurance company profile:

Insurance companies that do NOT have 24-hour service, the reservation will be routed to the branch that was selected. The branch will do a callback in the morning when they re-open. Insurance companies that have 24-hour service have their reservations re-routed to Claims Connection (who will do a callback prior to 9 pm in any time zone unless otherwise specified by an adjuster) if the selected office is not open. This determination is made in the background after the adjuster submits the reservation. Claims connection will re-route the reservation to the appropriate branch when the customer is contacted.

Essentially, the way that location selection is handled today can/should be supported in the future version of ARMS/Web (location selection is implied through the F2—Rates function of ARMS/400). Please let me know if you have questions with regard to this issue update/resolution.

Issue Number: 374

Question: In the Create Reservation functional specification, we have stated that the system will pull a location and rates immediately for the USER. The issue arises when we have no location to retrieve, in cases that the 'where needed' search criteria is weak or we don't have a branch within 50 miles of the search area. In the current state, we show Claims Connection as if it were a branch in this situation. This can be somewhat confusing (to see the location of Hanley Road in St. Louis if you are in Delaware). In the future state, we think it may be a good idea to notify the USER that no location was found, and that the reservation would be handled by Claims Connection (see example message below). Any thoughts on this question . . .

Example Message:

A rental branch could not be found within 50 miles of 555-512-5000. Claims Connection will ensure your reservation is handled immediately. Please call 800-CLAIMSCONNECTION for additional assistance.

Status: Pending

Resolution: 5-8-00, Response from Sean O'Donnell: Dave liked the idea, and so did Kim. Have not heard from Randy on this one, though. Let me know if you need me to follow up, otherwise this will be written in to the specification for Finding a rental location.

ARMS Web 3.0

Functional Design Specification

Send Message

Version 1.1

Send Message

1. Send Message Use Case 1.1 Brief Description

This use case describes the process of capturing messages and diary notes associated with a rental reservation/authorization. The USER can elect to either have the message sent to the Enterprise rental branch location responsible for the reservation/authorization (MESSAGE in this document), or to store the note in the ARMS Web system without sending the message to Enterprise (DIARY NOTE in this document). All MESSAGES and DIARY NOTES captured must be related to a specific reservation/authorization.

NOTE: This is a sub-use case that must be accessed from another use case. For example, a USER may send a message while creating a reservation, maintaining an authorization, or completing an extension.

1.2 Use Case Actors

The following actors will interact with this use case. All actors are referred to as USER throughout this use case:

ADJUSTER—The ADJUSTER will use this use case to enter and send a message about a reservation/authorization to the rental branch location that is responsible for the reservation/authorization. The ADJUSTER may also use this use case to capture diary notes.

PROCESSOR—The PROCESSOR will use this use case to enter and send a message about a reservation/authorization to either the rental branch location or the ADJUSTER that is responsible for the reservation/authorization.

ENTERPRISE ADMINISTRATOR—The ENTERPRISE ADMINISTRATOR will use this use case to send a message on a specific transaction to notify the rental branch location or other user of issues/complications in transmission of the transaction.

1.3 Pre-Conditions

The USER must be signed-on to the ARMS Web system.

The USER must have selected an authorization that is in a state that allows MESSAGES or DIARY NOTES.

1.4 Flow of Events

The Flow of Events includes all steps necessary to enter MESSAGES and DIARY NOTES.

Figure 111:
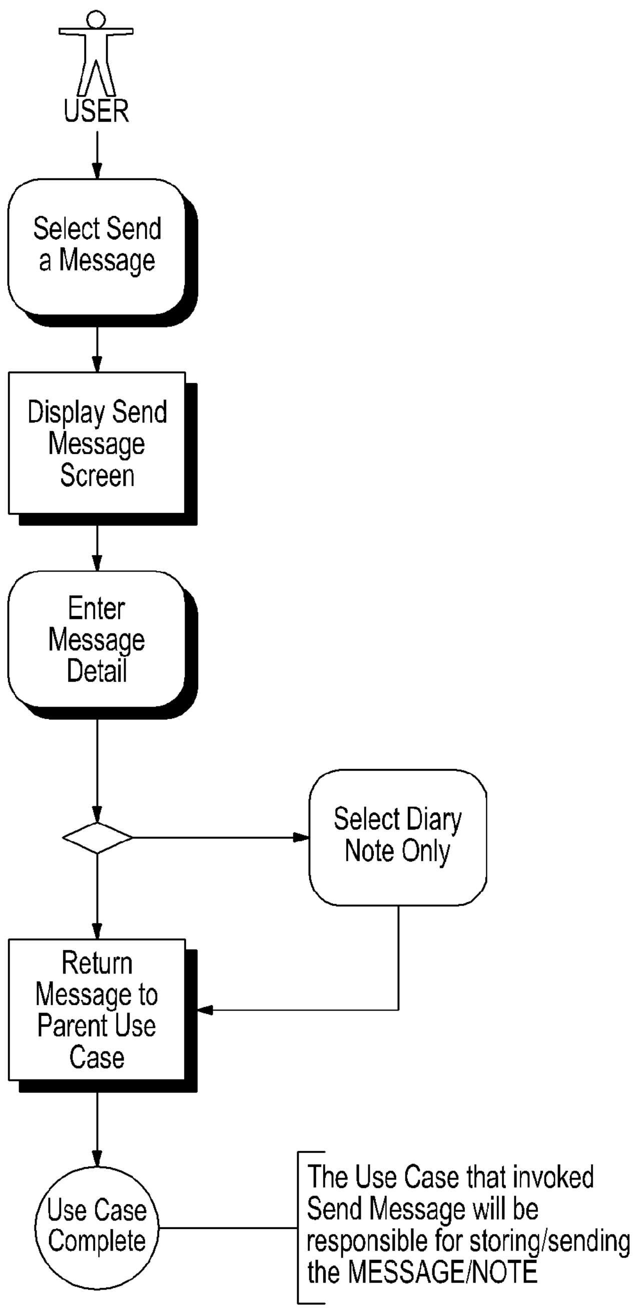

1.4.1 Activity Diagram—see FIG. 111.

1.4.2 Basic Flow

The Basic Flow of the Send Message use case includes all of the required steps for the USER to enter a MESSAGE or DIARY NOTE.

1. The USER will indicate that they want to send a MESSAGE for a reservation/authorization.
2. The system will display a screen that will capture the message/note text.
3. The USER will enter the message/note text.
4. The USER returns to the parent use case, and the system stores the text message to be sent at a later time (see Special Requirements).
5. This ends this use case.

1.4.3 Alternative Flows 1.4.3.1 Send Diary Note Only

The USER will have the ability to indicate that the MESSAGE text should be stored as a DIARY NOTE only in Step 3 of the Basic Flow. This text should not be sent to the Enterprise rental branch location handling the reservation/ticket.

1.4.3.2 Use Case Cancellation

The USER should be capable of leaving the use case at any time.

1.5 Post-Conditions

If successful, the message/note text will be updated in the ARMS Web database. MESSAGES requested to be sent to the rental branch location are sent to ARMS.

If unsuccessful, the system state remains unchanged.

1.6 Special Requirements 1.6.1 Submit Message Responsibilities

The parent use case that accessed this function will have the responsibility of submitting the text message to the ARMS Web database. Based on USER input, the parent use case must complete the following action:

If the USER chose to have the text sent to the rental branch location as a MESSAGE, the text will be written to the ARMS Web database and the MESSAGE will be sent to ARMS. ARMS will forward the text to ECARS for distribution to the appropriate rental branch.

If the USER chose to save the text as a DIARY NOTE, the text will be written to the ARMS Web database as a DIARY NOTE only.

1.7 Extension Points

None.

2. Screen Design

As noted in the Send Message Use Case, the Send Message function will be available on multiple screens throughout the system (e.g., Create Reservation, Extend Rental, Change Authorization). This section provides functional description of the screen container that is used on the multiple screens to support the Send Message use case.

Figure 112:
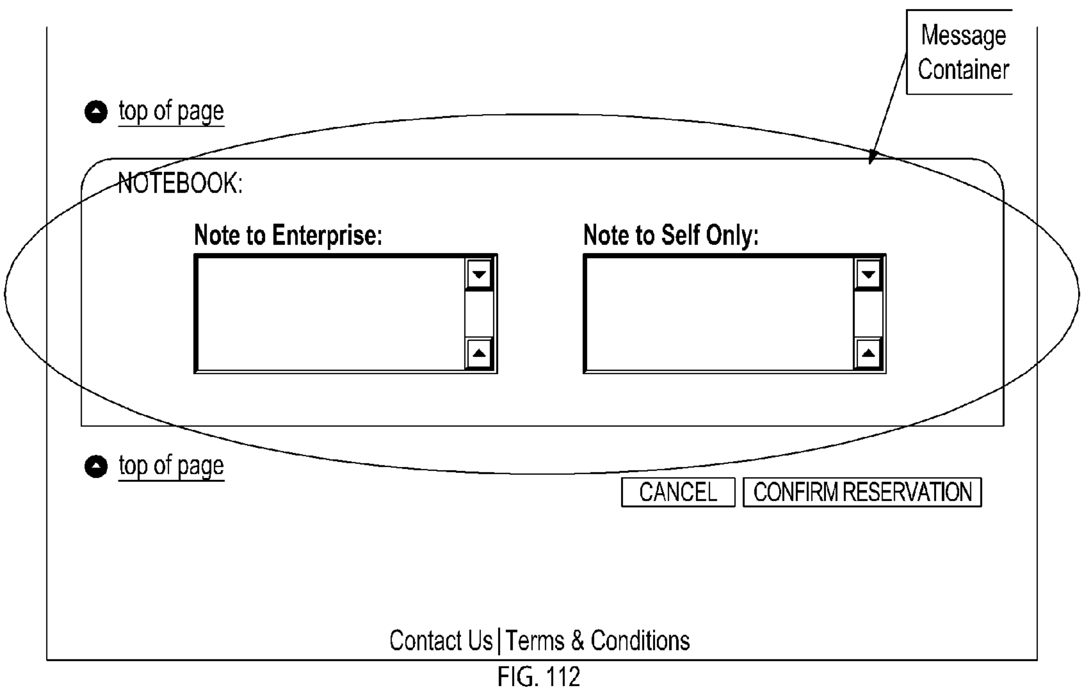

2.1 Message Screen Container 2.1.1 Screen Layout—see FIG. 112. (This is the screen layout for the Create Reservation screen. The Message screen container is part of this screen, and is shown here for illustrative purposes only.)

The area of the screen under consideration is the container beginning with the Notebook heading. This is an example of how the message container might look on any given screen.

2.1.2 Message Screen Container

| Screen Label | Type | Length | Screen Field Name | Data Field | Screen Specific Rule |
|---|---|---|---|---|---|
| Note to Enterprise | Input Text | 200 | Message Text | message text | Text entered into this field will be sent to the Enterprise rental branch location. |
| Note to Self Only | Input Text | 200 | Message Text | Diary text | Text entered into this field will be stored in the ARMS Web database but will not be sent to the Enterprise rental branch location. |

2.1.3 Screen Function Definition

The Message screen container will use the functions of the parent screen to have the message sent.

3. Questions and Answers

Issue Number: 341

Question: Current state ARMS400 allows user to enter maximum of four lines of fifty characters. Current state ARMS has program limitation of ten lines of fifty characters. ARMS Web will be limited by current state ARMS. Should that be the planned maximum for ARMS Web or ??? One idea would be to have the number of lines/characters profiled. Then the size of the message box that is displayed to the user would be limited by this profiled amount.

Status: Closed—Resolved

Resolution: 3-30-00, Kim De Valiance—I think ten lines of fifty characters to be entered by any user at a time is more than enough. I don't really for see the need to profile this by company.

Issue Number: 342

Question: Current state allows message to be sent on unauthorized requests only if they have not been assigned to an adjuster. How should future state work? If we allow messages on assigned unauthorized requests, we must keep in mind that we are defaulting the Direct-Bill To percent at 100% on all auth. screens. When the adjuster submits the message, they MAY be unintentionally authorizing the request.

Status: Closed—Resolved

Resolution: 3-30-00, Kim De Valiance—Kim: we should never send an authorization to the branch if all the adjuster did was key in a message. The message will either appear in ECARS under res notes or callback notes, but should never appear to the branch as an authorization. We not only need to give the adjuster the ability to send a message, but they should be able to change info (such as claim number, claim type, etc.) before assigning the request to the adjuster, thereby enabling the adjuster to see the correct info when authorizing or denying a DB. We hear this request a lot from our customers.

Functional Design Specification

Additional Charges

Version 1.2

Additional Charges

1. Additional Charges Use Case 1.1 Brief Description

The Additional Charges use case will allow the USER to view, add, or modify/remove any additional charges that may be associated with a rental authorization. Additional Charges such as Collision/Damage Waiver (CDW), Mileage Charge, or any other rental related charge could be authorized by a USER through this function.

1.2 Use Case Actors

The following actors will interact with this use case:

ADJUSTER—The ADJUSTER will use this use case to view, add, or modify any additional charges that are associated with a rental authorization.

1.3 Pre-Conditions

The USER must be signed-on to the ARMS Web system.

The USER must have a reservation or open ticket selected (active).

1.4 Flow of Events

The Flow of Events will include the necessary steps to view, add and modify additional charges associated with a rental authorization.

Figure 113:
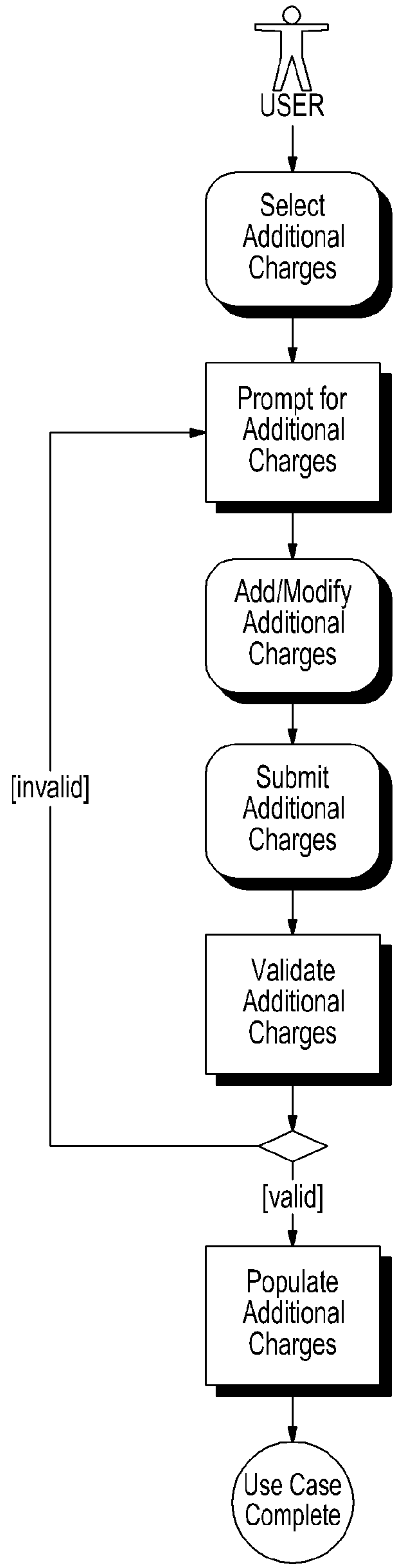

1.4.1 Activity Diagram—see FIG. 113.

1.4.2 Basic Flow

The Basic Flow of the Additional Charges use case includes all of the required steps to view, add, or modify Additional Charges as part of an authorization.

1. The USER will select Additional Charges for the active reservation or open ticket.
2. The system will prompt the USER to add, modify or remove Additional Charges.
3. The USER will view, add, or modify Additional Charges that will be authorized.
4. The USER will submit the Additional Charges to the system.
5. The system will validate the Additional Charges entered by the USER.

6. The system will return the USER to the active reservation or open ticket and populate Additional Charges. (The Additional Charges should not be submitted to the ARMS Web database until the USER submits the changes on the active reservation or open ticket.)
7. This ends this use case.

1.4.3 Alternative Flows 1.4.3.1 Additional Charges Invalid

If the Additional Charges entered by the USER are invalid, the system should present an error message to the USER and force the USER back into Step 2 of the Basic Flow. The system will declare additional charges invalid in the following circumstances:

1.4.3.1.1 It will be considered invalid if the additional charge type is 'Dollars per Day' or 'Dollars per Rental' and the additional charge value entered is greater than $999.99.

1.4.3.1.2 It will be considered invalid if the additional charge type is 'Dollars per Day' or 'Dollars per Rental' and the additional charge value entered is less than $0.

1.4.3.1.3 It will be considered invalid if the additional charge type is 'Percentage of Rental' and the additional charge value entered is greater than 100%.

1.4.3.1.4 It will be considered invalid if the additional charge type is 'Percentage of Rental' and the additional charge value entered is less than 0%.

1.5 Post-Conditions

If successful, the Additional Charges that were added or modified will be returned to the active reservation or open ticket.

If unsuccessful, no Additional Charge will be added to the active reservation or open ticket.

1.6 Special Requirements

The additional requirements of the business use case are included here. These are requirements not covered by the flow as they have been described in the sections above.

1.6.1 Submit Additional Charges Responsibilities

The parent use case that accessed this function will have the responsibility of submitting the additional charges to the ARMS Web database. Any additional charges returned to a parent use case should be reflected on the screen within that use case. For example, if additional charges were being added as part of the Create Reservation process, the Create Reservation screens should have some indication that additional charges have been added.

1.6.2 Additional Charges Descriptions

Below are the current additional charge descriptions used in the ARMS/400 system in the current state:

| | |
|---|---|
| DAMAGE WAIVER | SPECIAL |
| PAI | DROP CHARGE |
| MILEAGE CHARGE | MISC CHARGES |
| HOURLY | SLP |
| DAILY | UNDERAGE DRIVER |
| WEEKLY | BABY CAR SEAT |
| MONTHLY | SKI RACK |

1.7 Extension Points

None.

2. Screen Design

A definition of the screen layout(s), screen data fields, and screen functions that are used to implement the flows identified above. More than one screen may be used to implement support for the use case flow.

2.1 Additional Charges

This screen will allow the user to view, add, modify or remove additional charges associated with a reservation/authorization.

Figure 114:
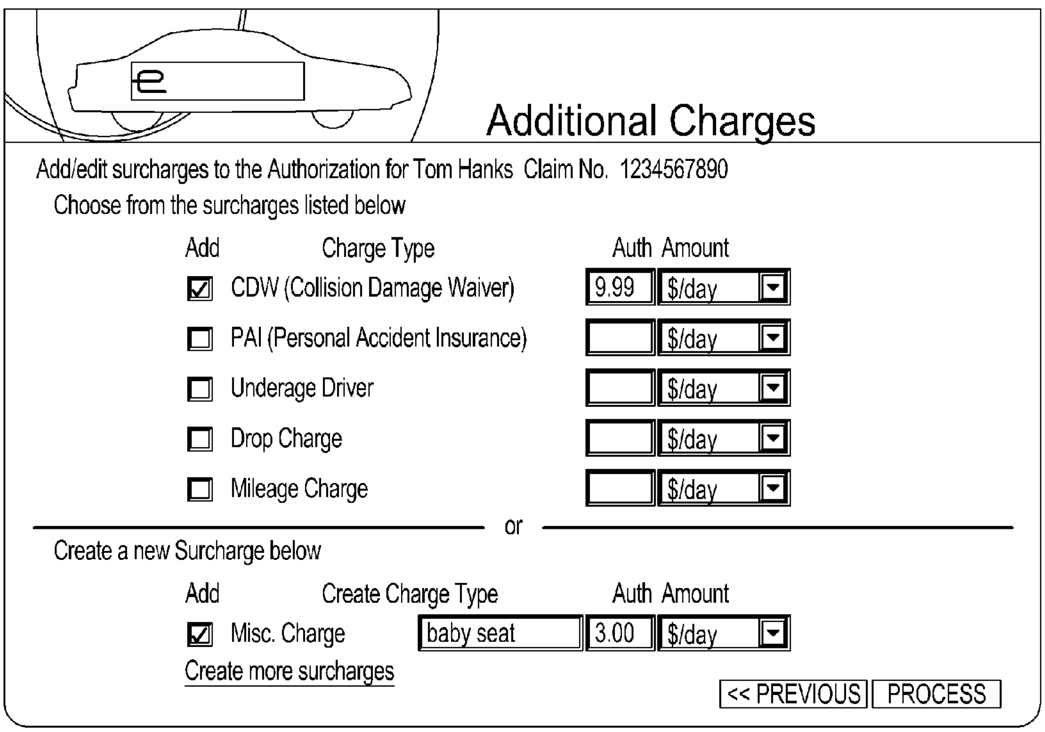

2.1.1 Screen Layout—see FIG. 114.

2.1.2 Screen Field Definition

| Screen Label | Type | Length | Screen Field Name | Data Field | Screen Specific Rule |
|---|---|---|---|---|---|
| CDW (Collision Damage Waiver) | Check Box | 1 | CDW (Collision Damage Waiver) | | |
| PAI (Personal Accident Insurance) | Check Box | 1 | PAI (Personal Accident Insurance) | | |
| Underage Driver | Check Box | 1 | Underage Driver | | |
| Drop Charge | Check Box | 1 | Drop Charge | | |
| Mileage Charge | Check Box | 1 | Mileage Charge | | |
| Misc. Charge | Check Box | 1 | Misc. Charge Check Box | | |
| Create Charge Type | Text Box | 15 | Additional Charge Description | | A description of the additional surcharge to be authorized. |
| Amount | Text Box | 6 | Additional Charge Value | | An Amount text box should be included for every check box on the screen. |
| Type | Combo Box | 20 | Additional Charge Type | | A Type combo box should be included for every check box on the screen. Values include: Dollars per Day (DEFAULT); Dollars per Rental; Percentage of Rental |

2.1.3 Screen Function Definition

This section includes the definitions for all functions that can be performed within the screen. This includes operations invoked by button clicks, specific shortcut keystrokes, or other actor activity.

2.1.3.1 Create More Surcharges

The Create More Surcharges screen function will allow the USER to select the hyperlink and have an additional Misc. Charge line added to the screen. For example, the Screen Layout above shows only one Misc. Charge box. If a USER were to click on the Create More Surcharges hyperlink, the screen would refresh and provide the user with two Misc. Charges boxes. The USER is not limited to the number of Misc. Charge boxes that can be added.

2.1.3.1.1 The Create More Surcharges screen function is invoked through clicking a hyperlink.

2.1.3.2 Process

The Process screen function allows the USER to save the additional charges that are being authorized and return to the active reservation or open ticket. The active reservation or open ticket will reflect that additional charges have been added.

2.1.3.2.1 The Process screen function is invoked through a button click or through an Enter keystroke.

2.1.3.3 Previous

The Previous screen function will allow the USER to return to the active reservation or open ticket without saving the updates to additional charges.

2.1.3.3.1 The Previous screen function is invoked through a button click.

3. Questions and Answers

None.

Functional Design Specification

View Car Class

Version 1.2

View Car Class

1. View Car Class Use Case 1.1 Brief Description

This use case will allow the USER to view examples of automobiles that are part of each Enterprise Car Class. The USER will have the ability to select a car class and have the rate for the car class apply to the reservation/authorization.

1.2 Use Case Actors

The following actors will interact with this use case:

ADJUSTER—The ADJUSTER will use the case to view and/or select the car class that will apply to a reservation.

1.3 Pre-Conditions

The USER must be signed-on to the ARMS Web system.

The USER must have a reservation or open ticket selected.

1.4 Flow of Events

The Flow of Events will include the necessary steps to view and/or select the car class to apply to a rental reservation.

1.4.1 Activity Diagram—see FIG. 98.

1.4.2 Basic Flow

The Basic Flow of the View Car Class use case includes all of the required steps to view and/or select a car for a rental reservation. If a car class is selected, it will be used to populate rate information on a rental authorization.

1. The USER will select View Car Class from the active reservation or open ticket.
2. The system will display a car class detail screen. If the USER had previously selected a car class (for example, on the Create Reservation screen), the car class selected will be displayed. If no car has been selected, the system will display the Standard car class.
3. The USER will select the car class to apply to the reservation or open ticket.
4. The system will return the USER to the active reservation or open ticket and populate car class information based on the car class selected.
5. This ends this use case.

1.4.3 Alternative Flows 1.4.3.1 Select Alternate Car Class

From Step 2 of the Basic Flow, the USER will have the ability to view an alternate car class. The car classes that will be available to view include:

Economy

Compact

Intermediate

Standard

Full Size

Premium

If the USER selects an alternate car class, the system will refresh and present the details of the new car class.

1.4.3.2 Populate Car Class Rates

If a rental branch location has already been selected prior to entering this use case, the selection of a car class will populate the rates that apply to the selected car class on the active reservation or open ticket. This alternate flow returns the USER to Step 4 of the Basic Flow.

1.5 Post-Conditions

If successful, the selected Car Class will be returned to the active reservation or open ticket.

If unsuccessful, the system state is unchanged.

1.6 Special Requirements

The additional requirements of the business use case are included here. These are requirements not covered by the flow as they have been described in the sections above.

1.6.1 Modify Car Class Selection Results

The USER may change the results of this use case as part of the active reservation or open ticket.

1.7 Extension Points

None.

2. Screen Design

A definition of the screen layout(s), screen data fields, and screen functions that are used to implement the flows identified above. More than one screen may be used to implement support for the use case flow.

2.1 Car Class Detail Screen

This screen (see FIG. 99(*a*)) will allow the USER to view detailed information about Enterprise car classes. The USER will also have the ability to select a car class to apply to a rental reservation/authorization.

2.1.1 Screen Layout—see FIG. 99(*a*)

2.1.2 Car Class Details

| Screen Label | Type | Length | Screen Field Name | Data Field | Screen Specific Rule |
|---|---|---|---|---|---|
| | Output | 20 | Car Class Name | | This should be the name of the currently selected car class. |
| (Person Image) | Output | 2 | Car Class Person Capacity | | This should provide the average person capacity of the selected car class. |

-continued

| Screen Label | Type | Length | Screen Field Name | Data Field | Screen Specific Rule |
|---|---|---|---|---|---|
| (Luggage Image) | Output | 2 | Car Class Luggage Capacity | | This should provide the average luggage capacity of the selected car class. |
| | Hidden | 255 | Car Class Image Source | | This should provide a picture of an example car within the selected car class. |
| | Output | 120 | Car Class Detail Description | | This should provide a description of the selected car class. |
| Economy | Output | | Economy Car Class | | This should be a hyperlink to the Economy car class detail. |
| Compact | Output | | Compact Car Class | | This should be a hyperlink to the Compact car class detail. |
| Intermediate | Output | | Intermediate Car Class | | This should be a hyperlink to the Intermediate car class detail. |
| Standard | Output | | Standard Car Class | | This should be a hyperlink to the Standard car class detail. |
| Full Size | Output | | Full Size Car Class | | This should be a hyperlink to the Full Size car class detail. |
| Premium | Output | | Premium Car Class | | This should be a hyperlink to the Premium car class detail. |

2.1.3 Screen Function Definition

This section includes the definitions for all functions that can be performed within the screen. This includes operations invoked by button clicks, specific shortcut keystrokes, or other actor activity.

2.1.3.1 Select this Car Class

The Continue screen function will allow the USER to select the car class to apply to a reservation.

2.1.3.1.1 The Continue screen function is invoked through either a button click or through an Enter keystroke.

2.1.3.2 Previous

The Previous screen function allows the USER to return to the previous screen.

2.1.3.2.1 The Previous screen function is invoked through a button click.

3. Questions and Answers

None.

Functional Design Specification

Assign a Request

Version 1.1

Assign a Request

1. Assign a Request Use Case 1.1 Brief Description

This use case describes the process of how a USER will review unassigned authorization request and assign them to an adjuster for further handling.

1.2 Use Case Actors

The following actors will interact with this use case:

CLAIMS PROCESSOR—The CLAIMS PROCESSOR is a USER who can perform this use case to assign a request for further handling.

ADJUSTER—The ADJUSTER is a USER who can receive the assigned request for further handling.

1.3 Pre-Conditions

The USER must be signed-on to the ARMS Web system.

The USER should be authorized to assign a request.

If there are unassigned requests present, the USER has selected the link from the Review List Action Items Use Case to enter this use case.

1.4 Flow of Events

The Flow of Events will include the necessary steps to make changes and updates to "Assign an Action Item".

Figure 115:
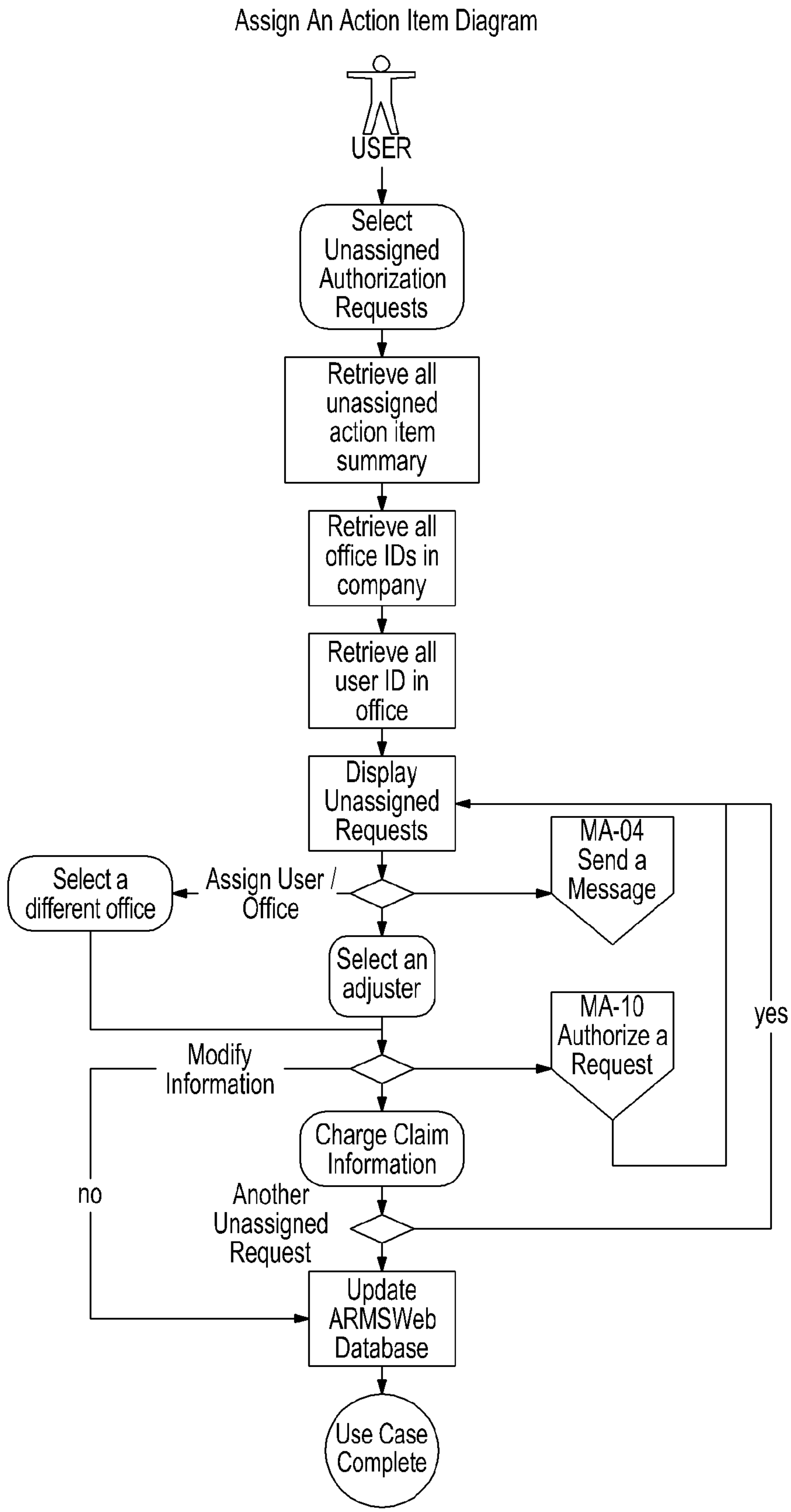

1.4.1 Activity Diagram—see FIG. 115.

1.4.2 Basic Flow

1. The USER selects the unassigned authorizations link.
2. The system retrieves all unassigned request summaries.
3. The system retrieves all OFFICE IDs within ARMS Web.
4. The system retrieves all USER IDs within the OFFICE.
5. The system displays the unassigned authorization summaries with the offices and adjusters.
6. The USER selects an adjuster to assign to the request.
7. The system will update the ARMS Web database.
8. This ends the use case.

1.4.3 Alternative Flows 1.4.3.1 Cancel Use Case

The USER should be capable of leaving the use case at any point prior to assigning the reservation information to an ADJUSTER.

1.4.3.2 Modify a Request

Before step 6 of the basic flow, the USER should be able to make changes to the authorization.

1.4.3.3 Select a Different Office

Before step 6 of the basic flow, the USER should be able to select a different office for this authorization request. If a different office has been selected, the user cannot assign the file to a new adjuster. The new office must now assign the file.

1.5 Post-Conditions

If the use case is successful, the system will change the request type from an unassigned authorization request to direct bill. If the user has authority to authorize this request, the system will change the request to Authorized status and assign the adjuster picked in Step 5 of the basic flow.

If the use case is unsuccessful, the system state will remain unchanged.

1.6 Special Requirements

None.

1.7 Extension Points 1.7.1 MA-04 Send Message

The Send Message function will be used to allow the user to capture messages and diary notes associated with a rental reservation/authorization. The USER can elect to have the message sent to the Enterprise rental branch location responsible for the reservation/authorization. The USER may also send a message without assigning the file to an adjuster/office. All MESSAGES and DIARY NOTES captured must be related to a specific reservation/authorization.

2. Screen Design

A definition of the screen layout(s), screen data fields, and screen functions that are used to implement the flows identified above. More than one screen may be used to implement support for the use case flow.

2.1 Action Items—Unassigned

This screen will allow the USER to assign action items to a claims office or an adjuster or the USER may cancel an item. The USER may also change specified information in the Customer File through this screen.

Figure 116:
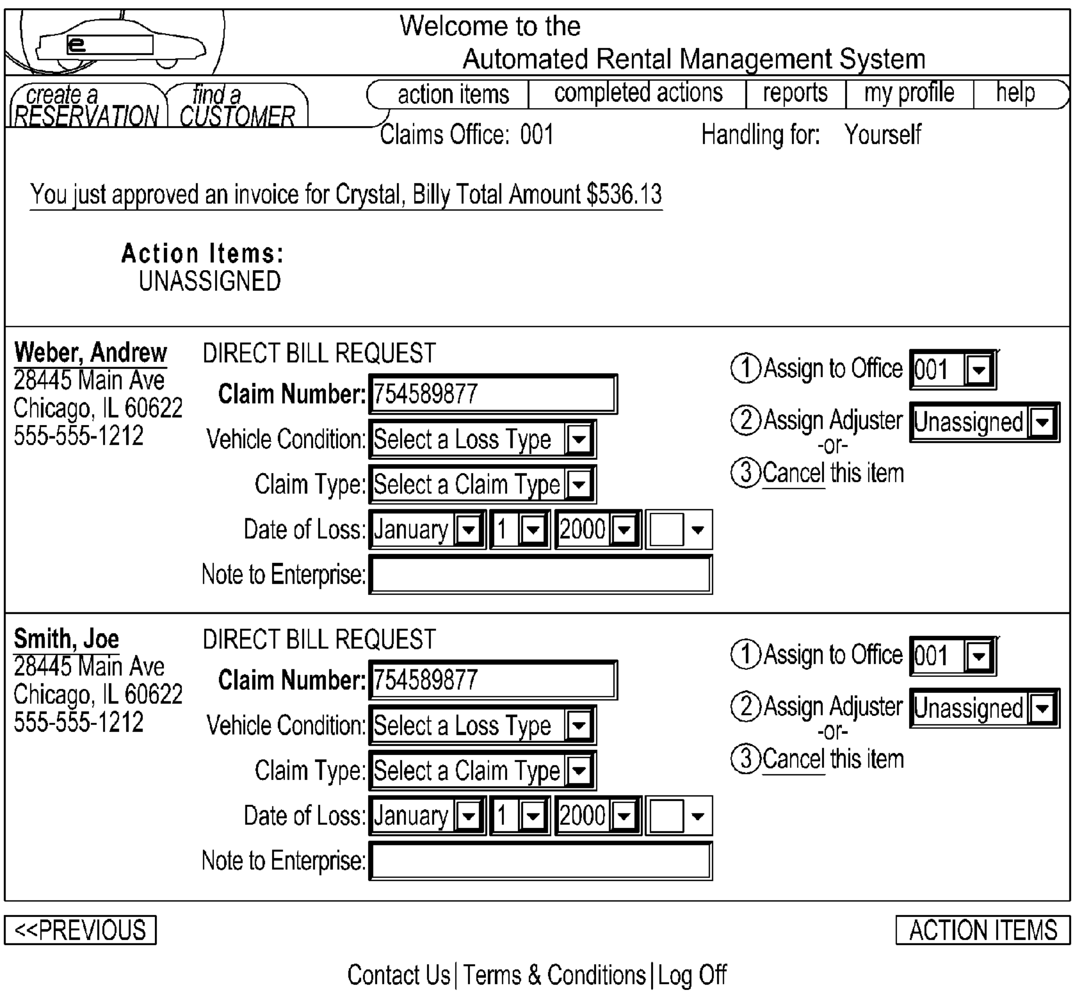

2.1.1 Screen Layout—Action Items—Unassigned—see FIG. 116.

2.1.2 Action Items—Unassigned

| Screen Label | Type | Size | Screen Field Name | Data Field Name | Screen Specific Rule |
|---|---|---|---|---|---|
| Claims Office | Output | 3 | Office Id | external organization abbreviated name | N/A. |
| Handling For: | Output | 30 | Handling for Adjuster's Name | First Name + Last Name | N/A. |
| | Output | 30 | Renter's Name | First Name + Last Name | This should be a link. The USER should be able to get to the authorize page from this screen field. |
| | Output | 30 | Renter's Address | Address Line | |
| | Output | 10 | Renter's City | City | |
| | Output | 3 | Renter's State | State | |
| | Output | 10 | Renter's Zip Code | Zip Code | |
| | Output | 16 | Renter's Home Phone | Renters Night Phone + Renters Night Phone Extension | If these fields are populated, add a label to the screen to differentiate between Home Phone and Work Phone. |
| | Output | 16 | Renter's Work Phone | Day Phone + Renters Day Phone Extension | If these fields are populated, add a label to the screen to differentiate between Home Phone and Work Phone. |
| Claim Number | Input | 30 | Claim Number | Insurance Claim Number | N/A. |
| Vehicle Condition | List Box | 15 | Loss Type | loss type description | |
| Claim Type | List Box | 15 | Claim Type | claim type description | N/A. |
| Date of Loss: | Input | 10 | Date of Loss | Date of Loss | N/A. |
| Note to Enterprise | Input | 30 | Message Text | NOTE | N/A. |
| Assign to office: | List Box | 5 | Office Id | external organization abbreviated name | |
| Assign adjuster: | List Box | 30 | Adjuster Name | First Name + Last Name | Lists only those adjusters the USER has authority to assign. |

1.7.2 MA-10 Authorize a Request

The ADJUSTER may decide to enter into the full detail screen of the unassigned request, which would invoke the Authorize a Request case.

1.7.3 MA-17 Cancel Authorization

At any point prior to assigning the file to an ADJUSTER, the USER should have the ability to cancel the authorization. If the authorization is canceled, the ADJUSTER will be prompted to select a cancellation reason code from a drop down list along with having the option to enter additional comments.

2.1.3 Screen Function Definition

This section includes the definitions for all functions that can be performed within the screen. This includes operations invoked by button clicks, specific shortcut keystrokes, or other actor activity.

2.1.3.1 <<Previous

When clicked, the USER will be taken back to the previous screen.

2.1.3.2 Process

When clicked, the USER will be taken to the next item in the action item list or a detail of the completed action items. This button ends the use case.

2.1.3.3 Cancel

When clicked, the USER will be allowed to cancel the authorization. If this occurs, the rental becomes unauthorized and the rental is no longer the responsibility of the insurance company.

2.1.3.4 Last Action Message

After each action item in the USER's list has been completed, upon arriving at the next item there will be a confirmation message at the top of the screen. This message will be a hyperlink describing the last completed action. If the USER clicks on this link, the system will open the customer file, which will reflect all of the current information for the rental. The USER is then free to make additional changes or to simply view the file.

3. Application Operations

4. Data Fields 4.1 Data Field Definition

This section includes a definition of all data fields included in the functional specification.

4.1.1 Address Line

| | |
|---|---|
| Entity | ARM: Renter Detail |
| Column Name | RKADL1 |
| Label Name | Address Line |
| System Name | |
| Data Type | CHAR(30) |
| Attribute Definition | |

4.1.2 City

| | |
|---|---|
| Entity | ARM: Renter Detail |
| Column Name | RKCYNM |
| Label Name | City |
| System Name | |
| Data Type | CHAR(20) |
| Attribute Definition | |

4.1.3 Claim Type Code

| | |
|---|---|
| Entity | AUTHORIZATION EXTENSION |
| Column Name | Clm_typ_cde |
| Label Name | claim type code: |
| System Name | CLMTYPCDE |
| Data Type | DEC(3, 0) |
| Attribute Definition | The claim type code defines the different Authorization claim types. For example: Insured, Claimant, Uninsured Motorist, etc. |

4.1.4 Claim Type Description

| | |
|---|---|
| Entity | CLAIM TYPE |
| Column Name | clm_typ_dsc |
| Label Name | claim type description: |
| System Name | CLMTYPDSC |
| Data Type | CHAR(40) |
| Attribute Definition | The claim type description is a lexical definition of the claim type code which defines the different Authorization claim types. For example: Insured, Claimant, Uninsured Motorist, etc. |

4.1.5 Company Identifier

| | |
|---|---|
| Entity | EXTERNAL ORGANIZATION |
| Column Name | cmpy_id |
| Label Name | company identifier: |
| System Name | CMPYID |
| Data Type | DEC(11, 0) |
| Attribute Definition | Business Party Identifier is a surrogate key assigned to each unique occurrence of an Individual, External Organization, and Internal Organization (Business Party). |

4.1.6 Date of Loss

| | |
|---|---|
| Entity | A4 Cross Reference |
| Column Name | X4LSDT |
| Label Name | DATE OF LOSS |
| System Name | |
| Data Type | NUMERIC(8) |
| Attribute Definition | |

4.1.7 Day Phone

| | |
|---|---|
| Entity | ARM: Renter Detail |
| Column Name | RKDYPH |
| Label Name | Day Phone |
| System Name | |
| Data Type | NUMERIC(10) |
| Attribute Definition | |

4.1.8 External Organization Abbreviated Name

| | |
|---|---|
| Entity | EXTERNAL ORGANIZATION |
| Column Name | e_o_abbr_nam |
| Label Name | external organization abbreviated name: |
| System Name | EOABBRNAM |
| Data Type | CHAR(10) |
| Attribute Definition | External Organization Abbreviated Name is a shortened text based label associated with an organization outside of Enterprise. This name is sometimes used for accounting purposes. |

4.1.9 External Organization Identifier

| | |
|---|---|
| Entity | EXTERNAL ORGANIZATION |
| Column Name | e_o_id |
| Label Name | external organization identifier: |
| System Name | EOID |
| Data Type | DEC(11,0) |
| Attribute Definition | The external organization identifier is a surrogate key assigned to each unique occurrence of an External Organization. Examples: body shops, vehicle manufacturers, insurance companies, leasing accounts, credit unions, dealerships, or government agencies. |

4.1.10 First Name

| | |
|---|---|
| Entity | ARM: Adjustor Master |
| Column Name | ALFSNM |
| Label Name | First Name |
| System Name | |
| Data Type | CHAR(15) |
| Attribute Definition | |

4.1.11 First Name

| | |
|---|---|
| Entity | ARM: Renter Detail |
| Column Name | RKFSNM |
| Label Name | First Name |
| System Name | |
| Data Type | CHAR(15) |
| Attribute Definition | |

4.1.12 Handled by Adjustor Code

| | |
|---|---|
| Entity | ACTION ITEM |
| Column Name | handl__by__adjr__cde |
| Label Name | Adjustor Code |
| System Name | HNDADJRCDE |
| Data Type | CHAR(10) |
| Attribute Definition | The handled by adjustor code is the adjustor code of the administrator or adjustor's who is handling the action item. |

4.1.13 Handled by Company Identifier

| | |
|---|---|
| Entity | ACTION ITEM |
| Column Name | handl__by__cmpy__id |
| Label Name | ARMS Profile ID |
| System Name | HNDCMPYID |
| Data Type | CHAR(5) |
| Attribute Definition | The handled by company identifier is the company identifier of the administrator or adjustor's who is handling the action item. |

4.1.14 Handling for Adjustor Code

| | |
|---|---|
| Entity | AUTHORIZATION ACTIVITY LOG |
| Column Name | handl__for__adjr__cde |
| Label Name | handling for adjustor code: |
| System Name | HNDADJRCDE |
| Data Type | CHAR(10) |
| Attribute Definition | The handled by adjustor code is the adjustor code of an adjustor/user who is handling authorization activities for another adjustor/user in the ARMS Web application. |

4.1.15 Handling for Company Identifier

| | |
|---|---|
| Entity | AUTHORIZATION ACTIVITY LOG |
| Column Name | handl__for__cmpy__id |
| Label Name | handling for company identifier: |
| System Name | HNDCMPYID |
| Data Type | CHAR(5) |
| Attribute Definition | The handling for company identifier is the company identifier used to uniquely identify an adjustor/user who is handling authorization activities for another adjustor/user in the ARMS Web application. |

4.1.16 Insurance Claim Number

| | |
|---|---|
| Entity | ARM: Authorization(Claim Info) |
| Column Name | AZCLNO |
| Label Name | Insurance Claim Number |
| System Name | |
| Data Type | CHAR(20) |
| Attribute Definition | |

4.1.17 Last Name

| | |
|---|---|
| Entity | ARM: Adjustor Master |
| Column Name | ALLSNM |
| Label Name | Last Name |
| System Name | |
| Data Type | CHAR(20) |
| Attribute Definition | |

4.1.18 Last Name

| | |
|---|---|
| Entity | ARM: Renter Detail |
| Column Name | RKLSNM |
| Label Name | Last Name |
| System Name | |
| Data Type | CHAR(20) |
| Attribute Definition | |

4.1.19 Loss Type Description

| | |
|---|---|
| Entity | LOSS TYPE |
| Column Name | loss__typ__dsc |
| Label Name | loss type description: |
| System Name | LOSSTYPDSC |
| Data Type | CHAR(40) |
| Attribute Definition | The loss type description is a lexical definition of the loss type code which defines the different loss categories when an Insurance Company authorizes a Rental. For example: Theft, Drivable, Repairable, Non-drivable, Non-repairable, Totaled. |

4.1.20 Note

| | |
|---|---|
| Entity | ARM: ARMS/400 Diary Notes File |
| Column Name | NENOTE |
| Label Name | NOTE |
| System Name | |
| Data Type | CHAR(50) |
| Attribute Definition | |

4.1.21 Renters Day Phone Extension

| | |
|---|---|
| Entity | ARM: Renter Detail |
| Column Name | RKDYEX |
| Label Name | Renters Day Phone Extension |
| System Name | |
| Data Type | NUMERIC(4) |
| Attribute Definition | |

4.1.22 Renters Night Phone

| | |
|---|---|
| Entity | ARM: Renter Detail |
| Column Name | RKNTPH |
| Label Name | Renters Night Phone |
| System Name | |
| Data Type | NUMERIC(10) |
| Attribute Definition | |

4.1.23 Renters Night Phone Extension

| | |
|---|---|
| Entity | ARM: Renter Detail |
| Column Name | RKNTEX |
| Label Name | Renters Night Phone Extension |
| System Name | |
| Data Type | NUMERIC(4) |
| Attribute Definition | |

4.1.23 State

| | |
|---|---|
| Entity | ARM: Renter Detail |
| Column Name | RKSACD |
| Label Name | State |
| System Name | |
| Data Type | CHAR(2) |
| Attribute Definition | |

4.1.24 Zip Code

| | |
|---|---|
| Entity | ARM: Renter Detail |
| Column Name | RKZPCD |
| Label Name | Zip Code |
| System Name | |
| Data Type | CHAR(9) |
| Attribute Definition | |

5. Questions and Answers

Issue Number: 345

Question: Do we force the user to view the Rental Detail in order to change the unassigned adjuster to an adjuster who is authorized to handle?

Status: Closed—Resolved

Resolution: 4-12-00, Randy Haselhorst, we don't want to force them to look at the detail to assign a rental request to another user. They primarily look for claim number, claim type, renter name and possibly date of loss. If you can make the option you've described intuitive, that may work, but it doesn't sound that way to me.

4-12-00, Kim De Valiance, NO—This is a great feature, but I don't know if it is necessary. Some companies use this feature, while others wait for the phone call to authorize.

Issue Number: 346

Question: Should you be allowed to decline, authorize or extend an unassigned rental.

Status: Closed—Resolved

Resolution: 4-12-00, Randy Haselhorst—you can't "extend" until you've authorized. Decline could be an option, but we should probably think about that more to determine if we should. Current state does not have this but I have heard people ask for it. As far as authorizing, that again may be a good idea. I'd like to see Kim and Dave's ideas. 4-12-00, Kim De Valiance—Yes, we have heard this many, many times that will assigning a rental, the user should have the ability to do all these things (as long as the user has the proper authority).

Issue Number: 361

Question: Can we pass along an unassigned to another office?

Status: Pending

Resolution: Yes, if the request is an unassigned status, the USER can transfer it to another office.

Issue Number: 378

Question: Can we Exit the use case after Sending a Message and leave the request unassigned? Iteration 2 question.

Status: Closed—Resolved

Resolution: 6-23-00 Per Brian Weingart, —yes, after sending a message on an unassigned request, if we didn't assign an adjuster, it is still unassigned.

Issue Number: 413

Question: 6-23-00, Only one person can handle un-assigns—which is set up in the profile? Or can a multiple # of people handle the un-assigns? Does the Handling for drop down box allow for the selection of unassigned? How do we handle record locking? Per Jennifer, Sean is working on this issue.

Status: Pending

Resolution:

Issue Number: 414

Question: 6-23-00, If I select Unassigned from the action item list and only one exists do I go straight to the detail? Per Jennifer—Sean is working on this issue.

Status: Pending

Resolution:

Issue Number: 415

Question: 6-23-00, If I select Unassigned from the action item list and multiple exists I go straight to the detail. I go to a screen, which looks like action items, but list all of the unassigned. Per Jennifer—Sean is working on this issue.

Status: Pending

Resolution:

Functional Design Specification
Authorize a Request
Version 1.1

Authorize a Request

1. Authorize Request Use Case 1.1 Brief Description

This use case describes how a USER authorizes a direct bill request.

1.2 Use Case Actors

The following actors will interact with this use case:

ADJUSTER—The USER will use this system to authorize a direct bill request.

1.3 Pre-Conditions

The USER must be logged into the ARMS Web system.

The USER must have the authority to authorize a request.

At least one outstanding unauthorized direct bill request must be assigned that the USER may handle.

The USER must have selected an Unauthorized Direct Bill Request from the Review Action Items Screen or from the Search Results page.

1.4 Flow of Events

The Flow of Events will include the necessary steps to make changes and updates to "Authorize Request".

Figure 117:
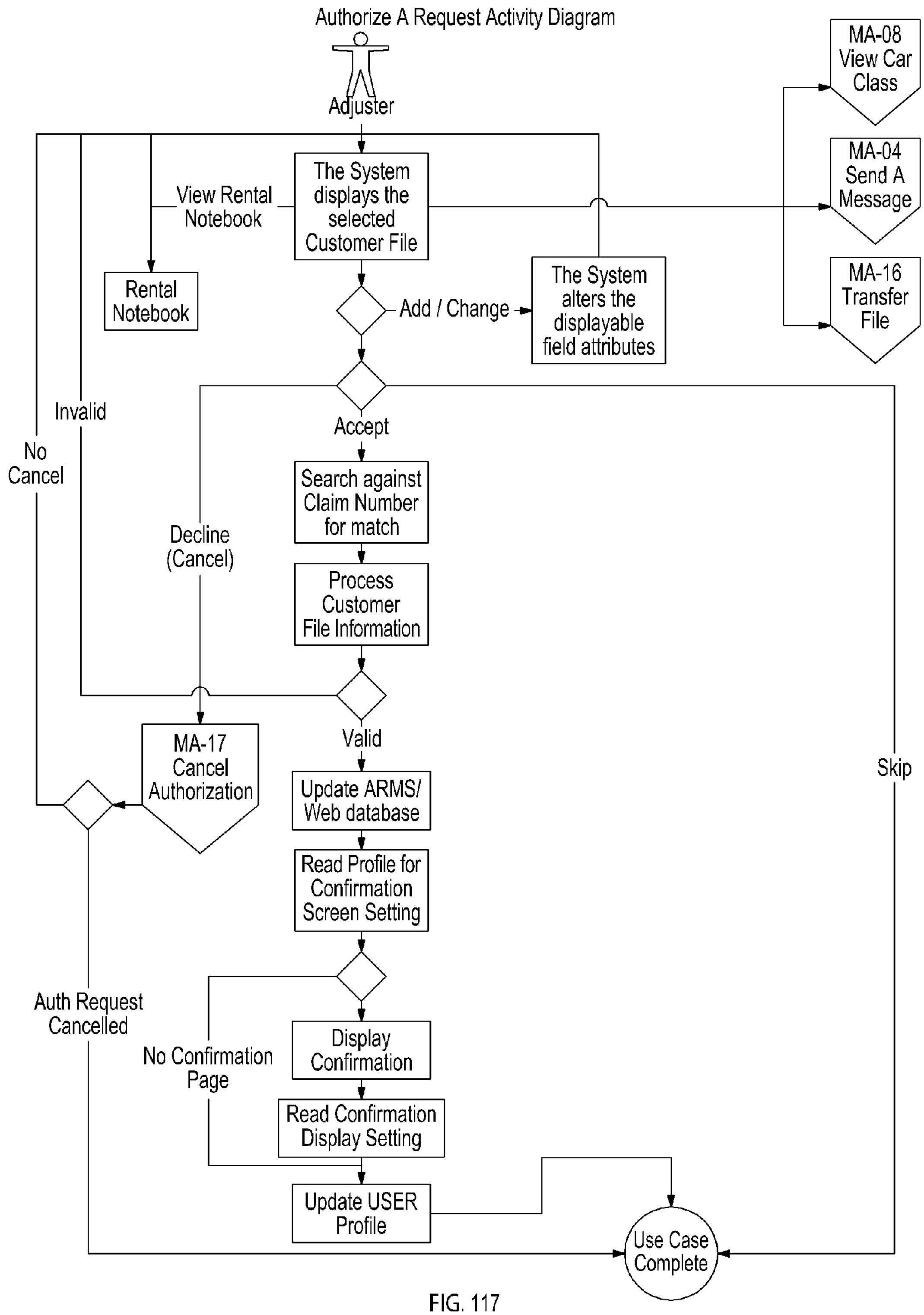

1.4.1 Activity Diagram—see FIG. 117.

1.4.2 Basic Flow

1. The USER selects an outstanding direct bill to authorize.
2. The system displays the Customer file.
3. The USER reviews the renter's information.
4. The USER inputs a number of Authorized Amounts, days and required fields.
5. The USER submits the Authorization.
6. The system validates information in the Customer File.
7. If the adjuster assigned to the Customer File is 'UNKNOWN' or 'UNASSIGNED', the System will assign the Customer File to the current USER.
8. The system will update the ARMS/Web database with the Authorization.
9. The System reads the user profile to see if the confirmation page should display.
10. If the profile indicates 'Show Confirmation Page', the System will display the confirmation page.
11. This ends the use case.

1.4.3 Alternative Flows 1.4.3.1 View Notebook

At step 3 of the Basic Flow, the USER can select to view the transaction history (Notebook) by selecting the Go To Notebook link.

1.4.3.2 Add Notes to Customer File

At step 3 of the Basic Flow, the USER can add notes to the Customer File by typing in the appropriate notes field on the Customer File page.

1.4.3.3 Skip Customer File

At step 3 of the Basic Flow, the USER should have the ability to skip to the next action item by clicking the Skip button. After clicking the Skip button, the USER should be taken to the next action item on their current list without any changes to the file being skipped.

1.4.3.4 Change Customer File

At step 3 of the Basic Flow, the adjuster can make changes to the additional details of the Customer File. This is done by selecting the Add/Change link which will invoke an editable page with all *appropriate information editable.

1.5 Post-Conditions

If the use case was successful then the changes should go into effect immediately and the screen should revert back to the original screen of entry.

If the use case was successful, then the ARMS system will be notified of authorization changes.

If the use case was unsuccessful then the system state will be unchanged.

1.6 Special Requirements 1.6.1 Requirements for Claim Type Authorizations

The following are a set of requirements surrounding the type of authorized amounts that are allowable based on the Claim Type associated with a rental. These restrictions DO NOT APPLY to reservations that are submitted with a Direct Billing Percentage of zero (0).

1.6.1.1 When the Claim Type Selected is 'Insured', 'Theft', or 'Uninsured Motorist'

1.6.1.1.1 The reservation/rental must always include an Authorized Rate or both Policy Daily and Maximum Limits as defined by the renter's insurance policy. Zero (0) is an acceptable Policy Daily Limit.

1.6.1.1.2 The reservation/rental must include an Authorized Rate or Policy Daily Limit if a Policy Maximum Limit is included. Zero (0) is an acceptable Policy Daily Limit.

1.6.1.2 When the Claim Type Selected is 'Claimant'

1.6.1.2.1 The reservation/rental must always include an Authorized Rate.

1.6.1.2.2 The reservation/rental may not include a Policy Daily/Maximum Limits selection.

1.6.1.3 Requirements for Editable Fields Based on Reservation/Ticket Status 1.6.1.3.1 Depending on the status of the Customer File the adjuster may change the following fields:

| Field Name | Unassigned/ Unauthorized Reservation/ Ticket | Assigned but Unauthorized Reservation or Ticket | Authorized Ticket |
|---|---|---|---|
| CLAIM NUMBER | X | X | X |
| CLAIM TYPE | X | X | X |
| LOSS TYPE | X | X | X |
| DATE OF LOSS | X | X | X |
| INSURED INFORMATION | X | X | X |
| RENTER INFORMATION | X | | |
| DATE RENTAL IS NEEDED | X | | |
| ADDITIONAL CHARGES | X | X | X |
| NUMBER OF AUTHORIZED DAYS | X | X | |
| BILL-TO PERCENT | X | X | X |
| POLICY LIMITS | X | X | X |
| AUTHORIZED RATE | X | X | X |

If the Customer File is an Unauthorized Reservation, the adjuster can Reject the Authorization Request, Send a Message, and/or Transfer (Assign) the file to an adjuster.

1.6.1.3.2 If the status of the Customer File is an open ticket the following rules apply:

| Actions | Authorized Reservation | Unauthorized Reservation/ Ticket | Authorized Open Ticket |
|---|---|---|---|
| Send Message | X | X | X |
| Extension | | | X |
| Terminate Rental | | | X |
| Cancel Authorization | X | X | |
| Transfer/Assign Adjuster | X | X | X |
| View Car Class | X | X | X |

1.7 Extension Points

An extension point indicates a link between this use case and another use case.

Extension points associated with the use case are indicated below. Clicking on the extension point will open the related use case.

1.7.1 MA-04 Send Message

The Send Message will be used to allow the USER to capture messages and diary notes associated with a rental reservation/authorization. The USER can elect to either have the message sent to the Enterprise rental branch location responsible for the reservation/authorization, or to store the note in the ARMS Web system without sending the message to Enterprise. All MESSAGES and DIARY NOTES captured must be related to a specific reservation/authorization.

1.7.2 MA-16 Transfer Work (The Change Adjuster button invokes this use case).

The ADJUSTER may choose to transfer an authorization to a different adjuster in his/her office or transfer the authorization to another adjuster in a different office.

1.7.3 MA-08 View Car Class

The ADJUSTER may choose to view the car class. This button invokes the View Car Class use case.

1.7.4 MA-17 Cancel Authorization

The ADJUSTER may choose to deny the authorization. When the ADJUSTER selects the CANCEL button, it will invoke the Cancel Authorization use case to reject the authorization.

2. Screen Design

A definition of the screen layout(s), screen data fields, and screen functions that are used to implement the flows identified above. More than one screen may be used to implement support for the use case flow.

2.1 Authorize Rental Detail

This screen will allow the user to work the currently selected authorization request. The user may set the authorization amounts and policy coverage limits or may assign the request to another adjuster.

Figure 118:
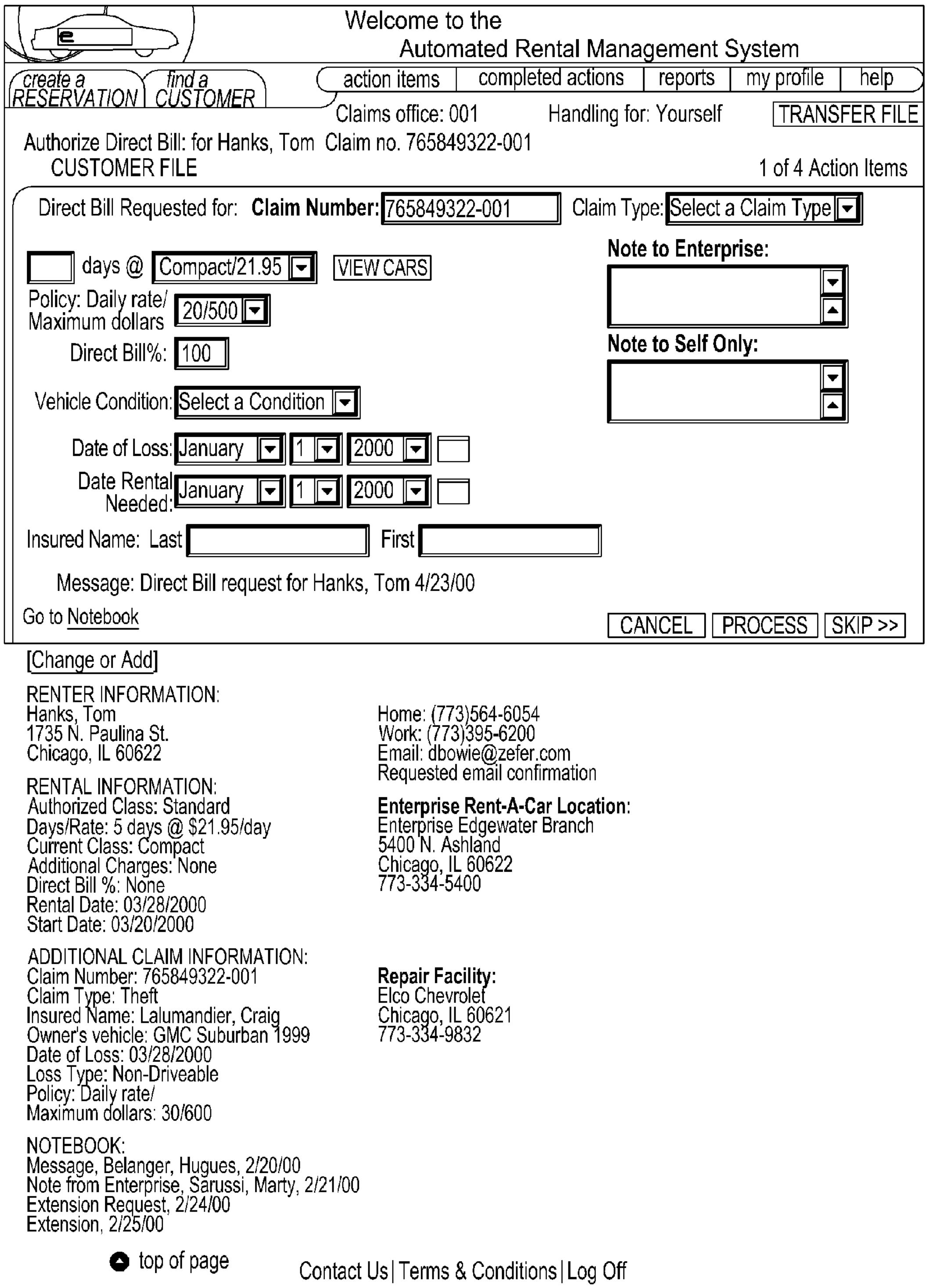

2.1.1 Screen Layout—Authorize Rental Detail—see FIG. 118.

2.1.2 Authorize Rental Detail

| Screen Label | Type | Size | Screen Field Name | Data Field | Screen Specific Rule |
|---|---|---|---|---|---|
| Handling For: | List Box | 30 | Handling for Adjuster's Name | First Name + Last Name | N/A. |
| Note to Enterprise: | Input | 0 | Message | NOTE | |
| Notebook | Output | 50 | Message | NOTE | |
| Note to Self Only | Input | 0 | Message | NOTE | |
| | Output | 8 | Message Creation Date | Add Date | N/A. |
| Message | Output | 50 | Message Text | NOTE | N/A. |
| | Output | 10 | Notebook creation date | Add Date | |
| Claim no. | Output | 30 | Claim Number | Insurance Claim Number | |
| Claim Number: | Input | 11 | Claim Number | Insurance Claim Number | N/A. |
| ____ days @ | Input | 4 | Number of Days Authorized | Number Of Days Authorized | N/A. |
| Direct Bill %: | Input | 6 | Percent Covered | Bill To % | N/A. |
| Policy: Daily rate/Maximum dollars: | List Box | 5 | Policy Maximum and Daily Rates | Dollars Per Day Covered | N/A. |
| Policy: Daily rate/Maximum dollars: | List Box | 5 | Policy Maximum and Daily Rates | Max $ Covered | N/A. |
| | Output | 30 | Rental Location Branch Name | Rental Location | N/A. |
| Date Rental Needed: | List Box | 10 | Rental Start Date | Start Date | N/A. |
| days @ ____ | List Box | 6 | Vehicle Rate | Vehicle Rate | N/A. |
| Insured Name: | Input | 30 | Insured's Name | First Name + Last Name | N/A. |
| Insured Name: | Output | 20 | Insured's Name | First Name + Last Name | |
| | Output | 30 | Rental Location Address | Address Line + Address Line2 | N/A. |
| | Output | 25 | Rental Location City Name | City | N/A. |
| | Output | 10 | Rental Location Postal/Zip Code | Zip Code | N/A. |
| | Output | 3 | Rental Location State/Province Code | State | N/A. |
| | Output | 13 | Rental Location Telephone Number | Telephone Number | N/A. |
| Date of Loss: | List Box | 10 | Date of Loss | Date of Loss | N/A. |
| Date of Loss | Output | 10 | Date of Loss | Date of Loss | |
| | Output | 30 | Renter's Address Line | Address Line | |
| Renter's Address | Output | 20 | Renter's City | City | |
| | Output | 3 | Renter's State/Province Code | State | |
| | Output | 15 | Renter's Zip/Postal Code | Zip Code | |
| Home Phone: | Output | 16 | Renter's Home Phone | Renters Night Phone + Renters Night Phone Extension | This field is input if the ticket is not opened. It will not be editable if the ticket is open. |
| Authorize Direct Bill: for | Output | 30 | Renter's Name | First Name + Last Name | N/A. |
| Renter: | Output | 30 | Renter's Name | First Name + Last Name | N/A. |
| | Output | 16 | Renter's Work Phone | Day Phone + Renters Day Phone Extension | |

-continued

| Screen Label | Type | Size | Screen Field Name | Data Field | Screen Specific Rule |
|---|---|---|---|---|---|
| Owner's Vehicle | Output | 20 | Vehicle Year, Make and Model | Renter Vehicle Year + Renter Make/Model | |
| | Output | 15 | Repair Facility City | City | |
| Repair Facility | Output | 20 | Repair Facility Name | Repair Facility Name | |
| | Output | 3 | Repair Facility State | State | |
| | Output | 10 | Repair Facility Telephone Number | Telephone Number | |
| | Output | 7 | Repair Facility Zip Code | Zip Code | |
| Claim Type: | List Box | 15 | Claim Type | claim type description | N/A. |
| Claims Office: | Output | 3 | Office Id | external organization abbreviated name | N/A. |
| Vehicle Condition | List Box | 20 | Loss Type | loss type description | |
| Vehicle Condition | Output | 20 | Type of Loss | loss type description | |
| | Input | 20 | Renter's Email | renter email | |

2.1.3 Screen Function Definition

This section includes the definitions for all functions that can be performed within the screen. This includes operations invoked by button clicks, specific shortcut keystrokes, or other actor activity.

2.1.3.1 Skip

When clicked, the USER will be taken out of the use case without changing the current status of the request. Any changes made by clicking Change or Add and keying data in the bottom section will be saved.

2.1.3.2 Process

When clicked, the system will validate the input and accept the changes made to the customer file. The arms database will be updated and the data will be sent to the arms system. The use case will then end and the USER will return to the process from which they came.

2.1.3.3 Notebook

When clicked, the USER will be taken to the Note Book section at the bottom of the screen to view all messages for this rental.

2.1.3.4 Transfer File

When clicked, the USER will be taken to the Transfer File screen. This screen allows the USER to change the office or adjuster currently assigned to the customer file. The required information in the Extend Rental/Customer File will be passed to the Transfer File screen. Upon completion of the transfer, the USER will then be returned to the next action item or the profiled start page, depending on the screen from which the USER began.

2.1.3.5 Change or Add

When clicked, the system will refresh the current screen and make all editable fields in the bottom section (outside the gray box area) input capable. The changes on the top of the screen will not be lost.

2.1.3.6 Top of Page

When clicked, the USER will be taken to the top of the current page.

2.1.3.7 View Car Class

When clicked, the USER will be taken to the View Car Class Use Case. No changes will be lost. Once the USER is finished with this use case, the USER will return to the Extend Rental Use Case.

3. Application Operations

4. Data Fields 4.1 Data Field Definition

This section includes a definition of all data fields included in the functional specification.

4.1.1 Add Date

| | |
|---|---|
| Entity | ARM: ARMS/400 Diary Notes File |
| Column Name | NEADDT |
| Label Name | Add Date |
| System Name | |
| Data Type | NUMERIC(8) |
| Attribute Definition | |

4.1.2 Address Line

| | |
|---|---|
| Entity | ARM: Renter Location Master |
| Column Name | LOADL1 |
| Label Name | |
| System Name | |
| Data Type | CHAR(30) |
| Attribute Definition | |

4.1.3 Address Line

| | |
|---|---|
| Entity | ARM: Renter Detail |
| Column Name | RKADL1 |
| Label Name | Address Line |
| System Name | |
| Data Type | CHAR(30) |
| Attribute Definition | |

4.1.4 Address Line2

| | |
|---|---|
| Entity | ARM: Renter Location Master |
| Column Name | LOADL2 |
| Label Name | Address Line |
| System Name | |
| Data Type | CHAR(30) |
| Attribute Definition | |

4.1.5 Bill to %

| | |
|---|---|
| Entity | ARM: Authorization(Claim Info) |
| Column Name | AZBTPC |
| Label Name | Bill To % |
| System Name | |
| Data Type | DECIMAL(3) |
| Attribute Definition | |

4.1.6 Branch

| | |
|---|---|
| Entity | A4 Cross Reference |
| Column Name | br__id |
| Label Name | Branch: |
| System Name | |
| Data Type | CHAR(2) |
| Attribute Definition | |

4.1.7 City

| | |
|---|---|
| Entity | ARM: Rental Location Master |
| Column Name | LOCYNM |
| Label Name | City |
| System Name | |
| Data Type | CHAR(20) |
| Attribute Definition | |

4.1.8 City

| | |
|---|---|
| Entity | ARM: Renter Detail |
| Column Name | RKCYNM |
| Label Name | City |
| System Name | |
| Data Type | CHAR(20) |
| Attribute Definition | |

4.1.9 City

| | |
|---|---|
| Entity | ARM: Repair Detail |
| Column Name | RUCYNM |
| Label Name | City |
| System Name | |
| Data Type | CHAR(20) |
| Attribute Definition | |

4.1.10 Claim Type Code

| | |
|---|---|
| Entity | AUTHORIZATION EXTENSION |
| Column Name | clm__typ__cde |
| Label Name | claim type code: |
| System Name | CLMTYPCDE |
| Data Type | DEC(3, 0) |
| Attribute Definition | The claim type code defines the different Authorization claim types. For example: Insured, Claimant, Uninsured Motorist, etc. |

4.1.11 Claim Type Description

| | |
|---|---|
| Entity | CLAIM TYPE |
| Column Name | clm__typ__dsc |
| Label Name | claim type description: |
| System Name | CLMTYPDSC |
| Data Type | CHAR(40) |
| Attribute Definition | The claim type description is a lexical definition of the claim type code which defines the different Authorization claim types. For example: Insured, Claimant, Uninsured Motorist, etc. |

4.1.12 Company Identifier

| | |
|---|---|
| Entity | EXTERNAL ORGANIZATION |
| Column Name | cmpy__id |
| Label Name | company identifier: |
| System Name | CMPYID |
| Data Type | DEC(11, 0) |
| Attribute Definition | Business Party Identifier is a surrogate key assigned to each unique occurrence of an Individual, External Organization, and Internal Organization (Business Party). |

4.1.13 Date of Loss

| | |
|---|---|
| Entity | ARM: Renter Detail |
| Column Name | RKLSDT |
| Label Name | Date Of Loss |
| System Name | |
| Data Type | NUMERIC(8) |
| Attribute Definition | |

4.1.14 Day Phone

| | |
|---|---|
| Entity | ARM: Renter Detail |
| Column Name | RKDYPH |
| Label Name | Day Phone |
| System Name | |
| Data Type | NUMERIC(10) |
| Attribute Definition | |

4.1.15 Dollars Per Day Covered

| | |
|---|---|
| Entity | ARM: Authorization(Claim Info) |
| Column Name | AZ$PDY |
| Label Name | Dollars Per Day Covered |
| System Name | |
| Data Type | DECIMAL(5, 2) |
| Attribute Definition | |

4.1.16 External Organization Abbreviated Name

| | |
|---|---|
| Entity | EXTERNAL ORGANIZATION |
| Column Name | e__o__abbr__nam |
| Label Name | external organization abbreviated name: |
| System Name | EOABBRNAM |
| Data Type | CHAR(10) |
| Attribute Definition | External Organization Abbreviated Name is a shortened text based label associated with an organization outside of Enterprise. This name is sometimes used for accounting purposes. |

4.1.17 External Organization Identifier

| | |
|---|---|
| Entity | EXTERNAL ORGANIZATION |
| Column Name | e_o_id |
| Label Name | external organization identifier: |
| System Name | EOID |
| Data Type | DEC(11, 0) |
| Attribute Definition | The external organization identifier is a surrogate key assigned to each unique occurrence of an External Organization. Examples: body shops, vehicle manufacturers, insurance companies, leasing accounts, credit unions, dealerships, or government agencies. |

4.1.18 First Name

| | |
|---|---|
| Entity | ARM: Adjustor Master |
| Column Name | ALFSNM |
| Label Name | First Name |
| System Name | |
| Data Type | CHAR(15) |
| Attribute Definition | |

4.1.19 First Name

| | |
|---|---|
| Entity | ARM: Insured Detail |
| Column Name | IRFSNM |
| Label Name | First Name |
| System Name | |
| Data Type | CHAR(15) |
| Attribute Definition | |

4.1.20 First Name

| | |
|---|---|
| Entity | ARM: Renter Detail |
| Column Name | RKFSNM |
| Label Name | First Name |
| System Name | |
| Data Type | CHAR(15) |
| Attribute Definition | |

4.1.21 Group

| | |
|---|---|
| Entity | A4 Cross Reference |
| Column Name | grp_id |
| Label Name | Group Number |
| System Name | |
| Data Type | CHAR(2) |
| Attribute Definition | |

4.1.22 Insurance Claim Number

| | |
|---|---|
| Entity | ARM: Authorization(Claim Info) |
| Column Name | AZCLNO |
| Label Name | Insurance Claim Number |
| System Name | |
| Data Type | CHAR(20) |
| Attribute Definition | |

4.1.23 Last Name

| | |
|---|---|
| Entity | ARM: Adjustor Master |
| Column Name | ALLSNM |
| Label Name | Last Name |
| System Name | |
| Data Type | CHAR(20) |
| Attribute Definition | |

4.1.24 Last Name

| | |
|---|---|
| Entity | ARM: Insured Detail |
| Column Name | IRLSNM |
| Label Name | Last Name |
| System Name | |
| Data Type | CHAR(20) |
| Attribute Definition | |

4.1.25 Last Name

| | |
|---|---|
| Entity | ARM: Renter Detail |
| Column Name | RKLSNM |
| Label Name | Last Name |
| System Name | |
| Data Type | CHAR(20) |
| Attribute Definition | |

4.1.26 Loss Type Code

| | |
|---|---|
| Entity | AUTHORIZATION EXTENSION |
| Column Name | loss_typ_cde |
| Label Name | loss type code: |
| System Name | LOSSTYPCDE |
| Data Type | DEC(3,0) |
| Attribute Definition | The loss type code defines the different loss categories when an Insurance Company authorizes a Rental. For example: Theft, Drivable, Repairable, Non-drivable, Non-repairable, Totaled. |

4.1.27 Loss Type Description

| | |
|---|---|
| Entity | LOSS TYPE |
| Column Name | loss_typ_dsc |
| Label Name | loss type description: |
| System Name | LOSSTYPDSC |
| Data Type | CHAR(40) |
| Attribute Definition | The loss type description is a lexical definition of the loss type code which defines the different loss categories when an Insurance Company authorizes a Rental. For example: Theft, Drivable, Repairable, Non-drivable, Non-repairable, Totaled. |

4.1.28 Max $ Covered

| | |
|---|---|
| Entity | ARM: Authorization(Claim Info) |
| Column Name | AZ$MAX |
| Label Name | Max $ Covered |
| System Name | |
| Data Type | DECIMAL(9,2) |
| Attribute Definition | |

4.1.29 Note

| | |
|---|---|
| Entity | ARM: ARMS/400 Diary Notes File |
| Column Name | NENOTE |
| Label Name | NOTE |
| System Name | |
| Data Type | CHAR(50) |
| Attribute Definition | |

4.1.30 Number of Days Authorized

| | |
|---|---|
| Entity | ARM: Authorization(Claim Info) |
| Column Name | AZAUDY |
| Label Name | Number Of Days Authorized |
| System Name | |
| Data Type | DECIMAL(3) |
| Attribute Definition | |

4.1.31 Rental Location

| | |
|---|---|
| Entity | ARM: Authorization(Claim Info) |
| Column Name | AZRNLC |
| Label Name | Rental Location |
| System Name | |
| Data Type | CHAR(10) |
| Attribute Definition | |

4.1.32 Renter Email

| | |
|---|---|
| Entity | RENTER EXTENSION |
| Column Name | rentr_eml |
| Label Name | renter email: |
| System Name | RENTREML |
| Data Type | CHAR(70) |
| Attribute Definition | The email address of the renter. |

4.1.33 Renter Make/Model

| | |
|---|---|
| Entity | ARM: Renter Detail |
| Column Name | RKVHMM |
| Label Name | Renter Make/Model |
| System Name | |
| Data Type | CHAR(15) |
| Attribute Definition | |

4.1.34 Renter Vehicle Year

| | |
|---|---|
| Entity | ARM: Renter Detail |
| Column Name | RKVHYR |
| Label Name | Renter Vehicle Year |
| System Name | |
| Data Type | NUMERIC(4) |
| Attribute Definition | |

4.1.35 Renters Day Phone Extension

| | |
|---|---|
| Entity | ARM: Renter Detail |
| Column Name | RKDYEX |
| Label Name | Renters Day Phone Extension |
| System Name | |
| Data Type | NUMERIC(4) |
| Attribute Definition | |

4.1.36 Renters Night Phone

| | |
|---|---|
| Entity | ARM: Renter Detail |
| Column Name | RKNTPH |
| Label Name | Renters Night Phone |
| System Name | |
| Data Type | NUMERIC(10) |
| Attribute Definition | |

4.1.37 Renters Night Phone Extension

| | |
|---|---|
| Entity | ARM: Renter Detail |
| Column Name | RKNTEX |
| Label Name | Renters Night Phone Extension |
| System Name | |
| Data Type | NUMERIC(4) |
| Attribute Definition | |

4.1.38 Repair Facility Name

| | |
|---|---|
| Entity | ARM: Repair Detail |
| Column Name | RURFNM |
| Label Name | Repair Facility Name |
| System Name | |
| Data Type | CHAR(35) |
| Attribute Definition | |

4.1.39 Start Date

| | |
|---|---|
| Entity | ARM: Authorization(Claim Info) |
| Column Name | AZSTDT |
| Label Name | Start Date |
| System Name | |
| Data Type | NUMERIC(8) |
| Attribute Definition | |

4.1.40 State

| | |
|---|---|
| Entity | ARM: Rental Location Master |
| Column Name | LOSACD |
| Label Name | State |
| System Name | |
| Data Type | CHAR(2) |
| Attribute Definition | |

4.1.41 State

| | |
|---|---|
| Entity | ARM: Renter Detail |
| Column Name | RKSACD |
| Label Name | State |
| System Name | |
| Data Type | CHAR(2) |
| Attribute Definition | |

4.1.42 State

| | |
|---|---|
| Entity | ARM: Repair Detail |
| Column Name | RUSACD |
| Label Name | State |
| System Name | |
| Data Type | CHAR (2) |
| Attribute Definition | |

4.1.43 Status Description

| | |
|---|---|
| Entity | ARM: ARMS/400 Cross Reference Status Table File |
| Column Name | XUSTDS |
| Label Name | Status Description |
| System Name | |
| Data Type | CHAR(6) |
| Attribute Definition | |

4.1.44 Telephone Number

| | |
|---|---|
| Entity | ARM: Rental Location Master |
| Column Name | LOPHNO |
| Label Name | Telephone Number |
| System Name | |
| Data Type | NUMERIC(10) |
| Attribute Definition | |

4.1.45 Telephone Number

| | |
|---|---|
| Entity | ARM: Repair Detail |
| Column Name | RUPHNO |
| Label Name | Telephone Number |
| System Name | |
| Data Type | NUMERIC(10) |
| Attribute Definition | |

4.1.46 Vehicle Class

| | |
|---|---|
| Entity | ARM: Authorization(Claim Info) |
| Column Name | AZVHCS |
| Label Name | Vehicle Class |
| System Name | |
| Data Type | CHAR(2) |
| Attribute Definition | |

4.1.47 Vehicle Rate

| | |
|---|---|
| Entity | ARM: Authorization(Claim Info) |
| Column Name | AZVHRT |
| Label Name | Vehicle Rate |
| System Name | |
| Data Type | DECIMAL(5, 2) |
| Attribute Definition | |

4.1.48 Zip Code

| | |
|---|---|
| Entity | ARM: Rental Location Master |
| Column Name | LOZPCD |
| Label Name | Zip Code |
| System Name | |
| Data Type | CHAR(9) |
| Attribute Definition | |

4.1.49 Zip Code

| | |
|---|---|
| Entity | ARM: Repair Detail |
| Column Name | RUZPCD |
| Label Name | Zip Code |
| System Name | |
| Data Type | CHAR(9) |
| Attribute Definition | |

5. Questions and Answers

Issue Number: 419

Question: 6-23-00, When rejecting an authorization do we want a reason code? Per Jennifer—Mike, Brad and Craig is handling this.

Status: Pending

Resolution: 7-03-00—Brad Reel: In the ARMS Web V2.0 application reason codes will be collected for the following events: reject invoice, terminate authorization. Per a discussion with Randy Haselhorst, it would be worthwhile to collect a reason code for reject/cancel authorization. However, it is not critical for this release. If possible it should be incorporated.

07-03-00—Brad Reel: I am reassigning to Mike Slater to work with Neil Fitzgerald and determine whether or not to incorporate in V2.0, or wait until a later release.

Functional Design Specification

Change Customer File

Version 1.1

Change Customer File

1. Change Customer File Use Case 1.1 Brief Description

The Change Authorization use case describes how the USER could change an authorization assigned to a reservation nor an open rental.

1.2 Use Case Actors

The following actors will interact with this use case:

ADJUSTER—The USER will use this case to add or change information related to an existing Customer File on a rental within ARMS Web.

1.3 Pre-Conditions

The USER must be logged into the ARMS Web system.

The USER must have selected to change an existing Customer File.

1.4 Flow of Events

The Flow of Events will include the necessary steps to make changes to a Customer File.

Figure 119:
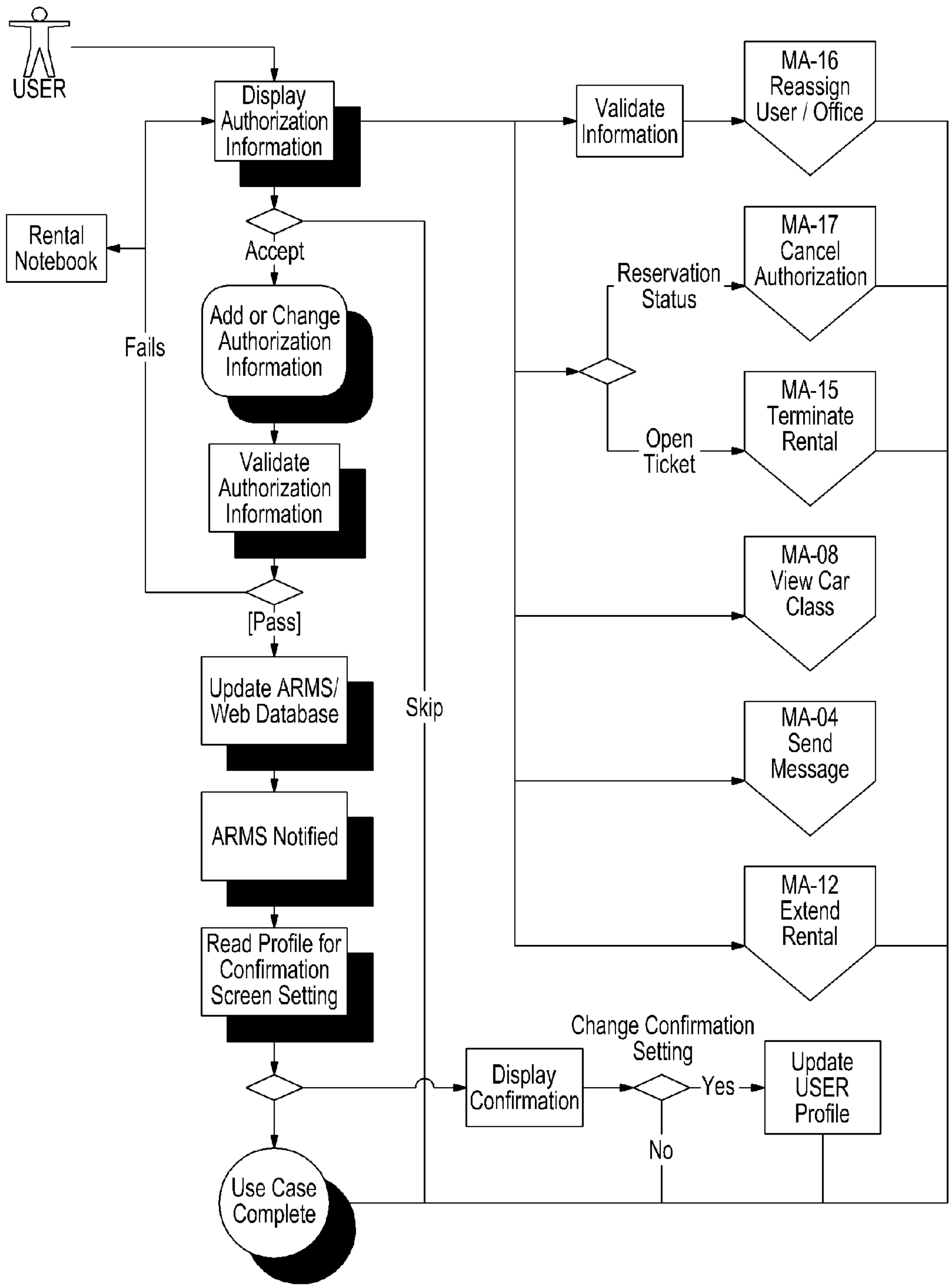

1.4.1 Activity Diagram—see FIG. 119.

1.4.2 Basic Flow

1. The USER will select a Customer File to change.
2. The SYSTEM will display the associated Customer File detail of the selected item.
3. The USER will add additional or modify existing information associated with the Customer File.
4. The SYSTEM will validate added or modified data.
5. The SYSTEM will update ARMS Web to reflect the changes.
6. The SYSTEM notifies ARMS of the changes associated with the Customer File.
7. The SYSTEM checks the profile for the confirmation screen setting.
8. This ends the use case.

1.4.3 Alternative Flows 1.4.3.1 View Rental Notebook

At step 1, the USER may choose to view the history of a rental. The USER will be able to see the last five diary notes. The USER can also select to view the transaction history or add diary notes from the Extend Rental Detail.

1.4.3.2 Validate Changes

If the USER changes or adds information, which does not pass validation, an error message will notify the USER and return them to step 1 of the Basic Flow.

If an error is discovered in the validation of the reservation/rental information submitted by the USER (Step 3 of the Basic Flow), the system would present the USER with an error message and return them to the Detailed Reservation/Rental Display. If the error is specific to a data field within the form, the field should be highlighted and the error described.

1.4.3.3 Display Confirmation

After step 6, the USER may wish to have a confirmation page displayed, indicating that some type of change has taken place. The confirmation page is completely optional; therefore, at anytime the USER wants to set their profile to bypass this screen, he/she may do so.

1.4.3.4 Update USER Profile

During the confirmation process, the USER has the option of changing their profile setting to display or hide the confirmation page. Each time the setting is changed, the USER profile must be updated to reflect the new requirements set by the USER.

1.5 Post-Conditions

If the use case was successful then the changes have been saved to the ARMS Web database and if appropriate, ARMS Web has generated notification transactions to ARMS.

If the use case was unsuccessful then the system has remained unchanged.

1.6 Special Requirements

It will be considered invalid if for a reservation, the Claim Number, Renter First Name, Renter Last Name, Claim Type, Vehicle Condition, Rental Location, Authorized Number of Days, Direct Bill Percent, and at least one Renter Telephone number have not been included.

It will be considered invalid if the customer has established Claim Number editing and the Claim Number format does not meet the requirements of the customer's Claim Number definition.

It will be considered invalid if any field identified as REQUIRED in the company/office profile is not included.

It will be considered invalid if any data entered violates the data type as specified by the ARMS Web database (i.e., alpha characters in a numeric field).

A warning will be presented to the USER if any defined limits identified in the company/office/user profile are exceeded (e.g., Maximum Number of Days Authorized). The system will allow the USER to submit the authorization from the warning.

It will be considered invalid if the selected Claim Type is 'Insured,' or 'Theft' and the reservation does not include an Authorized Rate or does not include both Policy Daily and Policy Maximum Limits (with the exception of reservations with a Direct Bill Percent of zero (0)). A Policy Daily Limit of zero (0) is an acceptable entry.

It will be considered invalid if the selected Claim Type is 'Insured,' or 'Theft' and the reservation includes a Policy Maximum Limit but does not include an Authorized Rate or Policy Daily Limit (with the exception of reservations with a Direct Bill Percent of zero (0)). A Policy Daily Limit of zero (0) is an acceptable entry.

It will be considered invalid if the selected Claim Type is 'Claimant' and Policy Limits (Daily or Maximum) have been included.

It will be considered invalid if the Authorized Number of Days is included and is less than zero (0).

It will be considered invalid if the Direct Bill Percent is greater than zero (0) and the Authorized Number of Days is zero.

It will be considered invalid if the Direct Bill Percent is less than zero (0).

It will be considered invalid if the Direct Bill Percent is greater than one hundred (100).

It will be considered invalid if the Labor Hours are less than zero (0).

It will be considered invalid if the Date of Loss is greater than the current date.

It will be considered invalid if the first three digits (i.e., area code) of any U.S. or Canadian telephone number meet the criteria below:

0XX

1XX the second and third digits equal (e.g., 800, 877, 888, etc.) Where X equals any digit 0 through 9.

It will be considered invalid if a U.S. or Canadian telephone number does not consist of 10 digits.

It will be considered invalid if a U.S. postal code that does not consist of 5 or 9 digits.

It will be considered invalid if the a Canadian postal code does not consist of 6 alphanumeric characters in the format AXAXAX where A is an alpha character and X is a digit between 0 and 9.

It will be considered invalid if an E-mail address is included that does not include an '@' character.

It will be considered invalid if the Send e-mail Confirmation to Renter flag is set to true and the Renter e-mail address is not included.

If the customer file is in reservation status, the screen will show a cancel button for the USER to cancel the authorization if desired.

If the customer file is in open ticket status, the screen will show the set last day button for the USER to terminate the rental if desired.

1.7 Extension Points 1.7.1 MA-04 Send a Message

The Send Message will be used to allow the USER to capture messages and diary notes associated with extending a rental. The USER can elect to either have the message sent to the Enterprise rental branch location responsible for the reservation/authorization, or to store the note in the ARMS Web system without sending the message to Enterprise. All MESSAGES and DIARY NOTES captured must be related to a specific reservation/authorization.

1.7.2 MA-16 Reassign User or Office (the Transfer File Button Invokes this Use Case)

After the extend rental detail is displayed, the USER may choose to change the current office/USER. First, the USER would select to change the current office/USER. Second, the system would display a list of authorized offices/USERs. Third, the USER would select a new office/USER.

1.7.3 MA-15 Terminate a Rental (Set Last Day)

After the extend rental detail is displayed, the USER may choose to terminate the rental. If termination is selected, the USER must enter a reason for the termination of the rental. Termination means the insurance company is no longer willing to pay for the rental. This function (button) is only available for an open ticket. For reservation status, the USER should see the Cancel button.

1.7.4 MA-17 Cancel Authorization

Before step 5 of the Basic Flow, the USER should have the capability to cancel the authorization. Before the USER has made changes that have been updated in the database and sent to ARMS, the Cancel Authorization function (button) should be available for reservation status. However, the USER cannot perform the Cancel function on an open ticket. For an open ticket, the Termination (Set Last Day) function (button) is available.

1.7.5 MA-08 View Car Class

The View Car Class use case will be used to allow the USER to view details about and select a car class to apply to a reservation. Details will include the average number of passengers and luggage items that can be served by a vehicle in the specific car class. The car class selected by the USER should be applied to the reservation.

2. Screen Design

A definition of the screen layout(s), screen data fields, and screen functions that are used to implement the flows identified above. More than one screen may be used to implement support for the use case flow.

2.1 Change Rental Detail

Figure 120A:
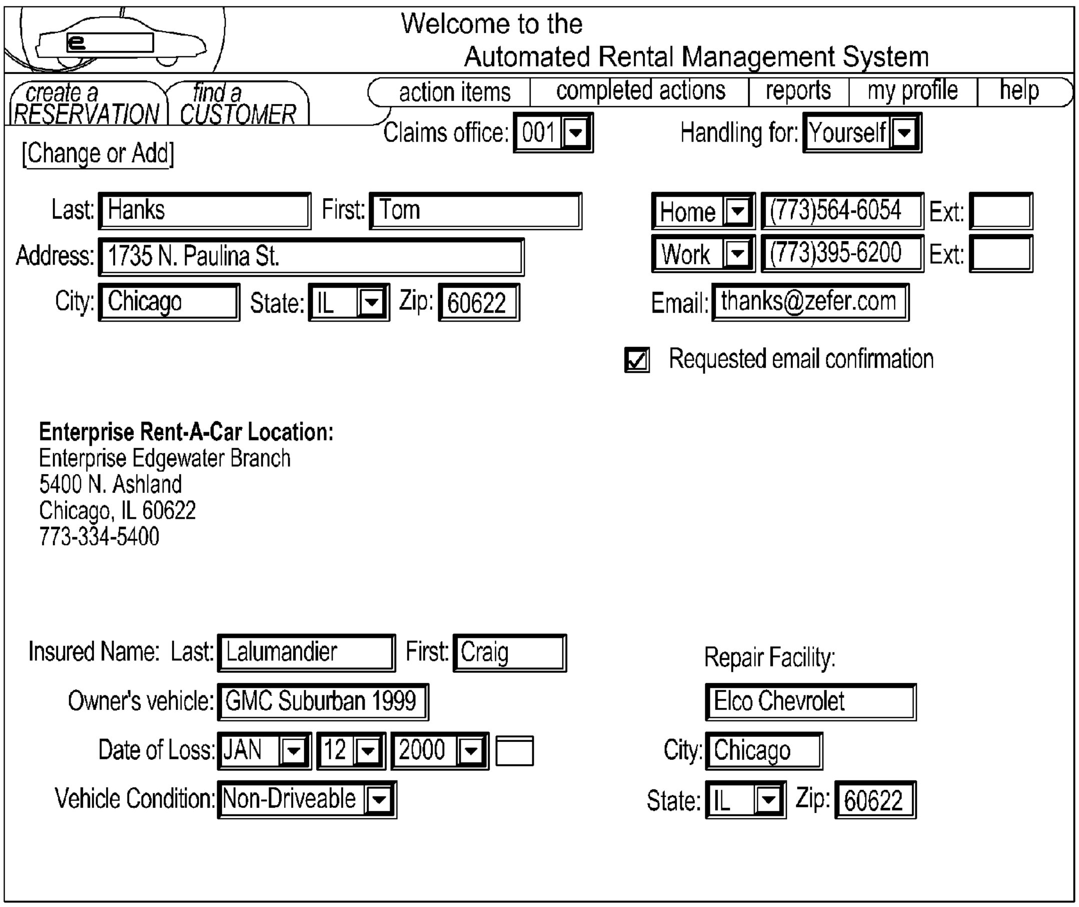

This screen (see FIGS. 120(*a*) and (*b*)) will allow the USER to work the currently selected authorization request. The USER may set the authorization amounts and policy coverage limits or may assign the request to another adjuster.

2.1.1 Screen Layout—Change Rental Detail—see FIGS. 120(*a*) and (*b*)

2.1.2 Change Rental Detail

| Screen Label | Type | Size | Screen Field Name | Data Field Name | Screen Specific Rule |
|---|---|---|---|---|---|
| Additional Charges | Output | 15 | Additional Charges | | |
| Handling For: | Output | 30 | Handling for Adjuster's Name | First Name + Last Name | Last Name + First Name |
| Note to Self Only | Input | 50 | Message | NOTE | |
| Messages: | Output | 8 | Message Creation Date | Add Date | N/A. |
| Note to Enterprise: | Input | 50 | Message Text | NOTE | N/A. |
| | Output | 50 | Message Text | NOTE | N/A. |
| Claim Number: | Output | 11 | Claim Number | Insurance Claim Number | |
| Days Authorized to Date: | Output | 2 | Number of Days Authorized | Number Of Days Authorized | N/A. |
| ____ additional authorized days | Output | 2 | Number of Days to Extend | Number of Days to Extend | |
| Policy Limits | List Box | 5 | Policy Maximum and Dollars per day | Max $ Covered + Dollars Per Day Covered | |
| | Output | 30 | Rental Location Branch Name | Rental Location | |
| days @: | List Box | 6 | Rental Location Rate | Vehicle Rate | N/A. |
| Date of Rental | Output | 10 | Rental Start Date | Start Date | N/A. |
| Insured Name: | Output | 30 | Insured's Name | First Name + Last Name | |
| | Output | 30 | Rental Location Address | Address Line + Address Line2 | N/A. |
| | Output | 25 | Rental Location City Name | City | N/A. |
| | Output | 10 | Rental Location Postal/Zip Code | Zip Code | N/A. |
| | Output | 3 | Rental Location State/ Province Code | State | N/A. |
| | Output | 13 | Rental Location Telephone Number | Telephone Number | N/A. |
| Date of Loss: | Output | 10 | Date of Loss | Date of Loss | |
| | Output | 20 | Renter City Name | City | |
| | Output | 10 | Rental Postal/Zip Code | Zip Code | |
| | Output | 3 | Renter State/ Province Code | State | |
| | Output | 30 | Renter Street Address | Address Line | |
| Home: | Output | 16 | Renter's Home Phone | Renters Night Phone + Renters Night Phone Extension | Not editable if ticket is Open. |
| | Output | 30 | Renter's Name | First Name + Last Name | Will not be editable if ticket is open. First Name + Last Name |
| Renter Information: | Output | 30 | Renter's Name | First Name + Last Name | N/A. |

-continued

| Screen Label | Type | Size | Screen Field Name | Data Field Name | Screen Specific Rule |
|---|---|---|---|---|---|
| Work Phone: | Output | 16 | Renter's Work Phone | Day Phone + Renters Day Phone Extension | Will not be able to edit if ticket is Open. |
| Owner's vehicle: | Output | 4 | Vehicle Year, Make and Model | Renter Make/Model + Renter Vehicle Year | |
| Repair Facility: | Output | 20 | Body Shop Name | Repair Facility Name | |
| | Input | 16 | Body Shop Phone Number | Telephone Number | |
| | Output | 15 | Repair Facility City | City | |
| | Output | 3 | Repair Facility State | State | |
| | Output | 7 | Repair Facility zip code | Zip Code | |
| Last Day authorized | Output | 10 | Date rental is authorized through | CALCULATED | Calculated field. Populated with an Open Ticket only. |
| Charges to Date: | Output | 10 | Total Charges | CALCULATED | |
| Renter Type | Output | 10 | Claim type | claim type description | |
| Claims Office: | Output | 3 | Office Id | external organization abbreviated name | N/A. |
| Vehicle Condition | Output | 15 | Type of Loss | loss type description | |
| Renter Email: | Output | 20 | Renter's Email | renter email | Will not be able to edit if ticket is Open. |

2.1.3 Screen Function Definition

This section includes the definitions for all functions that can be performed within the screen. This includes operations invoked by button clicks, specific shortcut keystrokes, or other actor activity.

2.1.3.1 Skip

When clicked, the USER will be taken out of the use case without changing the current status of the request. Any changes made by clicking Change or Add and keying data in the bottom section will be saved.

2.1.3.2 Process

When clicked, the system will validate the input and accept the changes made to the customer file. The arms web database will be updated and the data will be sent to the arms system. The use case will then end and the USER will return to the process from which they came.

2.1.3.3 Notebook

When clicked, the USER will be taken to the Note Book section at the bottom of the screen to view all messages for this rental.

2.1.3.4 Set Last Day

When clicked, the system will terminate the rental. The USER will be prompted to enter a termination date for this rental. This coincides with the use case MA-15-Terminate Rental.

2.1.3.5 Transfer File

When clicked, the USER will be taken to the Transfer File screen. This screen allows the USER to change the office or adjuster currently assigned to the customer file. The required information in the Extend Rental/Customer File will be passed to the Transfer File screen. Upon completion of the transfer, the USER will then be returned to the next action item or the profiled start page, depending on the screen from which the USER began.

2.1.3.6 Change or Add

When clicked, the system will refresh the current screen and make all editable fields in the bottom section (outside the gray box area) input capable. The changes on the top of the screen will not be lost.

2.1.3.7 Top of Page

When clicked, the USER will be taken to the top of the current page.

2.1.3.8 View Car Class

When clicked, the USER will be taken to the View Car Class Use Case. No changes will be lost. Once the USER is finished with this use case, the USER will return to the Extend Rental Use Case.

2.1.3.9 Extend Rental (Checkbox)

When clicked and the process button is clicked, the system will validate the input and accept the extension AND any other changes made to the customer file. The arms web database will be updated and the data will be sent to the arms system. The use case will then end and the USER will proceed to the next action item. (If unchecked and the process button is clicked, only the changes to the screen will be saved. The extension will NOT be executed.)

2.1.3.10 Last Action Message

After each action item in the USER's list has been completed, upon arriving at the next item there will be a confirmation message at the top of the screen. This message will be a hyperlink describing the last completed action. If the USER clicks on this link, the system will open the customer file, which will reflect all of the current information for the rental. The USER is then free to make additional changes or to simply view the file.

3. Application Operations

4. Data Fields 4.1 Data Field Definition

This section includes a definition of all data fields included in the functional specification.

4.1.1 Add Date

| | |
|---|---|
| Entity | ARM: ARMS/400 Diary Notes File |
| Column Name | NEADDT |
| Label Name | Add Date |
| System Name | |
| Data Type | NUMERIC(8) |
| Attribute Definition | |

4.1.2 Address Line

| | |
|---|---|
| Entity | ARM: Renter Location Master |
| Column Name | LOADL1 |
| Label Name | |
| System Name | |
| Data Type | CHAR(30) |
| Attribute Definition | |

4.1.3 Address Line

| | |
|---|---|
| Entity | ARM: Renter Detail |
| Column Name | RKADL1 |
| Label Name | Address Line |
| System Name | |
| Data Type | CHAR(30) |
| Attribute Definition | |

4.1.4 Address Line2

| | |
|---|---|
| Entity | ARM: Rental Location Master |
| Column Name | LOADL2 |
| Label Name | Address Line |
| System Name | |
| Data Type | CHAR(30) |
| Attribute Definition | |

4.1.5 Branch

| | |
|---|---|
| Entity | ARM: Rental Location Master |
| Column Name | Branch |
| Label Name | Branch: |
| System Name | |
| Data Type | CHAR(2) |
| Attribute Definition | |

4.1.6 City

| | |
|---|---|
| Entity | ARM: Rental Location Master |
| Column Name | LOCYNM |
| Label Name | City |
| System Name | |
| Data Type | CHAR(20) |
| Attribute Definition | |

4.1.7 City

| | |
|---|---|
| Entity | ARM: Renter Detail |
| Column Name | RKCYNM |
| Label Name | City |
| System Name | |
| Data Type | CHAR(20) |
| Attribute Definition | |

4.1.8 City

| | |
|---|---|
| Entity | ARM: Repair Detail |
| Column Name | RUCYNM |
| Label Name | City |
| System Name | |
| Data Type | CHAR(20) |
| Attribute Definition | |

4.1.9 Claim Type Code

| | |
|---|---|
| Entity | AUTHORIZATION EXTENSION |
| Column Name | clm__typ__cde |
| Label Name | claim type code: |
| System Name | CLMTYPCDE |
| Data Type | DEC(3,0) |
| Attribute Definition | The claim type code defines the different Authorization claim types. For example: Insured, Claimant, Uninsured Motorist, etc. |

4.1.10 Claim Type Description

| | |
|---|---|
| Entity | CLAIM TYPE |
| Column Name | clm__typ__dsc |
| Label Name | claim type description: |
| System Name | CLMTYPDSC |
| Data Type | CHAR(40) |
| Attribute Definition | The claim type description is a lexical definition of the claim type code which defines the different Authorization claim types. For example: Insured, Claimant, Uninsured Motorist, etc. |

4.1.11 Company Identifier

| | |
|---|---|
| Entity | EXTERNAL ORGANIZATION |
| Column Name | cmpy__id |
| Label Name | company identifier: |
| System Name | CMPYID |
| Data Type | DEC(11,0) |
| Attribute Definition | Business Party Identifier is a surrogate key assigned to each unique occurrence of an Individual, External Organization, and Internal Organization (Business Party). |

4.1.12 Date of Loss

| | |
|---|---|
| Entity | ARM: Renter Detail |
| Column Name | RKLSDT |
| Label Name | Date Of Loss |
| System Name | |
| Data Type | NUMERIC(8) |
| Attribute Definition | |

4.1.13 Day Phone

| | |
|---|---|
| Entity | ARM: Renter Detail |
| Column Name | RKDYPH |
| Label Name | Day Phone |
| System Name | |
| Data Type | NUMERIC(10) |
| Attribute Definition | |

4.1.14 External Organization Abbreviated Name

| | |
|---|---|
| Entity | EXTERNAL ORGANIZATION |
| Column Name | e__o__abbr__nam |
| Label Name | external organization abbreviated name: |
| System Name | EOABBRNAM |
| Data Type | CHAR(10) |
| Attribute Definition | External Organization Abbreviated Name is a shortened text based label associated with an organization outside of Enterprise. This name is sometimes used for accounting purposes. |

4.1.15 External Organization Identifier

| | |
|---|---|
| Entity | EXTERNAL ORGANIZATION |
| Column Name | e_o_id |
| Label Name | external organization identifier: |
| System Name | EOID |
| Data Type | DEC(11,0) |
| Attribute Definition | The external organization identifier is a surrogate key assigned to each unique occurrence of an External Organization. Examples: body shops, vehicle manufacturers, insurance companies, leasing accounts, credit unions, dealerships, or government agencies. |

4.1.16 First Name

| | |
|---|---|
| Entity | ARM: Adjustor Master |
| Column Name | ALFSNM |
| Label Name | First Name |
| System Name | |
| Data Type | CHAR(15) |
| Attribute Definition | |

4.1.17 First Name

| | |
|---|---|
| Entity | ARM: Insured Detail |
| Column Name | IRFSNM |
| Label Name | First Name |
| System Name | |
| Data Type | CHAR(15) |
| Attribute Definition | |

4.1.18 First Name

| | |
|---|---|
| Entity | ARM: Renter Detail |
| Column Name | RKFSNM |
| Label Name | First Name |
| System Name | |
| Data Type | CHAR(15) |
| Attribute Definition | |

4.1.19 Group

| | |
|---|---|
| Entity | ARM: Rental Location Master |
| Column Name | Group |
| Label Name | Group Number |
| System Name | |
| Data Type | CHAR(2) |
| Attribute Definition | |

4.1.20 Insurance Claim Number

| | |
|---|---|
| Entity | ARM: Authorization(Claim Info) |
| Column Name | AZCLNO |
| Label Name | Insurance Claim Number |
| System Name | |
| Data Type | CHAR(20) |
| Attribute Definition | |

4.1.21 Last Name

| | |
|---|---|
| Entity | ARM: Adjustor Master |
| Column Name | ALLSNM |
| Label Name | Last Name |
| System Name | |
| Data Type | CHAR(20) |
| Attribute Definition | |

4.1.22 Last Name

| | |
|---|---|
| Entity | ARM: Insured Detail |
| Column Name | IRLSNM |
| Label Name | Last Name |
| System Name | |
| Data Type | CHAR(20) |
| Attribute Definition | |

4.1.23 Last Name

| | |
|---|---|
| Entity | ARM: Renter Detail |
| Column Name | RKLSNM |
| Label Name | Last Name |
| System Name | |
| Data Type | CHAR(20) |
| Attribute Definition | |

4.1.24 Loss Type Code

| | |
|---|---|
| Entity | AUTHORIZATION EXTENSION |
| Column Name | loss_typ_cde |
| Label Name | loss type code: |
| System Name | LOSSTYPCDE |
| Data Type | DEC(3,0) |
| Attribute Definition | The loss type code defines the different loss categories when an Insurance Company authorizes a Rental. For example: Theft, Drivable, Repairable, Non-drivable, Non-repairable, Totaled. |

4.1.25 Loss Type Description

| | |
|---|---|
| Entity | LOSS TYPE |
| Column Name | loss_typ_dsc |
| Label Name | loss type description: |
| System Name | LOSSTYPDSC |
| Data Type | CHAR(40) |
| Attribute Definition | The loss type description is a lexical definition of the loss type code which defines the different loss categories when an Insurance Company authorizes a Rental. For example: Theft, Drivable, Repairable, Non-drivable, Non-repairable, Totaled. |

4.1.26 Message ECARS Indicator

| | |
|---|---|
| Entity | AUTHORIZATION MESSAGE |
| Column Name | msg_ecars_ind |
| Label Name | message ecars indicator: |
| System Name | MSGECARIND |
| Data Type | CHAR(1) |
| Attribute Definition | The message ecars indicator indicates whether the message is sent/received from the ecars system. |

4.1.27 Note

| | |
|---|---|
| Entity | ARM: ARMS/400 Diary Notes File |
| Column Name | NENOTE |
| Label Name | NOTE |
| System Name | |
| Data Type | CHAR(50) |
| Attribute Definition | |

4.1.28 Number of Days Authorized

| | |
|---|---|
| Entity | ARM: Authorization(Claim Info) |
| Column Name | AZAUDY |
| Label Name | Number Of Days Authorized |
| System Name | |
| Data Type | DECIMAL(3) |
| Attribute Definition | |

4.1.29 Rate Charged

| | |
|---|---|
| Entity | ARM: Authorization(Claim Info) |
| Column Name | AZRTCH |
| Label Name | Rate Charged |
| System Name | |
| Data Type | DECIMAL(5, 2) |
| Attribute Definition | |

4.1.30 Rental Location

| | |
|---|---|
| Entity | ARM: Authorization(Claim Info) |
| Column Name | AZRNLC |
| Label Name | Rental Location |
| System Name | |
| Data Type | CHAR(10) |
| Attribute Definition | |

4.1.31 Renter Email

| | |
|---|---|
| Entity | RENTER EXTENSION |
| Column Name | rentr_eml |
| Label Name | renter email: |
| System Name | RENTREML |
| Data Type | CHAR(70) |
| Attribute Definition | The email address of the renter. |

4.1.32 Renter Make/Model

| | |
|---|---|
| Entity | ARM: Renter Detail |
| Column Name | RKVHMM |
| Label Name | Renter Make/Model |
| System Name | |
| Data Type | CHAR(15) |
| Attribute Definition | |

4.1.33 Renter Vehicle Year

| | |
|---|---|
| Entity | ARM: Renter Detail |
| Column Name | RKVHYR |
| Label Name | Renter Vehicle Year |
| System Name | |
| Data Type | NUMERIC(4) |
| Attribute Definition | |

4.1.34 Renters Day Phone Extension

| | |
|---|---|
| Entity | ARM: Renter Detail |
| Column Name | RKDYEX |
| Label Name | Renters Day Phone Extension |
| System Name | |
| Data Type | NUMERIC(4) |
| Attribute Definition | |

4.1.35 Renters Night Phone

| | |
|---|---|
| Entity | ARM: Renter Detail |
| Column Name | RKNTPH |
| Label Name | Renters Night Phone |
| System Name | |
| Data Type | NUMERIC(10) |
| Attribute Definition | |

4.1.36 Renters Night Phone Extension

| | |
|---|---|
| Entity | ARM: Renter Detail |
| Column Name | RKNTEX |
| Label Name | Renters Night Phone Extension |
| System Name | |
| Data Type | NUMERIC(4) |
| Attribute Definition | |

4.1.37 Repair Facility Name

| | |
|---|---|
| Entity | ARM: Repair Detail |
| Column Name | RURFNM |
| Label Name | Repair Facility Name |
| System Name | |
| Data Type | CHAR(35) |
| Attribute Definition | |

4.1.38 Standard Message Description

| | |
|---|---|
| Entity | STANDARD MESSAGE |
| Column Name | std_msg_dsc |
| Label Name | standard message description: |
| System Name | STDMSGDSC |
| Data Type | CHAR(50) |
| Attribute Definition | The standard message description is a lexical definition for standard message code which defines a predefined message which is applicable to specific activity type codes. For example: “Authorization confirmed on &Date with Reservation Number &Resnumber” |

4.1.39 Start Date

| | |
|---|---|
| Entity | ARM: Authorization(Claim Info) |
| Column Name | AZSTDT |
| Label Name | Start Date |
| System Name | |
| Data Type | NUMERIC(8) |
| Attribute Definition | |

4.1.40 State

| | |
|---|---|
| Entity | ARM: Rental Location Master |
| Column Name | LOSACD |
| Label Name | State |
| System Name | |
| Data Type | CHAR(2) |
| Attribute Definition | |

4.1.41 State

| | |
|---|---|
| Entity | ARM: Renter Detail |
| Column Name | RKSACD |
| Label Name | State |
| System Name | |
| Data Type | CHAR(2) |
| Attribute Definition | |

4.1.42 State

| | |
|---|---|
| Entity | ARM: Repair Detail |
| Column Name | RUSACD |
| Label Name | State |
| System Name | |
| Data Type | CHAR(2) |
| Attribute Definition | |

4.1.43 Status Description

| | |
|---|---|
| Entity | ARM: ARMS/400 Cross Reference Status Table File |
| Column Name | XUSTDS |
| Label Name | Status Description |
| System Name | |
| Data Type | CHAR(6) |
| Attribute Definition | |

4.1.44 Telephone Number

| | |
|---|---|
| Entity | ARM: Rental Location Master |
| Column Name | LOPHNO |
| Label Name | Telephone Number |
| System Name | |
| Data Type | NUMERIC(10) |
| Attribute Definition | |

4.1.45 Telephone Number

| | |
|---|---|
| Entity | ARM: Repair Detail |
| Column Name | RUPHNO |
| Label Name | Telephone Number |
| System Name | |
| Data Type | NUMERIC(10) |
| Attribute Definition | |

4.1.46 Vehicle Class

| | |
|---|---|
| Entity | ARM: Authorization(Claim Info) |
| Column Name | AZVHCS |
| Label Name | Vehicle Class |
| System Name | |
| Data Type | CHAR(2) |
| Attribute Definition | |

4.1.47 Vehicle Rate

| | |
|---|---|
| Entity | ARM: Authorization(Claim Info) |
| Column Name | AZVHRT |
| Label Name | Vehicle Rate |
| System Name | |
| Data Type | DECIMAL(5, 2) |
| Attribute Definition | |

4.1.48 Zip Code

| | |
|---|---|
| Entity | ARM: Rental Location Master |
| Column Name | LOZPCD |
| Label Name | Zip Code |
| System Name | |
| Data Type | CHAR(9) |
| Attribute Definition | |

4.1.49 Zip Code

| | |
|---|---|
| Entity | ARM: Repair Detail |
| Column Name | RUZPCD |
| Label Name | Zip Code |
| System Name | |
| Data Type | CHAR(9) |
| Attribute Definition | |

4.1.50 Zip Code

| | |
|---|---|
| Entity | ARM: Repair Detail |
| Column Name | RUZPCD |
| Label Name | Zip Code |
| System Name | |
| Data Type | CHAR(9) |
| Attribute Definition | |

5. Questions and Answers

Issue Number: 368

Question: Can the Adjuster shorten the number of days authorized without terminating the rental.

Status: Closed—Resolved

Resolution: 5-3-00, Brian Weingart, Kim De Valiance—No. After a ticket is open and has been authorized, the only modification allowed to the number of days authorized comes in the form of a termination. For example, if an adjuster sent us ten days and on the fifth day, decided to only give us a total of six (thereby removing the authorization for four days) the adjuster would have to terminate that rental as of the sixth day.

Issue Number: 386

Question: Should the Date of Loss be editable in Change Authorization or does it depend on the state of the reservation/ticket.

Status: Closed—Resolved

Resolution: 6-23-00, Brian Weingart, —Since Date of Loss is considered Insurance company information, the adjuster owns this information. The Adjuster can change this in either a reservation or open ticket status. This is editable until the rental is considered closed.

Functional Design Specification

Terminate Rental

Version 1.0

Terminate Rental

1. Terminate Rental Use Case 1.1 Brief Description

The Terminate Rental use case describes how the USER would terminate a rental. This use case will allow the USER to inform Enterprise of the last day that the ADJUSTER will pay for a rental. In most cases, by providing a date in the future, Enterprise will receive an extension through the last day.

1.2 Use Case Actors

The following actors will interact with this use case:

ADJUSTER—The USER will use this case to terminate a rental. PS 1.3 Pre-Conditions The USER must be logged into the ARMS Web system.

The USER must have the authority to terminate an open rental.

The USER must have selected an authorized rental.

1.4 Flow of Events

The Flow of Events will include the necessary steps to terminate a rental.

Figure 121:
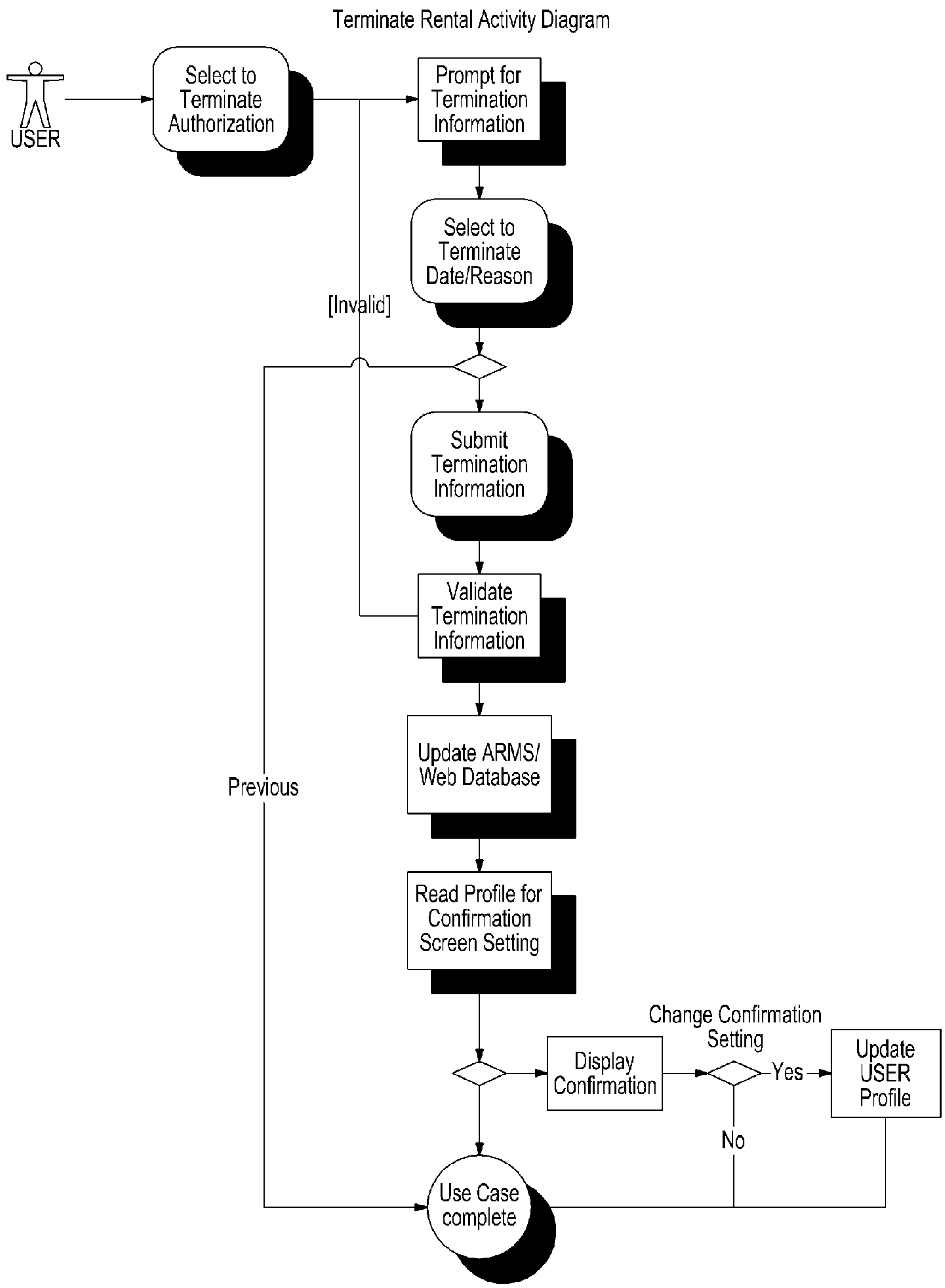

14.1 Activity Diagram—see FIG. 121.

14.2 Basic Flow

1. The USER selects to terminate an authorization.
2. The system prompts the USER for the termination information.
3. The USER enters the termination date and reason/comments.
4. The USER submits the termination information.
5. The system will validate the termination information.
6. The system updates the ARMS Web database.
7. The system reads the USER profile for the confirmation settings.
8. This ends the use case.

1.4.3 Alternative Flows 1.4.3.1 Previous

After step 3, the USER can abandon all changes, which result in the system state remaining unchanged. After clicking the "Previous" button, the USER will be returned to the screen from which they came.

1.4.3.2 Additional Comments

When terminating a rental, the USER must select a reason from the drop-down box to explain why the termination is taking place. As well, if further explanation is desired there is a comment box in which the USER may enter additional comments for more clarification. This section is optional, unless the USER selects "Other" from the reason code drop-down box. In this case, the comment box must be used.

1.4.3.3 Display Confirmation

After step 7, the USER may wish to have a confirmation page displayed, indicating that some type of change has taken place. The confirmation page is completely optional; therefore, at anytime the USER wants to set their profile to bypass this screen, he/she may do so.

1.4.3.4 Update User Profile

During the confirmation process, the USER has the option of changing their profile setting to display or hide the confirmation page. Each time the setting is changed, the USER profile must be updated to reflect the new requirements set by the USER.

1.5 Post-Conditions

If the use case was successful then the changes will go into effect immediately and write a transaction record to pass to ARMS indicating that there was a change on the rental. If the renter's email address was entered, a system-generated message will notify the renter.

If the use case was unsuccessful then the system will remain unchanged.

1.6 Special Requirements 1.6.1 The termination date must be greater than or equal to the current date or the last day authorized. There is a business rule that ensures that an adjuster cannot take away already used rental days.

| Current Date | Authorization Date | Termination Date |
|---|---|---|
| 6/20 | 6/25 | >=6/20 |
| 6/20 | 6/10 | >=6/10 |

1.6.2 If the USER extends an authorization that has been terminated, the termination information is considered invalid.

1.6.3 It is mandatory that a USER select a termination reason from the drop-down list. If the USER selects "Other" from the drop-down list, a comment about the termination must be supplied.

1.7 Extension Points

None.

2. Screen Design

A definition of the screen layout(s), screen data fields, and screen functions that are used to implement the flows identified above. More than one screen may be used to implement support for the use case flow.

2.1 Terminate Rental

This screen (see FIG. 122) will allow the user enter the information about terminating a rental.

Figure 122:
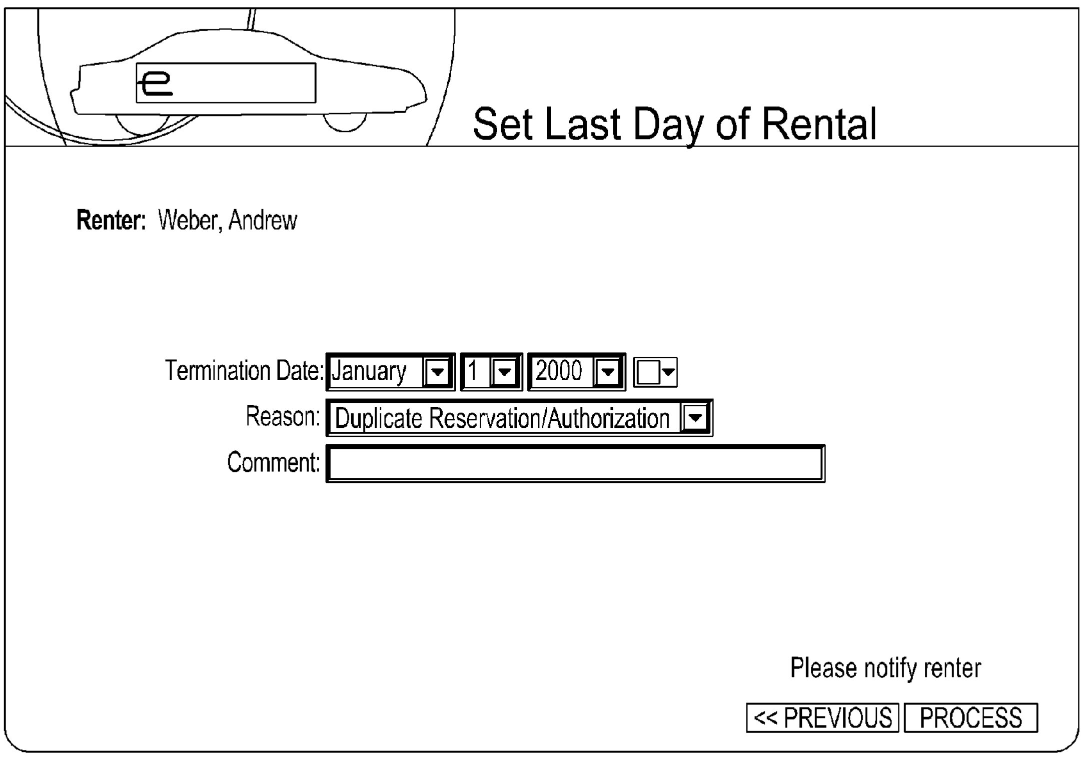

2.1.1 Screen Layout—Terminate Rental—see FIG. 122

2.1.2 Terminate Rental

| Screen Label | Type | Size | Screen Field Name | Data Field | Screen Specific Rule |
|---|---|---|---|---|---|
| Comment: | Input | 50 | Message Text | NOTE | Required field if Reason selected is "other" |
| Reason: | List Box | 30 | Reason | NOTE | Required Field |
| Termination Date | List Box | 10 | Termination Date | Termination Date | The date entered must be the current date or later. This is the date that the insurance company will no longer pay for the rental. /This field should have a calendar control associated with it to allow the user to select the date of loss from a calend. |

-continued

| Screen Label | Type | Size | Screen Field Name | Data Field | Screen Specific Rule |
|---|---|---|---|---|---|
| Renter: | Output | 30 | Renter's Name | First Name + Last Name | Renter's Last Name + Renter's First Name |

2.1.3 Screen Function Definition

This section includes the definitions for all functions that can be performed within the screen. This includes operations invoked by button clicks, specific shortcut keystrokes, or other actor activity.

2.1.3.1 Previous

Will return the user to the detail screen from which they came. The system and the information on the detail screen will remain unchanged.

2.1.3.2 Process

When clicked, the system will complete the termination of the rental and notify the required parties.

2.1.3.2.1 The user must have selected a valid termination date that is greater than the current date.

3. Application Operations

4. Data Fields 4.1 Data Field Definition

This section includes a definition of all data fields included in the functional specification.

4.1.1 Company Id

| | |
|---|---|
| Entity | ARM: ARMS/400 Internal Error Log File |
| Column Name | E4CUID |
| Label Name | Company Id |
| System Name | |
| Data Type | CHAR(5) |
| Attribute Definition | |

4.1.2 External Organization Abbreviated Name

| | |
|---|---|
| Entity | EXTERNAL ORGANIZATION |
| Column Name | e__o__abbr__nam |
| Label Name | external organization abbreviated name: |
| System Name | EOABBRNAM |
| Data Type | CHAR(10) |
| Attribute Definition | External Organization Abbreviated Name is a shortened text based label associated with an organization outside of Enterprise. This name is sometimes used for accounting purposes. |

4.1.3 External Organization Identifier

| | |
|---|---|
| Entity | EXTERNAL ORGANIZATION |
| Column Name | e__o__id |
| Label Name | external organization identifier: |
| System Name | EOID |
| Data Type | DEC(11,0) |
| Attribute Definition | The external organization identifier is a surrogate key assigned to each unique occurrence of an External Organization. Examples: body shops, vehicle manufacturers, insurance companies, leasing accounts, credit unions, dealerships, or government agencies. |

4.1.4 First Name

| | |
|---|---|
| Entity | ARM: Adjustor Master |
| Column Name | ALFSNM |
| Label Name | First Name |
| System Name | |
| Data Type | CHAR(15) |
| Attribute Definition | |

4.1.5 First Name

| | |
|---|---|
| Entity | ARM: Renter Detail |
| Column Name | RKFSNM |
| Label Name | First Name |
| System Name | |
| Data Type | CHAR(15) |
| Attribute Definition | |

4.1.6 Insurance Claim Number

| | |
|---|---|
| Entity | ARM: Authorization(Claim Info) |
| Column Name | AZCLNO |
| Label Name | Insurance Claim Number |
| System Name | |
| Data Type | CHAR(20) |
| Attribute Definition | |

4.1.7 Last Name

| | |
|---|---|
| Entity | ARM: Adjustor Master |
| Column Name | ALLSNM |
| Label Name | Last Name |
| System Name | |
| Data Type | CHAR(20) |
| Attribute Definition | |

4.1.8 Last Name

| | |
|---|---|
| Entity | ARM: Renter Detail |
| Column Name | RKLSNM |
| Label Name | Last Name |
| System Name | |
| Data Type | CHAR(20) |
| Attribute Definition | |

4.1.9 Note

| | |
|---|---|
| Entity | ARM: ARMS/400 Diary Notes File |
| Column Name | NENOTE |
| Label Name | NOTE |
| System Name | |
| Data Type | CHAR(50) |
| Attribute Definition | |

4.1.10 Renter Email

| | |
|---|---|
| Entity | RENTER EXTENSION |
| Column Name | rentr_eml |
| Label Name | renter email: |
| System Name | RENTREML |
| Data Type | CHAR(70) |
| Attribute Definition | The email address of the renter. |

4.1.11 Termination Date

| | |
|---|---|
| Entity | ARM: Authorization(Claim Info) |
| Column Name | AZTMDT |
| Label Name | Termination Date |
| System Name | |
| Data Type | NUMERIC(8) |
| Attribute Definition | |

5. Questions and Answers

Issue Number: 373

Question: How is the renter currently notified of a termination of the rental? Are they usually notified by the time the rental is terminated? How should this be represented on the screen? Should the checkbox say to notify the renter or that the renter has already been notified?

Status: Pending

Resolution:

Functional Design Specification
Transfer File
Version 0.6

Transfer File

1. Transfer File Use Case 1.1 Brief Description

The Transfer File use case describes how the user would assign one of their action items to another user/office.

1.2 Use Case Actors

The following actors will interact with this use case. Each of the actors can be defined generically as USER. The USER will use this use case to reassign action items to other USERS and/or offices.

ADJUSTER

PROCESSOR 1.3 Pre-Conditions

The USER must be logged into the ARMS Web system.

The USER must have the ability to reassign action items.

The USER must have access to a customer file to reassign.

The customer file must be in an open, reservation, or unauthorized state.

1.4 Flow of Events

The Flow of Events will include the necessary steps for a USER to reassign action items.

Figure 123:
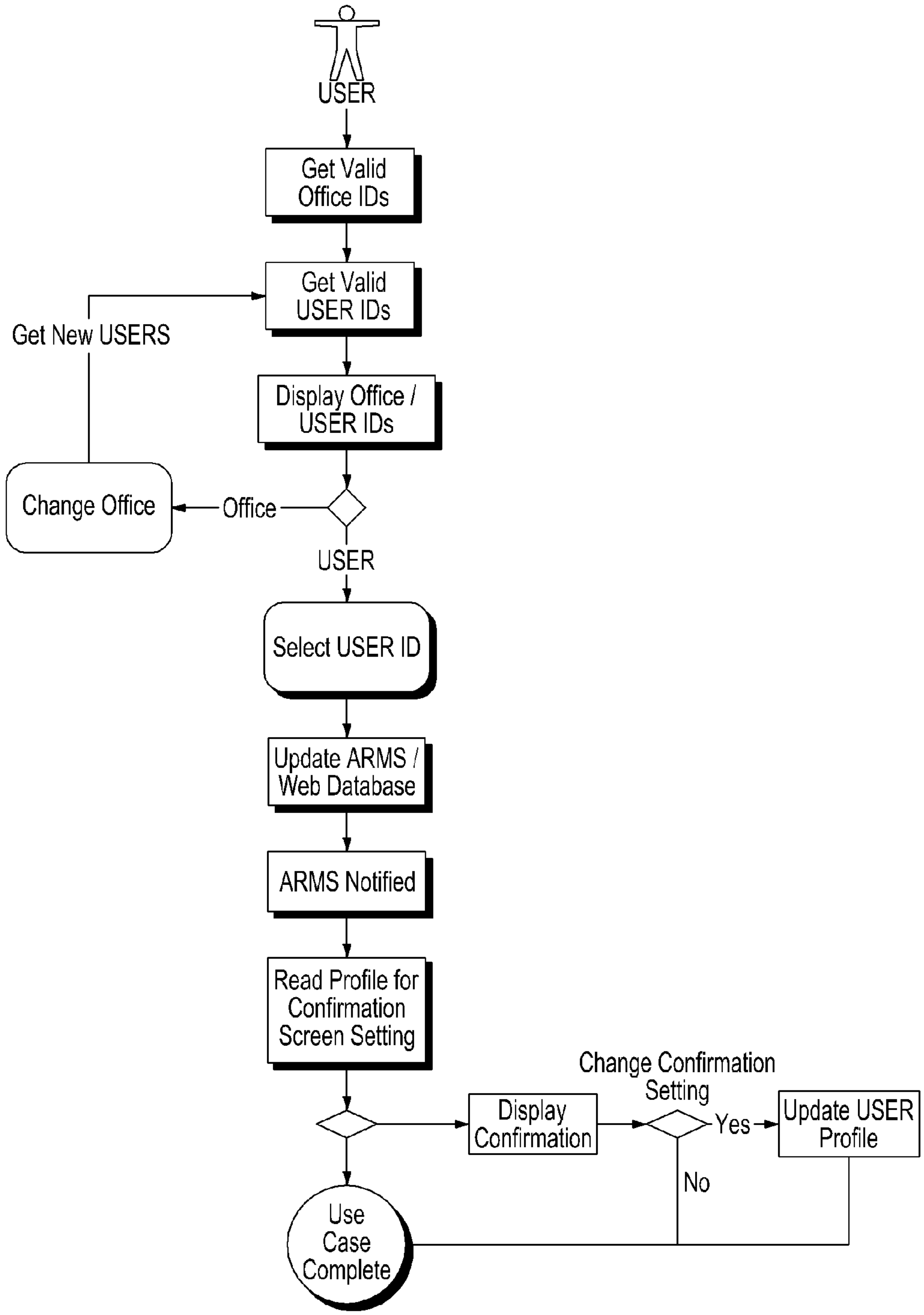

1.4.1 Activity Diagram—see FIG. 123.

1.4.2 Basic Flow

1. The USER selects to reassign a customer file.
2. The system retrieves the list of valid offices to display.
3. The system retrieves the list of valid USERs to display based on reservation/ticket status.
4. The system displays the list of adjusters for the current office and the list of other valid offices.
5. The USER selects the user that will be the new owner of the selected action item.
6. The system will update the ARMS Web database to reflect the recent ownership change and changes, if any, from the prior screen.
7. The system generates a message indicating that a transfer and any other changes have been completed.
8. The system updates the ARMS Web database and notifies ARMS with an Authorization Change transaction.
9. This ends the use case.

1.4.3 Alternative Flows 1.4.3.1 Change Office

After step 3 of the basic flow, the USER may choose to assign the action item to a new office. If the USER chooses a new office, the flow would return to step 2 of the basic flow. This should reflect possible recipients of the action item from that office.

1.4.3.2 Cancel Use Case

The USER may cancel the use case at any point prior to updating the ARMS Web Database. If the USER elects to cancel the use case, the customer file will not be transferred, however, any other changes that were made to the file will remain.

1.4.3.3 Display Confirmation

After step 7, the USER may wish to have a confirmation page displayed, indicating that some type of change has taken place. The confirmation page is completely optional, therefore, at anytime the USER wants to set their profile to bypass this screen, he/she may do so.

1.4.3.4 Update User Profile

During the confirmation process, the USER has the option of changing their profile setting to display or hide the confirmation page. Each time the setting is changed, the USER profile must be updated to reflect the new requirements set by the USER.

1.5 Post-Conditions

If the use case was successful then the changes should go in to effect immediately and the new owner should be able to view the newly assigned action item.

If the use case was unsuccessful then the system will remain unchanged.

1.6 Special Requirements

When building the list of valid USERS, the system will determine the status of the reservation/ticket and retrieve all users in the current office with authority to process that status of a reservation/ticket.

When building the list of valid Offices, the system will retrieve all other offices defined within ARMS Web as valid offices for the specified company.

When selecting an office for the reassign operation, the system must rebuild the user list so the USER will only see valid users that are able to complete the action item to be transferred.

After the changes have been submitted, the next Action Item will populate indicating that a transfer has been completed, if the USER started from the Action Item List.

After the changes have been submitted, the USER will return to the profiled start page with a message indicating that a transfer has been completed, if the USER arrived at the customer file via the search option.

1.7 Extension Points

None.

2. Screen Design

A definition of the screen layout(s), screen data fields, and screen functions that are used to implement the flows identified above. More than one screen may be used to implement support for the use case flow.

2.1 Transfer File

This screen (see FIG. 124) will allow the USER to pick which functions that they may want to change.

Figure 124:
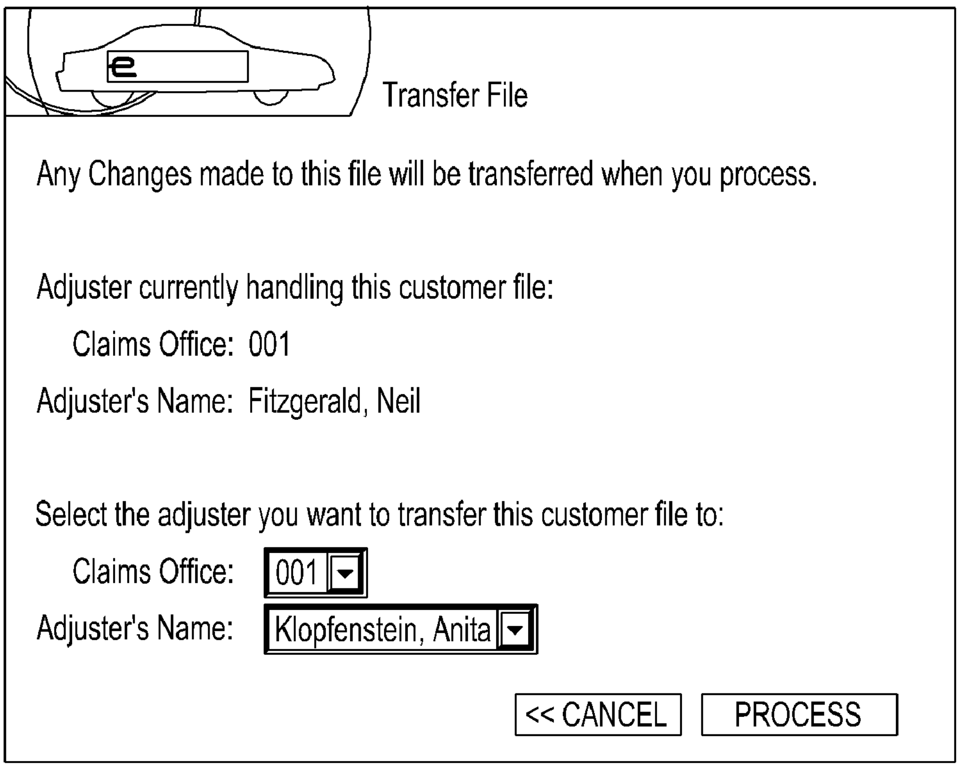

2.1.1 Screen Layout—Transfer File—see FIG. 124

2.1.2 Transfer File

| Screen Label | Type | Size | Screen Field Name | Data Field Name | Screen Specific Rule |
|---|---|---|---|---|---|
| Adjuster's Name | ListBox | 30 | Change to Adjuster's Name | First Name + Last Name | List of adjuster's within the currently selected Assign to Claim Office that are authorized to handle the current request type. The adjuster that the request is currently assigned to will be selected upon entry into the screen. |
| Adjuster's Name: | Output | 30 | Current Adjuster's Name | First Name + Last Name | N/A. |
| Claims Office | ListBox | 3 | Change to Office Id | external organization identifier | List of office within the current Company Structure that are authorized to handle the current request type. The office that the request is currently assigned to will be selected in the drop down box upon entry into the screen. |
| Claims Office: | Output | 3 | Current Office Id | external organization abbreviated name | N/A |

2.1.3 Screen Function Definition 2.1.3.1 Cancel

When clicked, the USER will be returned to the screen/use case where they were prior to selecting Change Office/Adjuster (Transfer). Any changes made will be lost and the system will remain unchanged.

2.1.3.2 Process

When clicked, the system will be validated. If the validation passes, the update will be sent to the ARMS system and the USER will be returned to the screen/use case from which they came. If the validation fails, the USER will be returned to the current screen with error message(s) and the field in error highlighted.

3. Application Operations

4. Data Fields 4.1 Data Field Definition

This section includes a definition of all data fields included in the functional specification.

4.1.1 External Organization Abbreviated Name

| | |
|---|---|
| Entity | EXTERNAL ORGANIZATION |
| Column Name | e_o_abbr_nam |
| Label Name | external organization abbreviated name: |
| System Name | EOABBRNAM |
| Data Type | CHAR(10) |
| Attribute Definition | External Organization Abbreviated Name is a shortened text based label associated with an organization outside of Enterprise. This name is sometimes used for accounting purposes. |

4.1.2 External Organization Identifier

| | |
|---|---|
| Entity | EXTERNAL ORGANIZATION |
| Column Name | e_o_id |
| Label Name | external organization identifier: |
| System Name | EOID |
| Data Type | DEC(11, 0) |
| Attribute Definition | The external organization identifier is a surrogate key assigned to each unique occurrence of an External Organization. Examples: body shops, vehicle manufacturers, insurance companies, leasing accounts, credit unions, dealerships, or government agencies. |

4.1.3 First Name

| | |
|---|---|
| Entity | ARM: Adjustor Master |
| Column Name | ALFSNM |
| Label Name | First Name |
| System Name | |
| Data Type | CHAR(15) |
| Attribute Definition | |

4.1.4 Last Name

| | |
|---|---|
| Entity | ARM: Adjustor Master |
| Column Name | ALLSNM |
| Label Name | Last Name |
| System Name | |
| Data Type | CHAR(20) |
| Attribute Definition | |

Functional Design Specification
Cancel Authorization
Version 1.0

Cancel Authorization

1. Cancel Authorization Use Case
1.1 Brief Description

This use case will describe how a USER would cancel an authorized reservation.

1.2 Use Case Actors

The following actors will interact with this use case:

ADJUSTER—The USER will be able to perform the duties of canceling an authorized reservation.

1.3 Pre-Conditions

The USER must be logged into the ARMS Web system.

The USER must have the ability to cancel an authorization.

The USER has selected an authorized reservation and wants to cancel the authorization within ARMS Web.

1.4 Flow of Events

The Flow of Events will include the necessary steps to "Cancel Authorization".

Figure 125:
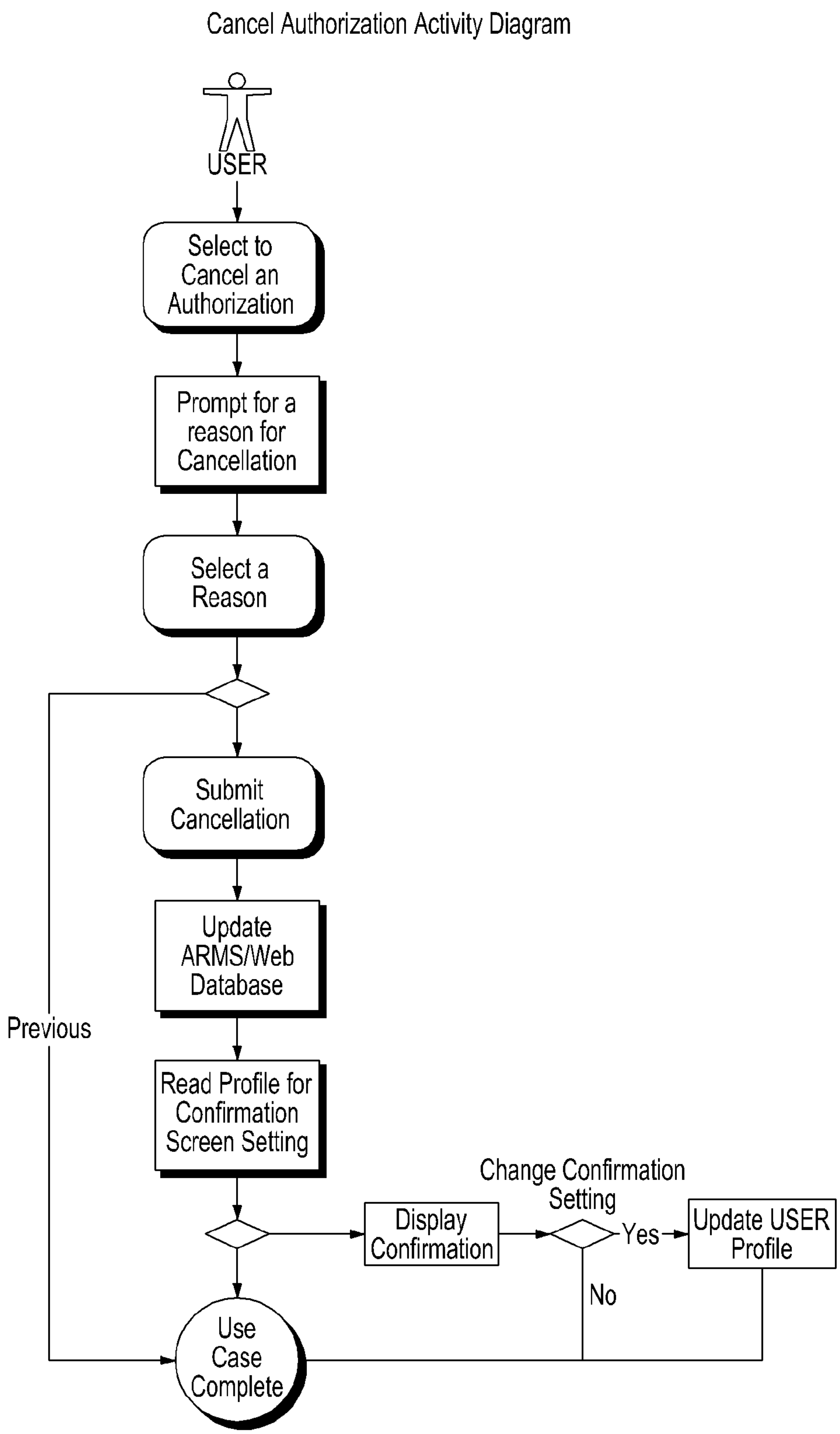

1.4.1 Activity Diagram—see FIG. 125.

1.4.2 Basic Flow

1. The USER selects to cancel the authorization.
2. The system will prompt the user for a reason for cancellation.
3. The USER will select a reason.
4. The USER will submit the cancellation.
5. The system will update the ARMS Web database to reflect that the USER cancelled the Authorization.
6. The system will read the USER profile for the confirmation settings.
7. This ends the use case.

1.4.3 Alternative Flows 1.4.3.1 Previous

After step 3, the USER can abandon all changes, which result in the system state remaining unchanged. After clicking the "Previous" button, the USER will be returned to the screen from which they came.

1.4.3.2 Additional Comments

When canceling a rental, the USER must select a reason from the drop-down box to explain why the cancellation is taking place. As well, if further explanation is desired, there is a comment box in which the USER may enter additional comments for more clarification. This section is optional, unless the USER selects "Other" from the reason code drop-down box. In this case, the comment box must be used.

1.4.3.3 Display Confirmation

After step 6, the USER may wish to have a confirmation page displayed, indicating that some type of change has taken place. The confirmation page is completely optional, therefore, at anytime the USER wants to set their profile to bypass this screen, he/she may do so.

1.4.3.4 Update User Profile

During the confirmation process, the USER has the option of changing their profile setting to display or hide the confirmation page. Each time the setting is changed, the USER profile must be updated to reflect the new requirements set by the USER.

1.5 Post-Conditions

If the use case was successful then the changes should go in to effect immediately and generate a transaction record to pass to ARMS indicating that the authorized reservation was cancelled.

If the use case was unsuccessful then the system will remain unchanged.

1.6 Special Requirements

When canceling an authorization, the USER must select a reason from the drop-down list. If the USER chooses "Other" from the pre-defined list, a comment about why the authorization was cancelled must be supplied.

1.7 Extension Points

None.

2. Screen Design

A definition of the screen layout(s), screen data fields, and screen functions that are used to implement the flows identified above. More than one screen may be used to implement support for the use case flow.

2.1 Cancel Direct Bill Authorization

This screen (see FIG. 126) will allow the USER to pick which functions that he/she may want to change.

Figure 126:
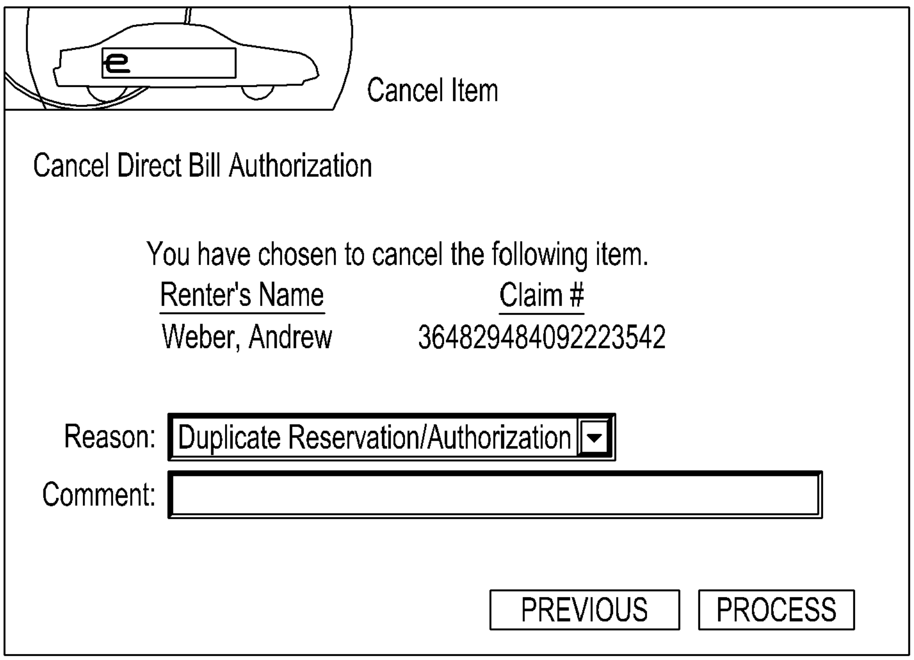

2.1.1 Screen Layout—Cancel Direct Bill Authorization—see FIG. 126

2.1.2 Cancel Direct Bill Authorization

| Screen Label | Type | Size | Screen Field Name | Data Field Name | Screen Specific Rule |
|---|---|---|---|---|---|
| Reason | List Box | 50 | Cancellation Reason | NOTE | N/A |
| Comment: | Input | 50 | Message Text | NOTE | Required if cancellation reason is "Other" |
| Claim # | Output | 30 | Claim Number | Insurance Claim Number | |
| Renter's Name | Output | 30 | Renter's Name | First Name + Last Name | N/A |

2.1.3 Screen Function Definition

This section includes the definitions for all functions that can be performed within the screen. This includes operations invoked by button clicks, specific shortcut keystrokes, or other actor activity.

2.1.3.1 Previous

When clicked, the user will be returned to the screen/use case where they were prior to selecting Cancel Reservation. Any changes made will be lost and the system will remain unchanged.

2.1.3.2 Process

When clicked, the system will update the message file with the comment record if entered and mark the current reservation authorization as cancel. The cancellation and the new message, if entered, will be forwarded to the ARMS system. The system returns the USER to the appropriate Action Items List screen.

3. Application Operations
4. Data Fields
4.1 Data Field Definition

This section includes a definition of all data fields included in the functional specification.

4.1.1 Cancel Date

| | |
|---|---|
| Entity | ARM: Authorization(Claim Info) |
| Column Name | AZCNDT |
| Label Name | Cancel Date |
| System Name | |
| Data Type | NUMERIC(8) |
| Attribute Definition | |

4.1.2 Cancellation Code

| | |
|---|---|
| Entity | ARM: Authorization(Claim Info) |
| Column Name | AZCNCD |
| Label Name | Cancellation Code |
| System Name | |
| Data Type | CHAR(2) |
| Attribute Definition | |

4.1.3 External Organization Abbreviated Name

| | |
|---|---|
| Entity | EXTERNAL ORGANIZATION |
| Column Name | e_o_abbr_nam |
| Label Name | external organization abbreviated name: |
| System Name | EOABBRNAM |
| Data Type | CHAR(10) |
| Attribute Definition | External Organization Abbreviated Name is a shortened text based label associated with an organization outside of Enterprise. This name is sometimes used for accounting purposes. |

4.1.4 First Name

| | |
|---|---|
| Entity | ARM: Renter Detail |
| Column Name | RKFSNM |
| Label Name | First Name |
| System Name | |
| Data Type | CHAR(15) |
| Attribute Definition | |

4.1.5 Insurance Claim Number

| | |
|---|---|
| Entity | ARM: Authorization(Claim Info) |
| Column Name | AZCLNO |
| Label Name | Insurance Claim Number |
| System Name | |
| Data Type | CHAR(20) |
| Attribute Definition | |

4.1.6 Last Name

| | |
|---|---|
| Entity | ARM: Renter Detail |
| Column Name | RKLSNM |
| Label Name | Last Name |
| System Name | |
| Data Type | CHAR(20) |
| Attribute Definition | |

4.1.7 Note

| | |
|---|---|
| Entity | ARM: ARMS/400 Diary Notes File |
| Column Name | NENOTE |
| Label Name | NOTE |
| System Name | |
| Data Type | CHAR(50) |
| Attribute Definition | |

4.1.8 Rental Location

| | |
|---|---|
| Entity | ARM: Authorization(Claim Info) |
| Column Name | AZRNLC |
| Label Name | Rental Location |
| System Name | |
| Data Type | CHAR(10) |
| Attribute Definition | |

5. Questions and Answers

Issue Number: 418

Question: Do we need a reason to cancel—have cancel page.

Status: Closed—Resolved

Resolution: 6-23-00, Per Neil, kill this page, it's not necessary.

Functional Design Specification

View Customer File

Version 1.0

View Customer File

1. Search and View Customer File 1.1 Brief Description

This use case describes the process that a USER would use to find and view information regarding a rental. In order to view the rental detail, one of two general conditions must be satisfied:

1) The rental is open and the USER does not have any authority to make changes.

2) The rental is in a state that no longer allows changes to be made.

If these conditions are not met, the USER will be taken to the appropriate use case.

1.2 Use Case Actors

All actors will use the use case to View Rental Detail in the ARMS Web system. All of the following actors can be defined generically as a USER:

ADJUSTER

PROCESSOR

COMPANY MANAGER

ENTERPRISE ADMINISTRATOR

COMPANY ADMINISTRATOR 1.3 Pre-Conditions

The USER must be signed-on to the system (AND)

The USER does not have the authority to make changes and the ticket is open, (OR)

The ticket is in a state that doesn't allow changes to be made.

1.4 Flow of Events

The Flow of Events includes all the steps necessary to View Rental Detail in the ARMS Web system.

Figure 127:
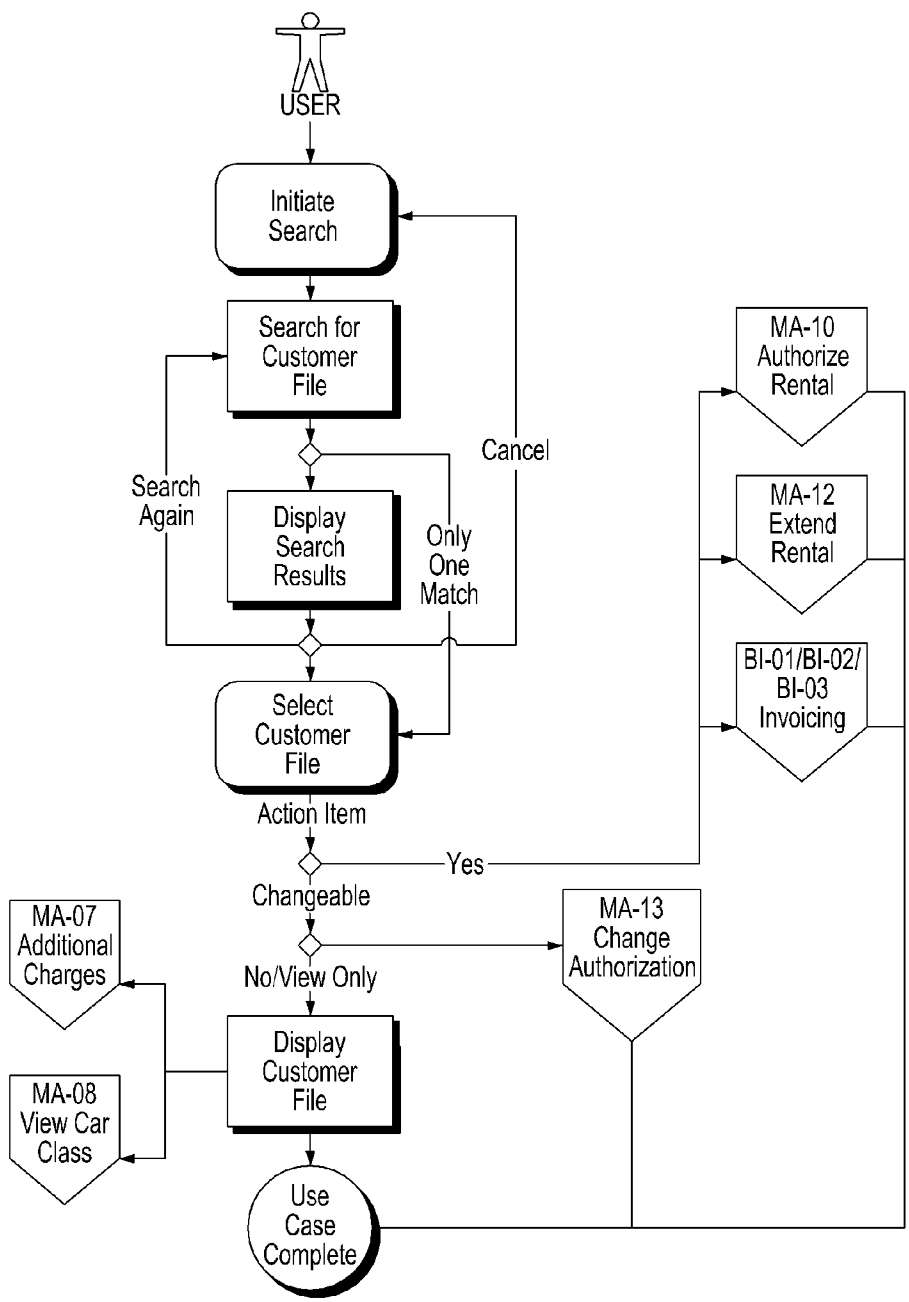

1.4.1 Activity Diagram—see FIG. 127.

1.4.2 Basic Flow

The Basic Flow of the View Rental Detail use case includes all of the required activities for the USER to successfully find and view information regarding an open rental.

1. The USER initiates a search for a Customer File.
2. The system, based on criteria entered by the USER, retrieves the matches for that search.
3. The system displays the search results.
4. The USER selects one of the matches.
5. The system displays the detail of the Customer File.
6. This ends this use case.

1.4.3 Alternative Flows 1.4.3.1 Search Again

After step 3 of the basic flow, the USER may decide that they would like to conduct another search. By entering new search criteria, they would return to step 2 with new criteria and the use case could continue.

1.4.3.2 Only One Match Found

At step 2 of the basic flow, if the system only finds one match, the system will advance to step 5 of the basic flow invoking the appropriate use case for modifications.

1.4.3.3 View Only

If the Customer File selected was in a state not allowing changes, the system would display the Customer File, however, not allowing the USER to modify any information within ARMS Web.

1.5 Post-Conditions

If the use case is successful, the system will return to its previous state.

If the use case is unsuccessful, the use case the system will remain unchanged.

1.6 Special Requirements

To successfully locate a customer file, the following criteria must be satisfied:

1. The following fields will limit the search results: Adjuster Name, Last Authorized Day, Date of Loss, and/or a status of the Customer File.
   a. If a Renter Last Name has been supplied, an exact match on last name is considered valid.
   b. If a Renter Last Name and Renter First Name has been supplied and there is no exact match on Renter Last Name, there is no match.
   c. If a Renter Last Name and Renter First Name has been supplied and there is an exact match on Renter Last Name and not an exact match on Renter First Name, the Renter Last Name with the closest Renter First Name is considered a match.
   d. If a Renter Last Name and Claim Number has been supplied and there is an exact match on Renter Last Name and not on Claim Number, the closest match on Renter Last Name and the closest match on Claim Number greater than the Claim Number provided is considered a match.
2. If the USER supplies one or more of the following fields, the above result set will position to closest match of Customer Files based on: Renter Last Name, Renter First Name, and/or Claim Number.
3. This search capability will include all available Open and Closed Rentals for searching.
4. Any empty fields signify the search should not limit the result set by that field.
5. Any Customer File present in the result set will contain a link to the appropriate use case based on the current status of the reservation or rental.

1.7 Extension Points 1.7.1.1 MA-10 Authorized a Request

If the customer file were an unauthorized reservation or ticket, the system would enter the Authorization use case to allow the USER to authorize this Customer File.

1.7.1.2 MA-12 Extend Rental

If the customer file were an authorized ticket or an action item of extension status, the system would enter the Extend Rental use case to allow the USER to extend this Customer File.

1.7.1.3 MA-13 Change Authorization

If the customer file were an authorized reservation or ticket not requiring any immediate action, the system would enter the Change Authorization use case to allow the USER to authorize this Customer File.

1.7.1.4 MA-07 Additional Charges

The Additional Charges use case will be used to add special charges to the reservation being created by the USER (e.g., CDW). Any Additional Charges captured should be returned and applied to the reservation. The existence of Additional Charges should be reflected on the reservation screen.

1.7.1.5 MA-08 View Car Class

The View Car Class use case will be used to allow the USER to view details about and select a car class to apply to a reservation. Details will include the average number of passengers and luggage items that can be served by a vehicle in the specific car class. The car class selected by the USER should be applied to the reservation.

1.7.1.6 Invoicing-BI-01-Handle Unapproved Invoices & BI-02 Pay Approved Invoices & BI-03 Reject an Invoice At step 5, the USER may elect to view approved invoices, unapproved invoices, or rejected invoices. Upon completion of this process, the USER should be returned back to step 5 of the Basic Flow.

2. Screen Design

A definition of the screen layout(s), screen data fields, and screen functions that are used to implement the flows identified above. More than one screen may be used to implement support for the use case flow.

2.1 Find a Customer (Tab)

This screen will allow the USER to view the rental.

Figure 128:
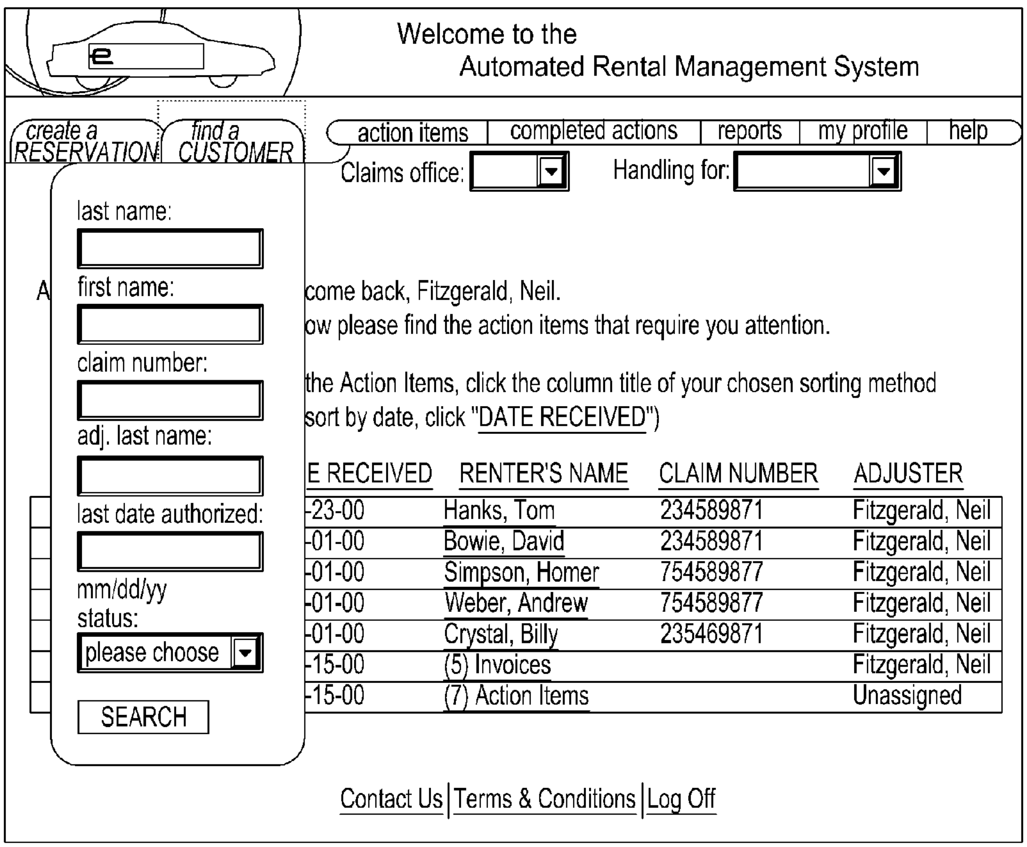

2.1.1 Find a Customer (Tab)—see FIG. 128

2.1.2 Customer (Tab)

| Screen Label | Type | Size | Screen Field Name | Data Field Name | Screen Specific Rule |
|---|---|---|---|---|---|
| last name | Input | 20 | Renter last name | Last name | |
| first name | Input | 20 | Renter's first name | First name | |
| claim number | Input | 30 | Insurance claim number | Ins. Claim number | N/A. |

-continued

| Screen Label | Type | Size | Screen Field Name | Data Field Name | Screen Specific Rule |
|---|---|---|---|---|---|
| adj. last name | Input | 20 | Adjuster's last name | Last name | N/A. |
| last date authorized: | Input | 20 | Last date authorized | LAST AUTH DAY | N/A. |
| status: | List Box | 20 | Contract Status | Status Code | N/A. |

2.1.3 Screen Function Definition

This section includes the definitions for all functions that can be performed within the screen. This includes operations invoked by button clicks, specific shortcut keystrokes, or other actor activity.

2.1.3.1 Search

When clicked, the will search for any records that match the criteria listed.

2.2 Customer File—Closed Items

This screen will allow the USER to view the rental when closed.

Figure 129A:
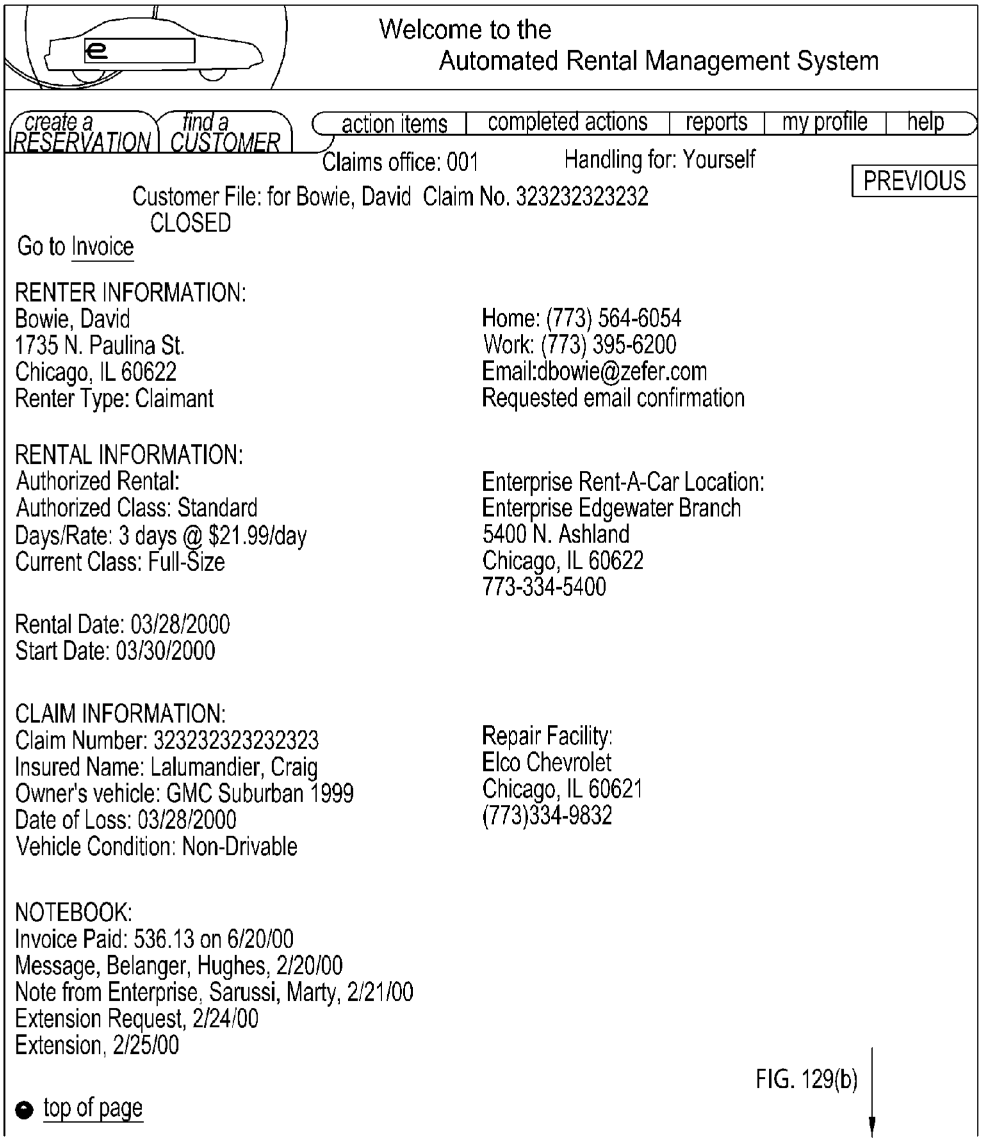

2.2.1 Screen Layout—Customer File—Closed Items—see FIG. 129

2.2.2 Customer File—Closed Items

| Screen Label | Type | Size | Screen Field Name | Data Field Name | Screen Specific Rule |
|---|---|---|---|---|---|
| Actual Days: | Output | 3 | actual days rented | Item Quantity | Invoicing Section Only |
| @ | Output | 3 | Actual Rate Rented | Item Rate | Invoicing Section - Actual Rental only |
| = | Output | 8 | Amount charged | Item Amount | Invoicing sections, Actual Rental only |
| Billed Period: ____ to ____ (__ days) | Output | 30 | Billing start date, end date and number of days | Item Quantity | Invoicing section only |
| | Output | 3 | Number of days authorized | Item Quantity | Invoicing, Actual Rental Section only |
| Sales Tax (__%) | Output | 3 | Sales Tax | Item Description | Invoicing, Actual Rental section only |
| Billed Period: ____ to ____ (__ days) | Output | 30 | Billing start date, end date and number of days | Bill to End Date | Invoicing section only |
| Billed Period: ____ to ____ (__ days) | Output | 30 | Billing start date, end date and number of days | Bill to Start Date | Invoicing section only |
| Federal ID: | Output | 12 | Federal ID Number | Federal ID Number | Only shown in Invoicing sections |
| Invoice Date: | Output | 10 | Invoice Date | Record Add Date | Only used in the invoice sections |
| Reference: | Output | 32 | Reference Number | Invoice Number | Only in the invoice sections |
| Amount Received | Output | 8 | Amount Received | Total Amount Received | Invoicing, Actual Rental sections only |
| Total Charges: | Output | 8 | Total Charges | Total Ticket Charges | Invoicing, Actual Rental Section only |
| Total Due: | Output | 8 | Total Due | Total Amount Due | Invoicing, Actual Rental sections only |
| Handling For: | Output | 30 | Handling for Adjuster's Name | First Name + Last Name | |
| Authorized Period: ____ to ____ (__ days) | Output | 30 | Authorized Start Date | Start Date + End Date + Days authorized-detail | Only in invoicing sections |
| Date | Output | 8 | Message Creation Date | Add Date | N/A. |
| Message to Branch Location: | Output | 50 | Message Text | NOTE | |
| Notebook | Output | 50 | Message Text | NOTE | N/A. |
| Authorized Class: | Output | 20 | Car Class Name | Vehicle Class | |
| Current Class: | Output | 20 | Car Class Name | Vehicle Class | N/A. |
| Claim Number: | Output | 11 | Claim Number | Insurance Claim Number | |
| Claim No. | Output | 30 | Claim Number | Insurance Claim Number | |

-continued

| Screen Label | Type | Size | Screen Field Name | Data Field Name | Screen Specific Rule |
|---|---|---|---|---|---|
| Daily Rate/Max. Dollars | Output | 10 | Daily Policy Rate and Maximum Policy Rate | Dollars Per Day Covered + Max $ Covered | Invoicing section only |
| Direct Bill Percent | Output | 4 | Direct Bill Percent | Bill To % | Invoicing sections only |
| Direct Bill Percent | Output | 8 | Direct Bill Percent | Bill To % | Invoicing sections Actual Rental only |
| | Output | 30 | Rental Location Branch Name | Rental Location | |
| Days/Rate | Output | 6 | Rental Location Rate and number of days | Number Of Days Authorized | N/A. |
| Days/Rate | Output | 6 | Rental Location Rate and number of days | Vehicle Rate | N/A. |
| @ | Output | 7 | Rental Rate per day | Rate Charged | Invoicing section only |
| Rental Period: ____ to ____ (____ days) | Output | 30 | Rental Start | Start Date + End Date + CALCULATED | Invoicing sections only |
| Rental Date | Output | 10 | Rental Start Date | Start Date | |
| Start Date | Output | 10 | Start Date of rental | Start Date | |
| Insured Name: | Output | 30 | Insured's Name | First Name + Last Name | |
| | Output | 30 | Rental Location Address | Address Line + Address Line2 | N/A. |
| | Output | 25 | Rental Location City Name | City | N/A. |
| | Output | 10 | Rental Location Postal/Zip Code | Zip Code | N/A. |
| | Output | 3 | Rental Location State/ Province Code | State | N/A. |
| | Output | 13 | Rental Location Telephone Number | Telephone Number | N/A. |
| Date of Loss: | Output | 10 | Date of Loss | Date Of Loss | |
| | Output | 20 | Renter City Name | City | |
| | Output | 10 | Renter Postal/Zip Code | Zip Code | |
| | Output | 3 | Renter State/ Province Code | State | |
| | Output | 30 | Renter Street Address | Address Line | |
| Renter Email: | Output | 20 | Renter's Email | Day Phone | |
| Home Phone: | Output | 16 | Renter's Home Phone | Renters Night Phone + Renters Night Phone Extension | |
| Renter Information: | Output | 30 | Renter's Name | First Name + Last Name | N/A. |
| Renter Name: | Output | 30 | Renter's Name | First Name + Last Name | |
| Owner's Vehicle | Output | 4 | Renter's Vehicle Year, Make and Model | Renter Vehicle Year + Renter Make/Model | |
| Work Phone: | Output | 16 | Renter's Work Phone | Day Phone + Renters Day Phone Extension | |
| Repair Facility: | Output | 20 | Body Shop Name | Repair Facility Name | |
| Phone Number: | Output | 16 | Body Shop Phone Number | Telephone Number | |
| | Output | 20 | Repair Facility City | City | |
| | Output | 3 | Repair Facility State | State | |
| | Output | 7 | Repair Facility Zip Code | Zip Code | |
| = | Output | 10 | Amount charged | CALCULATED | Invoicing sections only |
| Total authorized Includes Tax & Surcharge | Output | 8 | Total authorized amount | CALCULATED | Invoicing sections only |
| Renter Type | Output | 15 | Claim Type | claim type description | |
| Claims Office: | Output | 3 | Office Id | external organization abbreviated name | |
| Vehicle Condition | Output | 15 | Loss Type | loss type description | |
| Renter Email: | Output | 20 | Renter's Email | renter email | |

2.2.3 Screen Function Definition

This section includes the definitions for all functions that can be performed within the screen. This includes operations invoked by button clicks, specific shortcut keystrokes, or other actor activity.

2.2.3.1 Previous

When clicked, the USER will be taken back to the use case from where they came.

2.2.3.2 Printer Friendly Version

When clicked, the system will bring up a screen that only shows the particular invoice for which you clicked this button. The USER may print from this screen.

2.2.3.3 Top of Page

When clicked, the USER will be taken to the top of the current page.

2.3 Search Results

This screen will allow the USER To view the rental when closed.

Figure 130:
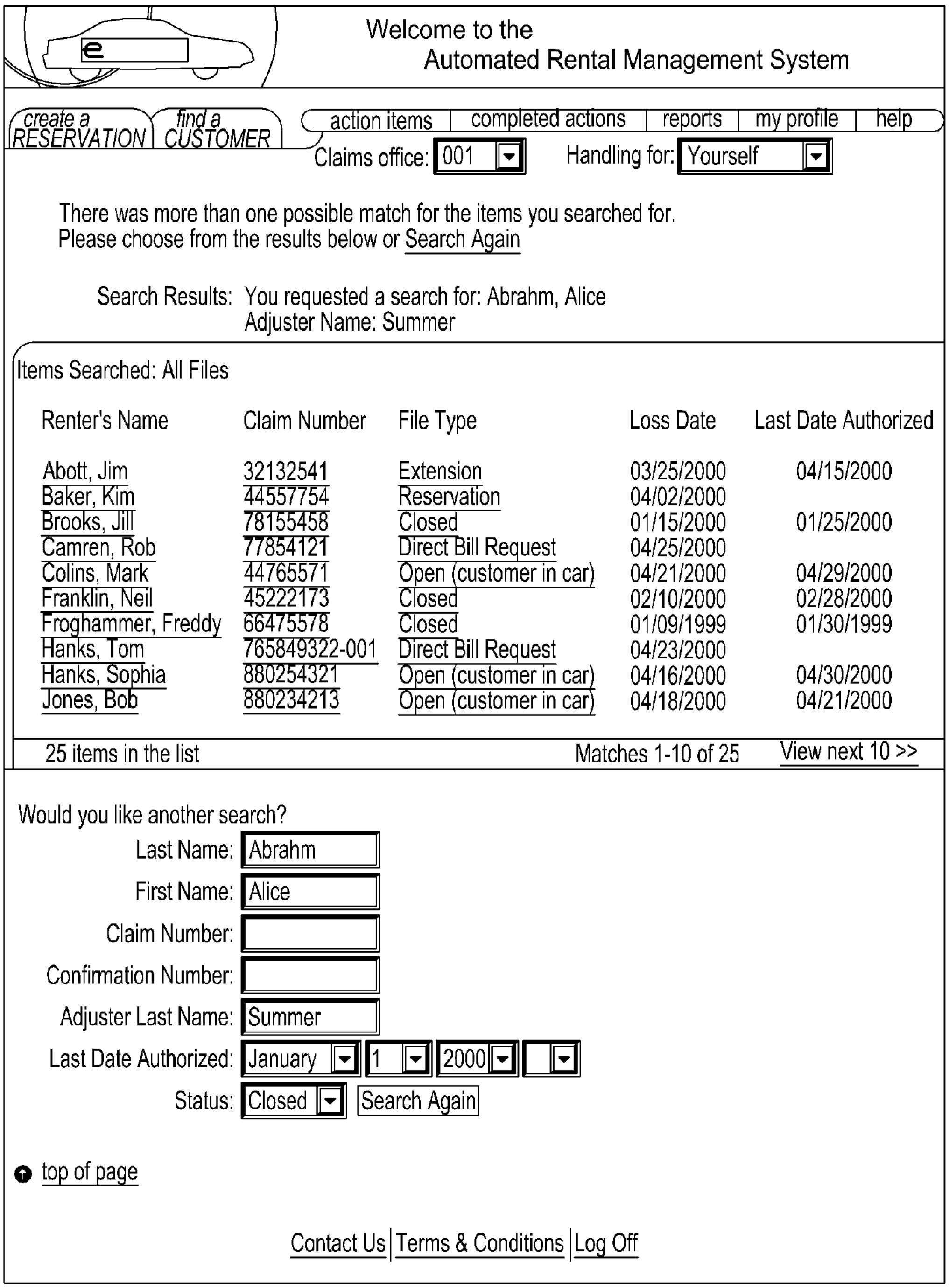

2.3.1 Screen Layout—Search Results—see FIG. 130

2.3.2 Search Results 2.3.3 Screen Function Definition

This section includes the definitions for all functions that can be performed within the screen. This includes operations invoked by button clicks, specific shortcut keystrokes, or other actor activity.

2.3.3.1 Search Again

When clicked, the system will re-search the database after the USER has entered new or additional criteria.

2.3.3.2 Top of Page

When clicked, the USER will be taken to the top of the current page.

2.3.3.3 View Next 10>>>

When clicked, the system will display the next 10 items that match the search criteria.

3. Application Operations

4. Data Fields 4.1 Data Field Definition

This section includes a definition of all data fields included in the functional specification.

| Screen Label | Type | Size | Screen Field Name | Data Field Name | Screen Specific Rule |
|---|---|---|---|---|---|
| Last Date | Output | 10 | Authorization Date | | |
| Status | List Box | 10 | Contract Status | Status Code | |
| last date authorized | Input | 5 | Last Day Authorized | LAST AUT DAY | |
| adj. last name | Input | 15 | Adjuster Last Name | Last Name | |
| Adjuster Name: | Output | 20 | Adjuster Name | First Name + Last Name | |
| Handling for: | List Box | 15 | Handling for Adjuster Name | First Name + Last Name | |
| File Type | Output | 15 | Status | Status Description | |
| confirmation number | Input | 52 | Confirmation Number | Transmission Code | |
| Claim Number | Output | 30 | Claim Number | Insurance Claim Number | Populated by the data matching the search criteria |
| claim number | Input | 30 | claim number | Insurance Claim Number | |
| Loss Date | Output | 10 | Date of Loss | Date Of Loss | |
| first name | Input | 15 | Renter's First Name | First Name | |
| last name | Input | 15 | Renter's Last Name | Last Name | |
| Renter's Name | Output | 30 | Renter's Name | First Name + Last Name | Returned data from the search criteria |
| Claims Office: | List Box | 5 | Office ID | external organization abbreviated name | |
| You requested a search for: | Output | 30 | Search Criteria | NOT STORED | This field will be populated by the criteria used to search for a particular record. This field may be at Last Name, First Name, Claim Number, Confirmation Number, Adjuster Last Name or Status. The data in this field |

4.1.1 Add Date

| | |
|---|---|
| Entity | ARM: ARMS/400 Diary Notes File |
| Column Name | NEADDT |
| Label Name | Add Date |
| System Name | |
| Data Type | NUMERIC(8) |
| Attribute Definition | |

4.1.2 Address Line

| | |
|---|---|
| Entity | ARM: Renter Location Master |
| Column Name | LOADL1 |
| Label Name | |
| System Name | |
| Data Type | CHAR(30) |
| Attribute Definition | |

4.1.3 Address Line

| | |
|---|---|
| Entity | ARM: Renter Detail |
| Column Name | RKADL1 |
| Label Name | Address Line |
| System Name | |
| Data Type | CHAR(30) |
| Attribute Definition | |

4.1.4 Address Line2

| | |
|---|---|
| Entity | ARM: Renter Location Master |
| Column Name | LOADL2 |
| Label Name | Address Line |
| System Name | |
| Data Type | CHAR(30) |
| Attribute Definition | |

4.1.5 Bill to %

| | |
|---|---|
| Entity | ARM: Authorization(Claim Info) |
| Column Name | AZBTPC |
| Label Name | Bill To % |
| System Name | |
| Data Type | DECIMAL(3) |
| Attribute Definition | |

4.1.6 Bill to End Date

| | |
|---|---|
| Entity | A4 Invoice Header |
| Column Name | IIBTDT |
| Label Name | Bill to End Date |
| System Name | |
| Data Type | NUMERIC(8) |
| Attribute Definition | |

4.1.7 Bill to Start Date

| | |
|---|---|
| Entity | A4 Invoice Header |
| Column Name | IISRDT |
| Label Name | Bill to Start Date |
| System Name | |
| Data Type | NUMERIC(8) |
| Attribute Definition | |

4.1.8 Branch

| | |
|---|---|
| Entity | ARM: Rental Location Master |
| Column Name | Branch |
| Label Name | Branch: |
| System Name | |
| Data Type | CHAR(2) |
| Attribute Definition | |

4.1.9 City

| | |
|---|---|
| Entity | ARM: Rental Location Master |
| Column Name | LOCYNM |
| Label Name | City |
| System Name | |
| Data Type | CHAR(20) |
| Attribute Definition | |

4.1.10 City

| | |
|---|---|
| Entity | ARM: Renter Detail |
| Column Name | RKCYNM |
| Label Name | City |
| System Name | |
| Data Type | CHAR(20) |
| Attribute Definition | |

4.1.11 City

| | |
|---|---|
| Entity | ARM: Repair Detail |
| Column Name | RUCYNM |
| Label Name | City |
| System Name | |
| Data Type | CHAR(20) |
| Attribute Definition | |

4.1.12 Claim Type Code

| | |
|---|---|
| Entity | AUTHORIZATION EXTENSION |
| Column Name | clm__typ__cde |
| Label Name | claim type code: |
| System Name | CLMTYPCDE |
| Data Type | DEC(3, 0) |
| Attribute Definition | The claim type code defines the different Authorization claim types. For example: Insured, Claimant, Uninsured Motorist, etc. |

4.1.13 Claim Type Description

| | |
|---|---|
| Entity | CLAIM TYPE |
| Column Name | clm__typ__dsc |
| Label Name | claim type description: |
| System Name | CLMTYPDSC |
| Data Type | CHAR(40) |
| Attribute Definition | The claim type description is a lexical definition of the claim type code which defines the different Authorization claim types. For example: Insured, Claimant, Uninsured Motorist, etc. |

4.1.14 Company Identifier

| | |
|---|---|
| Entity | EXTERNAL ORGANIZATION |
| Column Name | cmpy_id |
| Label Name | company identifier: |
| System Name | CMPYID |
| Data Type | DEC(11, 0) |
| Attribute Definition | Business Party Identifier is a surrogate key assigned to each unique occurrence of an Individual, External Organization, and Internal Organization (Business Party). |

4.1.15 Date of Loss

| | |
|---|---|
| Entity | ARM: Renter Detail |
| Column Name | RKLSDT |
| Label Name | Date Of Loss |
| System Name | |
| Data Type | NUMERIC(8) |
| Attribute Definition | |

4.1.16 Day Phone

| | |
|---|---|
| Entity | ARM: Renter Detail |
| Column Name | RKDYPH |
| Label Name | Day Phone |
| System Name | |
| Data Type | NUMERIC(10) |
| Attribute Definition | |

4.1.17 Days Authorized-Detail

| | |
|---|---|
| Entity | ARM: ARMS/400 Diary Notes File |
| Column Name | NEAUDY |
| Label Name | Days authorized-detail |
| System Name | |
| Data Type | DECIMAL(3) |
| Attribute Definition | |

4.1.18 Dollars Per Day Covered

| | |
|---|---|
| Entity | ARM: Authorization(Claim Info) |
| Column Name | AZ$PDY |
| Label Name | Dollars Per Day Covered |
| System Name | |
| Data Type | DECIMAL(5, 2) |
| Attribute Definition | |

4.1.19 End Date

| | |
|---|---|
| Entity | ARM: Authorization(Claim Info) |
| Column Name | AZENDT |
| Label Name | End Date |
| System Name | |
| Data Type | NUMERIC(8) |
| Attribute Definition | |

4.1.20 External Organization Identifier

-continued

| | |
|---|---|
| Entity | EXTERNAL ORGANIZATION |
| Column Name | e_o_id |
| Label Name | external organization identifier: |
| System Name | EOID |
| Data Type | DEC(11, 0) |
| Attribute Definition | The external organization identifier is a surrogate key assigned to each unique occurrence of an External Organization. Examples: body shops, vehicle manufacturers, insurance companies, leasing accounts, credit unions, dealerships, or government agencies. |

4.1.21 Federal ID Number

| | |
|---|---|
| Entity | A4 Invoice Header |
| Column Name | IIFETX |
| Label Name | Federal ID Number |
| System Name | |
| Data Type | CHAR(15) |
| Attribute Definition | |

4.1.22 First Name

| | |
|---|---|
| Entity | ARM: Adjustor Master |
| Column Name | ALFSNM |
| Label Name | First Name |
| System Name | |
| Data Type | CHAR(15) |
| Attribute Definition | |

4.1.23 First Name

| | |
|---|---|
| Entity | ARM: Insured Detail |
| Column Name | IRFSNM |
| Label Name | First Name |
| System Name | |
| Data Type | CHAR(15) |
| Attribute Definition | |

4.1.24 First Name

| | |
|---|---|
| Entity | ARM: Renter Detail |
| Column Name | RKFSNM |
| Label Name | First Name |
| System Name | |
| Data Type | CHAR(15) |
| Attribute Definition | |

4.1.25 Group

| | |
|---|---|
| Entity | ARM: Rental Location Master |
| Column Name | Group |
| Label Name | Group Number |
| System Name | |
| Data Type | CHAR(2) |
| Attribute Definition | |

4.1.26 Insurance Claim Number

| | |
|---|---|
| Entity | ARM: Authorization(Claim Info) |
| Column Name | AZCLNO |
| Label Name | Insurance Claim Number |
| System Name | |
| Data Type | CHAR(20) |
| Attribute Definition | |

4.1.27 Invoice Number

| | |
|---|---|
| Entity | A4 Invoice Header |
| Column Name | I1INNO |
| Label Name | Invoice Number |
| System Name | |
| Data Type | CHAR(20) |
| Attribute Definition | |

4.1.28 Last AUT Day

| | |
|---|---|
| Entity | A4 Cross Reference |
| Column Name | X4LADT |
| Label Name | LAST AUT DAY |
| System Name | |
| Data Type | NUMERIC(8) |
| Attribute Definition | |

4.1.29 Last Name

| | |
|---|---|
| Entity | ARM: Adjustor Master |
| Column Name | ALLSNM |
| Label Name | Last Name |
| System Name | |
| Data Type | CHAR(20) |
| Attribute Definition | |

4.1.30 Last Name

| | |
|---|---|
| Entity | ARM: Insured Detail |
| Column Name | IRLSNM |
| Label Name | Last Name |
| System Name | |
| Data Type | CHAR(20) |
| Attribute Definition | |

4.1.31 Last Name

| | |
|---|---|
| Entity | ARM: Renter Detail |
| Column Name | RKLSNM |
| Label Name | Last Name |
| System Name | |
| Data Type | CHAR(20) |
| Attribute Definition | |

4.1.32 Loss Type Code

| | |
|---|---|
| Entity | AUTHORIZATION EXTENSION |
| Column Name | loss__typ__cde |
| Label Name | loss type code: |
| System Name | LOSSTYPCDE |
| Data Type | DEC(3, 0) |
| Attribute Definition | The loss type code defines the different loss categories when an Insurance Company authorizes a Rental. For example: Theft, Drivable, Repairable, Non-drivable, Non-repairable, Totaled. |

4.1.33 Loss Type Description

| | |
|---|---|
| Entity | LOSS TYPE |
| Column Name | loss__typ__dsc |
| Label Name | loss type description: |
| System Name | LOSSTYPDSC |
| Data Type | CHAR(40) |
| Attribute Definition | The loss type description is a lexical definition of the loss type code which defines the different loss categories when an Insurance Company authorizes a Rental. For example: Theft, Drivable, Repairable, Non-drivable, Non-repairable, Totaled. |

4.1.34 Max $ Covered

| | |
|---|---|
| Entity | ARM: Authorization (Claim Info) |
| Column Name | AZ$MAX |
| Label Name | MAX $ Covered |
| System Name | |
| Data Type | DECIMAL(9, 2) |
| Attribute Definition | |

4.1.35 Message ECARS Indicator

| | |
|---|---|
| Entity | AUTHORIZATION MESSAGE |
| Column Name | msg__ecars__ind |
| Label Name | message ecars indicator: |
| System Name | MSGECARIND |
| Data Type | CHAR(1) |
| Attribute Definition | The message ecars indicator indicates whether the message is sent/received from the ecars system. |

4.1.36 Note

| | |
|---|---|
| Entity | ARM: ARMS/400 Diary Notes File |
| Column Name | NENOTE |
| Label Name | NOTE |
| System Name | |
| Data Type | CHAR(50) |
| Attribute Definition | |

4.1.37 Number of Days Authorized

| | |
|---|---|
| Entity | ARM: Authorization(Claim Info) |
| Column Name | AZAUDY |
| Label Name | Number Of Days Authorized |
| System Name | |
| Data Type | DECIMAL(3) |
| Attribute Definition | |

4.1.38 Rate Charged

| | |
|---|---|
| Entity | ARM: Authorization(Claim Info) |
| Column Name | AZRTCH |
| Label Name | Rate Charged |
| System Name | |
| Data Type | DECIMAL(5, 2) |
| Attribute Definition | |

4.1.39 Record Add Date

| | |
|---|---|
| Entity | A4 Invoice Header |
| Column Name | I1ADDT |
| Label Name | Record Add Date |
| System Name | |
| Data Type | NUMBER(8) |
| Attribute Definition | |

4.1.40 Rental Location

| | |
|---|---|
| Entity | ARM: Authorization(Claim Info) |
| Column Name | AZRNLC |
| Label Name | Rental Location |
| System Name | |
| Data Type | CHAR(10) |
| Attribute Definition | |

4.1.41 Renter Email

| | |
|---|---|
| Entity | RENTER EXTENSION |
| Column Name | rentr_eml |
| Label Name | renter email: |
| System Name | RENTREML |
| Data Type | CHAR(70) |
| Attribute Definition | The email address of the renter. |

4.1.42 Renter Make/Model

| | |
|---|---|
| Entity | ARM: Renter Detail |
| Column Name | RKVHMM |
| Label Name | Renter Make/Model |
| System Name | |
| Data Type | CHAR(15) |
| Attribute Definition | |

4.1.43 Renter Vehicle Year

| | |
|---|---|
| Entity | ARM: Renter Detail |
| Column Name | RKVHYR |
| Label Name | Renter Vehicle Year |
| System Name | |
| Data Type | NUMERIC(4) |
| Attribute Definition | |

4.1.44 Renters Day Phone Extension

| | |
|---|---|
| Entity | ARM: Renter Detail |
| Column Name | RKDYEX |
| Label Name | Renters Day Phone Extension |
| System Name | |
| Data Type | NUMERIC(4) |
| Attribute Definition | |

4.1.45 Renters Night Phone

| | |
|---|---|
| Entity | ARM: Renter Detail |
| Column Name | RKNTPH |
| Label Name | Renters Night Phone |
| System Name | |
| Data Type | NUMERIC(10) |
| Attribute Definition | |

4.1.46 Renters Night Phone Extension

| | |
|---|---|
| Entity | ARM: Renter Detail |
| Column Name | RKNTEX |
| Label Name | Renters night Phone Extension |
| System Name | |
| Data Type | NUMERIC(4) |
| Attribute Definition | |

4.1.47 Repair Facility Name

| | |
|---|---|
| Entity | ARM: Repair Detail |
| Column Name | RURFNM |
| Label Name | Repair Facility Name |
| System Name | |
| Data Type | CHAR(35) |
| Attribute Definition | |

4.1.48 Standard Message Description

| | |
|---|---|
| Entity | STANDARD MESSAGE |
| Column Name | std_msg_dsc |
| Label Name | standard message description: |
| System Name | STDMSGDSC |
| Data Type | CHAR(50) |
| Attribute Definition | The standard message description if a lexical definition for standard message code which defines a predefined message which is applicable to specific activity type code. For example: "Authorization confirmed on & Date with Reservation Number & Resnumber" |

4.1.49 Start Date

| | |
|---|---|
| Entity | ARM: Authorization(Claim Info) |
| Column Name | AZSTDT |
| Label Name | Start Date |
| System Name | |
| Data Type | NUMERIC(8) |
| Attribute Definition | |

4.1.50 State

| | |
|---|---|
| Entity | ARM: Rental Location Master |
| Column Name | LOSACD |
| Label Name | State |
| System Name | |
| Data Type | CHAR(2) |
| Attribute Definition | |

4.1.51 State

| | |
|---|---|
| Entity | ARM: Renter Detail |
| Column Name | RKSACD |
| Label Name | State |
| System Name | |
| Data Type | CHAR(2) |
| Attribute Definition | |

4.1.52 State

| | |
|---|---|
| Entity | ARM: Repair Detail |
| Column Name | RUSACD |
| Label Name | State |
| System Name | |
| Data Type | CHAR(2) |
| Attribute Definition | |

4.1.53 Status Description

| | |
|---|---|
| Entity | ARM: ARMS/400 Cross Reference Status Table File |
| Column Name | XUSTDS |
| Label Name | Status Description |
| System Name | |
| Data Type | CHAR(6) |
| Attribute Definition | |

4.1.54 Telephone Number

| | |
|---|---|
| Entity | ARM: Rental Location Master |
| Column Name | LOPHNO |
| Label Name | Telephone Number |
| System Name | |
| Data Type | NUMERIC(10) |
| Attribute Definition | |

4.1.55 Telephone Number

| | |
|---|---|
| Entity | ARM: Repair Detail |
| Column Name | RUPHNO |
| Label Name | Telephone Number |
| System Name | |
| Data Type | NUMERIC(10) |
| Attribute Definition | |

4.1.56 Total Amount Due

| | |
|---|---|
| Entity | A4 Invoice Trailer |
| Column Name | 13BL$$ |
| Label Name | Total Amount Due |
| System Name | |
| Data Type | DECIMAL(9, 2) |
| Attribute Definition | |

4.1.57 Total Amount Received

| | |
|---|---|
| Entity | A4 Invoice Trailer |
| Column Name | 13RC$$ |
| Label Name | Total Amount Received |
| System Name | |
| Data Type | DECIMAL(9, 2) |
| Attribute Definition | |

4.1.58 Total Ticket Charges

| | |
|---|---|
| Entity | A4 Invoice Trailer |
| Column Name | 13TO$$ |
| Label Name | Total Ticket Charges |
| System Name | |
| Data Type | DECIMAL(9, 2) |
| Attribute Definition | |

4.1.59 Transmission Code

| | |
|---|---|
| Entity | ARM: ARMS/400 Diary Notes File |
| Column Name | NETRCD |
| Label Name | Transmission Code |
| System Name | |
| Data Type | Char(1) |
| Attribute Definition | |

4.1.60 Vehicle Class

| | |
|---|---|
| Entity | ARM: Authorization(Claim Info) |
| Column Name | AZVHCS |
| Label Name | Vehicle Class |
| System Name | |
| Data Type | CHAR(2) |
| Attribute Definition | |

4.1.61 Vehicle Rate

| | |
|---|---|
| Entity | ARM: Authorization(Claim Info) |
| Column Name | AZVHRT |
| Label Name | Vehicle Rate |
| System Name | |
| Data Type | DECIMAL(5, 2) |
| Attribute Definition | |

4.1.62 Zip Code

| | |
|---|---|
| Entity | ARM: Rental Location Master |
| Column Name | LOZPCD |
| Label Name | Zip Code |
| System Name | |
| Data Type | CHAR(9) |
| Attribute Definition | |

4.1.63 Zip Code

| | |
|---|---|
| Entity | ARM: Rental Detail |
| Column Name | RKZPCD |
| Label Name | Zip Code |
| System Name | |
| Data Type | CHAR(9) |
| Attribute Definition | |

4.1.64 Zip Code

| | |
|---|---|
| Entity | ARM: Repair Detail |
| Column Name | RUZPCD |
| Label Name | Zip Code |
| System Name | |
| Data Type | CHAR(9) |
| Attribute Definition | |

Functional Design Specification

Handle Unapproved Invoices

Version 1.1

1. Handle Unapproved Invoices Use Case 1.1 Brief Description

The Handle Unapproved Invoices use case describes how the Adjuster would review invoices and approve them for payment. The use case will then describe the processes the Adjuster will follow in the case where the Adjuster is the one that is actually paying the invoice.

1.2 Use Case Actors

The following actors will interact with this use case:

ADJUSTER—The ADJUSTER will use this case to approve and either pay unapproved invoices or send them on to a PROCESSOR for payment.

1.3 Pre-Conditions

The ADJUSTER must be logged into the ARMS Web system.

The ADJUSTER'S office must be set up for individual approval of invoices.

The ADJUSTER must be able to handle invoices.

1.4 Flow of Events

The Flow of Events will include the necessary steps for an ADJUSTER to approve and pay invoices.

Figure 131A:
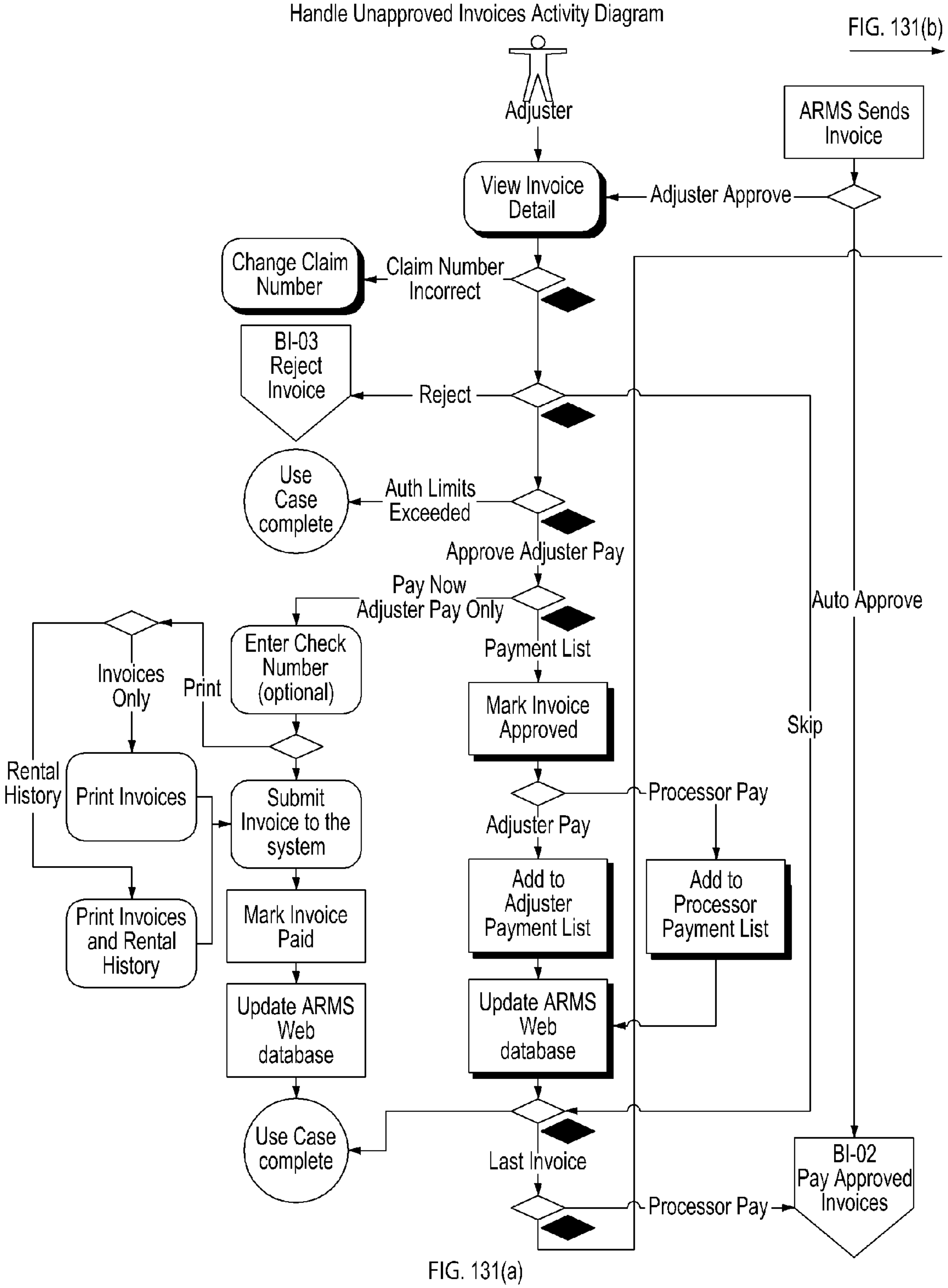
Figures 131A, 131B:
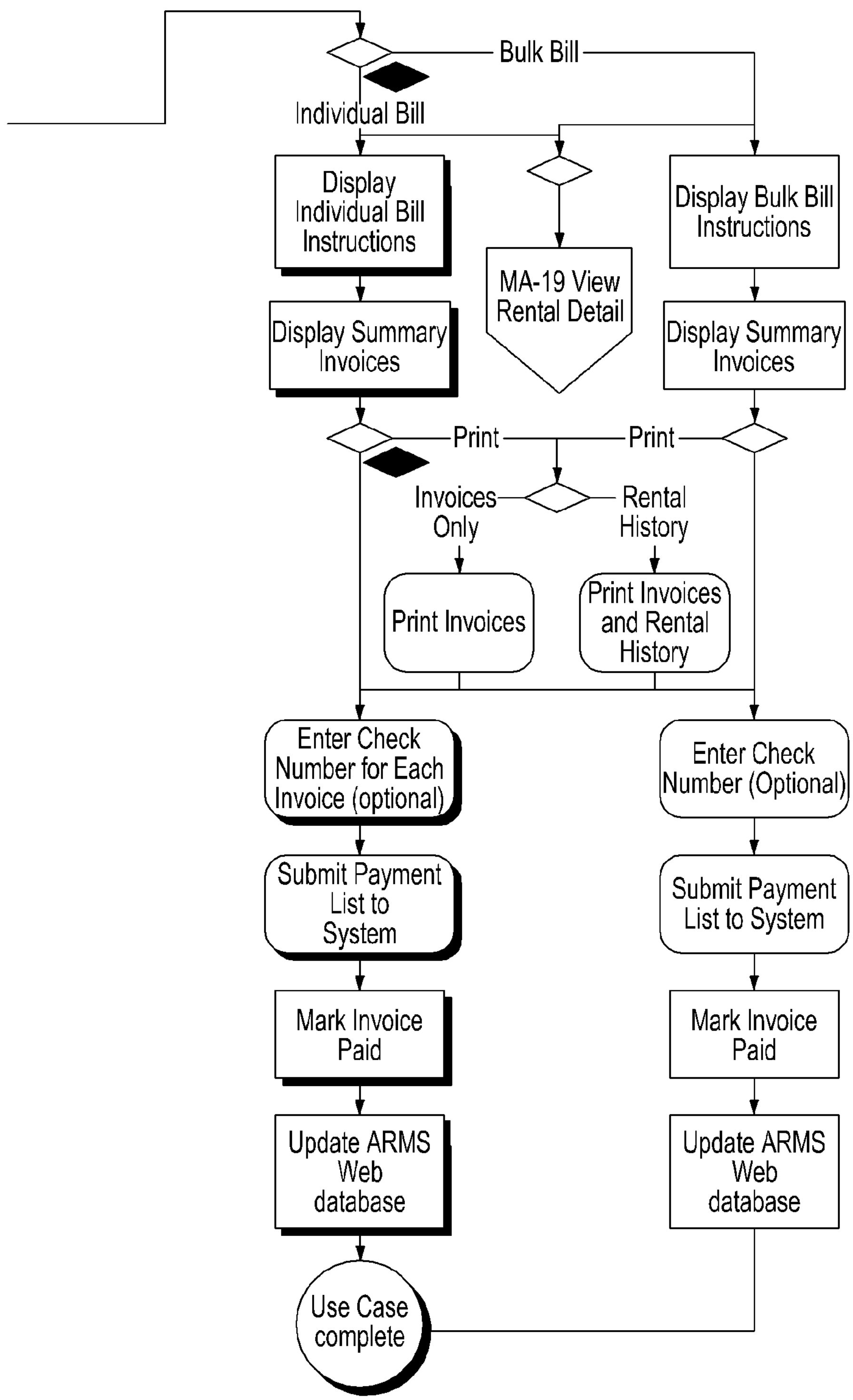

1.4.1 Activity Diagram—see FIG. 131.

1.4.2 Basic Flow

1. The ADJUSTER will view the detail of the invoice.
2. If the ADJUSTER chooses to pay the invoice immediately, execute subflow 1.4.2.3—Pay a Single Invoice. Otherwise continue the Basic Flow.
3. The ADJUSTER will approve the invoice.
4. The system will mark the invoice approved.
5. If the ADJUSTER pays their invoices, then the invoice will be added to their payment list. If a PROCESSOR pays their invoices, then the invoice will be added to the PROCESSOR'S payment list.
6. The system will update the ARMS Web database.
7. If this is the last or only invoice in the action items list, then continue to step eight of the Basic Flow. Otherwise, the use case ends.
8. The system will check to see if the ADJUSTER'S office is set up for individual payment or bulk payment.

If the ADJUSTER'S office is set up for individual payment execute subflow 1.4.2.1, Individual Pay.

If the ADJUSTER'S office is set up for bulk payment execute subflow 1.4.2.2, Bulk Pay.

1.4.2.1 Individual Payment List

1. The system will display instructions for paying the invoices individually and a summary list of all the invoices just approved by the ADJUSTER.
2. For each invoice on the payment list, the ADJUSTER may enter the associated check number.
3. The ADJUSTER will submit the payment list to the system.
4. The system will mark the invoice paid.
5. The system will update the ARMS Web database.
6. This ends the use case.

1.4.2.2 Bulk Payment List

1. The system will display instructions for paying the invoices in bulk and a summary list of all the invoices just approved by the ADJUSTER.
2. The ADJUSTER may enter the check number of the check that is paying all the invoices on the payment list.
3. The ADJUSTER will submit the payment list to the system.
4. The system will mark the invoice paid.
5. The system will update the ARMS Web database.
6. This ends the use case.

1.4.2.3 Pay a Single Invoice

1. The ADJUSTER may enter the check number for the invoice being paid.
2. The system will mark the invoice paid.
3. The system will update the ARMS Web database.
4. This ends the use case.

1.4.3 Alternative Flows 1.4.3.1 Selected Action Item is Payment List

At step one of the Basic Flow, if the action item being worked is the "Payment List" action item, then the ADJUSTER will be taken immediately to step one of section 1.4.2.1 if they are set up for individual pay, or step one of section 1.4.2.2 if they are set up for bulk pay.

1.4.3.2 Reject an Invoice

At step one in the Basic Flow, the ADJUSTER may choose to reject the invoice. The rejection process is executed using extension point BI-03—Reject an Invoice.

1.4.3.3 View Customer File

At Individual Payment List or Bulk Payment List, the ADJUSTER may choose to view detail information about the rental. The view rental detail process is executed using extension point MA-19—View Customer File.

1.4.3.4 Print a Single Invoice

At step one in the Basic Flow, the ADJUSTER may choose to print the invoice. If they so choose, they may also print the rental history. The system will display a printer friendly screen and the ADJUSTER will choose to print via their browser window. Upon printing, the ADJUSTER will choose to return to the step one of the Basic Flow by hitting the "back" button on the web browser.

1.4.3.5 Print an Invoice List

At step one in section 1.4.2.1, Individual Pay, or section 1.4.2.2, Bulk Pay, the ADJUSTER may choose to print the invoice list of all invoices on the Payment List. If they so choose, they may also print the rental history for all invoices. The system will display a printer friendly screen and the ADJUSTER will choose to print via their browser window. Upon printing, the ADJUSTER will choose to return to the step one of section 1.4.2.1 if the ADJUSTER is set up for Individual Pay, or section 1.4.2.2 if the ADJUSTER is set up for Bulk Pay.

1.4.3.6 Skip Invoice

At step three in the Basic Flow, the ADJUSTER may choose to skip the invoice in question and handle it at a later time. The ADJUSTER will be taken to the next action item on their action item list. The status of the invoice should not be changed by the ARMS Web system.

1.4.3.7 Payment by Processor

If the ADJUSTER is only responsible for approving the invoice, then, after step four in the Basic Flow, the system will make the approved invoice an action item for the PROCESSOR(S) responsible for paying the ADJUSTER'S invoices. This ends the use case. Payment by PROCESSOR is handled via Functional Specification BI-02—Pay Approved Invoices.

1.4.3.8 Amount Being Approved Exceeds USER'S Authorization Limits

When a USER attempts to approve an invoice for payment, the system will check to see if the amount due on the invoice is greater than the USER's authorization amount. If the amount due is greater than the USER'S limit, the system will not allow the approval and will request that the USER transfer the invoice to another user with authorization limits that are great enough to approve the invoice.

1.4.3.9 Change Claim Number

At step one in the Basic Flow, if the status is "rejected" and if the profile allows, the ADJUSTER may choose to change the claim number associated with an invoice. Once a claim number has been updated, the ADJUSTER will continue with step four of the basic.

1.5 Post-Conditions

If the use case was successful and the ADJUSTER is responsible for paying invoices, the approved invoices should be marked as paid in the ARMS Web system.

If the use case was successful and the ADJUSTER is only responsible for approving invoices, then the approved invoices should be marked as adjuster approved in the ARMS Web system.

1.6 Special Requirements

The additional requirements of the business use case are included here. These are requirements not covered by the flow as they have been described in the sections above.

1.6.1 ARMS Web Routes Invoices

Before an ADJUSTER receives an invoice to be approved, the ARMS Web system will look at the invoicing criteria for the owning office and owning adjuster and make a determination as to whether the invoice is auto approved or adjuster approved. If an invoice is auto approved, the invoice will always be assigned to a processor for payment without it ever being sent to an adjuster for approval. The payment method may be either bulk or individual payment.

1.6.2 Includes Tax and Surcharge Data Field

On the invoice next to the authorized amount, the field "Includes Tax and Surcharge" will be displayed next to the Authorized total if that total should include taxes and surcharges. This will occur in two events. For an insured, if the authorized amount is less than the policy daily amount, the authorized total will include taxes and surcharges up to the policy daily amount. For a claimant, the authorized amount will always include taxes and surcharges, without limit, until the rental is terminated by the ADJUSTER.

1.6.3 Data Fields to Assist with Future Releases or Customer Integration

It must be possible to capture the following information at some point in the future because of either planned future releases or customer integration.

Amount Being Paid on Each Invoice 1.7 Extension Points

An extension point indicates a link between this use case and another use case. Extension points associated with the use case are indicated below. Clicking on the extension point will open the related use case.

1.7.1 BI-03 Reject an Invoice

The Reject an Invoice Functional Specification is used to reject a specific invoice to Enterprise due to missing required information or an incorrect amount on the bill. Upon completion of the Reject an Invoice Functional Specification, the ADJUSTER should be returned to step six of the Basic Flow in the Handle Unapproved Invoices Functional Specification. Any previously approved invoices should still be approved in the system. The rejected invoice should be marked as rejected by the system. The Handle Unapproved Invoices Functional Specification will only allow for one invoice to be rejected at a time.

1.7.2 MA-19-View Rental Detail

The View Rental Detail Functional Specification is used to review the rental history in regards to a specific rental. Upon completion of the View Rental Detail Functional Specification, the ADJUSTER should be returned to step four of the Basic Flow in the Handle Unapproved Invoices Functional Specification. Any previously approved invoices should still be approved in the system.

2. Screen Design

A definition of the screen layout(s), screen data fields, and screen functions that are used to implement the flows identified above. More than one screen may be used to implement support for the use case flow.

2.1 Invoicing—Individual Payment

This screen will allow the user to choose to view the invoice selected in the action items list. They will choose to either pay this invoice immediately (pay now), or choose to add it to a payment list for payment later in conjunction with all their other invoices. They may also choose to print the invoice from this page. They may also optionally choose to print the rental history. The user may choose to change the claim number. Finally the user may choose to skip this invoice and leave it until later for review.

2.11 Invoicing—Individual Payment—see FIG. 132

| Screen Label | Type | Size | Screen Field Name | Data Field | Screen Specific Rule |
|---|---|---|---|---|---|
| | Output | 30 | Rental Location's Mailing Street Address | Address Line + Address Line2 | |
| | Output | 15 | Line Item Charge Description | Item Description | This line may repeat multiple times depending on the number of taxes and surcharges that apply. |
| | Output | 15.2 | Line Item Charge Description | Item Amount | Line Item Charge Qty * Line Item Charge Amount. This line may repeat multiple times depending on the number of taxes and surcharges that apply. |
| Claim No: | Input | 15 | Claim Number | Insurance Claim Number | |
| Invoice Date: | Output | 10 | Invoice Date (Ecar's Ticket Date) | Record Add Date | |
| Reference: | Output | 20 | Invoice ID | Invoice Number | Rental Group ID + Rental Branch ID + ECARS Ticket Number |
| Please include this reference number on your check | Output | 20 | Invoice Id | Invoice Number | Rental Group Id + Rental Branch Id + ECARS Ticket Number |
| Federal ID: | Output | 30 | Location's Federal Id. | Federal ID Number | |
| Federal ID: | Output | 30 | Location's Federal ID | Federal ID Number | |
| Amount Received | Output | 15.2 | Amount of rental Charges received | Total Amount Received | |

-continued

| Screen Label | Type | Size | Screen Field Name | Data Field | Screen Specific Rule |
|---|---|---|---|---|---|
| Total Due: | Input | 15.2 | Total Amount Due from Ins. Company | Total Amount Due | |
| Total Charges: | Output | 15.2 | Total Rental Ticket Charges | Total Ticket Charges | |
| Handling For: | Output | 30 | Handling for Adjuster's Name | First Name + Last Name | Adjuster's First name + Adjuster's last name. The name of the adjuster to which the invoice is currently assigned. |
| | Output | 150 | Messages | NOTE | This field will repeat multiple lines for all diary notes (messages) for this reservation. |
| to | Output | 10 | Authorization Termination Date | End Date | |
| to | Output | 10 | Authorization Termination Date | End Date | |
| Direct Bill Percent | Output | 15.0 | Authorized Bill percentage | Bill to % | |
| Direct Bill Percent | Output | 15.0 | Authorized Bill percentage | Bill to % | |
| Authorized Period: | Output | 10 | Authorized Start Date | Start Date | |
| Billed Period: | Output | 10 | Authorized Start Date | Start Date | |
| Claim Number | Input | 15 | Claim Number | Insurance Claim Number | Will be pre-filled with the claim number currently on the authorization. |
| to | Output | 10 | Close date of Rental Ticket | End Date | |
| Policy: Daily Rate-Max Dollars: | Output | 15.2 | Policy Daily Maximum Amount + Policy Maximum | Dollars Per Day Covered | |
| Policy: Daily Rate/Max Dollars: | Output | 15.2 | Policy Daily Maximum Amount + Policy Maximum | Max $ Covered | |
| Rental Period: | Output | 10 | Start date of Rental Ticket | Start Date | |
| Insured Name | Output | 30 | Insured's Name | First Name + Last Name | |
| For | Output | 30 | Insured's name | First Name + Last Name | |
| | Output | 30 | Rental Location's Mailing City, State and Zip Code | City + State + Zip Code | |
| | Output | 30 | Rental Location's Mailing Street Stress | Address Line + Address Line2 | |
| | Output | 15 | Rental Location's Phone Number | Telephone Number | |
| | Output | 30 | Rental Location's mailing City, State, and Zip | City | |
| | Output | 30 | Rental Location's Mailing City, State, and Zip | State | |
| | Output | 30 | Rental Location's mailing City, State, and Zip | Zip Code | |
| | Output | 30 | Rental Location's Mailing Street Address | Address Line + Address Line2 | |
| | Output | 15 | Rental Location's Phone Number | Telephone Number | This field is repeated for each invoice in the payment list. |
| Renter | Output | 30 | Renter's Name | First Name + Last Name | |
| ( | Output | 5 | Number of Authorized Days | CALCULATED | |

-continued

| Screen Label | Type | Size | Screen Field Name | Data Field | Screen Specific Rule |
|---|---|---|---|---|---|
| ( | Output | 5 | Number of authorized days | CALCULATED | |
| ( | Output | 5 | Number of Rental Days | CALCULATED | |
| Total Due | Output | 15.2 | Total Amount Due from Ins. Company | CALCULATED | Total Charges – Amount Received |
| Number of Authorized Dates + ”@” + authorized Daily Rate + “/day=“ | Output | 15.2 | Total Authorized Amount before tax and surcharge | CALCULATED | Number of Authorized Days * Authorized Daily Rate |
| Total authorized includes Tax & Surcharge | Output | 15.2 | Total authorized amount with Tax and surcharge | CALCULATED | (Number of authorized Days * Authorized Daily Rate) + Calculated Tax and surcharge |
| Number of Rental Days + “@” + ECAR’s Ticket Daily Rate + “/day=“ | Output | 15.2 | Total Ticket Rental Amount before tax and surcharge | CALCULATED | Number of Rental Days * ECARS Ticket Daily Rate. |
| Claim Type: | Output | 10 | Claim Type | claim type description | |
| Claims Office: | Output | 3 | Office Id | external organization abbreviated name | The claims office id which the user is currently process work for. |
| Vehicle Condition | Output | 20 | Loss Type | loss type description | |
| Rental | Output | 30 | Rental Location’s Accounting Name | accounting name | |
| Send Payment To: | Output | 30 | Rental Location’s Accounting Name | accounting name | |
| Check Number for your payment | Input | 20 | Check Number | check number | |

2.1.3 Screen Function Definition

This section includes the definitions for all functions that can be performed within the screen. This includes operations invoked by button clicks, specific shortcut keystrokes, or other actor activity.

2.1.3.1 Printer Friendly Page

When clicked, the user will be taken to the “Printer Friendly View” of the current invoice.

2.1.3.2 Reject

When clicked, the user will be taken to the Reject Invoice process.

2.1.3.3 Pay Now

When clicked, the system will edit the current information. If the edit passes, the invoice will be marked as paid and the data files updated. If the validation fails, the user will be returned to the current screen with the errors highlighted.

2.1.3.3.1 The system will validate that the user has an authorization limit high enough to approve the invoice. If not, the system will generate an error and ask the USER to transfer the invoice.

2.1.3.4 Add to Payment List

When clicked, the system will edit the current information for check number and claim number. If the edit passes, the invoice will be marked as approved and will be added to the ADJUSTER’S payment list and the user will be returned to the Review List process.

2.1.3.5 Skip>>

When clicked, the user will be advanced to the next action item to be processed and the current invoice will remain unchanged (un-approved).

2.1.3.6 Top of Page

When clicked, the user will be taken to the top of the current invoice page.

2.1.3.7 Transfer File

When clicked, the system will present a list of users that have authorization limits greater than the amount due on the invoice. The USER may then choose one user from this list to which they may transfer the file.

2.1.3.8 Policy Information

Policy Information will only be shown under the Authorized Section if the claim type is NOT claimant.

2.2 Invoicing—Approval

This screen will allow the user to choose to view the invoice selected in the action items list. They may choose to approve the invoice payment. This will add the invoice to the PROCESSOR(S) that are responsible for paying the ADJUSTER’S invoices. The user may also choose to skip this invoice and leave it until later for review. They may choose to print the invoice from this page. They may also optionally choose to print the rental history. Finally, the user may choose to change the claim number.

2.2.1 Screen Layout—Invoicing Approval.shtml—see FIG. 133

2.2.2 Invoice Approval

| Screen Label | Type | Size | Screen Field Name | Data Field | Screen Specific Rule |
|---|---|---|---|---|---|
| | Output | 152 | Line item Charge Amount | Item Amount | Line Item Charge Qty * Line Item Charge Amount. This line may repeat multiple times depending on the number of taxes and surcharges that apply. |
| | Output | 15 | Line Item Charge Description | Item Description | This line may repeat multiple times depending on the number of taxes and surcharges that apply. |
| Claim No: | Output | 15 | Claim Number | Insurance Claim Number | |
| Claim Number | | 15 | Claim Number | Insurance Claim Number | Will be pre-filled with claim number currently on authorization. |
| To | Output | 10 | Close Date of billing of Rental Ticket | Bill to End Date | |
| Invoice Date: | Output | 10 | Invoice Date (ECARs Ticket Date) | Record Add Date | |
| Reference | Output | 20 | Invoice Id | Invoice Number | Rental Group Id + Rental Branch Id + ECARS Ticket Number |
| Federal ID: | Output | 30 | Location's Federal Id. | Federal ID Number | |
| Billed Period | Output | 10 | Start date of billing of Rental Ticket | Bill to Start Date | |
| Amount Received: | Output | 15.2 | Amount of Rental received. | Total Amount Received | |
| Total Due | Output | 15.2 | Total amount due from Ins. Company | Total Amount Due | |
| Total Charges: | Output | 15.2 | Total Rental Ticket Charges | Total Ticket Charges | |
| Handling For: | Output | 30 | Handling for Adjuster's Name | First Name + Last Name | Adjuster's First name + Adjuster's last name. The name of the adjuster to which the invoice is currently assigned. |
| | Output | 50 | Messages | NOTE | This field will repeat multiple lines for all diary notes (messages) for a reservation |
| To | Output | 10 | Authorization Termination Date | End Date | |
| Direct Bill Percent: | Output | 15.0 | Authorized Bill percentage | Bill To % | |
| Direct Bill Percent | Output | 15.0 | Authorized Bill percentage | Bill To % | |
| Authorized Period: | Output | 10 | Authorized Start Date | Start Date | |
| To | Output | 10 | Close Date of Rental Ticket | End Date | |
| Policy: Daily Rate/Max Dollars | Output | 15.2 | Policy Daily Maximum Amount + Policy Maximum | Dollars Per Day Covered | |
| Policy: Daily Rate/Max Dollars | Output | 15.2 | Policy Daily Maximum Amount + Policy Maximum | Max $ Covered | |
| Rental Period: | Output | 10 | Start date of Rental Ticket | Start Date | |
| Insured Name: | Output | 30 | Insured's name | First Name + Last Name | |

-continued

| Screen Label | Type | Size | Screen Field Name | Data Field | Screen Specific Rule |
|---|---|---|---|---|---|
| For: | Output | 30 | Insured's Name | First Name + Last Name | Renter's Last Name + Renter's First Name |
| | Output | 30 | Rental Location's Mailing City, State and Zip Code | City + State + Zip Code | Mailing City + Mailing State + Mailing Zip |
| | Output | 30 | Rental Location's Mailing Street Address | Address Line + Address Line2 | |
| | Output | 15 | Rental Location's Phone Number | Telephone Number | |
| Date of loss: | Output | 20 | Date of loss | Date Of Loss | |
| Renter | Output | 30 | Renter's name | First Name + Last Name | Renter's Last Name + Renter's First Name |
| ( | Output | 5 | Number of Authorized Days | CALCULATED | Total number of authorized rental days |
| ( | Output | 5 | Number of Billed Days | CALCULATED | |
| ( | Output | 5 | Number of Rental Days | CALCULATED | Total number of authorized Rental Days |
| Total Due: | Output | 15.2 | Total Amount Due from Ins. Company | CALCULATED | Total Charges - Amount Received |
| Number of Authorized Days + "@" + Authorized Daily Rate + "/day=" | Output | 15.2 | Total authorized amount before tax and surcharge | CALCULATED | Number of Authorized Days * Authorized Daily Rate |
| Total authorized includes Tax & Surcharge | Output | 15.2 | Total Authorized Amount with tax and surcharge | CALCULATED | (Number of authorized Days * Authorized Daily Rate) + (Calculated Tax and surcharge) |
| Number of Rental Days + "@" + ECAR's Ticket Daily Rate + "/day=" | Output | 15.2 | Total Ticket Rental Amount before tax and surcharge | CALCULATED | Number of Rental Days * ECARS Ticket Daily Rate |
| Claim Type: | Output | 10 | Claim Type | claim type description | Claimant, Insured, etc. |
| Claims Office: | Output | 3 | Office Id | external organization abbreviated name | The claims office id which the user is currently process work for. |
| Rental | Output | 30 | Rental Location's Accounting Name | accounting name | |

2.2.3 Screen Function Definition

This section includes the definitions for all functions that can be performed within the screen. This includes operations invoked by button clicks, specific shortcut keystrokes, or other actor activity.

2.2.3.1 Printer Friendly Page

When clicked, the user will be taken to the "Printer Friendly View" of the current invoice.

2.2.3.2 Reject

When clicked, the user will be taken to the Reject Invoice process.

2.2.3.3 Approve for Payment

When clicked, the currently displayed invoice status will be marked as approved and the user will be taken to the next Action Items.

The system will validate that the user has an authorization limit high enough to approve the invoice. If not, the system will generate an error and ask the USER to transfer the invoice.

Another adjuster has not already approved the invoice.

2.2.3.4 Skip>>

When clicked, the user will be advanced to the next selected action item to be processed and the current invoice will remain unchanged (un-approved).

2.2.3.5 Top of Page

When clicked, the user will be taken to the top of the current invoice page.

2.2.3.6 Transfer File

When clicked, the system will present a list of users that have authorization limits greater than the amount due on the invoice. The USER may then choose one user from this list to which they may transfer the file.

2.2.3.7 Policy Information

Policy Information will only be shown under the Authorized Section if the claim type is NOT claimant.

2.3 Individual Payment List

This screen provides the user with information on what the system expects them to do, and requests a check number that will be used to pay each invoice. The user may also choose to print the invoices, and optionally print the rental history in addition to the invoices. The user may choose not to process the payment list at this time, in which case the payment list will be added to the user's action items list.

2.3.1 Screen Layout—invoicingPymtList.shtml—see FIG. 134

2.3.2 Individual Payment List

| Screen Label | Type | Size | Screen Field Name | Data Field | Screen Specific Rule |
|---|---|---|---|---|---|
| Claim Number | Input | 15 | Claim Number | Insurance Claim Number | Will be pre-filled with claim number currently on authorization. This field is repeated for each invoice in the payment list. This field is repeated for each invoice in the payment list. |
| Invoice Date | Output | 10 | Invoice Date (ECARS Ticket Date) | Record Add Date | This field is repeated for each invoice in the payment list. |
| Invoice: | Output | 20 | Invoice Id | Invoice Number | Rental Group Id + Rental Branch Id + ECARS Ticket Number This field is repeated for each invoice in the payment list. |
| Please include this reference number on your check: | Output | 20 | Invoice ID | Invoice Number | Rental Group ID + Rental Branch ID + ECARS Ticket number. This field is repeated for each invoice in the payment list. |
| Federal ID | Output | 30 | Location's Federal ID | Federal ID Number | This field is repeated for each invoice in the payment list. |
| Total Amount: | Output | 15.2 | Total amount due from Ins. Company | Total Amount Due | Total Charges – Amount Received This field is repeated for each invoice in the payment list. |
| Handling For: | Output | 30 | Handling for Adjuster's Name | First Name + Last Name | Adjuster's First name + Adjuster's last name. The name of the adjuster to which the invoice is currently assigned. |
| | Output | 30 | Insured's Name | First Name + Last Name | This field is repeated for each invoice in the payment list. |
| | Output | 30 | Rental Location's Mailing Street Address | Address Line + Address Line2 | This field is repeated for each invoice in the payment list. |
| | Output | 12 | Rental Location Telephone Number | Telephone Number | This field is repeated for each invoice in the payment list. |
| | Output | 30 | Rental Location's Mailing City, State and Zip Code | City + State + Zip Code | This field is repeated for each invoice in the payment list. |
| | Output | 30 | Rental Location's Mailing City State and Zip | City + State + Zip Code | This field is repeated for each invoice in the payment list. |
| | Output | 30 | Rental Location's Mailing Street Address | Address Line + Address Line2 | This field is repeated for each invoice in the payment list. |
| Date of loss | Output | 10 | Date of loss | Date Of Loss | This field is repeated for each invoice in the payment list. |
| Invoice | Output | 5 | Invoice List Number | CALCULATED | This field is repeated for each invoice in the payment list. |
| Claim type | Output | 10 | Claim Type | claim type description | This field is repeated for each invoice in the payment list. |
| Claims Office: | Output | 3 | Office Id | external organization abbreviated name | This claims office id which the user is currently process work for list. |

-continued

| Screen Label | Type | Size | Screen Field Name | Data Field | Screen Specific Rule |
|---|---|---|---|---|---|
| Vehicle Condition | Output | 10 | Loss Type | loss type description | This field is repeated for each invoice in the payment list. |
| Remit to: | Output | 30 | Rental Location's Accounting Name | accounting name | This field is repeated for each invoice in the payment list. |
| Rental: | Output | 30 | Rental Location's Accounting Name | accounting name | This field is repeated for each invoice in the payment list. |
| Send Payment to: | Output | 30 | Rental Location's Accounting Name | accounting name | This field is repeated for each invoice in the payment list. |
| Enter the check number of your payment here: | Input | 20 | Check Number | check number | This field is repeated for each invoice in the payment list. |

2.3.3 Screen Function Definition

This section includes the definitions for all functions that can be performed within the screen. This includes operations invoked by button clicks, specific shortcut keystrokes, or other actor activity.

2.3.3.1 Printer Friendly Page

When clicked, the user will be taken to the "Printer Friendly View" of the current invoice.

2.3.3.2 Confirm Payment

When clicked, system will mark the reservation as paid and update the database. The update will be passed to the Arms system.

2.3.3.3 Pay Later

When clicked, the user will be returned to view list and the requests will remain unchanged.

2.2.3.4 Top of Page

When clicked, the user will be taken to the top of the current invoice page.

2.4 Bulk Payment List

This screen provides the user with information on what the system expects them to do, and requests a check number that will be used to pay each invoice. The user may also choose to print the invoices, and optionally print the rental history in addition to the invoices. The user may choose not to process the payment list at this time, in which case the payment list will be added to the user's action items list.

2.4.1 Screen Layout—Bulk Payment List—see FIG. 135

2.4.2 Bulk Payment List

| Screen Label | Type | Size | Screen Field Name | Data Field | Screen Specific Rule |
|---|---|---|---|---|---|
| Claim Number | Input | 15 | Claim Number | Insurance Claim Number | Will be pre-filled with claim number currently on authorization. This field is repeated for each invoice in the payment list. |
| Invoice Date | Output | 10 | Invoice Date (ECARS Ticket Date) | Record Add Date | This field is repeated for each invoice in the payment list. |
| Please include this reference number on your check: | Output | 20 | Invoice ID | Invoice Number | Rental Group Id + Rental Branch Id + ECARS Ticket Number. This field is repeated for each invoice in the payment list. |
| Invoice: | Output | 20 | Invoice Id | Invoice Number | Rental Group ID + Rental Branch ID + ECARS Ticket number. This field is repeated for each invoice in the payment list. |
| Federal ID | Output | 30 | Location's Federal ID | Federal ID Number | This field is repeated for each invoice in the payment list. |
| Total Amount: | Output | 15.2 | Total amount due from Ins. Company | Total Amount Due | Total Charges - Amount Received. This field is repeated for each invoice in the payment list. |

-continued

| Screen Label | Type | Size | Screen Field Name | Data Field | Screen Specific Rule |
|---|---|---|---|---|---|
| Handling For: | Output | 30 | Handling for Adjuster's Name | First Name + Last Name | Adjuster's First name + Adjuster's last name. The name of the adjuster to which the invoice is currently assigned. |
| | Output | 30 | Insured's Name | First Name + Last Name | This field is repeated for each invoice in the payment list. |
| | Output | 30 | Rental Location's Mailing Street Address | Address Line + Address Line2 | This field is repeated for each invoice in the payment list. |
| | Output | 12 | Rental Location Telephone Number | Telephone Number | This field is repeated for each invoice in the payment list. |
| | Output | 30 | Rental Location's Mailing City, State and Zip Code | City + State + Zip Code | This field is repeated for each invoice in the payment list. |
| | Output | 30 | Rental Location's Mailing City State and Zip | City + State + Zip Code | This field is repeated for each invoice in the payment list. |
| | Output | 30 | Rental Location's Mailing Street Address | Address Line + Address Line2 | This field is repeated for each invoice in the payment list. |
| Date of loss | Output | 10 | Date of loss | Date Of Loss | This field is repeated for each invoice in the payment list. |
| Invoice | Output | 5 | Invoice List Number | CALCULATED | This field is repeated for each invoice in the payment list. Count |
| Claim type | Output | 10 | Claim Type | claim type description | This field is repeated for each invoice in the payment list. |
| Claims Office: | Output | 3 | Office Id | external organization abbreviated name | The claims office id which the user is currently process work for. |
| Vehicle Condition | Output | 10 | Loss Type | loss type description | This field is repeated for each invoice in the payment list. |
| Remit to: | Output | 30 | Rental Location's Accounting Name | accounting name | This field is repeated for each invoice in the payment list. |
| Send Payment to: | Output | 30 | Rental Location's Accounting Name | accounting name | This field is repeated for each invoice in the payment list. |
| Rental: | Output | 30 | Rental Location's Accounting Name | accounting name | This field is repeated for each invoice in the payment list. |

2.4.3 Screen Function Definition

This section includes the definitions for all functions that can be performed within the screen. This includes operations invoked by button clicks, specific shortcut keystrokes, or other actor activity.

2.4.3.1 Printer Friendly Page

When clicked, the user will be taken to the "Printer Friendly View" of the current invoices.

2.4.3.2 Confirm Payment

When clicked, the system will mark the reservation as paid and update the database. The update will be passed to the Arms system. The user will then be returned to the next action item or the Action Item screen if no more action items exist.

2.4.3.3 Pay Later

When clicked, the user will be returned to Action Items and the request will remain unchanged.

2.4.3.4 Top of Page

When clicked, the user will be taken to the top of the payment list.

3. Application Operations

This section will detail all the application operations that are part of this Functional Specification Document.

3.1 Get Unapproved Invoices (Adjuster Id)

The build unapproved invoice list operation finds all the invoices, that need approval, for the specified adjuster.

3.2 Approve Invoice (Invoice Number)

The approve invoice operation marks the specified invoice as approved. This invoice is now ready to be paid.

3.3 Get Approved Invoices (Adjuster Id)

The build approved invoice list operation finds all the approved invoices for the specified adjuster.

3.4 Get Invoice Detail (Invoice Number)

The build invoice detail operation gets the relevant invoice information for the specified invoice number.

3.5 Pay Invoice (Invoice Number, Check Number)

The pay invoice operation records the check number specified by the adjuster against the specified invoice and marks the invoice as paid.

4. Data Fields 4.1 Data Field Definition

This section includes a definition of all data fields included in the functional specification.

4.1.1 Accounting Name

| | |
|---|---|
| Entity | OFFDRB OFFICE DIRECTORY BRANCH MASTER |
| Column Name | acctg__nam |
| Label Name | Accounting Name |
| System Name | |
| Data Type | VARCHAR(8) |
| Attribute Definition | |

4.1.2 Action Item Assigned Date

| | |
|---|---|
| Entity | ACTION ITEM |
| Column Name | actn__item__assn__dte |
| Label Name | action item assigned date: |
| System Name | AITMASGNDT |
| Data Type | DATE |
| Attribute Definition | The action item assigned date is the date the action item was established and assigned to an administrator or adjustor. |

4.1.3 Action Item Complete Date

| | |
|---|---|
| Entity | ACTION ITEM |
| Column Name | actn__item__cmpl__dte |
| Label Name | action item complete date: |
| System Name | AITMCMPLDT |
| Data Type | DATE |
| Attribute Definition | The action item complete date is the date the action item was completed by an administrator or adjustor. |

4.1.4 Action Item Effective Date

| | |
|---|---|
| Entity | ACTION ITEM |
| Column Name | actn__item__eff__dte |
| Label Name | action item effective date: |
| System Name | AITMEFFDT |
| Data Type | DATE |
| Attribute Definition | The action item effective date is the date the action item will become effective. |

4.1.5 Action Item Status Code

| | |
|---|---|
| Entity | ACTION ITEM |
| Column Name | actn__item__stat__cde |
| Label Name | action item status code: |
| System Name | |
| Data Type | CHAR(6) |
| Attribute Definition | The action item status code defines the status of this action item. For example: |

4.1.6 Action Item Type Code

| | |
|---|---|
| Entity | ACTION ITEM |
| Column Name | actn__item__typ__cde |
| Label Name | action item type code: |
| System Name | |
| Data Type | DEC(3, 0) |
| Attribute Definition | The action item type code defines specific tasks/action items associated with the Rental Authorization/Reservation activities accomplished by adjustors and administrators when contracting an insured with a replacement vehicle. For example: Closing an Of |

4.1.7 Action Item Type Description

| | |
|---|---|
| Entity | ACTION ITEM TYPE |
| Column Name | actn__item__typ__dsc |
| Label Name | action item type description: |
| System Name | |
| Data Type | CHAR(40) |
| Attribute Definition | The action item type description is a lexical definition of an action item type code which defines specific tasks/action items associated with the Rental Authorization/Reservation activities accomplished by adjustors and administrators when contracting an |

4.1.8 Action Related Adjustor Code

| | |
|---|---|
| Entity | ACTION ITEM |
| Column Name | actn__rel__adjr__cde |
| Label Name | Adjustor Code |
| System Name | ARADJRCDE |
| Data Type | CHAR(10) |
| Attribute Definition | The action related adjustor code is the adjustor code of the adjustor/user which requires completion of some action item work activity such as an office closing and adjustors/users who need to be moved to another office. |

4.1.9 Action Related Company Identifier

| | |
|---|---|
| Entity | ACTION ITEM |
| Column Name | actn__rel__cmpy__id |
| Label Name | ARMS Profile ID |
| System Name | ARCMPYID |
| Data Type | CHAR(5) |
| Attribute Definition | The action related company identifier is the company identifier of the adjustor/user which requires completion of some action item work activity such as an office closing and adjustors/users who need to be moved to another office. |

4.1.10 Address Line

| | |
|---|---|
| Entity | ARM: Rental Location Master |
| Column Name | LOADL1 |
| Label Name | |
| System Name | |
| Data Type | CHAR(30) |
| Attribute Definition | |

4.1.11 Address Line2

| | |
|---|---|
| Entity | ARM: Rental Location Master |
| Column Name | LOADL2 |
| Label Name | Address Line |
| System Name | |
| Data Type | CHAR(30) |
| Attribute Definition | |

4.1.12 Adjustor Code

| | |
|---|---|
| Entity | ARM: Adjustor Master |
| Column Name | ALAACD |
| Label Name | Adjustor Code |
| System Name | |
| Data Type | CHAR(10) |
| Attribute Definition | |

4.1.13 ARMS Profile ID

| | |
|---|---|
| Entity | ACTION ITEM |
| Column Name | ALCUID |
| Label Name | ARMS Profile ID |
| System Name | |
| Data Type | CHAR(5) |
| Attribute Definition | The ARMS Profile ID is the company identifier used to uniquely define an authorization. |

4.1.14 ARMS Profile ID

| | |
|---|---|
| Entity | ARM: Adjustor Master |
| Column Name | ALCUID |
| Label Name | ARMS Profile ID |
| System Name | |
| Data Type | CHAR(5) |
| Attribute Definition | |

4.1.15 Assigned to Adjustor Code

| | |
|---|---|
| Entity | ACTION ITEM |
| Column Name | assgn__to__adjr__cde |
| Label Name | Adjustor Code |
| System Name | AADJRCDE |
| Data Type | CHAR(10) |
| Attribute Definition | The assigned to adjustor code is the adjustor code of the administrator or adjustor's who is assigned the action item. |

4.1.16 Assigned to Company Identifier

| | |
|---|---|
| Entity | ACTION ITEM |
| Column Name | assgn__to__cmpy__id |
| Label Name | ARMS Profile ID |
| System Name | ACMPYID |
| Data Type | CHAR(5) |
| Attribute Definition | The assigned to company identifier is the company identifier of the administrator or adjustor's who is assigned the action item. |

4.1.17 Bill to %

| | |
|---|---|
| Entity | ARM: Authorization(Claim Info) |
| Column Name | AZBTPC |
| Label Name | Bill To % |
| System Name | |
| Data Type | DECIMAL(3) |
| Attribute Definition | |

4.1.18 Bill to End Date

| | |
|---|---|
| Entity | A4 Invoice Header |
| Column Name | IIBTDT |
| Label Name | Bill to End Date |
| System Name | |
| Data Type | NUMERIC(8) |
| Attribute Definition | |

4.1.19 Bill to Start Date

| | |
|---|---|
| Entity | A4 Invoice Header |
| Column Name | IISRDT |
| Label Name | Bill to Start Date |
| System Name | |
| Data Type | NUMERIC(8) |
| Attribute Definition | |

4.1.20 Check Number

| | |
|---|---|
| Entity | RENTAL INVOICE PAYMENT |
| Column Name | chk__nbr |
| Label Name | check number: |
| System Name | CHKNBR |
| Data Type | DEC(11, 0) |
| Attribute Definition | |

4.1.21 City

| | |
|---|---|
| Entity | ARM: Rental Location Master |
| Column Name | LOCYNM |
| Label Name | City |
| System Name | |
| Data Type | CHAR(20) |
| Attribute Definition | |

4.1.22 Claim Type Description

| | |
|---|---|
| Entity | CLAIM TYPE |
| Column Name | clm__typ__dsc |
| Label Name | claim type description: |
| System Name | CLMTYPDSC |
| Data Type | CHAR(40) |
| Attribute Definition | The claim type description is a lexical definition of the claim type code which defines the different Authorization claim types. For example: Insured, Claimant, Uninsured Motorist, etc. |

4.1.23 Company Identifier

| | |
|---|---|
| Entity | EXTERNAL ORGANIZATION |
| Column Name | cmpy__id |
| Label Name | company identifier: |
| System Name | CMPYID |
| Data Type | DEC(11, 0) |
| Attribute Definition | Business Party Identifier is a surrogate key assigned to each unique occurrence of an Individual, External Organization, and Internal Organization (Business Party). |

4.1.24 Company Structure Level Code

| | |
|---|---|
| Entity | ACTION ITEM |
| Column Name | cmpy__strct__lvl__cde |
| Label Name | company structure level code: |
| System Name | CMPYSLVLCD |
| Data Type | DEC(3, 0) |
| Attribute Definition | The external organization structure level code identifies the kind or type of internal organizations of the external organizations which Enterprise Rent-A-Car does business with. Such as: Corporation, Branch Claims Office, Region, Area, Subregion, etc. |

4.1.25 Customer Transaction ID

| | |
|---|---|
| Entity | ACTION ITEM |
| Column Name | AZCUTI |
| Label Name | Customer Transaction ID |
| System Name | |
| Data Type | CHAR(20) |
| Attribute Definition | The Customer Transaction ID is the authorization transaction identifier which along with a company identifier uniquely define an authorization. |

4.1.26 Date of Loss

| | |
|---|---|
| Entity | ARM: Renter Detail |
| Column Name | RKLSDT |
| Label Name | Date of Loss |
| System Name | |
| Data Type | NUMERIC(8) |
| Attribute Definition | |

4.1.27 Dollars Per Day Covered

| | |
|---|---|
| Entity | ARM: Authorization(Claim Info) |
| Column Name | AZ$PDY |
| Label Name | Dollars Per Day Covered |
| System Name | |
| Data Type | DECIMAL(5, 2) |
| Attribute Definition | |

4.1.28 End Date

| | |
|---|---|
| Entity | ARM: Authorization(Claim Info) |
| Column Name | AZENDT |
| Label Name | End Date |
| System Name | |
| Data Type | NUMERIC(8) |
| Attribute Definition | |

4.1.29 External Organization Abbreviated Name

| | |
|---|---|
| Entity | EXTERNAL ORGANIZATION |
| Column Name | e__o__abbr__nam |
| Label Name | external organization abbreviated name: |
| System Name | EOABBRNAM |
| Data Type | CHAR(10) |
| Attribute Definition | External Organization Abbreviated Name is a shortened text based label associated with an organization outside of Enterprise. This name is sometimes used for accounting purposes. |

4.1.30 External Organization Identifier

| | |
|---|---|
| Entity | ALTERNATE ORGANIZATION |
| Column Name | e__o__id |
| Label Name | external organization identifier: |
| System Name | EOID |
| Data Type | DEC(11,0) |
| Attribute Definition | Business Party Identifier is a surrogate key assigned to each unique occurrence of an Individual, External Organization, and Internal Organization (Business Party). |

4.1.31 Federal ID Number

| | |
|---|---|
| Entity | A4 Invoice Header |
| Column Name | IIFETX |
| Label Name | Federal ID Number |
| System Name | |
| Data Type | CHAR(15) |
| Attribute Definition | |

4.1.32 First Name

| | |
|---|---|
| Entity | ARM: Adjustor Master |
| Column Name | ALFSNM |
| Label Name | First Name |
| System Name | |
| Data Type | CHAR(15) |
| Attribute Definition | |

4.1.33 First Name

| | |
|---|---|
| Entity | ARM: Insured Detail |
| Column Name | IRFSNM |
| Label Name | First Name |
| System Name | |
| Data Type | CHAR(15) |
| Attribute Definition | |

4.1.34 First Name

| | |
|---|---|
| Entity | ARM: Renter Detail |
| Column Name | RKFSNM |
| Label Name | First Name |
| System Name | |
| Data Type | CHAR(15) |
| Attribute Definition | |

4.1.35 Handled by Adjustor Code

| | |
|---|---|
| Entity | ACTION ITEM |
| Column Name | handl__by__adjr__cde |
| Label Name | Adjustor Code |
| System Name | HNDADJRCDE |
| Data Type | CHAR(10) |
| Attribute Definition | The handled by adjustor code is the adjustor code of the administrator or adjustor's who is handling the action item. |

4.1.36 Handled by Company Identifier

| | |
|---|---|
| Entity | ACTION ITEM |
| Column Name | handl__by__cmpy__id |
| Label Name | ARMS Profile ID |
| System Name | HNDCMPYID |
| Data Type | CHAR(5) |
| Attribute Definition | The handled by company identifier is the company identifier of the administrator or adjustor's who is handling the action item. |

4.1.37 Handling for Adjustor Code

| | |
|---|---|
| Entity | AUTHORIZATION ACTIVITY LOG |
| Column Name | handl__for__adtr__cde |
| Label Name | handling for adjustor code: |
| System Name | HNDADJRCDE |
| Data Type | CHAR(10) |
| Attribute Definition | The handling for adjustor coder is the adjustor code of an adjustor/user who is handling authorization activities for another adjustor/user in the ARMS Web application. |

4.1.38 Handling for Company Identifier

| | |
|---|---|
| Entity | AUTHORIZATION ACTIVITY LOG |
| Column Name | handl__for__cmpy__id |
| Label Name | handling for company identifier: |
| System Name | HNDCMPYID |
| Data Type | CHAR(5) |
| Attribute Definition | The handling for company identifier is the company identifier used to uniquely identify an adjustor/user who is handling authorization activities for another adjustor/user in the ARMS Web application. |

4.1.39 Insurance Claim Number

| | |
|---|---|
| Entity | A4 Invoice Header |
| Column Name | IICLNO |
| Label Name | Insurance Claim Number |
| System Name | |
| Data Type | CHAR(20) |
| Attribute Definition | |

4.1.40 Insurance Claim Number

| | |
|---|---|
| Entity | ARM: Authorization(Claim Info) |
| Column Name | AZCLNO |
| Label Name | Insurance Claim Number |
| System Name | |
| Data Type | CHAR(20) |
| Attribute Definition | |

4.1.41 Invoice Number

| | |
|---|---|
| Entity | A4 Invoice Header |
| Column Name | IIINNO |
| Label Name | Invoice Number |
| System Name | |
| Data Type | CHAR(20) |
| Attribute Definition | |

4.1.42 Item Amount

| | |
|---|---|
| Entity | A4 Invoice Detail |
| Column Name | I2IT$$ |
| Label Name | Item Amount |
| System Name | |
| Data Type | DECIMAL(7, 2) |
| Attribute Definition | |

4.1.43 Item Description

| | |
|---|---|
| Entity | A4 Invoice Detail |
| Column Name | I2ITDS |
| Label Name | Item Description |
| System Name | |
| Data Type | CHAR(30) |
| Attribute Definition | |

4.1.44 Item Quantity

| | |
|---|---|
| Entity | A4 Invoice Detail |
| Column Name | I2ITQY |
| Label Name | Item Quantity |
| System Name | |
| Data Type | DECIMAL(5) |
| Attribute Definition | |

4.1.45 Item Rate

| | |
|---|---|
| Entity | A4 Invoice Detail |
| Column Name | I2ITRT |
| Label Name | Item Rate |
| System Name | |
| Data Type | DECIMAL(7, 2) |
| Attribute Definition | |

4.1.46 Last Name

| | |
|---|---|
| Entity | ARM: Adjustor Master |
| Column Name | ALLSNM |
| Label Name | Last Name |
| System Name | |
| Data Type | CHAR(20) |
| Attribute Definition | |

4.1.47 Last Name

| | |
|---|---|
| Entity | ARM: Insured Detail |
| Column Name | IRLSNM |
| Label Name | Last Name |
| System Name | |
| Data Type | CHAR(20) |
| Attribute Definition | |

4.1.48 Last Name

| | |
|---|---|
| Entity | ARM: Renter Detail |
| Column Name | RKLSNM |
| Label Name | Last Name |
| System Name | |
| Data Type | CHAR(20) |
| Attribute Definition | |

4.1.49 Loss Type Description

| | |
|---|---|
| Entity | LOSS TYPE |
| Column Name | loss__typ__dsc |
| Label Name | loss type description: |
| System Name | LOSSTYPDSC |
| Data Type | CHAR(40) |
| Attribute Definition | The loss type description is a lexical definition of the loss type code which defines the different loss categories when an Insurance Company authorizes a Rental. For example: Theft, Drivable, Repairable, Non-drivable, Non-repairable, Totaled. |

4.1.50 Max $ Covered

| | |
|---|---|
| Entity | ARM: Authorization(Claim Info) |
| Column Name | AZ$MAX |
| Label Name | Max $ Covered |
| System Name | |
| Data Type | DECIMAL(9, 2) |
| Attribute Definition | |

4.1.51 Note

| | |
|---|---|
| Entity | ARM: ARMS/400 Diary Notes File |
| Column Name | NENOTE |
| Label Name | NOTE |
| System Name | |
| Data Type | CHAR(50) |
| Attribute Definition | |

4.1.52 Number of Days Authorized

| | |
|---|---|
| Entity | ARM: Authorization(Claim Info) |
| Column Name | AZAUDY |
| Label Name | Number Of Days Authorized |
| System Name | |
| Data Type | DECIMAL(3) |
| Attribute Definition | |

4.1.53 Record Add Date

| | |
|---|---|
| Entity | A4 Invoice Header |
| Column Name | IIADDT |
| Label Name | Record Add Date |
| System Name | |
| Data Type | NUMERIC(8) |
| Attribute Definition | |

4.1.54 Related Office Identifier

| | |
|---|---|
| Entity | ACTION ITEM |
| Column Name | rel__ofc__id |
| Label Name | related office identifier: |
| System Name | RELOFCID |
| Data Type | DEC(11, 0) |
| Attribute Definition | The related office identifier is the identifier of the office responsible for the action item. |

4.1.55 Remittance Reference #

| | |
|---|---|
| Entity | A4 Remit Reference No. |
| Column Name | Q5RMNO |
| Label Name | Remittance Reference # |
| System Name | |
| Data Type | NUMERIC(6) |
| Attribute Definition | |

1.56 Request Time

| | |
|---|---|
| Entity | ACTION ITEM TYPE |
| Column Name | XURSTP |
| Label Name | Request Type |
| System Name | XURSTP |
| Data Type | CHAR(1) |
| Attribute Definition | The request type is a code from the ARMS system which identifies whether adjustor action is necessary for an authorization and what type of action. |

4.1.57 Start Date

| | |
|---|---|
| Entity | ARM: Authorization(Claim Info) |
| Column Name | AZSTDT |
| Label Name | Start Date |
| System Name | |
| Data Type | NUMERIC(8) |
| Attribute Definition | |

4.1.58 State

| | |
|---|---|
| Entity | ARM: Rental Location Master |
| Column Name | LOSACD |
| Label Name | State |
| System Name | |
| Data Type | CHAR(2) |
| Attribute Definition | |

4.1.59 Status Code

| | |
|---|---|
| Entity | ACTION ITEM TYPE |
| Column Name | XUSTCD |
| Label Name | Status Code |
| System Name | XUSTCD |
| Data Type | CHAR(1) |
| Attribute Definition | The status code is a code from the ARMS system which identifies whether an authorization is a reservation, a ticket, unauthorized, invoiced, paid, etc. |

4.1.60 Telephone Number

| | |
|---|---|
| Entity | ARM: Rental Location Master |
| Column Name | LOPHNO |
| Label Name | Telephone Number |
| System Name | |
| Data Type | NUMERIC(10) |
| Attribute Definition | |

4.1.61 Total Amount Due

| | |
|---|---|
| Entity | A4 Invoice Trailer |
| Column Name | 13BL$$ |
| Label Name | Total Amount Due |
| System Name | |
| Data Type | DECIMAL(9,2) |
| Attribute Definition | |

4.1.62 Total Amount Received

| | |
|---|---|
| Entity | A4 Invoice Trailer |
| Column Name | 13RC$$ |
| Label Name | Total Amount Received |
| System Name | |
| Data Type | DECIMAL(9,2) |
| Attribute Definition | |

4.1.63 Total Billed to Others

| | |
|---|---|
| Entity | A4 Invoice Trailer |
| Column Name | 130T$$ |
| Label Name | Total Billed to Others |
| System Name | |
| Data Type | DECIMAL(9,2) |
| Attribute Definition | |

4.1.64 Total Ticket Charges

| | |
|---|---|
| Entity | A4 Invoice Trailer |
| Column Name | 13TO$$ |
| Label Name | Total Ticket Charges |
| System Name | |
| Data Type | DECIMAL(9,2) |
| Attribute Definition | |

4.1.65 Vehicle Rate

| | |
|---|---|
| Entity | ARM: Authorization(Claim Info) |
| Column Name | AZVHRT |
| Label Name | Vehicle Rate |
| System Name | |
| Data Type | DECIMAL(5,2) |
| Attribute Definition | |

4.1.66 Zip Code

| | |
|---|---|
| Entity | ARM: Rental Location Master |
| Column Name | LOZPCD |
| Label Name | Zip Code |
| System Name | |
| Data Type | CHAR(9) |
| Attribute Definition | |

5. Questions and Answers

Issue Number: 256

Question: The calculation for authorized limit when displaying the invoice detail does not take bill to percent into account when all the following conditions are true:

Policy Maximum=0

Policy Daily >0

Vehicle Rate >0

Vehicle Rate <Policy Daily or all the following conditions are true:

Policy Maximum >0

Policy Daily=0

Vehicle Rate >0

In all other cases, the amount is multiplied by the bill to percent to get the authorized limit. Is this calculation correct?

Status: Pending

Resolution: 3-14-00, DSE-Need to follow up with author to get a further understanding of question.

3-23-00, Issue Mtg., Will get addressed in current state and fix.

Issue Number: 257

Question: This is a presentation issue. The adjuster name on the invoice detail screen will not show up in certain cases. This code is in the *INZSR sub routine and needs some investigation of scenarios to determine the exact flaw.

Status: Closed—Resolved

Resolution: 3-14-00, DSE-Need to follow up with author to get a further understanding of question.

Functional Design Specification

Pay Approved Invoices (Processor Pay)

Version 1.0

1. Pay Approved Invoices Use Case 1.1 Brief Description

The Pay Approved Invoices use case describes how the PROCESSOR would review and pay invoices in the ARMS Web system.

1.2 Use Case Actors

The following actors will interact with this use case:

PROCESSOR—The PROCESSOR will use this use case to pay approved invoices.

1.3 Pre-Conditions

The PROCESSOR must be logged into the ARMS Web system.

The PROCESSOR'S office must be set up to handle processor payment of invoices.

The PROCESSOR must be authorized to handle invoices.

1.4 Flow of Events

The Flow of Events will include the necessary steps for a PROCESSOR to review and pay invoices.

Figure 136:
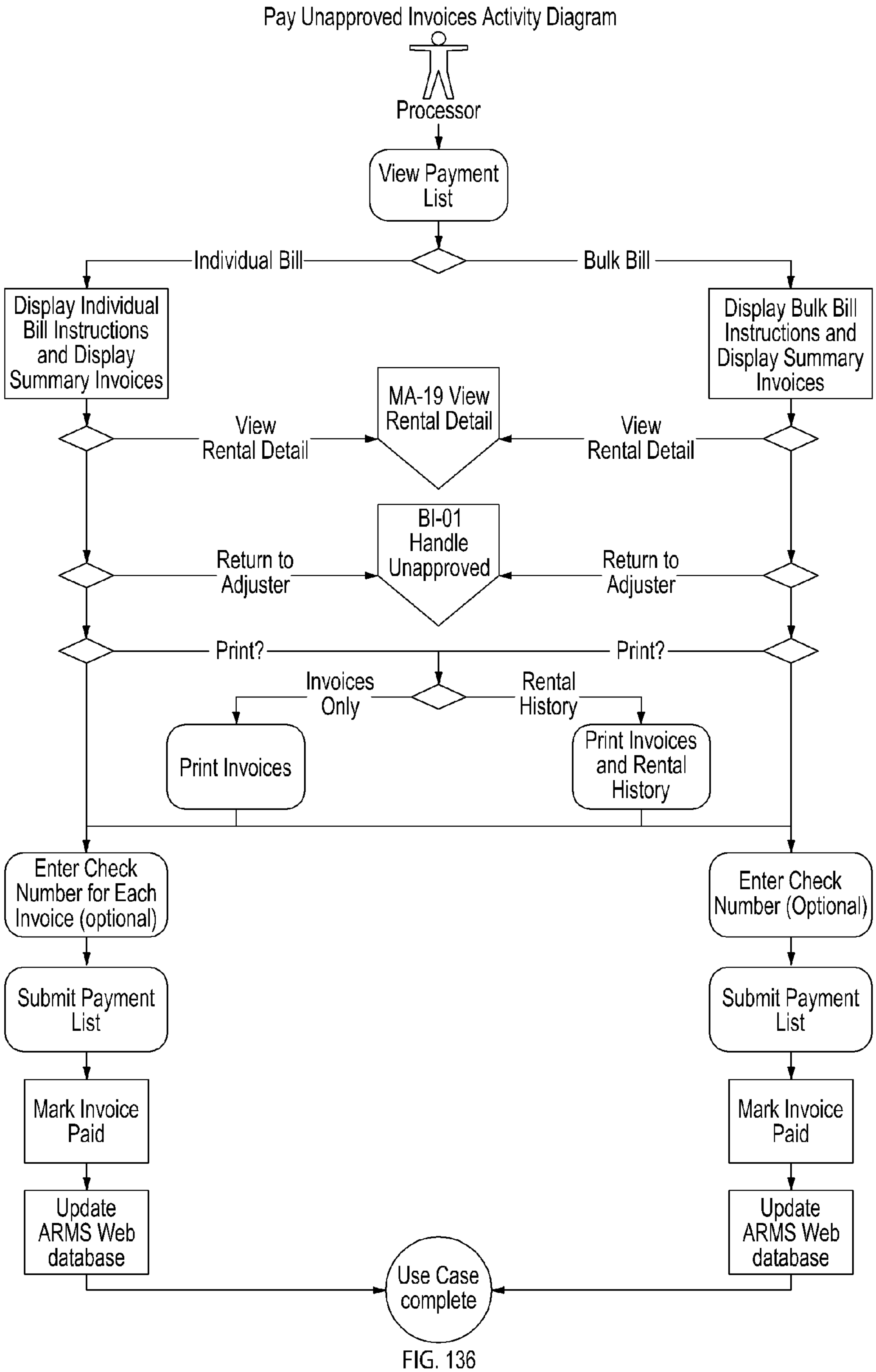

1.4.1 Activity Diagram—see FIG. 136

1.4.2 Basic Flow

1. The PROCESSOR will view their payment list.
2. The system will check to see if the PROCESSOR'S office is set up for individual payment or bulk payment.
   If the PROCESSOR'S office is set up for individual payment execute subflow 1.4.2.1, Individual Pay.
   If the PROCESSOR'S office is set up for bulk payment execute subflow 1.4.2.2, Bulk Pay.

1.4.2.1 Individual Pay

1. The system will display instructions for paying the invoices individually and a summary list of all the invoices on the PROCESSOR'S payment list.
2. For each invoice on the payment list, the PROCESSOR may enter the associated check number.
3. The PROCESSOR will submit the invoices to the system.
4. The system will mark the invoices paid.
5. The system will update the ARMS Web database.
6. This ends the use case.

1.4.2.2 Bulk Pay

1. The system will display instructions for paying the invoices in bulk and a summary list of all the invoices on the PROCESSOR'S payment list.
2. The ADJUSTER may enter the check number of the check that is paying all the invoices on the payment list.
3. The PROCESSOR will submit the invoices to the system.
4. The system will mark the invoices paid.
5. The system will update the ARMS Web database.
6. This ends the use case.

1.4.3 Alternative Flows 1.4.3.1 View Customer File

At step one of Section 1.4.2.1, Individual Pay, or Section 1.4.2.2, Bulk Pay, the PROCESSOR may choose to view detail information about the rental. The view rental detail process is executed using extension point MA-19—View Customer File.

1.4.3.2 Return an Invoice

At step one of Section 1.4.2.1, Individual Pay or Section 1.4.2.2, Bulk Pay the PROCESSOR may choose to return any invoice to the ADJUSTER. The PROCESSOR may enter a message to explain why they returned the invoice. The returned invoice should be given a status of returned invoice. The invoice will then become an action item for the owning ADJUSTER to review and correct.

1.4.3.3 Print an Invoice List

At step one in section 1.4.2.1, Individual Pay, or section 1.4.2.2, Bulk Pay, the PROCESSOR may choose to print the invoice list of all invoices on the Payment List. If they so choose, they may also print the rental history for all invoices. The system will display a printer friendly screen and the PROCESSOR will choose to print via their browser window. Upon printing, the PROCESSOR will return to the step one of section 1.4.2.1 if the PROCESSOR is set up for Individual Pay, or section 1.4.2.2 if the PROCESSOR is set up for Bulk Pay.

1.5 Post-Conditions

If the use case was successful the accepted invoices should be marked as paid in the ARMS Web system.

If the use case was unsuccessful, the system state is unchanged.

1.6 Special Requirements

The additional requirements of the business use case are included here. These are requirements not covered by the flow as they have been described in the sections above.

1.6.1 ARMS Web Routes Invoices

Before an ADJUSTER receives an invoice to be approved, the ARMS Web system will look at the invoicing criteria for the owning office and owning adjuster and make a determination as to whether the invoice is auto approved or adjuster approved. If an invoice is auto approved, the invoice will always be assigned to a processor for payment without it ever being sent to an adjuster for approval.

1.6.2 Data Fields to Assist with Future Releases or Customer Integration

It must be possible to capture the following information at some point in the future because of either planned future releases or customer integration.

Amount Being Paid on Each Invoice 1.6.3 Claim Number is Editable on the Invoice

If a company is set up for EDI transmission of invoices to the company's claim system, that company must have the ability to change the claim number on the invoice.

1.7 Extension Points 1.7.1 MA-19-View Customer File

The View Customer File Functional Specification is used to review the rental history in regards to a specific rental. Upon completion of the View Customer File Functional Specification, the ADJUSTER should be returned to step one of Section 1.4.2.1, Individual Pay, or Section 1.4.2.2, Bulk Pay in the Handle Unapproved Invoices Functional Specification. Any previously approved invoices should still be approved in the system.

2. Screen Design

A definition of the screen layout(s), screen data fields, and screen functions that are used to implement the flows identified above. More than one screen may be used to implement support for the use case flow.

2.1 Invoicing—Individual Payment List

This screen will allow the user to enter a check number for each invoice and notify Enterprise that they have processed the payment.

Figure 137:
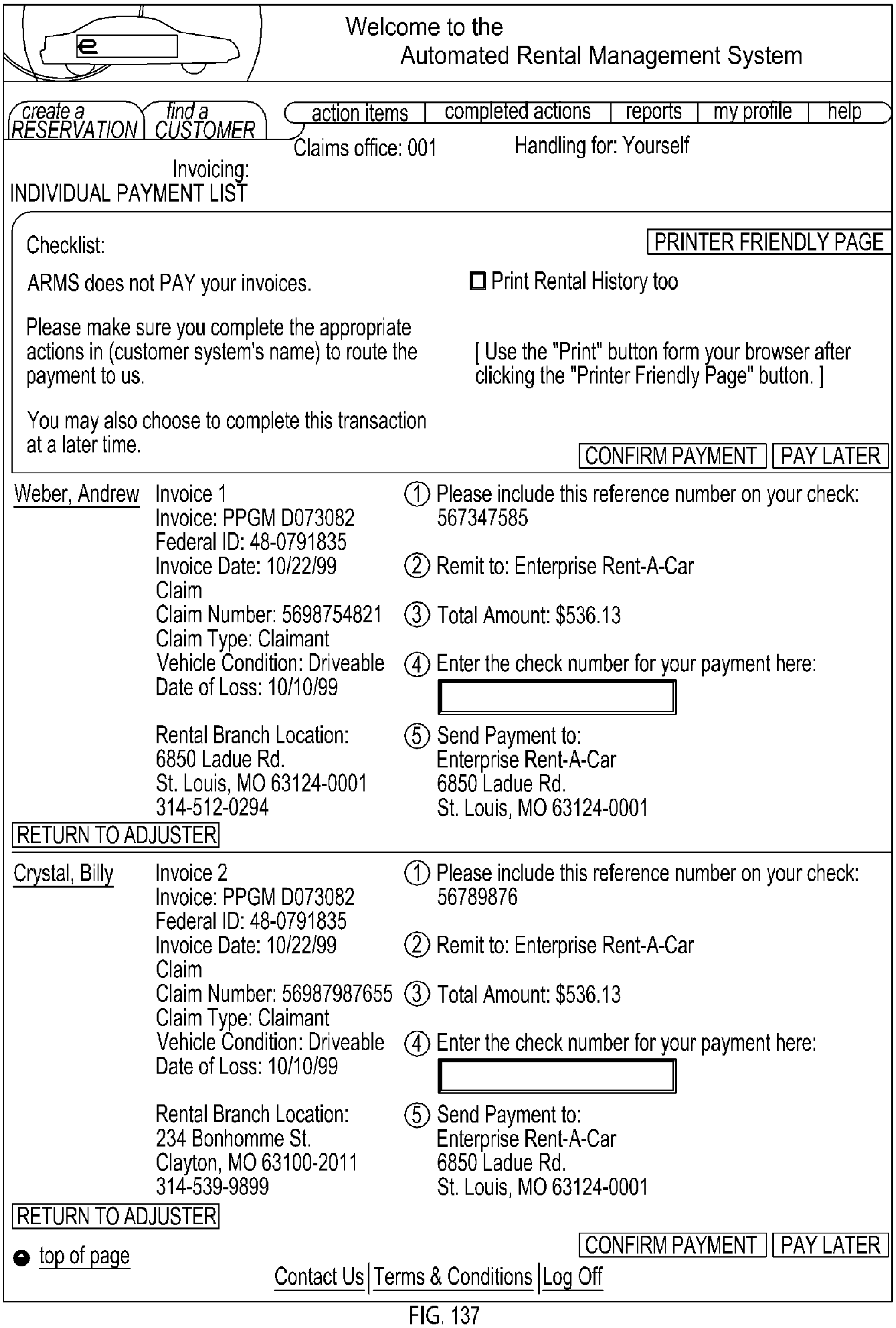

2.1.1 Individual Payment List—see FIG. 137

2.1.2 Individual Payment List

| Screen Label | Type | Size | Screen Field Name | Data Field | Screen Specific Rule |
|---|---|---|---|---|---|
| Claim Number | Input | 15 | Claim Number | Insurance Claim Number | Will be pre-filled with claim number currently on authorization. This field is repeated for each invoice in the payment list. This field is repeated for each invoice in the payment list. |
| Invoice Date | Output | 10 | Invoice Date (ECARS Ticket Date) | Record Add Date | This field is repeated for each invoice in the payment list. |
| Please include this reference number on your check: | Output | 20 | Invoice ID | Invoice Number | Rental Group ID + Rental Branch ID + ECARS Ticket number. This field is repeated for each invoice in the payment list. |
| Invoice: | Output | 20 | Invoice Id | Invoice Number | Rental Group Id + Rental Branch Id + ECARS Ticket Number This field is repeated for each invoice in the payment list. |
| Federal ID | Output | 30 | Location's Federal ID | Federal ID Number | This field is repeated for each invoice in the payment list. |

-continued

| Screen Label | Type | Size | Screen Field Name | Data Field | Screen Specific Rule |
|---|---|---|---|---|---|
| Total Amount: | Output | 15.2 | Total amount due from Ins. Company | Total Amount Due | Total Charges – Amount Received This field is repeated for each invoice in the payment list. |
| Handling For: | Output | 30 | Handling for Adjuster's Name | First Name + Last Name | Adjuster's First name + Adjuster's last name. The name of the adjuster to which the invoice is currently assigned. |
| | Output | 30 | Insured's Name | First Name + Last Name | This field is repeated for each invoice in the payment list. |
| | Output | 30 | Rental Location's Mailing Street Address | Address Line + Address Line2 | This field is repeated for each invoice in the payment list. |
| | Output | 12 | Rental Location Telephone Number | Telephone Number | This field is repeated for each invoice in the payment list. |
| | Output | 30 | Rental Location's Mailing City, State and Zip Code | City + State + Zip Code | This field is repeated for each invoice in the payment list. |
| | Output | 30 | Rental Location's Mailing City State and Zip | City + State + Zip Code | This field is repeated for each invoice in the payment list. |
| | Output | 30 | Rental Location's Mailing Street Address | Address Line + Address Line2 | This field is repeated for each invoice in the payment list. |
| Date of loss | Output | 10 | Date of loss | Date Of Loss | This field is repeated for each invoice in the payment list. |
| Invoice | Output | 5 | Invoice List Number | CALCULATED | This field is repeated for each invoice in the payment list. Count |
| Claim type | Output | 10 | Claim Type | claim type description | This field is repeated for each invoice in the payment list. |
| Claims Office: | Output | 3 | Office Id | external organization abbreviated name | This claims office id which the user is currently process work for. |
| Vehicle Condition | Output | 10 | Loss Type | loss type description | This field is repeated for each invoice in the payment list. |
| Remit to: | Output | 30 | Rental Location's Accounting Name | accounting name | This field is repeated for each invoice in the payment list. |
| Send Payment to: | Output | 30 | Rental Location's Accounting Name | accounting name | This field is repeated for each invoice in the payment list. |
| Rental: | Output | 30 | Rental Location's Accounting Name | accounting name | This field is repeated for each invoice in the payment list. |
| Enter the check number of your payment here: | Input | 20 | Check Number | check number | This field is repeated for each invoice in the payment list. |

2.1.3 Screen Function Definition

This section includes the definitions for all functions that can be performed within the screen. This includes operations invoked by button clicks, specific shortcut keystrokes, or other actor activity.

2.1.3.1 Printer Friendly Page

When clicked, the user will be taken to the "Printer Friendly View" of the current invoice.

2.1.3.2 Confirm Payment

When clicked, system will mark the reservation as paid and update the database. The update will be passed to the Arms system.

2.1.3.3 Pay Later

When clicked, the user will be returned to their action item list and the payment list will remain unprocessed.

2.1.3.4 Return to Adjuster

When clicked, the invoice will be returned to the last adjuster associated with the rental before it closed. The invoice will be removed from the list displayed.

2.1.3.5 Top of Page

When clicked, the user will be taken to the top of the current invoice page.

2.2 Bulk Payment List

This screen will allow the user to pick which functions that he/she may want to change.

Figure 138:
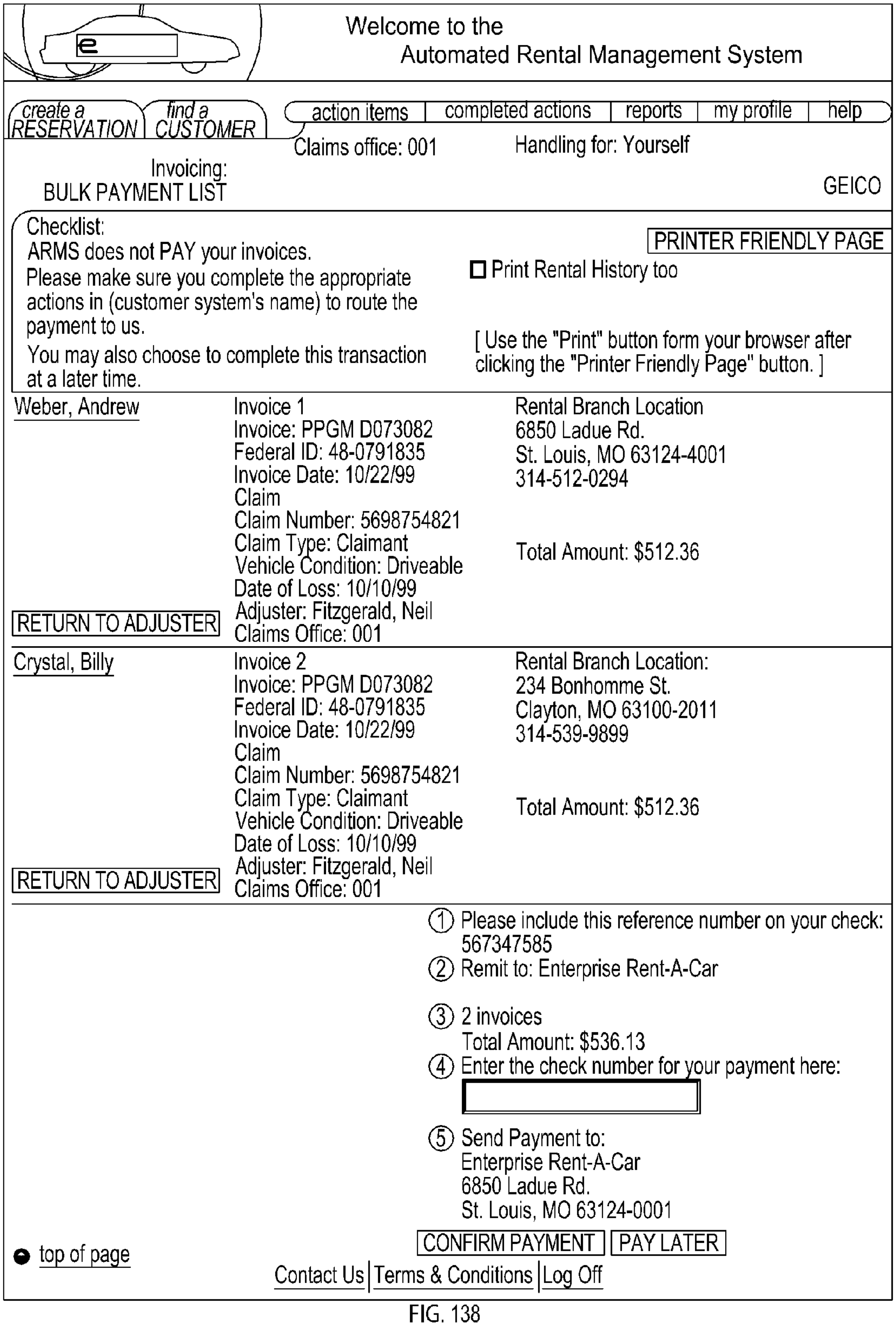

2.2.1 Screen Layout—Bulk Payment List—see FIG. 138

2.2.2 Invoicing—Bulk Payment List

| Screen Label | Type | Size | Screen Field Name | Data Field | Screen Specific Rule |
|---|---|---|---|---|---|
| Claim Number | Input | 15 | Claim Number | Insurance Claim Number | Will be pre-filled with claim number currently on authorization. This field is repeated for each invoice in the payment list. |
| Invoice Date | Output | 10 | Invoice Date (ECARS Ticket Date) | Record Add Date | This field is repeated for each invoice in the payment list. |
| Please include this reference number on your check: | Output | 20 | Invoice ID | Invoice Number | Rental Group ID + Rental Branch ID + ECARS Ticket number. This field is repeated for each invoice in the payment list. |
| Invoice: | Output | 20 | Invoice Id | Invoice Number | Rental Group Id + Rental Branch Id + ECARS Ticket Number. This field is repeated for each invoice in the payment list. |
| Federal ID | Output | 30 | Location's Federal ID | Federal ID Number | This field is repeated for each invoice in the payment list. |
| Total Amount: | Output | 152 | Total amount due from Ins. Company | Total Amount Due | Total Charges − Amount Received. This field is repeated for each invoice in the payment list. |
| Handling For: | Output | 30 | Handling for Adjuster's Name | First Name + Last Name | Adjuster's First name + Adjuster's last name. The name of the adjuster to which the invoice is currently assigned. |
| | Output | 30 | Insured's Name | Last Name | This field is repeated for each invoice in the payment list. |
| | Output | 30 | Rental Location's Mailing Street Address | Address Line + Address Line2 | This field is repeated for each invoice in the payment list. |
| | Output | 12 | Rental Location Telephone Number | Telephone Number | This field is repeated for each invoice in the payment list. |
| | Output | 30 | Rental Location's Mailing City, State and Zip Code | City + State + Zip Code | This field is repeated for each invoice in the payment list. |
| | Output | 30 | Rental Location's Mailing City State and Zip | City + State + Zip Code | This field is repeated for each invoice in the payment list. |
| | Output | 30 | Rental Location's Mailing Street Address | Address Line + Address Line2 | This field is repeated for each invoice in the payment list. |
| Date of loss | Output | 10 | Date of loss | Date Of Loss | This field is repeated for each invoice in the payment list. |
| Invoice | Output | 5 | Invoice List Number | CALCULATED | This field is repeated for each invoice in the payment list. |
| Claim type | Output | 10 | Claim Type | claim type description | This field is repeated for each invoice in the payment list. |
| Claims Office: | Output | 3 | Office Id | external organization abbreviated name | This claims office id which the user is currently process work for. |
| Vehicle Condition | Output | 10 | Loss Type | loss type description | This field is repeated for each invoice in the payment list. |
| Remit to: | Output | 30 | Rental Location's Accounting Name | accounting name | This field is repeated for each invoice in the payment list. |

-continued

| Screen Label | Type | Size | Screen Field Name | Data Field | Screen Specific Rule |
|---|---|---|---|---|---|
| Send Payment to: | Output | 30 | Rental Location's Accounting Name | accounting name | This field is repeated for each invoice in the payment list. |
| Rental: | Output | 30 | Rental Location's Accounting Name | accounting name | This field is repeated for each invoice in the payment list. |

2.2.3 Screen Function Definition

This section includes the definitions for all functions that can be performed within the screen. This includes operations invoked by button clicks, specific shortcut keystrokes, or other actor activity.

2.2.3.1 Printer Friendly Page

When clicked, the user will be taken to the "Printer Friendly View" of the current invoice.

2.2.3.2 Confirm Payment

When clicked, system will mark the reservation as paid and update the database. The update will be passed to the Arms system.

2.2.3.3 Pay Later

When clicked, the user will be returned to their action item list and the payment list will remain unprocessed.

2.2.3.4 Return to Adjuster

When clicked, the invoice will be returned to the last adjuster associated with the rental before it closed. The invoice will be removed from the list displayed.

2.2.3.5 Top of Page

When clicked, the user will be taken to the top of the current invoice page.

Figure 139:
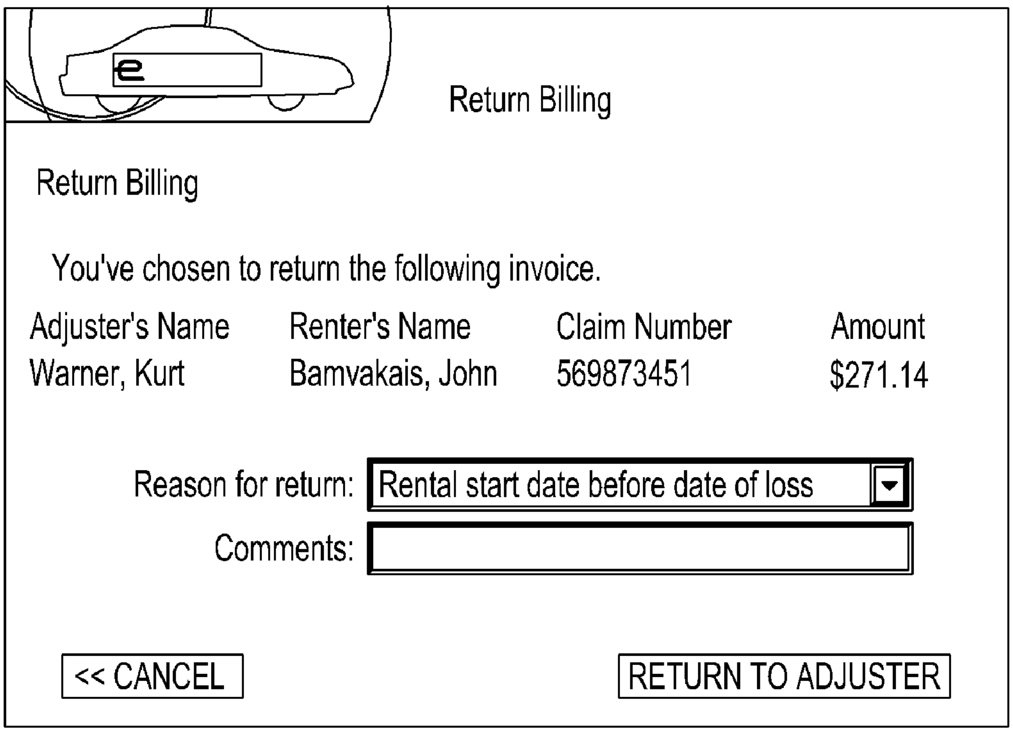

2.3 Return Invoice to Adjuster 2.3.1 Screen Layout—returnBilling.shtml—see FIG. 139

2.3.2 Return Billing

3. Application Operations

This section will detail all the application operations that are part of this Functional Specification Document.

3.1 Get Approved Invoices (Office Id)

The get approved invoices operation finds all the approved invoices for the specified office.

3.2 Get Invoice Detail (Invoice Number)

The get invoice detail operation gets the relevant invoice information for the specified invoice number.

3.3 Return Invoice to Approving Adjuster (Invoice Number, Reason Code)

The return invoice to approving adjuster operation marks the specified invoice so that the approving adjuster can review the invoice and re-approve it.

3.4 Pay Invoice (Invoice Number, Check Number)

The pay invoice operation records the check number specified by the adjuster against the specified invoice and marks the invoice as paid.

4. Data Fields 4.1 Data Field Definition

This section includes a definition of all data fields included in the functional specification.

| Screen Label | Type | Size | Screen Field Name | Data Field | Screen Specific Rule |
|---|---|---|---|---|---|
| Claim Number | Input | 15 | Claim Number | Insurance Claim Number | |
| Amount | Output | 15.2 | Total Amount Due from Ins. Company | Total Amount Due | |
| Adjuster's Name | Output | 30 | Adjuster's Name | First Name + Last Name | Adjuster's last name + adjuster's first name |
| Comments | Input | 50 | Reason Comments | NOTE | |
| Renter Name | Output | 30 | Renter's name | First Name + Last Name | Renter's Last Name + Renter's First Name |
| Reason For Return | ComboBox | 50 | Reason For Return | standard message description | |

2.3.3 Screen Function Definition

This section includes the definitions for all functions that can be performed within the screen. This includes operations invoked by button clicks, specific shortcut keystrokes, or other actor activity.

2.3.3.1 Cancel

When clicked, the user will be returned to the Invoicing Approval or Invoicing Individual Payment screen from which they came. The invoice will still be displayed with the status of the invoice unchanged.

2.3.3.2 Return to Adjuster

When clicked, the user will return the invoice to the Adjuster for further instructions and the status will show returned invoice.

4.1.1 Accounting Name

| | |
|---|---|
| Entity | OFFDRB OFFICE DIRECTORY BRANCH MASTER |
| Column Name | acctg_nam |
| Label Name | Accounting Name |
| System Name | |
| Data Type | VARCHAR(8) |
| Attribute Definition | |

4.1.2 Action Item Complete Date

| | |
|---|---|
| Entity | ACTION ITEM |
| Column Name | actn_item_cmpl_dte |

-continued

| | |
|---|---|
| Label Name | action item complete date: |
| System Name | AITMCMPLDT |
| Data Type | DATE |
| Attribute Definition | The action item complete date is the date the action item was completed by an administrator or adjustor. |

4.1.3 Action Item Effective Date

| | |
|---|---|
| Entity | ACTION ITEM |
| Column Name | actn_item_eff_dte |
| Label Name | action item effective date: |
| System Name | AITMEFFDT |
| Data Type | DATE |
| Attribute Definition | The action item effective date is the date the action item will become effective. |

4.1.4 Action Item Status Code

| | |
|---|---|
| Entity | ACTION ITEM |
| Column Name | actn_item_stat_cde |
| Label Name | action item status code: |
| System Name | |
| Data Type | CHAR(6) |
| Attribute Definition | The action item status code defines the status of this action item. For example: |

4.1.5 Action Item Type Code

| | |
|---|---|
| Entity | ACTION ITEM |
| Column Name | actn_item_typ_cde |
| Label Name | action item type code: |
| System Name | |
| Data Type | DEC(3,0) |
| Attribute Definition | The action item type code defines specific tasks/action items associated with the Rental Authorization/Reservation activities accomplished by adjustors and administrators when contracting an insured with a replacement vehicle. For example: Closing an Of |

4.1.6 Action Item Type Description

| | |
|---|---|
| Entity | ACTION ITEM TYPE |
| Column Name | actn_item_typ_dsc |
| Label Name | action item type description: |
| System Name | |
| Data Type | CHAR(40) |
| Attribute Definition | The action item type description is a lexical definition of an action item type code which defines specific tasks/action items associated with the Rental Authorization/Reservation activities accomplished by adjustors and administrators when contracting an |

4.1.7 Address Line

| | |
|---|---|
| Entity | ARM: Rental Location Master |
| Column Name | LOADL1 |
| Label Name | |
| System Name | |
| Data Type | CHAR(30) |
| Attribute Definition | |

4.1.8 Address Line2

| | |
|---|---|
| Entity | ARM: Rental Location Master |
| Column Name | LOADL2 |
| Label Name | Address Line |
| System Name | |
| Data Type | CHAR(30) |
| Attribute Definition | |

4.1.9 ARMS Profile ID

| | |
|---|---|
| Entity | ACTION ITEM |
| Column Name | ALCUID |
| Label Name | ARMS Profile ID |
| System Name | |
| Data Type | CHAR(5) |
| Attribute Definition | The ARMS Profile ID is the company identifier used to uniquely define an authorization. |

4.1.10 Assigned to Adjustor Code

| | |
|---|---|
| Entity | ACTION ITEM |
| Column Name | assgn_to_adjr_cde |
| Label Name | Adjustor Code |
| System Name | AADJRCDE |
| Data Type | CHAR(10) |
| Attribute Definition | The assigned to adjustor code is the adjustor code of the administrator or adjustor's who is assigned the action item. |

4.1.11 Assigned to Company Identifier

| | |
|---|---|
| Entity | ACTION ITEM |
| Column Name | assgn_to_cmpy_id |
| Label Name | ARMS Profile ID |
| System Name | ACMPYID |
| Data Type | CHAR(5) |
| Attribute Definition | The assigned to company identifier is the company identifier of the administrator or adjustor's who is assigned the action item. |

4.1.12 Bill to %

| | |
|---|---|
| Entity | ARM: Authorization(Claim Info) |
| Column Name | AZBTPC |
| Label Name | Bill To % |
| System Name | |
| Data Type | DECIMAL(3) |
| Attribute Definition | |

4.1.13 Branch

| | |
|---|---|
| Entity | A4 Cross Reference |
| Column Name | br_id |
| Label Name | Branch: |
| System Name | |
| Data Type | CHAR(2) |
| Attribute Definition | |

4.1.14 Check Number

| | |
|---|---|
| Entity | RENTAL INVOICE PAYMENT |
| Column Name | chk_nbr |
| Label Name | check number: |
| System Name | CHKNBR |
| Data Type | DEC(11,0) |
| Attribute Definition | |

4.1.15 City

| | |
|---|---|
| Entity | ARM: Rental Location Master |
| Column Name | LOCYNM |
| Label Name | City |
| System Name | |
| Data Type | CHAR(20) |
| Attribute Definition | |

4.1.16 Claim Type Description

| | |
|---|---|
| Entity | CLAIM TYPE |
| Column Name | clm__typ__dsc |
| Label Name | claim type description: |
| System Name | CLMTYPDSC |
| Data Type | CHAR(40) |
| Attribute Definition | The claim type description is a lexical definition of the claim type code which defines the different Authorization claim types. For example: Insured, Claimant, Uninsured Motorist, etc. |

4.1.17 Company Identifier

| | |
|---|---|
| Entity | EXTERNAL ORGANIZATION |
| Column Name | cmpy__id |
| Label Name | company identifier: |
| System Name | CMPYID |
| Data Type | DEC(11,0) |
| Attribute Definition | Business Party Identifier is a surrogate key assigned to each unique occurrence of an Individual, External Organization, and Internal Organization (Business Party). |

4.1.18 Company Structure Level Code

| | |
|---|---|
| Entity | ACTION ITEM |
| Column Name | cmpy__strct__lvl__cde |
| Label Name | company structure level code: |
| System Name | CMPYSLVLCD |
| Data Type | DEC(3, 0) |
| Attribute Definition | The external organization structure level code identifies the kind or type of internal organizations of the external organizations which Enterprise Rent-A-Car does business with. Such as: Corporation, Branch Claims Office, Region, Area, Subregion, etc. |

4.1.19 Customer Transaction ID

| | |
|---|---|
| Entity | ACTION ITEM |
| Column Name | AZCUTI |
| Label Name | Customer Transaction ID |
| System Name | |
| Data Type | CHAR(20) |
| Attribute Definition | The Customer Transaction ID is the authorization transaction identifier which along with a company identifier uniquely define an authorization. |

4.1.20 Date of Loss

| | |
|---|---|
| Entity | ARM: Renter Detail |
| Column Name | RKLSDT |
| Label Name | Date of Loss |
| System Name | |
| Data Type | NUMERIC(8) |
| Attribute Definition | |

4.1.21 Dollars Per Day Covered

| | |
|---|---|
| Entity | ARM: Authorization (Claim Info) |
| Column Name | AZ$PDY |
| Label Name | Dollars Per Day Covered |
| System Name | |
| Data Type | DECIMAL(5, 2) |
| Attribute Definition | |

4.1.22 End Date

| | |
|---|---|
| Entity | ARM: Authorization (Claim Info) |
| Column Name | AZENDT |
| Label Name | End Date |
| System Name | |
| Data Type | NUMERIC(8) |
| Attribute Definition | |

4.1.23 External Organization Abbreviated Name

| | |
|---|---|
| Entity | EXTERNAL ORGANIZATION |
| Column Name | e__o__abbr__nam |
| Label Name | external organization abbreviated name: |
| System Name | EOABBRNAM |
| Data Type | CHAR(10) |
| Attribute Definition | External Organization Abbreviated Name is a shortened text based label associated with an organization outside of Enterprise. This name is sometimes used for accounting purposes. |

4.1.24 External Organization Identifier

| | |
|---|---|
| Entity | EXTERNAL ORGANIZATION |
| Column Name | e__o__id |
| Label Name | external organization identifier: |
| System Name | EOID |
| Data Type | DEC(11, 0) |
| Attribute Definition | The external organization identifier is a surrogate key assigned to each unique occurrence of an External Organization. Examples: body shops, vehicle manufacturers, insurance companies, leasing accounts, credit unions, dealerships, or governing agencies. |

4.1.25 Federal ID Number

| | |
|---|---|
| Entity | A4 Invoice Header |
| Column Name | I1FETX |
| Label Name | Federal ID Number |
| System Name | |
| Data Type | CHAR(15) |
| Attribute Definition | |

4.1.26 First Name

| | |
|---|---|
| Entity | ARM: Adjustor Master |
| Column Name | ALFSNM |
| Label Name | First Name |
| System Name | |
| Data Type | CHAR(15) |
| Attribute Definition | |

4.1.27 First Name

| | |
|---|---|
| Entity | ARM: Renter Detail |
| Column Name | RKFSNM |
| Label Name | First Name |
| System Name | |
| Data Type | CHAR(15) |
| Attribute Definition | |

4.1.28 Group

| | |
|---|---|
| Entity | A4 Cross Reference |
| Column Name | grp__id |
| Label Name | Group Number |
| System Name | |
| Data Type | CHAR(2) |
| Attribute Definition | |

4.1.29 Handled by Adjustor Code

| | |
|---|---|
| Entity | ACTION ITEM |
| Column Name | handl__by__adjr__cde |
| Label Name | Adjustor Code |
| System Name | HNDADJRCDE |
| Data Type | CHAR(10) |
| Attribute Definition | The handled by adjustor code is the adjustor code of the administrator or adjustor's who is handling the action item. |

4.1.30 Handled by Company Identifier

| | |
|---|---|
| Entity | ACTION ITEM |
| Column Name | handl__by__cmpy__id |
| Label Name | ARMS Profile ID |
| System Name | HNDCMPYID |
| Data Type | CHAR(5) |
| Attribute Definition | The handled by company identifier is the company identifier of the administrator or adjustor's who is handling the action item. |

4.1.31 Handling for Adjustor Code

| | |
|---|---|
| Entity | AUTHORIZATION ACTIVITY LOG |
| Column Name | handl__for__adtr__cde |
| Label Name | handling for adjustor code: |
| System Name | HNDADJRCDE |
| Data Type | CHAR(10) |
| Attribute Definition | The handling for adjustor coder is the adjustor code of an adjustor/user who is handling authorization activities for another adjustor/user in the ARMS Web application. |

4.1.32 Handling for Company Identifier

| | |
|---|---|
| Entity | AUTHORIZATION ACTIVITY LOG |
| Column Name | handl__for__cmpy__id |
| Label Name | handling for company identifier: |
| System Name | HNDCMPYID |
| Data Type | CHAR(5) |
| Attribute Definition | The handling for company identifier is the company identifier used to uniquely identify an adjustor/user who is handling authorization activities for another adjustor/user in the ARMS Web application. |

4.1.33 Insurance Claim Number

| | |
|---|---|
| Entity | A4 Invoice Header |
| Column Name | I1CLNO |
| Label Name | Insurance Claim Number |
| System Name | |
| Data Type | CHAR(20) |
| Attribute Definition | |

4.1.34 Insurance Claim Number

| | |
|---|---|
| Entity | ARM: Authorization(Claim Info) |
| Column Name | AZCLNO |
| Label Name | Insurance Claim Number |
| System Name | |
| Data Type | CHAR(20) |
| Attribute Definition | |

4.1.35 Invoice Number

| | |
|---|---|
| Entity | A4 Invoice Header |
| Column Name | I1INNO |
| Label Name | Invoice Number |
| System Name | |
| Data Type | CHAR(20) |
| Attribute Definition | |

4.1.36 Item Amount

| | |
|---|---|
| Entity | A4 Invoice Detail |
| Column Name | I2IT$$ |
| Label Name | Item Amount |
| System Name | |
| Data Type | DECIMAL(7, 2) |
| Attribute Definition | |

4.1.37 Item Description

| | |
|---|---|
| Entity | A4 Invoice Detail |
| Column Name | I2ITDS |
| Label Name | Item Description |
| System Name | |
| Data Type | CHAR(30) |
| Attribute Definition | |

4.1.38 Item Quantity

| | |
|---|---|
| Entity | A4 Invoice Detail |
| Column Name | I2ITQY |
| Label Name | Item Quantity |
| System Name | |
| Data Type | DECIMAL(5) |
| Attribute Definition | |

4.1.39 Item Rate

| | |
|---|---|
| Entity | A4 Invoice Detail |
| Column Name | I2ITRT |
| Label Name | Item Rate |
| System Name | |
| Data Type | DECIMAL(7, 2) |
| Attribute Definition | |

4.1.40 Last Name

| | |
|---|---|
| Entity | ARM: Adjustor Master |
| Column Name | ALLSNM |
| Label Name | Last Name |
| System Name | |
| Data Type | CHAR(20) |
| Attribute Definition | |

4.1.41 Last Name

| | |
|---|---|
| Entity | ARM: Renter Detail |
| Column Name | RKLSNM |
| Label Name | Last Name |
| System Name | |
| Data Type | CHAR(20) |
| Attribute Definition | |

4.1.42 Loss Type Description

| | |
|---|---|
| Entity | LOSS TYPE |
| Column Name | loss__typ__dsc |
| Label Name | loss type description: |
| System Name | LOSSTYPDSC |
| Data Type | CHAR(40) |
| Attribute Definition | The loss type description is a lexical definition of the loss type code which defines the different loss categories when an Insurance Companyz authorizes a Rental. For example: Theft, Drivable, Repairable, Non-drivable, Non-repairable, Totaled. |

4.1.43 Max $ Covered

| | |
|---|---|
| Entity | ARM: Authorization(Claim Info) |
| Column Name | AZ$MAX |
| Label Name | Max $ Covered |
| System Name | |
| Data Type | DECIMAL(9, 2) |
| Attribute Definition | |

4.1.44 Note

| | |
|---|---|
| Entity | ARM: ARMS/400 Diary Notes File |
| Column Name | NENOTE |
| Label Name | NOTE |
| System Name | |
| Data Type | CHAR(50) |
| Attribute Definition | |

4.1.45 Record Add Date

| | |
|---|---|
| Entity | A4 Invoice Header |
| Column Name | I1ADDT |
| Label Name | Record Add Date |
| System Name | |
| Data Type | NUMERIC(8) |
| Attribute Definition | |

4.1.46 Related Office Identifier

-continued

| | |
|---|---|
| Entity | ACTION ITEM |
| Column Name | rel__ofc__id |
| Label Name | related office identifier: |
| System Name | RELOFCID |
| Data Type | DEC(11, 0) |
| Attribute Definition | The related office identifier is the identifier of the office responsible for the action item. |

4.1.47 Request Type

| | |
|---|---|
| Entity | ACTION ITEM TYPE |
| Column Name | X4RSFG |
| Label Name | Request Type |
| System Name | |
| Data Type | CHAR(1) |
| Attribute Definition | |

4.1.48 Standard Message Description

| | |
|---|---|
| Entity | STANDARD MESSAGE |
| Column Name | std__msg__dsc |
| Label Name | standard message description: |
| System Name | STDMSGDSC |
| Data Type | CHAR(50) |
| Attribute Definition | The standard message description is a lexical definition for standard message code which defines a predefined message which is applicable to specific activity type codes. For example: "Authorization confirmed on &Date with Reservation Number &Resnumber" |

4.1.49 Start Date

| | |
|---|---|
| Entity | ARM: Authorization(Claim Info) |
| Column Name | AZSTDT |
| Label Name | Start Date |
| System Name | |
| Data Type | NUMERIC(8) |
| Attribute Definition | |

4.1.50 State

| | |
|---|---|
| Entity | ARM: Rental Location Master |
| Column Name | LOSACD |
| Label Name | State |
| System Name | |
| Data Type | CHAR(2) |
| Attribute Definition | |

4.1.51 Status Code

| | |
|---|---|
| Entity | ACTION ITEM TYPE |
| Column Name | XUSTCD |
| Label Name | Status Code |
| System Name | XUSTCD |
| Data Type | CHAR(1) |
| Attribute Definition | The status code is a code from the ARMS system which identifies whether an authorization is a reservation, a ticket, unauthorized, invoiced, paid, etc. |

4.1.52 Telephone Number

| | |
|---|---|
| Entity | ARM: Rental Location Master |
| Column Name | LOPHNO |
| Label Name | Telephone Number |
| System Name | |
| Data Type | NUMERIC(10) |
| Attribute Definition | |

4.1.53 Ticket Number

| | |
|---|---|
| Entity | A4 Cross Reference |
| Column Name | X4TKNO |
| Label Name | Ticket Number |
| System Name | |
| Data Type | CHAR(6) |
| Attribute Definition | |

4.1.54 Total Amount Due

| | |
|---|---|
| Entity | A4 Invoice Trailer |
| Column Name | I3BL$$ |
| Label Name | Total Amount Due |
| System Name | |
| Data Type | DECIMAL(9, 2) |
| Attribute Definition | |

4.1.55 Total Amount Received

| | |
|---|---|
| Entity | A4 Invoice Trailer |
| Column Name | I3RC$$ |
| Label Name | Total Amount Received |
| System Name | |
| Data Type | DECIMAL(9, 2) |
| Attribute Definition | |

4.1.56 Total Billed to Others

| | |
|---|---|
| Entity | A4 Invoice Trailer |
| Column Name | I3OT$$ |
| Label Name | Total Billed to Others |
| System Name | |
| Data Type | DECIMAL(9, 2) |
| Attribute Definition | |

4.1.57 Total Ticket Charges

| | |
|---|---|
| Entity | A4 Invoice Trailer |
| Column Name | I3TO$$ |
| Label Name | Total Ticket Charges |
| System Name | |
| Data Type | DECIMAL(9, 2) |
| Attribute Definition | |

4.1.58 Zip Code

| | |
|---|---|
| Entity | ARM: Rental Location Master |
| Column Name | LOZPCD |
| Label Name | Zip Code |
| System Name | |
| Data Type | CHAR(9) |
| Attribute Definition | |

5. Questions and Answers

None.

Functional Design Specification

Reject an Invoice

Version 1.0

1. Reject an Invoice Use Case 1.1 Brief Description

The Reject an Invoice use case describes how the ADJUSTER would reject an invoice to Enterprise in the ARMS Web system.

1.2 Use Case Actors

The following actors will interact with this use case:

ADJUSTER—The ADJUSTER will use this use case to reject an invoice.

1.3 Pre-Conditions

The ADJUSTER'S office must be set up for individual approval of invoices.

The ADJUSTER must be set up to approve invoices.

1.4 Flow of Events

The Flow of Events will include the necessary steps for an ADJUSTER to reject invoices.

Figure 140:
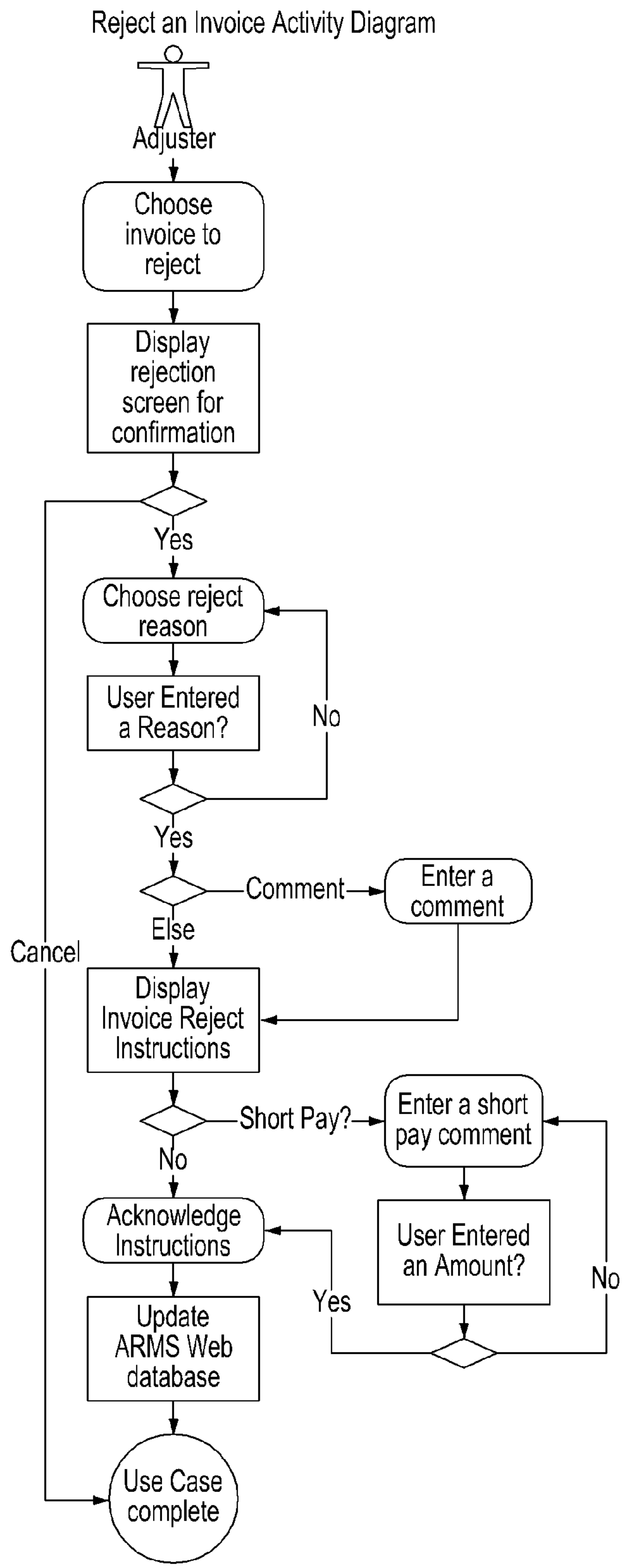

1.4.1 Activity Diagram—see FIG. 140

1.4.2 Basic Flow

1. The ADJUSTER will reject an invoice.
2. The system will prompt for reject confirmation.
3. The ADJUSTER will enter a reject reason for rejecting the invoice.
4. The ADJUSTER may enter comments to be added to the diary notes.
5. The ADJUSTER will submit the rejection to the system.
6. The system will display instructions for achieving resolution on the rejected invoice.
7. The ADJUSTER will acknowledge that they understand the instructions.
8. The system will update the ARMS Web database to reflect that the ADJUSTER rejected the invoice.
9. This ends the use case.

1.4.3 Alternative Flows 1.4.3.1 Cancel Rejection

At steps two through seven of the Basic Flow, the ADJUSTER must have the ability to cancel the invoice rejection process. Canceling the rejection should return the ADJUSTER to the Invoicing Approval Screen or the Invoicing Individual Payment screen. The invoice that was to be rejected should be displayed. The status of the invoice should be unapproved.

1.4.3.2 No Reject Reason Given

At step three in the Basic Flow; if the ADJUSTER attempts to bypass entering a reject reason, they will be prompted to enter one. The ADJUSTER will not be allowed to complete the rejection process without providing a reject reason.

1.4.3.3 Short Pay

If the reject reason given in step three of the Basic Flow is a reason that requires a short pay, at step five of the Basic Flow the system will display a field for entry of the short pay amount. The ADJUSTER will not be allowed to complete the rejection process without providing an amount that will be paid.

1.5 Post-Conditions

If the use case was successful the invoice will be marked rejected in the ARMS Web system.

If the use case was unsuccessful, the status remains unchanged.

1.6 Special Requirements

The additional requirements of the business use case are included here. These are requirements not covered by the flow as they have been described in the sections above.

1.6.1 Invoices are Initially Auto Approved

If an ADJUSTER'S invoices are normally auto approved, functionality needs to exist to route invoices to them when they are returned to ADJUSTER from the PROCESSOR. This functionality will need to override the normal routing processes that exist at the office.

1.7 Extension Points

None.

2. Screen Design

A definition of the screen layout(s), screen data fields, and screen functions that are used to implement the flows identified above. More than one screen may be used to implement support for the use case flow.

2.1 Reject Billing Reason

This screen will allow the user to begin the rejection process.

Figure 141:
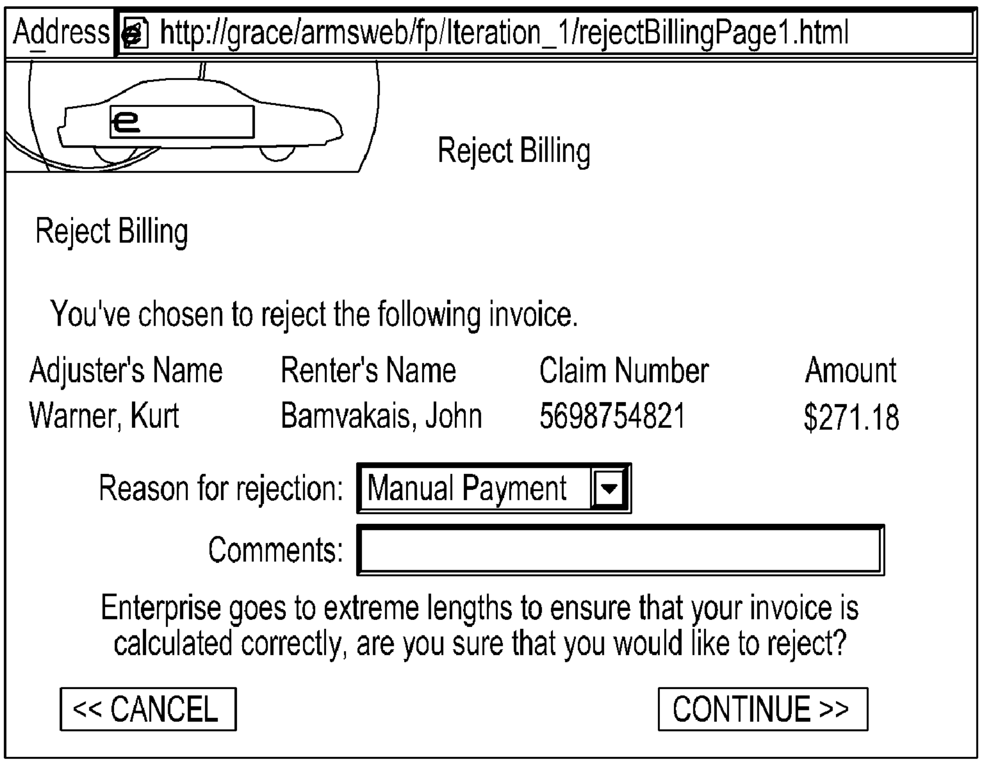

2.1.1 Screen Layout—Reject Billing Reason—see FIG. 141

2.1.2 Reject Billing—Reject Billing Reason 2.1.3.1 Continue

The system will validate the input from the screen according to the listed business rules. If the validation passes, the rejection process will continue.

The following business rules that must be passed before the USER may continue to the next step in the rejection process are the following:

A valid rejection reason must be selected from the drop down box

If the rejection reason selected is "Other" a comment must be entered 2.1.3.2 Cancel When clicked, the user will be returned to the Invoicing Approval or Invoicing Individual Payment screen. The invoice will still be displayed with the status of the invoice unchanged.

| Screen Label | Type | Size | Screen Field Name | Data Field | Screen Specific Rule |
|---|---|---|---|---|---|
| Amount | Output | 10 | Total Amount Due | CALCULATED | |
| Claim Number | Output | 15 | Claim Number | Insurance Claim Number | |
| Adjuster's Name | Output | 30 | Adjuster's Name | First Name + Last Name | Name of adjuster's to which the invoice is assigned |
| Comments | Input | 50 | Message Text | NOTE | |
| Renter's Name | Output | 30 | Renter's name | First Name + Last Name | Renter's Last Name + Renter's First Name |
| Reason for Rejection | List Box | 20 | Rejection Reasons | standard message description | |

2.1.3 Screen Function Definition

This section includes the definitions for all functions that can be performed within the screen. This includes operations invoked by button clicks, specific shortcut keystrokes, or other actor activity.

Figure 142:
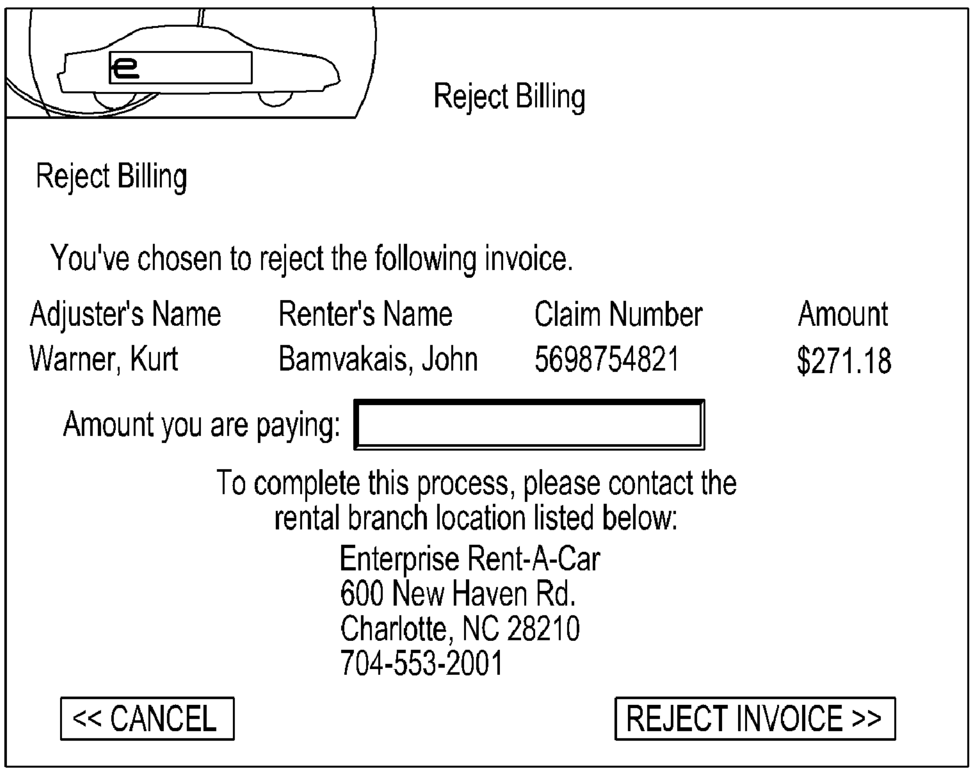

2.2 Reject Billing Amount 2.2.1 Screen Layout—Reject Billing Amount—see FIG. 142

2.2.2 Reject Billing—Reject Billing Amount

| Screen Label | Type | Size | Screen Field Name | Data Field | Screen Specific Rule |
|---|---|---|---|---|---|
| Claim Number | Output | 15 | Claim Number | Insurance Claim Number | |
| Amount | Output | 15.2 | Invoice Amount | Total Amount Due | |
| Adjuster's Name | Output | 30 | Adjuster's Name | First Name + Last Name | Name of adjuster's to which the invoice is assigned. |
| Handling For: | Output | 30 | Handling for Adjuster's Name | First Name + Last Name | Adjuster's First name + Adjuster's last name. The name of the adjuster to which the invoice is currently assigned. |
| | Output | 30 | User's Name | First Name + Last Name | Adjuster's last name + Adjuster's first name. The name of the adjuster to which the invoice is currently assigned. |
| | Output | 30 | Rental Location Address | Address Line + Address Line2 | |
| | Output | 30 | Rental Location City, State and Zip | City + State + Zip Code | |
| | Output | 15 | Rental Location Telephone Number | Telephone Number | |
| Renter's Name | Output | 30 | Renter's name | First Name + Last Name | Renter's Last Name + Renter's First Name |
| To complete this process, please contact the Enterprise Branch listed below: | Output | 50 | Rental Location Accounting Name | accounting name | |

2.2.3 Screen Function Definition

This section includes the definitions for all functions that can be performed within the screen. This includes operations invoked by button clicks, specific shortcut keystrokes, or other actor activity.

2.2.3.1 Reject Invoice

The system will validate the input from the screen. If the validation passes, the invoice will be marked as rejected and the Arms Web database will be updated. If an amount was entered in the "Amount you are paying" field, then the invoice should be marked short paid.

2.2.3.2 Cancel

When clicked, the user will be returned to the Invoicing Approval or Invoicing Individual Payment screen. The invoice will still be displayed with the status of the invoice unchanged.

3. Application Operations

This section will detail all the application operations that are part of this Functional Specification Document.

3.1 Get Invoice Rejection Reasons (Company Id)

The get invoice rejection reasons gets the predefined rejection reasons for the company.

3.2 Reject Invoice (Invoice Number)

The reject invoice operation marks the specified invoice as rejected. The rejected invoice becomes an action item for the adjuster to handle.

4. Data Fields 4.1 Data Field Definition

This section includes a definition of all data fields included in the functional specification.

4.1.1 Accounting Name

| | |
|---|---|
| Entity | OFFDRB OFFICE DIRECTORY BRANCH MASTER |
| Column Name | acctg_nam |
| Label Name | Accounting Name |
| System Name | |
| Data Type | VARCHAR(8) |
| Attribute Definition | |

4.1.2 Address Line

| | |
|---|---|
| Entity | ARM: Rental Location Master |
| Column Name | LOADL1 |
| Label Name | |
| System Name | |
| Data Type | CHAR(30) |
| Attribute Definition | |

4.1.3 Address Line2

| | |
|---|---|
| Entity | ARM: Rental Location Master |
| Column Name | LOADL2 |
| Label Name | Address Line |
| System Name | |
| Data Type | CHAR(30) |
| Attribute Definition | |

4.1.4 City

| | |
|---|---|
| Entity | ARM: Rental Location Master |
| Column Name | LOCYNM |
| Label Name | City |
| System Name | |
| Data Type | CHAR(20) |
| Attribute Definition | |

4.1.5 External Organization Abbreviated Name

| | |
|---|---|
| Entity | EXTERNAL ORGANIZATION |
| Column Name | e_o_abbr_nam |
| Label Name | external organization abbreviated name: |
| System Name | EOABBRNAM |
| Data Type | CHAR(10) |
| Attribute Definition | External Organization Abbreviated Name is a shortened text based label associated with an organization outside of Enterprise. This name is sometimes used for accounting purposes. |

4.1.6 First Name

| | |
|---|---|
| Entity | ARM: Adjustor Master |
| Column Name | ALFSNM |
| Label Name | First Name |
| System Name | |
| Data Type | CHAR(15) |
| Attribute Definition | |

4.1.7 First Name

| | |
|---|---|
| Entity | ARM: Renter Detail |
| Column Name | RKFSNM |
| Label Name | First Name |
| System Name | |
| Data Type | CHAR(15) |
| Attribute Definition | |

4.1.8 Insurance Claim Number

| | |
|---|---|
| Entity | A4 Invoice Header |
| Column Name | I1CLNO |
| Label Name | Insurance Claim Number |
| System Name | |
| Data Type | CHAR(20) |
| Attribute Definition | |

4.1.9 Last Name

| | |
|---|---|
| Entity | ARM: Adjustor Master |
| Column Name | ALLSNM |
| Label Name | Last Name |
| System Name | |
| Data Type | CHAR(20) |
| Attribute Definition | |

4.1.10 Last Name

| | |
|---|---|
| Entity | ARM: Renter Detail |
| Column Name | RKLSNM |
| Label Name | Last Name |
| System Name | |
| Data Type | CHAR(20) |
| Attribute Definition | |

4.1.11 Standard Message Description

| | |
|---|---|
| Entity | STANDARD MESSAGE |
| Column Name | std_msg_dsc |
| Label Name | standard message description: |
| System Name | STDMSGDSC |
| Data Type | CHAR(50) |
| Attribute Definition | The standard message description is a lexical definition for standard message code which defines a predefined message which is applicable to specific activity type codes. For example: "Authorization confirmed on & Date with Reservation Number & Resnumber" |

4.1.12 State

| | |
|---|---|
| Entity | ARM: Rental Location Master |
| Column Name | LOSACD |
| Label Name | State |
| System Name | |
| Data Type | CHAR(2) |
| Attribute Definition | |

4.1.13 Telephone Number

| | |
|---|---|
| Entity | ARM: Rental Location Master |
| Column Name | LOPHNO |
| Label Name | Telephone Number |
| System Name | |
| Data Type | NUMERIC(10) |
| Attribute Definition | |

4.1.14 Total Amount Due

| | |
|---|---|
| Entity | A4 Invoice Trailer |
| Column Name | I3BL$$ |
| Label Name | Total Amount Due |
| System Name | |
| Data Type | DECIMAL(9.2) |
| Attribute Definition | |

4.1.15 Zip Code

| | |
|---|---|
| Entity | ARM: Rental Location Master |
| Column Name | LOZPCD |
| Label Name | Zip Code |
| System Name | |
| Data Type | CHAR(9) |
| Attribute Definition | |

Functional Design Specification
Callbacks
Version 1.1

Callbacks

1. Callbacks 1.1 Brief Description

This use case describes the process that will perform repair facility callbacks in the ARMS Web system. USERs perform repair facility callbacks on each of the rental contracts that are set to expire in the near future (or have already expired), to proactively determine if rentals must be extended due to slippage in repair facility time estimates. The callback process in the ARMS Web system will retrieve each of the rental contracts that will expire in the user-defined period of time, and organize them by repair facility to allow the USER to make one phone call to inquire about the potentially multiple vehicles that the repair facility is responsible for.

1.2 Use Case Actors

All actors will use the use case to retrieve callback lists in the ARMS Web system. All of the following actors can be defined generically as a USER:

PROCESSOR
ADJUSTER
COMPANY MANAGER

For the balance of this use case, all of the above actors will be referred to as USER.

1.3 Pre-Conditions

The USER must be signed-on to the system.

1.4 Flow of Events

The Flow of Events includes all the steps necessary to retrieve and manage callbacks in the ARMS Web system.

Figure 143:
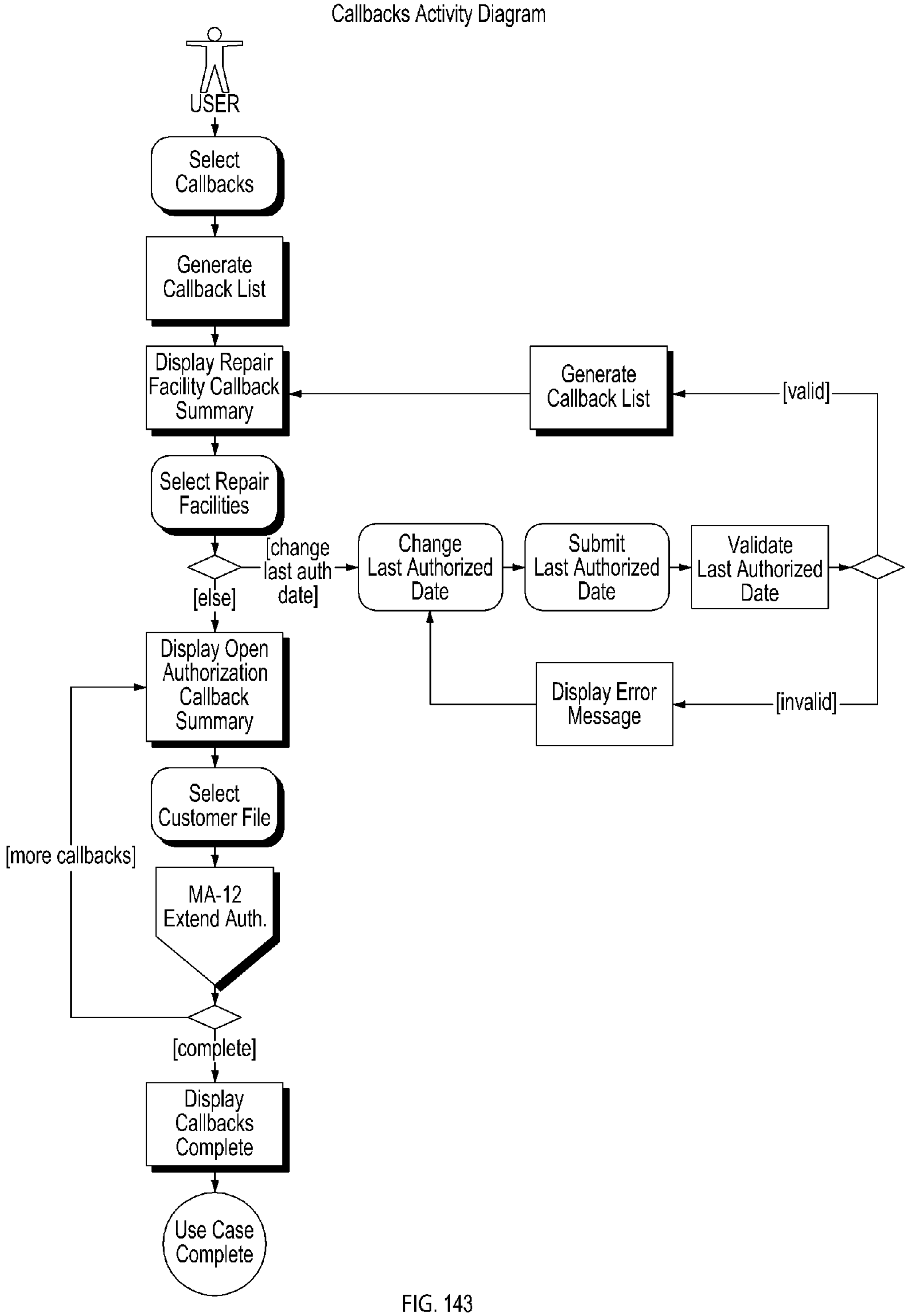

1.4.1 Activity Diagram—see FIG. 143

1.4.2 Basic Flow

The Basic Flow of the Callbacks use case includes all of the required activities for the USER to successfully generate and perform repair facility callbacks in the ARMS Web system.

1. The USER selects to perform callbacks from the reporting menu of top navigation.
2. The system generates a report of all open authorizations for the selected office that will expire the next day (have a last authorized day of tomorrow). This list will include any authorizations that have already expired, or will expire by the end of business on the following day.
3. The system displays a summary of repair facilities that have rentals expiring in the specified timeframe. The repair facility callback summary must consist of:
   Repair Facility Name
   Repair Facility Telephone Number
   Number of Rental callbacks due to the Repair Facility
4. The USER selects one or more repair facilities from the repair facility callback summary.
5. The system displays a summary of the open authorizations that are set to expire for all selected repair facilities. The open authorization callback summary will consist of:
   Renter Name
   Year/Make/Model of the Renter's Vehicle
   Driveable Flag (y/n)
   Number of Days Behind
   Authorized Days
   Last Authorized Day
6. The USER will select a customer file from the list.
7. The USER will extend into use case MA-12 Extend Authorization. The USER will have the ability to extend, add notes, terminate or modify an authorization as proscribed in the MA-12 Extend Authorization use case. If callbacks still exist, the USER will be returned to Step 5 of the Basic Flow on completion of the MA-12 Extend Authorization use case. If all callbacks have been completed, the Basic Flow continues.
8. The system will display a screen to indicate that all repair facility callbacks for the office have been completed.
9. This ends this use case.

1.4.3 Alternative Flows

The Alternative Flows of this use case can occur when certain conditions exist or when specific USER feedback is provided.

1.4.3.1 Change Last Authorized Date

At Step 3 or Step 5 of the Basic Flow, the USER has the ability to change the last authorized day to any day in the future. The system will re-generate the callbacks list and the USER will be returned to Step 2 of the Basic Flow on submission of the new last authorized day.

1.4.3.2 Last Authorized Date Entered Invalid

In the Change Last Authorized Date Alternative Flow, if the last authorized date entered by the USER is invalid, the system will return to the beginning of the Change Last Authorized Date Alternative Flow and provide the USER with an error message.

1.4.3.2.1 It will be considered invalid if the last authorized date entered is less than the current date.

1.5 Post-Conditions

If successful, a callback list is created for the USER.

If unsuccessful, the system state remains unchanged.

1.6 Special Requirements

None.

1.7 Extension Points 1.7.1 MA-12 Extend Authorization

At Step 7 of the Basic Flow, the USER will extend from the use case to the MA-12 Extend Authorization use case. This will allow the USER to update the open authorization with the results of the repair facility callback (e.g., extend, add notes, or terminate the rental authorization). On completion of the MA-12 Extend Authorization use case, the rules specified within the Basic Flow should be followed as to the next step in the process.

2. Screen Design

A definition of the screen layout(s), screen data fields, and screen functions that are used to implement the flows identified above. More than one screen may be used to implement support for the use case flow.

2.1 Repair Facility Callback Summary

This screen provides the USER with a repair facility callback summary, and supports Step 3 of the Basic Flow.

2.1.1 Screen Layout—see FIG. 144

Functional Design Specification

Generate Personal Report

Version 1.11

Generate Personal Report

1. Generate Personal Report 1.1 Brief Description

This use case describes how a USER would generate a report on their personal rental management activity. Personal reports allow the USER access to reporting on only their own rental management activity, which allows the USER to review their own performance and secures access to the rental management reports of others.

1.2 Use Case Actors

All actors will use the use case to generate personal reports in the ARMS Web system. All of the following actors can be defined generically as a USER:

ADJUSTER

PROCESSOR

COMPANY MANAGER

For the balance of this use case, all of the above actors will be referred to as USER.

1.3 Pre-Conditions

The USER must be signed-on to the system.

1.4 Flow of Events

The Flow of Events includes all the steps necessary to generate personal reports in the ARMS Web system.

Figure 145:
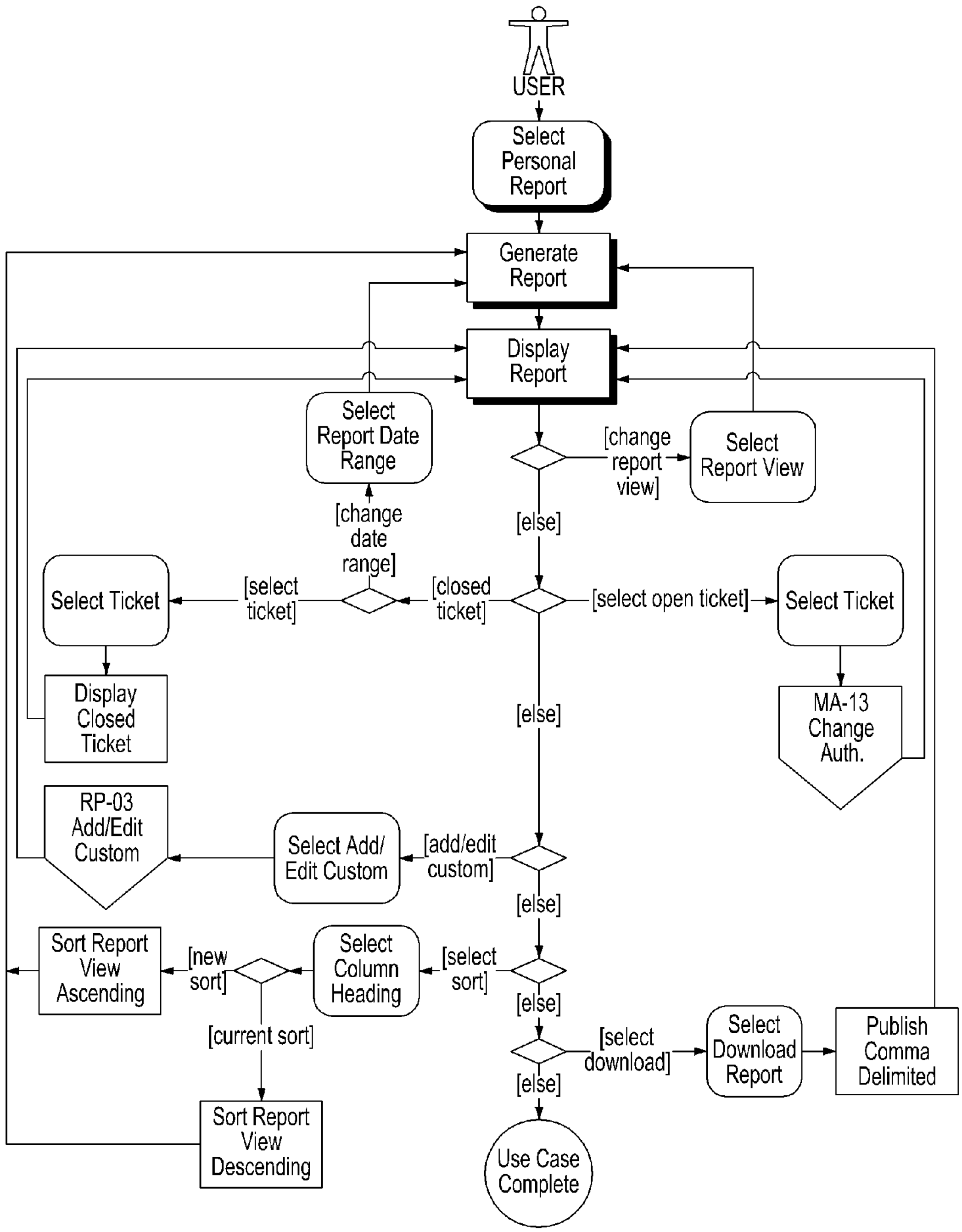

1.4.1 Activity Diagram—see FIG. 145

1.4.2 Basic Flow

The Basic Flow of the Generate Personal Report use case includes all of the required activities for the USER to successfully generate and view a standard personal report in ARMS Web.

1. The USER selects to generate a personal report from the top navigation bar.
2. The system generates the report for the specific USER. The report should provide rental management reports for the signed-in USER. The default report view to display to the USER will be the Open Ticket Detail view (see section 1.6.1 of the Special Requirements section on page 5 for further definition).
3. The system displays the report to the USER.
4. This ends this use case.

1.4.3 Alternative Flows

The Alternative Flows of this use case can occur when certain conditions exist or when specific USER feedback is provided. The Alternative Flows are optional and only occur if the conditions specified are met.

1.4.3.1 Change Report View

At Step 3 of the Basic Flow, the USER will have the ability to change the report 'view'. (Report views are covered in more detail in Section 1.6 Special Requirements.) Report 'views' change the type of information that is presented to the USER, but maintains the same or similar scope. For example, the USER can select to change to a closed ticket detail view from the open ticket detail view, but the information presented is limited (scoped) to the rental management activity of the USER.

If the USER selects to change the report view, the system will return to Step 2 of the Basic Flow and re-generate the report to build the requested view.

1.4.3.2 Change Closed Ticket Date Range

At Step 3 of the Basic Flow, if the current report view is a closed ticket report, the USER will have the ability to change the date range of the report. The available date range for closed ticket reporting will be a rolling 13-month period (to be expanded to 24-months in future releases) with the current month inclusive. The default date range that will be presented to the USER will be the current and previous two (2) months. The USER will have the ability to select Month/Year to begin and end the date range for the closed ticket report. The USER will not have the ability to select specific days within a month as part of the date range.

If the USER selects a new date range for the closed ticket report view, the system will return to Step 2 of the Basic Flow and re-generate the report to build the USERs closed ticket report for the selected date range.

1.4.3.3 Select Open Ticket from Open Ticket Detail Report

At Step 3 of the Basic Flow, if the current report view is an open ticket detail report, the USER will have the ability to select a report line item to view the details of the open ticket customer file. When selected, the system will present the USER with the customer file that corresponds to the selected open ticket. The USER will be allowed to modify and submit changes to the customer file (as proscribed in use case MA-13 Change Authorization). Once activity on the customer file is complete, the USER should be returned to the open ticket detail report (Step 3 of the Basic Flow).

1.4.3.4 Select Closed Ticket from Closed Ticket Detail Report

At Step 3 of the Basic Flow, if the current report view is a closed ticket detail report, the USER will have the ability to select a report line item to view the details of the closed ticket customer file. When selected, the system will present the USER with the closed customer file that corresponds to the selected closed ticket. The USER will be allowed to view/print the details of the closed ticket, but will not have the ability to modify or change the ticket information. From the closed customer file, the USER will be returned to the closed ticket detail report (Step 3 of the Basic Flow).

1.4.3.5 Sort Report

At Step 3 of the Basic Flow, the USER will have the ability to select any report column heading to have the report sorted by the selected column. If the USER selects a column heading, the system must sort the report by the selected column heading in ascending order. The USER will have the ability to toggle between ascending and descending sort order by re-selecting the currently sorted column. For example, if the USER wanted their report view to be sorted by Renter Name, clicking on the column would cause the report view to be sorted ascending by renter last name. If the USER would like to reverse the sort order to descending, selecting the column heading again would allow the report to be resorted descending by renter last name.

The system will return the USER to Step 3 of the Basic Flow on completion of this Alternative Flow, with the report view resorted according to the USER request.

1.4.3.6 Add/Edit Custom View

At Step 3 of the Basic Flow, the USER will have the ability to add or edit a custom report view. If the USER selects to add a report view, the system will extend to the RP-03 Add/Edit Custom View use case to define a new custom report layout.

If the USER is viewing a custom report, they will have the ability to edit the custom view by selecting an 'edit' option. When a user requests to edit a custom report layout, the system will extend to the RP-03 Add/Edit Custom View use case and pre-fill all corresponding fields with the currently selected parameters for the custom layout.

On completion of the use case extension, the USER will be returned to Step 2 of Basic Flow in this use case and be presented with the custom report layout that was defined/modified.

1.4.3.7 Select Download Report

At Step 3 of the Basic Flow, the USER will have the ability to download the current report view to a comma-delimited file. If the USER selects to download a comma-delimited version of the report, the system must publish a comma-delimited file that includes all of the data within the columns of the current report view. The comma-delimited file should include column headings for each of the columns of data provided to the USER. The comma-delimited file must also include report header information that includes:

Report View (open ticket detail/closed ticket detail)

Name of the Adjuster

Date and time the report was generated

The system should return the USER to the report view (Step 3 of the Basic Flow) once a report has been successfully downloaded.

1.5 Post-Conditions

If successful, a standard report is created for the USER.

If unsuccessful, the system state remains unchanged.

1.6 Special Requirements

The special requirements for this use case define all of the personal report 'views' that are available to the USER. This list of personal report views may be expanded at a later date to include additional information from the ARMS/400 reporting detail files, but only these views are anticipated for the initial release.

1.6.1 Open Ticket Detail View

The Open Ticket Detail View provides the USER with columns of data on all currently open tickets under their management. The Open Ticket Detail report will display the following information to the user:

1. Renter Name
2. Claim Number
3. Claim Type
4. Authorized Rate*
5. Authorized Days*
6. Rental Days*
7. Number of Days Behind*
8. Number of Extensions*
9. Surcharges (Y/N)
10. Authorized Amount*

Specific rules that must apply to the Open Ticket Detail report view are outlined in the sections below;

1.6.1.1 Data Columns in the Open Ticket Detail View should be presented in the order defined above. For example, renter name belongs in column 1 of the Open Ticket Detail report.

1.6.1.2 All numeric fields should have averages provided at the foot of each corresponding column. Numeric fields are indicated with an asterisk (*) in the list above.

1.6.1.3 The default sort for the Open Ticket Detail view must be by the Number of Days Behind field, with open tickets that are the farthest behind presented at the top of the list.

1.6.1.4 Any open tickets that have a value greater than zero (0) in the Number of Days Behind field should be highlighted to the USER.

1.6.1.5 The report must include a count of the total number of contracts in the list.

1.6.1.6 The report view must include report header information (in both screen and downloaded versions) that includes:

the type/view of report (open ticket detail)

the name of the USER for whom the report was generated the date/time the open ticket report was generated 1.6.2 Closed Ticket Detail View The Closed Ticket Detail View provides the USER with columns of data on closed ticket activity for the currently selected date range (the default date range is the current plus previous two (2) months). The Closed Ticket Detail report will display the following information to the user:

1. Renter Name
2. Claim Number
3. Claim Type
4. Authorized Rate*
5. Authorized Days*
6. Billed Days*
7. Number of Extensions*
8. Total Charges*
9. Amount Received*
10. Billed Amount*

Specific rules that must apply to the Closed Ticket Detail report view are outlined in the sections below;

1.6.2.1 Data Columns in the Closed Ticket Detail View should be presented in the order defined above. For example, renter name belongs in column 1 of the Closed Ticket Detail report.

1.6.2.2 All numeric fields should have averages provided at the foot of each corresponding column. Numeric fields are indicated with an asterisk (*) in the list above.

1.6.2.3 The default sort for the Closed Ticket Detail view must be by the Claim Number field.

1.6.2.4 The report must include a count of the total number of contracts in the list.

1.6.2.5 The report view must include report header information (in both screen and downloaded versions) that includes:

the type/view of report view (closed ticket detail)

the name of the USER for whom the report was generated the date/time the open ticket report was generated 1.6.3 Custom Report Views The USER will have the ability to define their own custom report views through the RP-03 Add/Edit Custom View use case. These custom views are accessible from the Personal Reporting module of ARMS Web.

1.6.4 Report View Management

The system will present all of the records in a report result set on a single page, and the USER will scroll through the results to find specific records. Report views will not be presented in paging format (e.g., forcing the USER to review the Next 25 of 427 records).

1.7 Extension Points

This section describes the extension points of this use case.

1.7.1 MA-13 Change Authorization

If the USER selects a line item from the Open Ticket Detail report view, the USER will extend into the MA-13 Change Authorization use case (see the Select Open Ticket from Open Ticket Detail Report Alternative Flow on page 3 for additional detail). The USER will have the ability to make any changes or updates that their security level allows, and have the opportunity to return to this use case without making any changes to the open ticket. On completion of activity in the MA-13 Change Authorization use case, the USER will be returned to Step 3 of the Basic Flow within this use case (be presented with the Open Ticket Detail report).

1.7.2 RP-03 Add/Edit Custom View

If the USER selects to add or edit a custom view, the USER will extend into the RP-03 Add/Edit Custom View use case (see the Add/Edit Custom View Alternative Flow on page 4 for additional detail). The USER will define or modify their custom report layout and be returned to Step 2 of the Basic Flow within this use case.

2. Screen Design

A definition of the screen layout(s), screen data fields, and screen functions that are used to implement the flows identified above. More than one screen may be used to implement support for the use case flow.

2.1 Personal Report Template Screen

This screen provides the template to build personal report 'views', and supports Step 3 of the Basic Flow.

Figure 146:
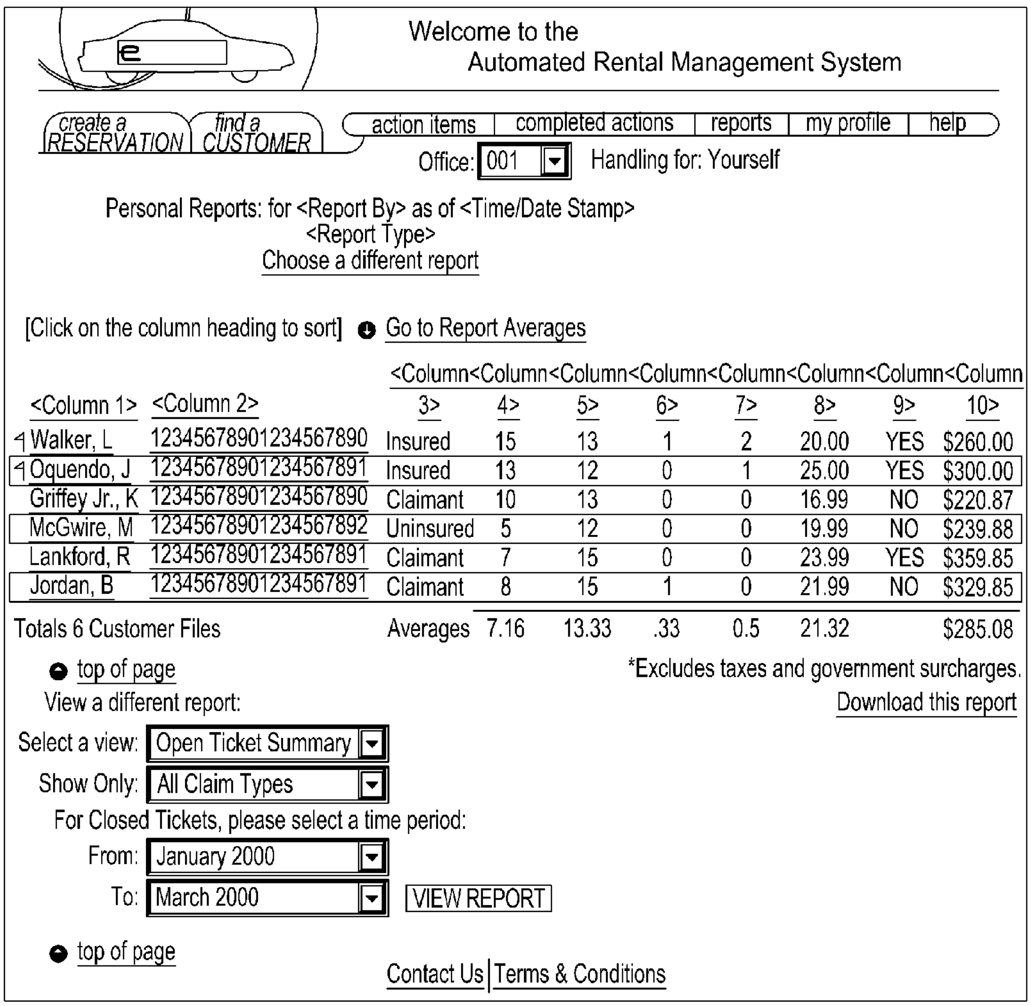

2.1.1 Screen Layout—see FIG. 146

2.1.2 Screen Field Definition

| Screen Label | Type | Length | Data Field | Screen Specific Rule |
|---|---|---|---|---|
| Office | Combo Box | | Branch claims office | This combo list should include all of the offices for the currently active company that the USER is assigned to.<br>If the value of this field is changed, the system should automatically refresh the screen with the current report view for the newly selected office. |
| Handling for | Output Text | | Handling for | For personal reports, this value should always be 'Yourself'. |
| | Output Text | | <Report By> | The <report by> field is a place holder in the header of the report view. For personal reports, this placeholder should be populated with the name of the user that is being reported on (i.e., the name of the user that requested the report). |
| | Output Text | | <Time/Date Stamp> | The <time/date stamp> field is a placeholder in the header of the report view. For personal reports, this placeholder should be populated with the date and time that the report was generated. |
| | Output Text | | <Report Type> | The <report type> field is a placeholder in the header of the report view. For personal reports, this placeholder should be populated with the name of the current report view (e.g., Open Ticket Detail, Custom View 1) |
| <Column Heading I through X> | Output Text | | <Data Columns I through X> | The data columns of the report should correspond to the data columns defined for the selected report view (either static or custom report view). The data columns should be presented in the sequence that they are defined. |
| Total | Output Text | | Number of Customer Files | The total field should include the total number of contracts/customer files that are represented in the report. |

-continued

| Screen Label | Type | Length | Data Field | Screen Specific Rule |
|---|---|---|---|---|
| Select a view | Combo Box | | Report view selection | The 'select a view' combo box should include the names of all report views that are available to the user. This includes all pre-defined (e.g., Open Ticket Detail) and user-defined custom views. There should be an additional option to 'Add a custom view...'. If selected, the system should redirect the user to the Add/Edit Custom View screen in the RP-03 Add/Edit Custom View specification. |
| Show Only | Combo Box | | Claim Type Filter | The 'show only' combo box should include the following values: II Claim Types (default) nsured Claim Types laimant Claim Types ninsured Claim Types heft Claim Types When selected, the report should filter the records to display in the requested report view according to the selection in this combo box. For example, if the selection in the 'show only' field were 'Insured Claim Types', the report view would only include records that have a Claim Type of 'Insured. |
| From | Combo box | | Closed ticket report from date | The 'From' combo box should include all months and years for the last 13 months (rolling 13 month period, current month inclusive). For example a value in this field might include 'January 2000'. The default value should be 2 months prior to the current month. |
| To | Combo box | | Closed ticket report to date | The 'From' combo box should include all months and years for the last 13 months (rolling 13 month period, current month inclusive). For example a value in this field might include 'July 2000'. The default value should be the current month. |

2.1.3 Screen Function Definition

This section includes the definitions for all functions that can be performed within the screen. This includes operations invoked by button clicks, specific shortcut keystrokes, or other actor activity.

2.1.3.1 Choose a Different Report

The 'Choose a different report' screen function provides the USER with a hyperlink to the View a Different Report section of the Personal Report Template screen. The 'Choose a different report' screen function must be at or near the header of the report.

2.1.3.2 Go to Report Averages

The 'Go to Report Averages' screen function provides the USER with a hyperlink to the bottom of the report to review the averages for each of the numeric columns in the report view. The 'Go to Report Averages' hyperlink must be at or near the header of the report.

2.1.3.3 Column Heading Sort

The 'Column Heading Sort' screen function allows the USER to click on any column heading and have the current report view sorted by the selected column. On initial selection of a column heading, the system will resort the report view by the column selected in ascending order. If the sorted column is selected by the USER, the system will resort the report in descending order.

2.1.3.4 Download this Report

The 'Download this Report' screen function allows the USER to click on a hyperlink and download a comma-delimited copy of the current report view. The downloaded copy must include:

- Report Header Information
  - Name of the Report View
  - Name of the Person
  - Date and Time that the Report Was generated
- Report View Column Headings
- Report View Records 2.1.3.5 View Report The 'View Report' screen function allows the USER to submit a request for a different type and/or date range of the report view. The system will refresh the screen with updated report view information when this screen function is invoked.

2.1.3.6 Edit Custom View

The Edit Custom View screen function is available only in cases that the USER has a custom defined view active. If the USER selects the Edit Custom View hyperlink, the system will present the USER with the Add/Edit Custom View screen and pre-populate the screen with the custom view definition. This will allow the USER to edit the custom views that they have previously defined.

Figure 147A:
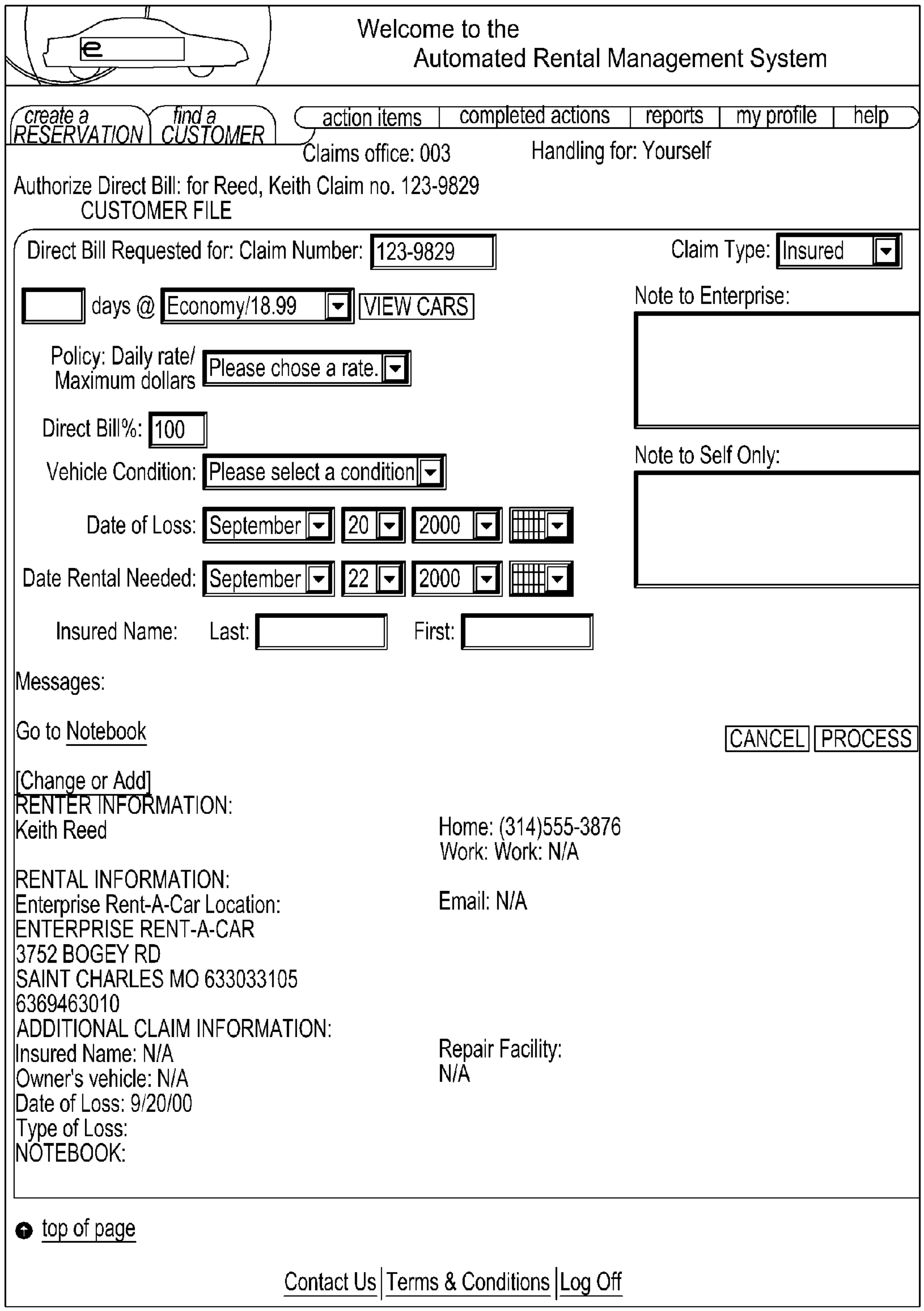
Figure 147B:
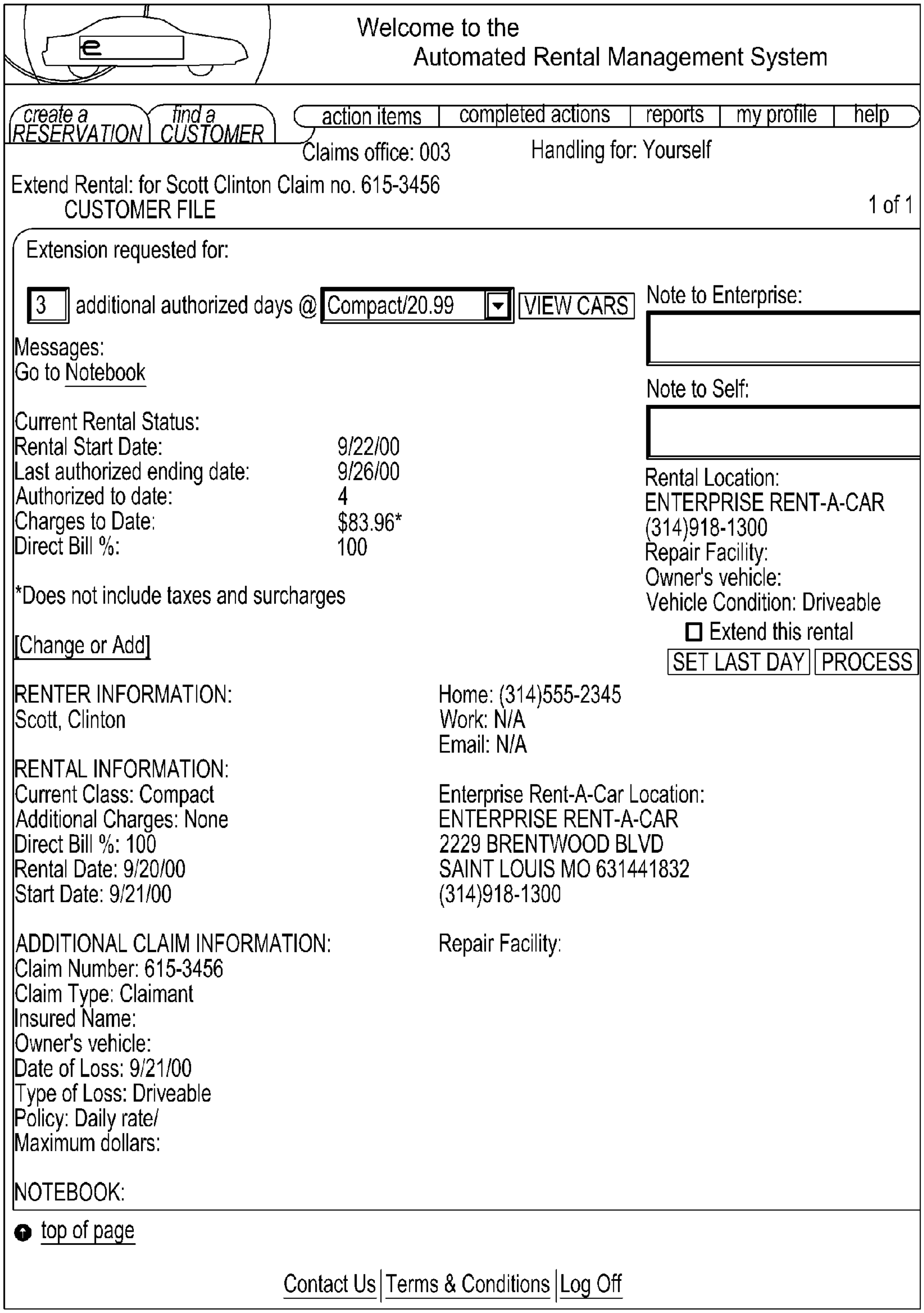
Figure 147C:
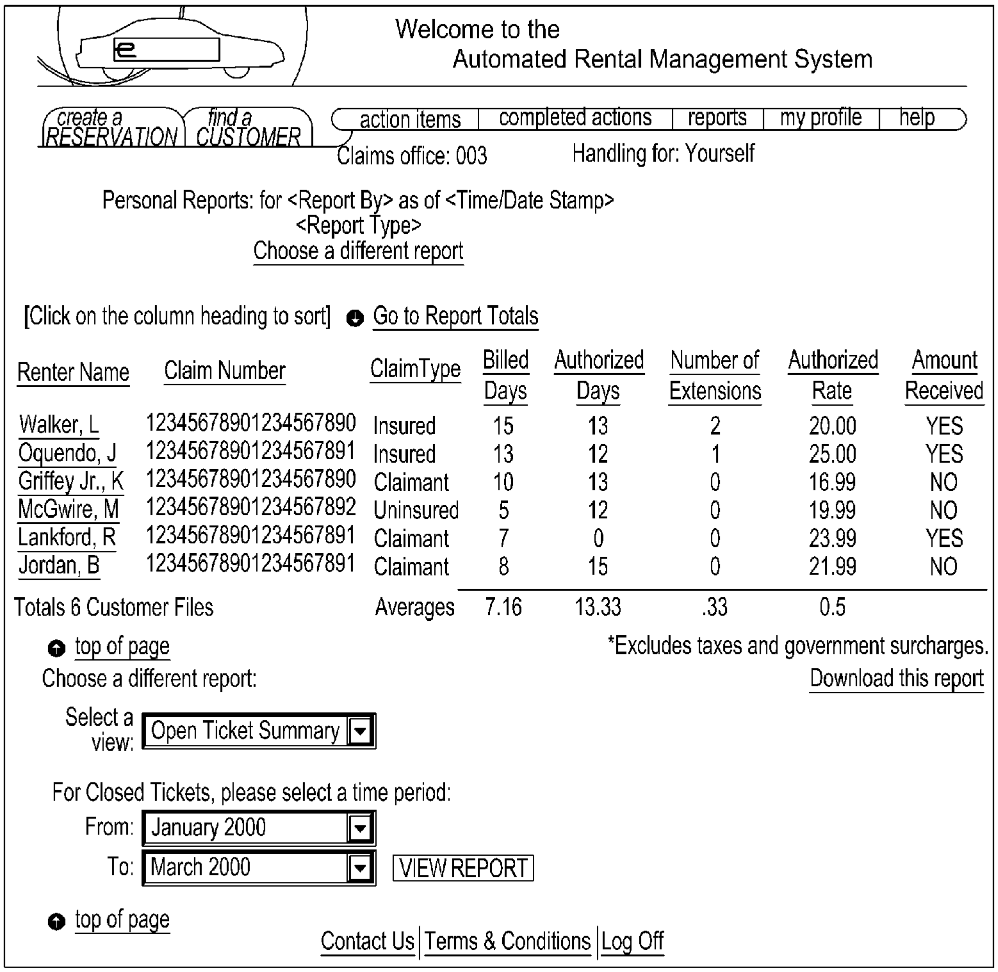

See FIGS. 147(*a*)-(*c*).

Functional Design Specification

Generate Management Report

Version 1.11

Generate Management Report

1. Generate Management Report 1.1 Brief Description

This use case describes how a USER would request and generate management reports using the on-line reporting functionality of ARMS Web. On-line management reports provide real-time access to open and closed ticket information, which provides the management team of our customers with a tool to effectively monitor rental management statistics. Using the on-line reporting functionality, USERs can request and receive summarized and detailed rental management reports on their Office, on Adjusters within an office, or on the Repair Facilities that are trading partners of a particular office.

NOTE: The on-line reporting functionality of ARMS Web provides ARMS ticket data only. ARMS and Non-ARMS reporting is available through the monthly L480 report.

1.2 Use Case Actors

All actors will use the use case to generate management reports in the ARMS Web system. All of the following actors can be defined generically as a USER:

ADJUSTER—Adjusters may be granted the authority to access management reports in their user profile. (Users may be granted access to management reporting capabilities through their user profile, even if they are not considered 'managers' in the ARMS Web system.)

COMPANY MANAGER—All users that are identified to the system as managers will have access rights to the management reporting functionality.

For the balance of this use case, all of the above actors will be referred to as USER.

1.3 Pre-Conditions

The USER must be signed-on to the system.

The USER must have the authority to access management reports.

1.4 Flow of Events

The Flow of Events includes all the steps necessary to generate management reports in the ARMS Web system.

Figure 148:
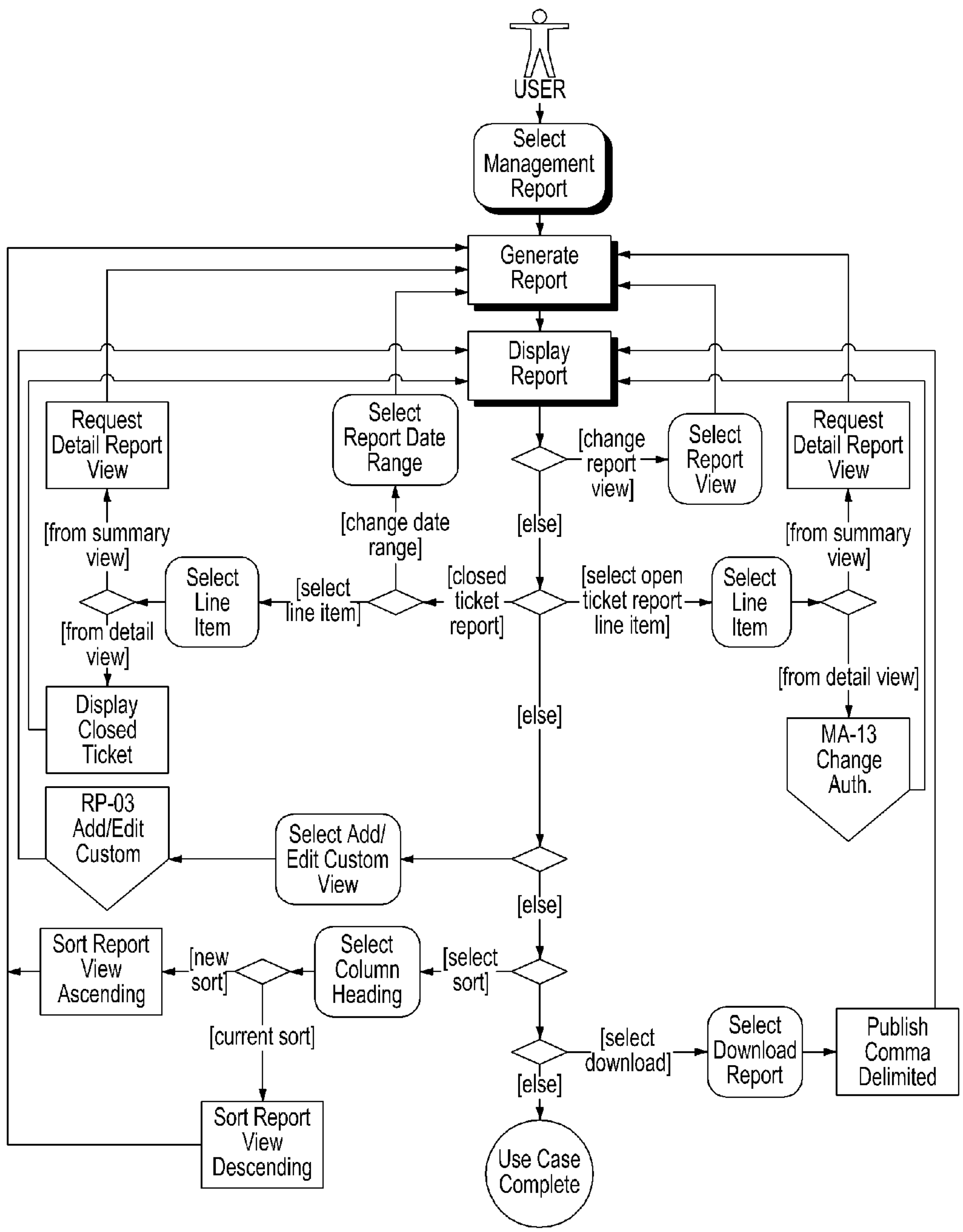

1.4.1 Activity Diagram—see FIG. 148

1.4.2 Basic Flow

The Basic Flow of the Generate Management Report use case includes all of the required activities for the USER to successfully generate and view a management report using the on-line reporting functionality in ARMS Web.

1. The USER selects to generate a management report from top navigation.
2. The system generates a Closed Ticket Summary report by Adjuster for the USER. Management reporting USERs will have the ability to request additional summary or detail reports for:
   a. The office as a whole (by Office)
   b. The adjusters within an office (by Adjuster)
   c. The repair facilities doing business with a claims office (by Repair Facility)
3. The system displays the report to the USER.
4. This ends this use case.

1.4.3 Alternative Flows

The Alternative Flows of this use case can occur when certain conditions exist or when specific USER feedback is provided.

1.4.3.1 Change Report View

At Step 6 of the Basic Flow, the USER will have the ability to change the report 'view'. (Report views are covered in more detail in Section 1.6 Special Requirements.) Report 'views' change the type of information that is presented to the USER, but maintains the same or similar scope.

If the USER selects to change the report view, the system will return to Step 5 of the Basic Flow and re-generate the report to build the requested view. NOTE: The USER may also change the Report By criteria to request a new report view (e.g., request a report by Adjuster, Office, or Repair Facility).

1.4.3.2 Change Closed Ticket Date Range

At Step 6 of the Basic Flow, if the current report view is a closed ticket report, the USER will have the ability to change the date range of the report. The available date range for closed ticket reporting will be a rolling 13-month period (to be expanded to 24-months in future releases) with the current month inclusive. The default date range that will be presented to the USER will be the current and previous two (2) months. The USER will have the ability to select Month/Year to begin and end the date range for the closed ticket report. The USER will not have the ability to select specific days within a month as part of the date range.

If the USER selects a new date range for the closed ticket report view, the system will return to Step 5 of the Basic Flow and re-generate the report to build the USERs closed ticket report for the selected date range.

This applies to both summary and detail views of closed ticket reports.

1.4.3.3 Select Summary Line Item from Open Ticket Summary Report

At Step 6 of the Basic Flow, if the current report view is an open ticket summary report, the USER will have the ability to select a report line item, which will trigger a request for a more detailed report for the selected item. For example, if the current view were an Open Ticket Summary for Adjusters within an office (Open Summary by Adjuster), the USER would have the ability to select an adjuster from the summarized report and review the Open Ticket Detail report for that adjuster. This 'drill-down' capability must be available for all report types (by Office, by Adjuster, by Repair Facility).

If the USER selects a line item from a summary report view, the system will return to Step 5 of the Basic Flow and generate the Open Ticket Detail report view for the selected item. From the Open Ticket Detail, the USER will have the ability to return to the Open Ticket Summary or to continue reviewing the Open Ticket Detail report views for each adjuster/repair facility within the office.

1.4.3.4 Select Open Ticket from Open Ticket Detail Report

At Step 6 of the Basic Flow, if the current report view is an open ticket detail report, the USER will have the ability to select a report line item to view the details of the open ticket customer file. When selected, the system will present the USER with the customer file that corresponds to the selected open ticket. The USER will be allowed to modify and submit changes to the customer file (as proscribed in use case MA-13 Change Authorization). Once activity on the customer file is complete, the USER should be returned to the open ticket detail report (Step 6 of the Basic Flow).

1.4.3.5 Select Summary Line Item from Closed Ticket Summary Report

At Step 6 of the Basic Flow, if the current report view is a closed ticket summary report, the USER will have the ability to select a report line item, which will trigger a request for a more detailed report for the selected item. For example, if the current view were a Closed Ticket Summary for Repair Facilities within an office (Closed Summary by Repair Facility), the USER would have the ability to select a repair facility name from the summarized report and review the Closed Ticket Detail report for that repair facility. This 'drill-down' capability must be available for all report types (by Office, by Adjuster, by Repair Facility).

If the USER selects a line item from a summary report view, the system will return to Step 5 of the Basic Flow and generate the Closed Ticket Detail report view for the selected item. From the Closed Ticket Detail, the USER will have the ability to return to the Closed Ticket Summary or to continue reviewing the Closed Ticket Detail report views for each adjuster/repair facility within the office.

1.4.3.6 Select Closed Ticket from Closed Ticket Detail Report

At Step 6 of the Basic Flow, if the current report view is a closed ticket detail report, the USER will have the ability to select a report line item to view the details of the closed ticket customer file. When selected, the system will present the USER with the closed customer file that corresponds to the selected closed ticket. The USER will be allowed to view/print the details of the closed ticket, but will not have the ability to modify or change the ticket information. From the closed customer file, the USER will be returned to the closed ticket detail report (Step 6 of the Basic Flow).

1.4.3.7 Sort Report

At Step 6 of the Basic Flow, the USER will have the ability to select any report column heading to have the report sorted by the selected column. If the USER selects a column heading, the system must sort the report by the selected column heading in ascending order. The USER will have the ability to toggle between ascending and descending sort order by re-selecting the currently sorted column. For example, if the USER wanted their report view to be sorted by Renter Name, clicking on the column would cause the report view to be sorted ascending by renter last name. If the USER would like to reverse the sort order to descending, selecting the column heading again would allow the report to be resorted descending by renter last name.

The system will return the USER to Step 6 of the Basic Flow on completion of this Alternative Flow, with the report view resorted according to the USER request.

1.4.3.8 Add/Edit Custom View

At Step 6 of the Basic Flow, the USER will have the ability to add or edit a custom report view. If the USER selects to add a report view, the system will extend to the RP-03 Add/Edit Custom View use case to define a new custom report layout.

If the USER is viewing a custom report, they will have the ability to edit the custom view by selecting an 'edit' option. When a user requests to edit a custom report layout, the system will extend to the RP-03 Add/Edit Custom View use case and pre-fill all corresponding fields with the currently selected parameters for the custom layout.

On completion of the use case extension, the USER will be returned to Step 5 of Basic Flow in this use case and be presented with the custom report layout that was defined/modified.

1.4.3.9 Select Download Report

At Step 6 of the Basic Flow, the USER will have the ability to download the current report view to a comma-delimited file. If the USER selects to download a comma-delimited version of the report, the system must publish a comma-delimited file that includes all of the data within the columns of the current report view. The comma-delimited file should include column headings for each of the columns of data provided to the USER. The comma-delimited file must also include report header information that includes:

Report View (open ticket detail/closed ticket detail)
Name of the Adjuster
Date and time the report was generated The system should return the USER to the report view (Step 6 of the Basic Flow) once a report has been successfully downloaded.

1.5 Post-Conditions

If successful, a standard report is created for the USER.

If unsuccessful, the system state remains unchanged.

1.6 Special Requirements

The special requirements for this use case define all of the management report 'views' that are available to the USER. Management reports will be provided two USERs in two ways:

- 'Standard' reporting views that have been defined by Enterprise at the request of customers
- 'Custom' reporting detail views that allow the USER to define the columns of data that they would like to be present in a report 1.6.1 Standard Management Reporting Views Standard management reporting views are views that have been defined by Enterprise based on the requests of customers. These views will be carried forward in to ARMS Web and are defined in this section.

The table below (see FIG. 149) includes the detailed data fields that are available on each of the 'standard' management records. The columns available in each report have been expanded somewhat over the current state, as the web environment offers more flexibility to provide additional information than the current state green screen application. The sequence of columns that must be presented in each report are indicated using the number 1-10, with fields that are on the screen but not in the primary data table indicated with an 'X'. For example, the first column in the 'Adjuster—Open Detail' report is the renter name, the second column is the claim number, etc.

1.6.1.1 All numeric fields should have averages provided at the foot of each corresponding column. Numeric fields are indicated with an asterisk (*) in the list above.

1.6.1.2 The default sort for the Open Ticket Detail views must be by the Number of Days Behind field, with open tickets that are the farthest behind presented at the top of the list.

1.6.1.3 The default sort for the Closed Ticket Detail views must be by Claim Number.

1.6.1.4 The default sort for the Open Ticket Summary views must be by Adjuster Name (if by Adjuster), Repair Facility Name (if by Repair Facility), or Office Name (if by Office)

1.6.1.5 The default sort for the Closed Ticket Summary views must be by Adjuster Name (if by Adjuster), Repair Facility Name (if by Repair Facility), or Month/Year (if by Office)

1.6.1.6 Any items in an Open Ticket Detail view that have a value greater than zero (0) in the Number of Days Behind field should be highlighted to the USER.

1.6.1.7 All report views must include a count of the total number of contracts listed.

1.6.1.8 The report view must include report header information (in both screen and downloaded versions) that includes:

- the type/name of the report view (e.g., open ticket detail, open ticket summary)

the name of the entity that is being reported on. For summary views, this should always be the office name. For detail views, the entity name must be:
the adjuster name (for reports by Adjuster)
the office name (for reports by Office)
the repair facility name (for reports by Repair Facility)
the date/time the report was generated 1.6.2 Custom Management Reporting Views Custom management reporting views allow the USER to define the fields that they would like to use to build their own report. The fields selected by the USER become the columns of the report, and the system will not limit the number of columns that a USER can request as part of the report. Custom reporting views are discussed at length in use case RP-03 Add/Edit Custom View.

1.6.3 Report View Management

The system will present all of the records in a report result set on a single page, and the USER will scroll through the results to find specific records. Report views will not be presented in paging format (e.g., forcing the USER to review the Next 25 of 427 records).

1.7 Extension Points

This section describes the extension points of this use case.

1.7.1 MA-13 Change Authorization

If the USER selects a line item from the Open Ticket Detail report view, the USER will extend into the MA-13 Change Authorization use case (see the Select Open Ticket from Open Ticket Detail Report Alternative Flow on page 4 for additional detail). The USER will have the ability to make any changes or updates that their security level allows, and have the opportunity to return to this use case without making any changes to the open ticket. On completion of activity in the MA-13 Change Authorization use case, the USER will be returned to Step 6 of the Basic Flow within this use case.

1.7.2 RP-03 Add/Edit Custom View

If the USER selects to add or edit a custom view, the USER will extend into the RP-03 Add/Edit Custom View use case (see the Add/Edit Custom View Alternative Flow on page 5 for additional detail). The USER will define or modify their custom report layout and be returned to Step 6 of the Basic Flow within this use case.

2. Screen Design

A definition of the screen layout(s), screen data fields, and screen functions that are used to implement the flows identified above. More than one screen may be used to implement support for the use case flow.

2.1 Management Report View Template

This screen provides the USER with a management report view template, and supports Step 6 of the Basic Flow.

Figure 150:
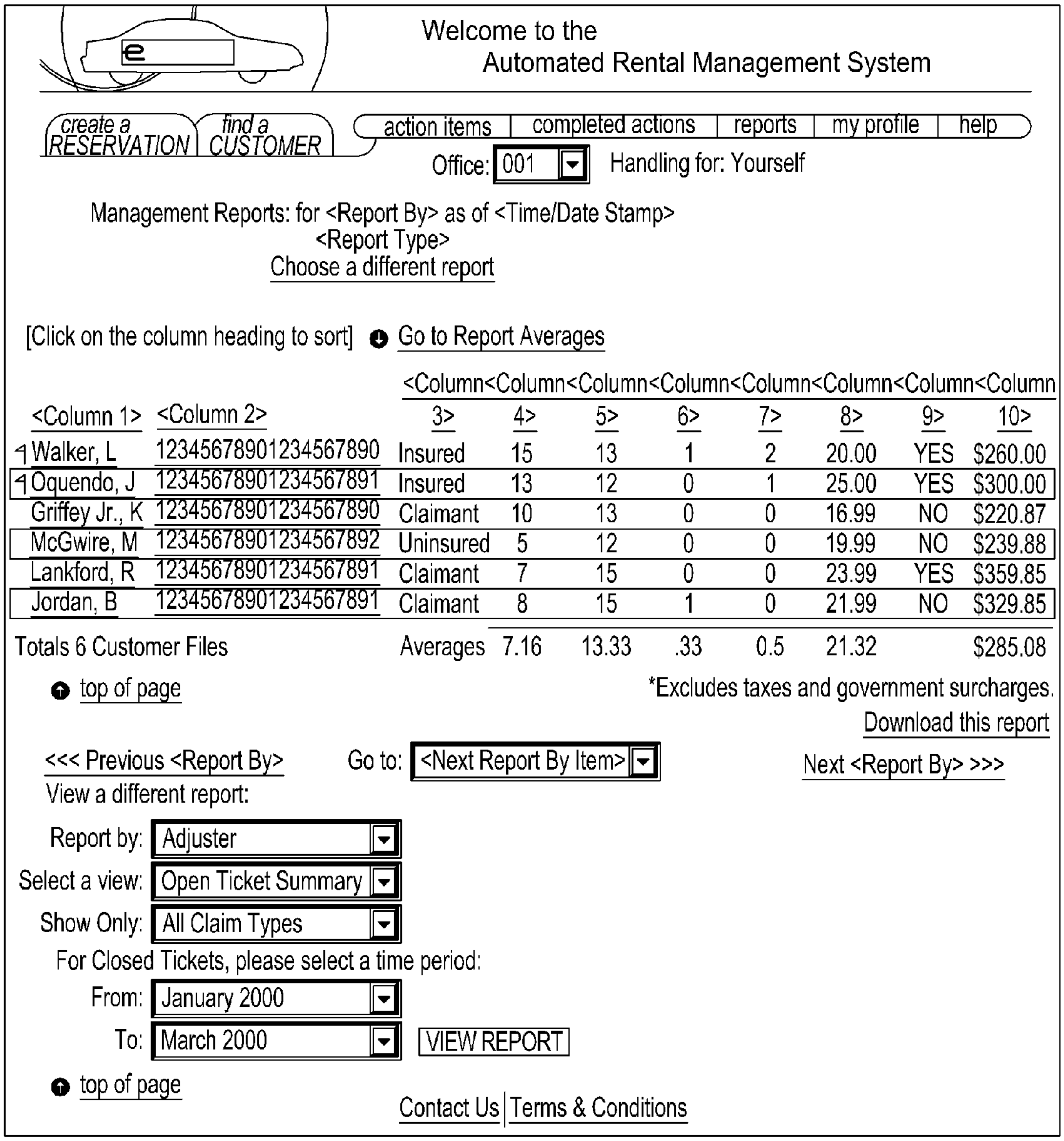

2.1.1 Screen Layout—see FIG. 150

2.1.2 Screen Field Definition

| Screen Label | Type | Length | Data Field | Screen Specific Rule |
|---|---|---|---|---|
| Office | Combo Box | | Branch claims office | This combo list should include all of the offices for the currently active company that the USER is assigned to. If the value of this field is changed, the system should automatically refresh the screen with the current report view for the newly selected office. |
| Handling for | Output Text | | Handling for | For management reports, this value should always be 'Yourself'. |
| | Output Text | | <Report By> | The <report by> field is a placeholder in the header of the report view. For management reports, this placeholder should be populated with the name of the entity that is being reported on (i.e., Adjuster Name, Office Name, or Repair Facility Name). |
| | Output Text | | <Time/Date Stamp> | The <time/date stamp> field is a placeholder in the header of the report view. For management reports, this placeholder should be populated with the date and time that the report was generated. |
| | Output Text | | <Report Type> | The <report type> field is a placeholder in the header of the report view. For management reports, this placeholder should be populated with the name of the current report view (e.g., Open Ticket Detail, Custom View 1) |
| <Column Heading I through X> | Output Text | | <Data Columns I through X> | The data columns of the report should correspond to the data columns defined for the selected report view (either static or custom report view). The data columns should be presented in the sequence that they are defined. |
| Total | Output Text | | Number of Customer Files | The total field should include the total number of contracts/customer files that are represented in the report. |

-continued

| Screen Label | Type | Length | Data Field | Screen Specific Rule |
|---|---|---|---|---|
| Go to | Combo Box | | Report sorted by navigation | The 'Go to' combo box should include all of the entities available in the current report. For example, if the report were an Open Ticket Detail view Reported By Adjuster, this list would include all of the Adjusters that would PAGE in the list.<br>The 'Go to' combo box should only be available in detail views. |
| Report by | Combo box | | Report sorted by | The 'Report by' combo box should include all of the currently available report by options in the ARMS Web system. The report by options for the initial release of ARMS Web 2.0 should be: 'Office', 'Adjuster', and 'Repair Facility' |
| Select a view | Combo box | | Report view selection | The 'select a view' combo box should include the names of all report views that are available to the user. This includes all pre-defined (e.g., Open Ticket Detail) and user-defined custom views.<br>There should be an additional option to 'Add a custom view...'. If selected, the system should redirect the user to the Add/Edit Custom View screen in the RP-03 Add/Edit Custom View specification. |
| Show Only | Combo box | | Claim Type Filter | The 'show only' combo box should include the following values:<br>II Claim Types (default)<br>nsured Claim Types<br>laimant Claim Types<br>ninsured Claim Types<br>heft Claim Types<br>When selected, the report should filter the records to display in the requested report view according to the selection in this combo box. For example, if the selection in the 'show only' field were 'Insured Claim Types', the report view would only include records that have a Claim Type of 'Insured. |
| From | Combo box | | Closed ticket report from date | The 'From' combo box should include all months and years for the last 13 months (rolling 13 month period, current month inclusive). For example a value in this field might include 'January 2000'.<br>The default value should be 2 months prior to the current month. |
| To | Combo box | | Closed ticket report to date | The 'From' combo box should include all months and years for the last 13 months (rolling 13 month period, current month inclusive). For example a value in this field might include 'July 2000'.<br>The default value should be the current month. |

2.1.3 Screen Function Definition

This section includes the definitions for all functions that can be performed within the screen. This includes operations invoked by button clicks, specific shortcut keystrokes, or other actor activity.

2.1.3.1 Choose a Different Report

The 'Choose a different report' screen function provides the USER with a hyperlink to the View a Different Report section of the Personal Report Template screen. The 'Choose a different report' screen function must be at or near the header of the report.

2.1.3.2 Go to Report Averages

The 'Go to Report Averages' screen function provides the USER with a hyperlink to the bottom of the report to review the averages for each of the numeric columns in the report view. The 'Go to Report Averages' hyperlink must be at or near the header of the report.

2.1.3.3 Column Heading Sort

The 'Column Heading Sort' screen function allows the USER to click on any column heading and have the current report view sorted by the selected column. On initial selection of a column heading, the system will resort the report view by the column selected in ascending order. If the sorted column is selected by the USER, the system will resort the report in descending order.

2.1.3.4 Previous <Report By>

The 'Previous <Report By>' screen function allows the USER to navigate to the previous detail record in a particular detail report. For example, if the report view were an Open Ticket Detail report by Repair Facility, the 'Previous <Report By>' screen function would allow the USER to move to the previous Repair Facility detail record in a report. This screen function should only be available on open or closed ticket detail views (including custom views), and should only be available if a previous report by item exists (i.e., we wouldn't have a previous item if we were on the first item in the list).

2.1.3.5 Next <Report By>

The 'Next <Report By>' screen function allows the USER to navigate to the next detail record in a particular detail report. For example, if the report view were an Open Ticket Detail report by Adjuster, the 'Next <Report By> screen function would allow the USER to move forward to the next Adjuster's detail report view within the office. This screen function should only be available on open or closed ticket detail views (including custom views), and should only be available if a next report by item exists (i.e., we wouldn't have a next item if we were on the last item in the list).

2.1.3.6 Download this Report

The 'Download this Report' screen function allows the USER to click on a hyperlink and download a comma-delimited copy of the current report view. The downloaded copy must include:

- Report Header Information
  - Name of the Report View
  - Name of the Person
  - Date and Time that the Report Was generated
- Report View Column Headings
- Report View Records 2.1.3.7 View Report The 'View Report' screen function allows the USER to submit a request for a different type and/or date range of the report view. The system will refresh the screen with updated report view information when this screen function is invoked.

2.1.3.8 Edit Custom View

The Edit Custom View screen function is available only in cases that the USER has a custom defined view active. If the USER selects the Edit Custom View hyperlink, the system will present the USER with the Add/Edit Custom View screen and pre-populate the screen with the custom view definition. This will allow the USER to edit the custom views that they have previously defined.

Functional Design Specification
Add/Edit Custom View
Version 1.1

Add/Edit Custom View

1. Generate Management Report 1.1 Brief Description

The Add/Edit Custom View use case describes the process to add or edit a custom report view in the ARMS Web system. Custom views allow the USER to select the data columns that they would like to view in a report (from a pre-defined list of available fields). USERs will have the ability to access their custom views just as they would any other 'standard' report view.

1.2 Use Case Actors

All actors will use the use case to add or edit a custom report view(s) in the ARMS Web system. All of the following actors can be defined generically as a USER:

- ADJUSTER
- COMPANY MANAGER

For the balance of this use case, all of the above actors will be referred to as USER.

1.3 Pre-Conditions

The USER must be signed-on to the system.

The USER must have the on-line reporting functionality active (i.e., must be on an on-line reporting screen).

1.4 Flow of Events

The Flow of Events includes all the steps necessary to add or edit a custom report view in the ARMS Web system.

Figure 151:
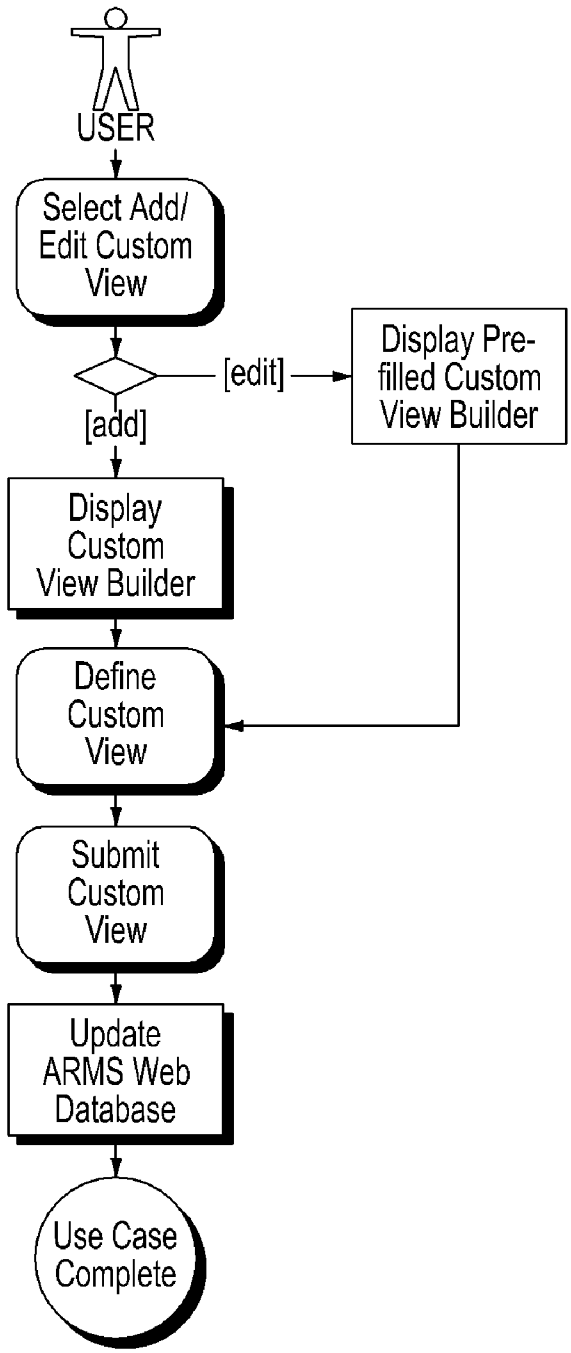

1.4.1 Activity Diagram—see FIG. 151

1.4.2 Basic Flow

The Basic Flow of the Add/Edit Custom View use case includes all of the required activities for the USER to successfully add or edit a custom report view for use in the on-line reporting functionality of ARMS Web.

1. The USER selects to add or edit a custom report view from the on-line reporting screen(s).
2. The system displays a screen that allows the USER to define or build a custom report view.
3. The USER defines the custom report view. The USER will have the ability to indicate a Name for the view, and define the data columns that they would like to have reported. The comprehensive list of data columns that will be available to the USER can be found in Section 1.6 Special Requirements (on page 4).
4. The USER will submit the custom view to the system.
5. The system will update the ARMS Web database.
6. This ends this use case.

1.4.3 Alternative Flows

The Alternative Flows of this use case can occur when certain conditions exist or when specific USER feedback is provided.

1.4.3.1 Edit Custom Report View

At Step 1 of the Basic Flow, if the USER selected to edit a current custom report view, the system will present the screen to define/build a custom report and pre-fill all fields with the current report definition. For example, if the USER were editing their 'Massive' custom report view, 'Massive' would appear in the report name field and all of the data columns that were previously defined as the massive report would appear in the 'selected columns' portion of the screen.

1.5 Post-Conditions

If successful, a custom report view is created for the USER.

If unsuccessful, the system state remains unchanged.

1.6 Special Requirements

The special requirements for this use case define all of the management report 'views' that are available to the USER. Management reports will be provided two USERs in two ways:

1.6.1 Custom Report Definition

This section provides the system framework for custom report view definition in the ARMS Web system. These are additional requirements around functionality to allow USERs to define/build custom report views, and apply to the use case as a whole.

1.6.1.1 USERs will have the ability to create one or more custom views.

1.6.1.2 USERs will be able to define custom report views for DETAIL views only (USERs will not have the ability to define custom summary views). (Most of the numeric fields that can be summarized for USERs are already provided in the standard management report views.)

1.6.1.3 USERs will have the ability to select custom report views by Office, by Adjuster, or by Repair Facility (similar to the standard management reports).

1.6.1.4 Custom report views will be limited to the data columns in the Custom Report View Data Domain (see 1.6.2 Custom Report View Data Domain)

1.6.1.5 Custom report views must define if the report view retrieves Open, Closed, or All Ticket statuses.

1.6.1.6 All custom report views defined as 'closed ticket only' must allow the user to indicate a date range. The default date range for custom views will be the same as the default range for standard closed ticket reports (the current month plus two (2) prior months).

1.6.1.7 When a custom report view has been defined, the name of the custom report view will become a selection from the USERs view list. For example, 'MyCustomView' would be seen in the list with 'Open Ticket Detail', 'Closed Ticket Detail', etc.

1.6.2 Custom Report View Data Domain

The following is a list of all available data columns that a USER may select as part of a custom report view. The number of columns that a USER selects to make part of the custom report view is not limited, which allows the USER to select a subset or all of these data fields to be published in their report.

| | | |
|---|---|---|
| Adjuster | Claim Number | Claim Type |
| Office Name | Renter Name | State of Rental Location |
| Authorized Days | Authorized Rate | Policy Daily Rate |
| Days Behind | Number of Extensions | Policy Maximum Rate |
| Rental Days | Billed Days | Billed to % |
| Repair Facility Name | Insured Name | Rental Status |
| Total Charges | Billed Amount | Amount Received |
| Other Charges | Vehicle Condition (Driveable Flag/Repairable Flag) | Authorized Total Amount |
| Surcharges Flag | Rental Start Date | Rental Close Date |
| Termination Date | Invoice Date | Invoice Approve Date |
| Remittance Date | Repair Facility Phone Number | |

1.7 Extension Points

None.

2. Screen Design

A definition of the screen layout(s), screen data fields, and screen functions that are used to implement the flows identified above. More than one screen may be used to implement support for the use case flow.

2.1 Add/Edit Custom View

This screen provides the USER with the ability to add or edit a custom view, and supports Step 2 of the Basic Flow.

Figure 152:
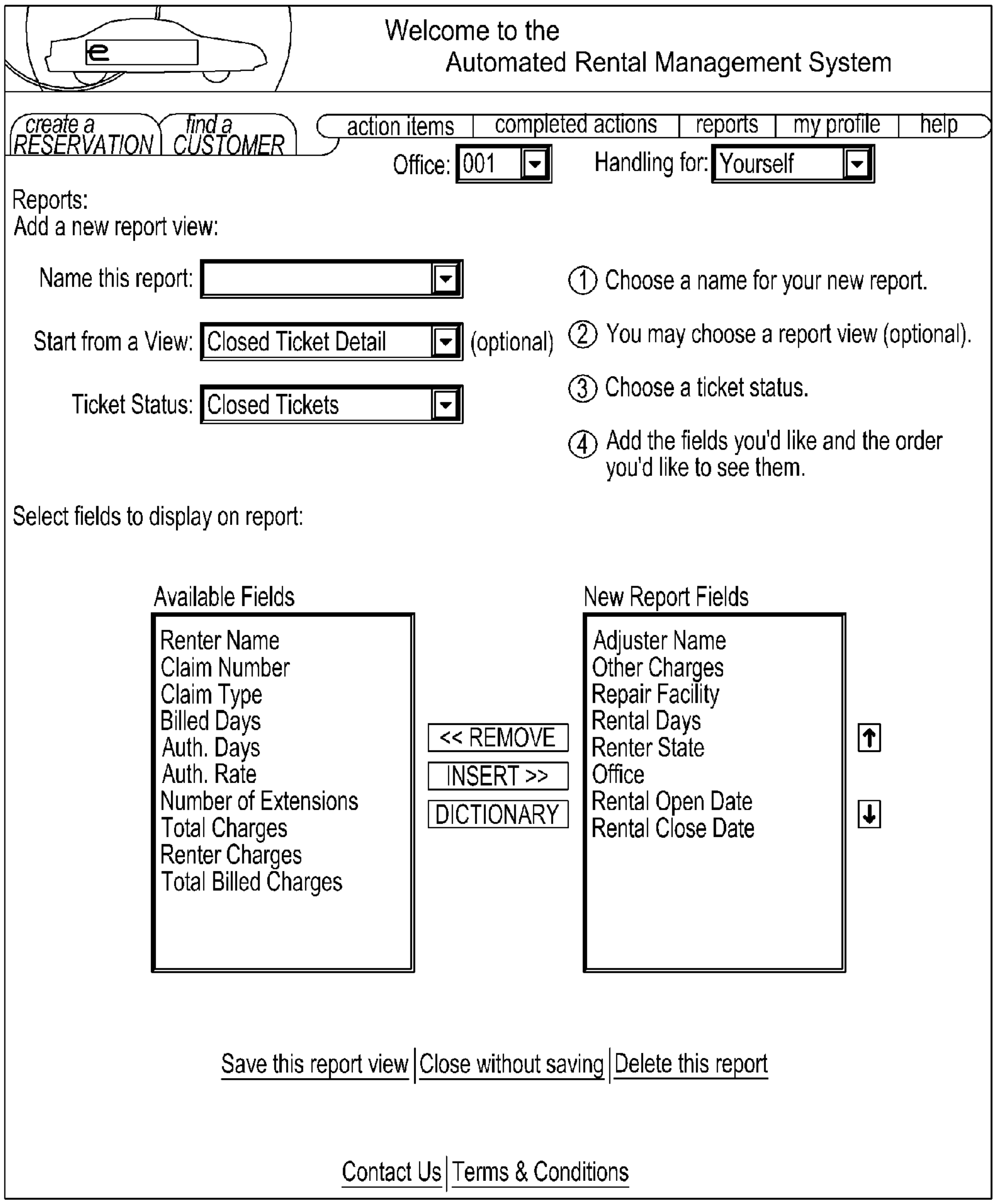

2.1.1 Screen Layout—see FIG. 152

2.1.2 Screen Field Definition

| Screen Label | Type | Length | Data Field | Screen Specific Rule |
|---|---|---|---|---|
| Name this report | Text | | Custom Report Name | The name a USER provides to refer to the custom report view definition. The name of the report must be unique to other custom reports defined by the user (e.g., a single user can not have two reports with the same name). This uniqueness must only be enforced at the user level (e.g., two different users CAN use the same name for a report). The name of the report will appear in the USERs 'Select a view' combo box when the report view is saved. |
| Start from a View | Combo box | | Custom view start point | The 'Start from a View' combo list allows a USER to select a default or 'standard' view as a starting point in report view definition. The values within the combo box should be 'Open Ticket Detail' and 'Closed Ticket Detail'. If selected, the system should use the values of the Report by 'Adjuster' standard report to pre-populate the 'New Report Fields' list box. The default value of this field should be '-Select a Starting View-' |
| Ticket Status | Combo box | | Custom view ticket status | The 'Ticket Status' combo box indicates the scope of the report in terms of ticket status. The list should include 'Open Tickets', 'Closed Tickets', and 'All Tickets'. The system will use this as part of the overall custom report definition. |
| Available Fields | List Box | | Custom view available fields | The 'Available Fields' list box includes all of the fields that are available to be included in a custom view, but have not yet been selected to be included in the report. When an available field is selected from the list to be included in the report, the field should be removed from this list box (and populate the 'New Report Fields' list box). |

-continued

| Screen Label | Type | Length | Data Field | Screen Specific Rule |
|---|---|---|---|---|
| | | | | For a list of all available fields see Section 1.6.2 Custom Report View Data Domain above. |
| New Report Fields | List Box | | Custom view selected fields | The 'New Report Fields' list box includes all of the fields that have been selected by the USER. These fields define the columns of the report. The sequence that the fields appear in the report is defined from top to bottom of this list box (e.g., the first field in the list = the first column in the report). This sequence can be modified using the Sequence Up and Sequence Down screen functions (see 0 Screen Function Definition below). If the USER selects a starting view (from the Start from a View field), the list box will populate with all of the fields that make up the standard view selected (e.g., if the USER selects 'Closed Ticket Detail' from the Start from a View field, all of the fields that make up a Closed Ticket Detail report would populate in this field. |

2.1.3 Screen Function Definition

This section includes the definitions for all functions that can be performed within the screen. This includes operations invoked by button clicks, specific shortcut keystrokes, or other actor activity.

2.1.3.1 Remove

The 'Remove' screen function allows a USER to remove selected fields from the New Report Fields' list box (and re-add them to the 'Available Fields' list box).

2.1.3.2 Insert

The 'Insert' screen function allows a USER to add selected fields to the 'New Report Fields' list box (and remove them from the 'Available Fields' list box).

2.1.3.3 Dictionary

The 'Dictionary' screen function allows a USER to open a dictionary that defines all of the fields that can be added to a report view. The dictionary will be included as part of the help functionality of the system.

2.1.3.4 Sequence Up

The 'Sequence Up' screen function (presented with an 'up' arrow in the screen shot) allows a USER to move a selected field in the 'New Report Fields' list box up in the sequence of the report.

2.1.3.5 Sequence Down

The 'Sequence Down' screen function (presented with a 'down' arrow in the screen shot) allows a USER to move a selected field in the 'New Report Fields' list box down in the sequence of the report.

2.1.3.6 Save Report View

The 'Save Report View' screen function allows the USER to save the custom report definition and return to the reporting use case(s). The system will return the USER to the report use case from which they entered this use case (either RP-01 or RP-02) and be presented with the newly defined report view.

2.1.3.7 Close without Saving

The 'Close without Saving' screen function allows the USER to exist the screen with saving any changes made. The system will return the USER to the report use case from which they entered this use case (either RP-01 or RP-02).

2.1.3.8 Delete

The 'Delete' screen function allows the USER to delete a custom report view from their profile. When a custom report view is deleted it should no longer be available in the USERs view selection combo box. The system will return the USER to the report use case from which they entered this use case (either RP-01 or RP-02).

Functional Design Specification
Maintain User
Version 1.3

Maintain User

1. Maintain User Use Case 1.1 Brief Description

The Maintain User use case describes how a USER would set up or maintain a user in the ARMS Web system.

1.2 Use Case Actors

The following actors will interact with this use case:

ENTERPRISE ADMINISTRATOR—The ENTERPRISE ADMINISTRATOR is a person who can perform this use case to set up any user in a company.

COMPANY ADMINISTRATOR—The COMPANY ADMINISTRATOR is a person who can perform this use case for the company. They may add users and assign them to office(s) that they are the administrator of within the company.

OFFICE ADMINISTRATOR—The OFFICE ADMINISTRATOR is a person who can perform this use case for the company. The OFFICE ADMINISTRATOR may maintain any user in their company structure to which they have been assigned ownership.

1.3 Pre-Conditions

The USER must be logged into the system.

If maintaining a user, the USER should have the ability to maintain that user. In order to maintain a user at a specific office, the ADMINISTRATOR must have access to that specific office.

If adding a user, the USER should have the ability to add a user.

1.4 Flow of Events

The Flow of Events will include all the steps necessary to add or maintain a company user in the ARMS Web system.

Figure 153:
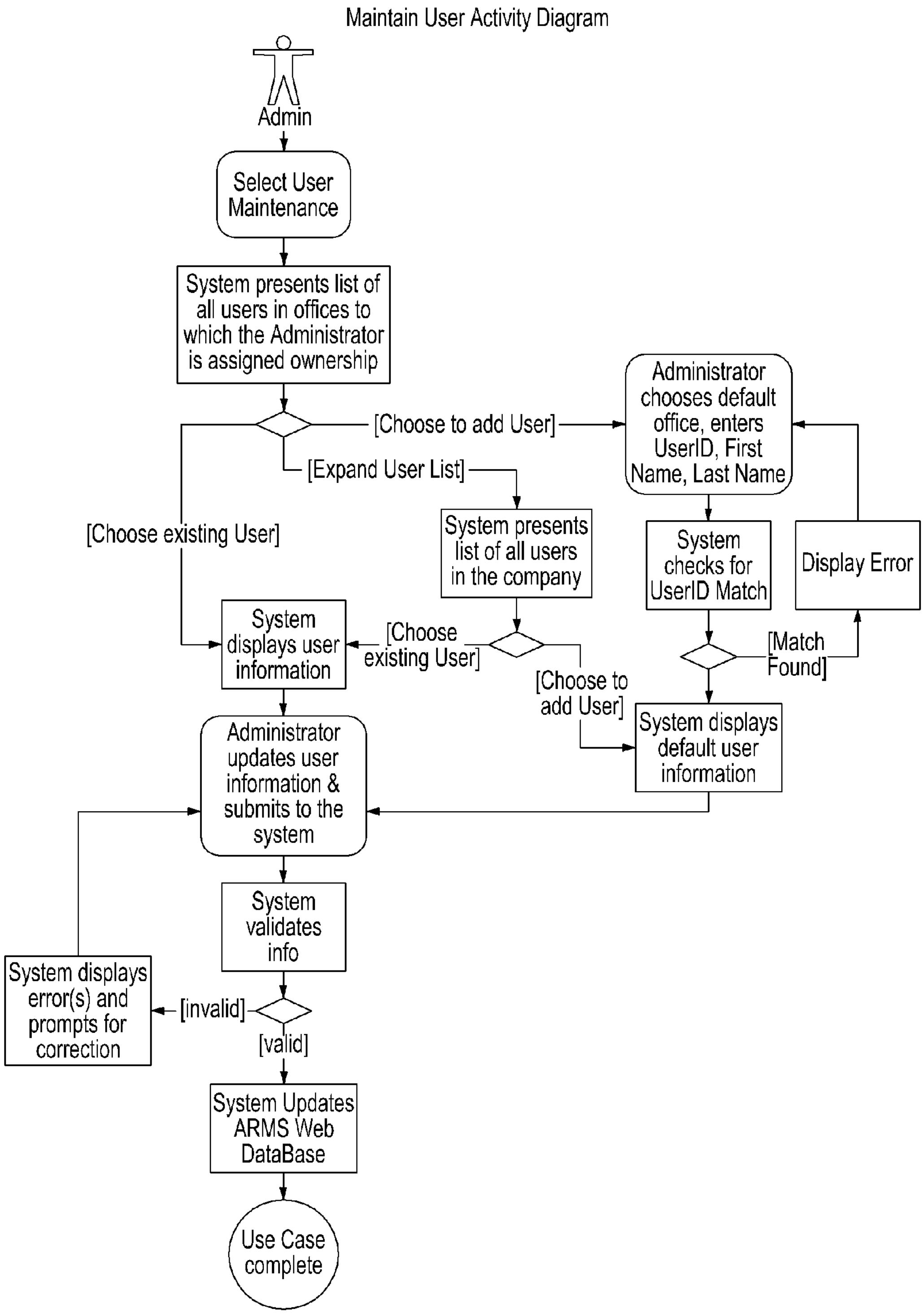

1.4.1 Activity Diagram—see FIG. 153

1.4.2 Basic Flow

The Basic Flow will describe how a USER will maintain a user in the ARMS Web system.

1. The USER will choose to maintain user(s).
2. The system will present a list of all users that are in all the offices the USER has access to maintain.
3. The USER will choose a user to maintain.
4. The system will display the user's information for the USER to edit.
5. The USER will update the user's information and submit the information to the system.
6. The system will validate the information entered.
7. The system will update the ARMS Web database.
8. This ends the use case.

1.4.3 Alternative Flows 1.4.3.1 Add User

At step three in the Basic Flow, the USER may choose to add a user, if they have the authority level to do so. The USER will enter a primary office, UserID, First Name and Last Name for the new user. The system will then validate that the office was entered and the UserID does not exist. If a UserID match is found, or the office was not entered, the system will display an error and request the USER enter a new UserID. Otherwise, the system will display the default settings for a new user; the USER will update the default settings and submit the information to the system. The system will validate the information entered, and update the ARMS Web database. The use case is then complete.

1.4.3.2 Show all Users for the Company

At step three in the Basic Flow, the USER may choose to display all users within the company. This would allow for adding users to offices the USER controls. The USER will choose the user they wish to work with and the system will then display the user's information; the USER will add the user to any offices the USER controls and submit the information to the system. The system will validate the information entered, and update the ARMS Web database. The use case is then complete.

1.4.3.2.1 If a user's primary office is not an office controlled by the USER, the USER may only add the user to offices the USER controls. The USER should not be able to change any of the user's settings. A USER that has control of a user's primary office can only change user settings.

1.4.3.3 User Information Validation Fails

In step six of the Basic Flow, the system may find that user information entered by the USER does not meet the validation criteria. The system should return the USER to step four of the Basic Flow, show the USER the invalid data, and prompt the USER to reenter the data.

This rule also applies for new user creation. Whenever a new user is submitted to the system for creation, the system must validate that the criteria entered is valid. If any information is invalid, the system should present the invalid date to the USER, and prompt the user to correct it.

1.4.3.3.1 The following fields must be populated to complete a user update or new user creation.

Last Name

First Name

UserID (Must be validated to ensure it is not a duplicate ID)

Home Office (Must be a valid office and not null)

1.4.3.4 Cancel Add/Maintain User

Until step five in the Basic Flow, the USER may choose to cancel the use case. The system should not store any changes made by the USER within the use case.

1.5 Post-Conditions

If the use case was successful and the USER was maintaining a user, the user criteria being changed will have been changed and updated in the ARMS Web system.

If the use case was successful and the USER was adding a user, the user will have been added in the ARMS Web system.

If the use case was unsuccessful, the system state will be unchanged.

1.6 Special Requirements 1.6.1 User Inactivation

In order to inactivate a user, the following set of criteria must be validated. If any of the criteria are found to be true, then the system will not allow the USER to inactivate the user.

If A4XREFL1/X4STCD is equal to 'C' (closed rental) and any tickets were closed in the past seven days If A4XREFL1/X4STCD is equal to 'A' (audited invoice)

If A4XREFL1/X4STCD is equal to 'R' (reservation)

If A4XREFL1/X4STCD is equal to 'O' (open contract)

If A4XREFL1/X4STCD is equal to 'U' (unconfirmed) and A4XREFL1/X4RSFG is equal to 'D' (Direct Bill request)

If A4XREFL1/X4STCD is equal to 'Z' (sent) and A4XREFL1/X4RSFG is equal to 'C' (extension request & message sent)

If A4XREFL1/X4STCD is equal to 'Z' (sent) and A4XREFL1/X4RSFG is equal to 'M' (authorization message sent)

If A4XREFL1/X4STCD is equal to 'Z' (sent) and A4XREFL1/X4RSFG is equal to 'X' (extension request sent)

If A4XREFL1/X4STCD is equal to 'B' (authorized invoice) and A4XREFL1/X4RSFG is equal to 'B' (invoice sent from ARMS)

If A4XREFL1/X4STCD is equal to 'B' (authorized invoice) and A4XREFL1/X4RSFG is equal to 'R' (invoice returned to adjuster)

If A4XREFL1/X4STCD is equal to 'B' (authorized invoice) and A4XREFL1/X4RSFG is equal to 'E' (rejected system error)

If A4XREFL1/X4STCD is equal to 'B' (authorized invoice) and A4XREFL1/X4RSFG is equal to 'Q' (rejected invoice ARMS researching)

1.6.2 User Default Settings

Whenever a new user is created, the settings for that user should be defaulted based on the user's primary office profile settings. For example, if the office is a reservation only office, the user should default to reservation only. This does not imply that the administrator cannot change the settings. This should also apply to whether can receive work setting should be on or off for the user/team. If all other users/teams in the office have the setting either on or off, then the new user should mimic this setting. Once again, this does not imply that the administrator cannot change this setting.

1.7 Extension Points

None.

2. Screen Design

A definition of the screen layout(s), screen data fields, and screen functions that are used to implement the flows identified above. More than one screen may be used to implement support for the use case flow.

2.1 Create or Modify User

This screen will allow the USER to search for and select a user to modify or select to add a new user.

Figure 154:
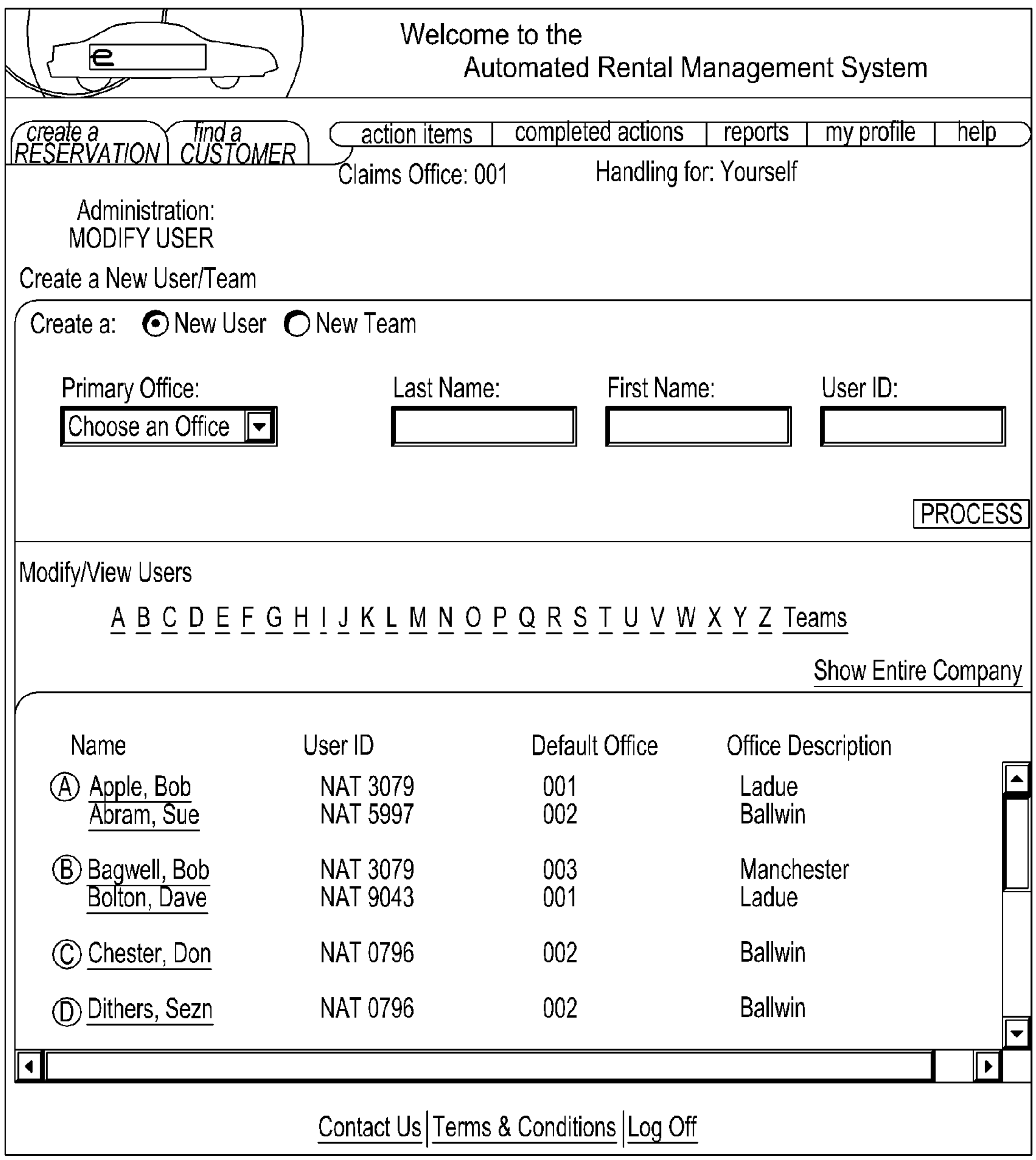

2.1.1 Screen Layout—see FIG. 154

2.1.2 Create or Modify User

| Screen Label | Type | Size | Screen Field Name | Data Field Name | Screen Specific Rule |
|---|---|---|---|---|---|
| New Team | Radio Button | 1 | Create a New Team | | |
| New User | Radio Button | 1 | Create a New User Indicator | | |
| User ID: | Input | 10 | User Id | ARMS Profile ID | |
| First Name: | Input | 15 | First Name of New User | First Name | |
| Handling For | Output | 30 | Handling For | First Name + Last Name | |
| Last Name: | Text Box | 20 | Last Name of New User | Last Name | |
| User ID | Output | 10 | List of User Ids within the company | Adjustor Code | |
| Name | Output | 30 | List of Users within a Company | First Name + Last Name | |
| User ID: | Input | 10 | User Id | Adjustor Code | |
| Primary office | List Box | 25 | Primary office | external organization name | |
| Primary office | Output | 10 | List of Primary offices | external organization abbreviated name | |
| Office Description | Output | 20 | List of Office Descriptions within Company | external organization name | |
| Office: | Output | 4 | Office Id | external organization abbreviated name | |

2.1.3 Screen Function Definition

This section includes the definitions for all functions that can be performed within the screen. This includes operations invoked by button clicks, specific shortcut keystrokes, or other actor activity.

2.1.3.1 A-Z Anchor Links

When any of the letters are clicked, the list of users should position itself with that letter presented at the top of the user view area on the page.

2.3.3.2 Teams Link

When the team link is clicked, the list of teams should position itself at the top of the view area on the page. The list of teams should be placed last in the list of all users/teams.

2.1.3.3 Process

When the Process button is clicked, the system should check to see that the appropriate information was entered in order to create a new user (Office, Last Name, First Name UserID). If the information is entered, the system will create a new user with those attributes and the other user attributes defaulted. The system should then display the new user's profile.

2.2 Create or Modify Team

This screen will allow the USER to input and change information about a user (i.e. name, E-mail address, etc.)

Figure 155:
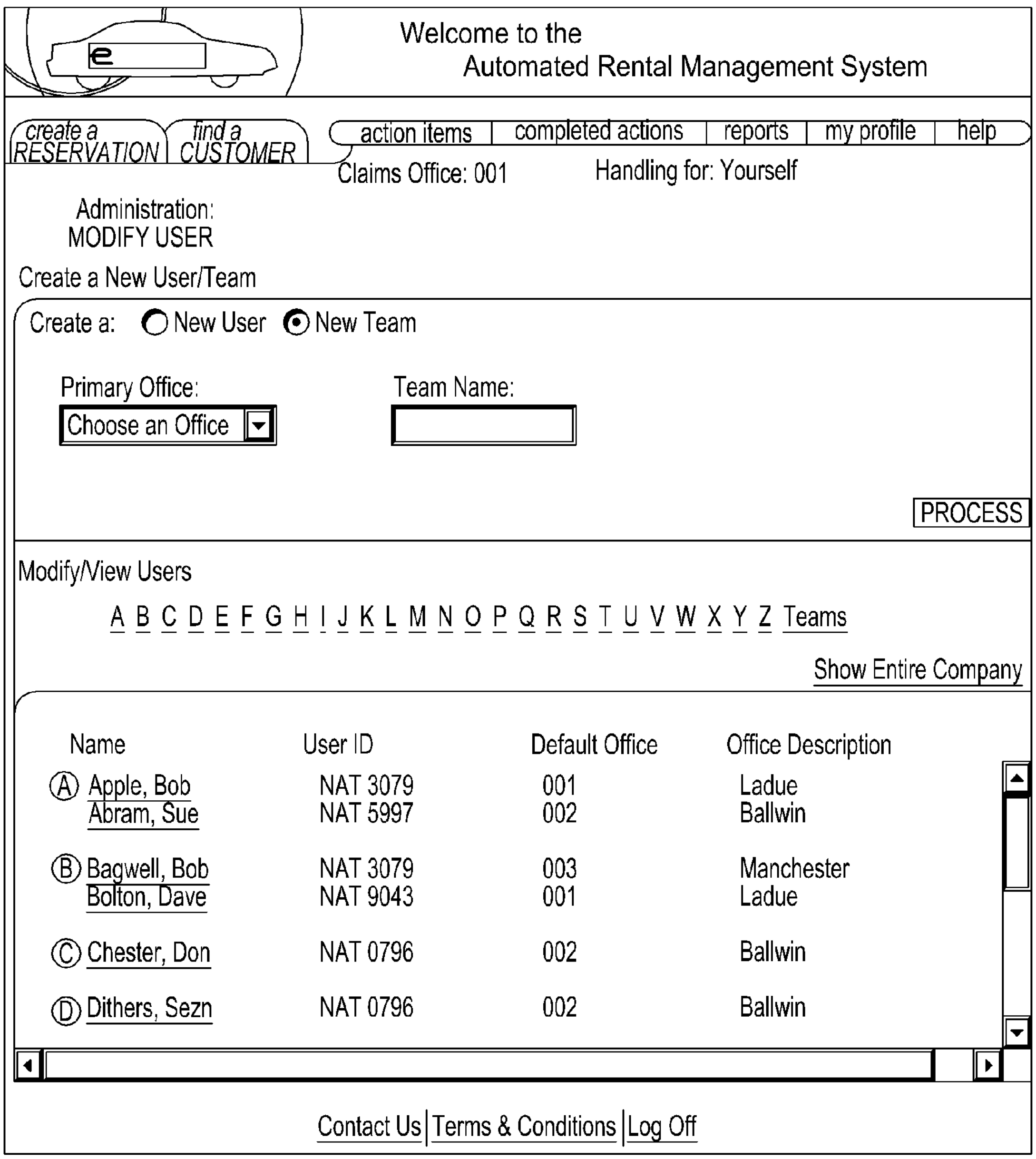

2.2.1 Screen Layout—see FIG. 155

2.2.2 Create or Modify Team

| Screen Label | Type | Size | Screen Field Name | Data Field Name | Screen Specific Rule |
|---|---|---|---|---|---|
| New Team | Radio Button | 1 | Create a New Team | | |
| New User | Radio Button | 1 | Create a New User Indicator | | |
| Name | Output | 20 | Adjusters Associated with the Company | First Name + Last Name | |
| Handling For | Output | 20 | Handling For | First Name + Last Name | |
| User ID | Output | 7 | List of User Ids Associated with a Company | Adjustor Code | |
| Primary office | List Box | 20 | Primary office associated with Team | external organization abbreviated name | |
| Primary office | Output | 10 | List of Primary offices Associated with a Company | external organization abbreviated name | |
| Office Description | Output | 20 | List of Office Descriptions associated with a comp | external organization name | |

-continued

| Screen Label | Type | Size | Screen Field Name | Data Field Name | Screen Specific Rule |
|---|---|---|---|---|---|
| Office: | Output | 10 | Office | external organization abbreviated name | |
| Team Name | Input | 15 | Team Name | external organization name | |

2.2.3 Screen Function Definition

This section includes the definitions for all functions that can be performed within the screen. This includes operations invoked by button clicks, specific shortcut keystrokes, or other actor activity.

2.2.3.1 A-Z Anchor Links

When any of the letters are clicked, the list of users should position itself with that letter presented at the top of the user view area on the page.

2.2.3.2 Teams Link

When the team link is clicked, the list of teams should position itself at the top of the view area on the page. The list of teams should be placed last in the list of all users/teams.

2.2.3.3 Process

When the Process button is clicked, the system should check to see that the appropriate information was entered in order to create a new team (Office, Team Name). If the information is entered, the system will create a new team with those attributes and the other user attributes defaulted. The system should then display the new team's profile.

2.3 User Profile

This screen will allow the USER to input and change information about a user (i.e. name, E-mail address, etc.)

Figure 156:
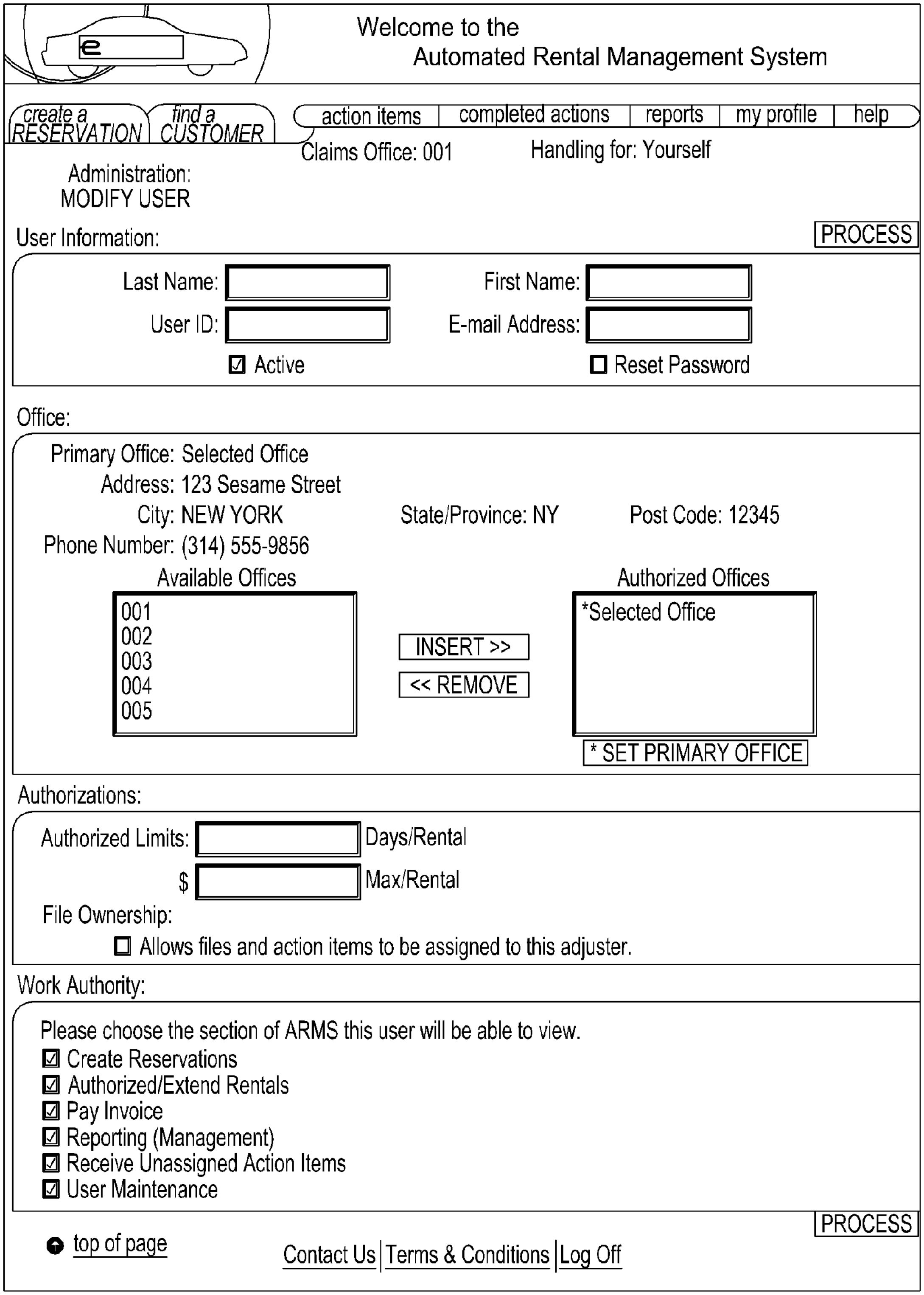

2.3.1 Screen Layout—see FIG. 156

2.3.2 User Profile

| Screen Label | Type | Size | Screen Field Name | Data Field Name | Screen Specific Rule |
|---|---|---|---|---|---|
| Reset Password | Check Box | 1 | Reset Password Indicator | | |
| Email Address: | Text Box | 15 | Adjuster's Email Address | e-Mail address | |
| First Name | Text Box | 15 | First Name | First Name | |
| Handling For | Output | 10 | Handling For | First Name + Last Name | |
| Last Name | Text Box | 10 | Last Name | Last Name | |
| User ID: | Output | 0 | User Id | Adjustor Code | |
| Active | Check Box | 1 | User is Active | Status: Active/Inactive | |
| Address | Output | 25 | Home Office Address | Customer Address Line 1 + Customer Address Line 2 | |
| Phone: | Output | 10 | Home Office Phone Number | Customer Phone Number + Customer Phone Extension | |
| Postal | Output | 10 | Home Office Postal Code | Zip Code | |
| City | Output | 15 | Home Office City | customer city text | |
| ST/PROV | Output | 5 | Home Office State | customer state code | |
| Office | Output | 10 | Office | external organization abbreviated name | |
| Home Office | List Box | 20 | Office Name | external organization name | |
| Other authorized Offices | List Box | 20 | Other authorized Offices for The User | external organization name | |
| Allow files and action items to be assigned to this user | Check Box | 1 | Allow files & action items to be assigned to user | profile type value code | If Allow Files and Action Items have been selected, this user or team will appear in the Handle For list. |
| Authorize/ Extend Rental | Check Box | 1 | Allow user to Authorize/Extend Rental | profile type value code | |
| User Maintenance | Check Box | 1 | Allow user to conduct user maintenance | profile type value code | |
| Create Reservation | Check Box | 1 | Allow user to create reservation | profile type value code | |
| Reporting (Management) | Check Box | 1 | Allow user to do reporting | profile type value code | |
| Pay Invoice | Check Box | 1 | Allow user to Pay Invoices | profile type value code | |

-continued

| Screen Label | Type | Size | Screen Field Name | Data Field Name | Screen Specific Rule |
|---|---|---|---|---|---|
| Days/Rental | Text Box | 10 | Authorization Limit on Days per Rental | profile type value quantity | |
| $__max/ rental | Text Box | 10 | Authorization Limit on Maximum Dollars per Rental | profile type value amount | |

2.3.3 Screen Function Definition

This section includes the definitions for all functions that can be performed within the screen. This includes operations invoked by button clicks, specific shortcut keystrokes, or other actor activity.

2.3.3.1 Process

When clicked, the system will ensure that all rules on the page are enforced. Upon completion, the system will return the USER to the Create a New User/Team page.

2.3.3.1.1 The user must have a First Name, Last Name and Home Office entered. The Home Office must be a valid office for that company.

2.3.3.1.5 If the File Ownership flag is turned off, the system will check to see if the user owns any open work. If the user owns work, the system will not allow the file ownership flag to be turned off. The system will notify the USER that the user has open work assigned to them and request that they transfer the work before attempting to turn off file ownership.

2.4 Team Profile

This screen will allow the USER to input and change information about a user (i.e. name, E-mail address, etc.)

Figure 157:
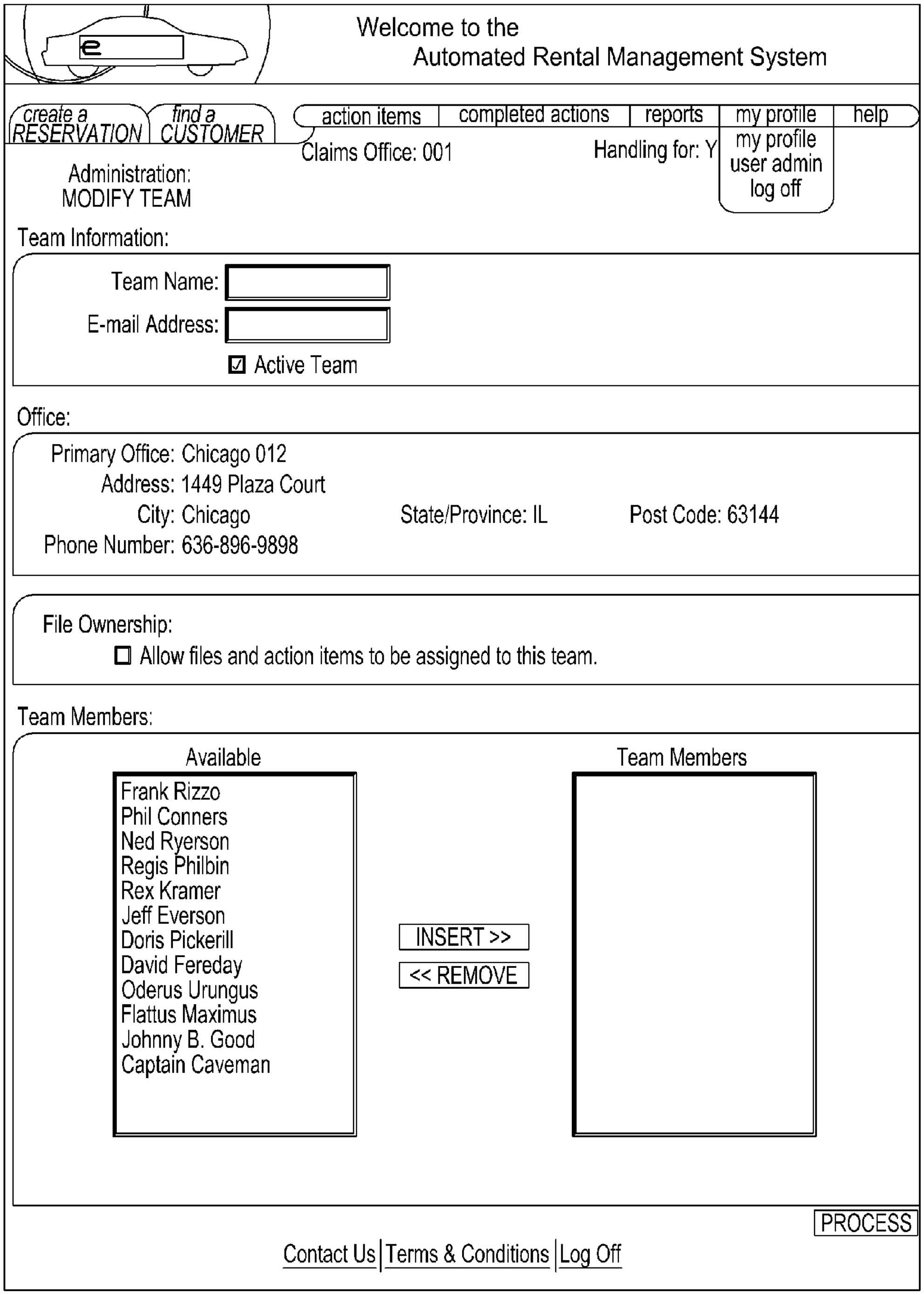

2.4.1 Screen Layout—see FIG. 157

2.4.2 Create or Modify Team

| Screen Label | Type | Size | Screen Field Name | Data Field Name | Screen Specific Rule |
|---|---|---|---|---|---|
| Allow files and action items to be assigned to this team | Check Box | 1 | Allow action items to be assigned to team | | |
| Available | List Box | 30 | Available Members for Team | First Name + Last Name | |
| E-mail Address | Text Box | 20 | Email Address | e-Mail address | |
| Handling For: | Output | 20 | Handling For: | First Name + Last Name | |
| Active | Check Box | 1 | Team Active Indicator | Status: Active/Inactive | |
| Team Members | List Box | 30 | Team Members | First Name + Last Name | |
| Phone Number | Output | 10 | Branch Office Phone Number | Customer Phone Number + Customer Phone Extension | |
| Postal | Output | 10 | Branch Office Postal Code | Zip Code | |
| Address | Output | 25 | Home Office Address | Customer Address Line 1 + Customer Address Line 2 | |
| ST/PROV | Output | 3 | Branch Office State or Province | customer state code | |
| City | Output | 15 | Home Office City | customer city text | |
| Home Office | Output | 20 | Home Office Name | external organization name | |
| Office | Output | 5 | Office | external organization abbreviated name | |
| Team Name | Text Box | 20 | Team Name | external organization name | |

2.3.3.1.2 Work Authority for each user will default to all enabled.

2.3.3.1.3 If the Active switch has been set to inactive, the system will check to see if the user owns any open work. If the user owns work, the system will not allow the user to be set to inactive. The system will notify the USER that the user has open work assigned to them and request that they transfer the work before attempting to inactivate the user.

2.3.3.1.4 If the reset password option is set, the system will reset the user's password. This will reset the user's password to the password used for new users. Need to verify what that password is.

2.4.3 Screen Function Definition

This section includes the definitions for all functions that can be performed within the screen. This includes operations invoked by button clicks, specific shortcut keystrokes, or other actor activity.

2.4.3.1 Process

When clicked, the system will ensure that all rules on the page are enforced. Upon completion, the system will return the USER to the Create a New User/Team page.

2.4.3.1.1 The team must have a Team Name and Home Office entered. The Home Office must be a valid office for that company.

2.4.3.1.2 If the Active switch has been set to inactive, the system will check to see if the team owns any open work. If the team owns work, the system will not allow the team to be set to inactive. The system will notify the USER that the team has open work assigned to them and request that they transfer the work before attempting to inactivate the team.

2.4.3.1.3 If the File Ownership flag is turned off, the system will check to see if the team owns any open work. If the team owns work, the system will not allow the file ownership flag to be turned off. The system will notify the USER that the team has open work assigned to them and request that they transfer the work before attempting to turn off file ownership. If the user or team does not receive File Ownership, that user or team will not display in the Handle For list.

3. Application Operations

This section will detail all the application operations that are part of this Functional Specification Document.

3.1 Build List of Users (Office Id, First Name, Last Name, User Id)

Build a list of User first and last names NOT limited to a given office in order to search for a user. Limited by the first or last name passed.

3.2 Find User Information (User Id)

Retrieve the current values for a user's profile.

3.3 Update User Information (User Id, Name, e-mail Address, Out of Office, Handler for out of office user, Initial Page, Is user Multi-company, Is User Active, Current Password, New Password, Receive Authorization Assignment)

Update the given data values for the user profile.

3.4 Build List of User offices (User Id)

Build a list of office names for the offices the user is assigned to.

3.5 Find User Office Information (User Id, Office Id)

Retrieve the current values assigned for the user at a given office.

3.6 Update User Office Information (User Id, Office Id, and Data Values)

Update the given data values for the user profile.

3.7 Add User Office Information (User Id, Office Id)

Assign user access to another office. Default values are set for the users access.

3.8 Remove User Office Information (User Id, Office Id)

Revoke assignment of the user to an office. The user cannot be revoked from their primary office.

3.9 Build a List of Users to which the Administrator has Access (Company Id, Administrator Id, User Id)

Build a list of User first and last names limited to a given office in order to maintain a user. Limited by the first or last name passed.

3.10 Validate that User ID does not Exist (User ID)

Verify that the administrator must add a new user.

4. Data Fields 4.1 Data Field Definition

This section includes a definition of all data fields included in the functional specification.

4.1.1 User Language Preference

This is the user's language preference while working with the ARMS Web System.

Data Field Type: Alpha-Numeric

Data Field Length: 10

Data Source: <Data Source>

4.1.2 Phone Number

This is the user's phone number.

Data Field Type: Alpha-Numeric

Data Field Length: 10

Data Source: <Data Source>

4.1.3 Profile Attribute Id

I.S. assigned identifier for a profile attribute. Must be unique and non-blank. Each profilable item will have a profile attribute.

Data Field Type: Alpha-Numeric

Data Field Length: 20

Data Source: <Data Source>

4.1.4 Last Name

This is the last name of the user.

Data Field Type: Alpha-Numeric

Data Field Length: 20

Data Source: <Data Source>

4.1.5 Handler for Out of Office User

This is the user who will handle work for the user who is out of office.

Data Field Type: Alpha-Numeric

Data Field Length: 0

Data Source: <Data Source>

4.1.6 Start Page

This is the initial page that the user will see when he logs on to the system.

Data Field Type: URL

Data Field Length: 256

Data Source: <Data Source>

4.1.7 Is User Out of Office?

This flag indicates that the user is out of office and no work should be assigned to them. Instead another user can be set up to handle for the user who is out of office.

Data Field Type: Boolean

Data Field Length: 1

Data Source: <Data Source>

4.1.8 Is the User Multicompany?

This flag indicates that this user can do work for multiple insurance companies. These are typically Enterprise Rent-A-Car employees working on site at an insurance company office or Rental Management Services employees who are also Enterprise employees who manage rentals for the insurance company but are not on site.

Data Field Type: Boolean

Data Field Length: 1

Data Source: <Data Source>

4.1.9 Can User Receive Work?

This flag indicates that user can receive work (e.g. requests for authorization, requests for extension etc.). Typically, a manager would set this flag to "No" so that work would not be assigned to him or her although he or she could be notified in certain situations like authority limit exceeded etc.

Data Field Type: Boolean

Data Field Length: 1

Data Source: <Data Source>

4.1.10 Is User Active?

This flag indicates the user is currently active and may log on to the system to do work.

Data Field Type: Boolean

Data Field Length: 1

Data Source: <Data Source>

4.1.11 Email Address

This is the email address of the user.

Data Field Type: Alpha-Numeric

Data Field Length: 30

Data Source: <Data Source>

4.1.12 First Name

This is the first name of the user.

Data Field Type: Alpha-Numeric

Data Field Length: 15

Data Source: <Data Source>

4.1.13 Password

This is the user specified password that the user will use along with the user id to log on to the ARMS Web System.

Data Field Type: Password

Data Field Length: 10

Data Source: <Data Source>

4.1.14 User Id

This is the user id that the user will use to sign on to the ARMS Web System. This id must be unique across the whole system.

Data Field Type: Alpha-Numeric

Data Field Length: 10

Data Source: <Data Source>

5. Questions and Answers

Issue Number: 321

Question: When do we "Kill" profiles that have been created but not used? Question 2—Do we allow for deleting users, and if so, who would handle this function? Question 3—Do we allow for deleting inactive user, and if so, who would handle this function?

Status: Closed—Resolved

Resolution: 3-21-00, Dave Smith—The other questions would seem to have procedures in place today. Unless there is a compelling reason, I don't think we should reinvent the wheel. Could you check with the ARMS team to find out?

8-07-00—Brad Reel: UserIDs that were created, but never accessed will be made inactive after six months. UserIDs that have not been accessed for two years will also be made inactive. After being made inactive, they will be purged after three additional months.

Issue Number: 322

Question: Do we allow for deleting users, and if so who would it be that does so?

Status: Closed—Merged

Resolution: 3-21-00, Dave Smith—The other questions would seem to have procedures in place today. Unless there is a compelling reason, I don't think we should reinvent the wheel. Could you check with the ARMS team to find out? 3-27-00, merged with Issue 321

Issue Number: 323

Question: When do we delete an inactive user? And who would handle?

Status: Closed—Merged

Resolution: 3-21-00, Dave Smith—The other questions would seem to have procedures in place today. Unless there is a compelling reason, I don't think we should reinvent the wheel. Could you check with the ARMS team to find out? 3-27-00, merged with issue 321

Issue Number: 324

Question: User ID: Do we have current Enterprise Business rules that we need to enforce, and if so, what are they? The assumption we made when discussing this was that the admin could give them whatever ID the user desired. If user wanted the ID Beavis, the admin could create it. The question is, are there some rules we want to enforce (i.e. User ID's start w/first three characters of insurance company's name, GEI for GEICO) and some defaults for both UserID & Password? Maybe for GEICO, the first user is GEI0001 and the default password is GEICO. Just something we need to address.

Status: Closed—Resolved

Resolution: 3-22-00, Dave Smith—I think we should give them whatever user ID they want.

3-30-00. Kim DeVallance—user ID is a company specific item. For example, GEICO's is their associate ID (similar to our employee number). Progressive uses their PACMAN ID, Nationwide uses their RACF ID . . . all a similar concept. It is an ID that the adjuster is familiar with and I think we should allow the customer to use an employee number already familiar to the adjuster.

4-7-00, Issue Mtg, the field is 10 characters, First three will be company driven, the next 7 can be alpha/num and the users choice.

4-11-00, Brad Reel—Current State, ID's are first three characters of the company's name, and up to seven numeric characters. Could possibly expand to seven alpha-numeric instead of just numeric. Barring any disagreement, we will suggest the following in the ARMS Web system: first three characters of the company's name are the first three characters of the ID. Then the ID must include at least 4 alphanumeric characters with at least one number in it. The minimum ID length would be 7 characters, the maximum 10. Suggest we try to force companies to use their employee IDs as the seven digits. ARMS Web system can generate a number if necessary.

Need to confirm with our security people that this is acceptable security on an Enterprise-owned application. Also, should consider whether or not we think first three characters of a company's name will allow us to always uniquely identify companies.

Issue Number: 325

Question: Current State we capture the primary address for the user, (the address the user (adjuster) is located at) do we want to do the same in future state? In the screen prototype should the primary user (adjuster) address be capture in the user profile screens, given that we currently have an office address in the office profile?

Status: Closed—Resolved

Resolution: 3-30-00, Kim DeVallance—Kim—I do not think it is necessary for the ARMS/Web application, but it may be a mandatory field for the ARMS system when it processes info. I would recommend checking with the analysts from ARMS. We pull the address from ECARS when we send a paper bill, and if the bill is electronic, the address does not matter.

4-7-00, Issue Mtg, Default to office address, allow at the user level to be changed, if it is changed it will only update the database not the 400.

4-11-00, Brad Reel—When creating a user, we need to capture a user-specific address. It should default to the primary office they are assigned to when they are first created, but be changeable. This means we have to change the process for adding a user so we identify their primary office before we enter address information.

Issue Number: 326

Question: Can a user be maintained at more than one office? Do we still have a default/primary office when the user is created?

Example: You have been created at the St. Louis Office and you need to travel to California to help with a disaster, does California have the rights to maintain you.

Status: Closed—Resolved

Resolution: 3-22-00, Dave Smith—For tracking purposes, I think we need to maintain one profile only. If someone moves to another location because of a disaster, we should move the profile to that office. Perhaps to make it easy on the transition, we could transfer their base profile and let the new office modify accordingly.

3-27-00, Ask Brad to follow-up with Dave Smith.

3-30-00, Kim DeVallance—Current state, yes a user can be maintained at more than one office, but a user should have a primary office.

Issue Number: 327

Question: Do we need a primary office at which you see all work below you? This would apply only to people who were in offices that were not claims offices. Example: I am a regional VP (wouldn't that be cool) and I want to use the system. I define "Default One" as my region, so when I look at stuff in the system an I see all the offices under my office as my default.

Status: Closed—Resolved

Resolution: 3-22-00, Dave Smith—Yes, I think this a good enhancement. 3-30-00, Kim DeVallance—This would be great!!!

Issue Number: 328

Question: Do we need a primary office that you can create work at? This would apply to everyone and defines the primary office I can create work in. For an Adjuster, this would be their primary office. For someone at a higher level, it would be the office they assign work to if they create it. Following the example above, if that VP creates a res (unlikely, but work with me), this default would be the claims office it would be sent to for completion.

Status: Closed—Resolved

Resolution: 3-22-00, Dave Smith—Yes, I think this a good enhancement as well. 3-30-00, Kim DeVallance—Yes, but keep in mind during the life of a rental we can transfer the rental to different offices within the same company profile.

Issue Number: 329

Question: Where does the manager get assigned to a user? At the Office Level, the User Level or the Team level? Can a user have more than one manager?

Status: Closed—Resolved

Resolution: 08-08-00—Brad Reel: Upon further discussion with the business, the process for selecting a person to handle an authorization limit is as follows: When a user hits an authorization limit, the system will request that the user select another user to approve the request and handle the rental. The system will only present users that have limits higher than the requested amount/number of days. Once the user has been selected, the rental will then be permanently transferred to the chosen user.

Issue Number: 331

Question: Under Report Layout section, is this for the office to give the user what fields that they want them to see? Then the user can set how he views these fields in MY PROFILE?

Status: Closed—Resolved

Resolution: 3-21-00, Anita Klopfenstein—It allows the user to create a default report layout as well as establish groupings. For example: I may want a team group which allows me to select adjusters to view. However, this would be a function which had to be approved in the profile of the user. Otherwise they can only see their work.

Issue Number: 332

Question: Are the authorization limits for the life of the rental or the transaction, (as applied to use by an adjuster)

Status: Closed—Resolved

Resolution: 3-21-00, Anita Klopfenstein—Both—There is a daily limit and a rental max. For the life of the rental.

Issue Number: 350

Question: Do we want to force a search before and admin can add a user?

Status: Closed—Resolved

Resolution: 08-07-00—Brad Reel: When adding a user, the system will search for the UserID and ensure it does not exist. No other searches will be performed.

Issue Number: 352

Question: Where does the ability to change the language the user can view the screens in reside? With the Admin or the user?

Status: Deferred

Resolution:

Issue Number: 356

Question: When setting up a user, should the office profile restrict the user's profile? Or are the office and user profiles independent of each other?

Status: Closed—Resolved

Resolution: 08-07-00—Brad Reel: Office profile overrides user profile. A user can have more rights than the office, but will still be restricted to only activities that can be performed in that office based on the office profile while they are working in that office.

Issue Number: 360

Question: Brad Decoder, Password/do we send e-mail to the admin to let them know how many times login failed?

Status: I2 User Review

Resolution:

Issue Number: 365

Question: Do we need a batch process for adding users?

Status: Closed—Resolved

Resolution: 07-03-00—Brad Reel: This question has also been asked in the more general setting of "Should a process exist for walking a user through setting up an entire company (much like a wizard tool)." For this release of ARMS Web (V2.0) a batch process for creating users will not be created. There will also not be a wizard for creating a company. However, for future releases, this wizard will be a very worthwhile tool to create and should be incorporated into future releases.

Functional Design Specification

User Profile

Version 1.0

1. User Profile Use Case 1.1 Brief Description

The User Profile use case describes how the USER would customize their working environment. User Profile will allow the USER to change their password, set his or her out of office, and modify their Favorite Locations list.

1.2 Use Case Actors

Actors will use this use case to update their user profile. The following actors will interact with this use case:

ENTERPRISE ADMINISTRATOR

COMPANY ADMINISTRATOR

OFFICE ADMINISTRATOR

CLAIMS MANAGER

ADJUSTER

FIRST NOTICE OF LOSS ADJUSTER

PROCESSOR 1.3 Pre-Conditions

The company must be enrolled in ARMS Web.

The USER must be enrolled and have an active User ID and password.

The USER must be logged into the ARMS Web system.

1.4 Flow of Events

The Flow of Events will include the necessary steps to make changes and updates to "My Profile".

Figure 158:
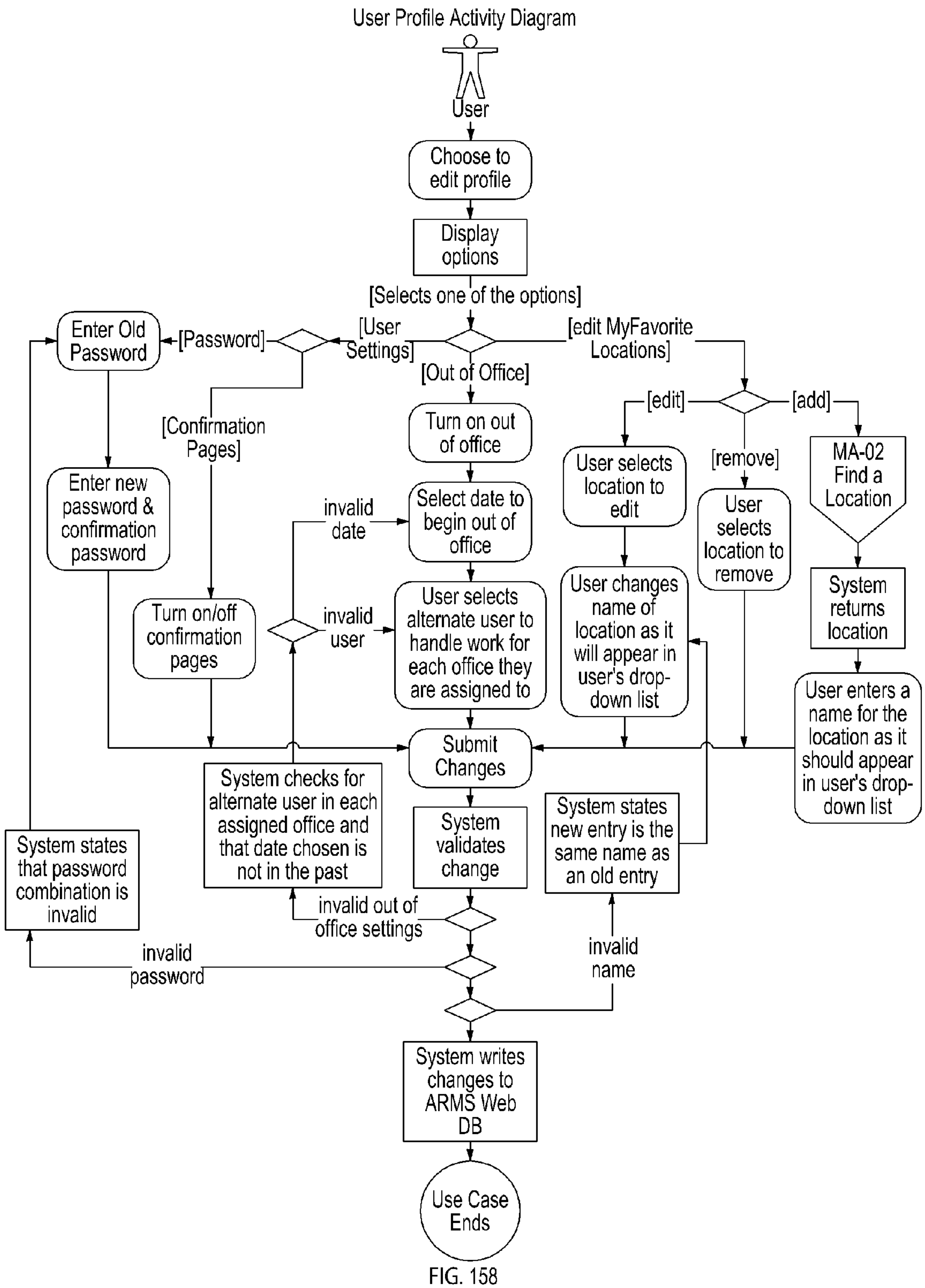

1.4.1 Activity Diagram—see FIG. 158

1.4.2 Basic Flow

1. The USER will choose to edit their User Profile

2. The system will display the USER'S User Profile.

3. The USER will specify the action they would like to perform (user settings, set out of office, add a Favorite Location, remove a Favorite Location, edit a Favorite Location).
4. The USER will select one of the options.
5. Based on the USER'S response, one or more of the following subflows is executed:
If the USER chooses to edit a Favorite Location, the Edit Favorite Location Subflow is executed.
If the USER chooses to add a Favorite Location, the Add Favorite Location Subflow is executed.
If the USER chooses to remove a Favorite Location, the Remove Favorite Location Subflow is executed.
If the USER chooses to set the Out of Office Function, the Out of Office Subflow is executed.
If the USER chooses to Change Password, the Change Password Subflow is executed.
If the USER chooses Confirmation Page, the Confirmation Page Subflow is executed.

1.4.2.1 Edit Favorite Location Subflow

This subflow allows the USER to edit a location on their Favorite Locations List.

1. The USER selects the location they wish to edit from their Favorite Locations List.
2. The USER changes the name they wish to use to identify the location. This is the name that will be displayed to them in their Favorite Locations List.
3. The USER submits the information to the system.
4. The system updates ARMSWeb to reflect the new Favorite Location.
5. The use case ends.

1.4.2.2 Add Favorite Location Subflow

This subflow allows the USER to add a location to the Favorite Locations List.

1. The USER will execute Functional Specification MA-02: Find a Rental Location to search for the location they would like to add to their Favorite Locations List.
2. The USER selects the location they wish to add to their Favorite Locations List.
3. The USER enters the name they wish to use to identify the location. This is the name that will be displayed to them in their Favorite Locations List.
4. The USER submits the information to the system.
5. The system updates ARMSWeb to reflect the new Favorite Location.
6. The use case ends.

1.4.2.3 Remove Favorite Location Subflow

This subflow allows the USER to remove a location to the Favorite Locations List.

1. The USER selects the location they wish to remove from their Favorite Locations List.
2. The USER submits the information to the system.
3. The system updates ARMSWeb to reflect the removal of the Favorite Location.
4. The use case ends.

1.4.2.4 Out of Office Subflow

This subflow allows the USER to select when they are out of office and assigns their workload to another USER.

1. The USER will set choose to be Out of Office.
2. The USER will enter the beginning date of when they will be Out of Office.
3. The USER will choose an alternate USER to handle their work for each office the USER is assigned to.
4. The USER submits the information to the system.
5. The system validates the changes.
6. The system updates ARMSWeb database to reflect the out of office status. At this time, the system will assign any work that exists for the USER to the chosen user(s). Any new work that is assigned to the USER will automatically be reassigned by the system to the chosen user(s).
7. The use case ends.

1.4.2.5 Change Password Subflow

This subflow allows the USER to change their current password.

1. The USER enters the old password.
2. The USER enters the new password of their choice.
3. The USER re-enters new password for verification
4. The USER submits the passwords to the system.
5. The system validates the password changes.
6. The system updates ARMSWeb to reflect the new password changes.
7. The use case ends.

1.4.2.6 Confirmation Page

This subflow allows the USER to turn on or off confirmation pages in the ARMS Web system.

1. If Confirmation pages have been turned off, the user will turn them on.
2. If Confirmation pages have been turned on, the user will turn them off.
3. The USER submits the change to the system.
4. The system updates ARMSWeb to reflect the change.
5. The use case ends.

1.4.3 Alternative Flows 1.4.3.1 Invalid Password

At step five in the Change Password Subflow, if the current password is incorrect or if the confirmed password does not match the new password, the system will prompt the USER to re-enter the old, the new and the confirmation password.

1.4.3.1.1 It will be considered invalid if the new password entered was one of the USER'S last five ARMS Web passwords.

1.4.3.1.2 It will be considered invalid if the new password is not at between six and 10 characters and alphanumeric in type. —Validate 1.4.3.1.1 & 1.4.3.1.2 in Sign-on.

1.4.3.2 Alternate Users not Chosen in Each Office User is Assigned

At step five in the Out of Office Subflow, the system will validate that a user was selected to handle the USER'S work in each office the USER is assigned to. If a user was not chosen for each office, the system will notify the USER that they must select a user to handle their work in each office they are assigned to. The system will then return the USER to step two of the Out of Office Subflow.

1.4.3.3 Out of Office Start Date is in the Past

At step five in the Out of Office Subflow, the system will validate that a user selected an out of office date that is present (today) or in the future. If the date is in the past, the system will generate an error and ask the USER to enter a date that is either today or in the future. The system will then return the USER to step two of the Out of Office Subflow.

1.4.3.4 Favorite Location Name Entered is the Same as an Existing Location

When the USER submits the name for a new location, or changes the name of an existing location, the system will validate that the name entered is not an exact duplicate of any other name in the USER'S list of Favorite Locations. If the name is a duplicate, the system will prompt the USER to enter a different name for the location in question. The system will then return the USER to step one of the Edit Favorite Location Subflow.

1.4.3.5 Cancel User Profile

At any point during the use case up until a change has been submitted to the system, the USER may decide to not update their profile.

1.5 Post-Conditions

If the use case was successful then either a new password has been assigned, the out of office function will be turned on, or the USER'S Favorite Locations will be edited.

If the use case was unsuccessful then the system will remain unchanged.

1.6 Special Requirements

None.

1.7 Extension Points

None.

2. Screen Design

A definition of the screen layout(s), screen data fields, and screen functions that are used to implement the flows identified above. More than one screen may be used to implement support for the use case flow.

2.1 My Profile

This screen will allow the USER to pick which functions that they wish to change.

Figure 159:
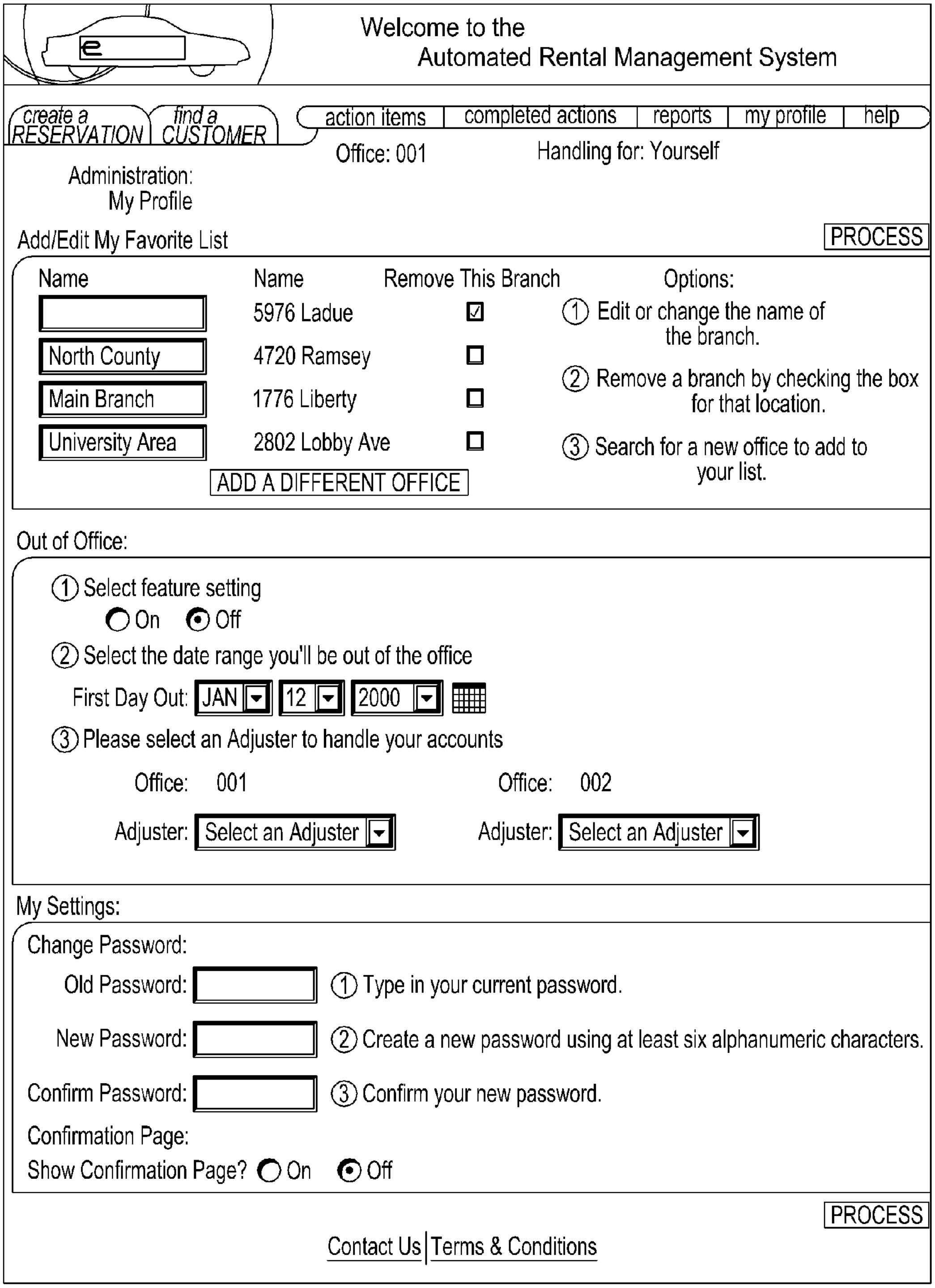

2.1.1 Screen Layout—My Profile—see FIG. 159

2.1.2 My Profile 2.1.3.2 Add a Different Office

When clicked, the system will take the USER to MA-02-Find Rental Location Use Case. Here, the USER will select a new location to add to the preferred location list, and then return to the PR-07-User Profile Use Case. The new information will be validated and the database will be updated.

3. Application Operations

This section will detail all the application operations that are part of this Functional Specification Document.

3.1 Retrieve User Profile (User Id)

Retrieve user's current profile settings.

3.2 Update User Profile (User Id, Out of Office, Assigned Adjuster, Start Page)

Update user's Out of Office status, Adjuster to handle work during out of office period, and the user's initial page.

3.3 Change Password (Current Password, New Password, New Password Confirmation)

Change the user's password from the current password to the new password. Validate that the current password is correct.

| Screen Label | Type | Size | Screen Field Name | Data Field | Screen Specific Rule |
|---|---|---|---|---|---|
| Remove This Branch | Check Box | 1 | Delete branch from preferred locations indicator | | |
| First Day Out: | List Box | 10 | Out of office start date | | Three drop downs: month, day, year |
| Off | Radio Button | 1 | Select feature setting | | |
| On | Radio Button | 1 | Select feature setting | | |
| Off | Radio Button | 1 | Show confirmation page | | |
| On | Radio Button | 1 | Show confirmation page? | | |
| Confirm Password: | Text Box | 0 | Password | change password | N/A. |
| New Password: | Text Box | 0 | Password | change password | N/A. |
| Adjuster: | List Box | 30 | Handler for out of office user | First Name + Last Name | |
| Handling For | Output | 15 | Handling For Adjuster | First Name + Last Name | |
| Old Password: | Text Box | 0 | Password | User Paswd | N/A. |
| Address | Output | 30 | Preferred Location Address | Address Line + Address Line2 | |
| Office | Output | 10 | Claims Office | external organization abbreviated name | |
| Office: | Output | 10 | Handler for out of office adjuster's office | external organization abbreviated name | |
| Name | Input | 30 | Preferred Location Name | location name | Defaults to address name |

2.1.3 Screen Function Definition

This section includes the definitions for all functions that can be performed within the screen. This includes operations invoked by button clicks, specific shortcut keystrokes, or other actor activity.

2.1.3.1 Process

When clicked, the system will validate the information on the screen is correct and complete. If an error is found the screen will be redisplayed with a message indicating the error condition and highlighting the field in error. If no errors are found, the database will be updated with the new information.

4. Data Fields 4.1 Data Field Definition

This section includes a definition of all data fields included in the functional specification.

4.1.1 Handler for Out of Office User

This is the user who will handle work for the user who is out of office.

Data Field Type: Alpha-Numeric

Data Field Length: 0

Data Source: <Data Source>

4.1.2 Start Page

This is the initial page that the user will see when he logs on to the system.

Data Field Type: URL

Data Field Length: 256

Data Source: <Data Source>

4.1.3 Is User Out of Office?

This flag indicates that the user is out of office and no work should be assigned to them. Instead another user can be set up to handle for the user who is out of office.

Data Field Type: Boolean

Data Field Length: 1

Data Source: <Data Source>

4.1.4 Password

This is the user specified password that the user will use along with the user id to log on to the ARMS Web System.

Data Field Type: Password

Data Field Length: 10

Data Source: <Data Source>

5. Questions and Answers

Issue Number: 334

Question: Is out of office assigned at the user level or at the office level? (Could you set this for each office you work out of?) Example: You have been created at the St. Louis Office and you need to travel to California to help with a disaster, does California have the rights to maintain you.

Status: Closed—Resolved

Resolution: 4-7-00, Issue Mtd., Defer to user review I2

08-07-00—Brad Reel: A user will be required to set their out of office function for all offices they are assigned to in order to activate the function. The function is set up using the assumption that a user would only be out of office if they were unreachable at all offices (vacation, training, etc.). Since the system can be accessed from any web connection, it is possible for a user to do work for any and all offices they are assigned to from anywhere. Therefore, it seems logical that a user would only set their out of office function if they were not available in any capacity.

Issue Number: 335

Question: Does a user have the field level control of the fields he can see?

Status: Closed—Resolved

Resolution: 04-7-00, Issue Mtg., Should be set at the Office level, the user should not be able to set the field that they want to see.

4-11-00, Brad Reel—User does not need to have control over the fields they see. Control at the office (or team level, where applicable) is sufficient.

Issue Number: 336

Question: Are we still using the "Requests to be Processed" page (the Command Center) as an option for a start up page?

Status: Future

Resolution: 04-7-00, Issue Mtg., Defer to future release, We are not sure that it will not be an option, right now it is not.

4-11-00, Brad Reel—As of right now, the "Command Center" page (Requests to be Processed) should not be an option for the start page, and is not even planned for the ARMS Web system.

Issue Number: 434

Question: 07-06-00—Brad Reel: The ARMS Web redesign has a requirement that the system would allow the user to choose the page in the system they could use as their start-up page. Their options were: the Command Center Page, the Action Items Page, or the Create Reservation Page. Based on the way the system has been designed to process since that time, it does not seem to make sense to be able to choose anything other than the Action Items page as a user's start page. The profile build team suggests removing the option to allow a user to choose their start page from the user profile. 07-07-00—Brad Reel: Feedback from the technical team and the business suggests that it may make more sense to have Create Reservation as an option, and have it process in a different manner than the normal create reservation process. The main advantage of this would be First Notice of Loss Adjusters. There was also consensus that if the ability to select your start page is removed in this release, it should be possible to easily add it back in the future.

07-07-00—Brad Reel: Upon speaking to the database and build teams, it should not be difficult to add the functionality back to the system in a future release. A user's start page was set up as an attribute of a user, and since there will still be other attributes for a user, the start page will just be a new attribute when it is added back. Therefore adding the ability to choose a start page in a future release should not be difficult.

07-07-00—Brad Reel: This issue is being assigned to Sean O'Donnell for review of the feasibility and impacts to the create reservation process if a user is allowed to enter the create res page without having entered the initial required fields (i.e. Claim #, Claim Type, Renter Last Name, etc.). This issue should be discussed for resolution at the 07-17 issues meeting and is being assigned to Craig Lalumandier as resolution contact until it is resolved. Upon resolution, this issue may need to be assigned back to Brad Reel so that the decision can be implemented into the user profile.

Status: Closed—Resolved

Resolution: 07/17/00 [Craig L.]—For the initial release, the start page will not be profiled. This feature would not be difficult to add in the future.

Sean O'Donnell 07-11-00—I would NOT recommend allowing users to have the create reservation page selected as their 'Start Page' for the following reasons:

- the reason(s) we split the reservation process into two pages to begin with still exist 1) to have the information to perform authorized and unauthorized matches to ensure that the reservation that is being created does not already exist, 2) to get the 'where needed' information to retrieve a location & rates, 3) to get the claim type information up front so that we can build the authorization section of the create reservation page appropriately.
- if we change the process to support 'FNOL' adjusters differently than the 'normal' way of creating a reservation, use of the application will be inconsistent.

Please contact me if there are concerns with these statements.

What is claimed is:

1. An Internet-enabled rental vehicle reservation management system, the system comprising:

- a server for communication via the Internet, wherein the server is configured to provide a plurality of graphical user interface (GUI) menus to an authorized purchaser computer for display thereon, wherein at least one of the GUI menus is configured to accept a selection by a user of the authorized purchaser computer as to which one of a plurality of competitive rental vehicle service providers that a rental vehicle reservation is to be booked with, and wherein at least one of the GUI menus is configured to accept input from the user for defining the rental vehicle reservation, wherein the server is further configured to communicate the rental vehicle reservation to the selected one of the competitive rental vehicle service providers via the Internet;
- a computer system for operation by a selected competitive rental vehicle service provider, the computer system for communication with the server via the Internet, the computer system configured to execute a rental vehicle software program, wherein the rental vehicle software program is configured to (1) automatically book the communicated rental vehicle reservation with the selected competitive rental vehicle service provider operating the computer system without human intervention on the part of personnel of the selected competitive rental vehicle service provider operating the computer system and (2) manage the booked rental vehicle reservation in response to further input from the user.

2. The system of claim 1 wherein the computer system comprises:

a first mainframe;

a second mainframe in communication with the first mainframe;

a database in which rental vehicle reservation data is stored, wherein the database is in communication with the second mainframe; and a plurality of branch office computers of the selected competitive rental vehicle service provider operating the computer system, wherein the plurality of branch office computers are in communication with the second mainframe;

wherein the first mainframe is configured to execute the rental vehicle software program; and wherein the second mainframe is configured to execute a software program for access by the branch office computers to fulfill rental vehicle reservations that are stored within the database and that were booked and managed by the rental vehicle software program in response to input from the user.

3. The system of claim 2 wherein the server is configured for access by a plurality of authorized purchaser computers, and wherein the server is further configured to customize the GUI menus on a per authorized purchaser computer user basis.

4. The system of claim 2 wherein the server is configured to provide a user of the authorized purchaser computer with a single set of GUI menus for booking a rental vehicle reservation with all of the competitive rental vehicle service providers.

5. The system of claim 4 wherein the server is further configured to accommodate a plurality of varying data requirements for rental vehicle reservations with the competitive rental vehicle service providers.

6. The system of claim 2 wherein the rental vehicle software program is further configured to support a plurality of management functions by the user for a rental vehicle reservation, the management functions comprising a rental vehicle reservation extension by the user, an authorization by the user of a request for a rental vehicle reservation extension requested by someone other than the user, an authorization by the user for a rental vehicle reservation booked by someone other than the user, and a change in rental vehicle reservation authorization by the user.

7. The system of claim 6 wherein the server is configured for access by a plurality of authorized purchaser computers belonging to a common business organization, and wherein the server is further configured to provide a GUI menu for display on the authorized purchaser computers that presents each user with an action item list that identifies a plurality of management function actions for rental vehicle reservations that have been assigned to the user, and wherein the server is further configured to create a plurality of workgroups of users, wherein each workgroup shares a workload of management function actions.

8. The system of claim 1 wherein the server comprises a plurality of networked web servers.

9. The system of claim 1 wherein the server is resident in a computer system operated by a competitive rental vehicle service provider.

10. An Internet-enabled rental vehicle reservation management system, the system comprising:

a purchaser computer for operation by a user, the purchaser computer configured to display a plurality of graphical user interface (GUI) menus for selecting in response to user input which one of a plurality of competitive rental vehicle service providers that a rental vehicle reservation is to be booked with and for defining in response to user input the rental vehicle reservation, wherein the purchaser computer system is further configured to communicate the rental vehicle reservation to the selected one of the competitive rental vehicle service providers via the Internet;

a computer system for operation by a selected competitive rental vehicle service provider, the computer system for communication with the purchaser computer via the Internet, the computer system configured to execute a rental vehicle software program, wherein the rental vehicle software program is configured to (1) automatically book the communicated rental vehicle reservation with the selected competitive rental vehicle service provider operating the computer system without human intervention on the part of personnel of the selected competitive rental vehicle service provider operating the computer system and (2) manage the booked rental vehicle reservation in response to further input from the user.

11. The system of claim 10 wherein the computer system further comprises:

a database in which rental vehicle reservation data is stored; and a plurality of branch office computers of the selected competitive rental vehicle service provider operating the computer system; and wherein the computer system is further configured to execute a software program for access by the branch office computers to fulfill rental vehicle reservations that are stored within the database and that were booked and managed by the rental vehicle software program in response to input from the user, and wherein the rental vehicle software program is further configured to support a plurality of management functions by the user for a rental vehicle reservation, the management functions comprising a rental vehicle reservation extension by the user, an authorization by the user of a request for a rental vehicle reservation extension requested by someone other than the user, an authorization by the user for a rental vehicle reservation booked by someone other than the user, and a change in rental vehicle reservation authorization by the user.

12. An Internet-enabled rental vehicle reservation management method, the method comprising:

a purchaser computer selecting a competitive rental vehicle service provider from among a plurality of rental vehicle service providers and defining a rental vehicle reservation in response to user input through at least one graphical user interface (GUI) displayed on the purchaser computer; and the purchaser computer initiating over the Internet a remote execution of a rental vehicle software program, the rental vehicle software program resident on a rental vehicle reservation management computer system operated by the selected competitive rental vehicle service provider, the rental vehicle software program configured, upon execution, to (1) automatically book the defined rental vehicle reservation with the selected competitive rental vehicle service provider operating the rental vehicle reservation management computer system without human intervention on the part of personnel of the selected competitive rental vehicle service provider operating the rental vehicle reservation management computer system and (2) manage the booked rental vehicle reservation in response to further input from the user of the purchaser computer.

13. The method of claim 12 further comprising the purchaser computer accessing the at least one GUI over the Internet.

14. The method of claim 13 wherein the rental vehicle reservation management computer system comprises an Internet web portal, the method further comprising the purchaser computer communicating with the Internet web portal over the Internet to access the at least one GUI.

15. The method of claim 12 wherein the purchaser computer comprises an insurance company computer, wherein the user comprises an insurance adjuster, and wherein the rental vehicle reservation comprises a replacement rental vehicle reservation for a renter whose ordinary vehicle is undergoing repairs.

16. The method of claim 15 wherein the rental vehicle software program is further configured, upon execution, to support a plurality of management functions by the user for a rental vehicle reservation, the management functions comprising a rental vehicle reservation extension by the user, an authorization by the user of a request for a rental vehicle reservation extension requested by someone other than the user, an authorization by the user for a rental vehicle reservation booked by someone other than the user, and a change in rental vehicle reservation authorization by the user.

17. An Internet-enabled rental vehicle reservation management method, the method comprising:

a rental vehicle reservation management computer system receiving from a purchaser computer via the Internet a selection of a competitive rental vehicle service provider from among a plurality of competitive rental vehicle service providers and rental vehicle reservation data submitted by a user through at least one graphical user interface (GUI) displayed on the purchaser computer; and the rental vehicle reservation management computer system executing a rental vehicle software program in response to the received selection and the received rental vehicle reservation data, wherein the executing comprises (1) automatically booking the defined rental vehicle reservation with the selected competitive rental vehicle service provider without human intervention on the part of personnel of the selected competitive rental vehicle service provider and (2) managing the booked rental vehicle reservation in response to further input received from the user of the purchaser computer.

18. The method of claim 16 further comprising the rental vehicle reservation management computer system providing the at least one GUI to the purchaser computer via the Internet.

19. The method of claim 18 wherein the rental vehicle reservation management computer system comprises an Internet web portal, wherein the Internet web portal provides the at least one GUI to the purchaser computer via the Internet.

20. The method of claim 17 wherein the rental vehicle software program is further configured, upon execution, to support a plurality of management functions for a rental vehicle reservation, the management functions comprising a rental vehicle reservation extension by a user of the purchaser computer, an authorization by the user of a request for a rental vehicle reservation extension requested by someone other than the user, an authorization by the user for a rental vehicle reservation booked by someone other than the user, and a change in rental vehicle reservation authorization by the user.

* * * * *